US011934027B2

(12) United States Patent
Hu et al.

(10) Patent No.: US 11,934,027 B2
(45) Date of Patent: Mar. 19, 2024

(54) OPTICAL SYSTEM

(71) Applicant: TDK TAIWAN CORP., Taoyuan (TW)

(72) Inventors: Chao-Chang Hu, Taoyuan (TW); Chih-Wei Weng, Taoyuan (TW); Chia-Che Wu, Taoyuan (TW); Chien-Yu Kao, Taoyuan (TW); Hsiao-Hsin Hu, Taoyuan (TW); He-Ling Chang, Taoyuan (TW); Chao-Hsi Wang, Taoyuan (TW); Chen-Hsien Fan, Taoyuan (TW); Che-Wei Chang, Taoyuan (TW); Mao-Gen Jian, Taoyuan (TW); Sung-Mao Tsai, Taoyuan (TW); Wei-Jhe Shen, Taoyuan (TW); Yung-Ping Yang, Taoyuan (TW); Sin-Hong Lin, Taoyuan (TW); Tzu-Yu Chang, Taoyuan (TW); Sin-Jhong Song, Taoyuan (TW); Shang-Yu Hsu, Taoyuan (TW); Meng-Ting Lin, Taoyuan (TW); Shih-Wei Hung, Taoyuan (TW); Yu-Huai Liao, Taoyuan (TW); Mao-Kuo Hsu, Taoyuan (TW); Hsueh-Ju Lu, Taoyuan (TW); Ching-Chieh Huang, Taoyuan (TW); Chih-Wen Chiang, Taoyuan (TW); Yu-Chiao Lo, Taoyuan (TW); Ying-Jen Wang, Taoyuan (TW); Shu-Shan Chen, Taoyuan (TW); Che-Hsiang Chiu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 0 days.

(21) Appl. No.: 17/808,057

(22) Filed: Jun. 21, 2022

(65) Prior Publication Data

US 2022/0317408 A1 Oct. 6, 2022

Related U.S. Application Data

(63) Continuation of application No. 17/067,493, filed on Oct. 9, 2020, now Pat. No. 11,397,302.

(Continued)

(51) Int. Cl.
*G02B 7/00* (2021.01)
*G02B 7/10* (2021.01)

(52) U.S. Cl.
CPC ............... *G02B 7/005* (2013.01); *G02B 7/10* (2013.01)

(58) Field of Classification Search
CPC .......... G02B 7/005; G02B 7/10; G02B 5/005; G02B 7/021; G02B 7/08; G02B 27/646;
(Continued)

(56) References Cited

U.S. PATENT DOCUMENTS 6,498,624 B1 12/2002 Ogura et al.
2006/0227415 A1 10/2006 Caldwell et al.
(Continued)

FOREIGN PATENT DOCUMENTS

EP 0840873 A1 5/1998
EP 1931135 A1 6/2008
(Continued)

OTHER PUBLICATIONS

European Search Report dated Feb. 26, 2021 in EP Application No. 20200996.5, 15 pages.
(Continued)

*Primary Examiner* — James C. Jones
(74) *Attorney, Agent, or Firm* — MUNCY, GEISSLER, OLDS & LOWE, P.C.

(57) ABSTRACT

An optical system affixed to an electronic apparatus is provided, including a first optical module, a second optical module, and a third optical module. The first optical module
(Continued)

is configured to adjust the moving direction of a first light from a first moving direction to a second moving direction, wherein the first moving direction is not parallel to the second moving direction. The second optical module is configured to receive the first light moving in the second moving direction. The first light reaches the third optical module via the first optical module and the second optical module in sequence. The third optical module includes a first photoelectric converter configured to transform the first light into a first image signal.

19 Claims, 206 Drawing Sheets

Related U.S. Application Data

(60) Provisional application No. 63/065,865, filed on Aug. 14, 2020, provisional application No. 63/041,459, filed on Jun. 19, 2020, provisional application No. 63/031,026, filed on May 28, 2020, provisional application No. 63/017,313, filed on Apr. 29, 2020, provisional application No. 62/986,039, filed on Mar. 6, 2020, provisional application No. 62/972,259, filed on Feb. 10, 2020, provisional application No. 62/950,520, filed on Dec. 19, 2019, provisional application No. 62/932,625, filed on Nov. 8, 2019, provisional application No. 62/925,958, filed on Oct. 25, 2019, provisional application No. 62/912,743, filed on Oct. 9, 2019.

(58) Field of Classification Search
CPC .... G02B 13/0065; G02B 7/09; G02B 7/1805; G02B 7/182; G03B 13/36
See application file for complete search history.

(56) References Cited

U.S. PATENT DOCUMENTS

| | | | | |
|---|---|---|---|---|
| 2017/0329111 | A1* | 11/2017 | Hu | G02B 7/09 |
| 2018/0213131 | A1 | 7/2018 | Liu et al. | |
| 2018/0335603 | A1 | 11/2018 | Hu et al. | |
| 2019/0018222 | A1 | 1/2019 | Weng et al. | |
| 2019/0235202 | A1 | 8/2019 | Smyth et al. | |

FOREIGN PATENT DOCUMENTS

| | | | |
|---|---|---|---|
| EP | 3115819 | A1 | 1/2017 |
| EP | 3165956 | A1 | 5/2017 |
| EP | 3349064 | A1 | 7/2018 |
| EP | 3739370 | A1 | 11/2020 |
| JP | 2011085682 | A | 4/2011 |
| JP | 2017021268 | A | 1/2017 |
| KR | 100975630 | B1 | 8/2010 |
| KR | 2015-0142196 | A | 12/2015 |
| KR | 2017-0105236 | A | 9/2017 |
| KR | 20180105970 | A | 10/2018 |
| WO | WO-97/05423 | | 2/1997 |
| WO | WO-2006-023425 | A2 | 3/2006 |
| WO | WO-2019/002523 | A1 | 1/2019 |
| WO | WO-2019/139284 | A1 | 7/2019 |

OTHER PUBLICATIONS

European Search Report dated Jun. 23, 2021 in EP Application No. 20200990.8, 13 pages.
European Search Report dated Mar. 5, 2021 in EP Application No. 20200990.8, 12 pages.
Extended European Search Report dated Feb. 26, 2021 in EP Application No. 20200953.6, 9 pages.

* cited by examiner 1-100

5-11

7-111

7-112

8-620

8-630

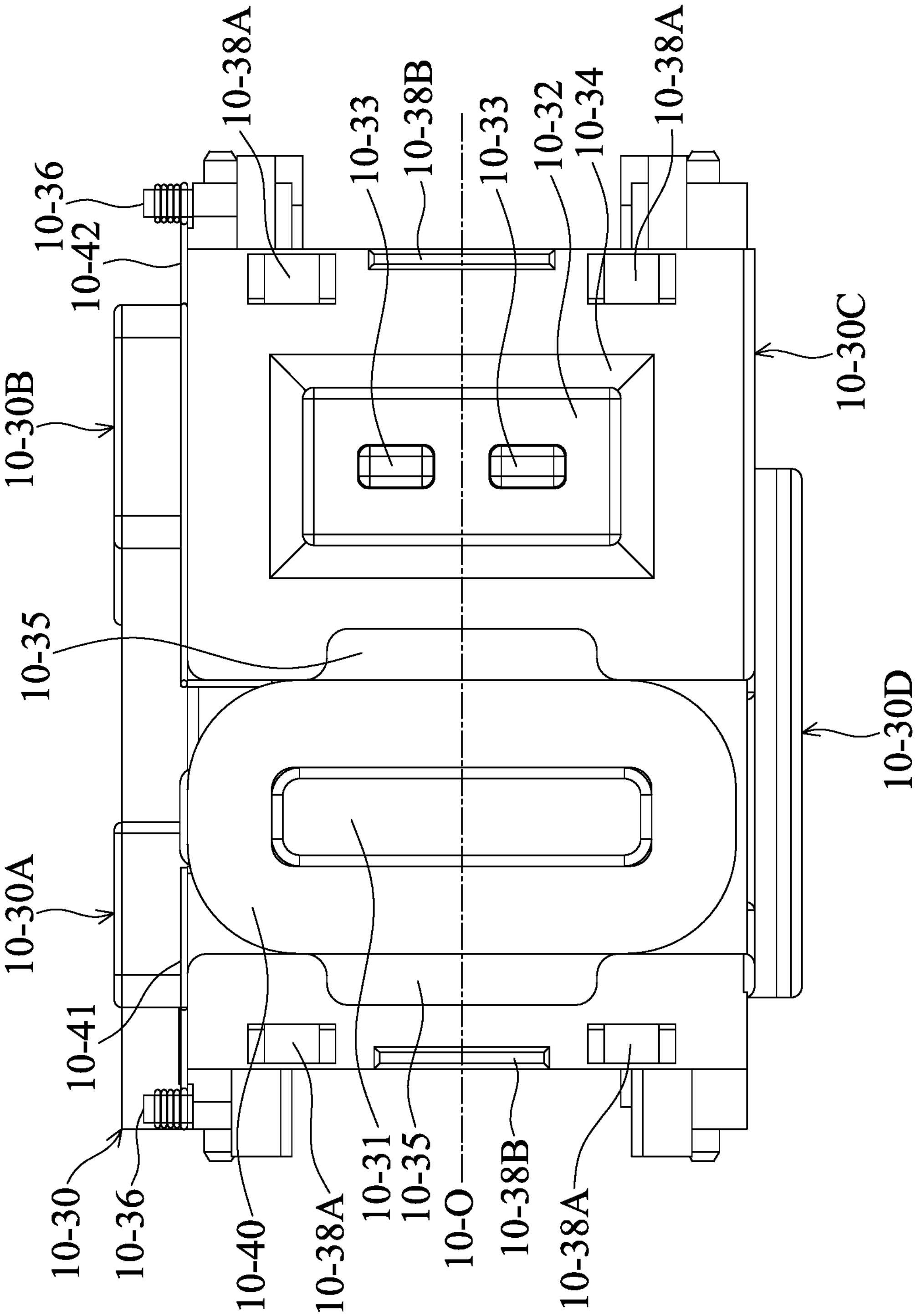
FIG. 135A
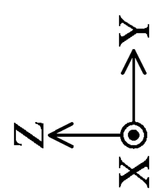

12-1

OPTICAL SYSTEM

CROSS REFERENCE TO RELATED APPLICATIONS

This application is a Continuation of application Ser. No. 17/067,493, filed Oct. 9, 2020, which claims the benefit of U.S. Provisional Patent Application No. 62/912,743, filed Oct. 9, 2019, U.S. Provisional Patent Application No. 62/925,958, filed Oct. 25, 2019, U.S. Provisional Patent Application No. 62/932,625, filed Nov. 8, 2019, U.S. Provisional Patent Application No. 62/950,520, filed Dec. 19, 2019, U.S. Provisional Patent Application No. 62/972,259, filed Feb. 10, 2020, U.S. Provisional Patent Application No. 62/986,039, filed Mar. 6, 2020, U.S. Provisional Patent Application No. 63/017,313, filed Apr. 29, 2020, U.S. Provisional Patent Application No. 63/031,026, filed May 28, 2020, U.S. Provisional Patent Application No. 63/041,459, filed Jun. 19, 2020, and U.S. Provisional Patent Application No. 63/065,865, filed Aug. 14, 2020, the entirety of which are incorporated by reference herein.

BACKGROUND OF THE INVENTION

Field of the Invention

The application relates in general to an optical system, and in particular, to an optical system having a plurality of optical modules.

Description of the Related Art

Thanks to technological advancements, the latest consumer electronic devices (such as tablet computers and smartphones) now usually include a lens module capable of aiding in photography or recording video. These electronic devices have become commonplace, and have been developed to be more convenient and thin. Users are given more and more choices. However, when a lens with a long focal length is disposed in the electronic device, the thickness of the electronic device is increased, and as such it is hard to make the electronic device thin.

BRIEF SUMMARY OF INVENTION

To address the deficiencies of conventional products, an embodiment of the invention provides an optical system affixed to an electronic apparatus. The optical system includes a first optical module, a second optical module, and a third optical module. The first optical module is configured to adjust the moving direction of a first light from a first moving direction to a second moving direction, wherein the first moving direction is not parallel to the second moving direction. The second optical module is configured to receive the first light moving in the second moving direction. The first light reaches the third optical module via the first optical module and the second optical module in sequence. The third optical module includes a first photoelectric converter configured to transform the first light into a first image signal.

In some embodiments, the first optical module further comprises a first light path adjusting member and a first driving mechanism, and the first driving mechanism is configured to drive the first light path adjusting member to move relative to the electronic apparatus. The first driving mechanism is configured to drive the first light path adjusting member to rotate around a first axis relative to the electronic apparatus. The first axis is not parallel to the first moving direction. The first axis is perpendicular to the first moving direction. The first axis is not parallel to the second moving direction. The first axis is perpendicular to the second moving direction. The first driving mechanism is configured to drive the first light path adjusting member to rotate around a second axis relative to the electronic apparatus. The second axis is not parallel to the first axis. The second axis is not parallel to the first moving direction. The second axis is not parallel to the second moving direction. The electronic apparatus has a plate structure, and a direction, which the thickness of the electronic apparatus be measured, is parallel to the first moving direction. The arrangement direction of the first driving mechanism and the first light path adjusting member is parallel to the first moving direction. As seen from the first moving direction, the first driving mechanism overlaps the first light path adjusting member. The second optical module comprises a first optical assembly and a second driving mechanism, the first optical assembly has a first optical axis, and the second driving mechanism is configured to drive the first optical assembly to move relative to the electronic apparatus. The second driving mechanism is configured to drive the first optical assembly to move along the first optical axis. The first optical axis is parallel to the second moving direction. The first optical assembly comprises a first lens. The first optical assembly comprises a second lens. The first light reaches the third optical module via the first lens and the second lens in sequence. The arrangement direction of the second driving mechanism and the first optical assembly is not parallel to the first moving direction. As seen from the first moving direction, the second driving mechanism and the first optical assembly do not overlap.

In some embodiments, the optical system further comprises a fourth optical module, and the first light reaches the third optical module via the fourth optical module. The first light enters the third optical module via the first optical module and the fourth optical module in sequence. The fourth optical module comprises a second optical assembly and a third driving mechanism, the second optical assembly has a second optical axis, and the third driving mechanism is configured to drive the second optical assembly to move relative to the electronic apparatus. The third driving mechanism is configured to drive the second optical assembly to move relative to the apparatus along a first shifting direction, and the first shifting direction is not parallel to the second optical axis. The third driving mechanism is configured to drive the second optical assembly to move relative to the apparatus along a second shifting direction, and the second shifting direction is not parallel to the second optical axis. The first shifting direction is not parallel to the second shifting direction. The second optical assembly comprises a third lens. The second optical assembly comprises a fourth lens. The first light reaches the third optical module via the third lens and the fourth lens in sequence. The arrangement direction of the third driving mechanism and the second optical assembly is not parallel to the first moving direction. As seen from the first moving direction, the third driving mechanism and the second optical assembly do not overlap.

In some embodiments, the optical system further comprises a fifth optical module, and the first light reaches the third optical module via the fifth optical module. The first light reaches the third optical module via the first optical module and the fifth optical module in sequence. The fifth optical module comprises a third optical assembly, and the third optical assembly has a third optical axis. The third optical assembly comprises a fifth lens. The third optical assembly comprises a sixth lens. The first light reaches the third optical module via the fifth lens and the sixth lens in sequence.

In some embodiments, the optical system further comprises a sixth optical module, and the first light reaches the third optical module via the sixth optical module. The first light reaches the third optical module via the first optical module and the sixth optical module in sequence. The sixth optical module is configured to adjust the moving direction of the first light from the second moving direction to a third moving direction. The second moving direction is not parallel to the third moving direction. The sixth optical module comprises a second light path adjusting member and a fourth driving mechanism, and the fourth driving mechanism is configured to drive the second light path adjusting member to move relative to the electronic apparatus. The fourth driving mechanism is configured to drive the second light path adjusting member to rotate around a third axis relative to the electronic apparatus. The third axis is not parallel to the second moving direction. The third axis is perpendicular to the second moving direction. The third axis is not parallel to the third moving direction. The third axis is perpendicular to the third moving direction. The fourth driving mechanism is configured to drive the second light path adjusting member to rotate around a fourth axis relative to the electronic apparatus. The fourth axis is not parallel to the third axis. The fourth axis is not parallel to the second moving direction. The fourth axis is not parallel to the third moving direction.

In some embodiments, the arrangement direction of the fourth driving mechanism and the second light path adjusting member is parallel to the first moving direction. As seen from the first moving direction, the fourth driving mechanism overlaps the second light path adjusting member. The third moving direction is parallel to the first moving direction.

In some embodiments, the arrangement direction of the fourth driving mechanism and the second light path adjusting member is not parallel to the first moving direction. As seen from the first moving direction, the fourth driving mechanism and the second light path adjusting member do not overlap. The third moving direction is not parallel to the first moving direction.

In some embodiments, the optical system further comprises a seventh optical module, and the first light reaches the third optical module via the seventh optical module. The first light reaches the third optical module via the first optical module and the seventh optical module in sequence. The seventh optical module comprises a fourth optical assembly and a fifth driving mechanism, the fourth optical assembly has a fourth optical axis, and the fifth driving mechanism is configured to drive the fourth optical assembly to move relative to the electronic apparatus. The fifth driving mechanism is configured to drive the fourth optical assembly to move along the fourth optical axis relative to the electronic apparatus. The fourth optical assembly comprises a seventh lens. The fourth optical assembly comprises an eighth lens. The first light reaches the third optical module via the seventh lens and the eighth lens in sequence. The largest movement range of the second optical assembly along the second optical axis relative to the electronic apparatus is different from the largest movement range of the fourth optical assembly along the fourth optical axis relative to the electronic apparatus.

In some embodiments, the optical system further comprises an eighth optical module, and the first light reaches the third optical module via the eighth optical module. The first light reaches the third optical module via the first optical module and the eighth optical module in sequence. The eighth optical module is configured to adjust the moving direction of the first light from the third moving direction to a fourth moving direction. The third moving direction is not parallel to the fourth moving direction. The eighth optical module comprises a third light path adjusting member and a sixth driving mechanism, and the sixth driving mechanism is configured to drive the third light path adjusting member to move relative to the electronic apparatus. The sixth driving mechanism is configured to drive the third light path adjusting member to rotate around a fifth axis relative to the electronic apparatus. The fifth axis is not parallel to the third moving direction. The fifth axis is perpendicular to the third moving direction. The fifth axis is not parallel to the fourth moving direction. The fifth axis is perpendicular to the fourth moving direction. The sixth driving mechanism is configured to drive the third light path adjusting member to rotate around a sixth axis relative to the electronic apparatus. The sixth axis is not parallel to the fifth axis. The sixth axis is not parallel to the third moving direction. The sixth axis is not parallel to the fourth moving direction.

In some embodiments, the arrangement direction of the sixth driving mechanism and the third light path adjusting member is parallel to the first moving direction. As seen from the first moving direction, the sixth driving mechanism overlaps the third light path adjusting member. The fourth moving direction is parallel to the first moving direction.

In some embodiments, the arrangement direction of the sixth driving mechanism and the third light path adjusting member is not parallel to the first moving direction. As seen from the first moving direction, the sixth driving mechanism and the third light path adjusting member do not overlap. The fourth moving direction is not parallel to the first moving direction. The fourth moving direction is parallel to the second moving direction.

In some embodiments, the third optical module further comprises a seventh driving mechanism configured to drive the first photoelectric converter to move relative to the electronic apparatus. The first photoelectric converter has a receiving surface and a fifth optical axis, the receiving surface is configured to receive the first light, and the fifth optical axis is perpendicular to the receiving surface. The seventh driving mechanism is configured to drive the first photoelectric converter to rotate around the fifth optical axis relative to the electronic apparatus. The seventh driving mechanism is configured to drive the first photoelectric converter to rotate around a seventh axis relative to the electronic apparatus, and the seventh axis is perpendicular to the fifth optical axis. The seventh driving mechanism is configured to drive the first photoelectric converter to rotate around an eighth axis relative to the electronic apparatus, and the eighth axis is perpendicular to the fifth optical axis. The seventh axis is not parallel to the eighth axis.

In some embodiments, the fifth optical axis is parallel to the fourth moving direction. As seen from a direction that is perpendicular to the fourth moving direction, the seventh driving mechanism overlaps the eighth optical module. As seen from a direction that is perpendicular to the fourth moving direction, the seventh driving mechanism overlaps the eighth optical module. As seen from the direction that is perpendicular to the fourth moving direction, the seventh driving mechanism overlaps the third light path adjusting member.

In some embodiments, the fifth optical axis is parallel to the third moving direction. As seen from a direction that is perpendicular to the third moving direction, the seventh driving mechanism overlaps the sixth optical module. As seen from the third moving direction, the first photoelectric converter overlaps the second light path adjusting member. As seen from the direction that is perpendicular to the third moving direction, the seventh driving mechanism overlaps the second light path adjusting member.

In some embodiments, the optical system further comprises a ninth optical module, and the first light reaches the third optical module via the first optical module and the ninth optical module in sequence. The ninth optical module comprises an iris aperture and an eighth driving mechanism, the iris aperture is configured to adjust the amount of first light that passes through the iris aperture, and the eighth driving mechanism is configured to change the size of the iris aperture. The iris aperture has a sixth optical axis. As seen from the first moving direction, the eighth driving mechanism and the sixth optical axis do not overlap. The sixth optical axis and the first moving direction do not overlap. The sixth optical axis and the second moving direction do not overlap. The sixth optical axis and the fourth moving direction do not overlap. The sixth optical axis is parallel to the third moving direction.

In some embodiments, the first light passes through the first lens, the second lens, the third lens, the fourth lens, the fifth lens, the sixth lens, the seventh lens, and the eighth lens in sequence. The dimensions of the first lens are different from the dimensions of the second lens. The dimensions of the first lens are smaller than the dimensions of the second lens. The dimensions of the second lens are different from the dimensions of the third lens. The dimensions of the second lens are smaller than the dimensions of the third lens. The dimensions of the third lens are different from the dimensions of the fourth lens. The dimensions of the third lens are smaller than the dimensions of the fourth lens. The dimensions of the fourth lens are different from the dimensions of the fifth lens. The dimensions of the fourth lens are smaller than the dimensions of the fifth lens. The dimensions of the fifth lens are different from the dimensions of the sixth lens. The dimensions of the fifth lens are smaller than the dimensions of the sixth lens. The dimensions of the sixth lens are different from the dimensions of the seventh lens. The dimensions of the sixth lens are smaller than the dimensions of the seventh lens. The dimensions of the seventh lens are different from the dimensions of the eighth lens. The dimensions of the seventh lens are smaller than the dimensions of the eighth lens. The first light passes through the first lens, an iris aperture, and the eighth lens in sequence.

In some embodiments, the eighth lens has a trimming plane. The first lens comprises a circular structure without trimming.

In some embodiments, the seventh optical module further comprises a plurality of fourth optical assemblies, and the fourth optical assemblies have different focal lengths. The fifth driving mechanism is configured to switch the fourth optical assemblies.

In some embodiments, an optical device is formed by the first optical module, the second optical module, and the third optical module, and the optical system further comprises an additional optical device adjacent to the optical device, wherein the additional optical device comprises a second photoelectric converter configured to transform a second light entering the additional device into a second image signal. A distance between the first photoelectric converter and the second photoelectric converter is not zero. As seen from all directions which are perpendicular to the first moving direction, the optical device overlaps the additional optical device.

In some embodiments, the first optical module is independent from the third optical module. A distance between the first optical module and the third optical module is not zero. The first optical module is adjusted to a predetermined position relative to the third optical module by a first adhesive member directly or indirectly, and the first optical module is affixed to the third optical module by the first adhesive member. The first optical module is affixed to the third optical module by a fixed frame and the first adhesive member. The second optical module is independent from the third optical module. A distance between the second optical module and the third optical module is not zero. The second optical module is adjusted to another predetermined position relative to the third optical module by a second adhesive member directly or indirectly, and the second optical module is affixed to the third optical module by the second adhesive member. The second optical module is affixed to the third optical module by the fixed frame and the second adhesive member.

BRIEF DESCRIPTION OF DRAWINGS

The invention can be more fully understood by reading the subsequent detailed description and examples with references made to the accompanying drawings, wherein:

FIG. 112 shows a bottom view of the optical element driving mechanism according to an embodiment of the present disclosure;

FIG. 113 is a perspective view of an optical element driving mechanism in some embodiments of the present disclosure;

FIG. 114 is an exploded view of the optical element driving mechanism,

FIG. 115 is a top view of the optical element driving mechanism;

FIG. 116 is a bottom view of the optical element driving mechanism,

FIG. 117 is an enlarged view of FIG. 116;

Figure 113:
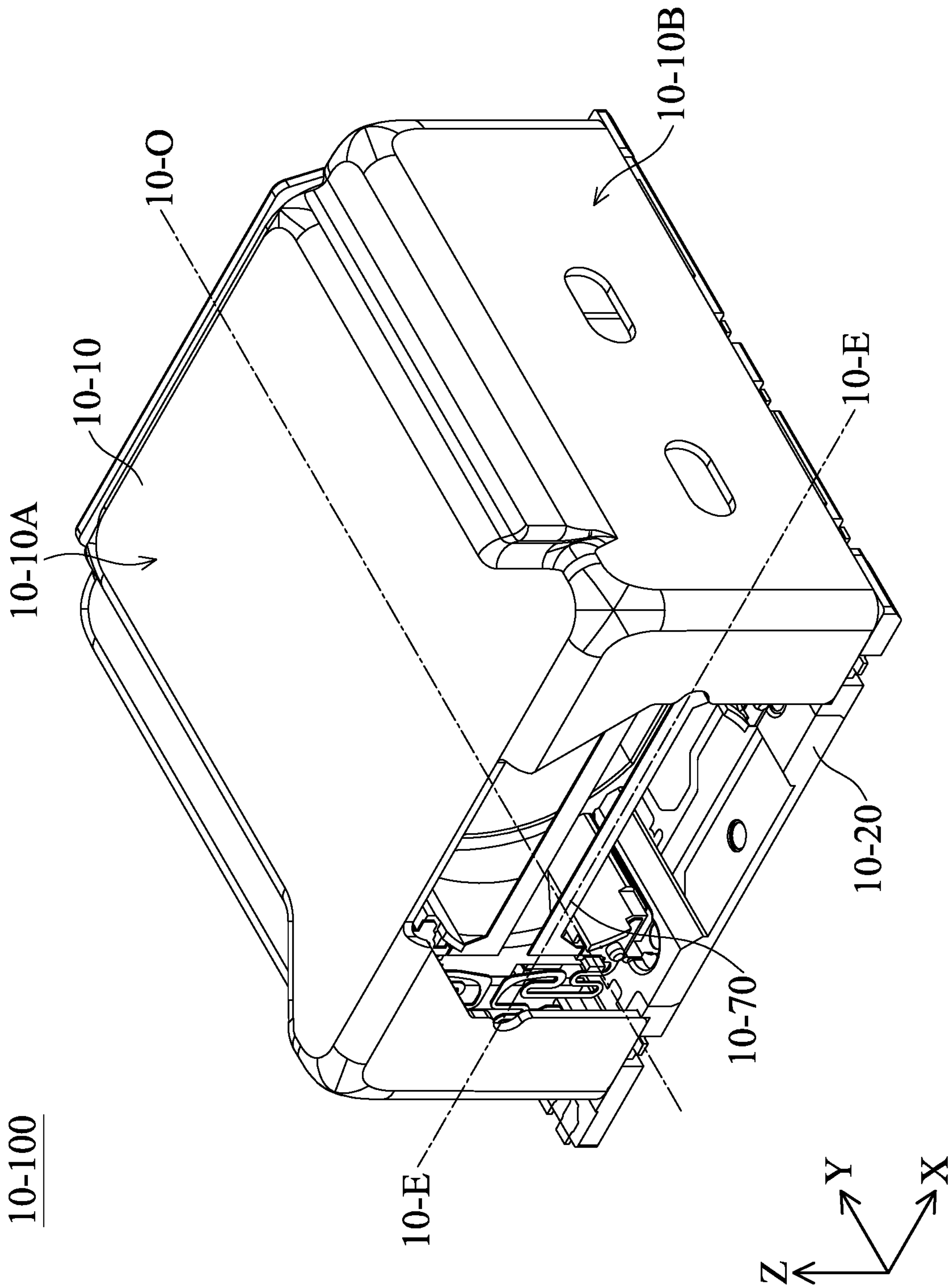
Figure 115:
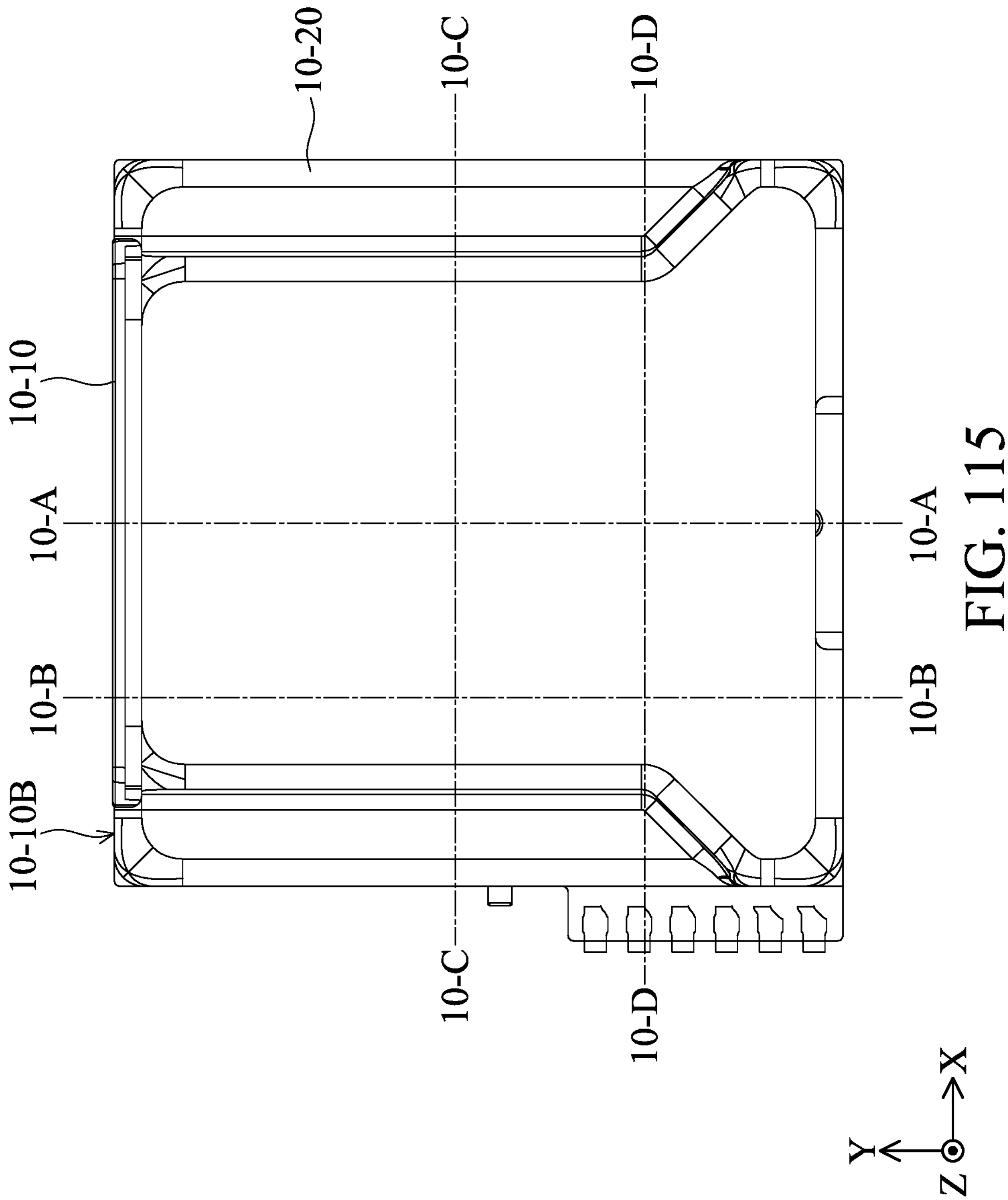
Figure 123:
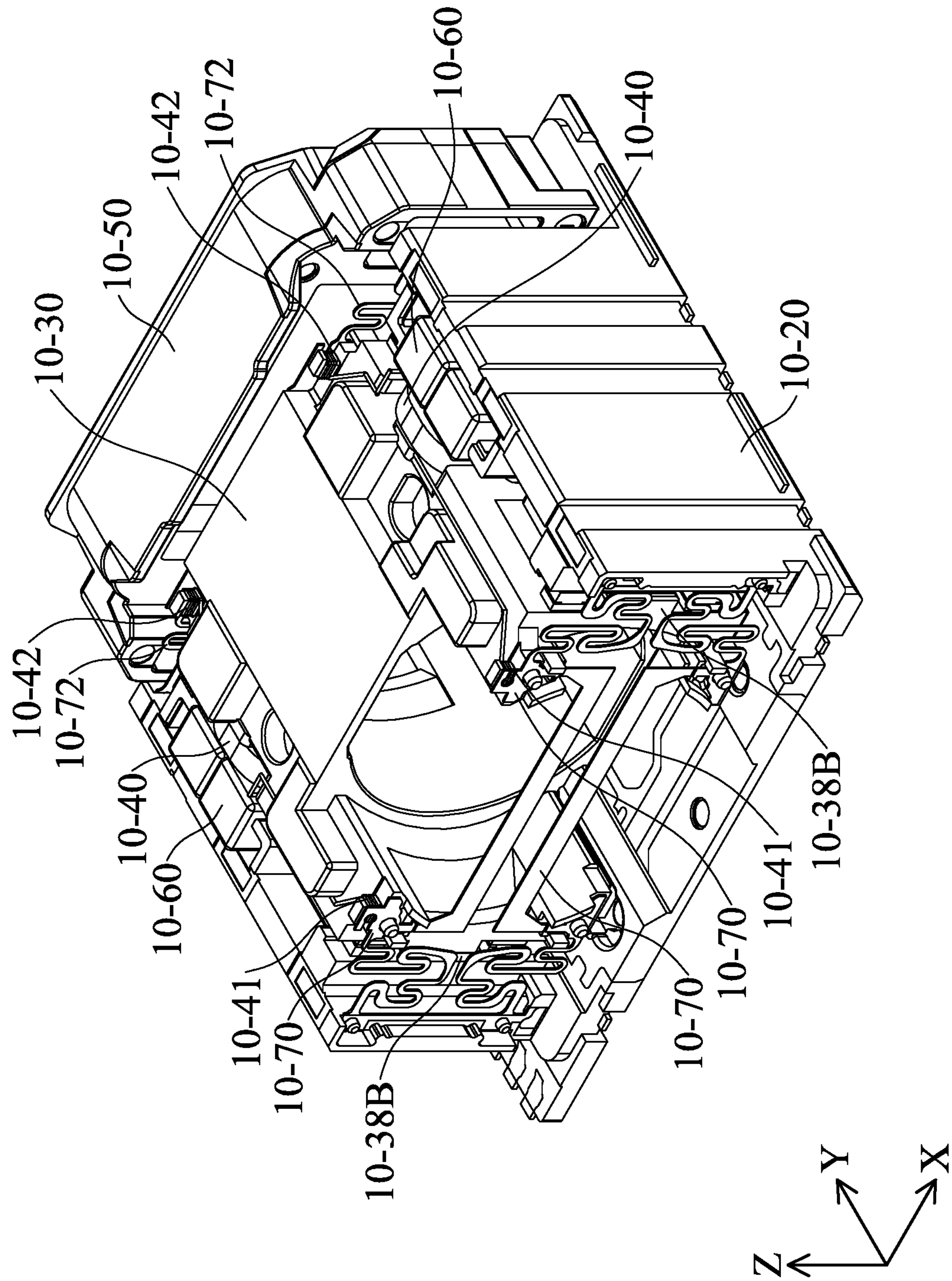
Figure 124:
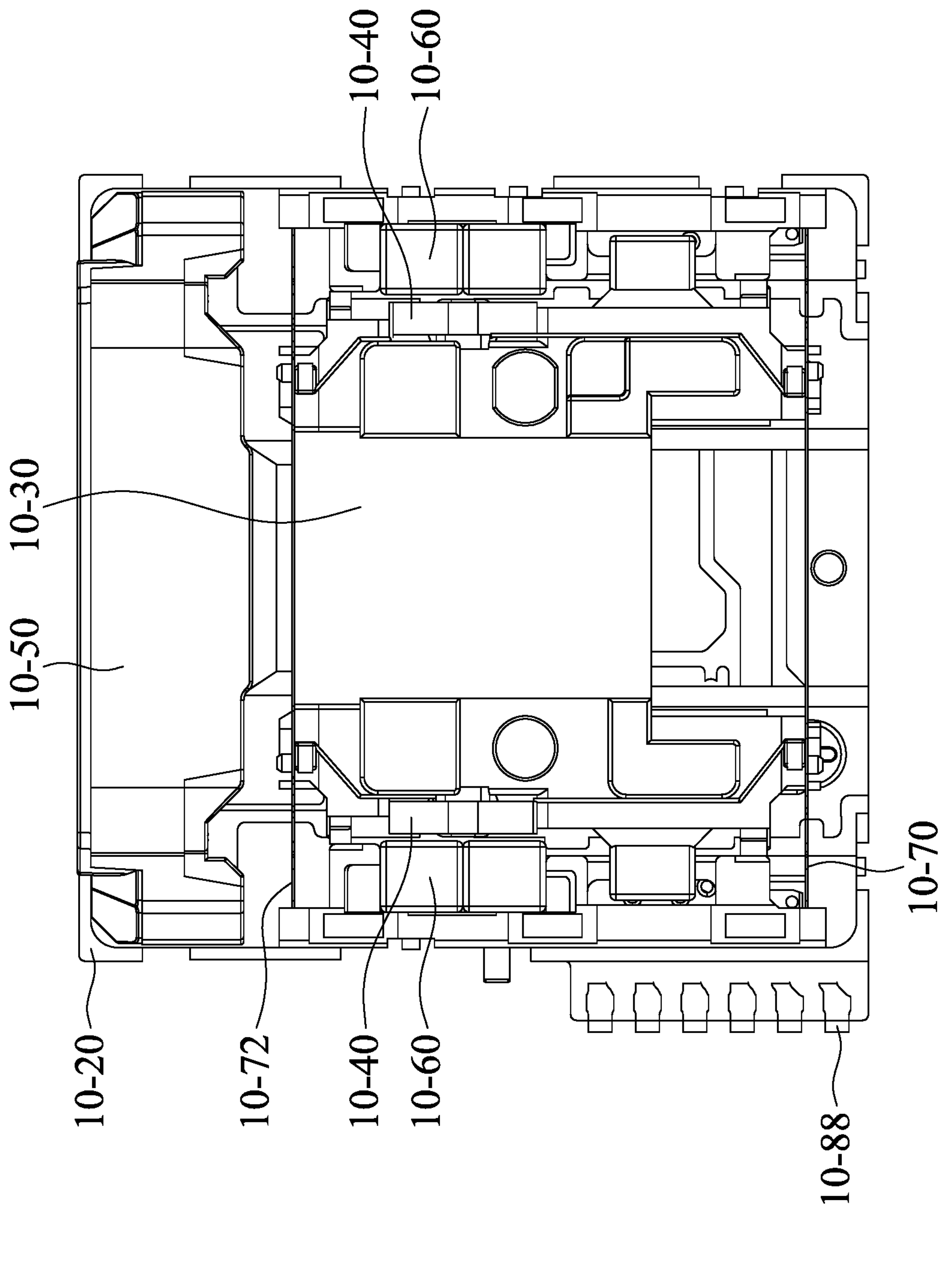
Figure 125:
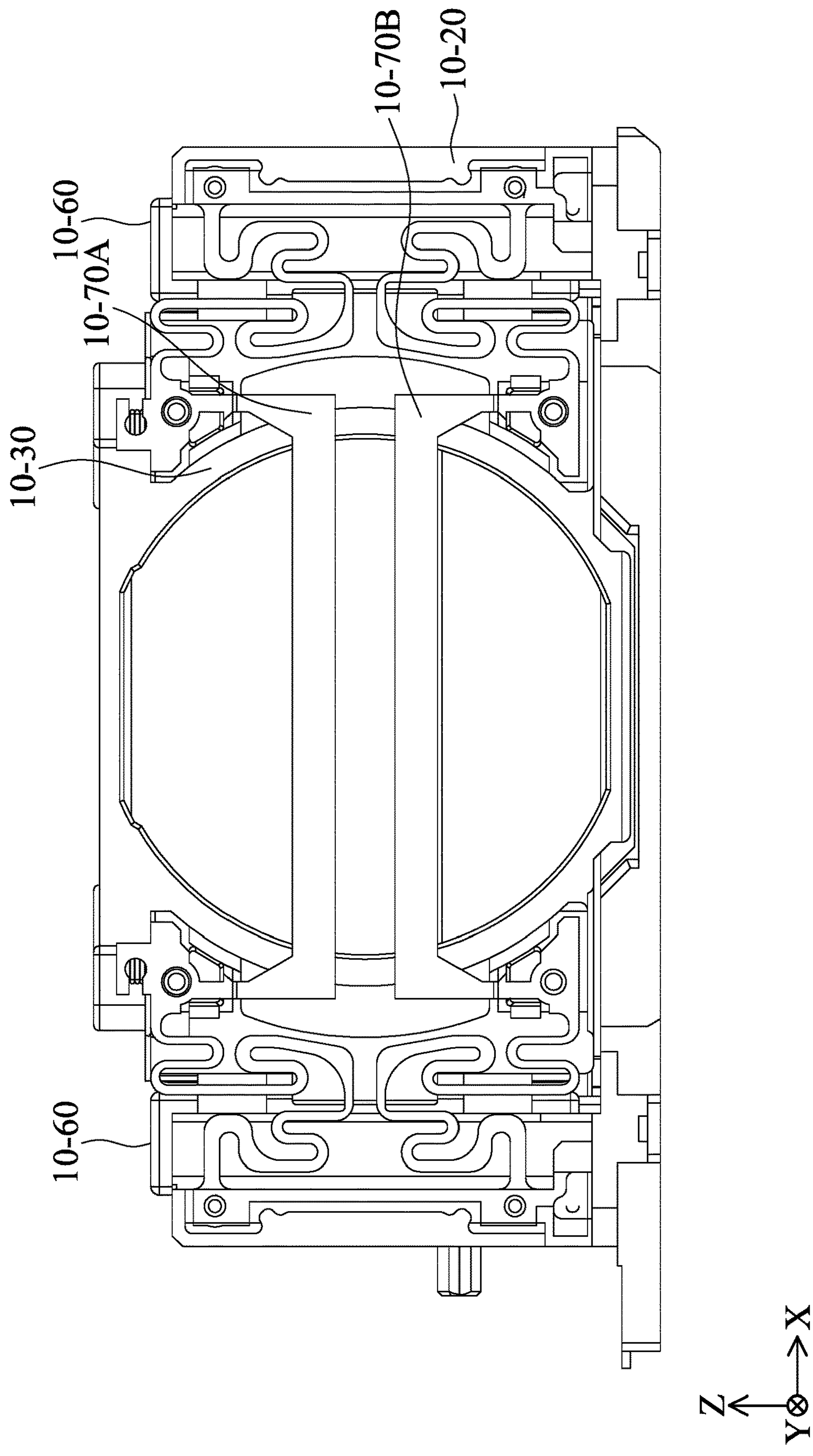
Figure 126:
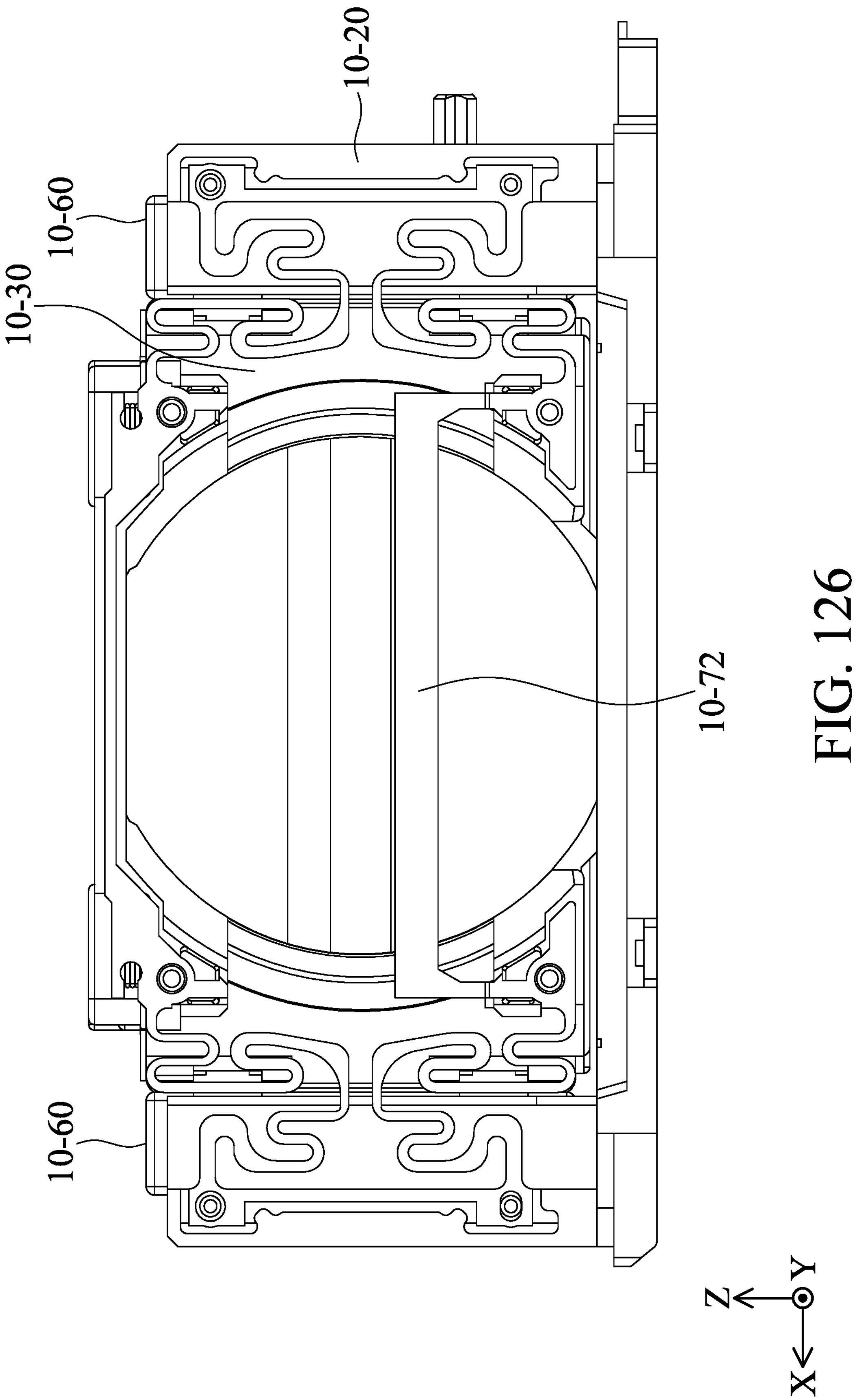
Figure 127:
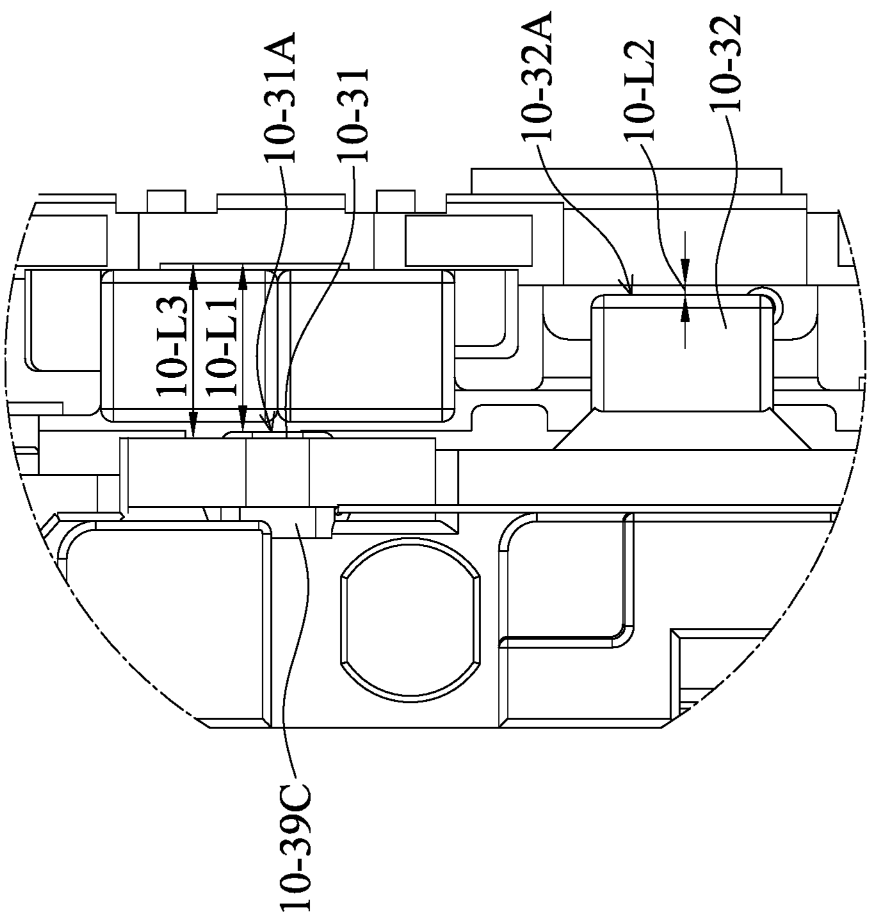
Figure 128:
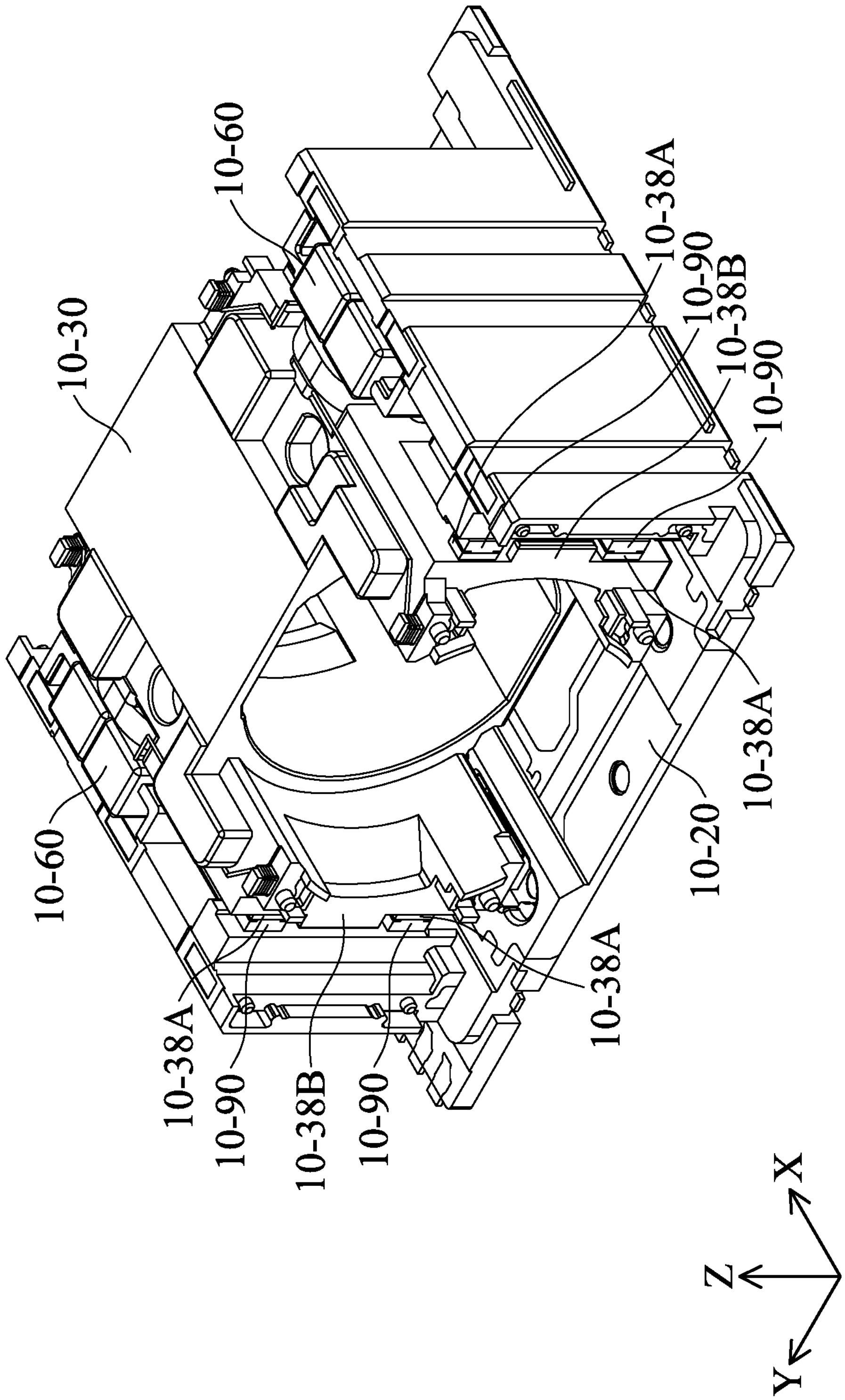
Figure 129:
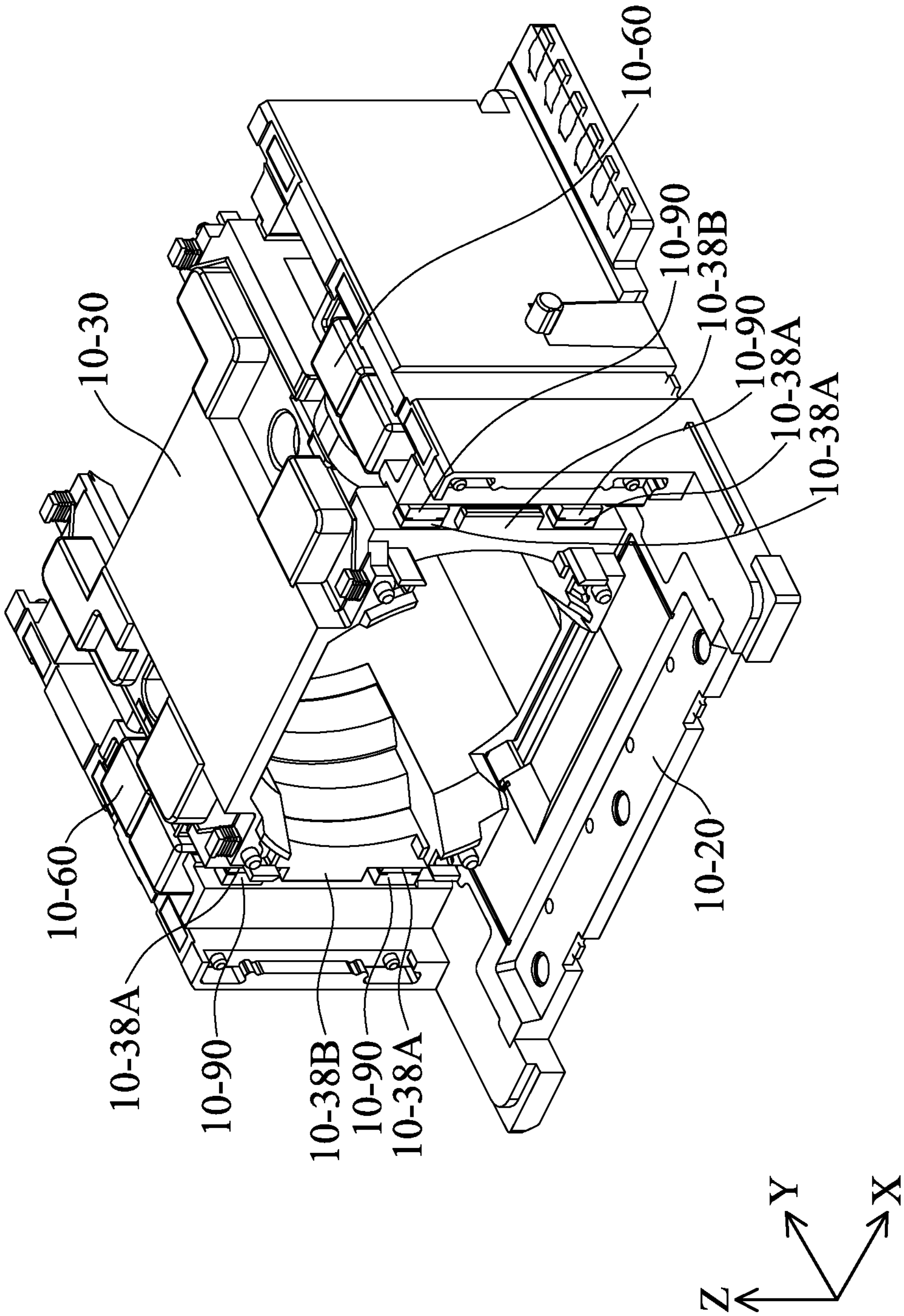
Figure 130:
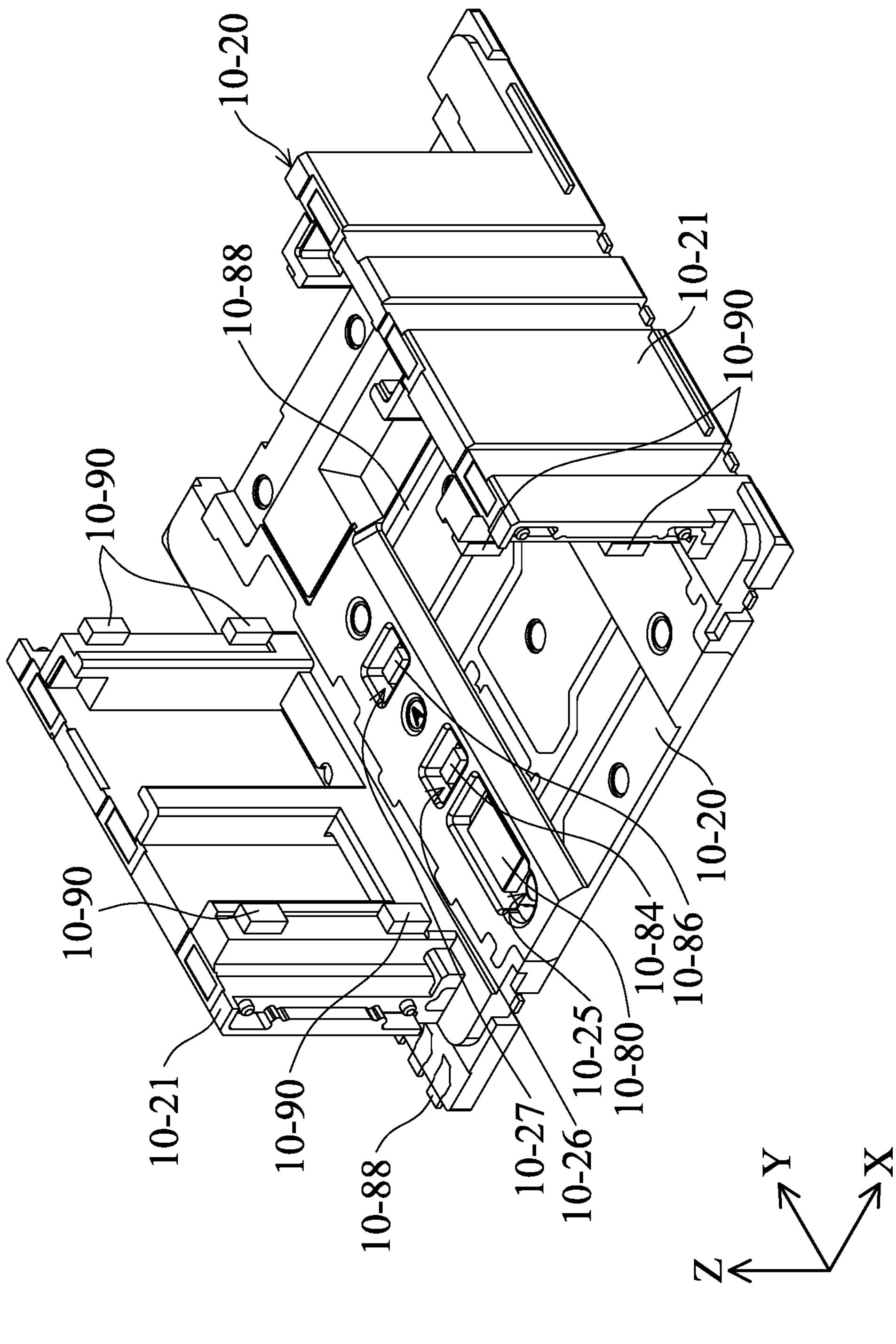
Figure 131:
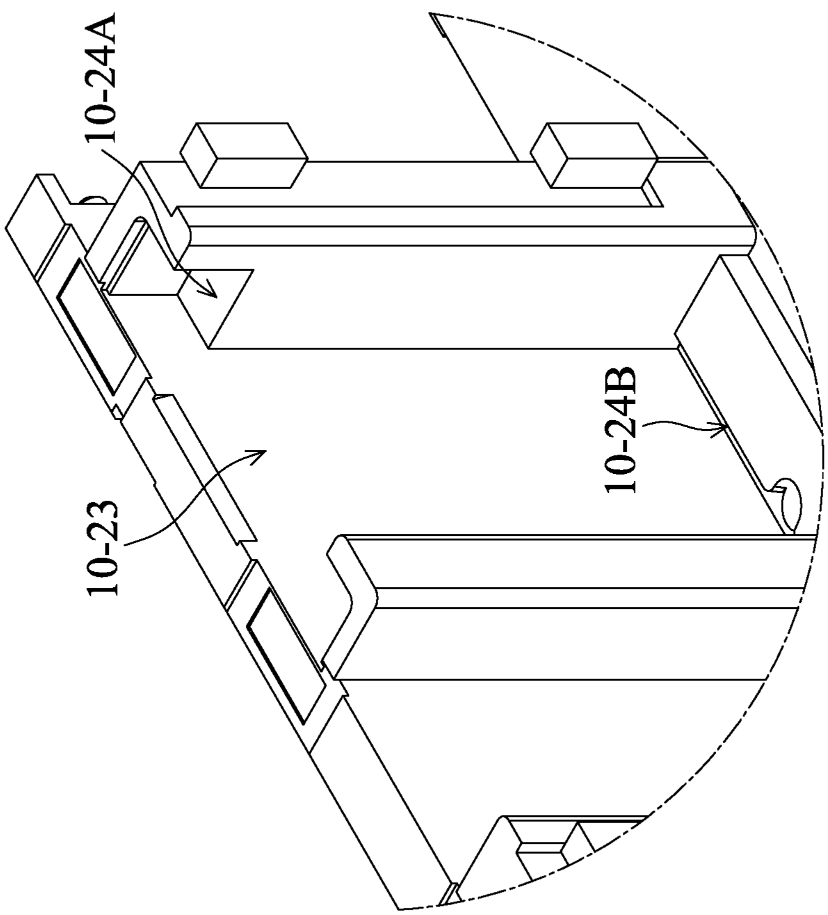
Figure 132:
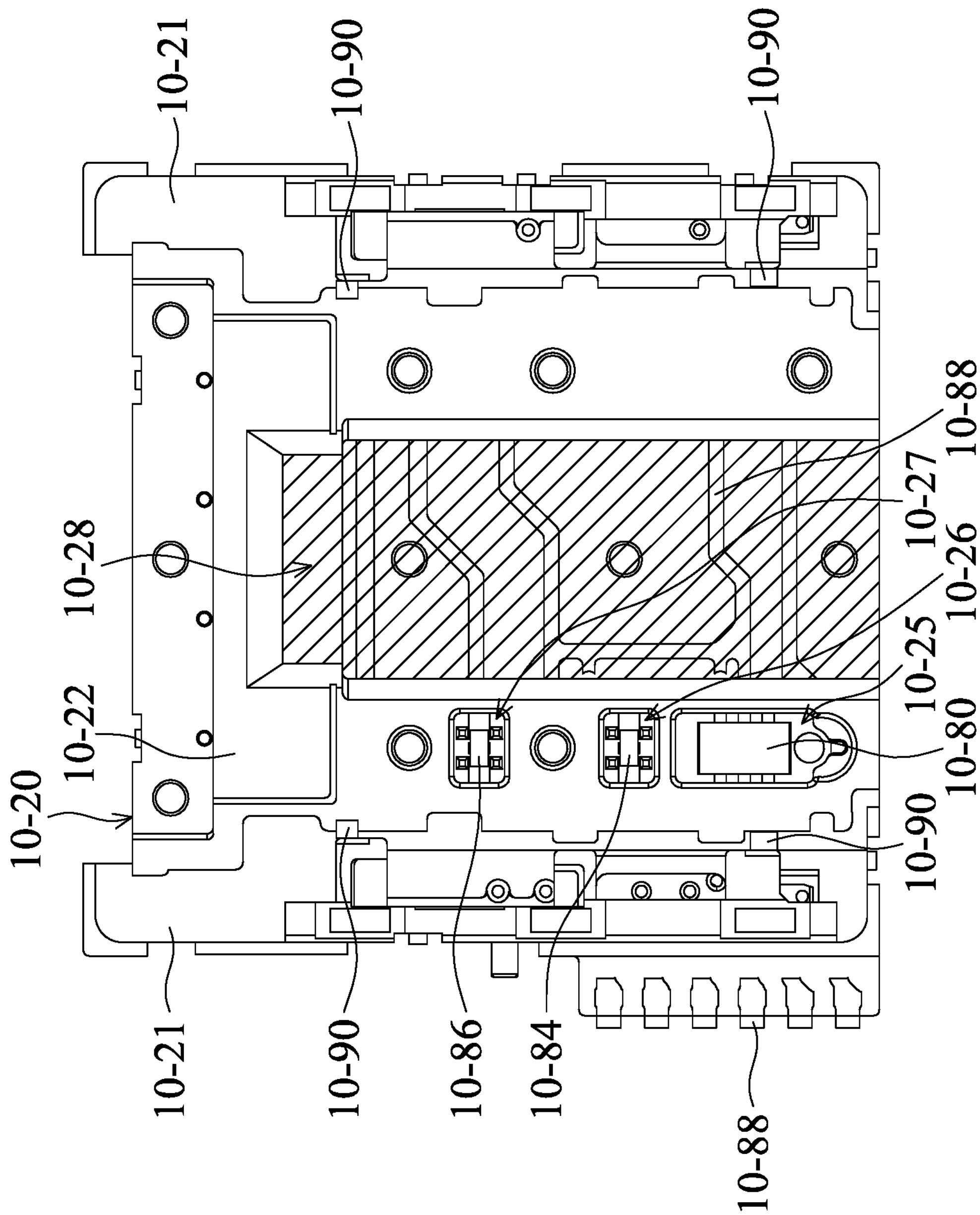
Figure 133:
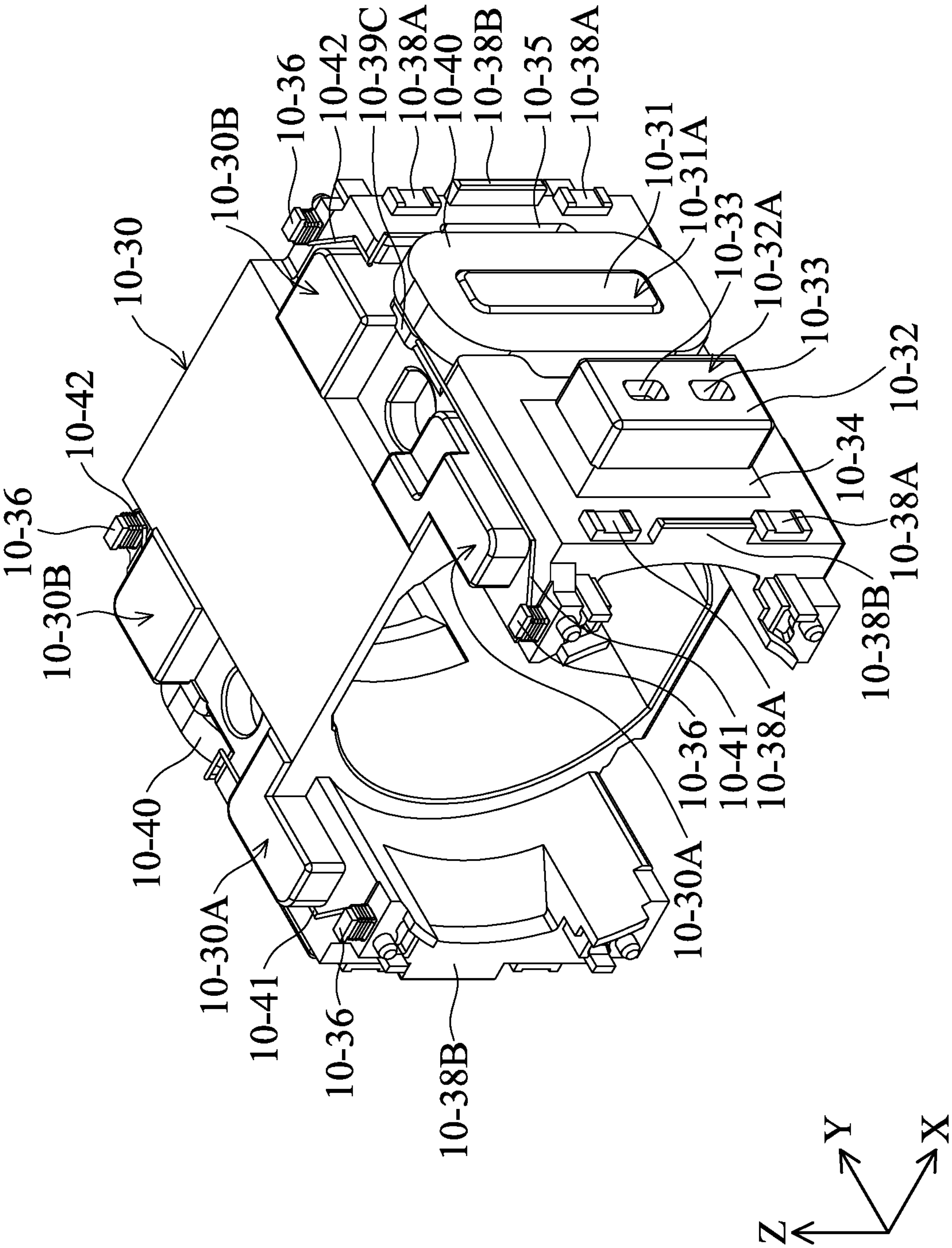
Figure 134:
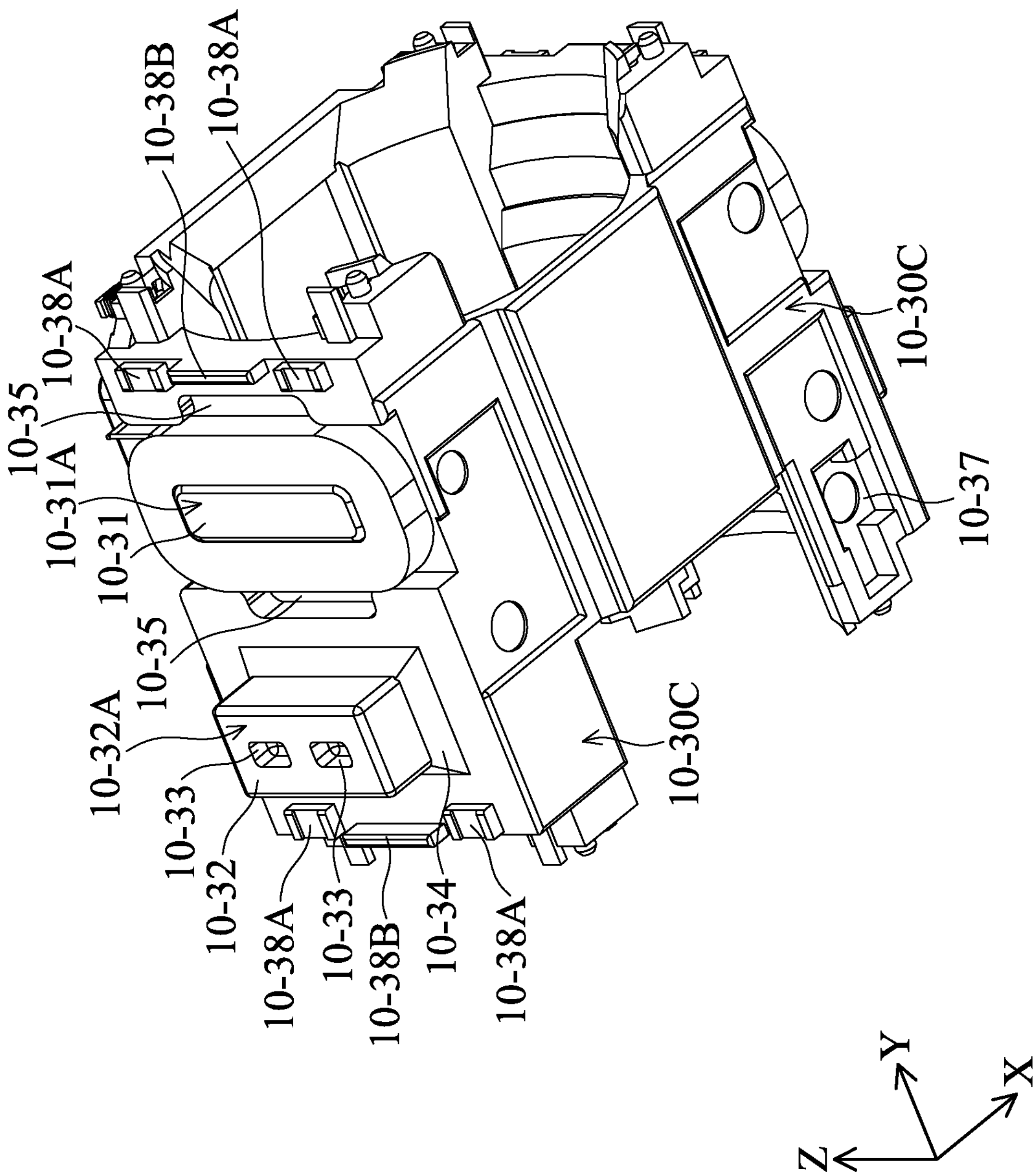
Figure 135B:
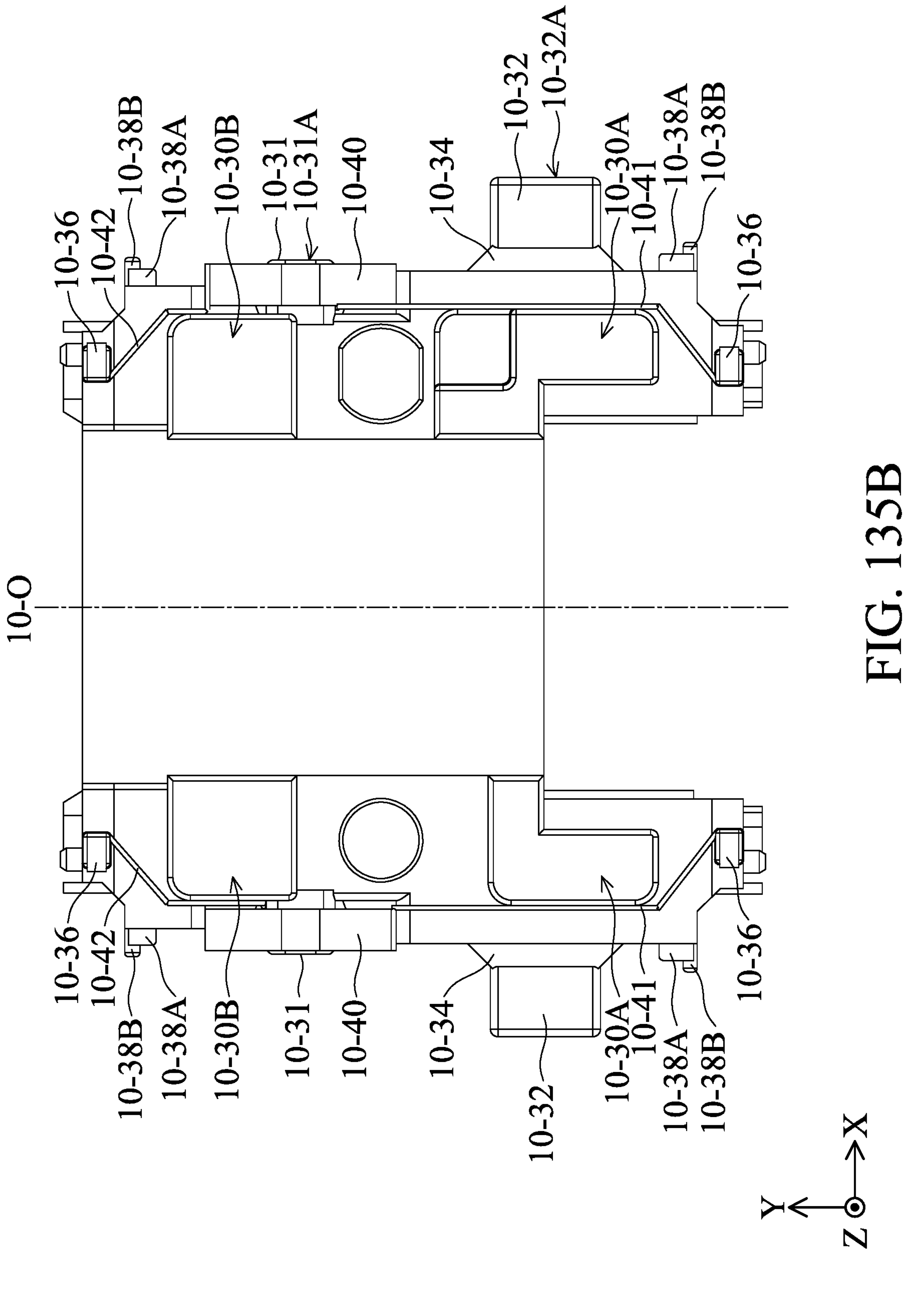
Figure 136:
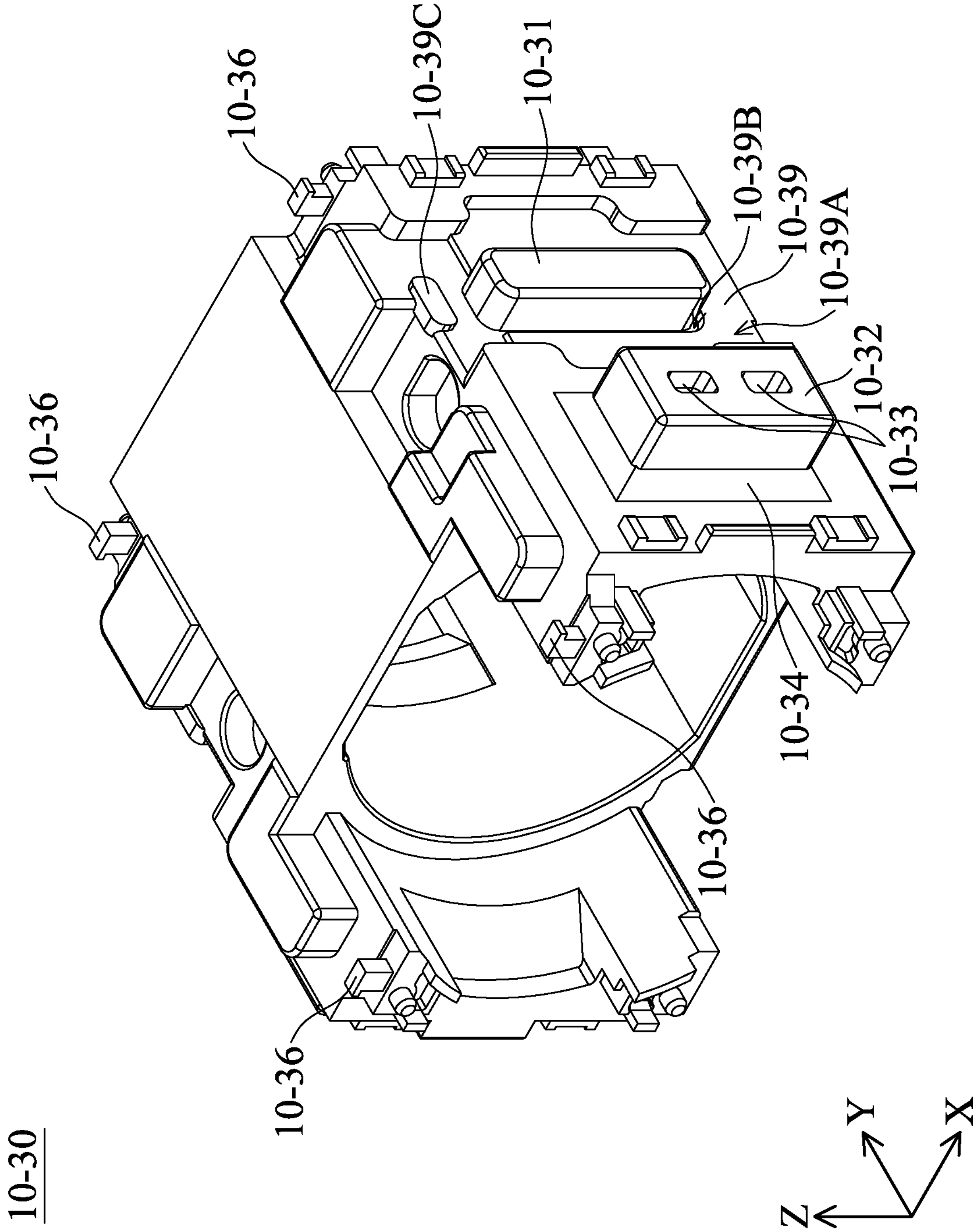
Figure 137:
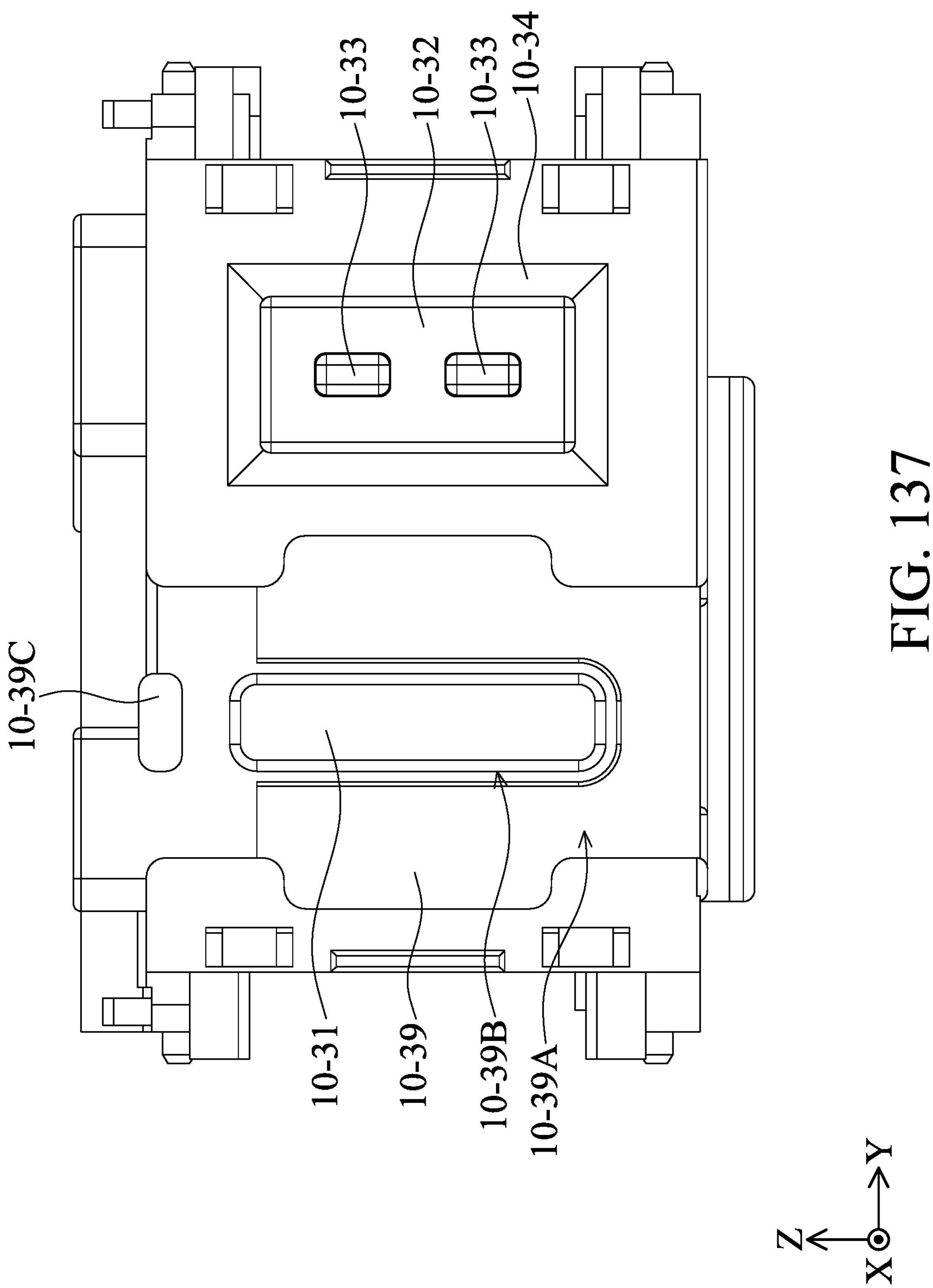
Figure 138:
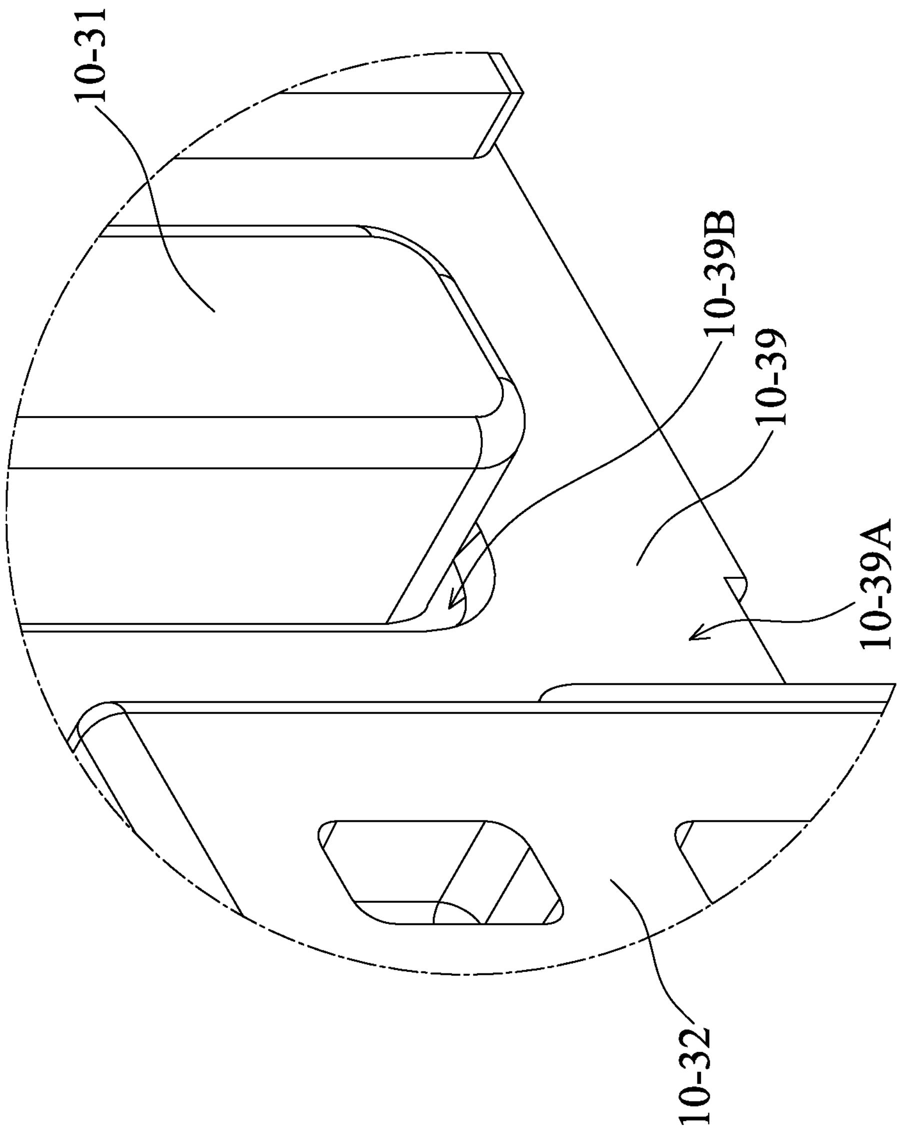
Figure 139:
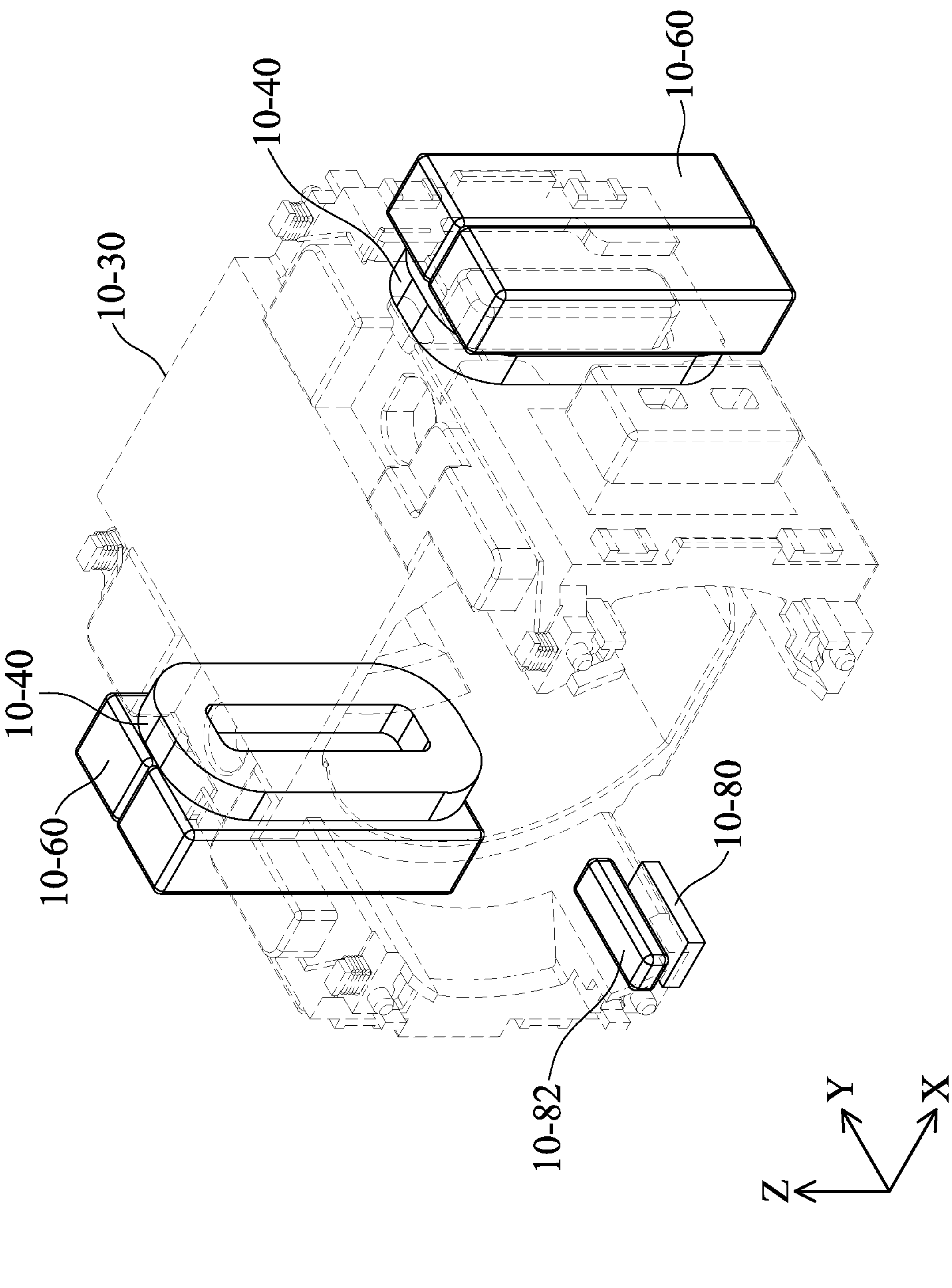
Figure 140:
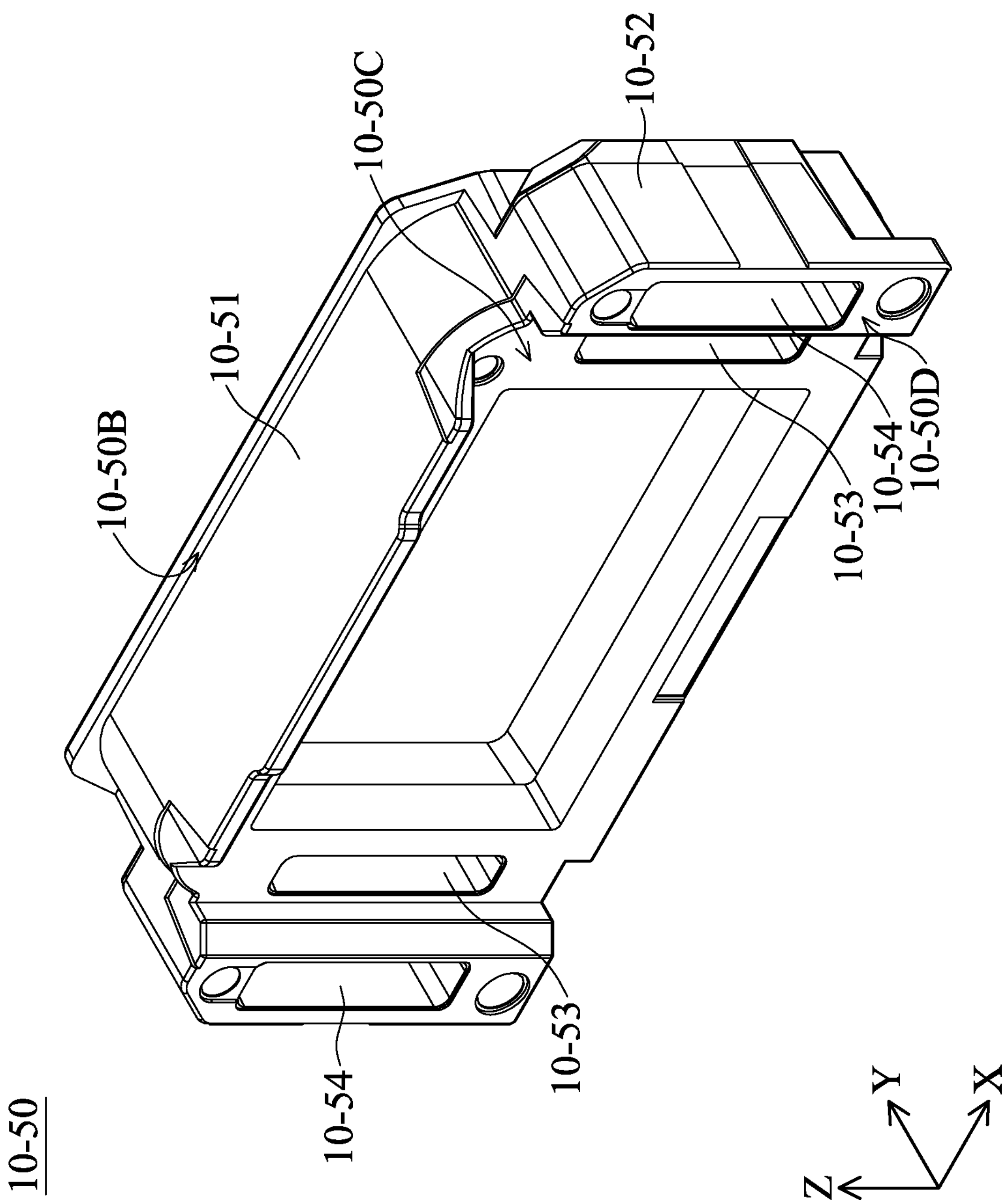
Figure 141:
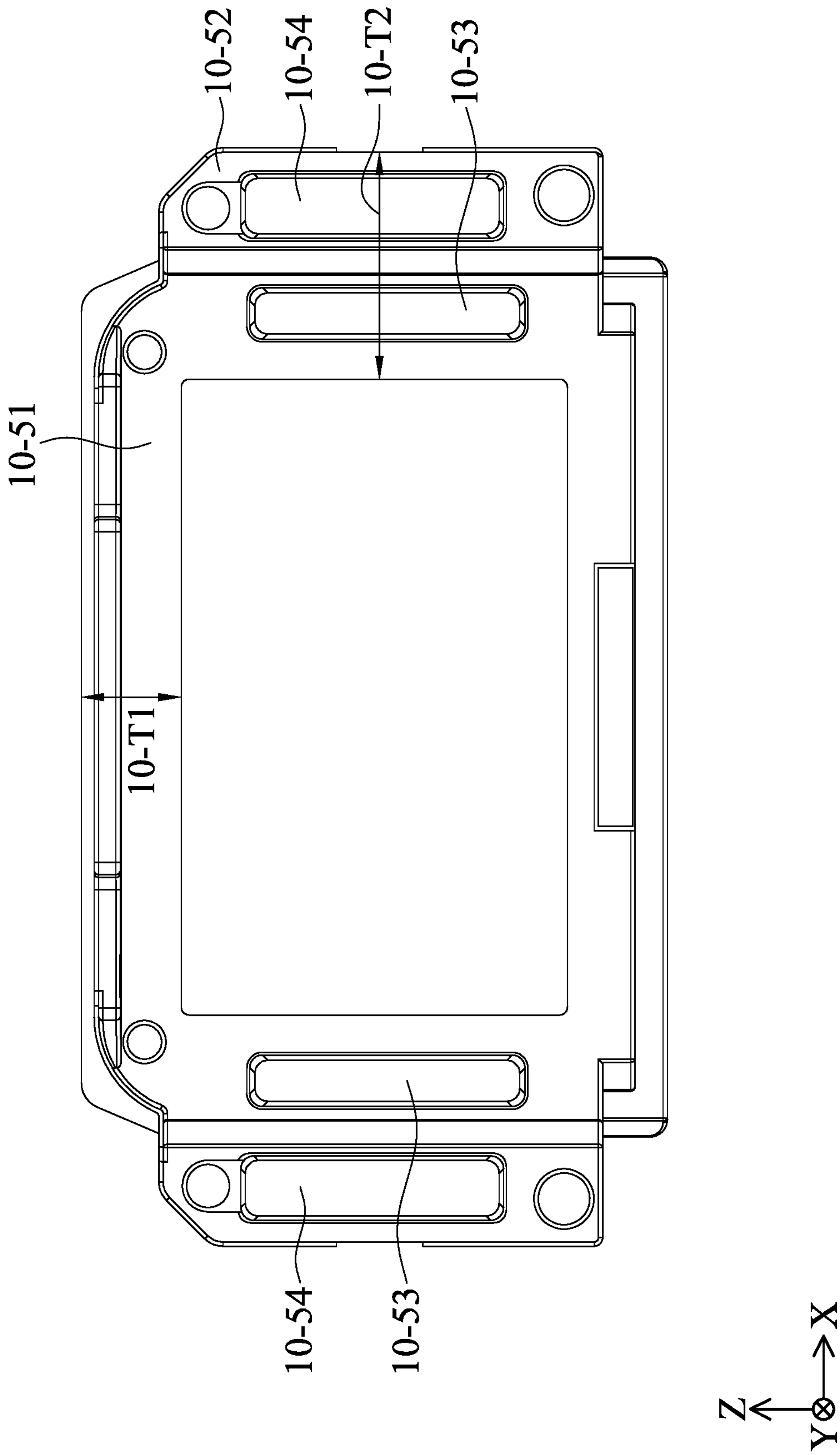
Figure 142:
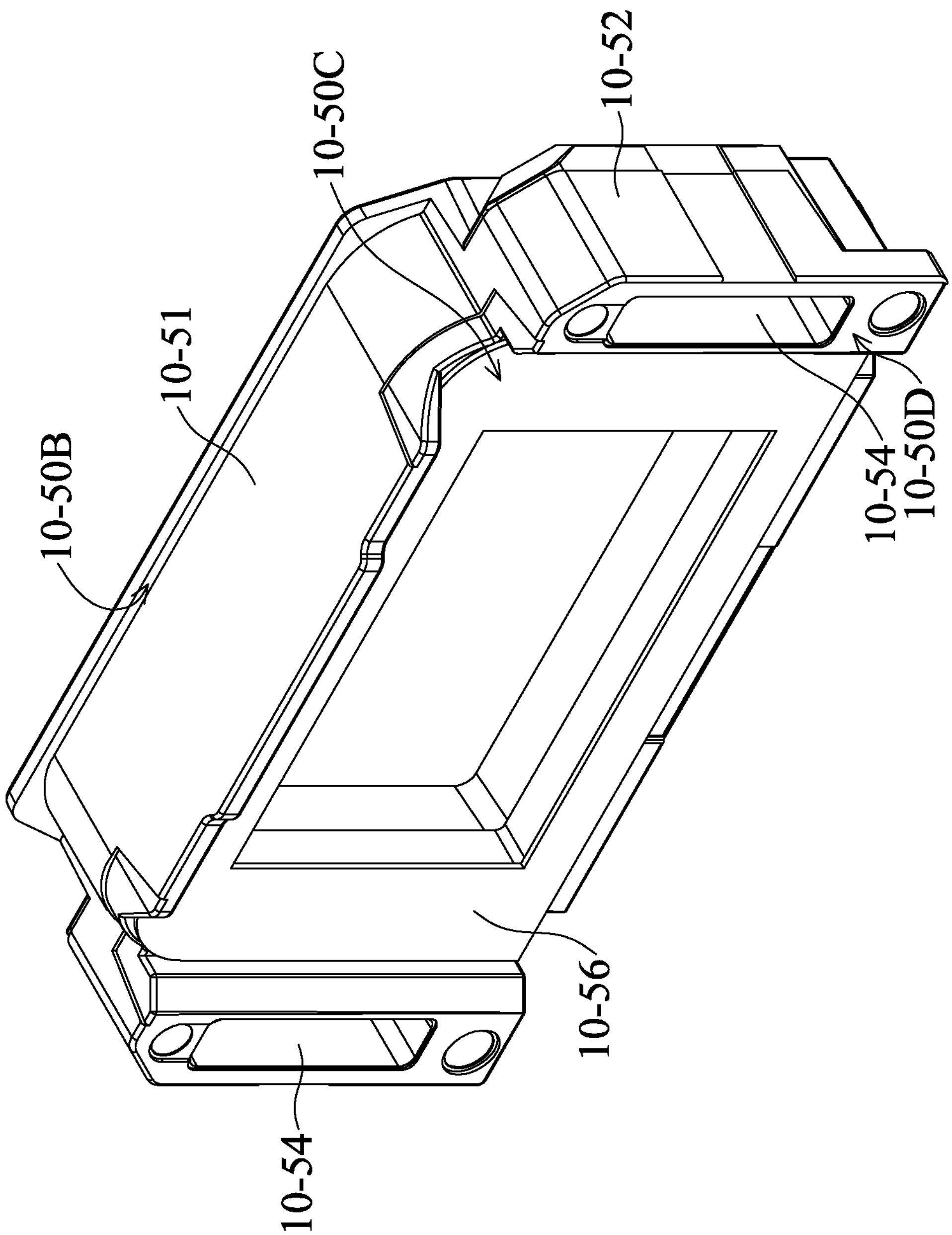
Figure 143:
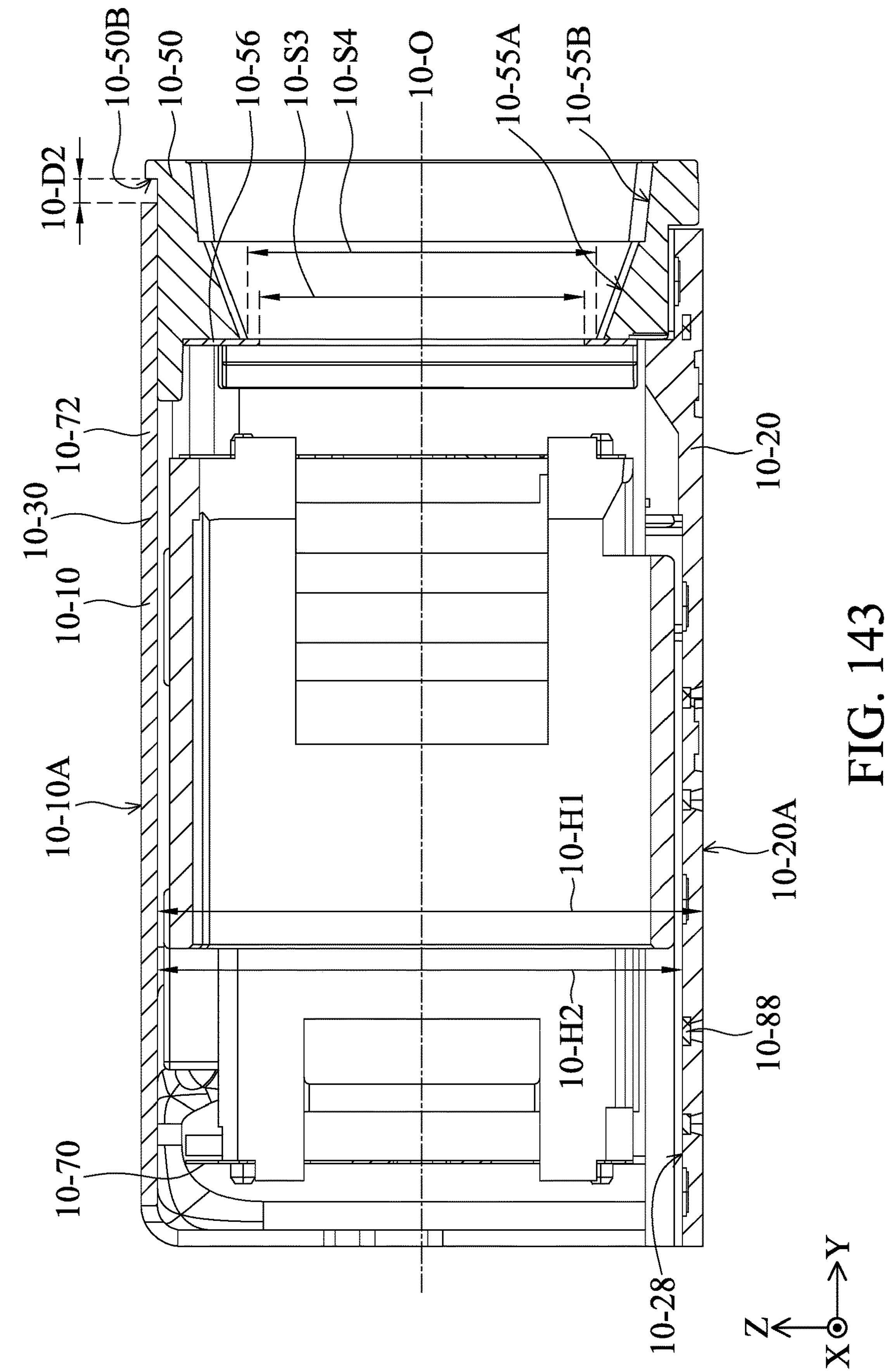
Figure 144:
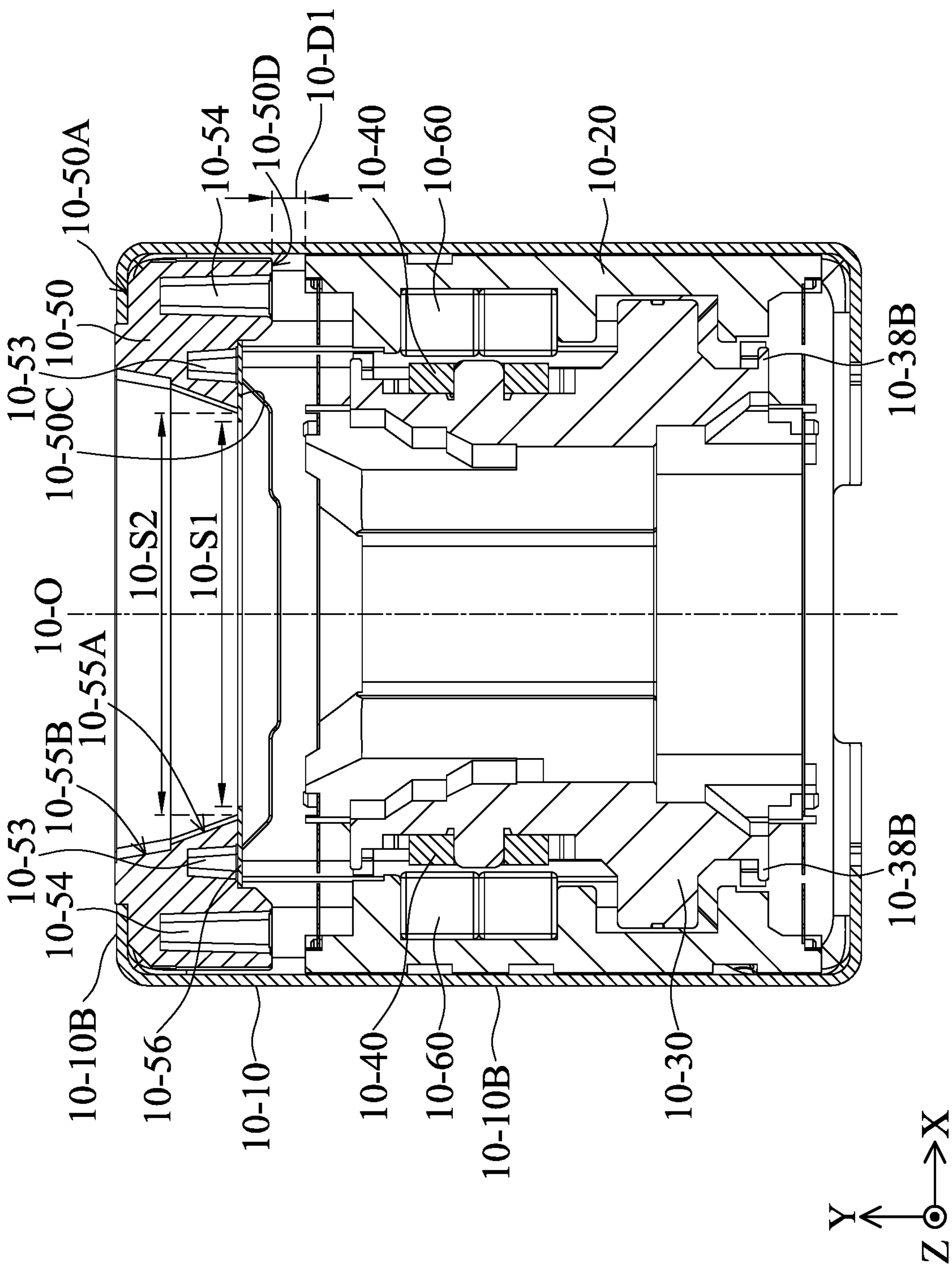
Figure 145:
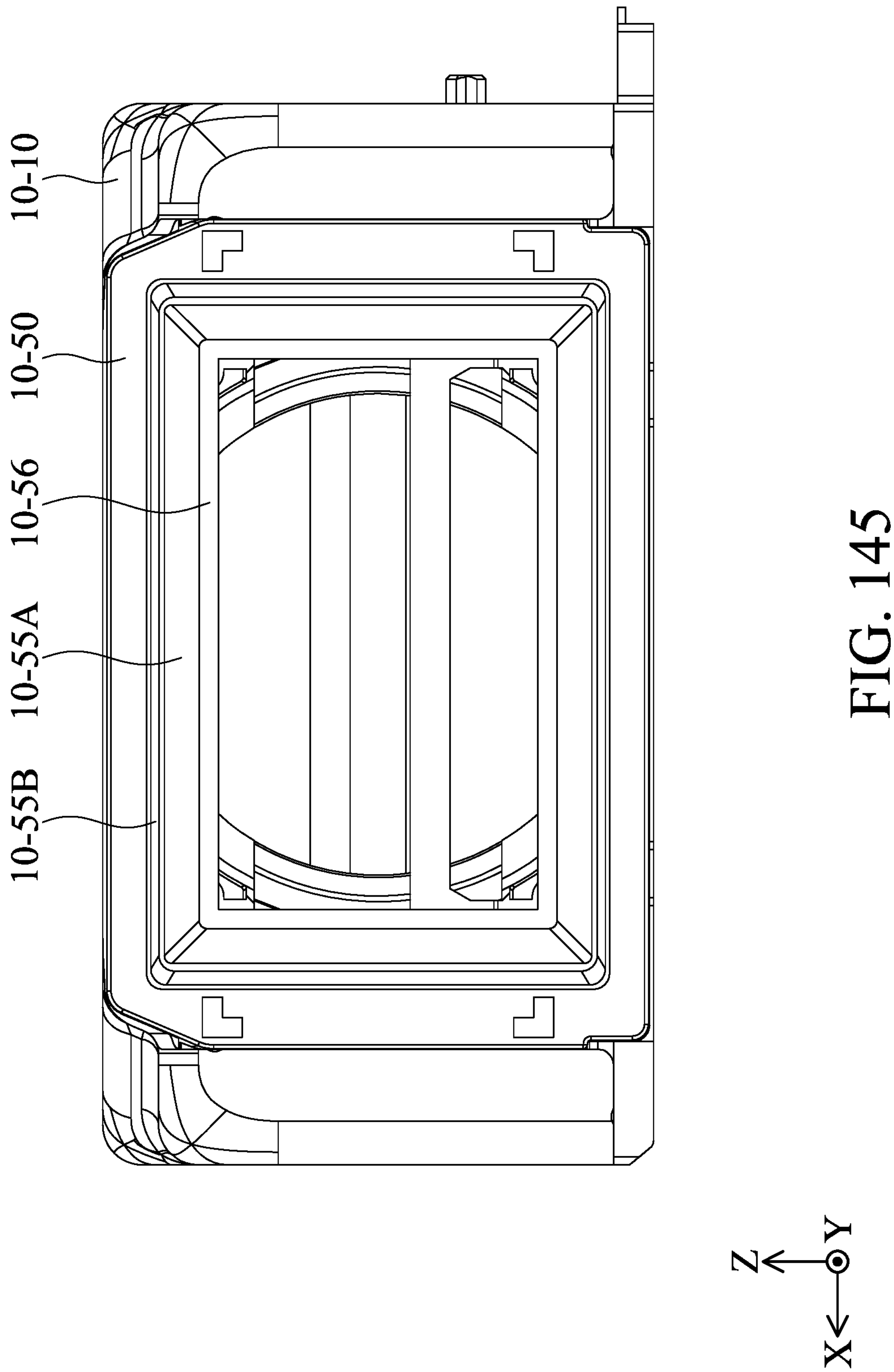
Figure 146:
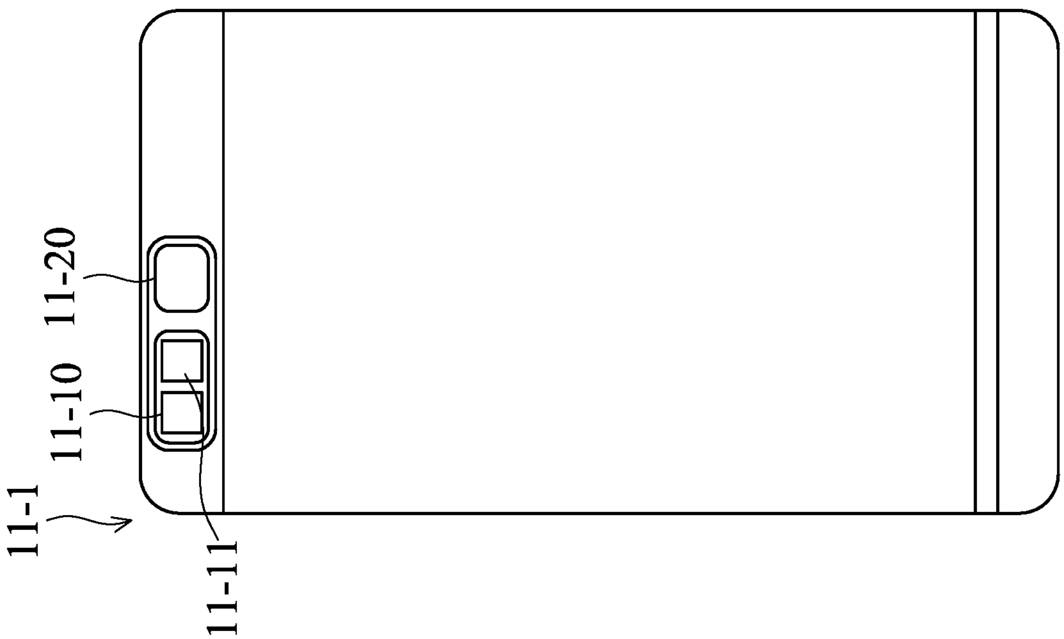
Figure 147:
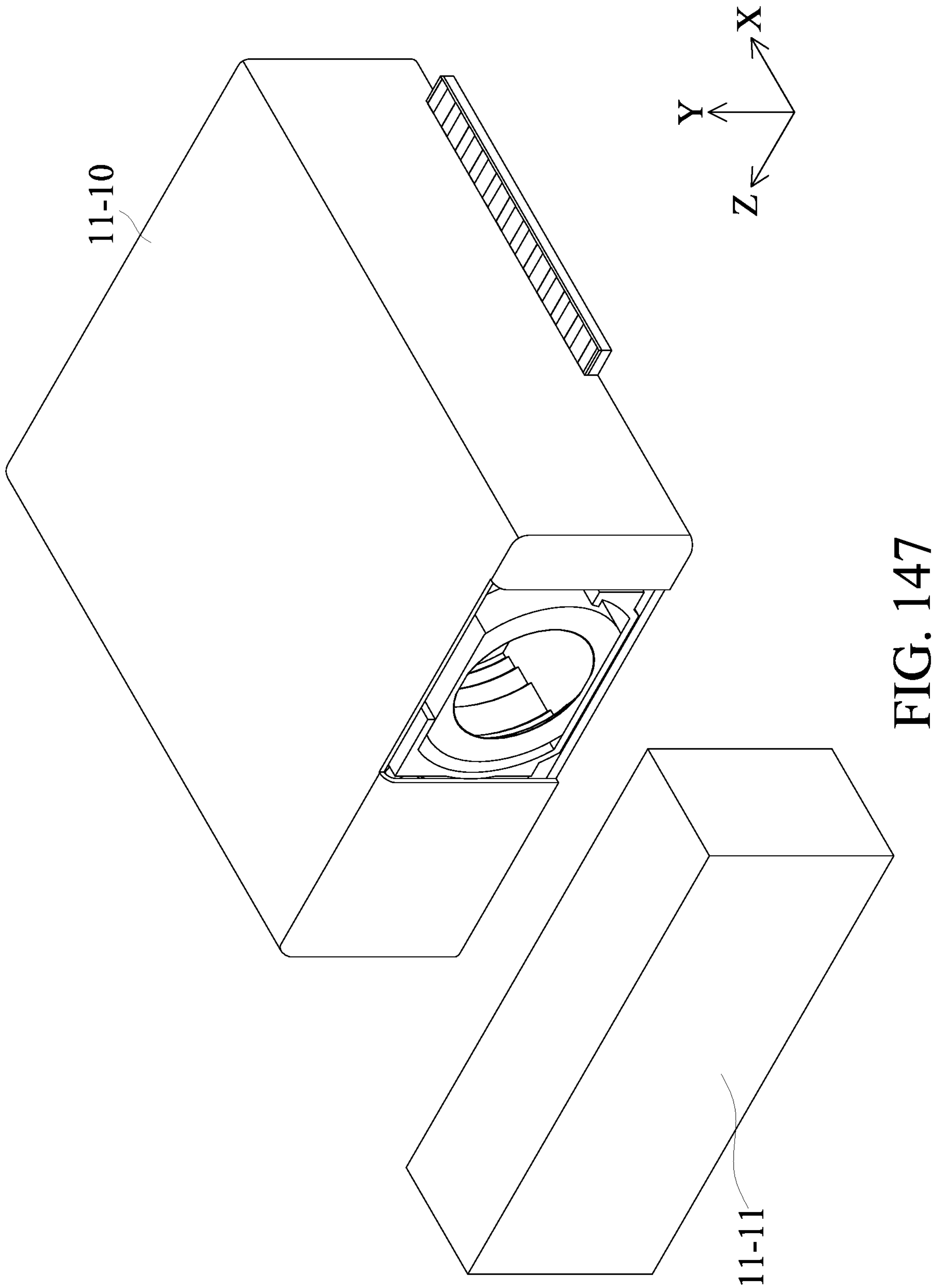
Figure 148:
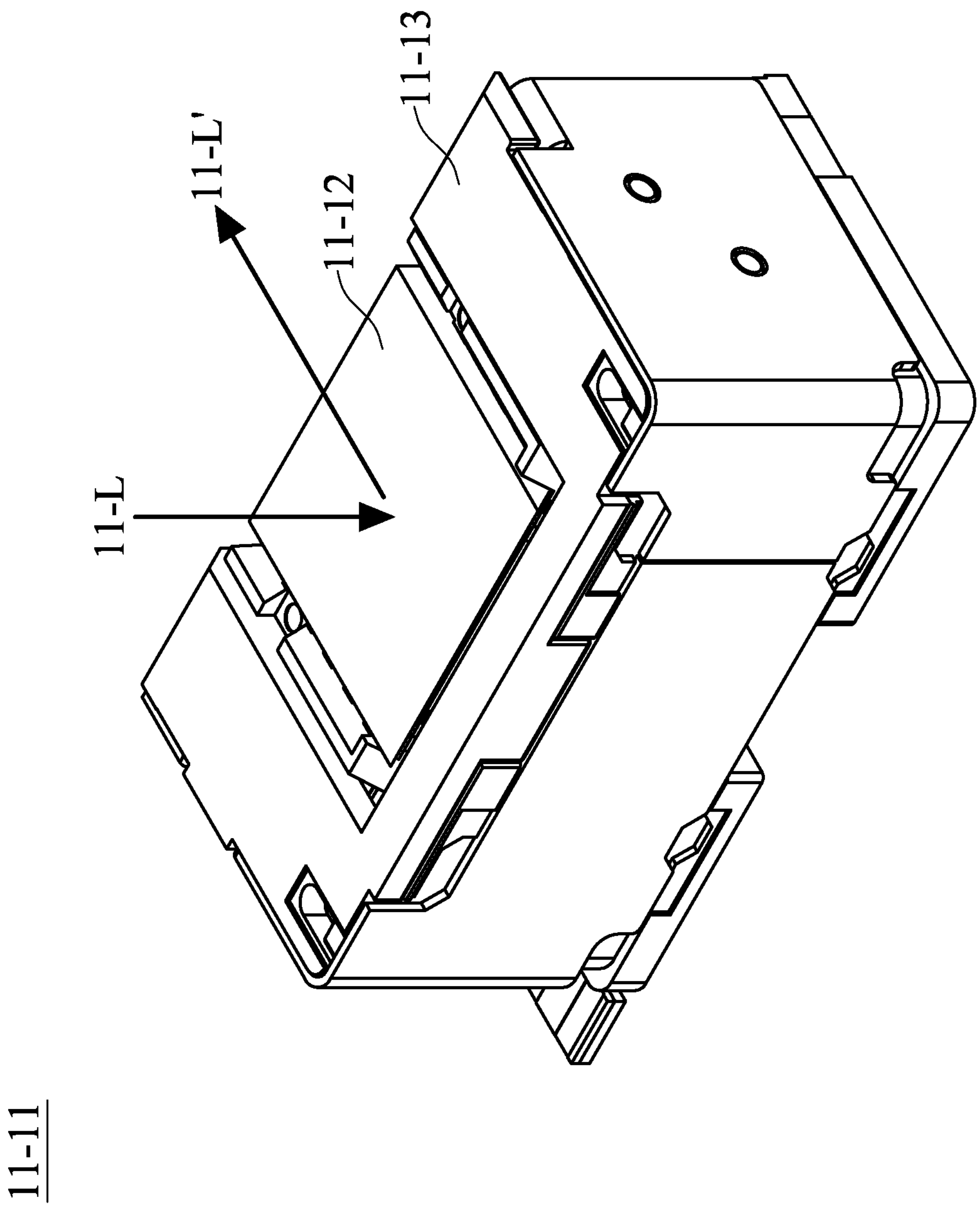
Figure 149:
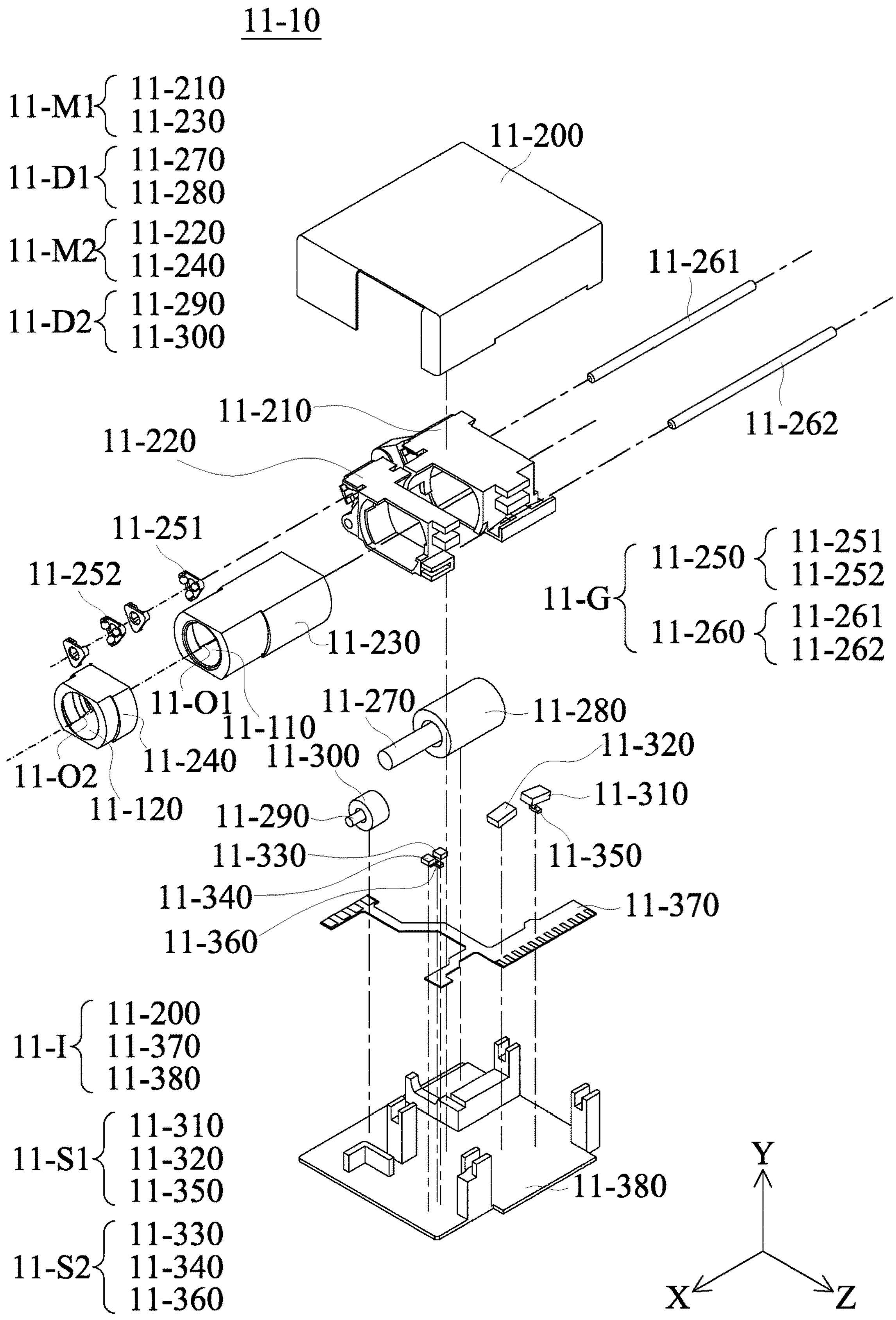
Figure 150:
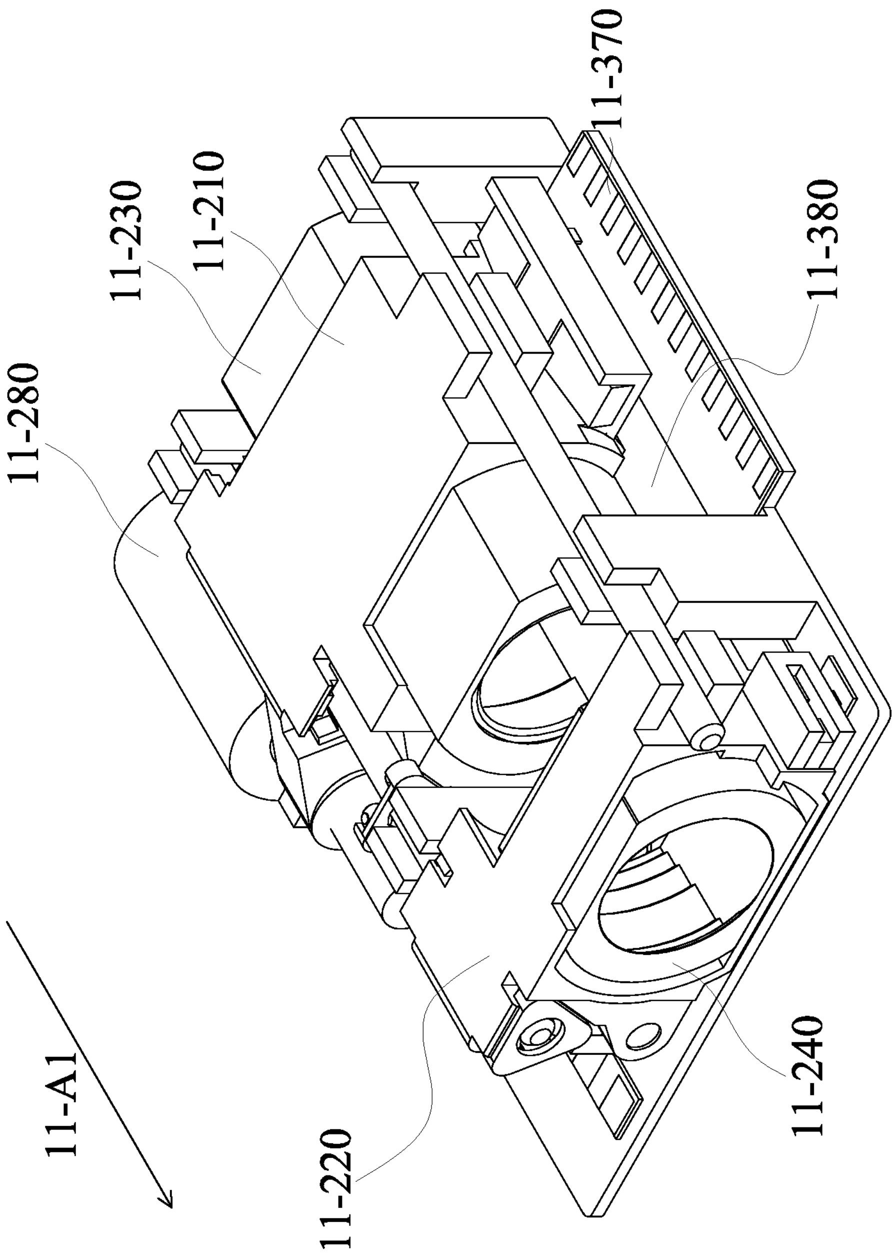
Figure 151:
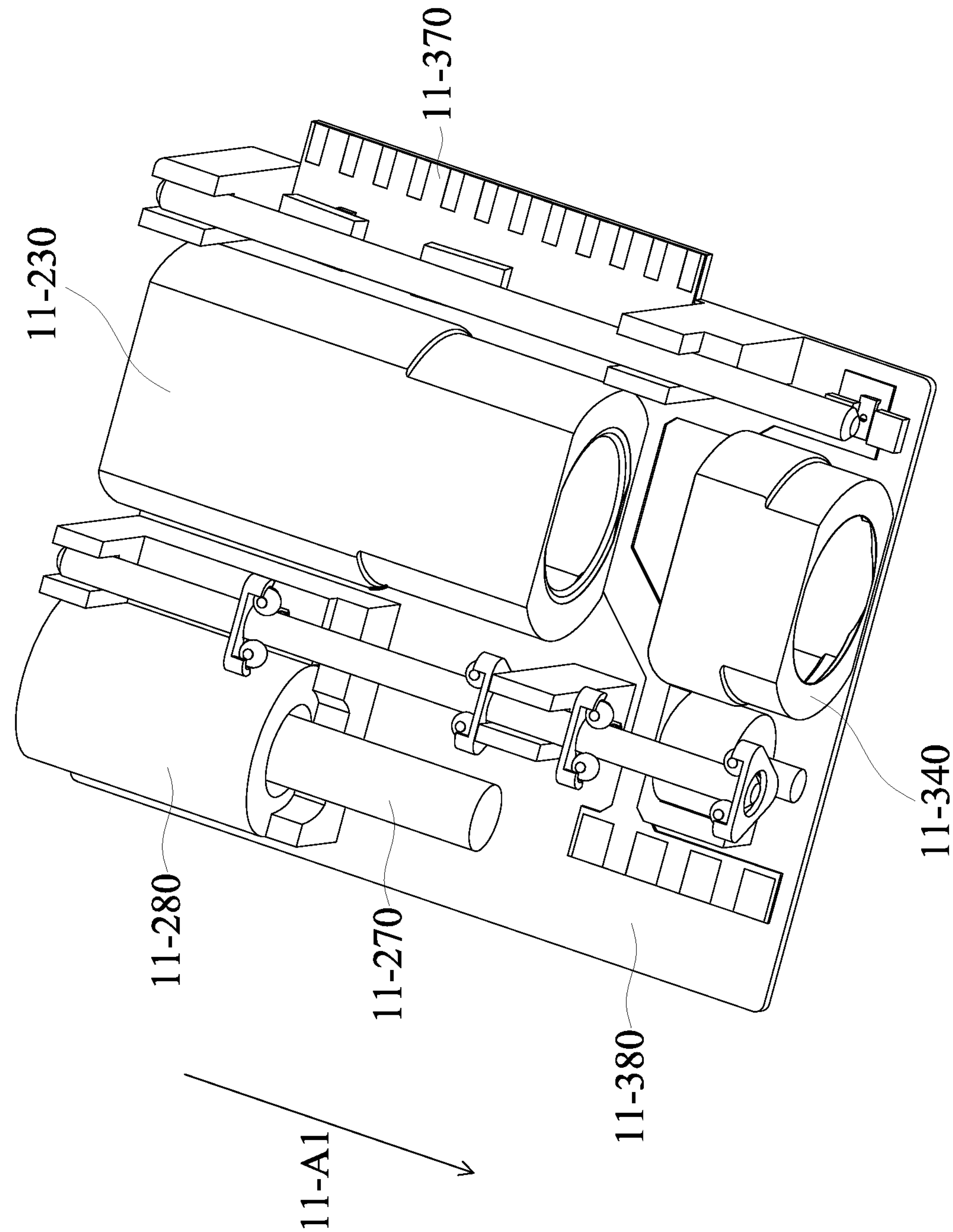
Figure 152:
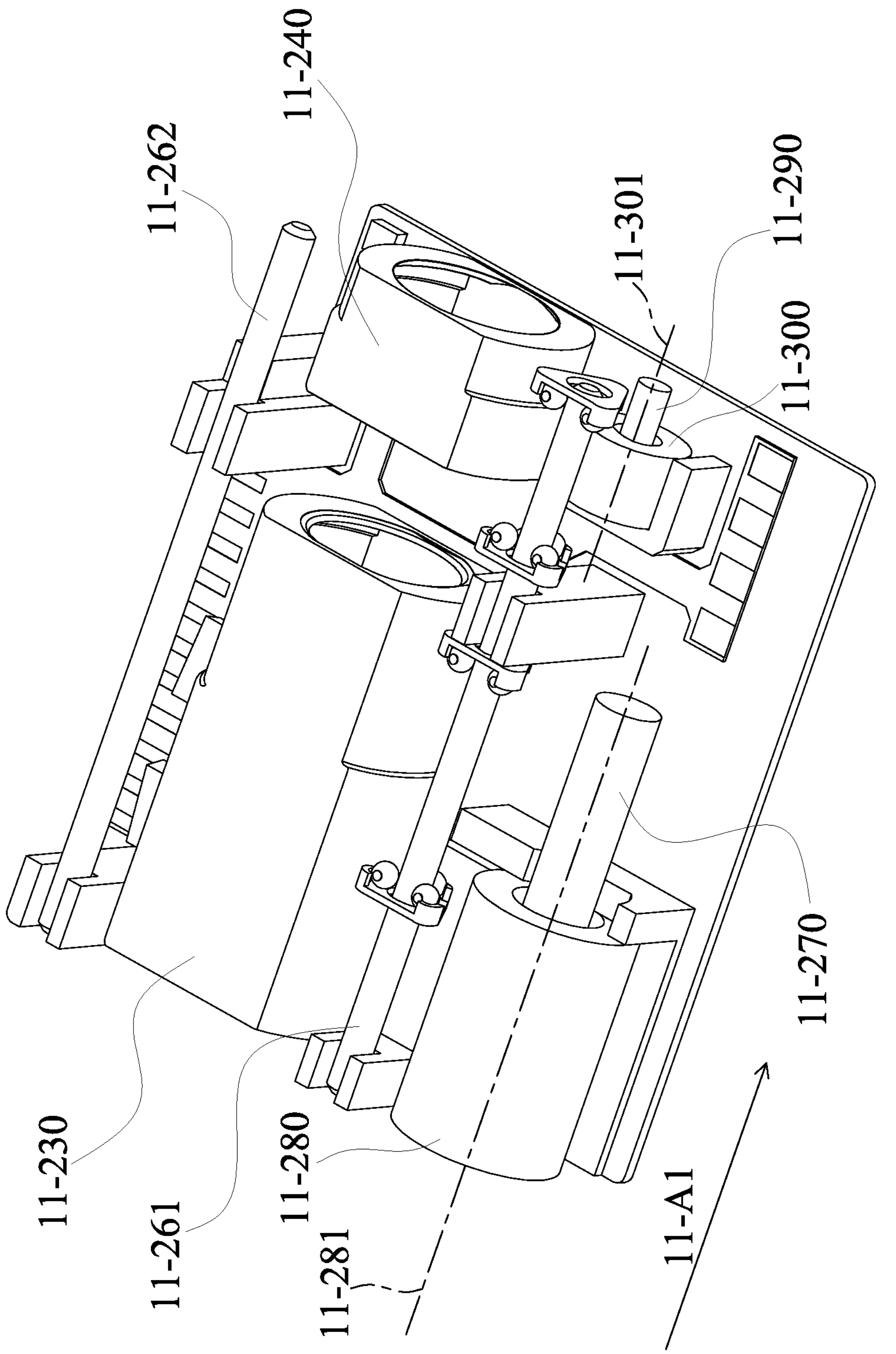
Figure 153:
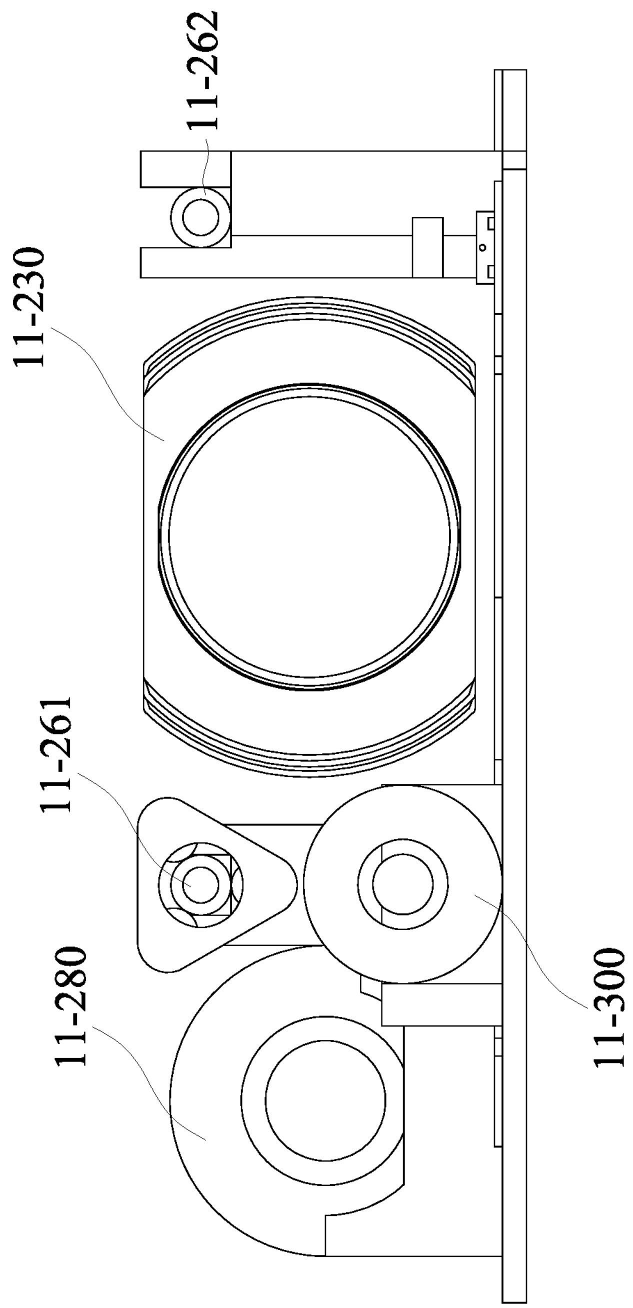
Figure 154:
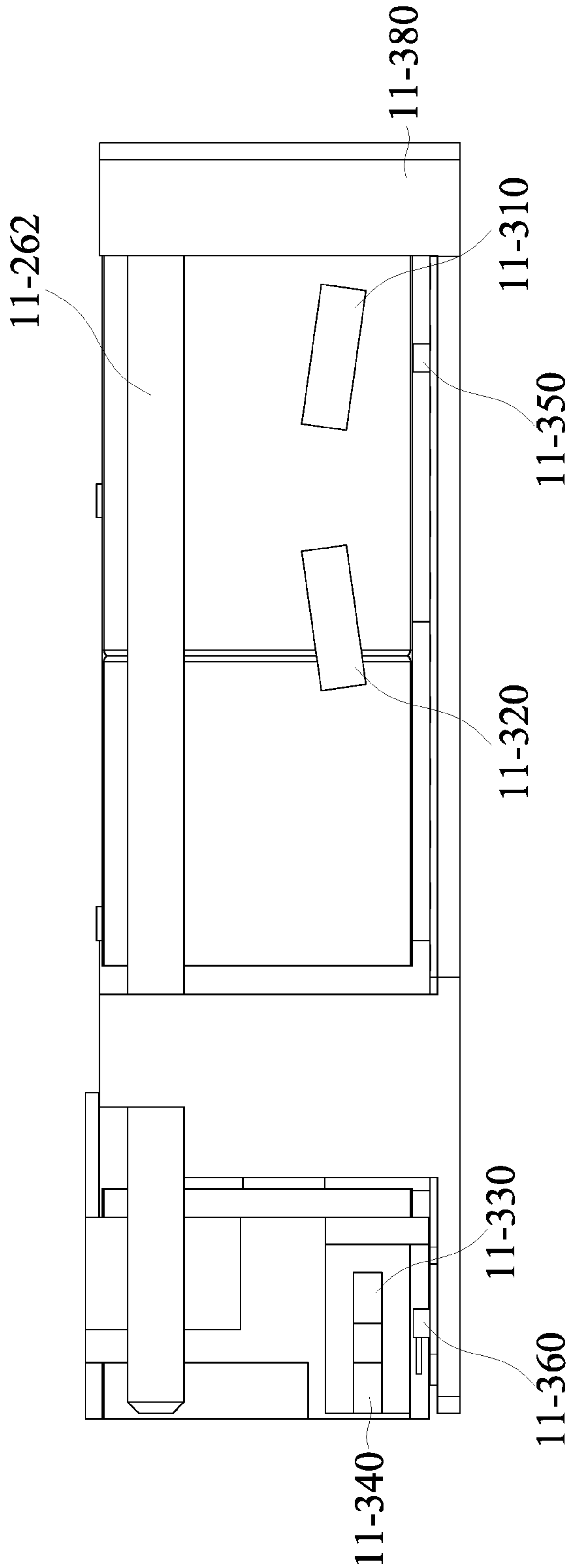
Figure 155:
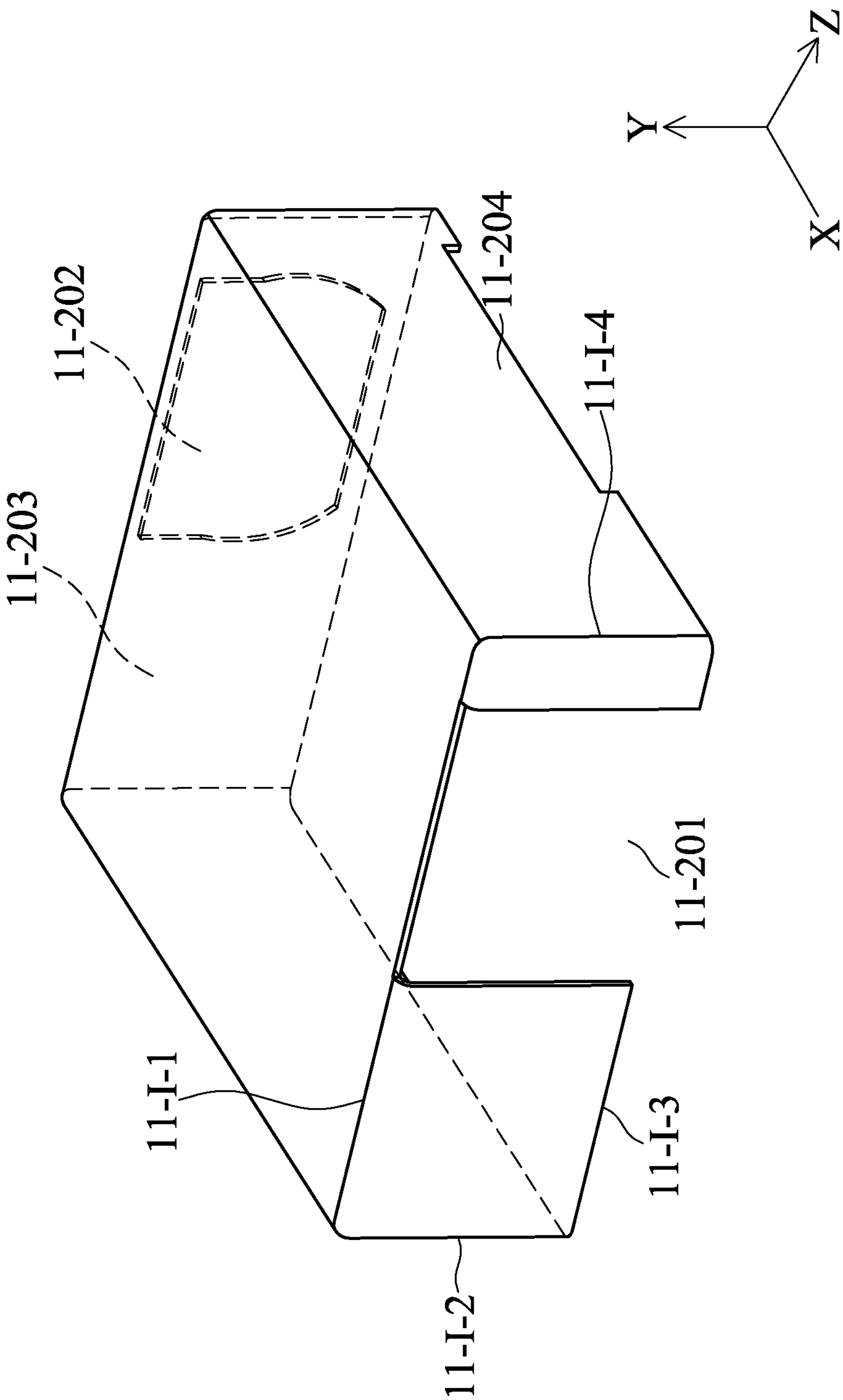
Figure 156:
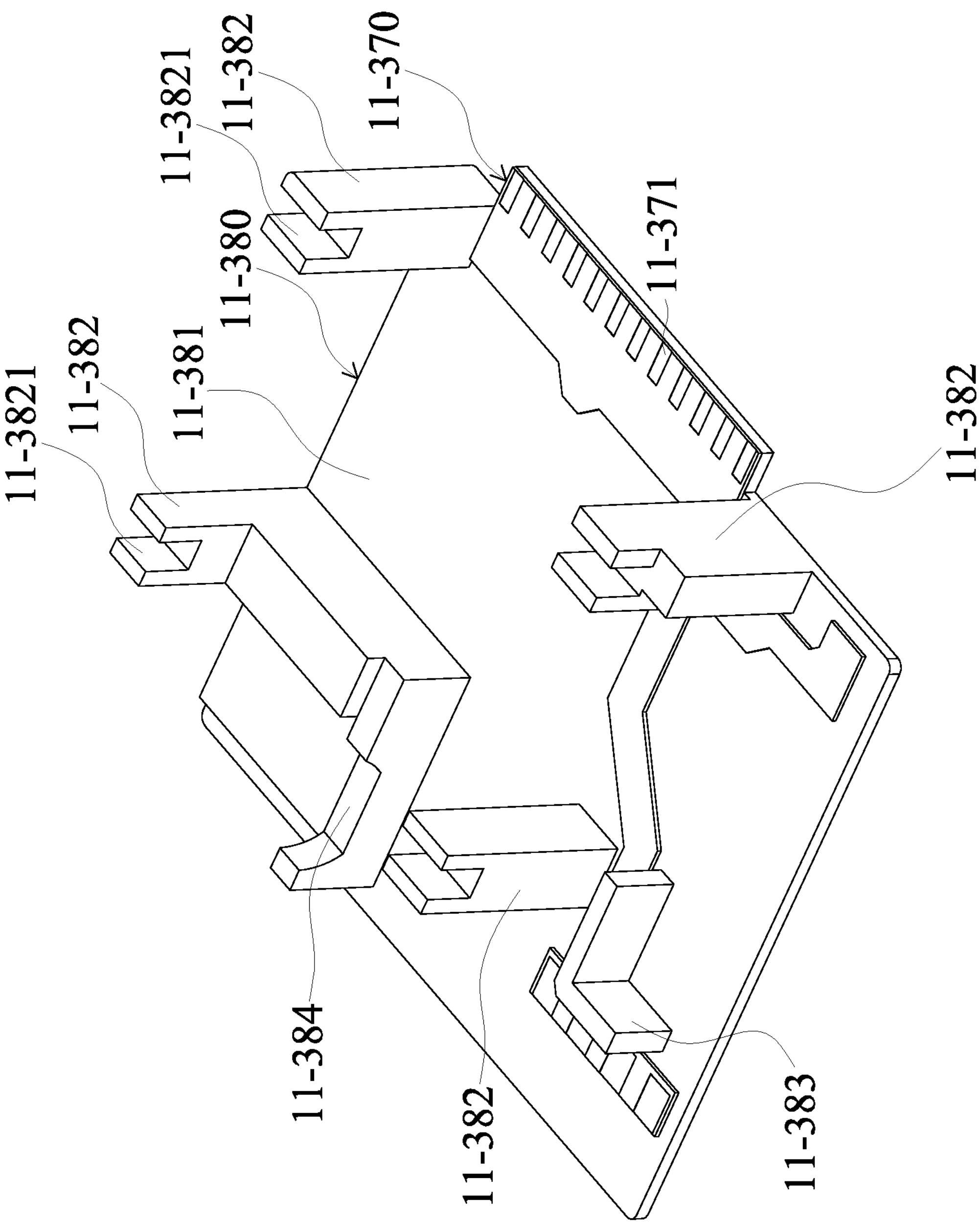
Figure 157:
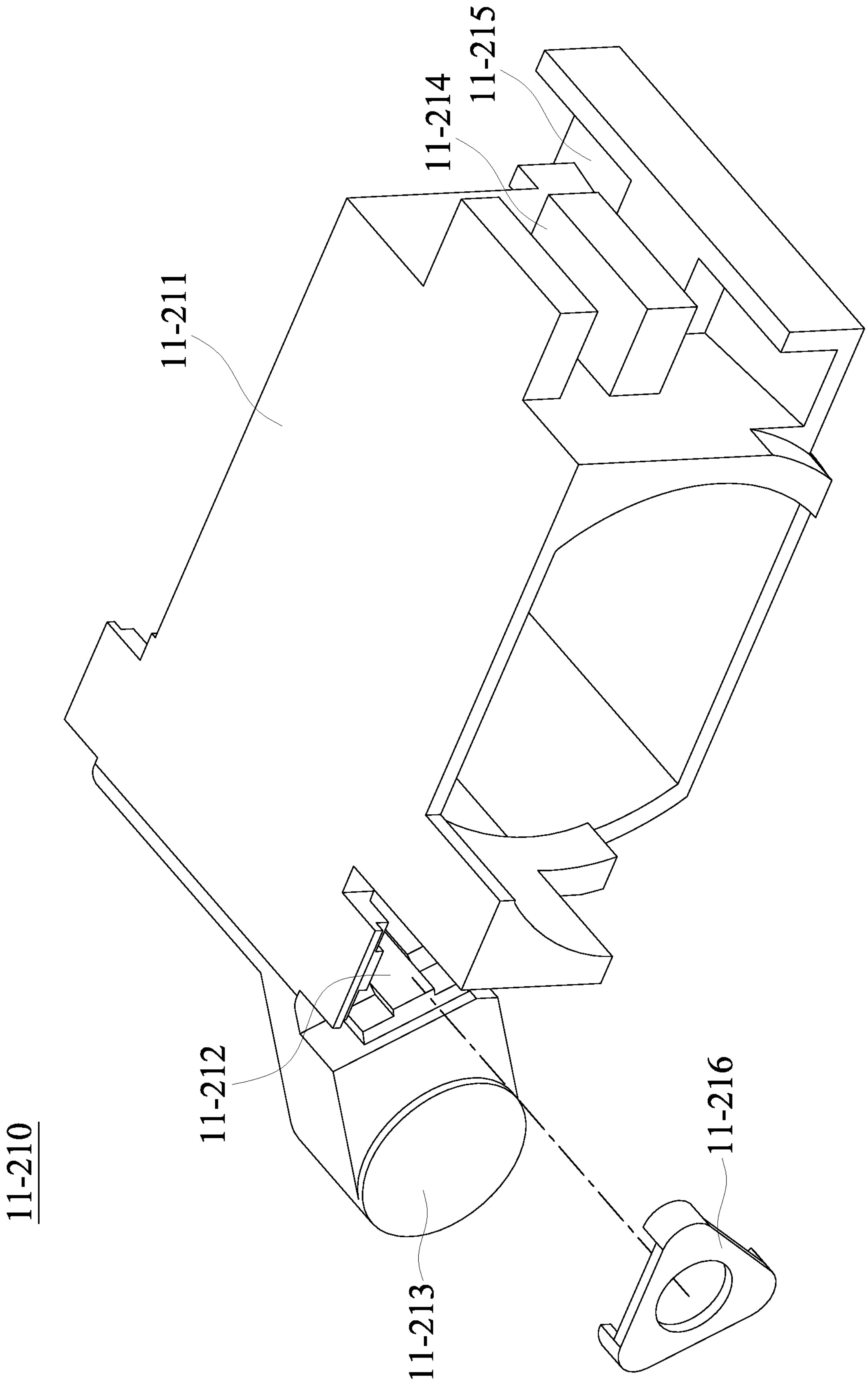
Figure 158:
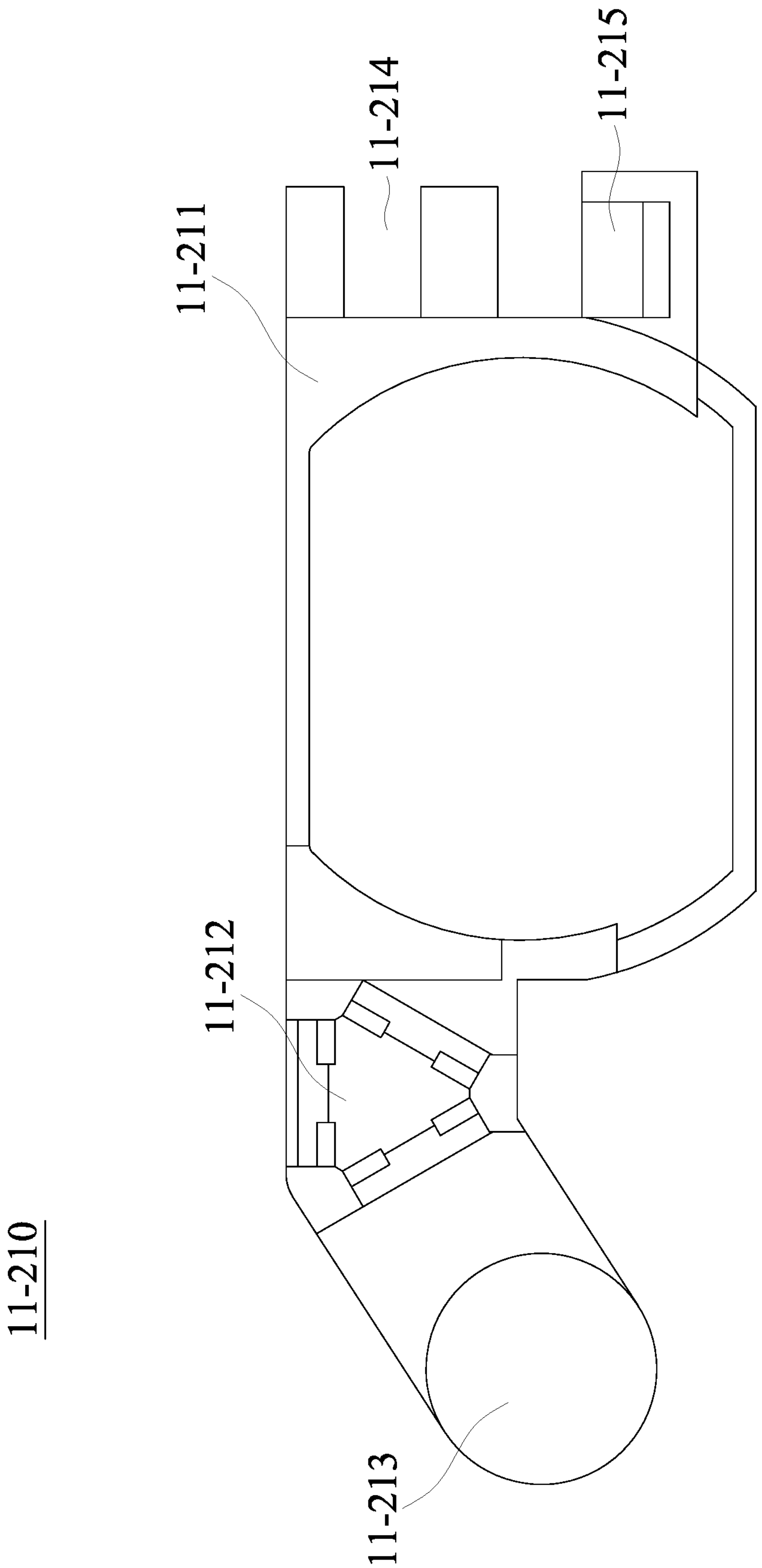
Figure 159:
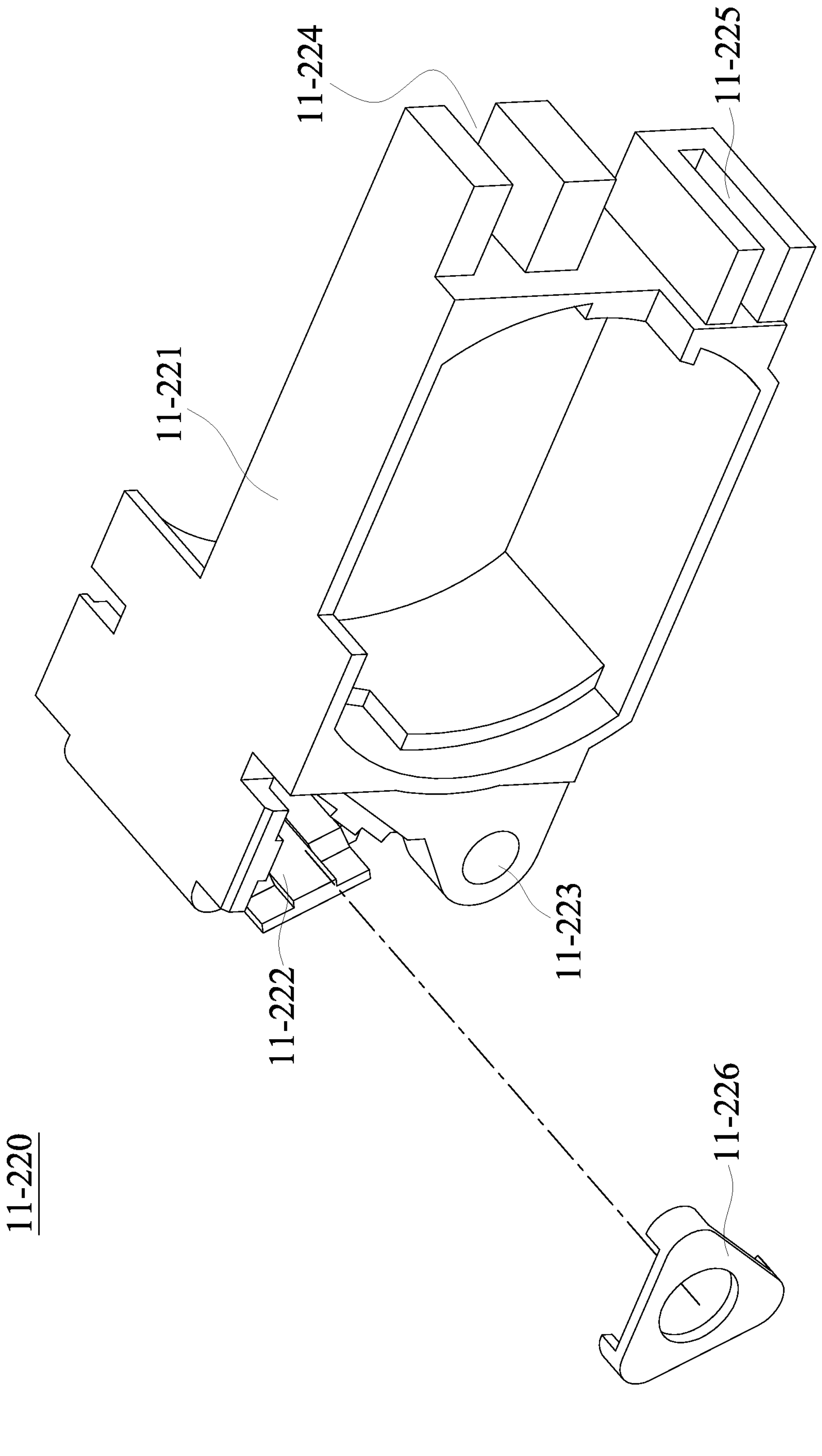
Figure 160:
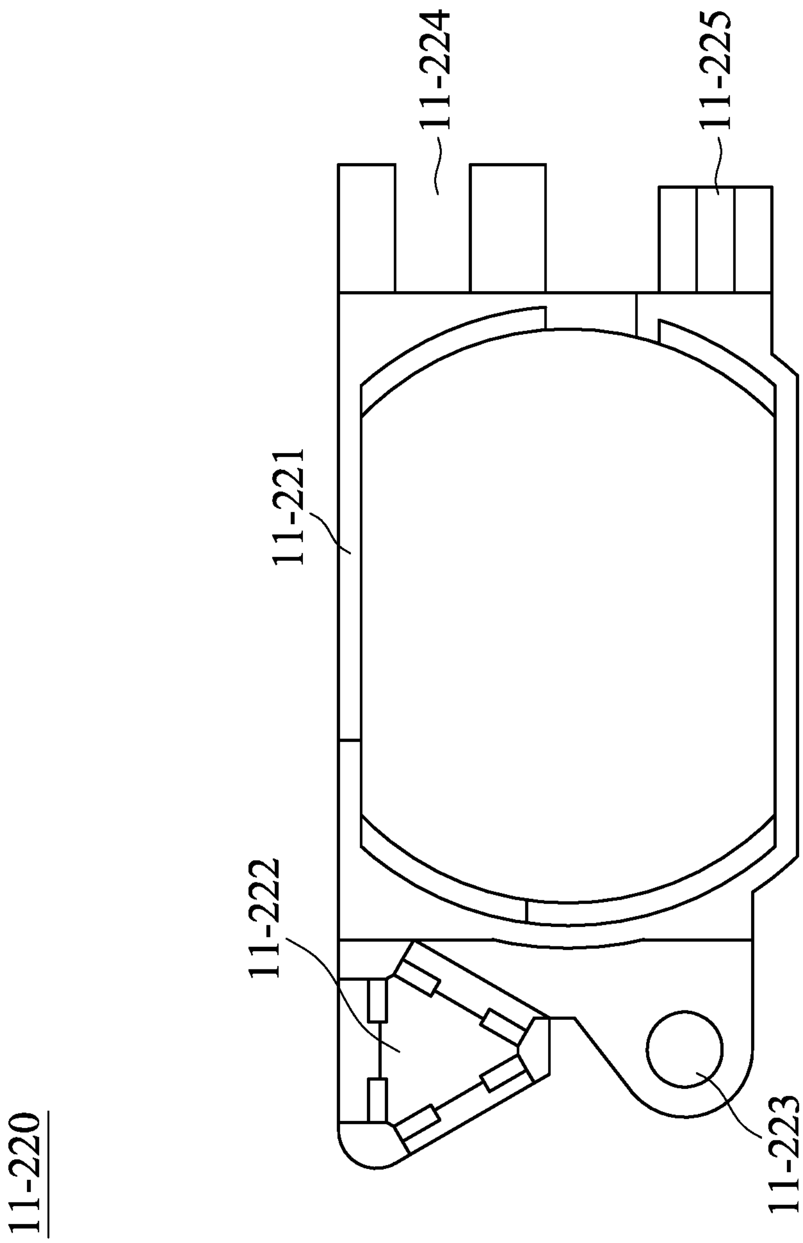
Figure 161:
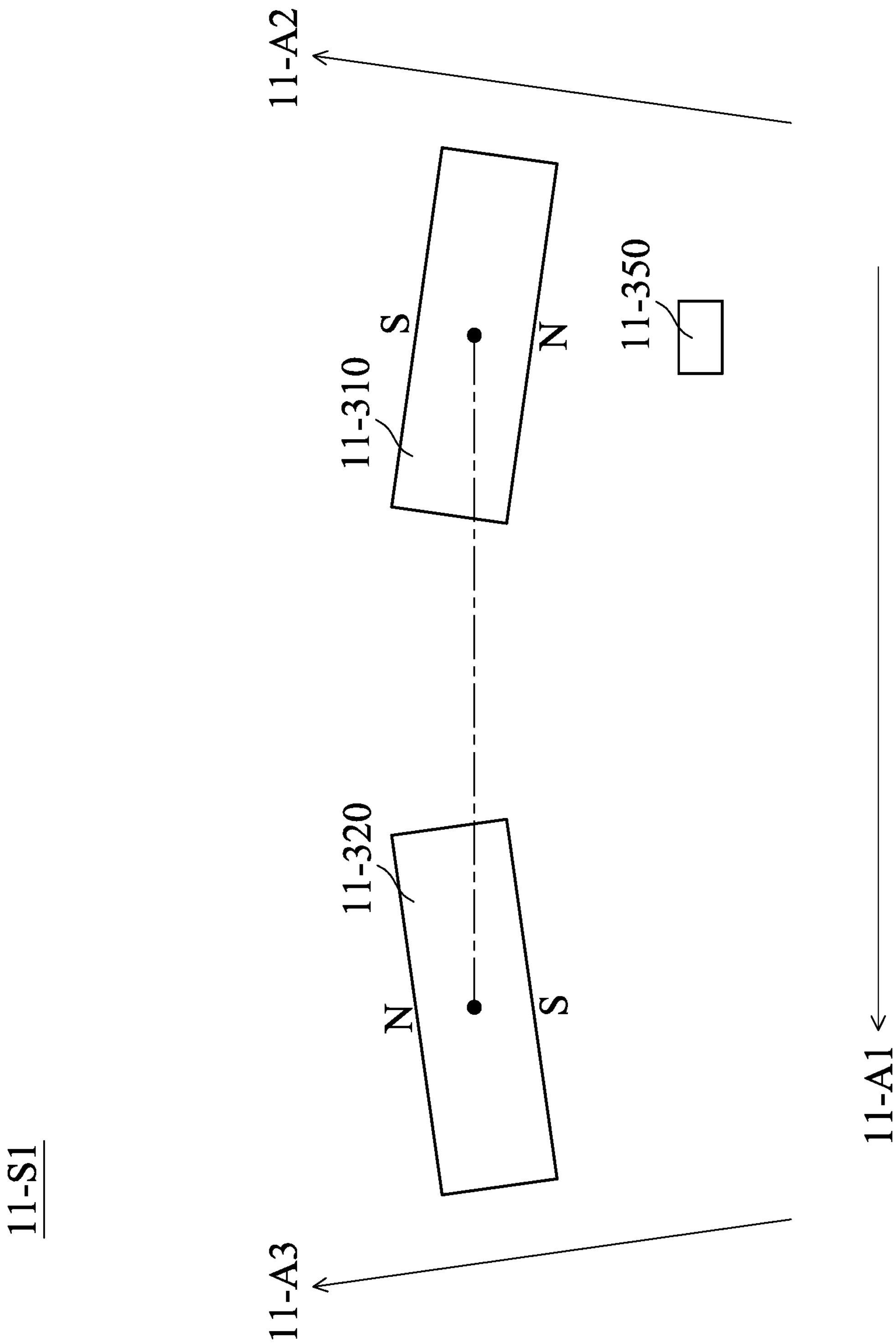
Figure 162:
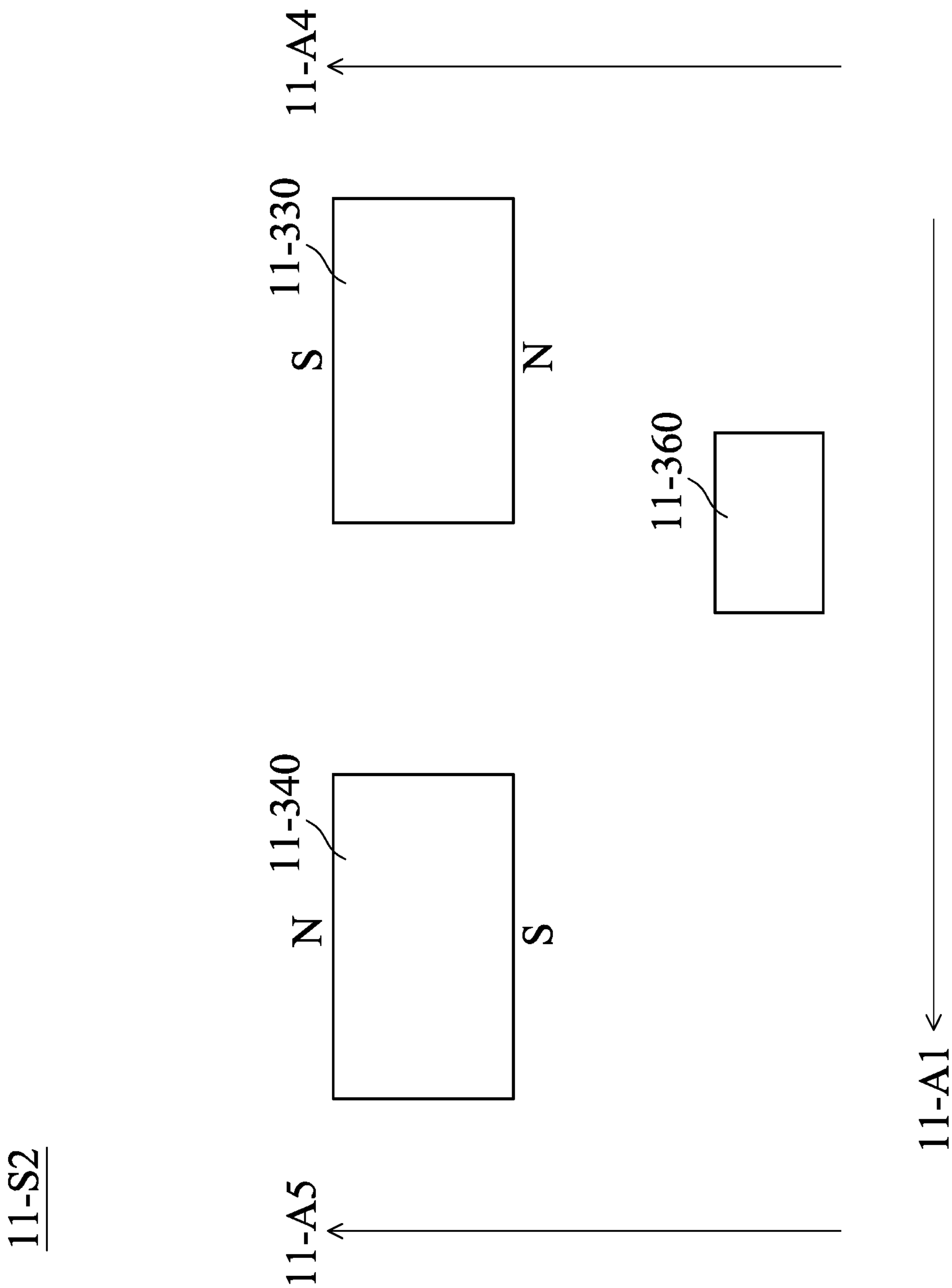
Figure 163:
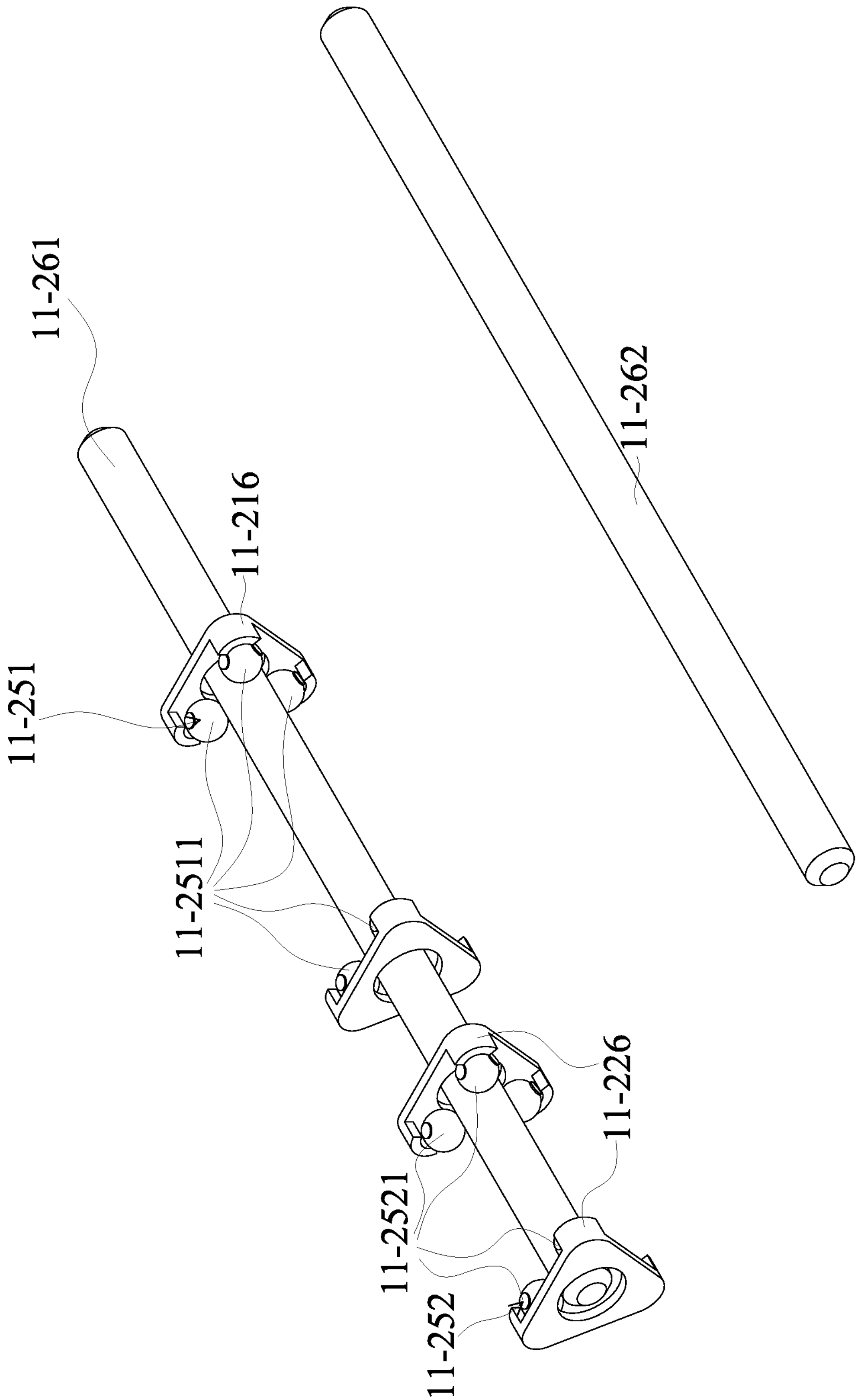
Figure 164:
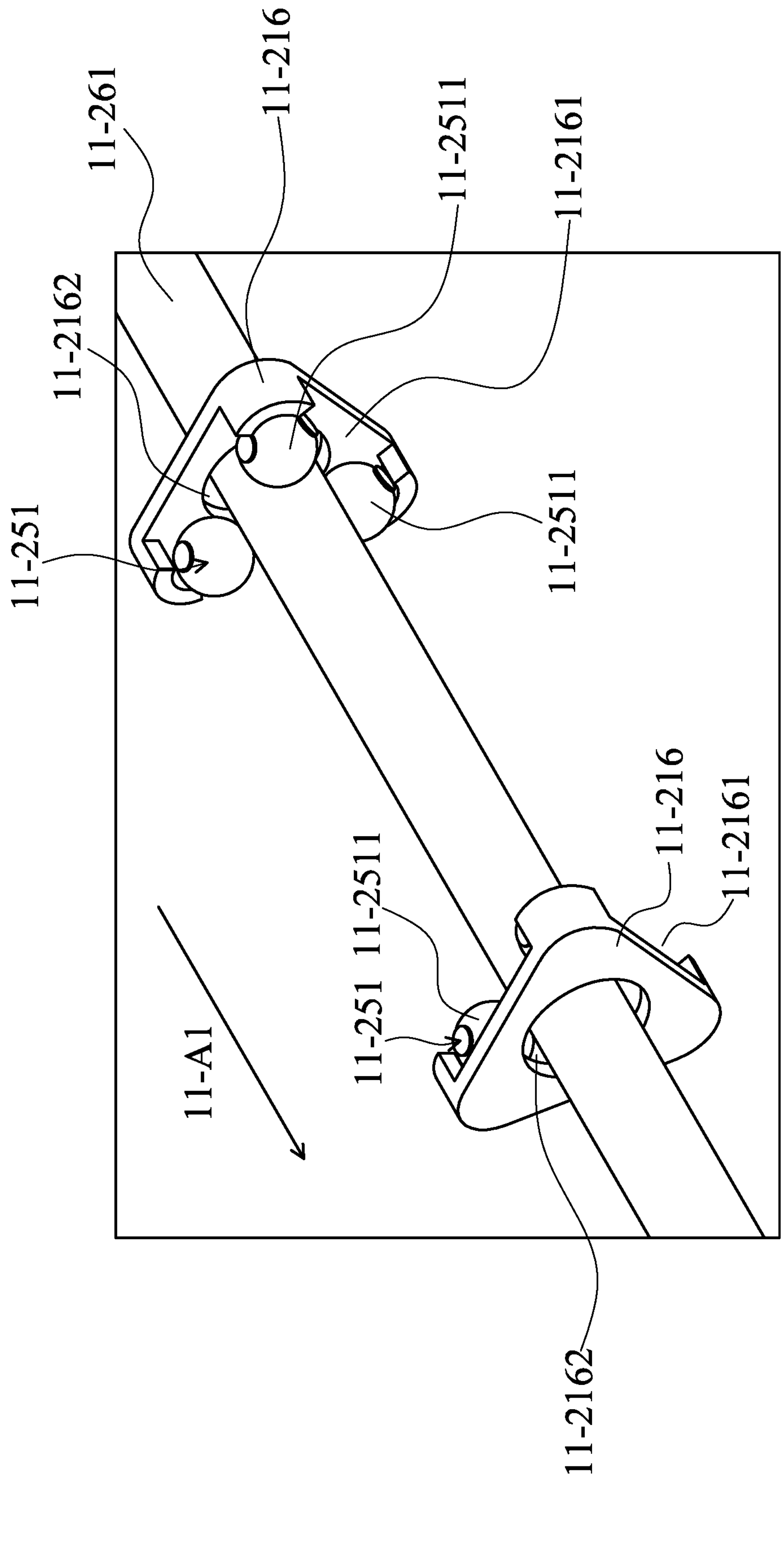
Figure 165:
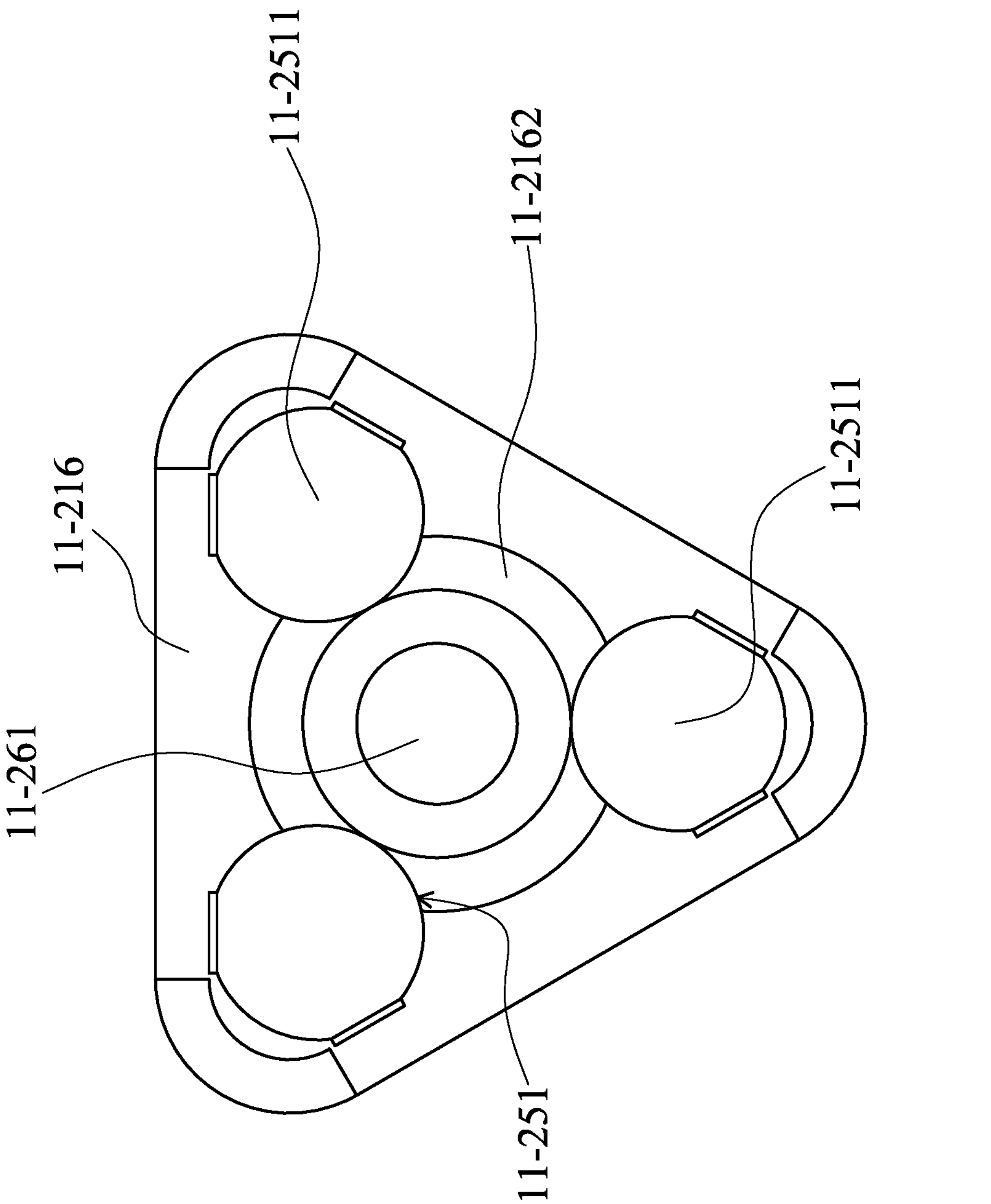
Figure 166:
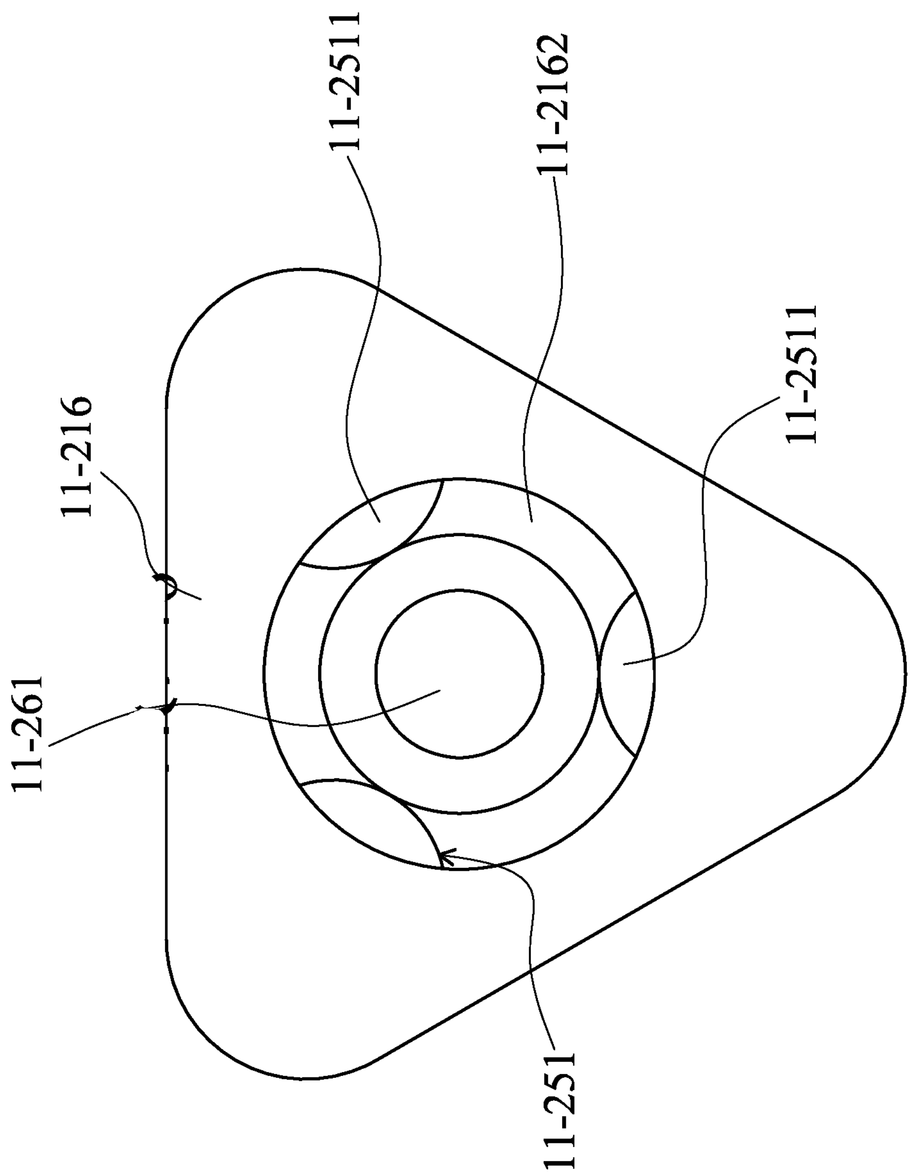
Figure 167:
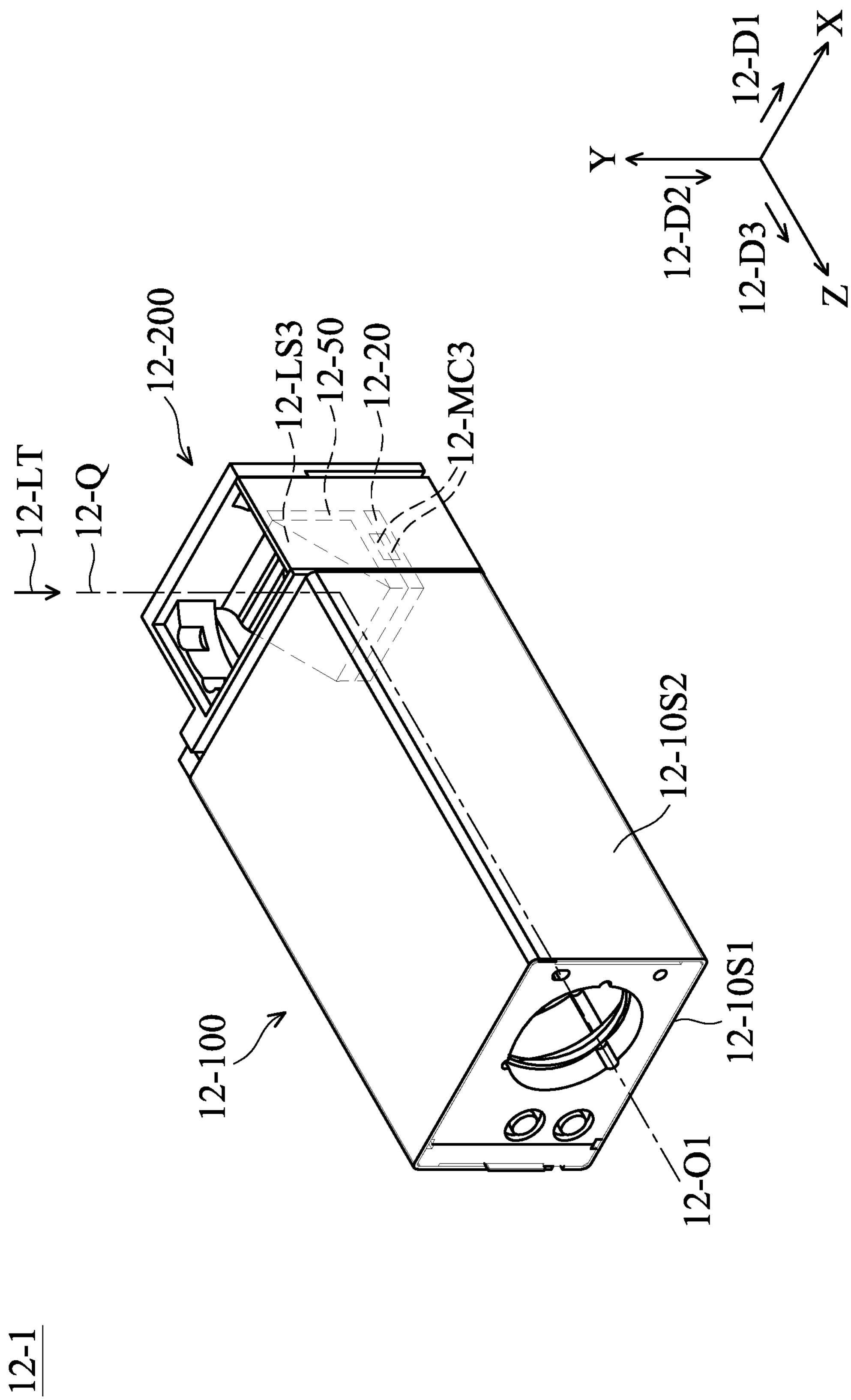
Figure 168:
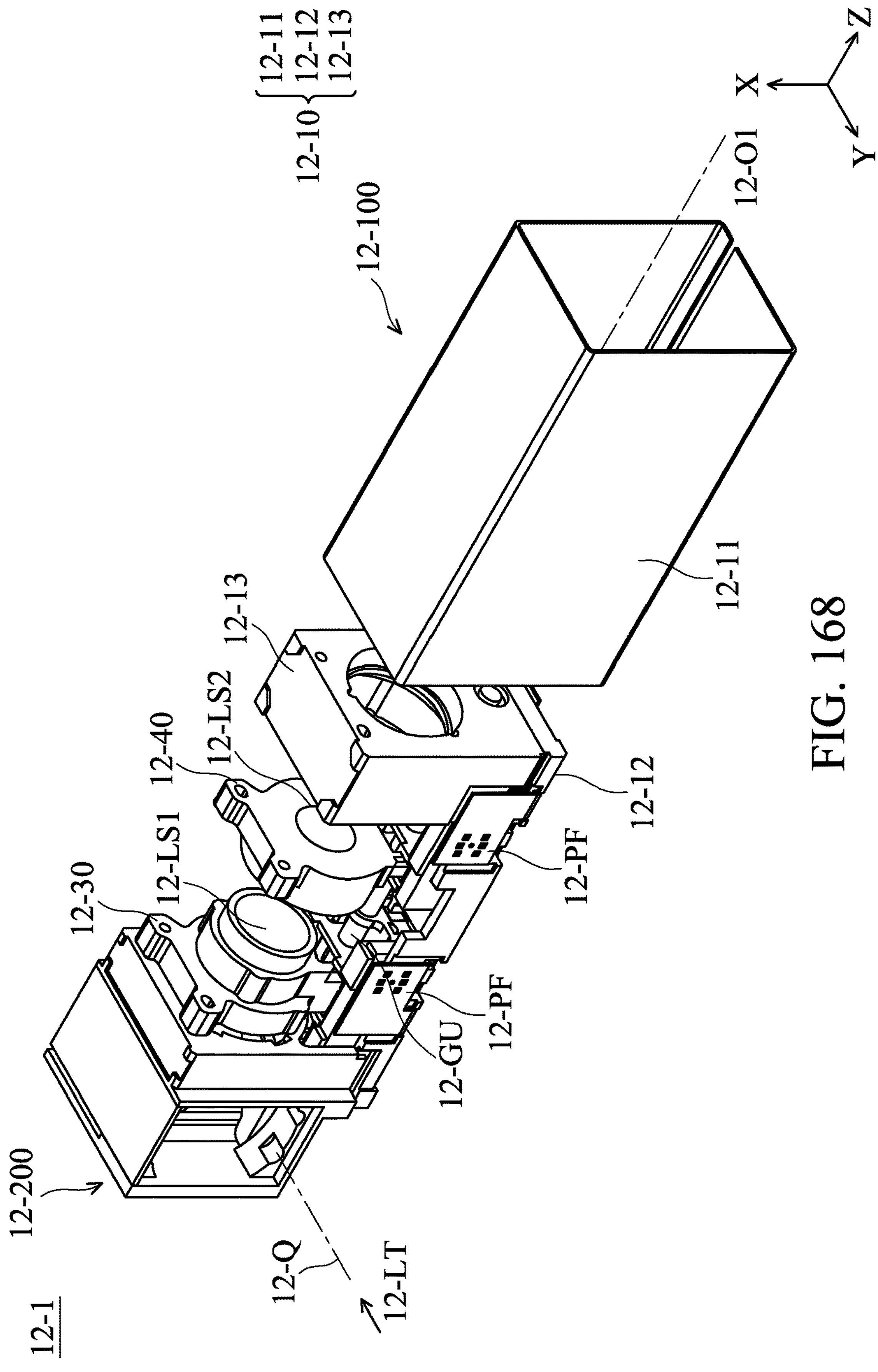
Figure 169:
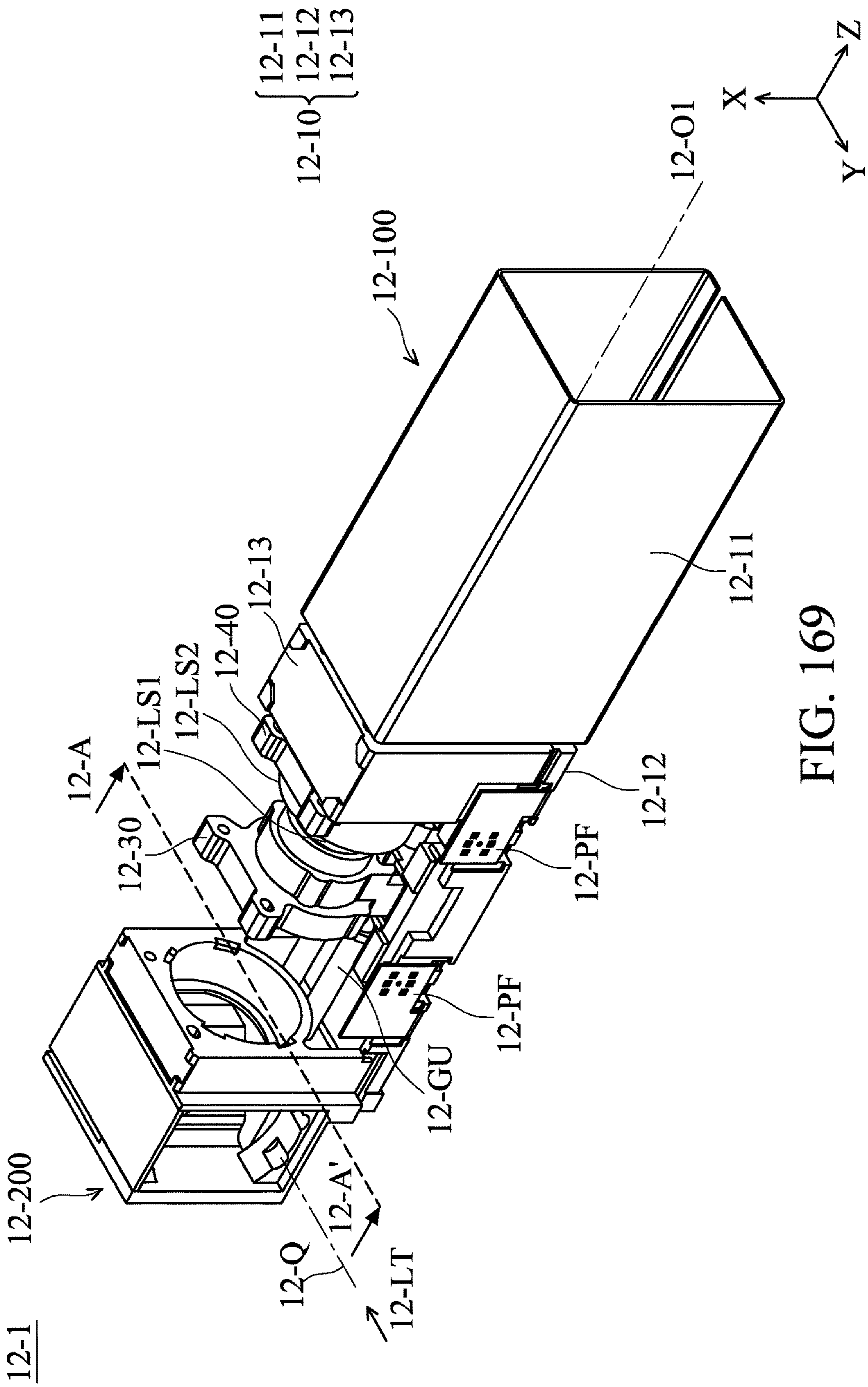
Figure 170:
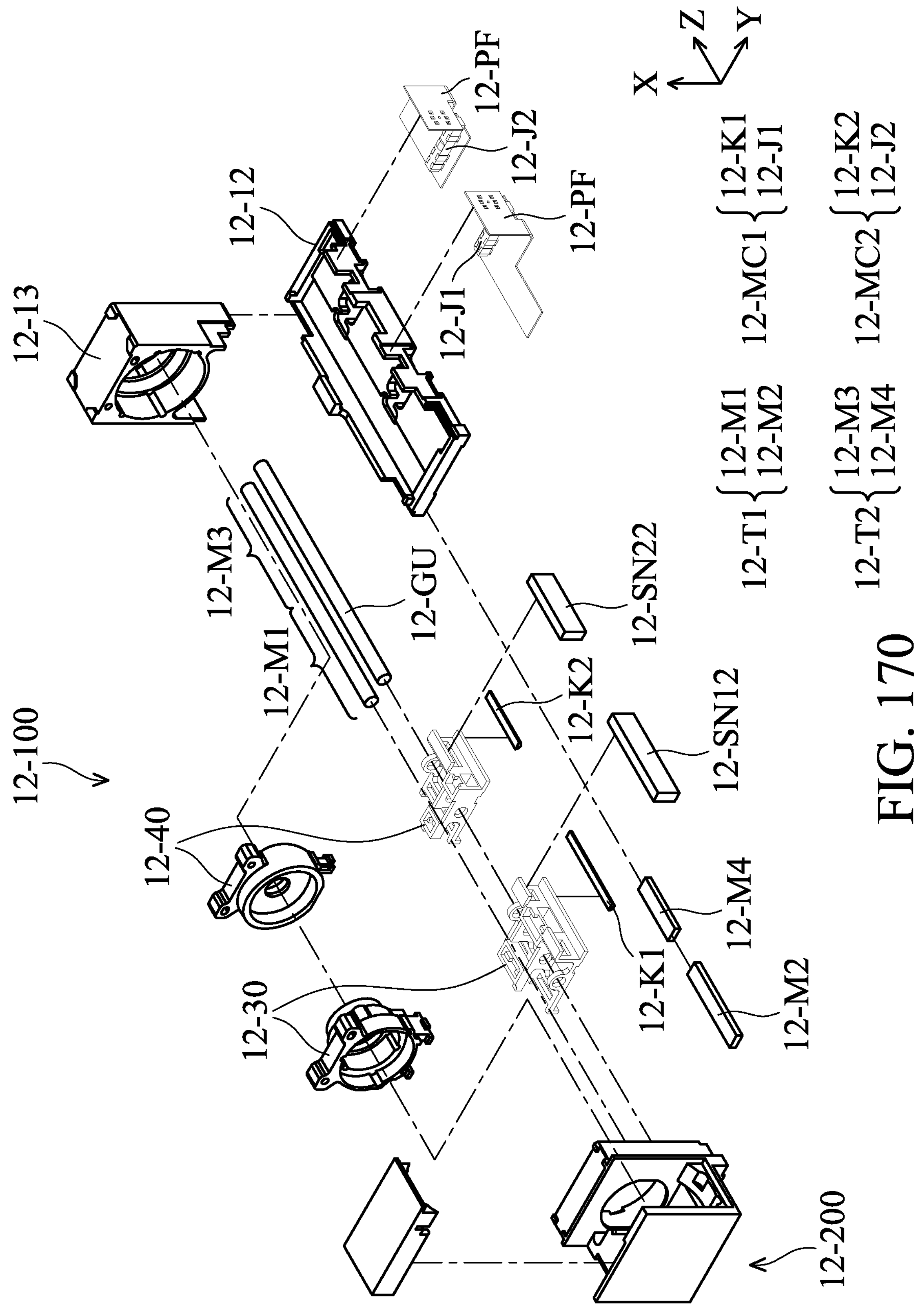
Figure 171:
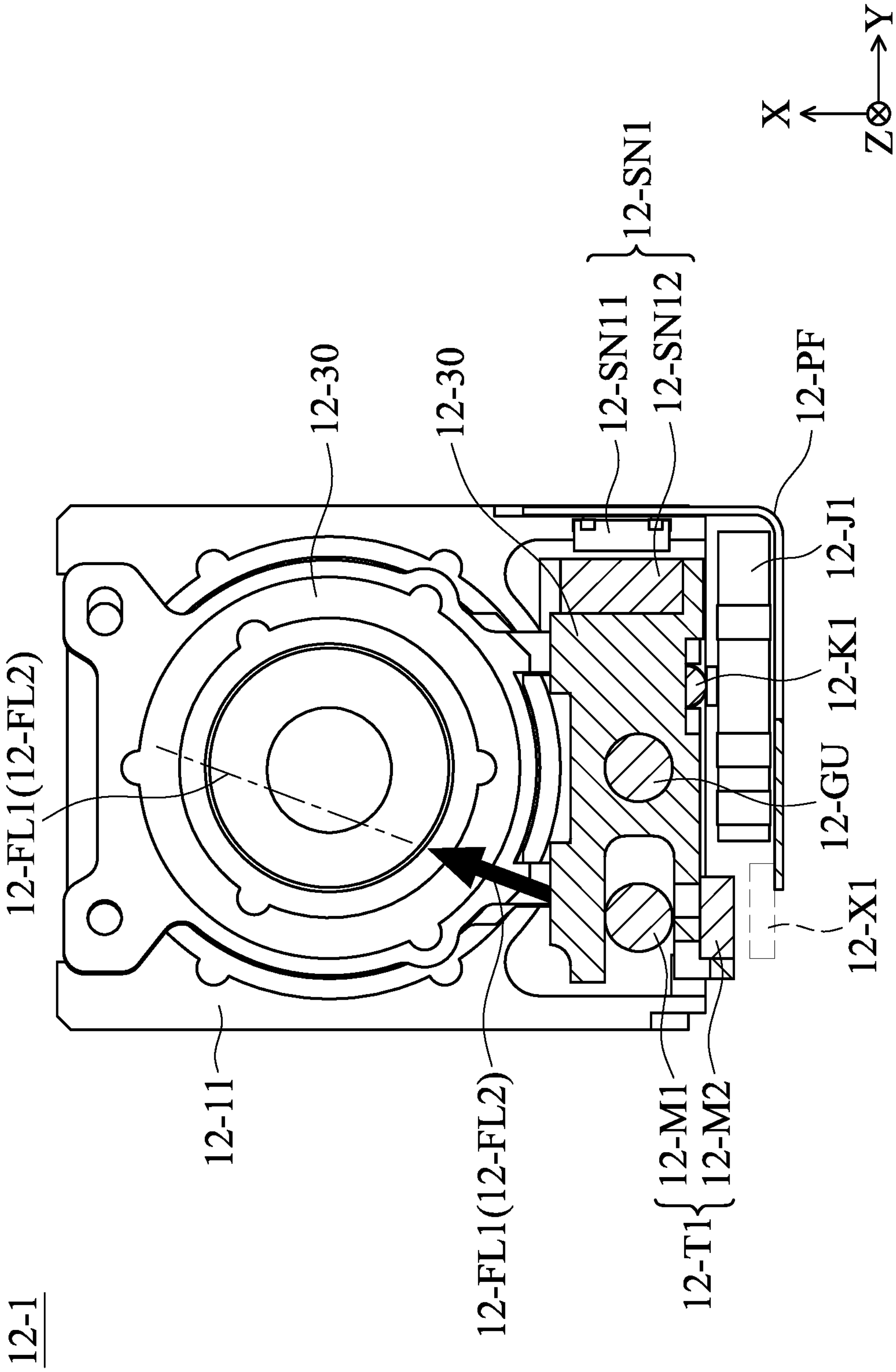
Figure 172:
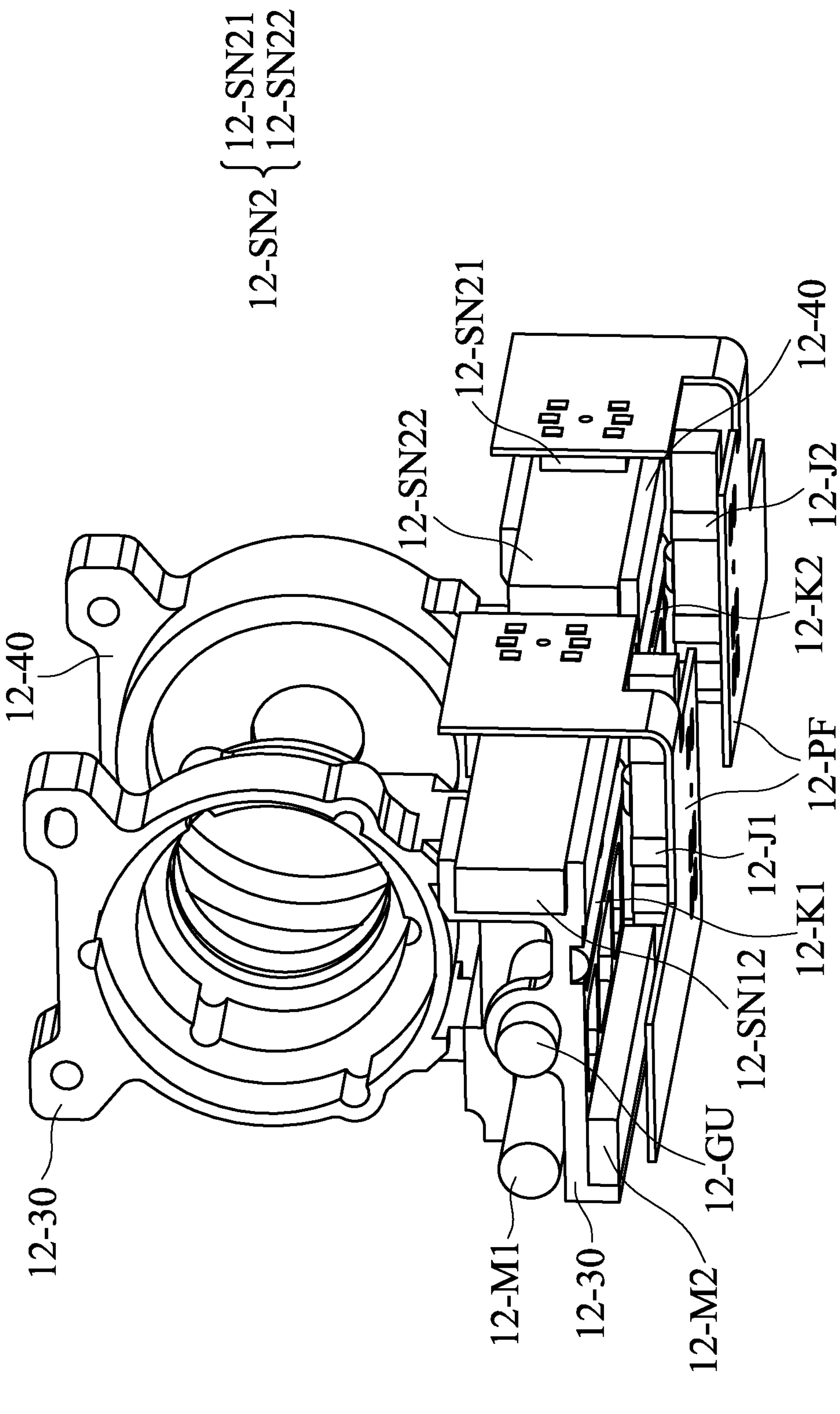
Figure 173:
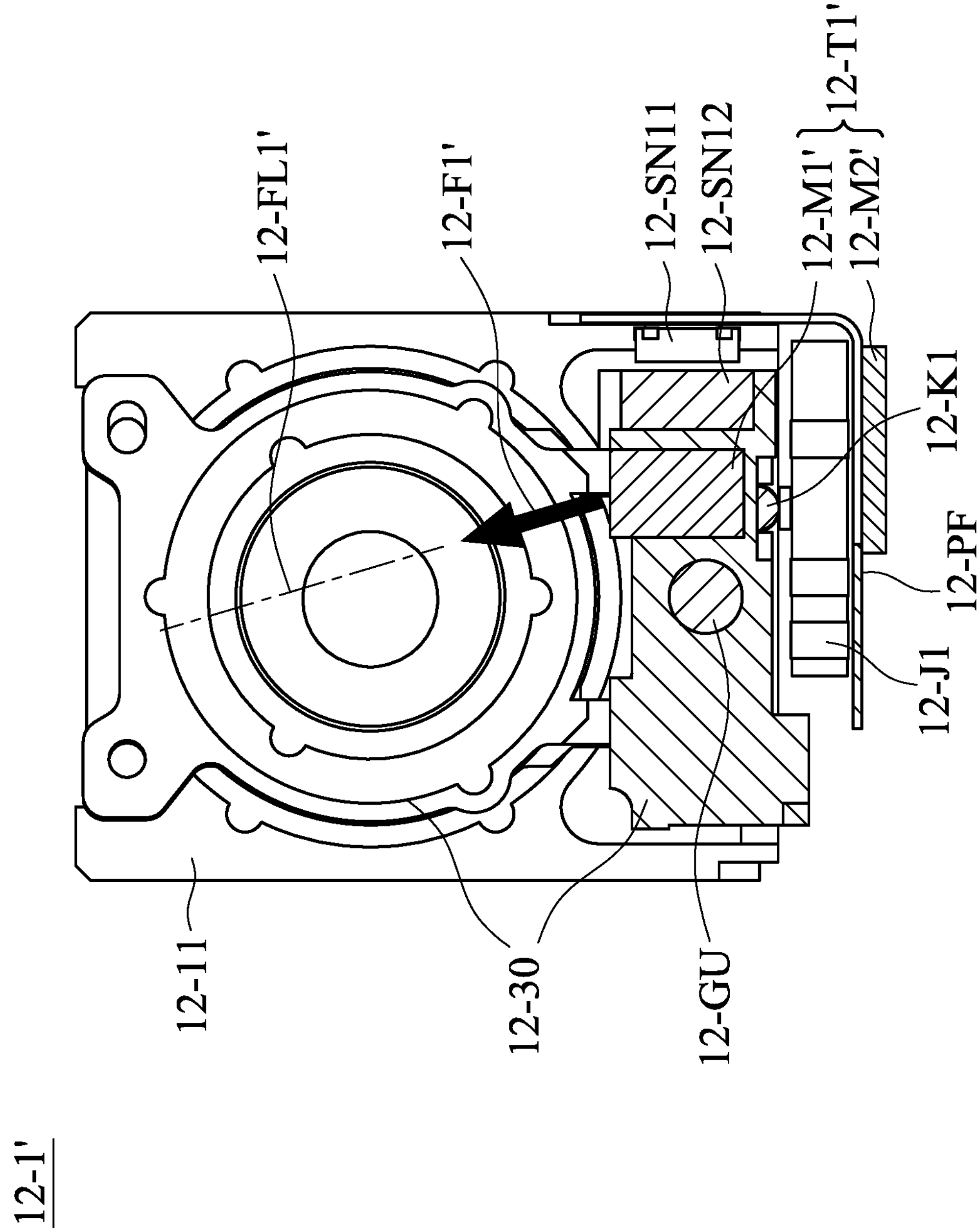
Figure 174:
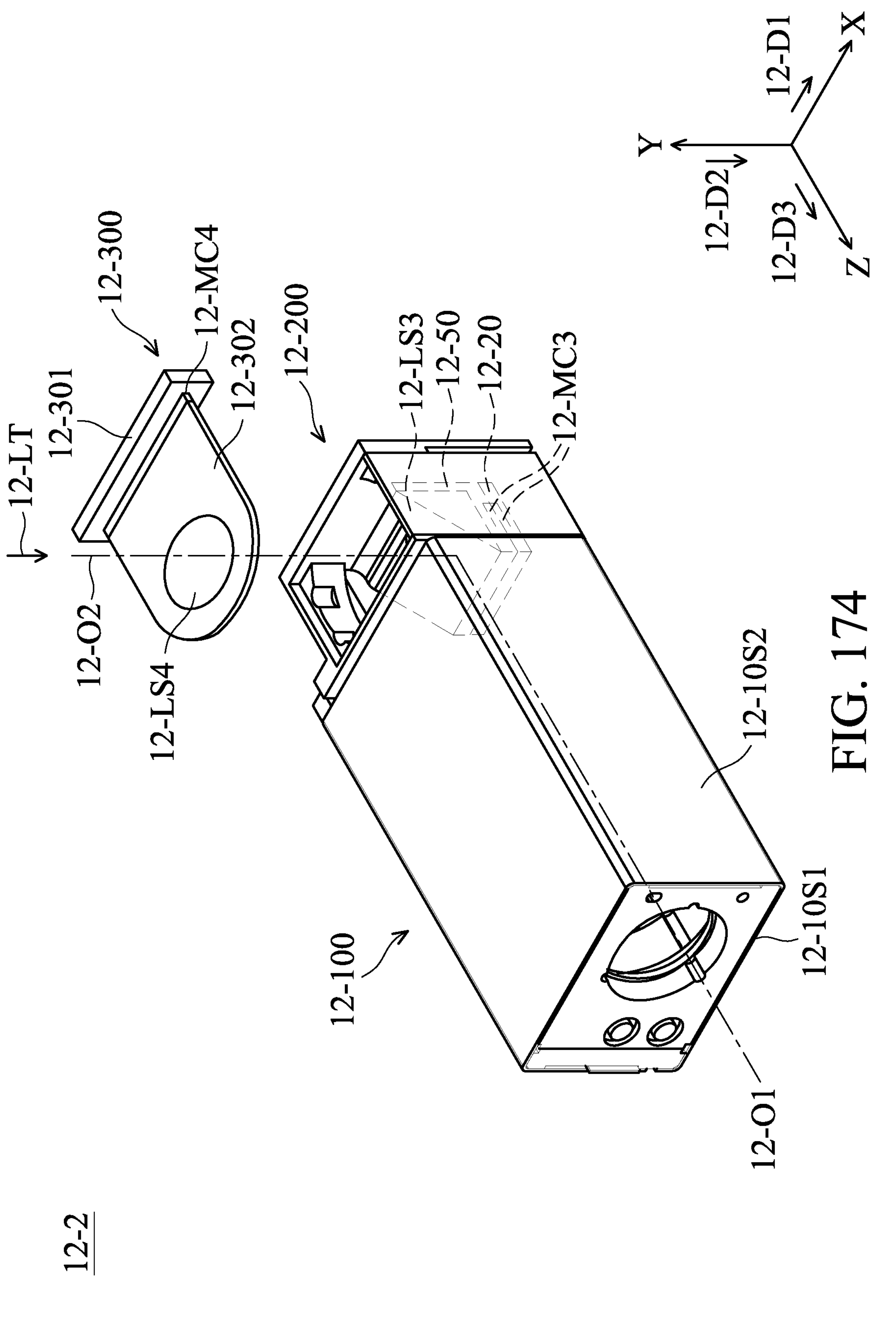
Figure 175:
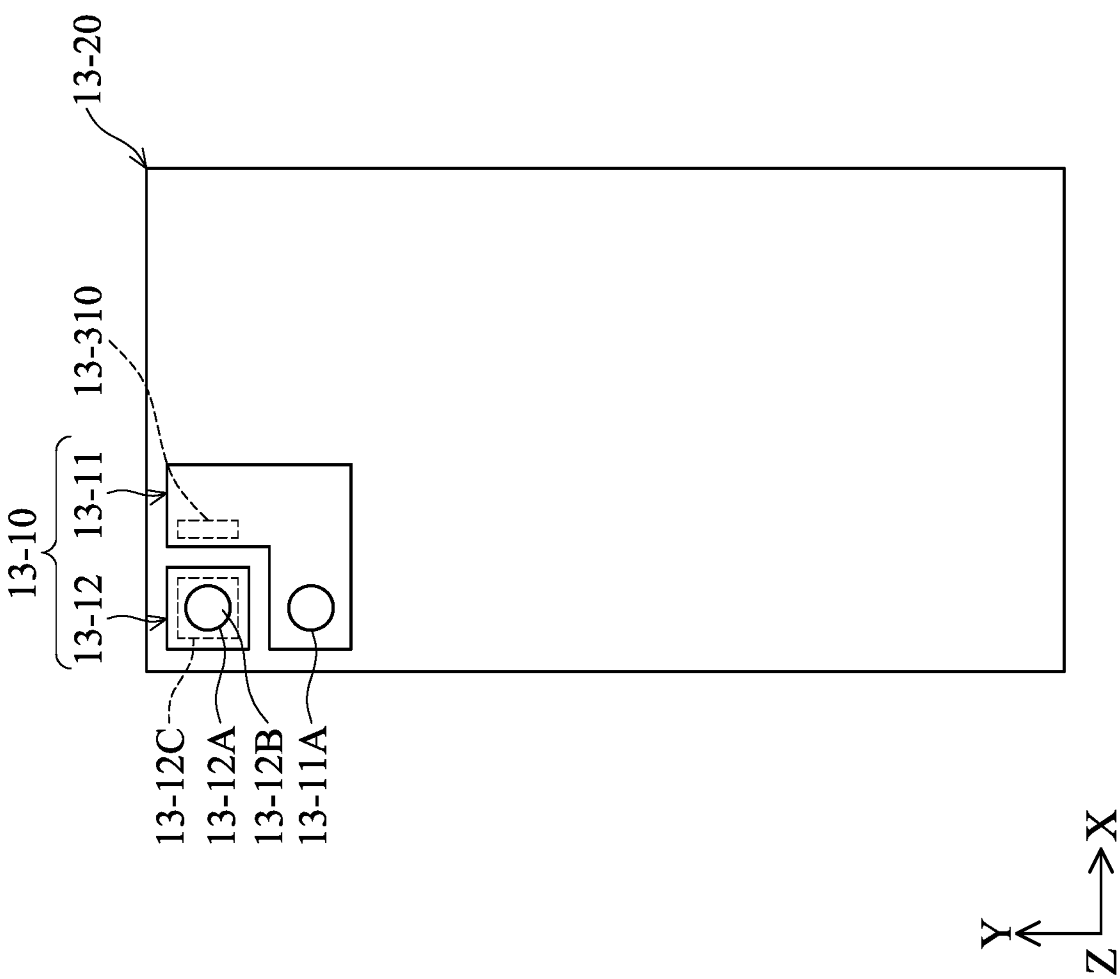
Figure 176:
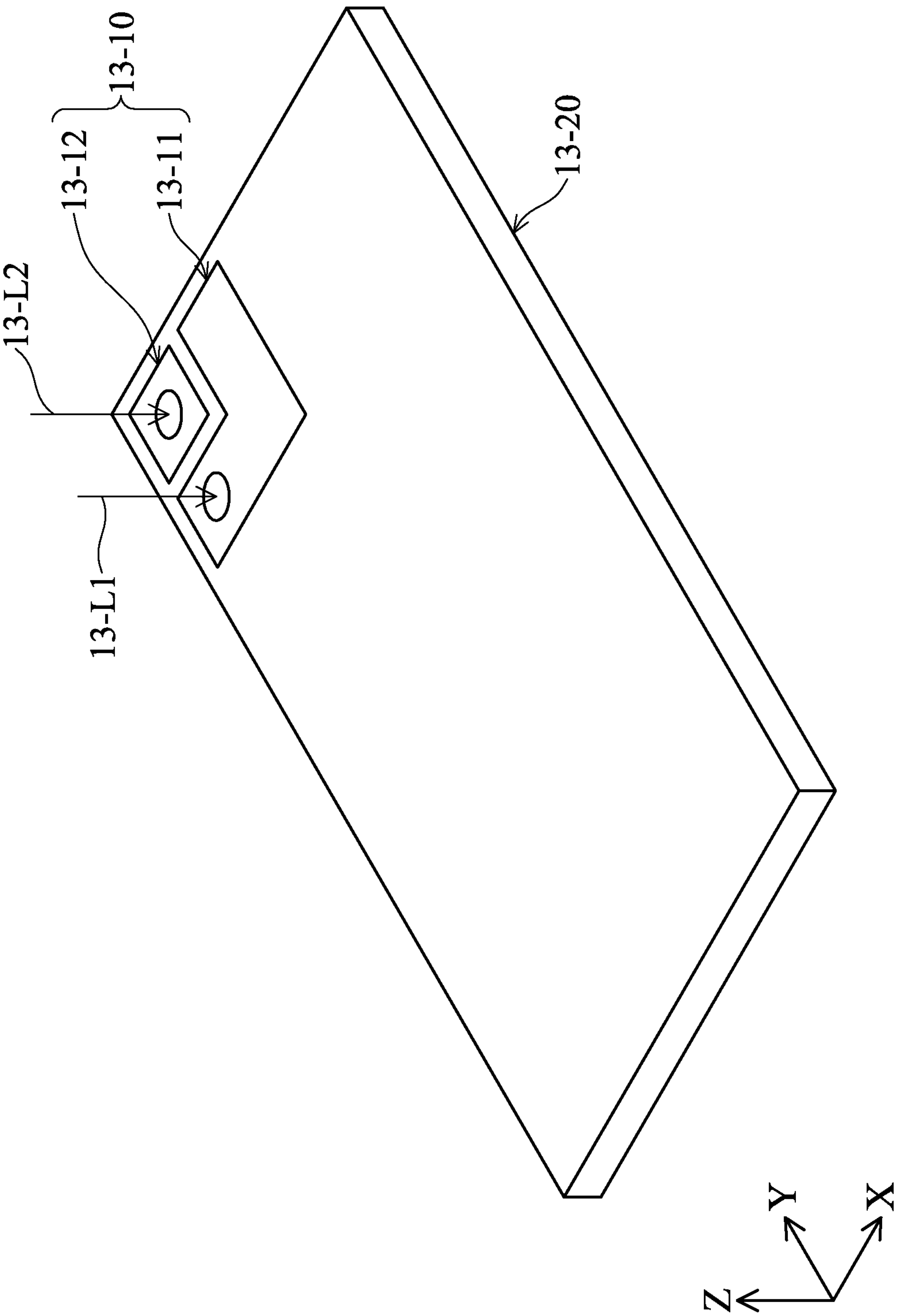
Figure 177:
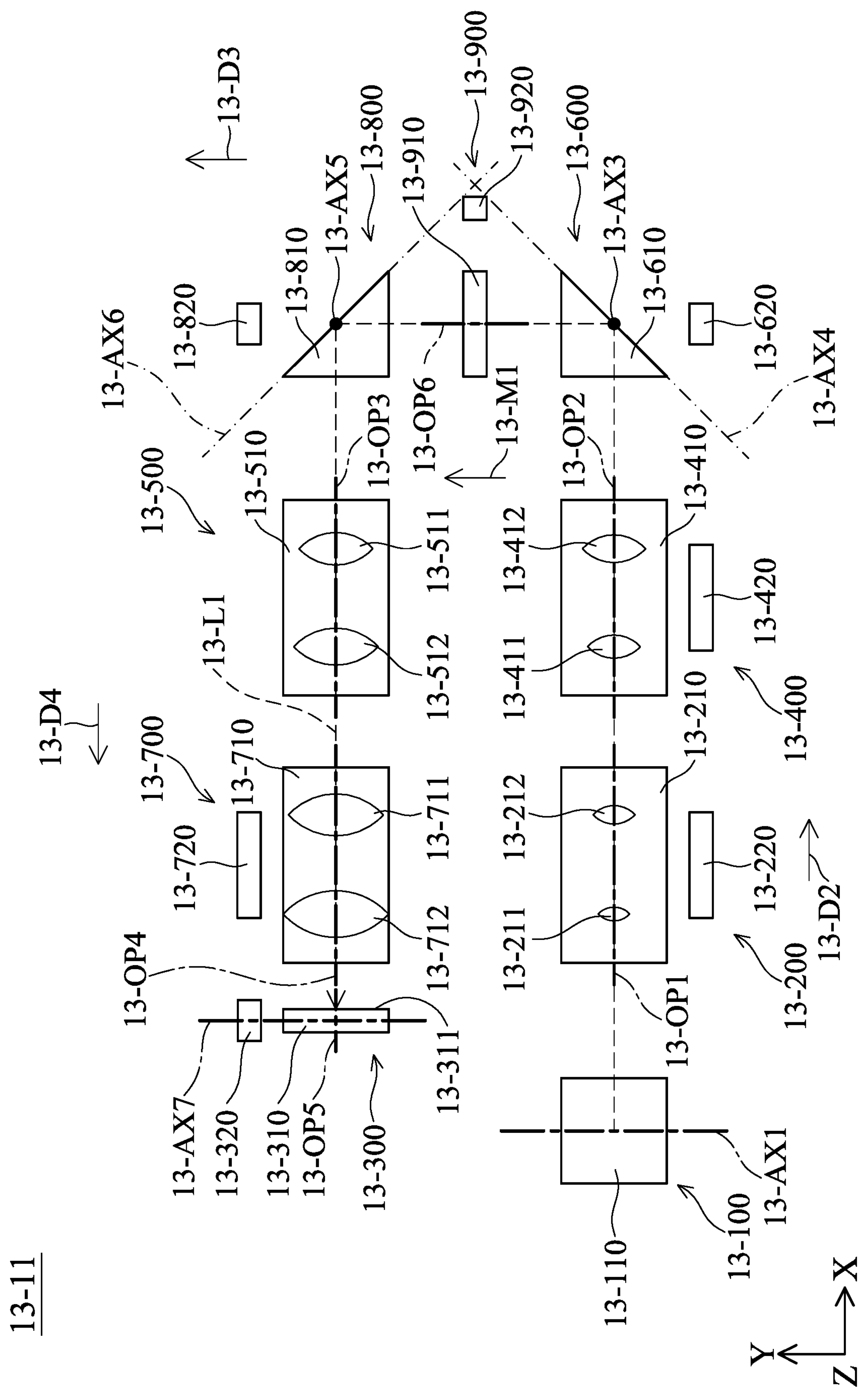
Figure 178:
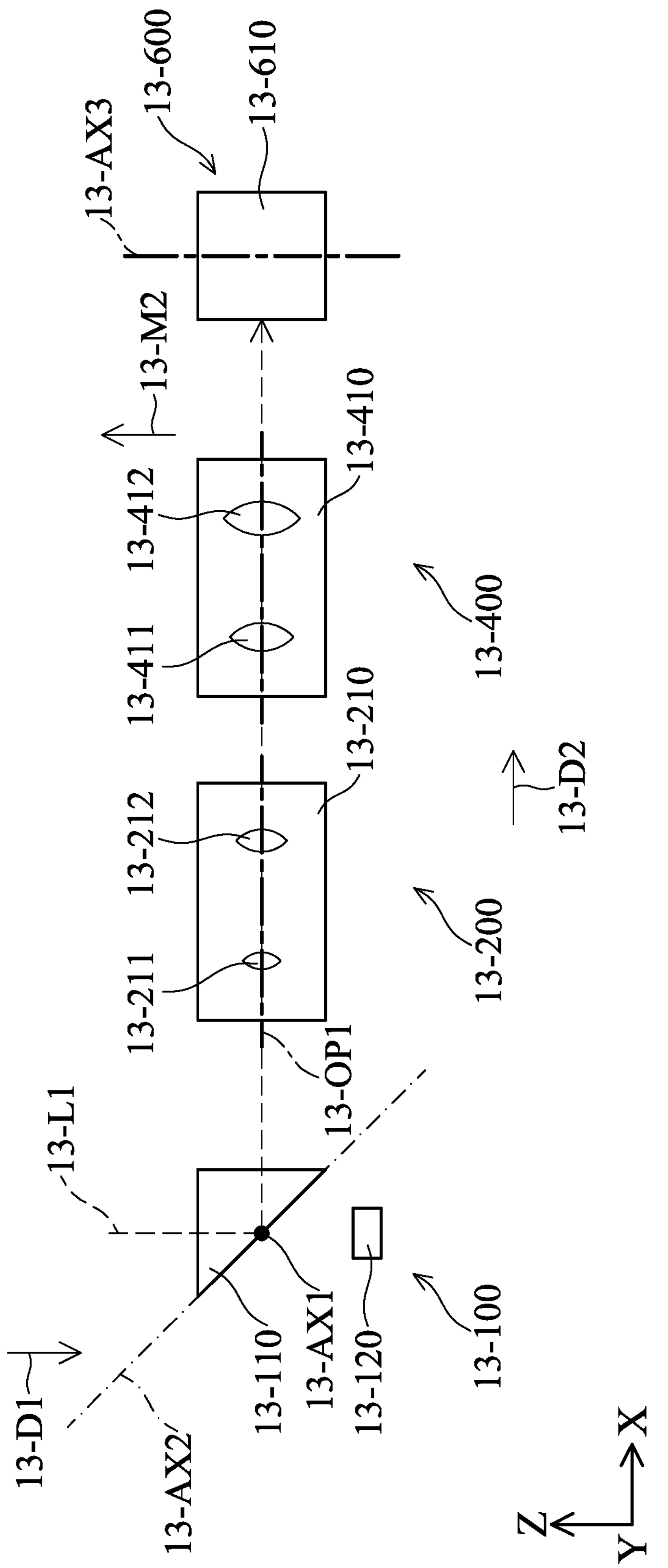
Figure 179:
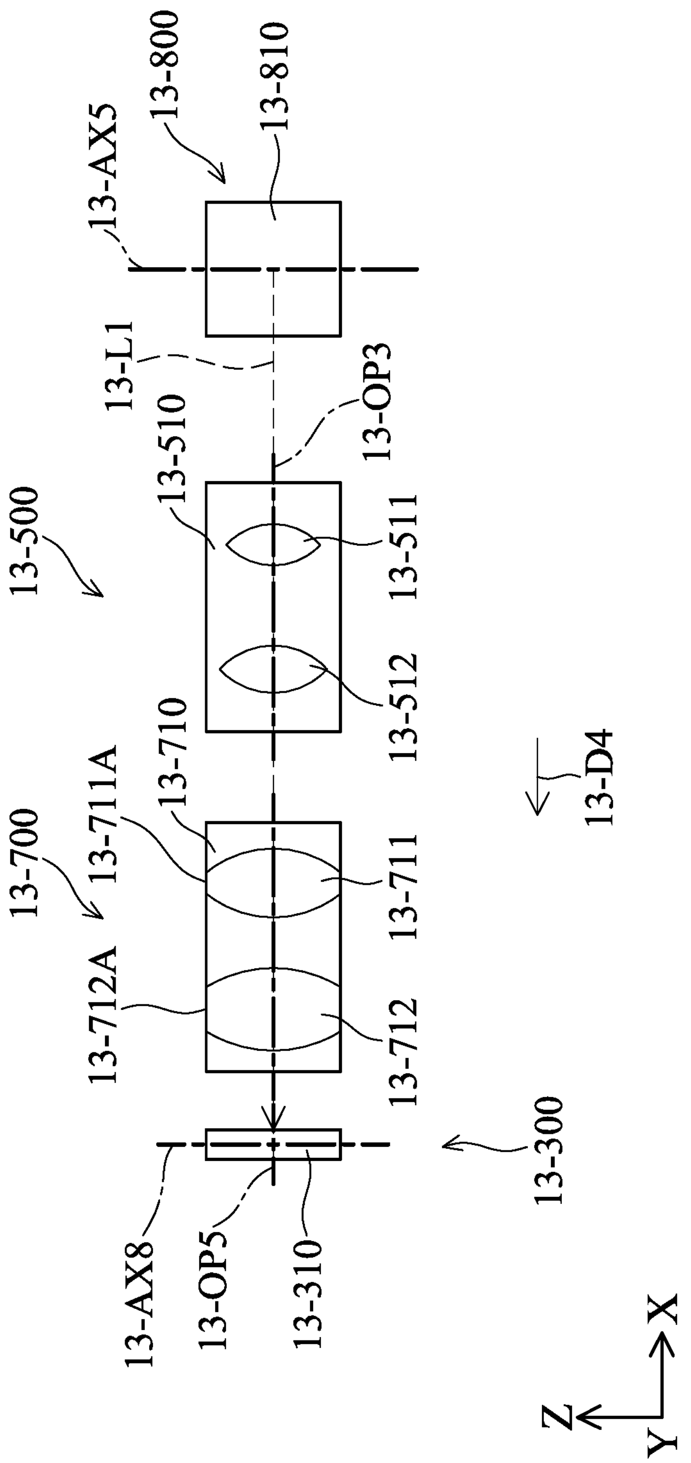
Figure 180:
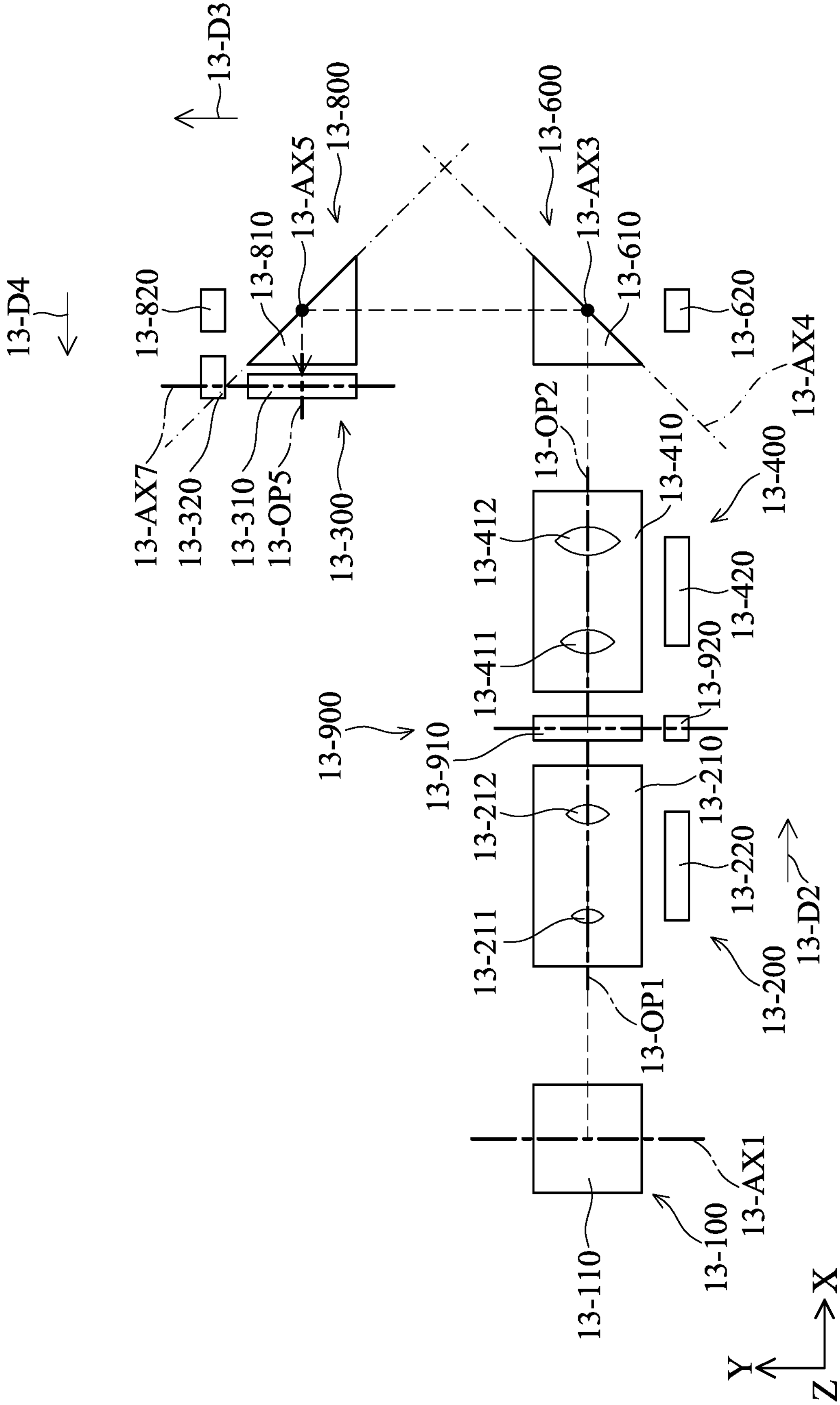
Figure 181:
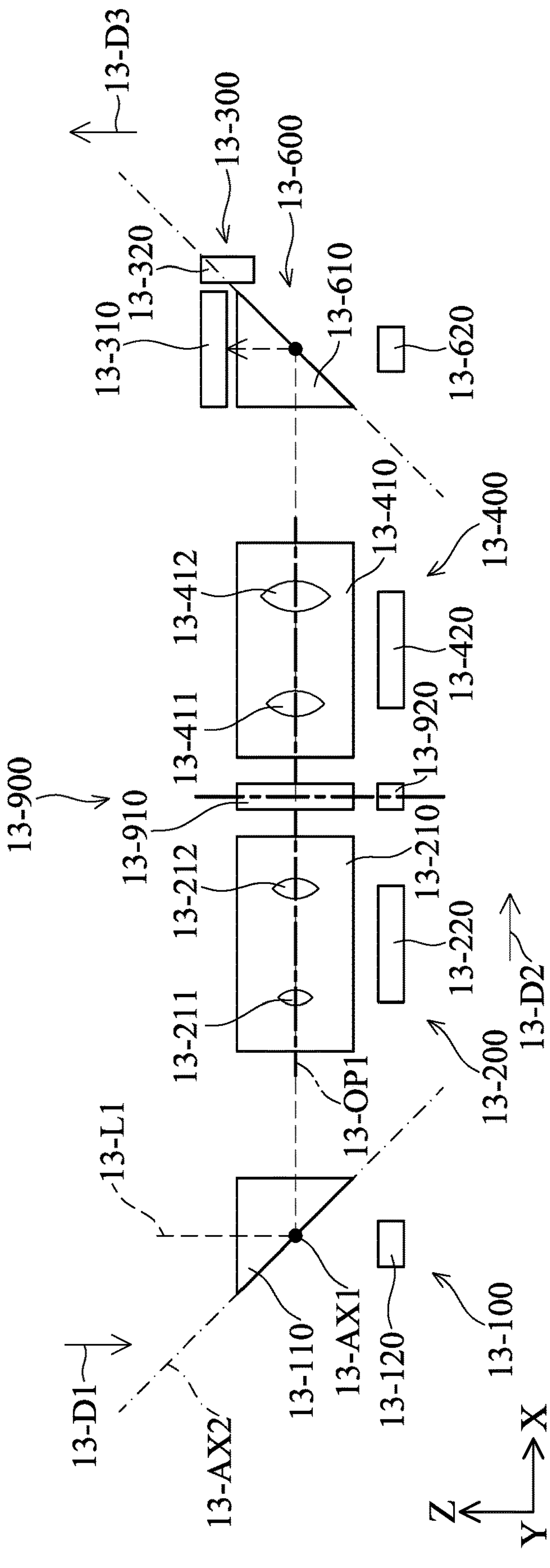
Figure 182:
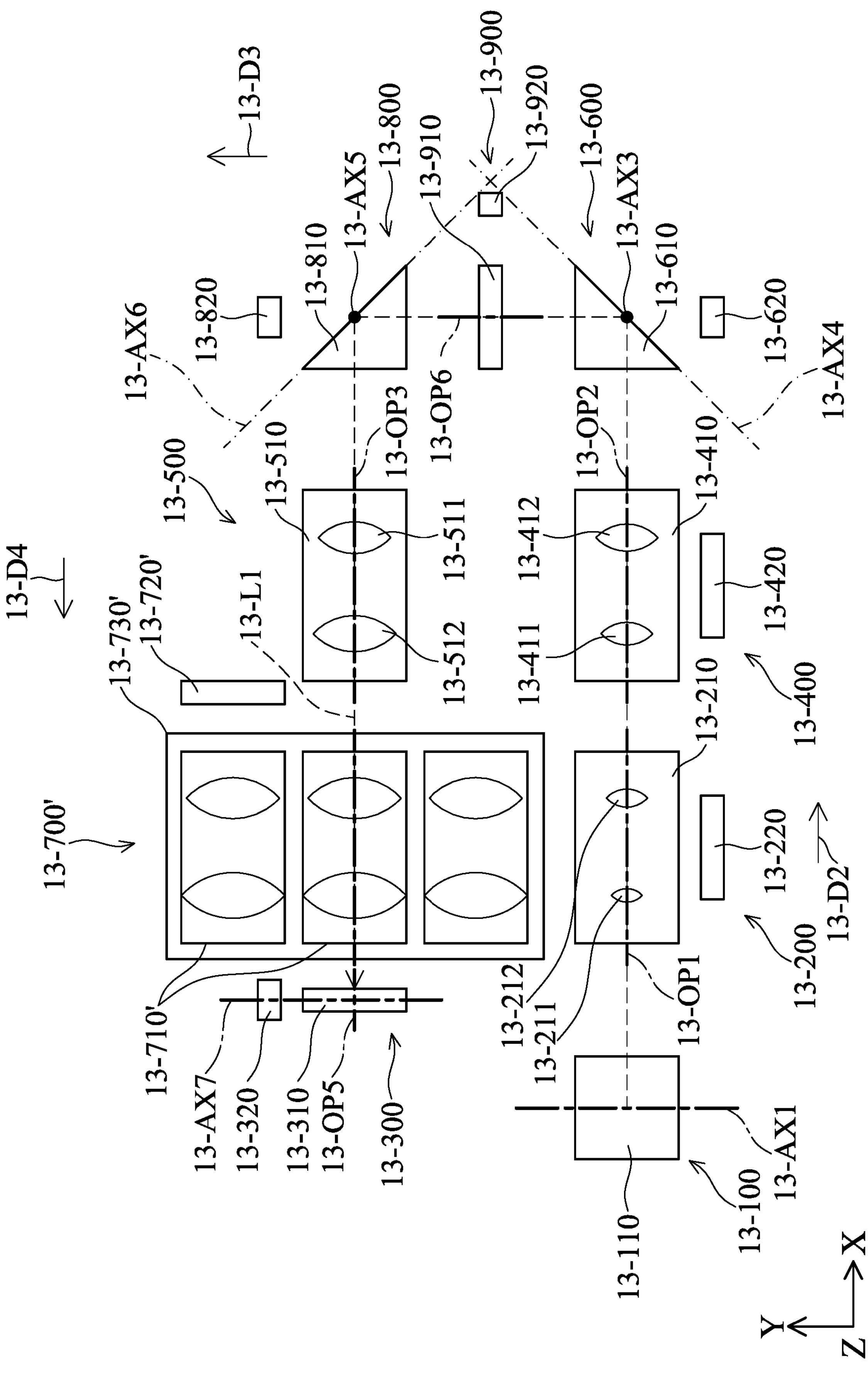
Figure 183:
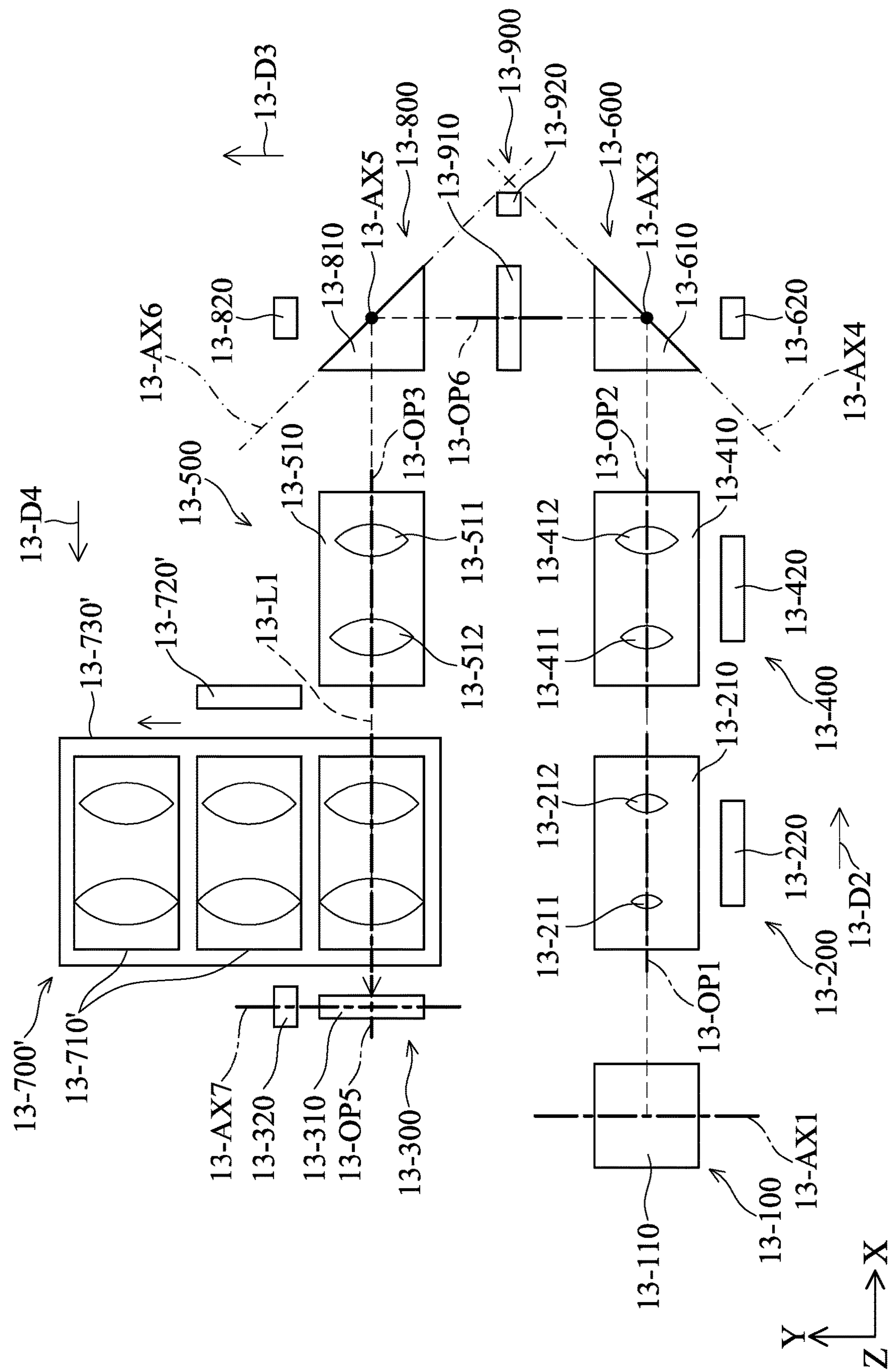
Figure 184:
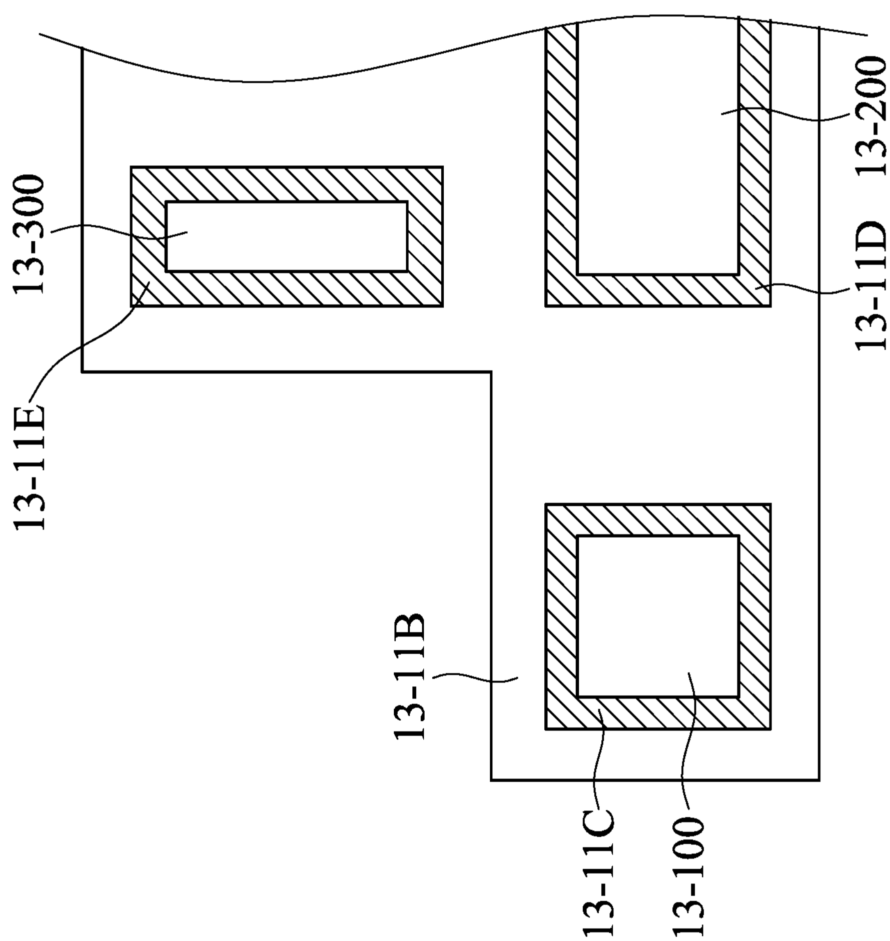
Figure 185:
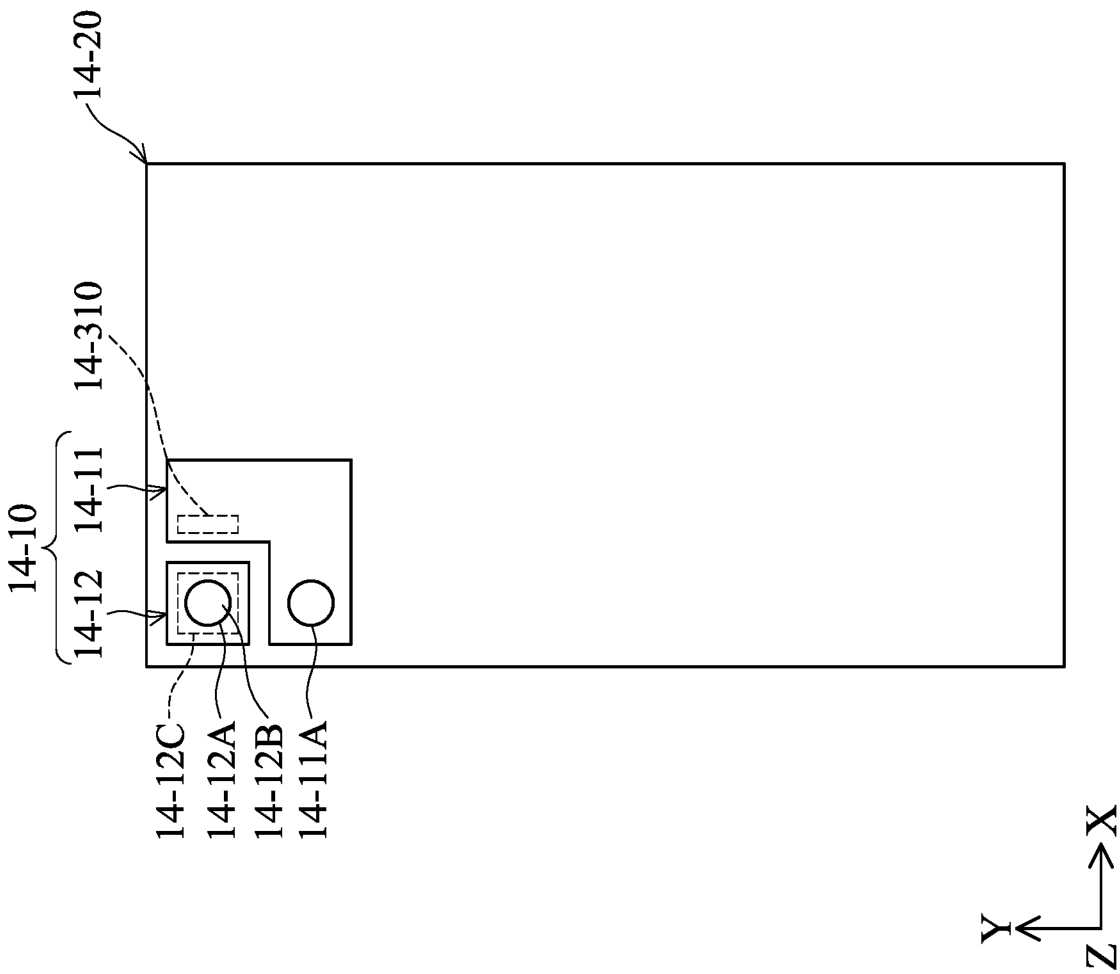
Figure 186:
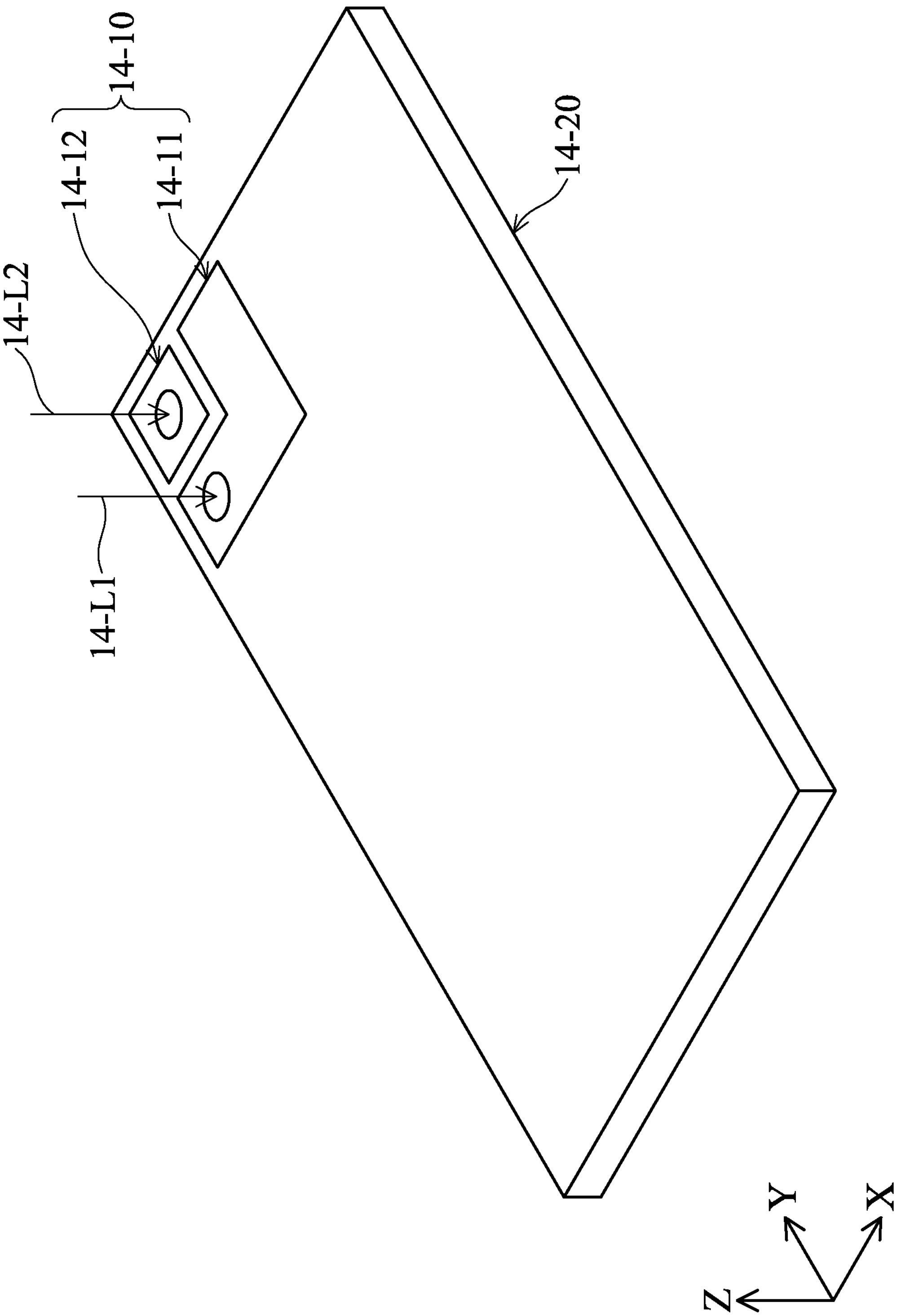
Figure 187:
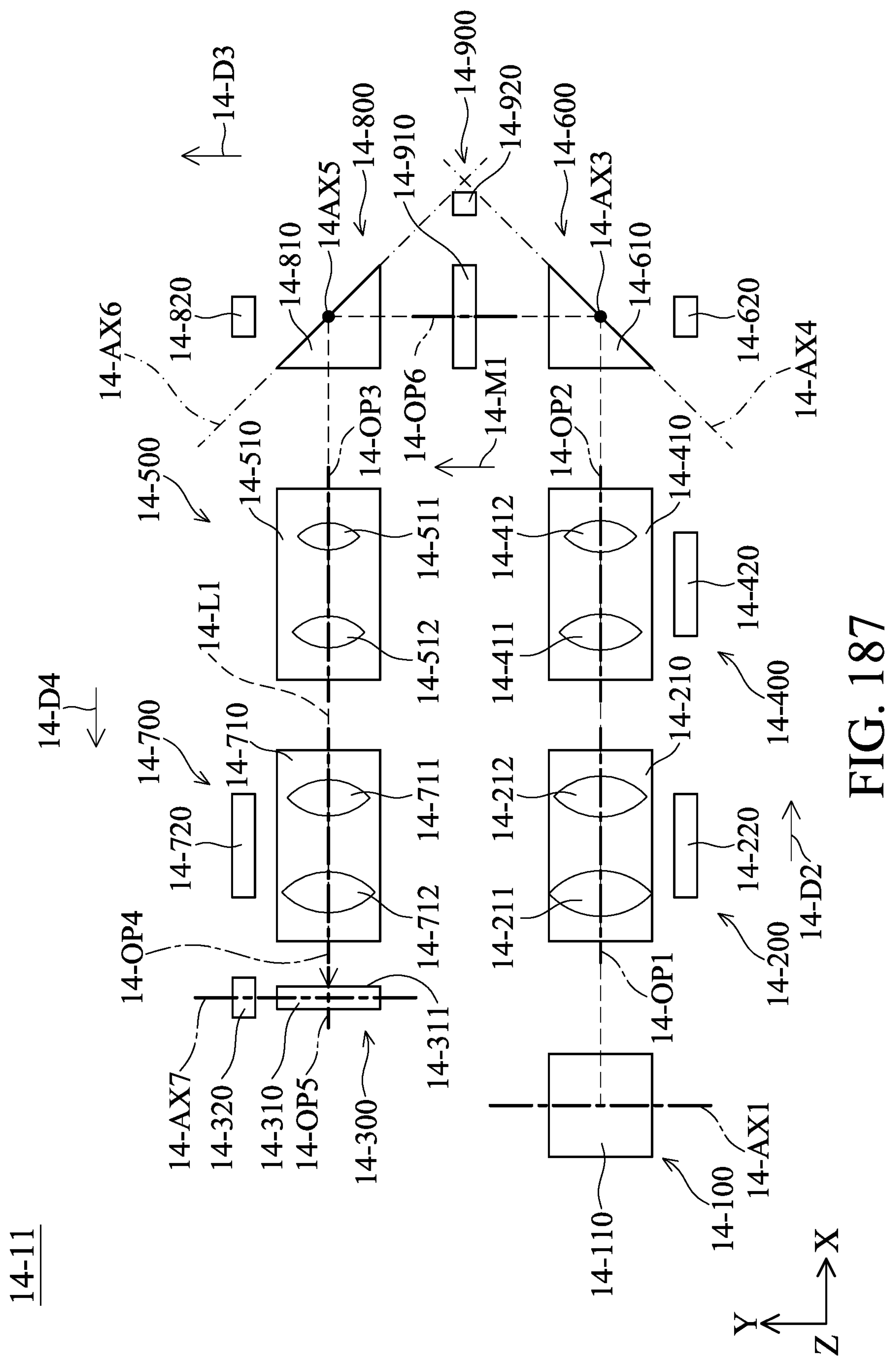
Figure 188:
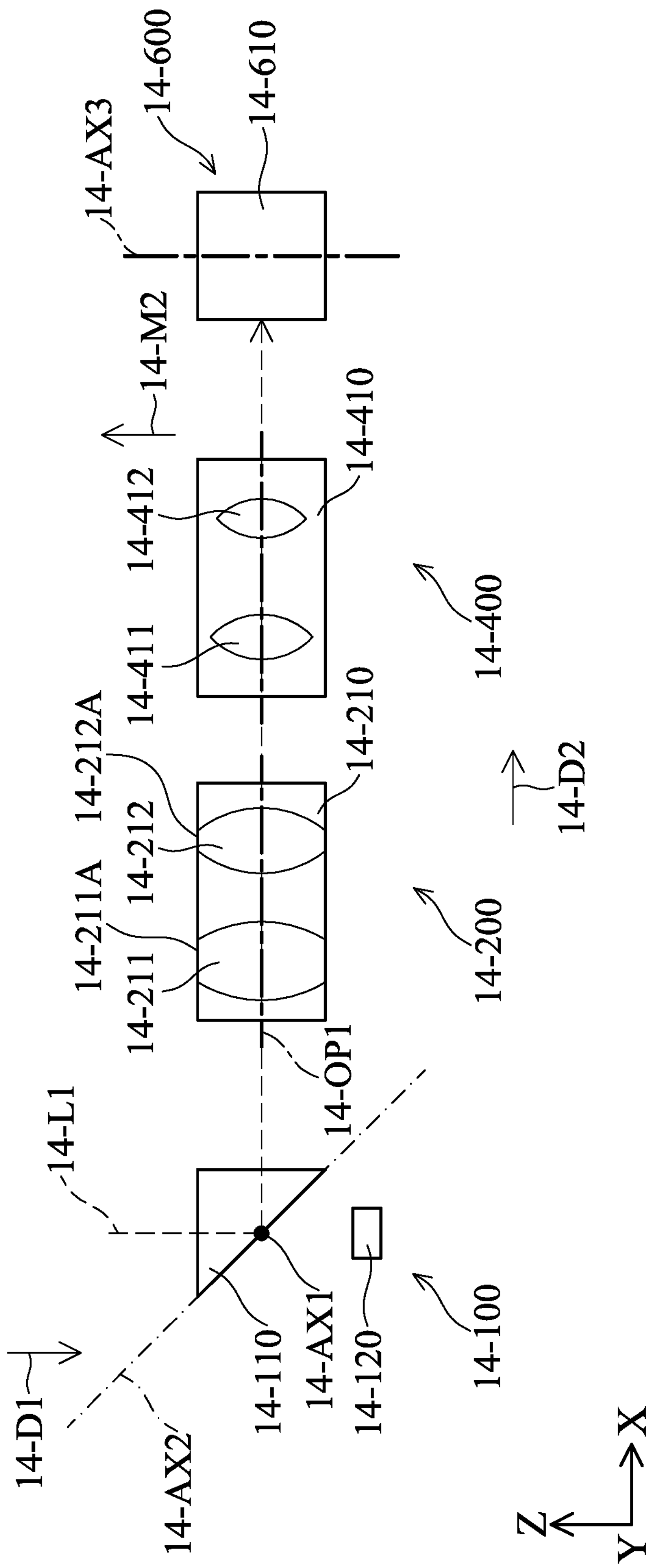
Figure 189:
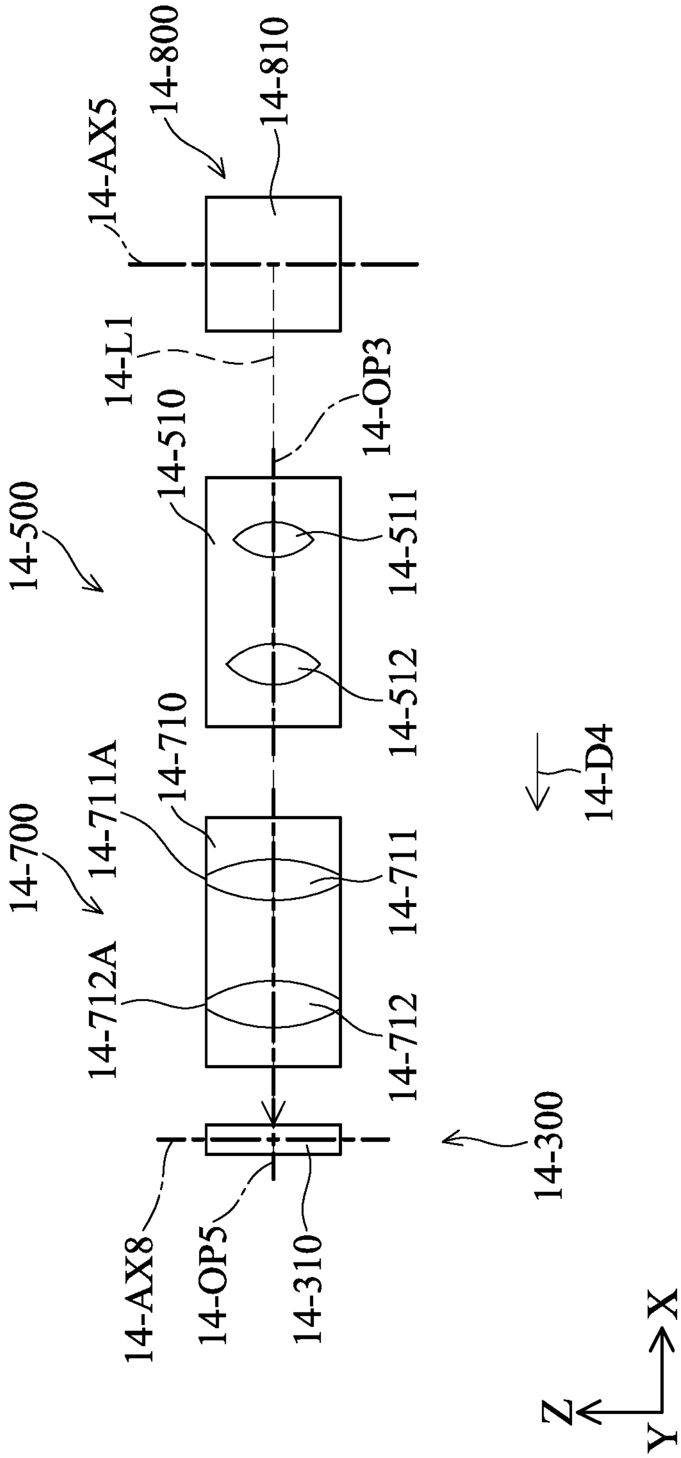
Figure 190:
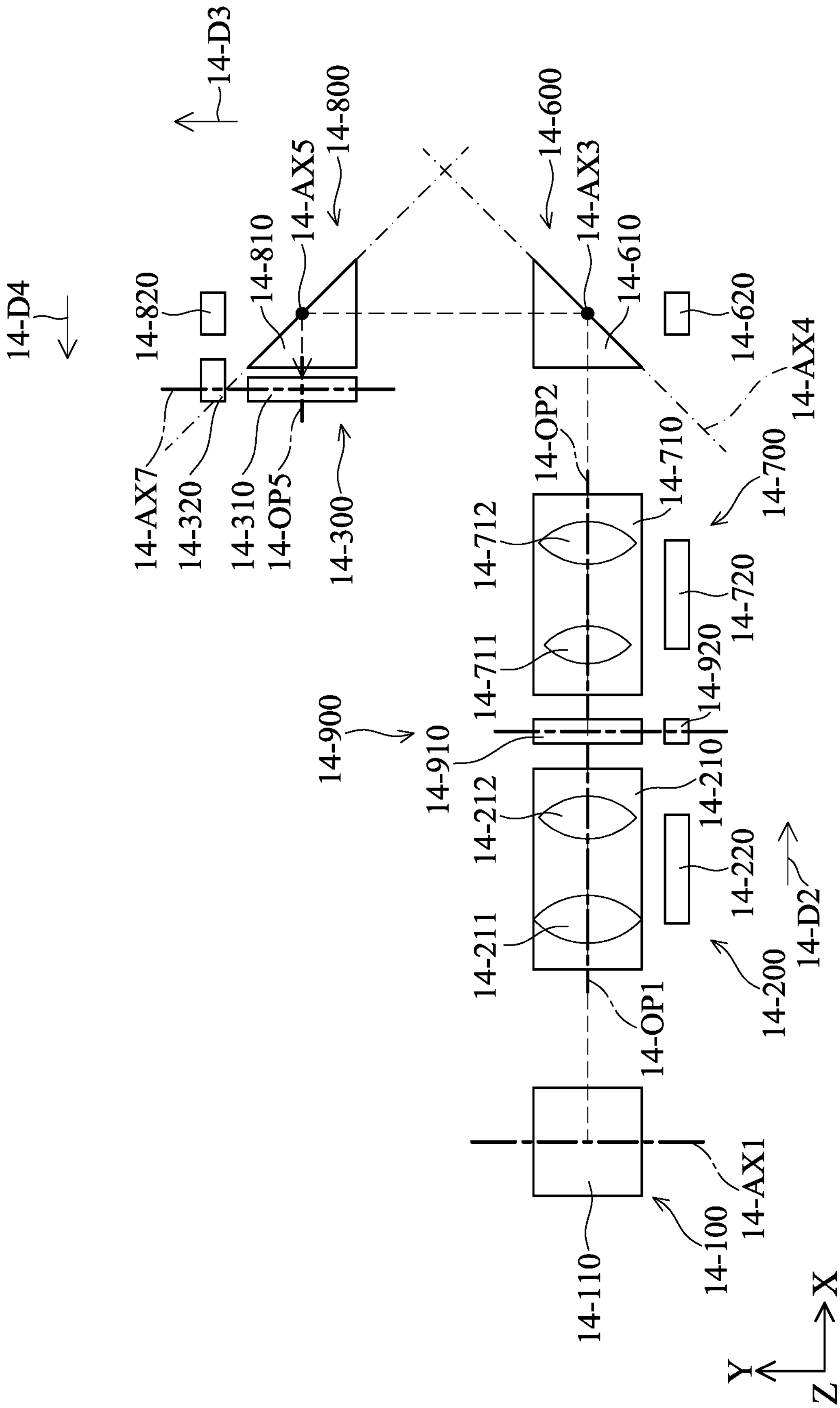
Figure 191:
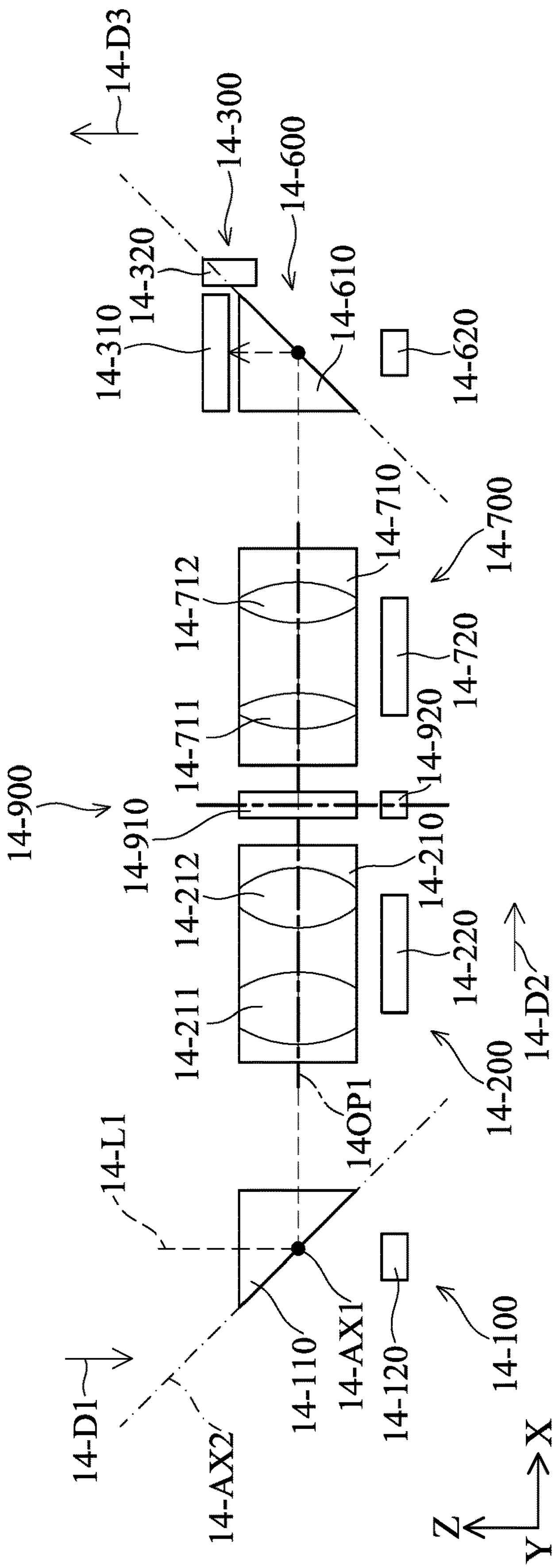
Figure 192:
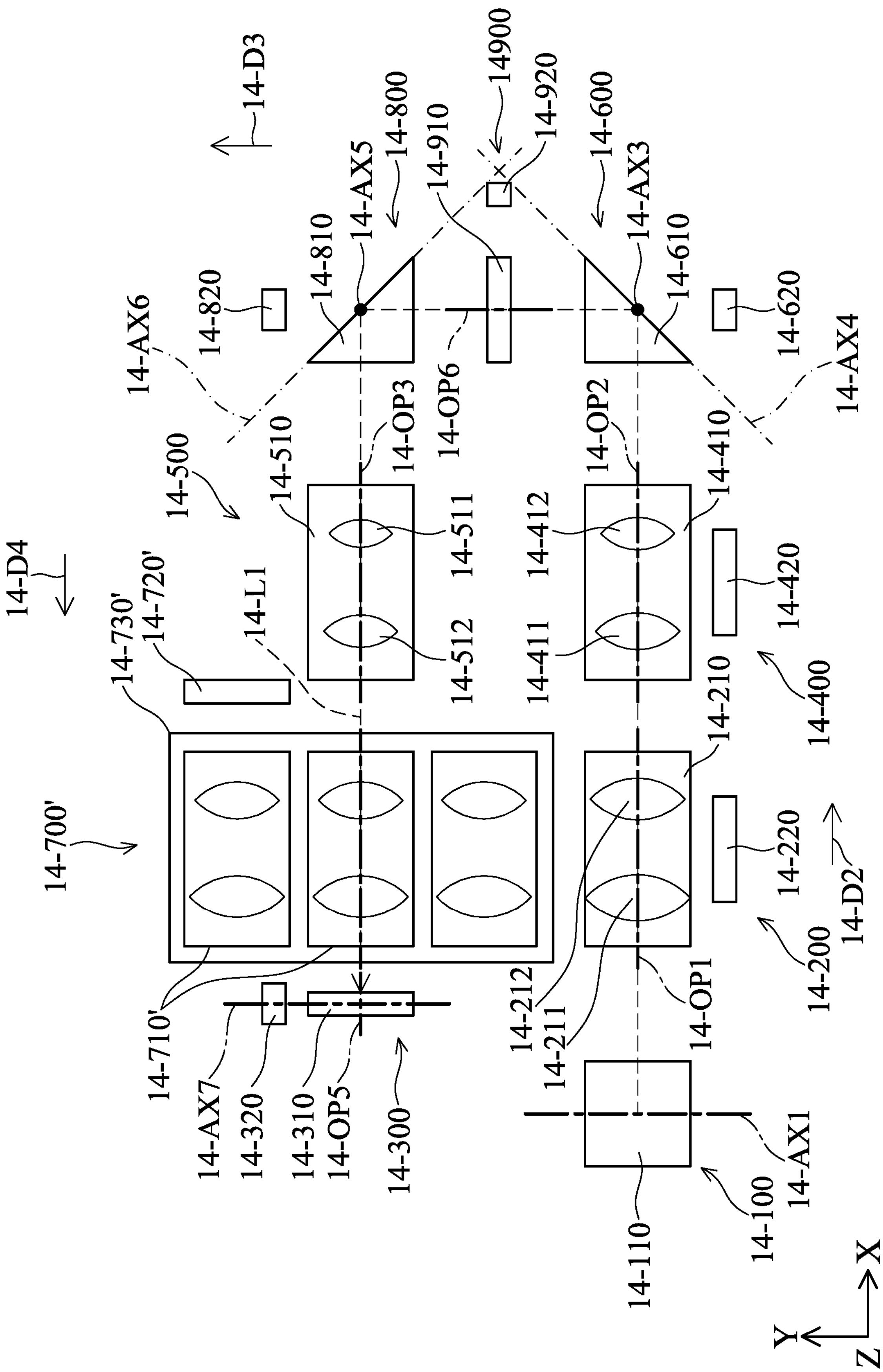
Figure 193:
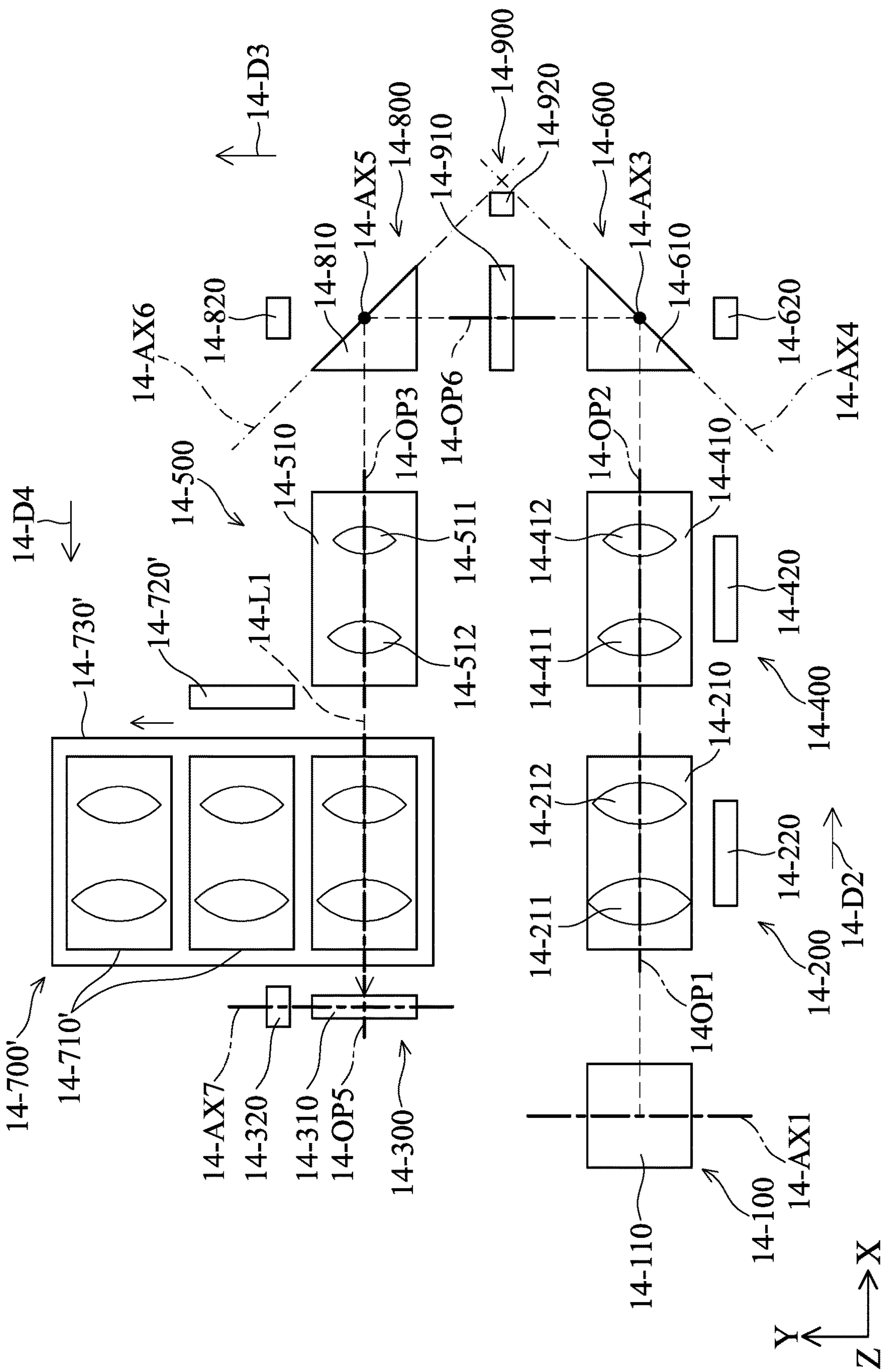
Figure 194:
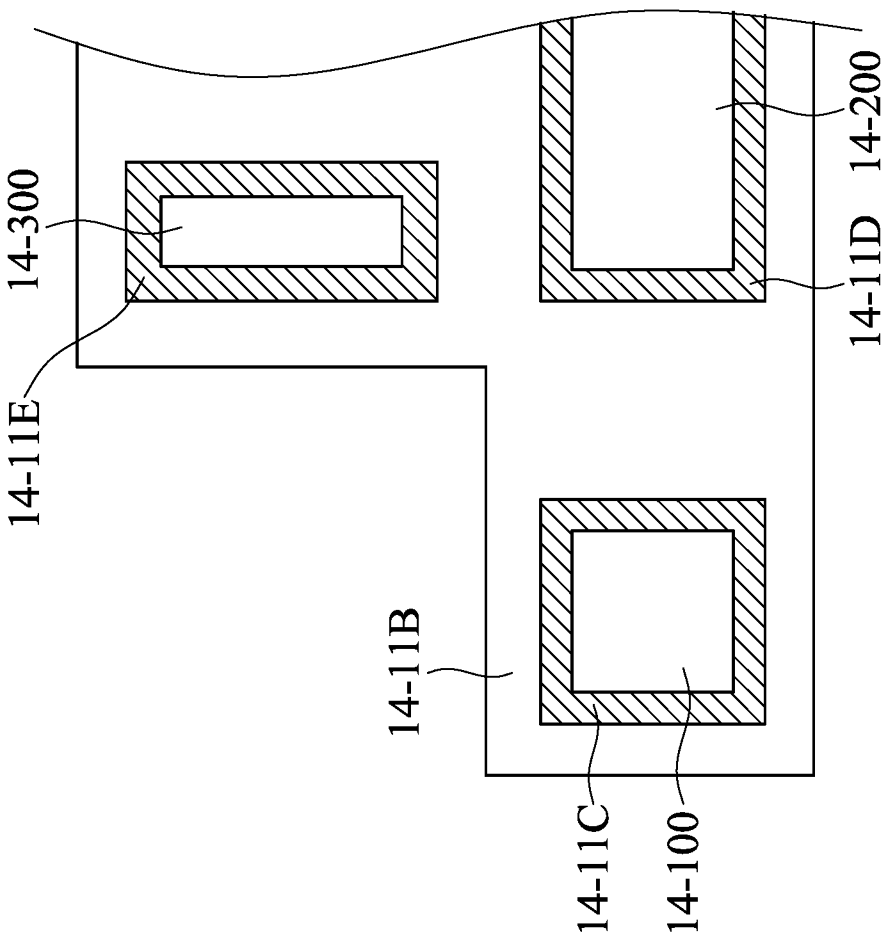
Figure 195:
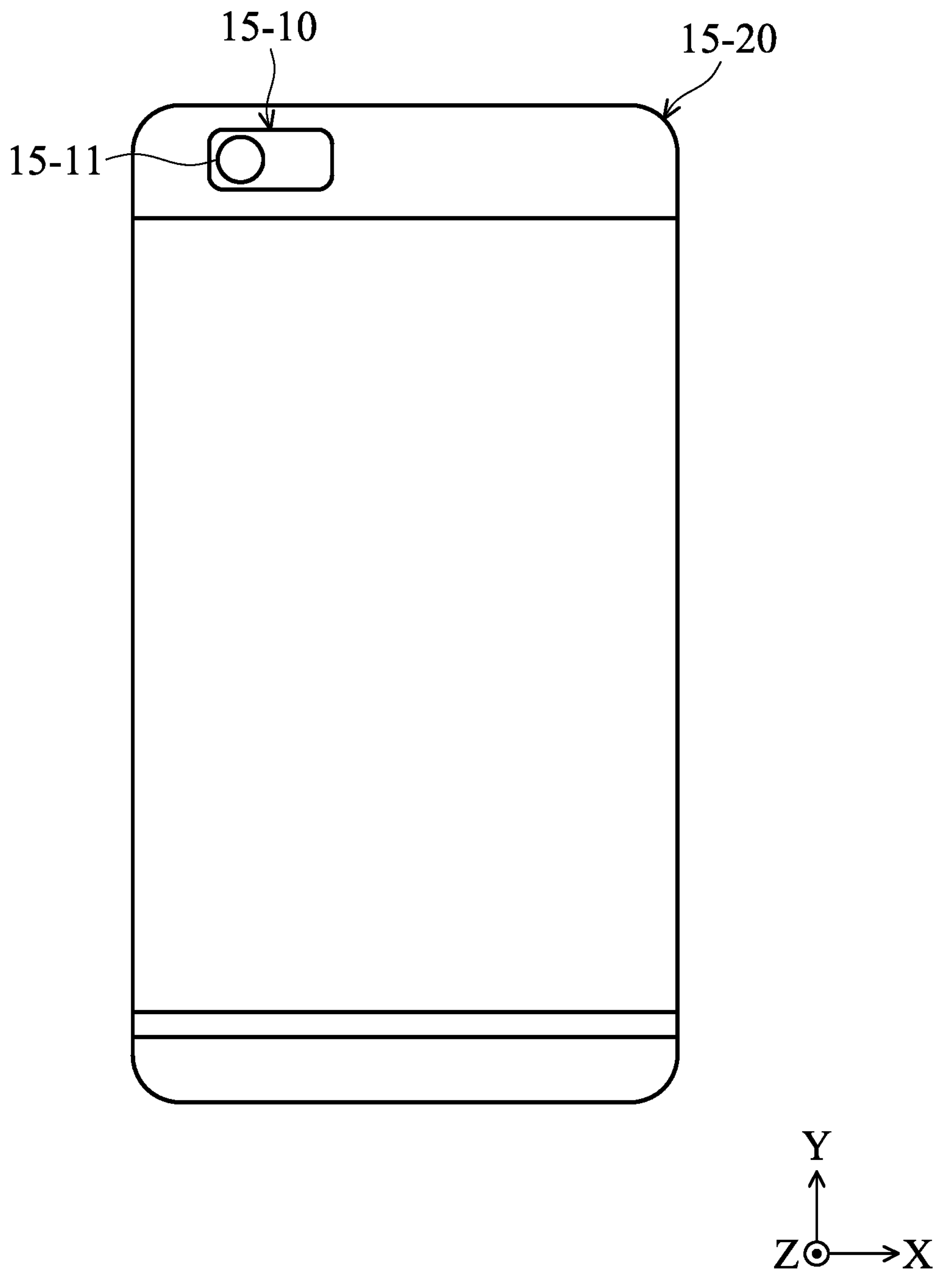
Figure 196:
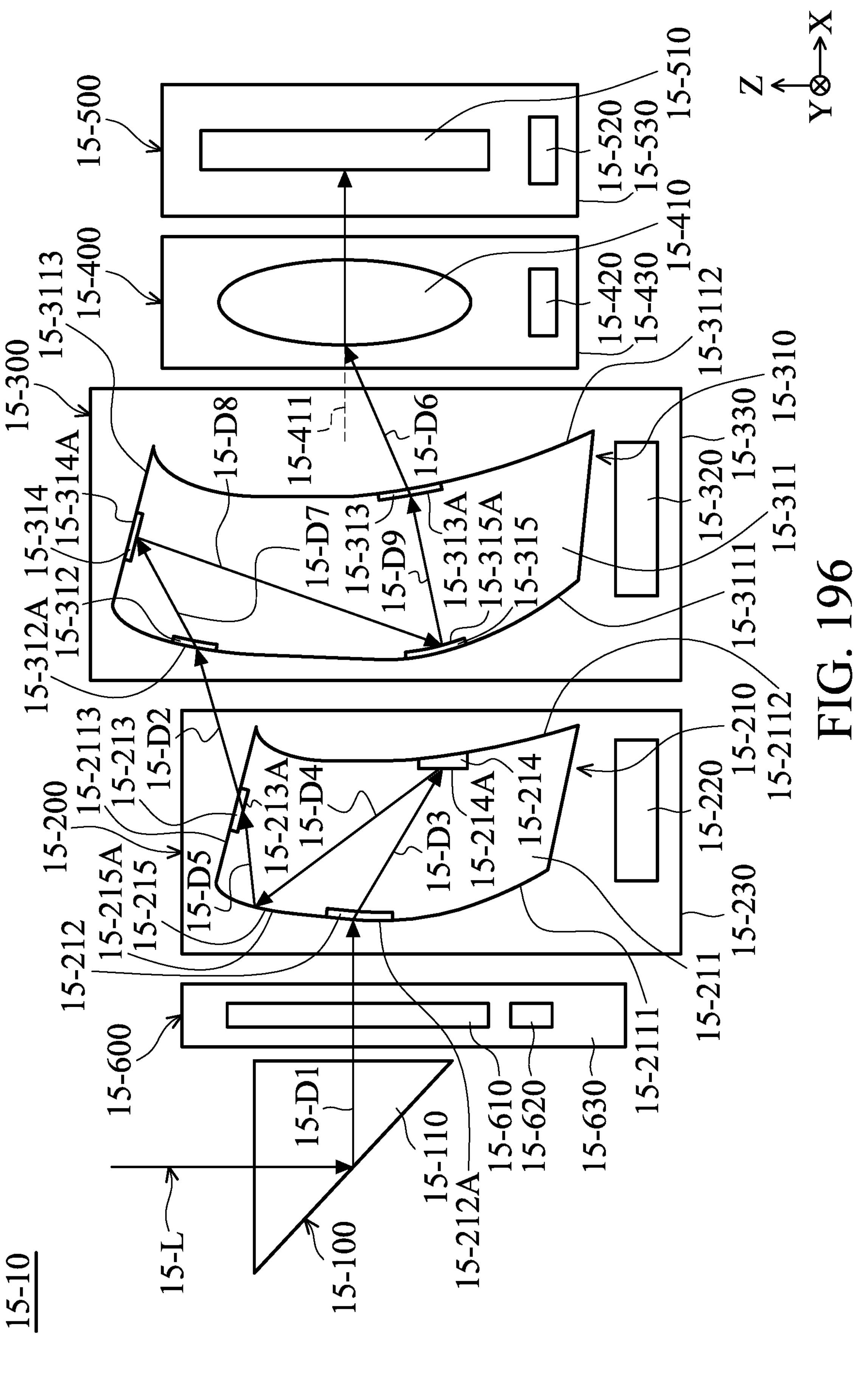

FIG. 118, FIG. 119, FIG. 120, FIG. 121, and FIG. 122 are cross-sectional views illustrated along lines 10-A-10-A, 10-B-10-B, 10-C-10-C, 10-D-10-D in FIG. 115 and a line 10-E-10-E in FIG. 113:

FIG. 123 is a schematic view of some elements of the optical element driving mechanism;

FIG. 124 is a top view of some elements of the optical element driving mechanism;

FIG. 125 is a front view of some elements of the optical element driving mechanism;

FIG. 126 is a back view of some elements of the optical element driving mechanism;

FIG. 127 is an enlarged view of FIG. 124;

FIG. 128 and FIG. 129 are schematic views of other elements of the optical element driving mechanism viewed in different directions;

FIG. 130 is a schematic view of the bottom and some elements disposed on the bottom:

FIG. 131 is an enlarged view of FIG. 130;

FIG. 132 is a top view of the bottom and some elements disposed on the bottom;

FIG. 133 and FIG. 134 are schematic views of the movable portion and the coil viewed in different directions;

FIG. 135A is a side view of the movable portion and the coil;

FIG. 135B is a top view of the movable portion and the coil:

FIG. 136 is a schematic view of the movable portion;

FIG. 137 is a side view of the movable portion:

FIG. 138 is an enlarged view of FIG. 136;

FIG. 139 is a schematic view of some elements of the optical element driving mechanism;

FIG. 140 is a schematic view of the frame:

FIG. 141 is a front view of the frame;

FIG. 142 is a schematic view when an anti-reflect element is disposed on the frame;

FIG. 143 and FIG. 144 are cross-sectional views of the optical element driving mechanism when the anti-reflect element is disposed on the frame;

FIG. 145 is a back view of the optical element driving mechanism when the anti-reflect element is disposed on the frame;

FIG. 146 is a schematic view of the electronic device equipped with the optical element driving mechanism;

FIG. 147 is a perspective view of the optical element driving mechanism and the optical path adjustment assembly;

FIG. 148 is a schematic view of the optical path adjustment assembly:

FIG. 149 is an exploded view of the optical element driving mechanism;

FIG. 150 to FIG. 152 are perspective vies of the optical element driving mechanism from different perspectives;

FIG. 153 is a front view of the optical element driving mechanism;

FIG. 154 is a side view of the optical element driving mechanism;

FIG. 155 is a perspective view of the case;

FIG. 156 is a perspective view of the circuit assembly and the bottom;

FIG. 157 is a perspective view of the first holder;

FIG. 158 is a front view of the first holder;

FIG. 159 is a perspective view of the second holder:

FIG. 160 is a front view of the second holder:

FIG. 161 is a schematic view of the first sensing assembly:

FIG. 162 is a schematic view of the second sensing assembly;

FIG. 163 is a schematic view of the guidance assembly;

FIG. 164 is a perspective view of the first accommodating part, the first contact unit, and the first guidance element:

FIG. 165 and FIG. 166 are a front view and a rear view of the first accommodating part, the first contact unit, and the first guidance element;

FIG. 167 is a schematic diagram showing an optical system according to an embodiment of the present invention;

FIG. 168 is a schematic diagram of the optical system in a telephoto mode;

FIG. 169 is a schematic diagram of the optical system in a wide-angle mode:

FIG. 170 is an exploded view diagram of the optical system (the housing is omitted):

FIG. 171 is a schematic cross-sectional view taken along the line 12-A-12-A' in FIG. 168;

FIG. 172 is a bottom perspective view showing a portion of the optical system;

FIG. 173 is a schematic diagram showing an optical system according to another embodiment of the present invention;

FIG. 174 is a schematic diagram showing an optical system according to another embodiment of the present invention;

FIG. 175 is a schematic diagram of an optical system and an electronic apparatus according to an embodiment of the invention;

FIG. 176 is a schematic diagram of the optical system and the electronic apparatus according to an embodiment of the invention;

FIG. 177 is a schematic diagram of an optical device according to an embodiment of the invention:

FIG. 178 is a schematic diagram of the optical device according to an embodiment of the invention:

FIG. 179 is a schematic diagram of the optical device according to an embodiment of the invention:

FIG. 180 is a schematic diagram of an optical device according to another embodiment of the invention:

FIG. 181 is a schematic diagram of an optical device according to another embodiment of the invention;

FIG. 182 is a schematic diagram of an optical device according to another embodiment of the invention;

FIG. 183 is a schematic diagram of the optical device according to another embodiment of the invention;

FIG. 184 is a schematic diagram of a first optical module, a second optical module, and a third optical module affixed to a fixed frame according to some embodiments of the invention:

FIG. 185 is a schematic diagram of an optical system and an electronic apparatus according to an embodiment of the invention;

FIG. 186 is a schematic diagram of the optical system and the electronic apparatus according to an embodiment of the invention;

FIG. 187 is a schematic diagram of an optical device according to an embodiment of the invention:

FIG. 188 is a schematic diagram of the optical device according to an embodiment of the invention:

FIG. 189 is a schematic diagram of the optical device according to an embodiment of the invention:

FIG. 190 is a schematic diagram of an optical device according to another embodiment of the invention:

FIG. 191 is a schematic diagram of an optical device according to another embodiment of the invention:

FIG. 192 is a schematic diagram of an optical device according to another embodiment of the invention:

FIG. 193 is a schematic diagram of the optical device according to another embodiment of the invention;

FIG. 194 is a schematic diagram of a first optical module, a second optical module, and a third optical module affixed to a fixed frame according to some embodiments of the invention:

FIG. 195 is a schematic diagram of an electronic apparatus according to an embodiment of the invention; and FIG. 196 is a schematic diagram of an optical system according to an embodiment of the invention.

DETAILED DESCRIPTION OF INVENTION

The making and using of the embodiments of the optical system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
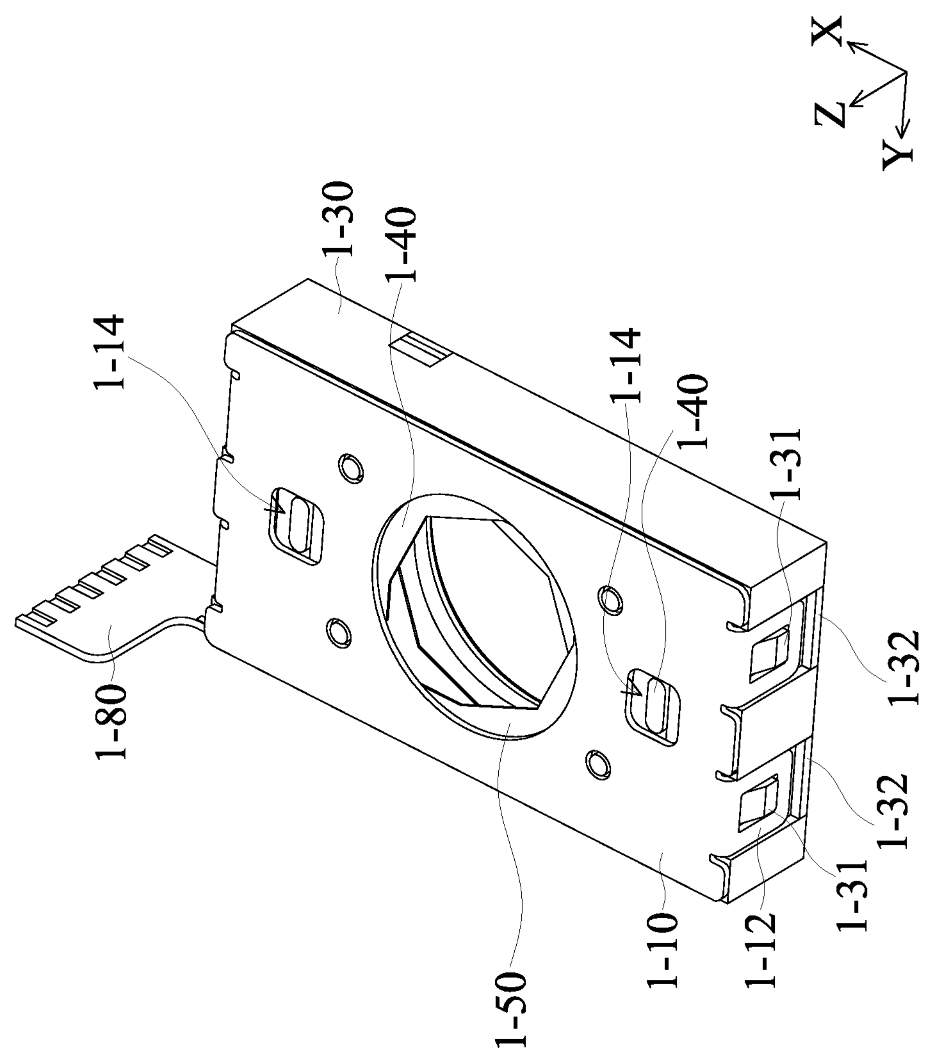
FIG. 1 is a schematic view of an optical element driving mechanism in some embodiments of the present disclosure.
Figure 2:
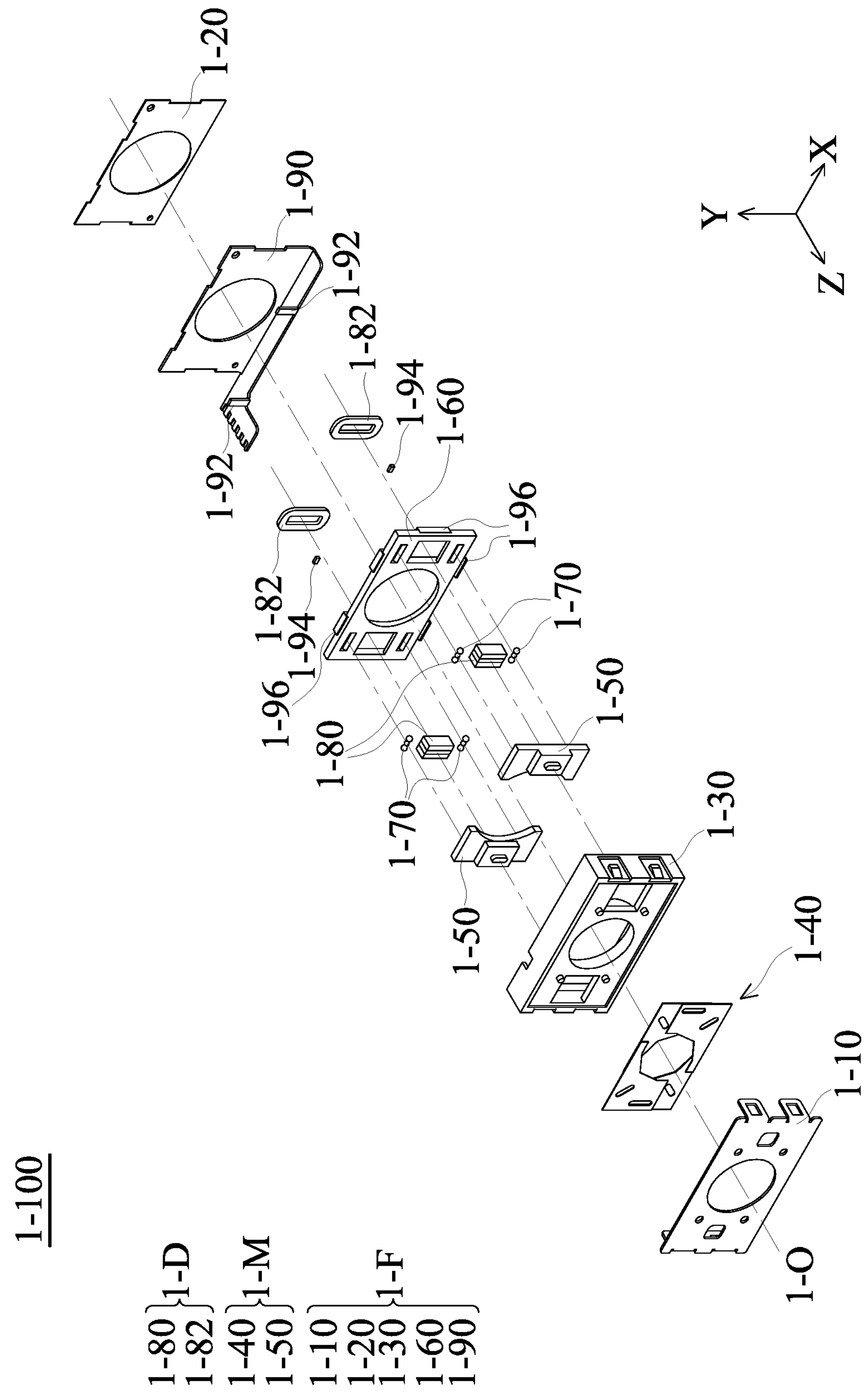
FIG. 2 is an exploded view of the optical element driving mechanism.
Figure 3:
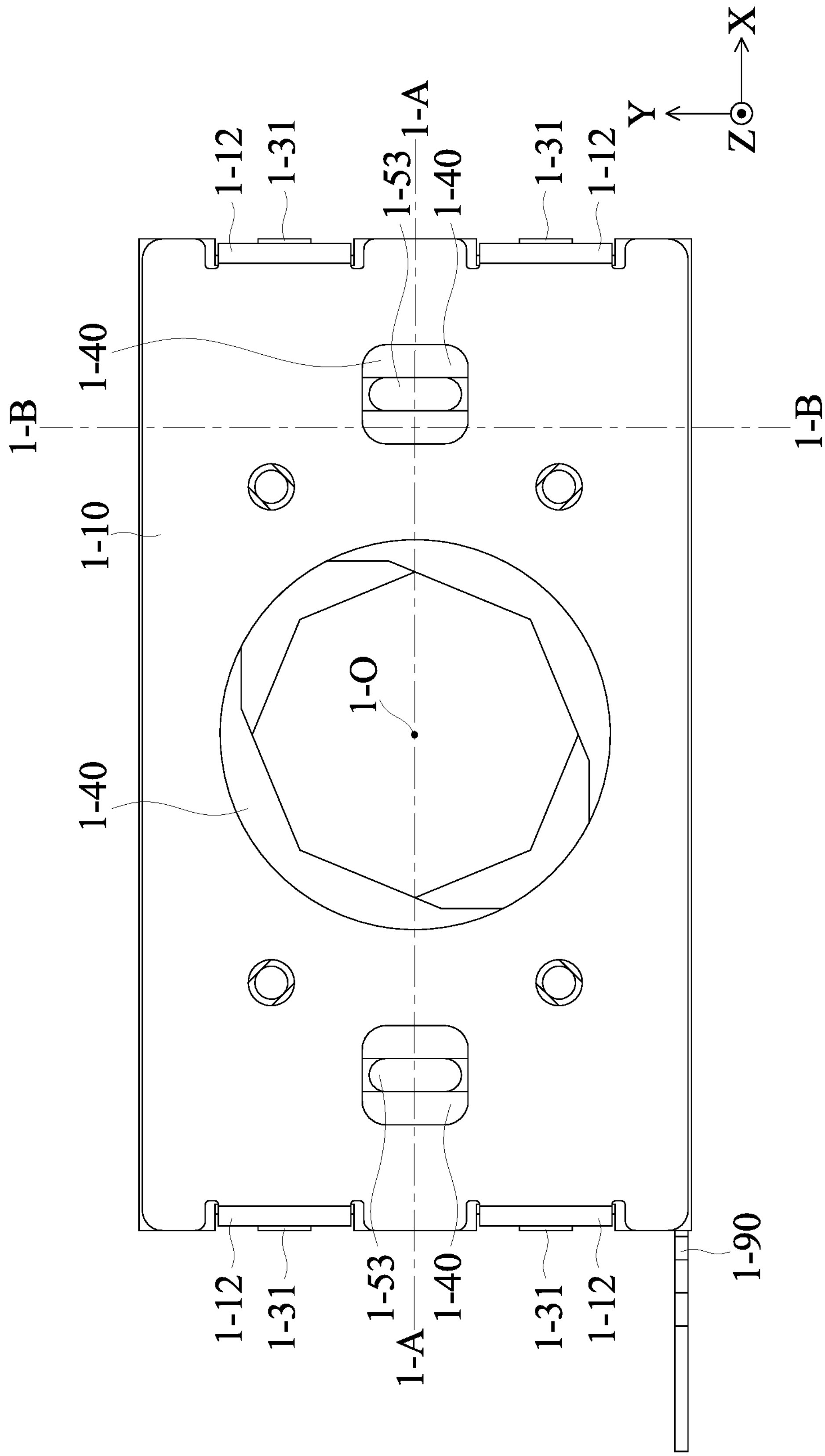
FIG. 3 is a top view of the optical element driving mechanism.
Figure 4A:
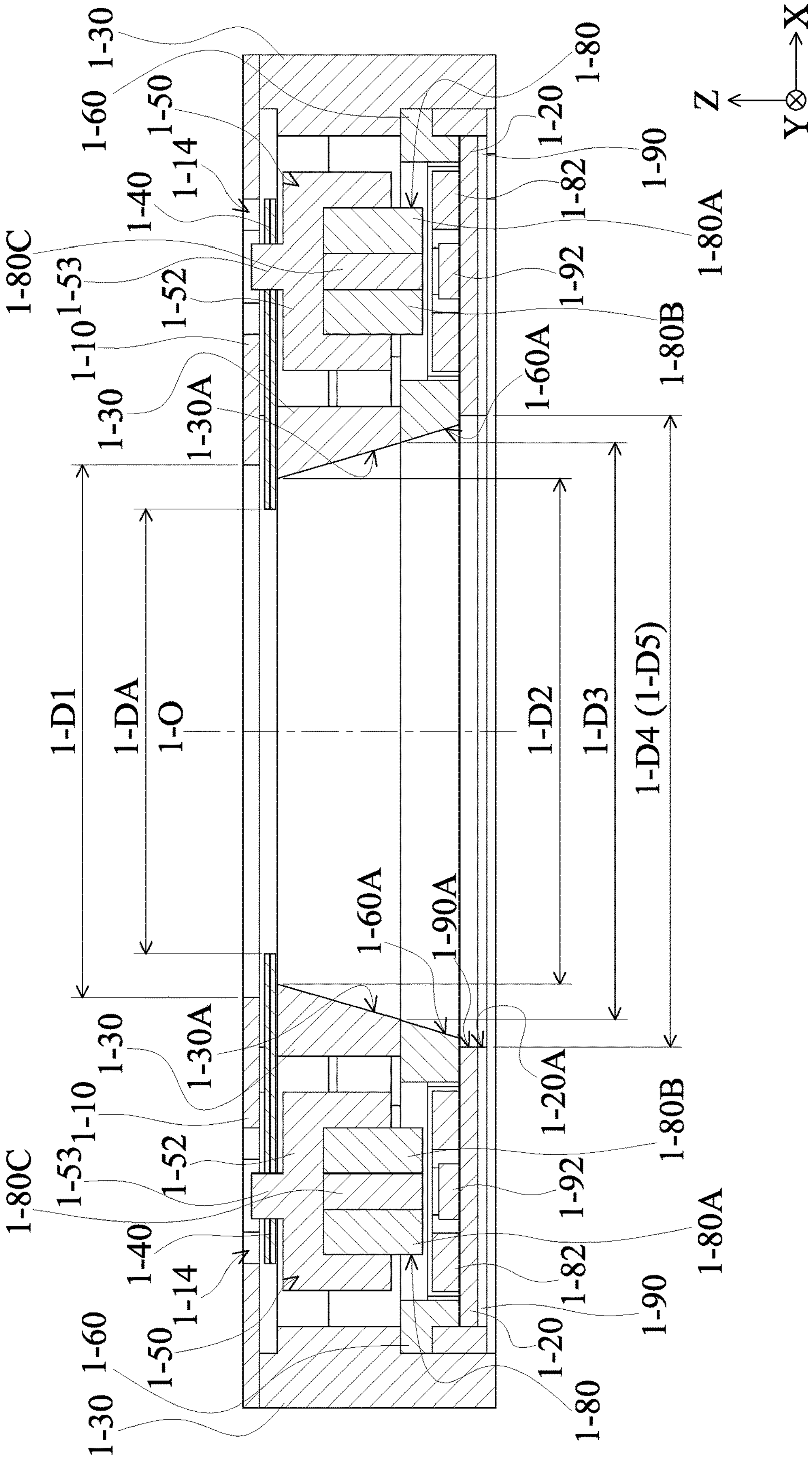
FIG. 4A is a cross-sectional view illustrated along line 1-A-1-A in FIG. 3.
Figure 4B:
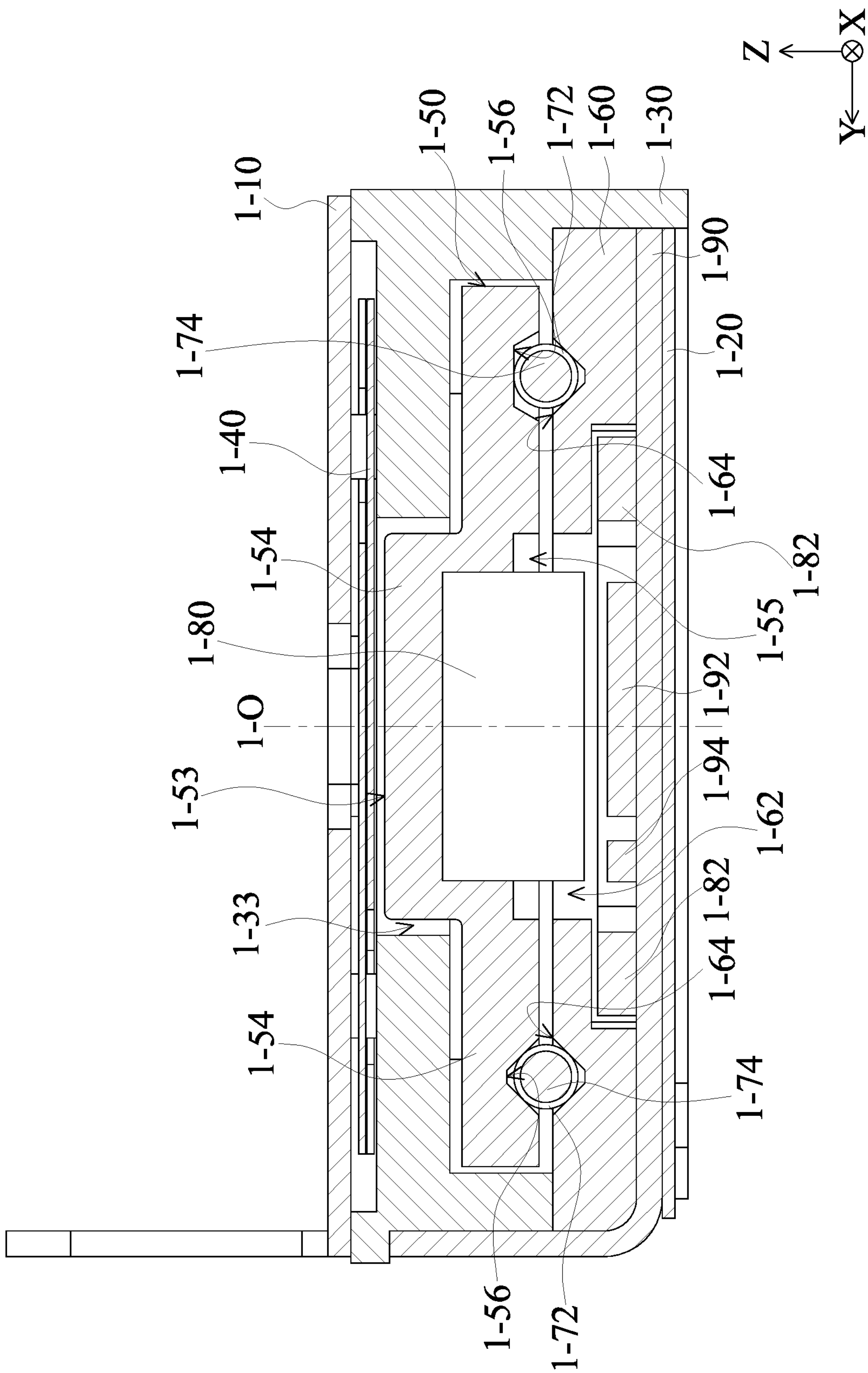
FIG. 4B is a cross-sectional view illustrated along line 1-B-1-B in FIG. 3.

Refer to FIG. 1 to FIG. 4B. FIG. 1 is a schematic view of the optical element driving mechanism 1-100 in some embodiments of the present disclosure. FIG. 2 is an exploded view of the optical element driving mechanism. FIG. 3 is a top view of the optical element driving mechanism 1-100. FIG. 4A is a cross-sectional view illustrated along line 1-A-1-A in FIG. 3. FIG. 4B is a cross-sectional view illustrated along line 1-B-1-B in FIG. 3.

For example, the optical element driving mechanism 1-100 may be an aperture or a shutter, and may mainly include a case 1-10, a bottom plate 1-20, a frame 1-30, a blade assembly 1-40, a transmission element 1-50, a base 1-60, a support assembly 1-70, a magnetic element 1-80, a coil 1-82, a circuit board 1-90, an electronic assembly 1-92, a sensor 1-94, and binding elements 1-96.

In some embodiments, the case 1-10, the bottom plate 1-20, the frame 1-30, the base 1-60, the circuit board 1-90 may be called as a fixed portion 1-F. The blade assembly 1-40 and the transmission element 1-50 may be called as a movable portion 1-M which is movable relative to the fixed portion 1-F. The magnetic element 1-80 and the coil 1-82 may be called as a driving assembly 1-D used for driving the transmission element 1-50 to move relative to the fixed portion 1-F.

The frame 1-30 may be disposed between the case 1-10 and the bottom plate 1-20, and the blade assembly 1-40 may be disposed on the frame 1-30. The transmission element 1-50 may be disposed on the blade assembly 1-40 and passes through the case 1-10, the frame 1-30, and the base 1-60. The support assembly 1-70 may be disposed on the transmission element 1-50 and used for bringing the transmission element 1-50 to move relative to the fixed portion 1-F.

The magnetic element 1-80 may be disposed on the transmission element 1-50, and may move with the transmission element 1-50. The coil 1-82 may be disposed on the base 1-60. An electromagnetic force may be generated between the coil 1-82 and the magnetic element 1-80 when current is provided to the coil 1-82. The transmission element 1-50 (and the blade assembly 1-40 disposed thereon) may be moved by the electromagnetic force. In some embodiments, the position of the magnetic element 1-80 and the coil 1-82 are interchangeable.

The electronic assembly 1-92 and the sensor 1-94 may be disposed in the coil 1-82 to detect the position of the magnetic element 1-80 relative to the fixed portion 1-F to control the optical element driving mechanism 1-100. The sensor 1-94 or the sensor in the electronic assembly 1-92 may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

In some embodiments, the circuit on the circuit board 1-90 is electrically connected to other electronic elements disposed inside or outside the optical element driving mechanism 1-100, so the optical element driving mechanism 1-100 may be controlled.

In some embodiments, as shown in FIG. 1 and FIG. 3, the case 1-10 may include a first binding portion 1-12, and the frame 1-30 may include a second binding portion 1-31. The first binding portion 1-12 has an opening, and the second binding portion 1-31 may be disposed in the opening to fix the relative position between the case 1-10 and the frame 1-30. In other words, when viewed along the main axis 1-O, at least a portion of the second binding portion 1-31 is exposed from the case 1-10.

As shown in FIG. 4A, the case 1-10 includes a first opening surface 1-10A, the frame 1-30 includes a second opening surface 1-30A, the base 1-60 includes a third opening surface 1-60A, the circuit board 1-90 includes a fourth opening surface 1-90A, the bottom plate 1-20 includes a fifth opening surface 1-20A, used for defining a first opening, a second opening, a third opening, a fourth opening, a fifth opening, respectively. For example, the openings may be defined as the area surrounded by the opening surfaces.

The first opening surface 1-10A, the second opening surface 1-30A, the third opening surface 1-60A, the fourth opening surface 1-90A, and the fifth opening surface 1-20A face the main axis 1-O. In some embodiments, the first opening surface 1-10A is parallel to the main axis 1-O, the second opening surface 1-30A is not parallel to the main axis 1-O, the third opening surface 1-60A is not parallel to the main axis 1-O, the fourth opening surface 1-90A is parallel to the main axis 1-O, and the fifth opening surface 1-20A is parallel to the main axis 1-O. As shown in FIG. 4A, when viewed in a first direction (the Y direction), the first opening surface 1-10A is not parallel to the second opening surface 60A. In some embodiments, the third opening surface 1-30A and the fourth opening surface 60A extend continuously and form a tapered surface to control the light path passing through the optical element driving mechanism 1-100.

The minimum diameters of the first opening, the second opening, the third opening, the fourth opening, and the fifth opening are 1-D1, 1-D2, 1-D3, 1-1D4, 1-D5, respectively. The first opening, the second opening, the third opening, the fourth opening, and the fifth opening are used for allowing light to pass through. It should be noted that the first opening is closer to a light incident position (such as the position close to the case 1-10 at the top of FIG. 4A) than the second opening. The second opening is closer to the light incident position than the third opening. The third opening is closer to the light incident position than the fourth opening. The fourth opening is closer to the light incident position than the fifth opening. The main axis 1-O passes through the first opening, the second opening, the third opening, the fourth opening, the fifth opening sequentially.

It should be noted that the minimum diameter 1-D1 of the first opening is greater than the minimum diameter 1-D2 of the second opening. The minimum diameter 1-D2 of the second opening is less than the minimum diameter 1-D3 of the third opening. The minimum diameter 1-D3 of the third opening is less than the minimum diameter 1-D4 of the fourth opening. The minimum diameter 1-D4 of the fourth opening is less than the minimum diameter 1-D5 of the fifth opening. The minimum diameter 1-D1 of the first opening is less than the minimum diameter 1-D3 of the third opening. In some embodiments, the minimum diameter 1-D4 of the fourth opening may be equal to the minimum diameter 1-D5 of the fifth opening.

The case 1-10 may include an opening 1-14, and a portion of the transmission element 1-50 may be disposed in the opening 1-14 to pass through the blade assembly 1-40. The magnetic element 1-80 may include a first magnetic element 1-80A, a second magnetic element 1-80B, and a separating element 1-80C. The first magnetic element 1-80 and the second magnetic element 1-80B may be magnets having different magnetic pole directions, such as opposite directions. The separating element 1-80C may separate the first magnetic element 1-80A and the second magnetic element 1-80B.

In some embodiments, as shown in FIG. 4A, the top surface of the electronic assembly 1-92 may be lower than the top surface of the coil 1-82. In other words, the distance between the top surface of the electronic assembly 1-92 and the magnetic element 80 is longer than the distance between the top surface of the coil 1-82 and the magnetic element 1-80. Therefore, collision of the electronic assembly 1-92 may be prevented.

Figure 5A:
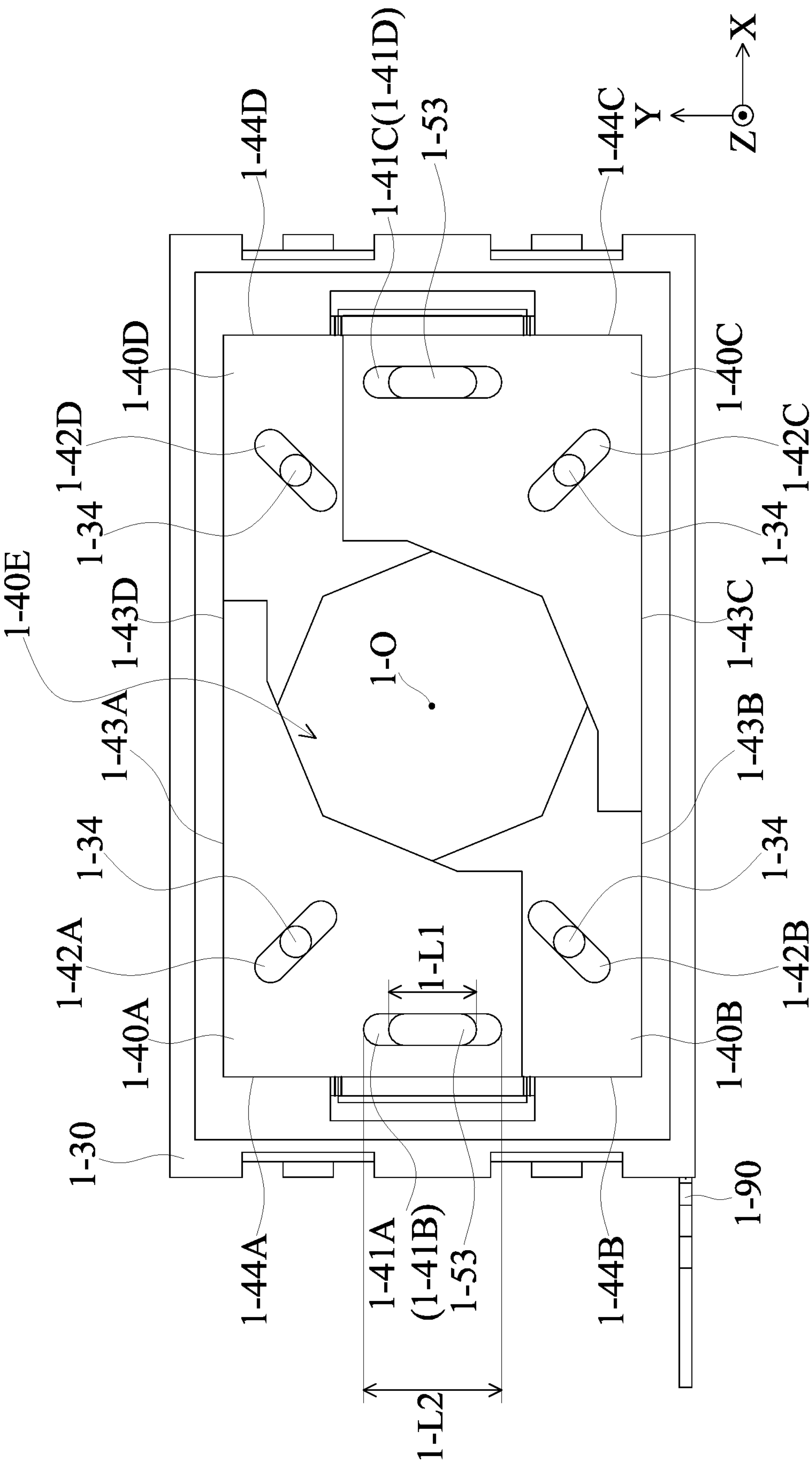
FIG. 5A is a schematic view of the optical element driving mechanism, wherein the case is omitted.

FIG. 5A is a schematic view of the optical element driving mechanism 1-100 when the case 1-10 is omitted. As shown in FIG. 5A, the first blade assembly 1-40 may include a first blade 1-40A, a second blade 1-40B, a third blade 1-40C, and a fourth blade 1-40D. The first blade 1-40A, the second blade 1-40B, the third blade 1-40C, and the fourth blade 1-40D form an aperture opening 1-40E that allows the light to pass through the optical element driving mechanism 1-100. The first blade 1-40A includes a first blade opening 1-41A, the second blade 1-40B includes a second blade opening 1-41B, the third blade 1-40C includes a third blade opening 1-41C, and the fourth blade 1-40D includes a fourth blade opening 1-41D. The openings extend in the Y direction.

A connecting portion 1-53 of one of the transmission elements 1-50 passing through the first blade opening 1-41A and the second blade opening 1-41B, and the connecting portion 1-53 of another transmission elements 1-50 passing through the third blade opening 1-41C and the fourth blade opening 1-41D. In some embodiments, the first blade opening 1-41A overlaps the entire second blade opening 1-41B, and the third blade opening 1-41C overlaps the entire fourth blade opening 1-41D. For example, the openings may have an identical length 1-L2, the connecting portion 1-53 includes a length 1-L1, and the length 1-L1 is less than the length 1-L2. Therefore, the transmission element 1-50 may move in the blade openings relative to the blades through the connecting portion 1-53.

Moreover, the blades may include guiding openings extending to the main axis 1-O. For example, the first blade 1-40A includes a first guiding opening 1-42A, the second blade 1-40B includes a second guiding opening 1-42B, the third blade 1-40C includes a third guiding opening 1-42C, the fourth blade 1-40D includes a fourth guiding opening 1-42D. The guiding element 1-34 of the frame 1-30 may be disposed in the first guiding opening 1-42A, the second guiding opening 1-42B, the third guiding opening 1-42C, and the fourth guiding opening 1-42D to guide the movement directions of the first blade 1-40A, the second blade 1-40B, the third blade 140C, and the fourth blade 1-40D relative to the fixed portion 1-F.

The first guiding opening 1-42A, the second guiding opening 1-42B, the third guiding opening 1-42C, and the fourth guiding opening 1-42D extend in different directions, so the first blade 1-40A, the second blade 1-40B, the third blade 1-40C, and the fourth blade 1-40D may move in different directions. For example, the first guiding opening 1-42A and the third guiding opening 1-42C extend in opposite directions, and the second guiding opening 1-42B and the fourth guiding opening 1-42D extend in opposite directions. In other words, the first blade 1-40A and the third blade 1-40C move in opposite directions, and the second blade 1-40B and the fourth blade 1-40D extend in opposite directions.

Furthermore, as shown in FIG. 5A, the first blade 1-40A may include a side 1-43A and a side 1-44A, the second blade 1-40B may include a side 1-43B and a side 1-44B, the third blade 1-40C may include a side 1-43C and a side 1-44C, and the fourth blade 1-40 may include a side 1-43C and a side 1-44D. The sides 1-43A, 1-43B, 1-43C, and 1-43D may extend in a first direction (the X direction), the sides 1-44A, 1-44B, 1-44C, 1-44D may extend in a second direction (the Y direction), and the first direction and the second direction are different (e.g. perpendicular to each other).

When the blade assembly 1-40 of the optical element driving mechanism 1-100 is operating, the side 1-43A substantially overlaps the side 1-43D, the side 1-43B substantially overlaps the side 1-43C, the side 1-44A substantially overlaps the side 1-44B, and the side 1-44C substantially overlaps the side 1-44D. Therefore, the amount of movement of the blades in different directions may be substantially identical, and the shape of the aperture opening 1-40E may be maintained.

In some embodiments, the first blade 1-40A, the second blade 1-40B, the third blade 1-40C, and the fourth blade 1-40D may be plate-shaped. The first blade 1-40A and the third blade 1-40C may substantially be positioned on the same plane, and the second blade 1-40B and the fourth blade 1-40D may substantially be positioned on the same plane. In the top view, both of the first blade 1-40A and the third blade 1-40C cover a portion of the second blade 1-40B and the fourth blade 1-40D.

Figure 5B:
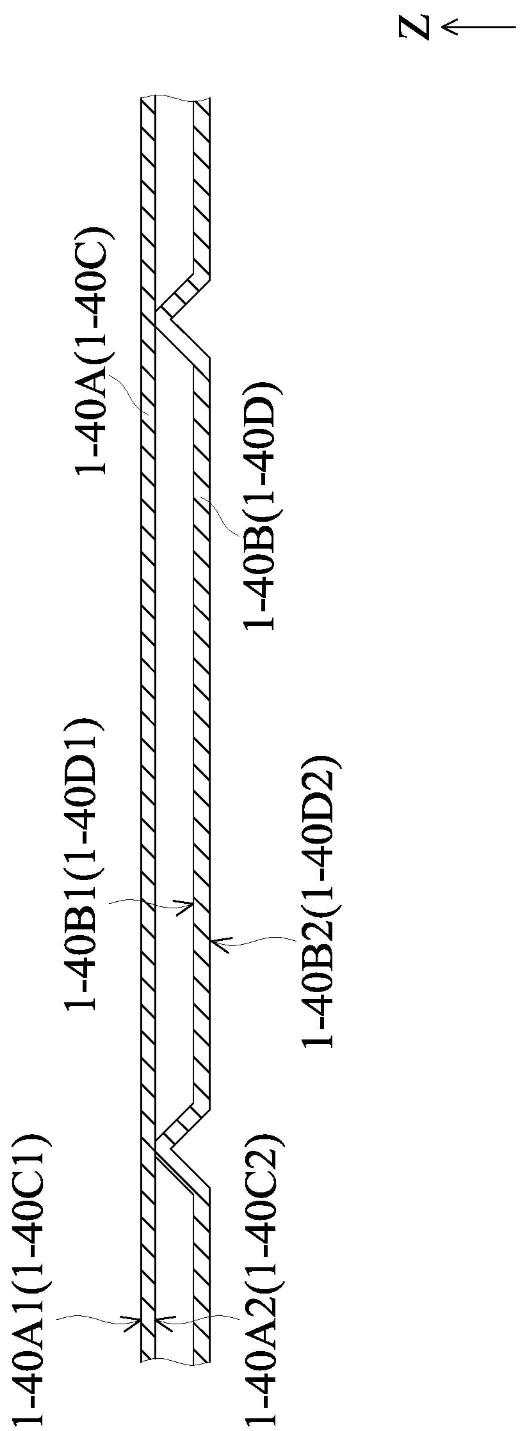
FIG. 5B is a cross-sectional view of a first blade, a second blade, a third blade, and a fourth blade.

FIG. 5B is a cross-sectional view of the first blade 1-40A, the second blade 1-40B, the third blade 1-40C, and the fourth blade 1-40D. The first blade 1-40A includes a top surface 1-40A1 and a bottom surface 1-40A2, the second blade 1-40B includes a top surface 1-40B1 and a bottom surface 1-40B2, the third blade 1-40C includes a top surface 1-40C 1 and a bottom surface 1-40C2, and the fourth blade 1-40D includes a top surface 1-40D1 and a bottom surface 1-40D2. The roughness of the top surface 1-40A1 and the bottom surface 1-40A2 are different, the roughness of the top surface 1-40B1 and the bottom surface 1-40B2 are different, the roughness of the top surface 1-40C1 and the bottom surface 1-40C2 are different, the roughness of the top surface 1-40D1 and the bottom surface 1-40D2 are different. For example, the roughness of the top surface 1-40A1 may be less than the roughness of the bottom surface 1-40A2, the roughness of the top surface 1-40B1 may be less than the roughness of the bottom surface 1-40B2, the roughness of the top surface 1-40C1 may be less than the roughness of the bottom surface 1-40C2, and the roughness of the top surface 1-40D1 may be less than the roughness of the bottom surface 1-40D2. In other words, the reflectivity of the top surface 1-40A1 may be higher than the reflectivity of the bottom surface 1-40A2, the reflectivity of the top surface 1-40B1 may be higher than the reflectivity of the bottom surface 1-40B2, the reflectivity of the top surface 1-40C1 may be higher than the reflectivity of the bottom surface 1-40C2, and the reflectivity of the top surface 1-40D1 may be higher than the reflectivity of the bottom surface 1-40D2. Therefore, noise light may be prevented from being generated.

The first blade 1-40A and the third blade 1-40C may in contact with the second blade 1-40B and the fourth blade 1-40D by point contact to reduce the contact area and friction. For example, the second blade 1-40B and the fourth blade 1-40D may have points recessed toward the first blade 1-40A and the third blade 1-40C, and the second blade 1-40B and the fourth blade 1-40D are in contact with the first blade 1-40A and the third blade 1-40C through the recessed points. The surfaces of the second blade 1-40B and the fourth blade 1-40D are separated from the surfaces of the first blade 1-40A and the third blade 1-40C. For example, the distance from the bottom surface 1-40A2 or the bottom surface 1-40C2 to the top surface 1-40B1 or the top surface 1-40D1 is greater than zero. However, the present disclosure is not limited thereto. The first blade 1-40A and the third blade 1-40C may also have points that are recessed to the second blade 1-40B and the fourth blade 1-40D, depending on design requirements. In some embodiments, the number of recessed points on each blade may be greater than three (three points form a plane).

Figure 6:
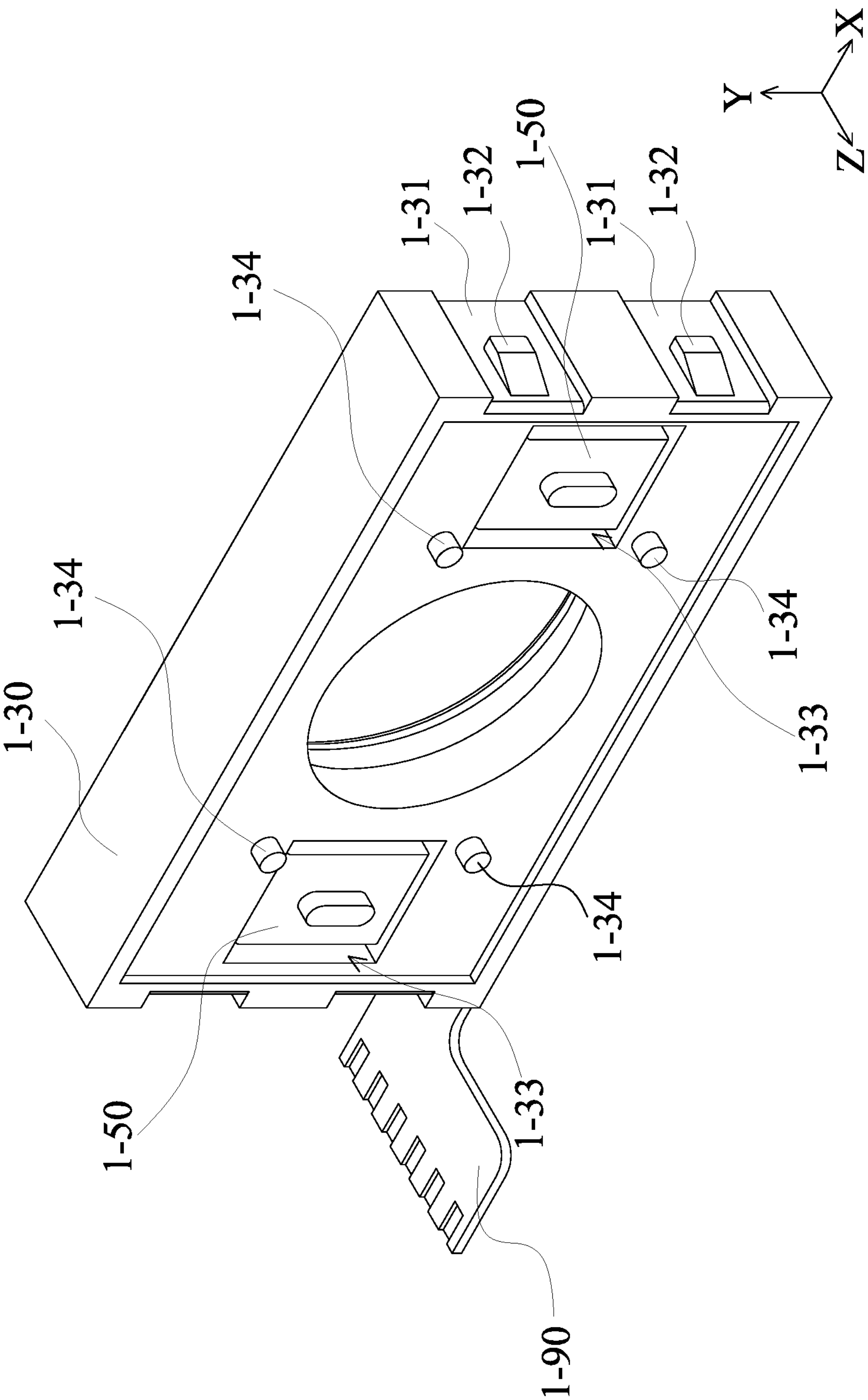
FIG. 6 is a schematic view of some elements of the optical element driving mechanism.

FIG. 6 is a schematic view of some elements of the optical element driving mechanism 1-100, wherein the case 1-10 and the blade assembly 1-40 are omitted. The frame 1-30 may include an opening 1-33 used for accommodating the transmission element 1-50. It should be noted that in the X direction, the size of the opening 1-33 may be greater than the size of the transmission element 1-50, so the transmission element 1-50 may move in the X direction relative to the frame 1-30.

Figure 7A:
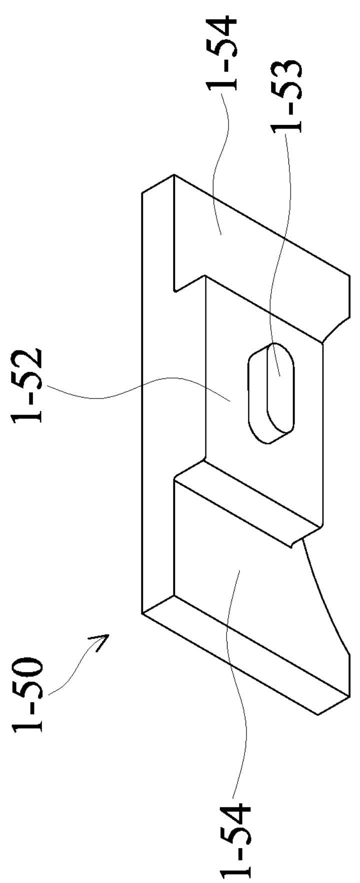
FIG. 7A and FIG. 7B are schematic views of the transmission viewed in different directions.
Figure 7B:
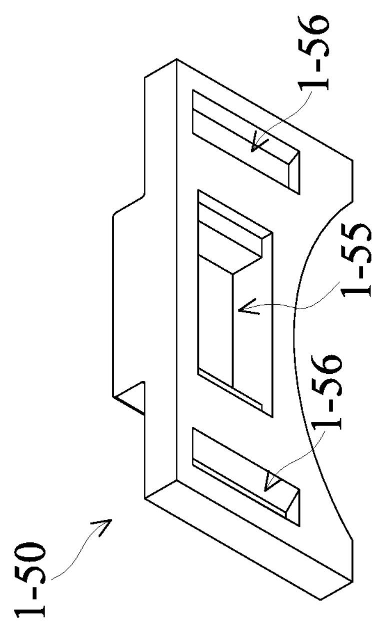

FIG. 7A and FIG. 7B are schematic views of the transmission element 1-50 when viewed in different directions. The transmission element 1-50 may include a main body 1-52, a connecting portion 1-53, extending portions 1-54, a first recess 1-55, and second recesses 1-56. The connecting portion 1-53 may extend from the main body 1-52 in the Z direction, and the extending portions 1-54 may extend from the main body 1-52 in the X direction. The first recess 1-55 may overlap the main body 1-52, and the second recesses may overlap the extending portions 1-54.

As shown in FIG. 4B, the magnetic element 1-80 may be disposed in the first recesses 1-55, and the first recess 1-55 may have a stepped shape in the cross-sectional view. Therefore, adhesive material (e.g. glue) may be disposed between the magnetic element 1-80 and the first recess 1-55 to affix the magnetic element 1-80 and the transmission element 1-50. It should be noted that the transmission element 1-50 is not in direct contact with the case 1-10, the frame 1-30, or the base 1-60 in the X direction, reducing friction.

Figure 8:
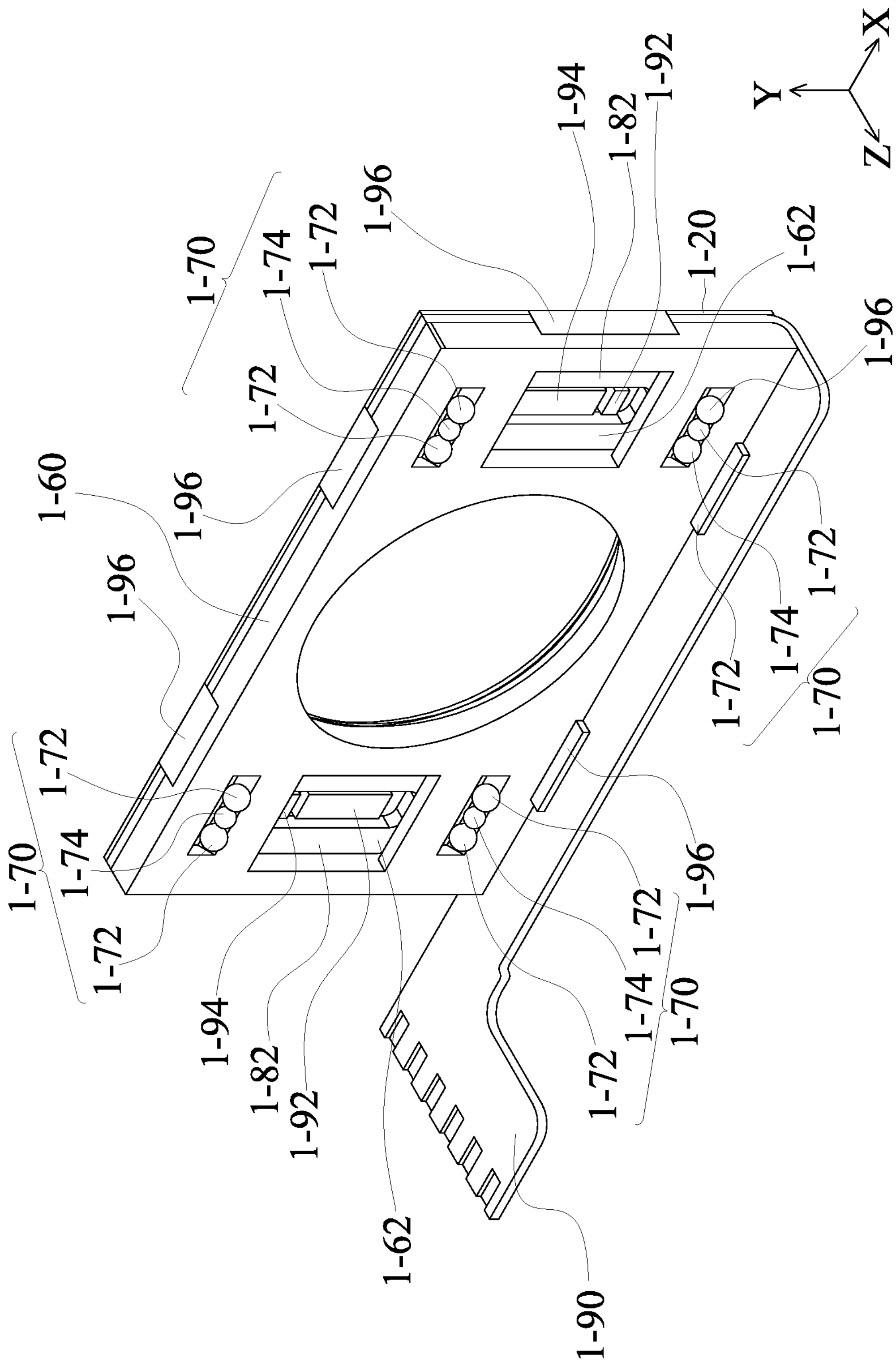
FIG. 8 is a schematic view of some elements of the optical element driving mechanism.

FIG. 8 is a schematic view of some elements of the optical element driving mechanism 1-100, wherein the frame 1-30 and the transmission elements 1-50 are omitted when compared with FIG. 6. The support assembly 1-70 may include two first support elements 1-72 and one second support element 1-74. The first support element 1-72 and the second support element 1-74 may be spherical, the diameter of the second support element 1-74 may be less than the diameter of the first support element 1-72, and may be disposed between the two first support elements 1-72 to reduce the friction when the first support elements 1-72 are rolling.

As shown in FIG. 4B and FIG. 8, a portion of the support assembly 1-70 may be disposed in the recess 1-64 of the base 1-60, and a portion of the support assembly 1-70 may be disposed in the second recess 1-56 to reduce the friction between the transmission element 1-50 and the base 1-60. Therefore, the transmission 1-50 may move relative to the base 1-60 more easily. However, the present disclosure is not limited thereto. Other support assembly with other configurations also may be applied, depending on design requirements.

As shown in FIG. 4B and FIG. 8, the base 1-60 may have a base opening 1-62, and the transmission element 1-50 and the magnetic element 1-80 disposed on the transmission element 1-50 may be disposed in the base opening 1-62. In FIG. 8, at least a portion of the coil 1-82, the electronic assembly 1-92, and the sensor 1-94 is exposed from the base opening 1-62 to interact with the magnetic field of the magnetic element 1-80. For example, an electromagnetic force may be generated, or variations in the magnetic field may be detected.

As shown in FIG. 8, the base 1-60, the circuit board 1-90, and the bottom plate 1-20 may be combined using binding elements 1-96. The binding elements 1-96 may be glue, and may be disposed at the sides of the base 1-60, the circuit board 1-90, and the bottom plate 1-20, such as disposed on all of the four sides. Different number of binding elements 1-96 may be provided on different sides of the base 1-60, the circuit board 1-90, and the bottom plate 1-20.

Figure 9A:
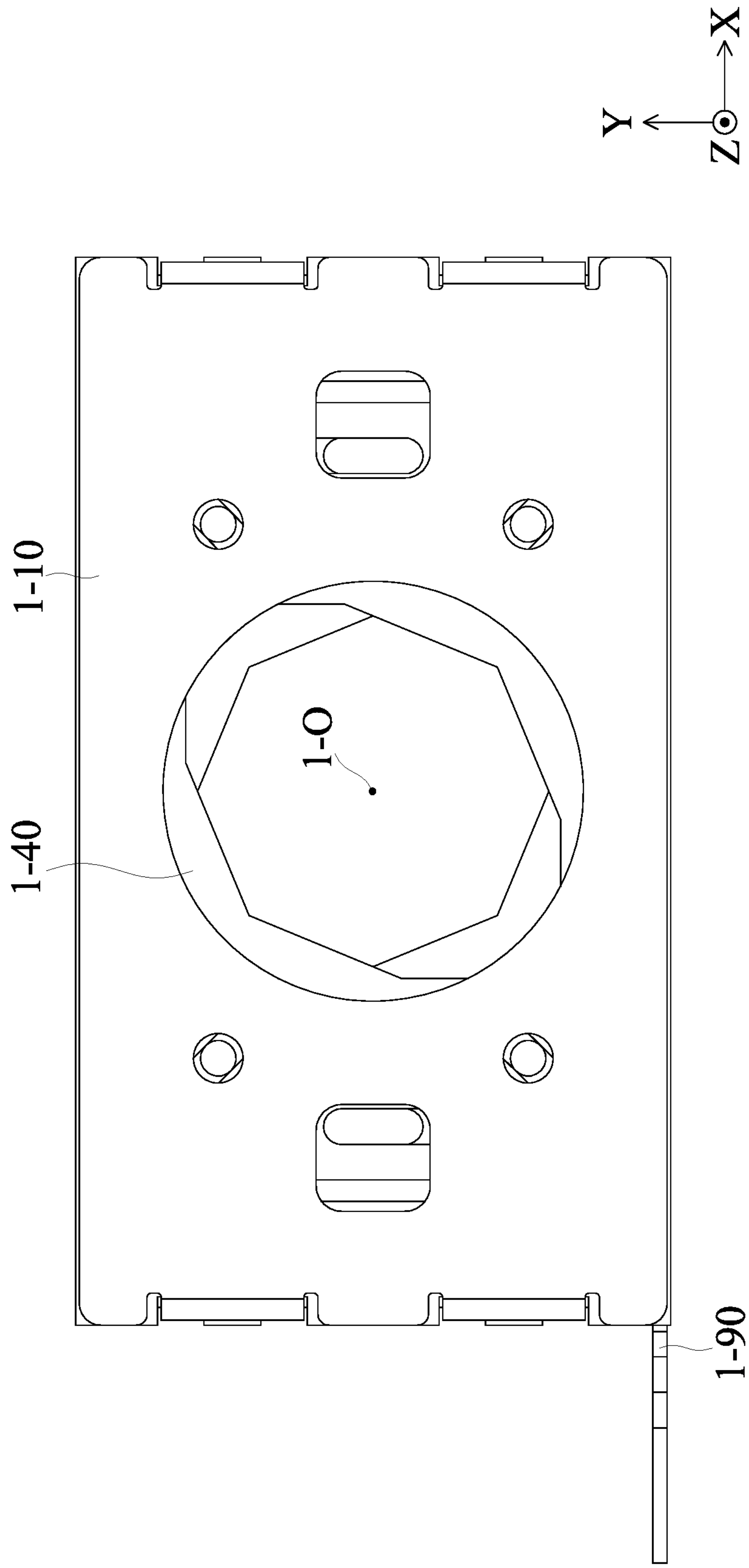
FIG. 9A is a top view of the optical element driving mechanism when the blade assembly is closed.
Figure 9B:
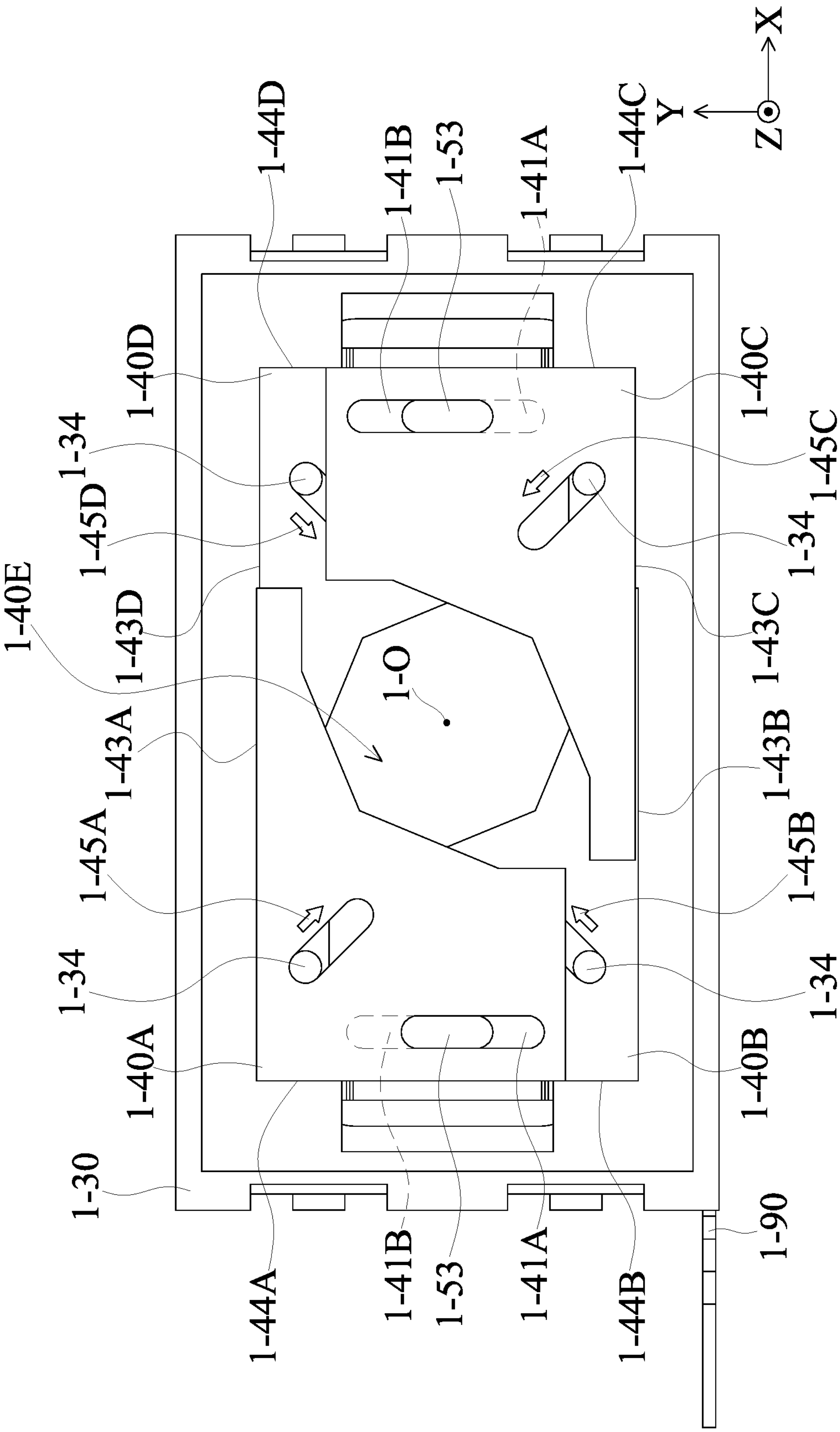
FIG. 9B is a schematic of FIG. 9A, wherein the case is omitted.

FIG. 9A is a top view of the optical element driving mechanism 1-100 when the blade assembly 1-40 is closed. FIG. 9B is a schematic view of FIG. 9A, wherein the case 1-10 is omitted. The first blade 1-40A, the second blade 1-40B, the third blade 1-40C, and the fourth blade 1-40D respectively move toward directions 1-45A, 1-45B, 1-45C, and 1-45D, as shown in the arrows in FIG. 9B. It should be noted that the two transmission elements 1-50 move in directions toward the main axis 1-O (i.e. move close to each other) to drive the blades. Therefore, the aperture opening 1-40E may shrink, so the size of the aperture formed by the optical element driving mechanism 1-100 may be adjusted.

Figure 9C:
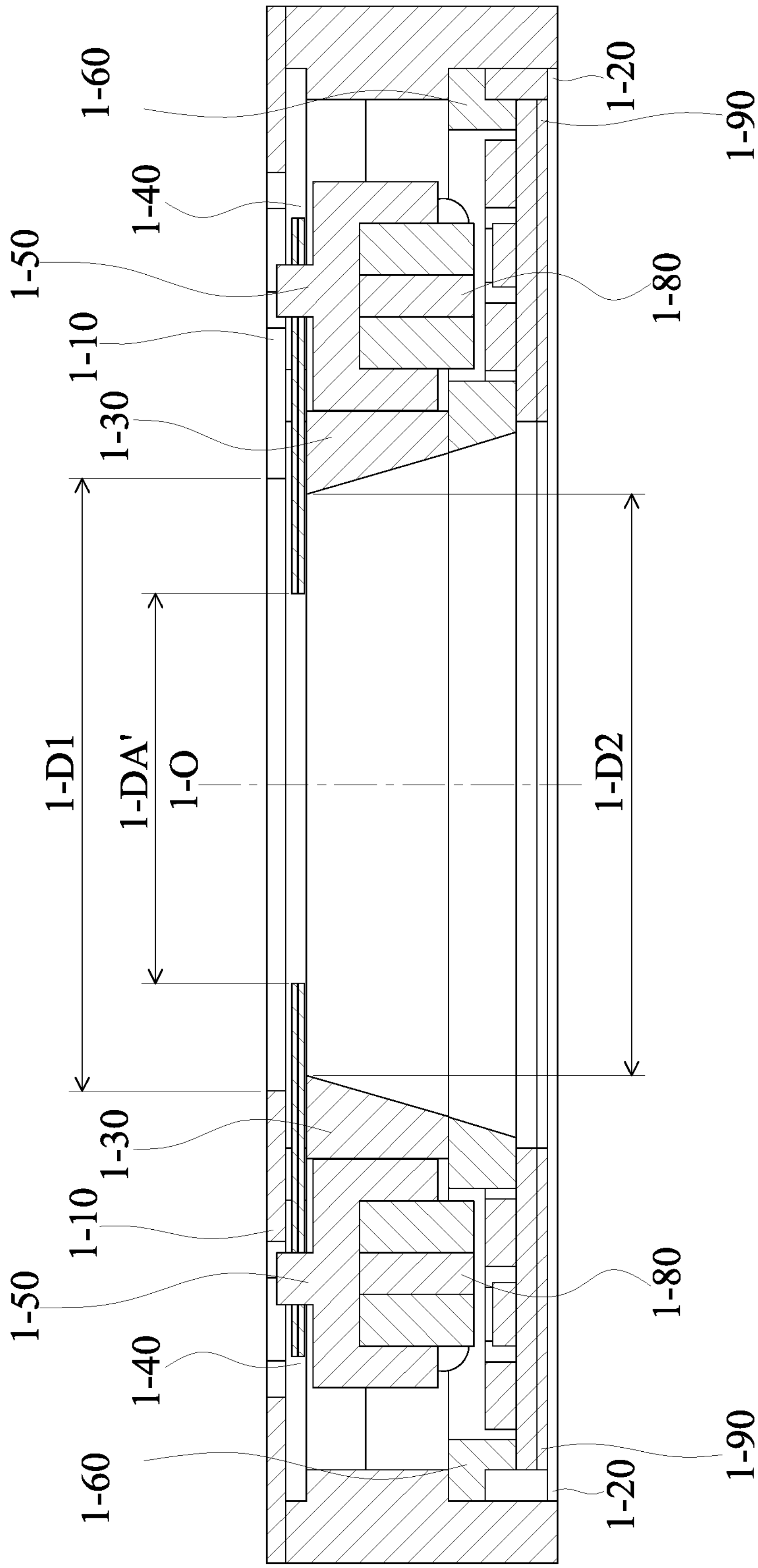
FIG. 9C is a cross-sectional view of FIG. 9A.

FIG. 9C is a cross-sectional view of FIG. 9A. As shown in FIG. 9C, the aperture opening 1-40E has a minimum diameter of 1-DA', which is less than the minimum diameter 1-D1 of the first opening and the minimum diameter 1-D2 of the second opening. In other words, the size of the aperture formed by the optical element driving mechanism 1-100 may be defined as the minimum diameter 1-DA' of the aperture opening 1-40E. In some embodiments, the minimum diameter 1-DA' may equal to zero, and the optical element driving mechanism 1-100 may act as a shutter in this condition.

Figure 10A:
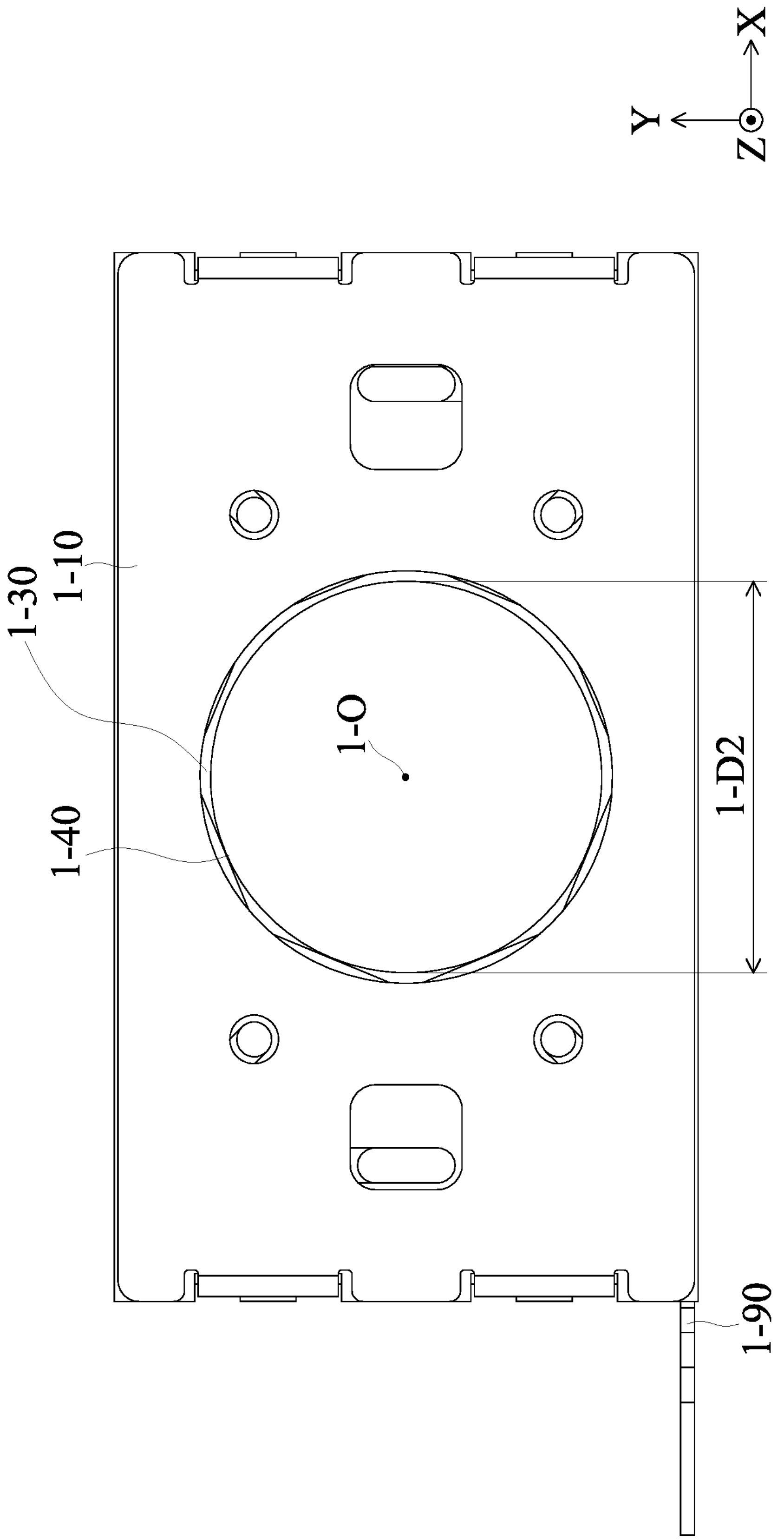
FIG. 10A is a top view of the optical element driving mechanism when the blade assembly is opened.
Figure 10B:
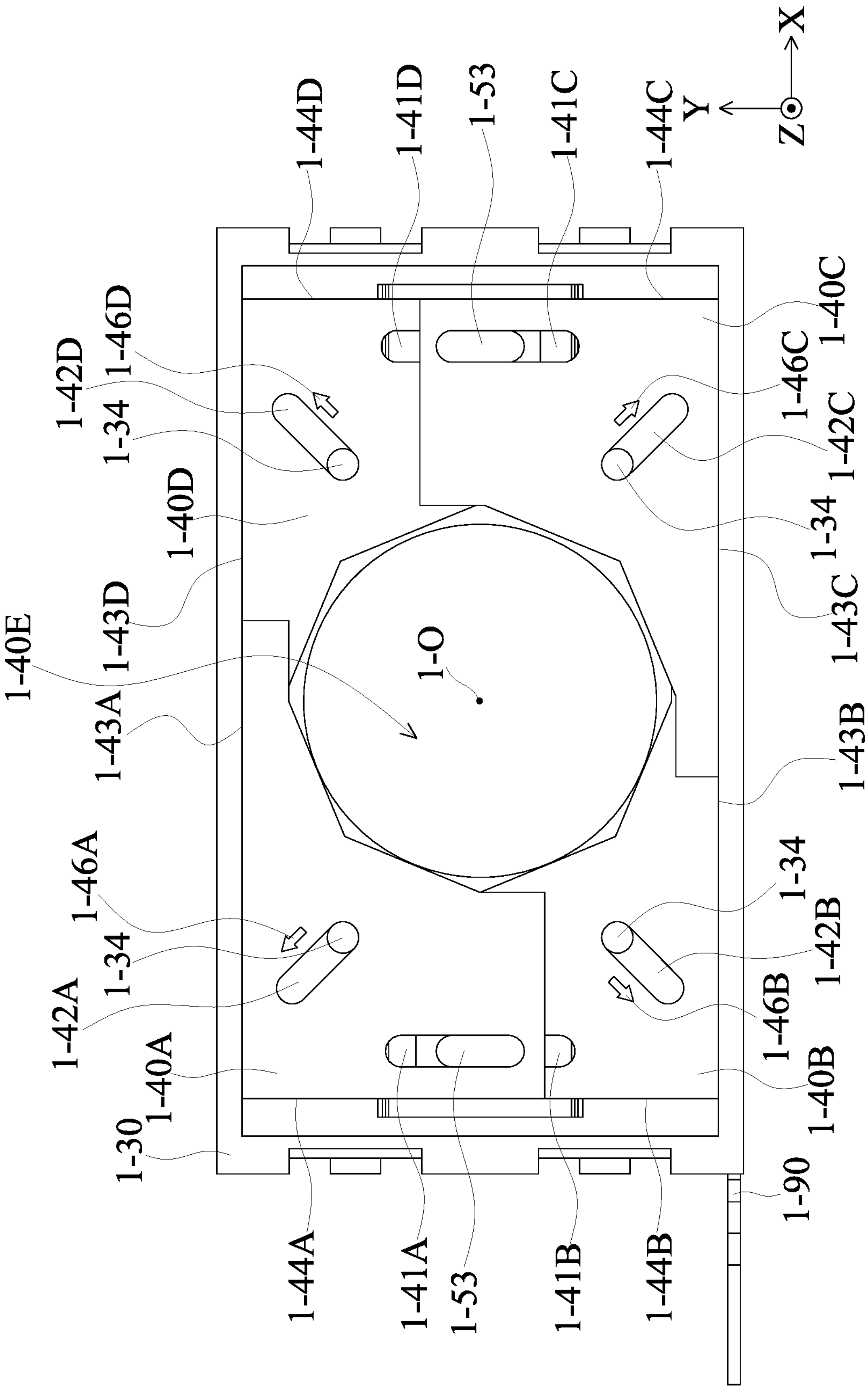
FIG. 10B is a schematic of FIG. 10A, wherein the case is omitted.

FIG. 10A is a top view of the optical element driving mechanism 1-100 when the blade assembly 1-40 is opened. FIG. 10B is a schematic view of FIG. 10A, wherein the case 1-10 is omitted. The first blade 1-40A, the second blade 1-40B, the third blade 1-40C, and the fourth blade 1-40D respectively move toward directions 1-46A, 1-46B, 1-46C, and 1-46D, as shown in the arrows in FIG. 10B. It should be noted that the two transmission elements 1-50 move in directions away from the main axis 1-O (i.e. move away to each other) to drive the blades. Therefore, the aperture opening 1-40E may enlarge, so the size of the aperture formed by the optical element driving mechanism 1-100 may be adjusted.

Figure 10C:
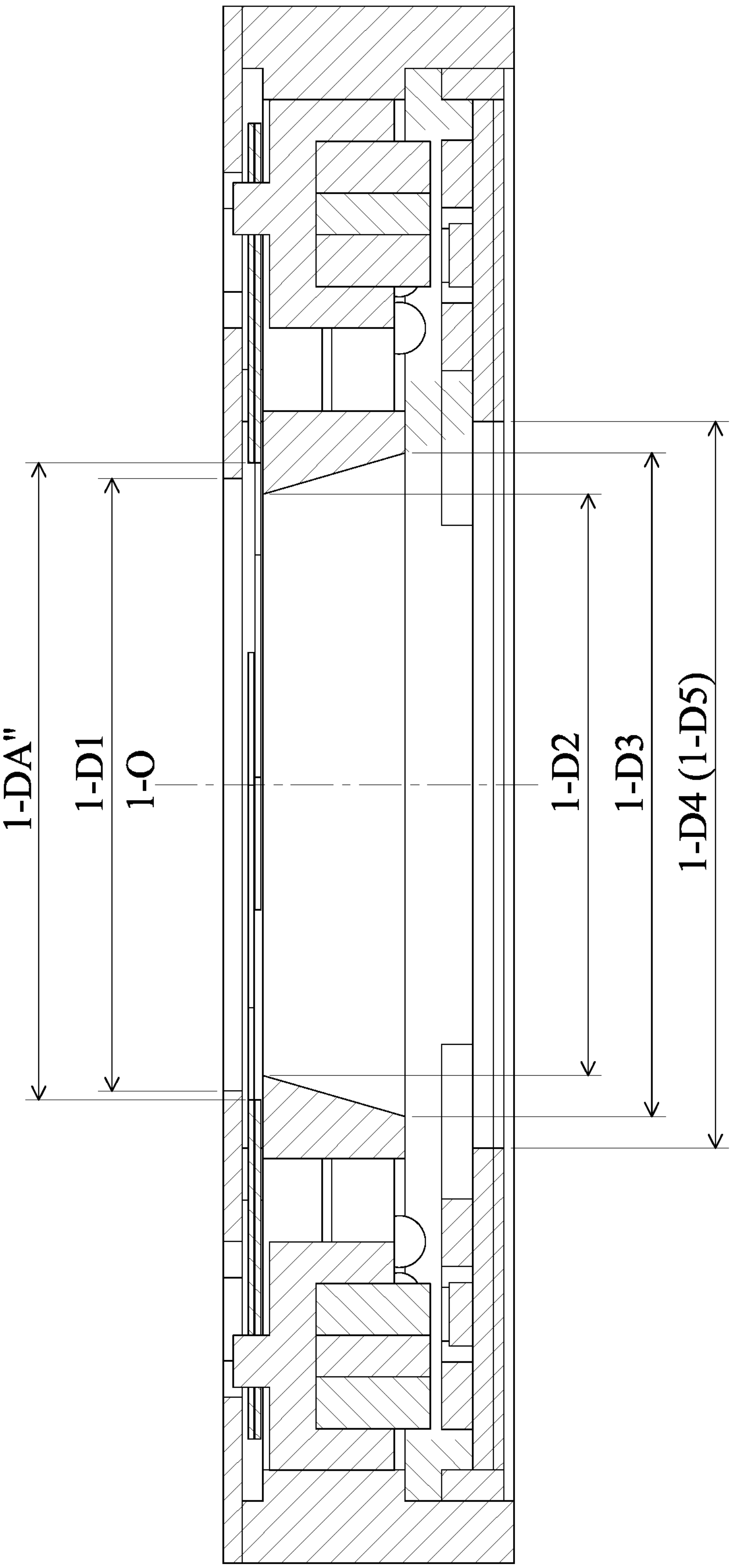
FIG. 10C is a cross-sectional view of FIG. 10A.

FIG. 10C is a cross-sectional view of FIG. 10A. As shown in FIG. 10C, the aperture opening 1-40E has a greatest diameter 1-DA", which is greater than the minimum diameter 1-D2 of the second opening. In other words, the size of the aperture formed by the optical element driving mechanism 1-100 may be defined as the minimum diameter 1-D2 of the second opening.

Figure 11:
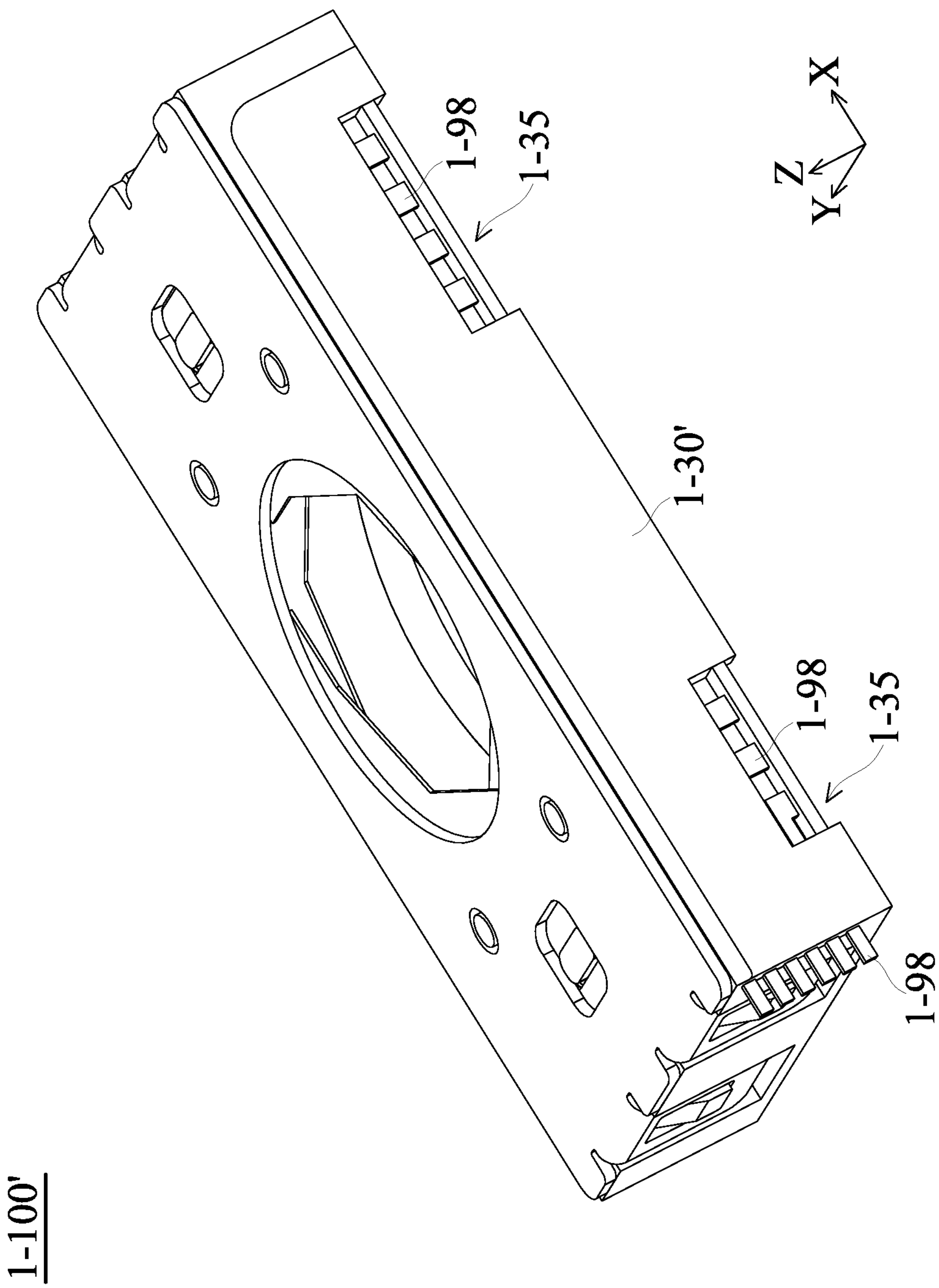
FIG. 11 and FIG. 12 are a schematic view and a exploded view of an optical element driving mechanism in other embodiments of the present disclosure, respectively.
Figure 12:
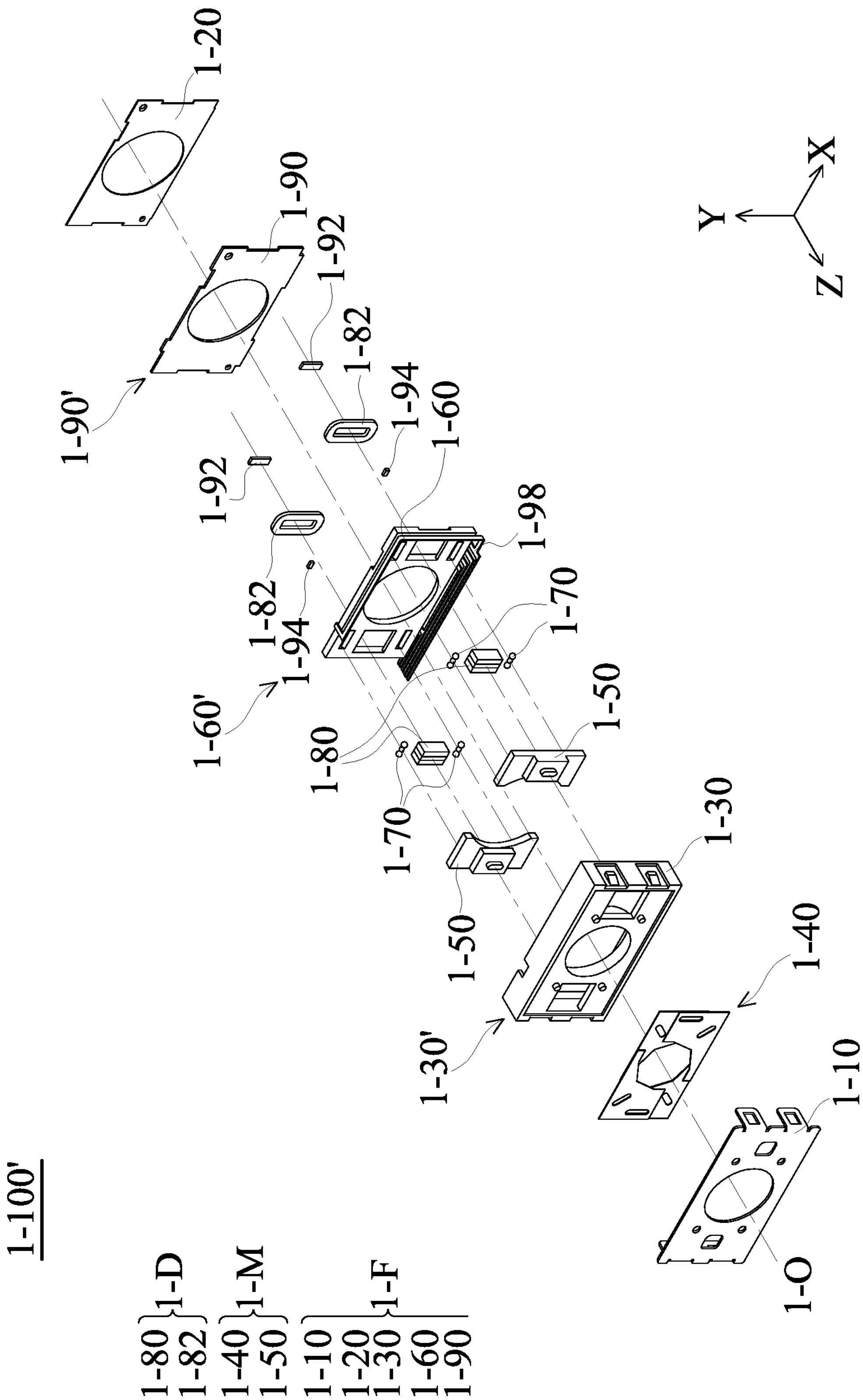

Although the circuit board 1-90 of the optical element driving mechanism 1-100 is used for connecting to other external elements, the present disclosure is not limited thereto. For example, FIG. 11 and FIG. 12 are a perspective view and an exploded view of an optical element driving mechanism 1-100' in other embodiments of the present disclosure. The elements of the optical element driving mechanism 1-100' are substantially similar or identical to the elements of the optical element driving mechanism 1-100. The difference is that the frame 1-30', the base 1-60', and the circuit plate 1-90' of the optical element 1-100' have different structures.

As shown in FIG. 11 and FIG. 12, additional conductive element 1-98 may be provided on the base 1-60'. The conductive element 1-98 may partially exposed from side openings 1-35 of the frame 1-30', and may have an end exposed from another side of the frame 1-30' to be electrically connected to external environment. It should be noted that at least a portion of the conductive element 1-98 may be embedded in the frame 1-30, and the mechanical strength of the frame 1-30' may be increased.

In summary, an optical element driving mechanism is provided. The optical element driving mechanism includes a fixed portion, a first blade, a transmission assembly, and a driving assembly. The first blade is movable relative to the fixed portion. The transmission assembly is movable relative to the fixed portion. The driving assembly is used for driving the transmission element to move relative to the fixed portion. The transmission element brings the first blade to move relative to the fixed portion when the transmission element is driven by the driving assembly.

For ease of description, in the following content and the drawings, the first direction 2-D1 (Y axis), the second direction 2-D2 (Z axis), and the third direction 2-D3 (X axis) may be used to describe the direction or orientation. The first direction 2-D1, the second direction 2-D2, and the third direction 2-D3 are different and not parallel to each other. In some embodiments, the first direction 2-D1, the second direction 2-D2, and the third direction 2-D3 are perpendicular or substantially perpendicular to each other. In some situations, the movement in the dimension may include linear movements and rotations.

Figure 13:
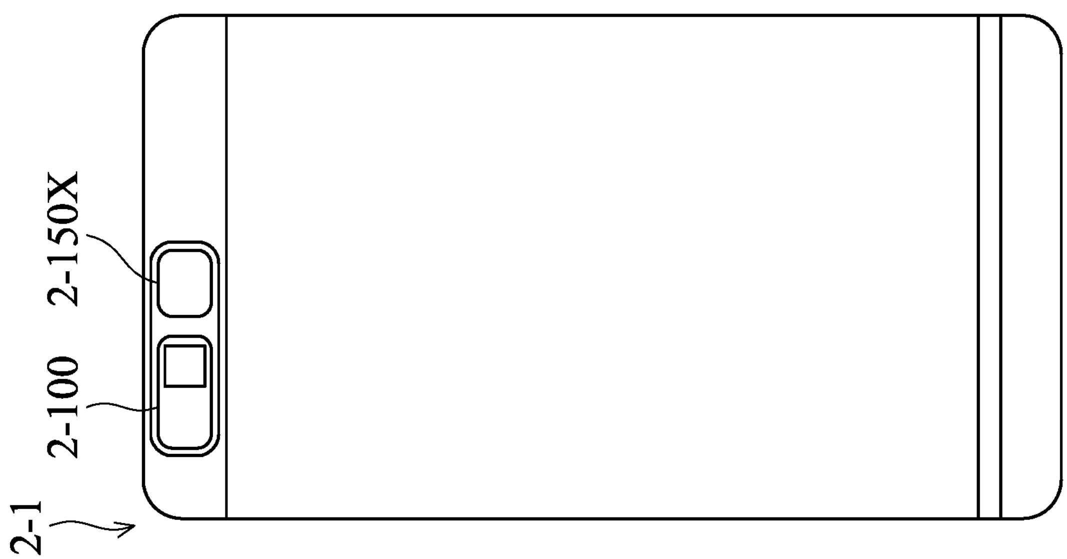
FIG. 13 is a schematic diagram showing an electronic device according to an embodiment of the present invention.

FIG. 13 is a schematic diagram of an electronic device 2-1 equipped with an optical element driving mechanism 2-100. The electronic device 2-1 may be a tablet computer, a smart phone, etc. The optical element driving mechanism 2-100 is usually arranged on the top area of the electronic device 2-1. The optical element driving mechanism 2-100 may be a periscope mechanism. In some embodiments, the electronic device 2-1 may be further equipped with another optical element driving mechanism 2-150X. The optical element driving mechanism 2-100 and the optical element driving mechanism 2-150X can form images respectively to improve the recording quality of the electronic device 2-1.

Figure 14:
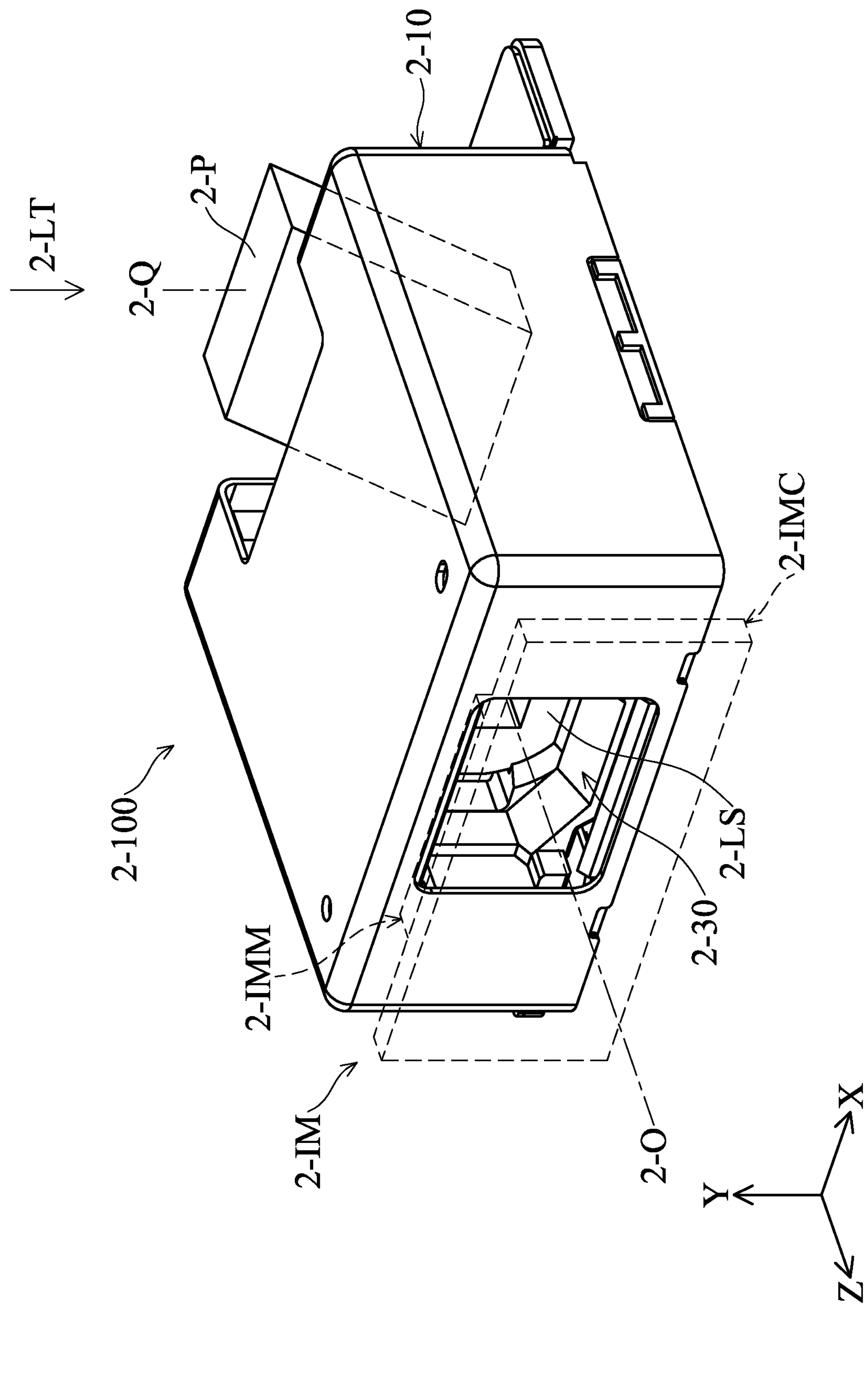
FIG. 14 is a schematic diagram of an optical element driving mechanism according to an embodiment of the present invention.
Figure 15:
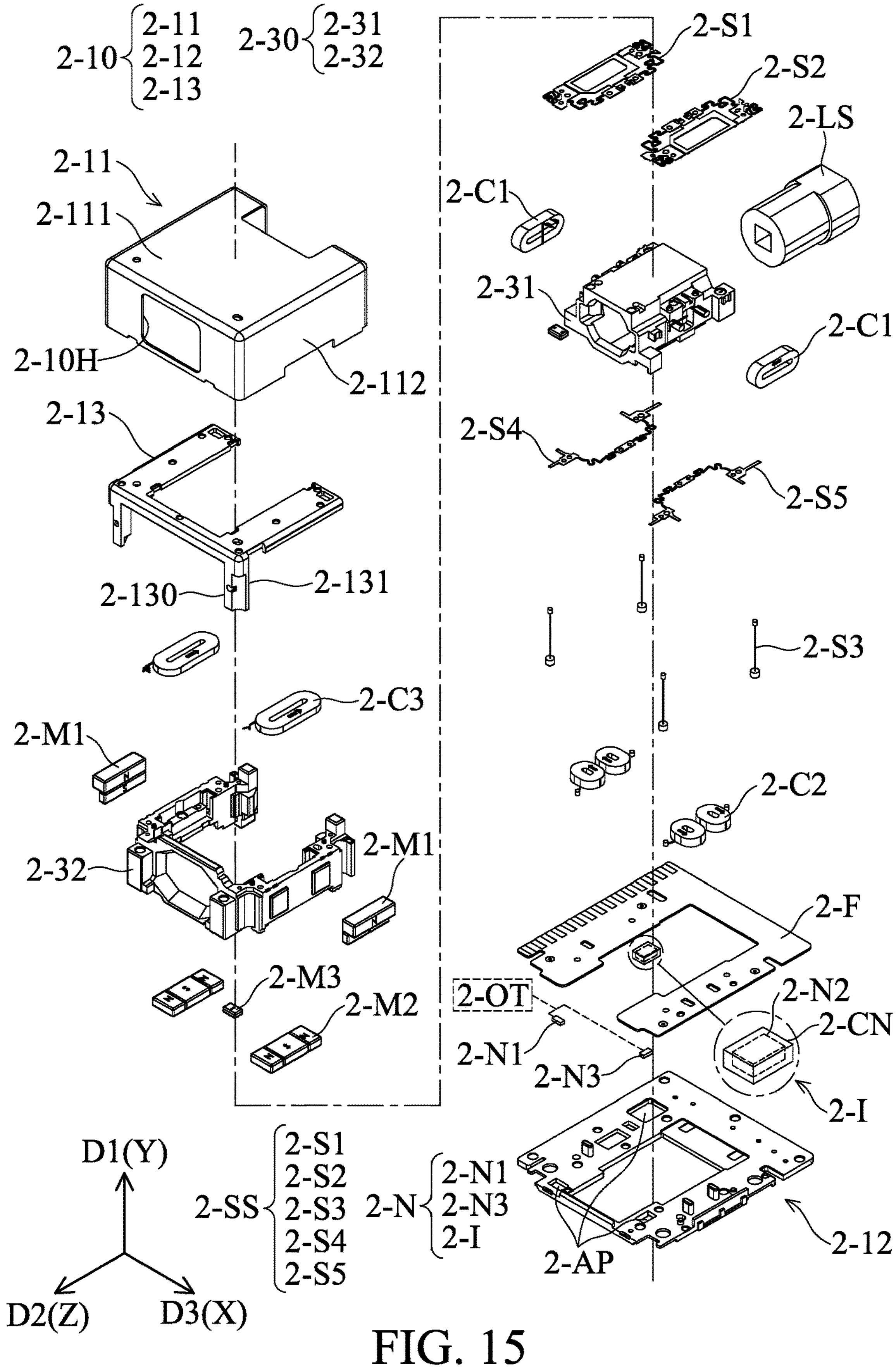
FIG. 15 is an exploded view diagram of the optical element driving mechanism.

FIG. 14 is a schematic diagram showing the optical path adjustment unit 2-P and the optical element driving mechanism 2-100 of the electronic device 2-1. The optical path adjustment unit 2-P can change the optical path of the incident light 2-LT. Specifically, when the incident light 2-LT from the outside reaches the optical path adjustment unit 2-P along the main axis 2-Q, the optical path adjustment unit 2-P is used to adjust the incident direction and exit direction of the incident light, thereby changing the path of the light 2-LT, and the incident light 2-LT can reach the optical element 2-LS of the optical element driving mechanism 2-100. The optical element 2-LS, such as a lens element or a lens assembly containing a plurality of lens elements, is arranged in the movable part 2-30 (FIG. 15). The optical axis 2-O is a virtual axis passing through the center of the optical element 2-LS. The optical path adjustment unit 2-P may be a mirror, a prism, or a beam splitter. The incident light 2-LT is substantially perpendicular to the optical axis 2-O and enters the optical path adjustment unit 2-P, and then by the optical path adjustment unit 2-P, the incident light 2-LT passes through the optical element 2-LS to the photosensitive element 2-IMM to obtain images. Through the driving mechanism of the optical element driving mechanism 2-100, the optical element 2-LS and the photosensitive element 2-IM can move relatively to achieve optical zooming, auto-focusing (AF) or optical image stabilization (OIS). In some embodiments, it may also be defined that the optical element driving mechanism 2-100 includes the optical path adjustment unit 2-P.

The optical path adjustment unit 2-P is fixedly connected to the fixed part 2-10, which can simplify active alignment and facilitate assembly. In some embodiments, in the first direction 2-D1, the maximum size of the optical path adjustment unit 2-P is larger than one-half of the optical element driving mechanism 2-100. In some embodiments, in the first direction 2-D1, the maximum size of the optical path adjustment unit 2-P is larger than two-thirds of the optical element driving mechanism 2-100.

The photosensitive component 2-IM includes a photosensitive element 2-IMM and a correction component 2-IMC. The photosensitive element 2-IMM, such as an image sensor, is used to receive light. The correction component 2-IMC is used to drive the photosensitive element 2-IMM to move relative to the fixed part 2-10, wherein the correction component 2-IMC can be used to drive the photosensitive element 2-IMM to move along the second and third dimensions relative to the fixed part 2-10. In some embodiments, the correction component 2-IMC may include coils and magnets, and the driving force for driving the photosensitive element 2-IMM is generated by applying current to the coils and the magnets. In other embodiments, the correction component 2-IMC may include a bias element made of shape memory alloys (SMA) to generate driving force for the photosensitive element 2-IMM.

The optical axis 2-O and the main axis 2-Q are not parallel. In some embodiments, the main axis 2-Q is perpendicular to the optical axis 2-O. The maximum size of the optical element driving mechanism 2-100 in the direction of the spindle 2-Q is smaller than the size of the optical element driving mechanism 2-100 in the direction of the optical axis 2-O. The maximum dimension of the optical element driving mechanism 2-100 in the direction of the spindle 2-Q is smaller than the dimension of the optical element driving mechanism 2-100 in the third direction 2-D3.

The detailed structure of the optical element driving mechanism 2-100 will be described below.

Figure 16:
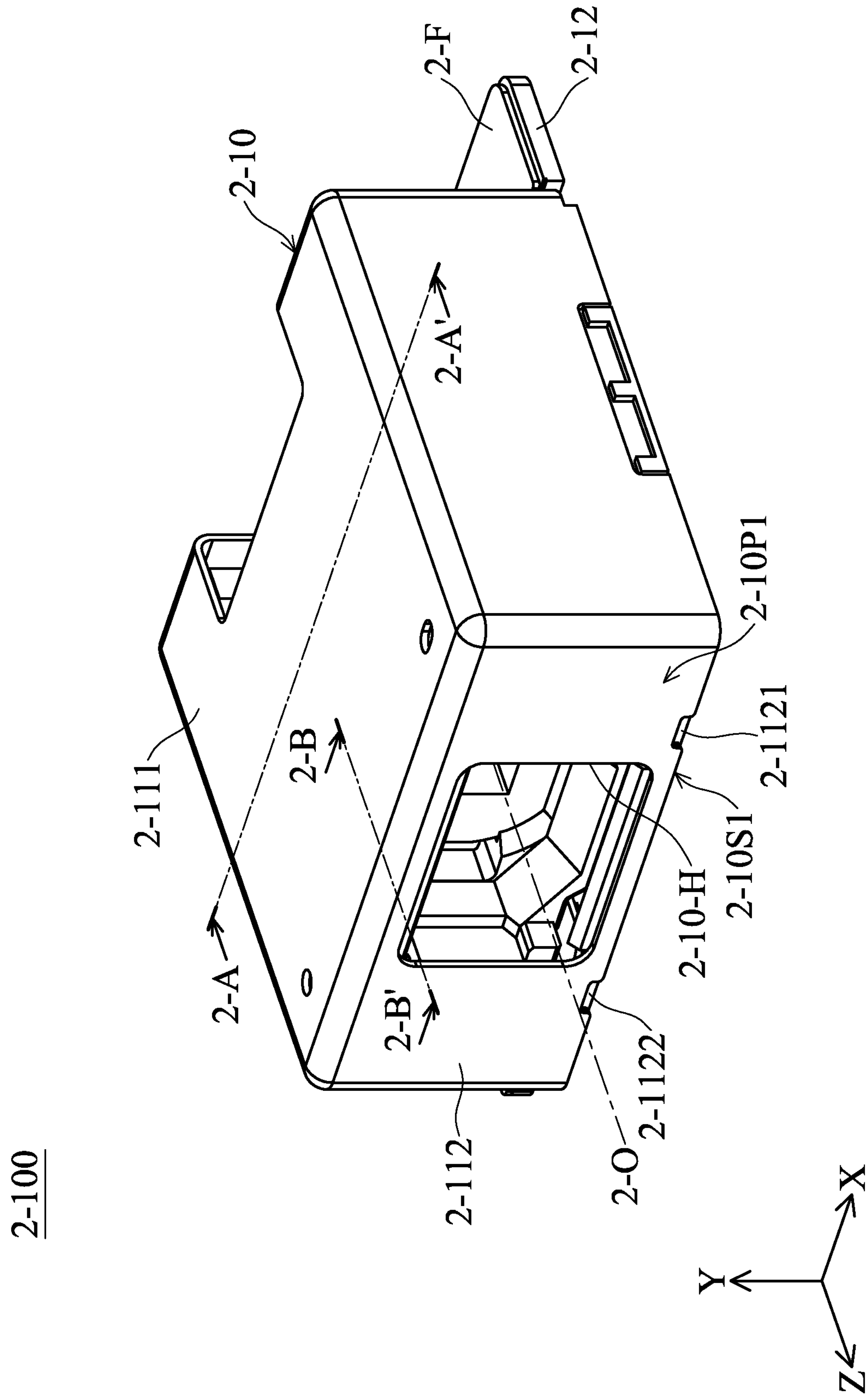
FIG. 16 is a schematic diagram of the optical element driving mechanism after assembly.

FIG. 15 is an exploded schematic diagram of the optical element driving mechanism 2-100, and FIG. 16 is a schematic diagram of the optical element driving mechanism 2-100 after assembly. The optical element driving mechanism 2-100 includes a fixed part 2-10, a movable part 2-30, a driving assembly 2-MC and a supporting assembly 2-SS. The movable part is used to connect an optical element 2-LS (such as a lens or a lens assembly), the driving assembly 2-MC is used to drive the movable part 2-30 to move relative to the fixed part 2-10, and the movable part 2-30 is movable relative to the fixed part 2-10 in multiple dimensions via the supporting assembly 2-SS.

The fixed part 2-10 includes a casing 2-11 and a base 2-12 corresponding to each other, which are arranged along a main axis 2-Q (Y-axis), and has an accommodation space for the movable part 2-30, the driving assembly 2-MC and the supporting assembly 2-SS, to protect them. In some embodiments, the fixed part 2-10 has a polygonal structure when viewed along the direction of the main axis 2-Q. The movable part 2-30 is arranged on the base 2-12. The driving assembly 2-MC is disposed on the movable part 2-30 and the fixed part 2-10, and is used to drive the movable part 2-30 and the optical element 2-LS to move relative to the fixed part 2-10, thereby adjusting the posture or position of the movable part 2-30 with the optical element 2-LS, to achieve the purpose of optical zooming), auto-focusing (AF) or optical image stabilization (OIS).

The casing 2-11 includes a top wall 2-111 and a side wall 2-112. The top wall 2-111 has a plate-shaped structure; and the top wall 2-111 is not parallel to the main axis 2-Q. In some embodiments, the top wall 2-111 is perpendicular to the main axis 2-Q. The side wall 2-112 has a plate structure and extends from the edge of the top wall 2-111. The top wall 2-111 is not parallel to the side wall 2-112, and the side wall 2-112 is parallel to the main axis 2-Q. The base 2-12 has a plate-shaped structure and is not parallel to the main axis 2-Q. In some embodiments, the base 2-12 is perpendicular to the main axis 2-Q.

Figure 17:
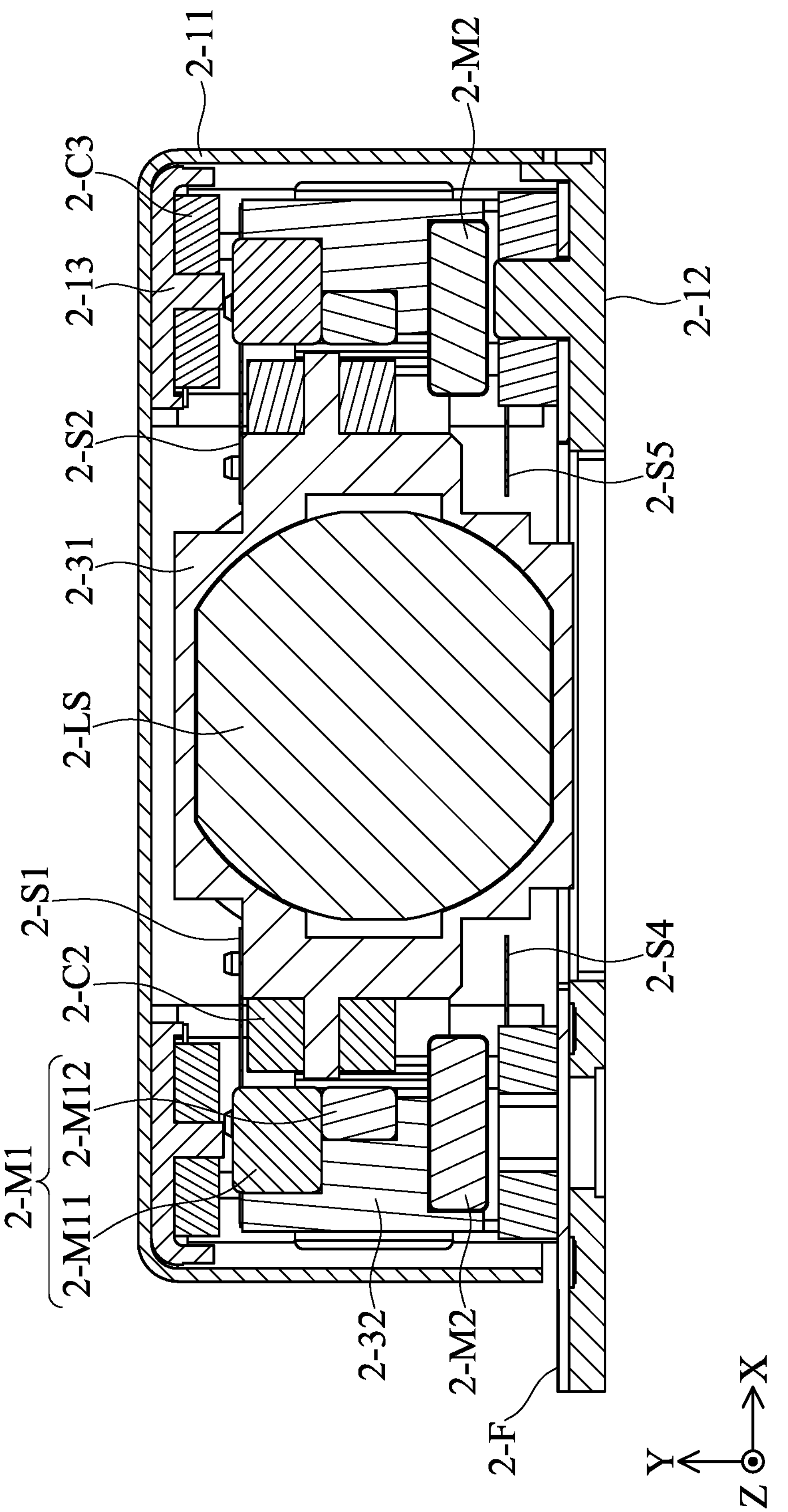
FIG. 17 is a schematic cross-sectional view taken along the line 2-A-2-A' in FIG. 15.

Referring to FIGS. 15 and 17, the movable part 2-30 includes an optical element holder 2-31 and a driving assembly holder 2-32, and the optical element holder 2-31 is used for connecting the optical element 2-LS, the driving assembly holder 2-32 is connected to at least a part of the driving assembly 2-MC. The driving assembly MC includes a plurality of coils 2-C1 to 2-C3 and a plurality of magnetic elements 2-M1 to 2-M3 (Those elements will be detailed later). The driving assembly holder 2-32 is connected to or carries at least a part of the driving assembly 2-MC, for example, is connected to the first and second magnetic elements 2-M1 and 2-M2 of the driving assembly 2-MC.

Figure 18:
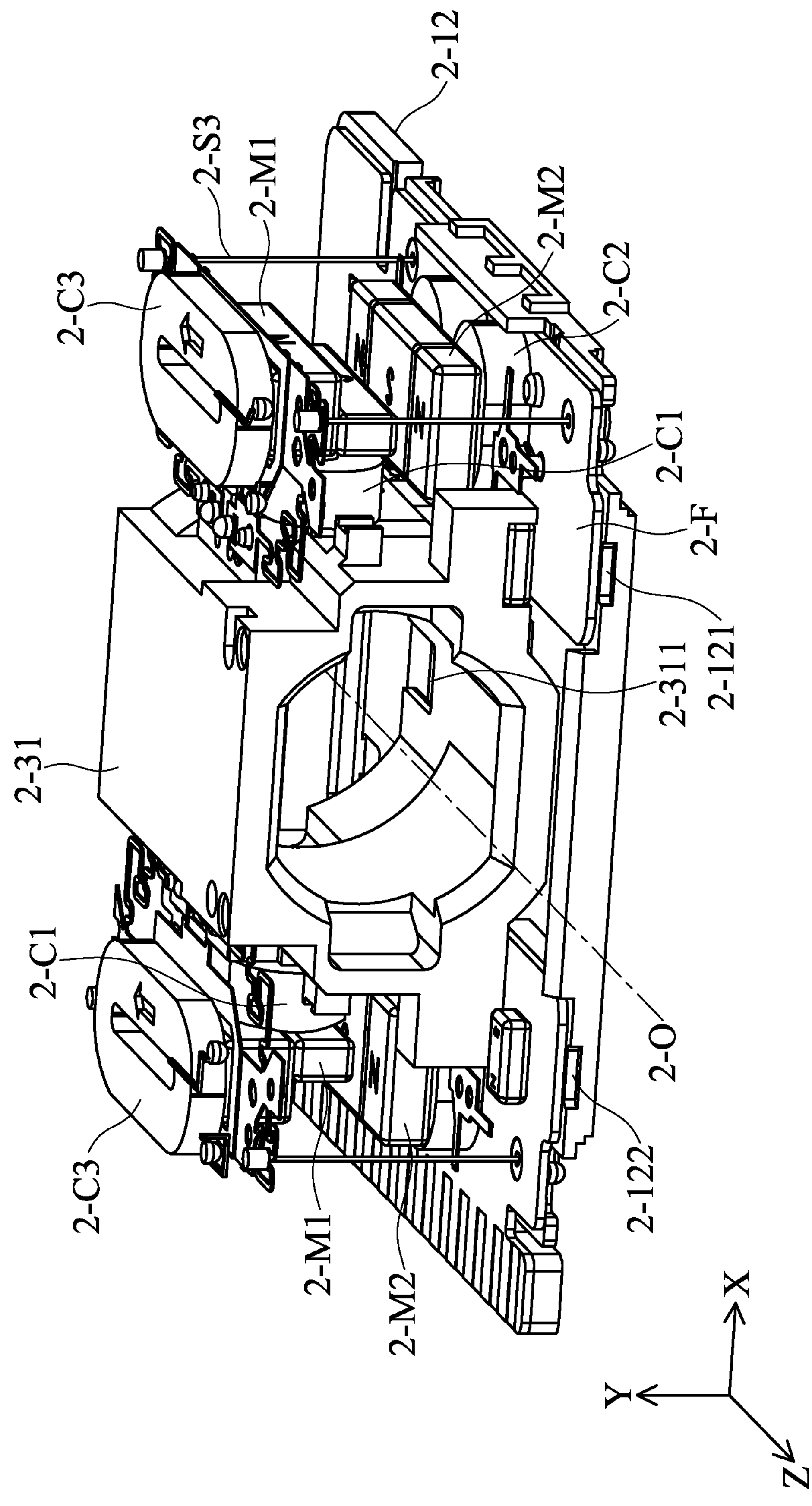
FIG. 18 is a schematic diagram of the optical element driving mechanism (the casing, the frame and the driving assembly holder are omitted)

Referring to FIGS. 15 and 18, regarding the driving assembly 2-MC, it may be an electromagnetic driving assembly, including a plurality of coils (including first, second, and third coils 2-C1, 2-C2, 2-C3) and a plurality of magnetic elements (including the first, second, and third magnetic elements 2-M1, 2-M2, 2-M3).

When a driving signal is applied to the driving assembly 2-MC (for example, a current is applied to the driving coil by an external power supply), a magnetic force is generated between the magnetic element and the coil, which can drive the movable part 2-30 to move relative to the fixed part 2-10. In this way, the driving assembly 2-MC can drive the movable part 2-30 and the optical element 2-LS to move along the optical axis 2-O, or move in a plane perpendicular to the optical axis 2-O, so as to achieve the optical image anti-shake, auto-focusing or changing the focal length.

Through the driving assembly 2-MC, the optical element holder 2-31 can move relative to the driving assembly holder 2-32, the optical element holder 2-31 can move relative to the fixed part 2-10, and the driving assembly holder 2-32 can move relative to the fixed part 2-10. The driving assembly 2-MC is used to drive the optical element holder 2-31 to move along a first dimension relative to the driving assembly holder 2-32, for example, through the first coil 2-C1 and the first magnetic element 2-M1. The driving assembly 2-MC is used to drive the driving assembly holder 32 to move along a second dimension relative to the fixed part 2-10, for example, through the second coil 2-C2 and the second magnetic element 2-M2. The driving assembly 2-MC is used to drive the driving assembly holder 2-32 to move along a third dimension relative to the fixed part 2-10, for example, through the third coil 2-C3 and the second magnetic element 2-M2 or the third magnetic element 2-M3. The aforementioned first and second dimensions are different, the second and third dimensions are different; the first dimension can be movement parallel to the first direction 2-D1; the movement in second dimension can be a movement that is parallel to the second direction 2-D2; the third dimension movement can be a movement that is parallel to the third direction 2-D3. The first, second, and third directions 2-D1, 2-D2, and 2-D3 are not parallel to each other; the first, second, and third directions are perpendicular to each other; the second dimension is parallel to the optical axis 2-O of the optical element 2-LS.

In some embodiments, each first magnetic element 2-M1 may include two first and second sub-magnetic elements 2-M11, 2-M12 with different thicknesses (in the X-axis direction), and they are arranged in the main axis 2-Q direction.

Continuing to refer to FIG. 18, the optical element holder 2-31 further includes a notch 2-311, and the arrangement direction of the notch 2-311 and the optical axis 2-O is perpendicular to the third direction 2-D3. The arrangement direction of the notch 2-311 and the optical axis 2-O is parallel to the first direction 2-D1. With the notch 2-311, the overall mechanism is thinner and the optical quality can be improved.

Figure 19:
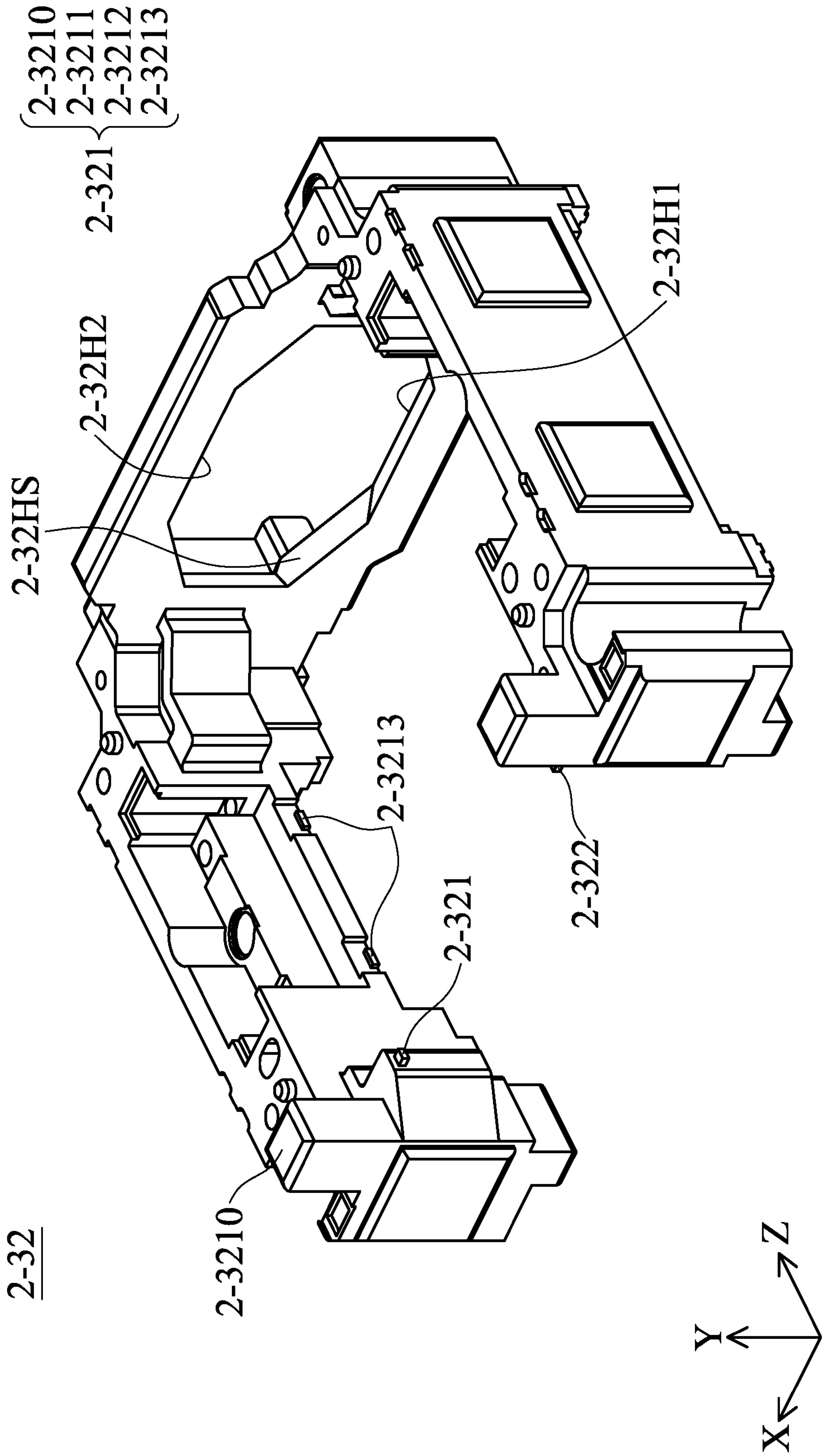
FIG. 19 is a schematic diagram of the driving assembly holder.

Referring to FIG. 19, the driving assembly bearing base 2-32 also includes a metal reinforcement assembly 2-321, which can strengthen the overall mechanical strength of the driving assembly bearing base 2-32. The metal reinforcement assembly 2-321 includes a main body 2-3210, a first reinforcement element 2-3211, a second reinforcement element 2-3212, and a third reinforcement element 2-3213. The main body 2-3210 has a non-metallic material. The first reinforcement element 2-3211 is made of a metal material and is at least partially embedded in the main body 2-3210, and at least partially exposed from the main body 2-3210. The second reinforcement element 2-3212 is at least partially embedded in the main body 2-3210, and at least partially exposed from the main body 2-3210. The exposed parts of the main body of the first and second reinforcing elements 2-3211 and 2-3212 extend in parallel 2-D3 along the third direction 2-D3. The third reinforcement element 2-3213 is made of a magnetic metal material, and is at least partially embedded in the main body 2-3210, and at least partially exposed from the main body 2-3210, and faces or contacts the second magnetic element 2-M2. Since the third reinforcement element 2-3213 is made of a magnetic metal material, the magnetic force between the magnetic element 2-M1-2-M3 and the coil 2-C1-2-C3 can be concentrated in a predetermined direction, thereby strengthening the driving ability of the driving assembly 2-MC, and can reduce the effect of magnetic interference, and enhance the overall mechanical strength of the driving assembly holder 2-32. In some embodiments, the third reinforcement element 2-3213 can be used as a permeability element.

The driving assembly holder 2-32 has an opening 2-32H, and the opening 2-32H has an outer opening portion 2-32H1, an inner opening portion 2-32H2, and an opening incline group 2-32HS. The opening area of the inner opening portion 2-32H2 is larger than the opening area of the outer opening portion 2-32H1. The opening incline group 2-32HS is located between the outer opening 2-32H1 and the inner opening 2-32H2, and connects the two. In some embodiments, an incline surface of the opening incline group 2-32HS connecting the outer opening 2-32H1 and the inner opening 2-32H2 is inclined by 25 to 30 degrees with respect to the reference plane XZ plane (or the top wall 2-111). Through the opening incline group 2-32HS, optical characteristics can be increased.

Referring to FIGS. 15 and 18, the supporting assembly 2-SS includes a first elastic element 2-S1 and a second elastic element 2-S2. The optical element holder 2-31 is movably connected to the driving assembly holder 2-32 via the first elastic element 2-S1. The first elastic element 2-S1 has a plate-shaped structure, and its extending direction is parallel to a first imaginary plane (ZX plane). The optical element holder 2-31 is movably connected to the driving assembly holder 2-32 via the second elastic element 2-S2. The second elastic element 2-S2 has a plate-shaped structure; the extending direction of the second elastic element 2-S2 is parallel to the first imaginary plane. The centers of the first and second elastic elements 2-S1, 2-S2 are arranged along the third direction 2-D3, and the first imaginary plane passes through the first and second elastic elements 2-S1, 2-S2. The first imaginary plane is perpendicular to the main axis 2-Q, and the first imaginary plane is parallel to the optical axis 2-O.

The supporting assembly 2-SS further includes a plurality of third elastic elements 2-S3, and the movable part 2-30 is movably connected to the fixed part 2-10 via the third elastic element 2-S3. The third elastic element 2-S3 has an elongated structure, the extending direction of the third elastic element 2-S3 is not parallel to the optical axis 2-O direction, the third elastic element 2-S3 is not parallel to the first imaginary plane, and the third elastic element 2-S3 is perpendicular to the first imaginary plane. In some embodiments, the plurality of third elastic elements 2-S3 can be used as an elastic assembly. In some embodiments, the supporting assembly 2-SS may include one third elastic element 2-S3, so that the movable part 2-30 can be movably connected to the fixed part 2-10.

The supporting assembly 2-SS also includes a fourth elastic element 2-S4 and a fifth elastic element 2-S5, which are arranged on the bottom side of the optical element holder 2-31 for elastically connecting the movable part 2-30 and fixed part 2-10.

Referring to FIG. 15, in some embodiments, the optical element driving mechanism 2-100 further includes a sensing assembly 2-N for sensing the movement of the movable part 2-30 relative to the fixed part 2-10. The sensing assembly 2-N includes: a first sensing element 2-N1 for sensing the movement of the optical element holder 2-31 relative to the driving assembly holder 2-32, wherein the first sensing element 2-N1 is used for sensing the movement of the optical element holder 2-31 relative to the driving assembly holder 2-32 in the first dimension; a second sensing element 2-N2 for sensing the movement of the driving assembly holder 2-32 relative to the fixed part 2-10, wherein the second sensing element 2-N2 for sensing the movement of the driving assembly holder 2-32 relative to the fixed part 2-10 in the second dimension; and a third sensing element 2-N3 is used to sense the movement of the driving assembly holder 2-32 relative to the fixed part 2-10, wherein the third sensing element 2-N3 is used to sense the movement of the driving assembly bearing base 2-32 relative to the fixed part 2-10 in the third dimension.

The first control unit 2-CN is electrically connected to the driving assembly 2-MC and the second sensing element 2-N2, and controls the driving assembly 2-MC according to the sensing signal output by the second sensing element 2-N2. The first control unit 2-CN and the second sensing element 2-N2 are located in a packaging unit 2-1; the first and third sensing elements 2-N1, 2-N3 and the driving assembly 2-MC are electrically connected to an external control unit 2-OT, which is located outside the optical element driving mechanism 2-100. The first control unit 2-CN is electrically connected to the external control unit 2-OT; the packaging unit 2-1 is located in the optical element driving mechanism 2-100; and the first and third sensing elements 2-N1, 2-N2 are located in the optical element driving mechanism 2-100.

The optical element driving mechanism 2-100 also includes a circuit element 2-F, electrically connected to the first, second, and third sensing elements 2-N1, 2-N2, 2-N3. The driving assembly 2-MC and the first sensing element 2-N1 are respectively located on opposite sides (or upper and lower sides) of the circuit element 2-F, wherein the driving assembly 2-MC and the second and third sensing elements 2-N2, 2-N3 are respectively located on the opposite sides (or upper and lower sides) of circuit element 2-F. The base 2-12 includes a plurality of receiving portions 2-AP, corresponding to the first to third sensing elements 2-N1 to 2-N3. In the first direction 2-D1, the maximum size of the receiving portion 2-AP is larger than the maximum sizes of the first, second and third sensing elements 2-N1-2-N3, so the base 2-12 can protect the sensing elements 2-N1~2-N3 to avoid damage caused by impact.

Figure 20:
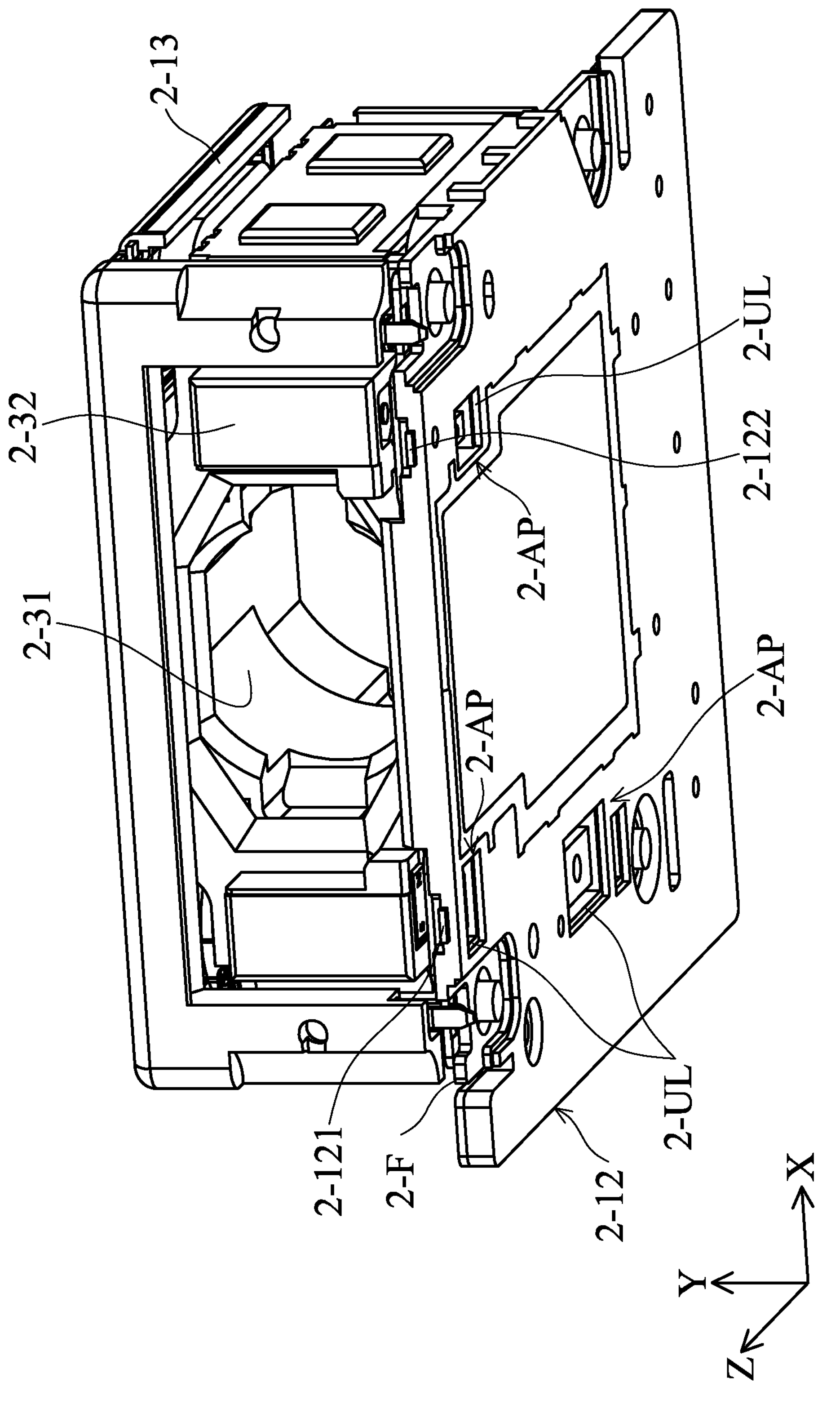
FIG. 20 is a schematic diagram of the optical element driving mechanism (the casing is omitted)
Figure 21:
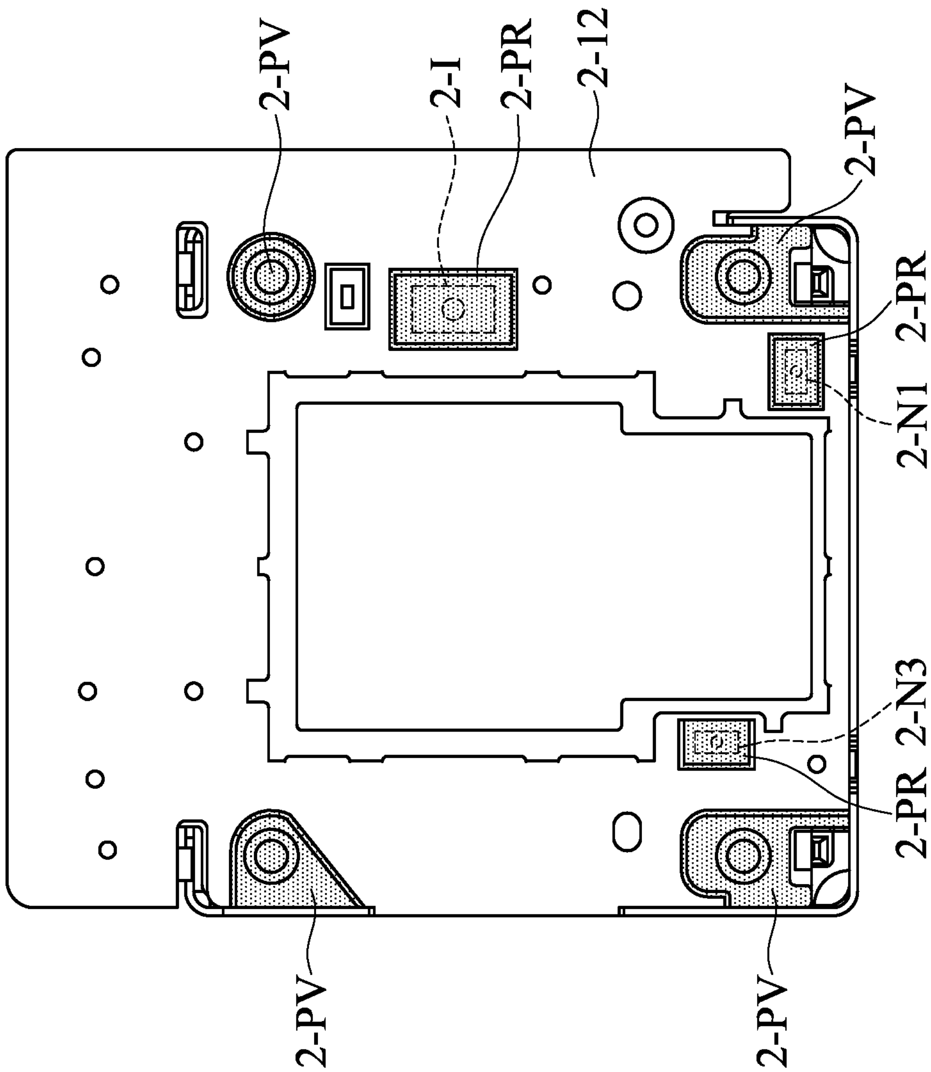
FIG. 21 is a bottom view of the optical element driving mechanism.

Referring to FIGS. 20 and 21, the optical element driving mechanism 2-100 also includes a protective element 2-PR, such as glue, adhesive, gel or colloid, which is arranged in the receiving portions 2-AP to protect the first to the third sensing elements 2-N1 to 2-N3. In this embodiment, the protection element 2-PR directly contacts the receiving portions 2-AP and the first to third sensing elements 2-N1 to 2-N3. In addition, a limiting structure 2-UL is formed around the receiving portions 2-AP to limit the setting range of the protection element 2-PR, so as to prevent the protection element 2-PR from overflowing when the protection element 2-PR is applied. In the direction perpendicular to the first direction 2-D1, the maximum size of the limiting structure 2-UL is greater than the maximum size of the receiving part 2-AP. The fixed part 2-10 also includes an insulating element 2-PV disposed on the base 2-12 and directly contacting the electrical connecting member 2-B (FIG. 23, which will be described later) to avoid the electrical connecting member 2-B and other circuits are short-circuited (such as electrical components in the optical element driving mechanism 2-100). In some embodiments, the insulating element 2-PV directly contacts the base 2-12, directly contacts the frame 2-13, and directly contacts the casing 2-11.

Figure 22:
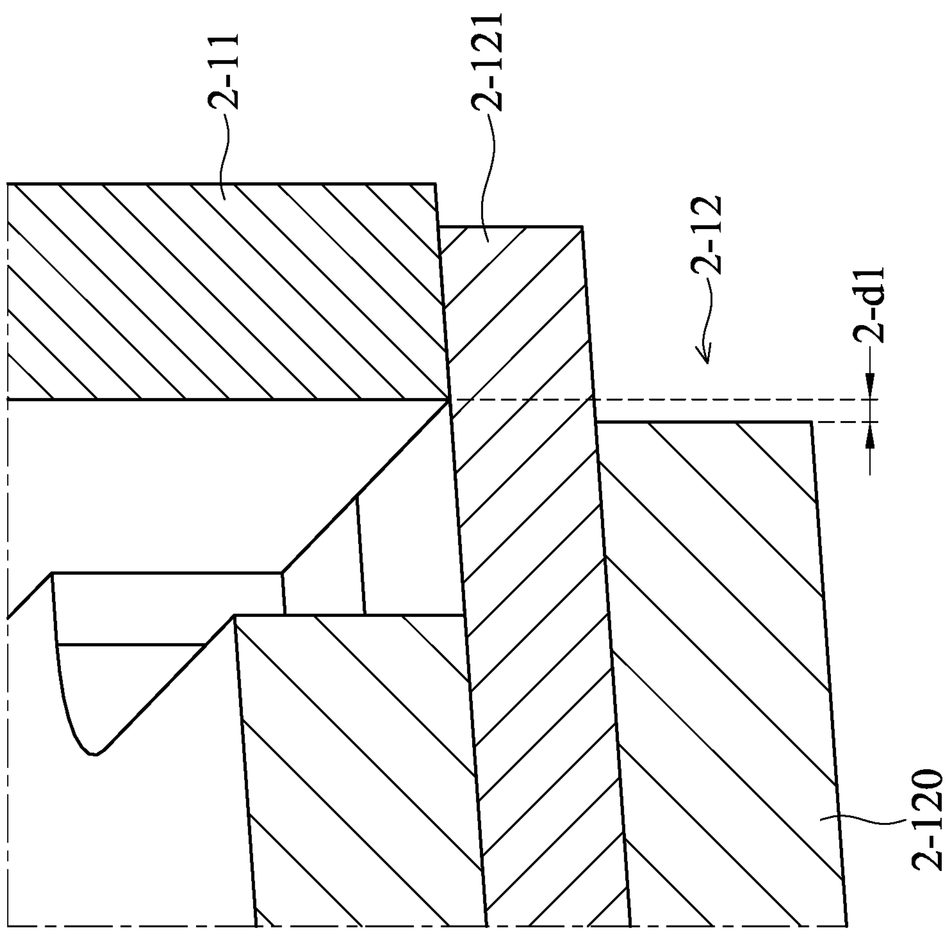
FIG. 22 is a partial cross-sectional schematic diagram of the casing and the base.

Referring to FIGS. 18 and 22, the base 2-12 includes: a non-metal body 2-120 and a first metal portion 2-121. The non-metal body 2-120 has a plate-shaped structure. The first metal portion 2-121 is made of metal and is at least partially embedded in the non-metal body 2-120, and the casing 2-11 has metal material and is welded to the first metal portion 2-121 through welding (by a metal connection processing method such as soldering, welding or resistance welding).

The shortest distance between the first metal portion 2-121 and the casing (which can be zero) is less than the shortest distance **2-*d*1 between the non-metal body 2-120 and the casing, to ensure that the casing 2-11 and the first metal part 2-121** can actually contact, thereby improving the welding quality.

The aforementioned base 2-12 also includes a second metal portion 2-122 having metal material and at least partially embedded in the non-metal body 2-120, the casing 2-11 and the second metal portion 2-122 are connected by welding. Similarly, the shortest distance (may be zero) between the second metal portion 2-122 and the casing 2-11 is smaller than the shortest distance between the non-metal body 2-120 and the casing 2-11 (such as the distance **2-*d*1**).

Referring to FIGS. 15 and 18, the weld between the first and second metal portions 2-121, 2-122 and the casing 2-11 is located at the side 2-10S of the fixed part 2-10. The opening 2-10H of the fixed part 2-10 is corresponding to light. When viewed along the main axis 2-Q direction, the opening 2-10H is located at the side 2-10S. The side wall 2-112 of the casing 2-11 has a plurality of (at least two) grooves 2-1121 and 2-1122, corresponding to the first and second metal portions 2-121 and 2-122, respectively. The grooves 2-1121, 2-1122 and the opening 2-10H are located on the side surface 2-10P1 of the fixed part 2-10. The side surface 2-10P1 is perpendicular to the optical axis 2-O; the side surface 2-10P1 is parallel to the main axis 2-Q; the casing 2-11 is electrically connected to an external ground circuit via the first metal portion 2-121 for grounding.

Figure 23:
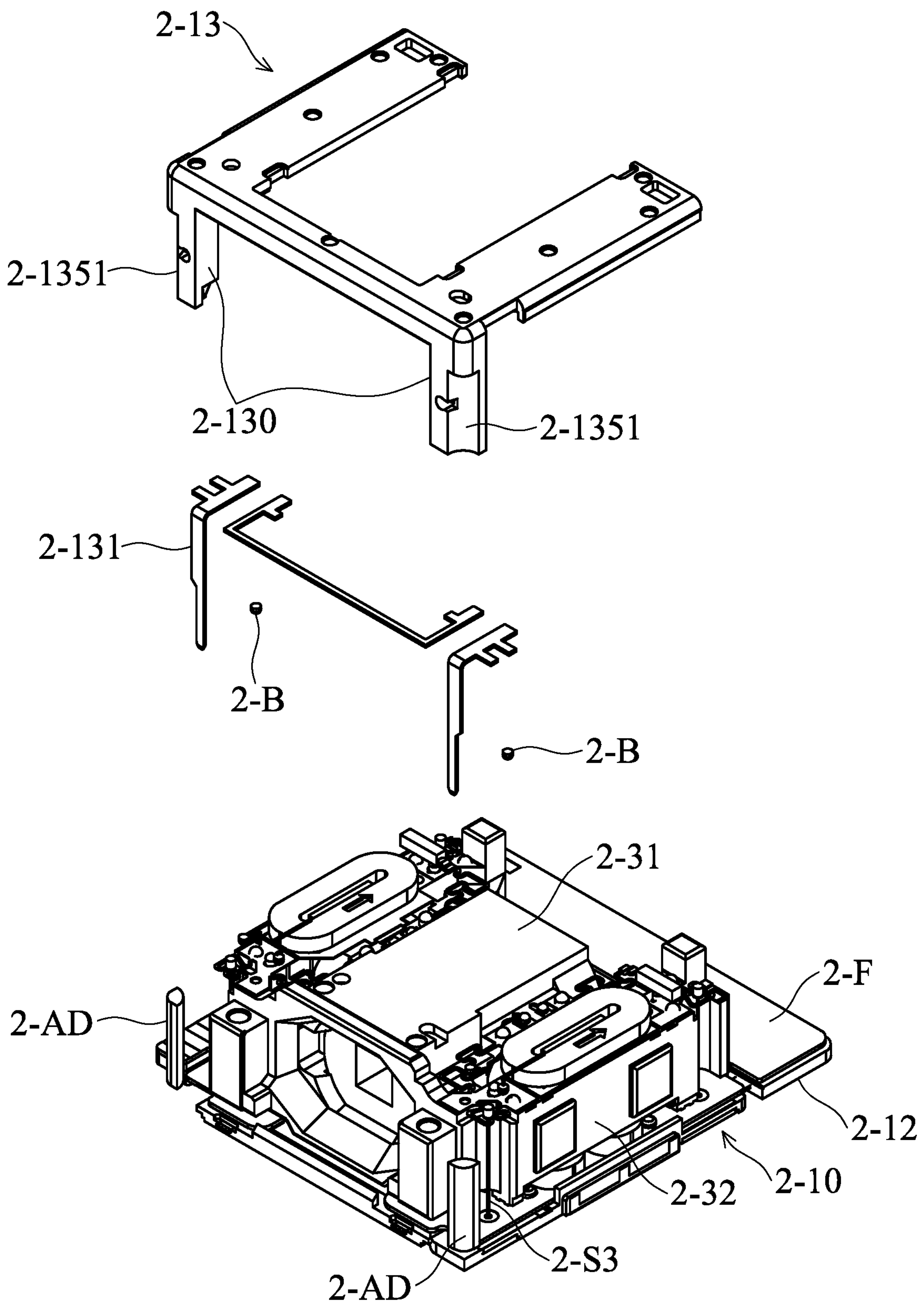
FIG. 23 is an exploded view diagram of the frame, the first circuit and the electrical connecting member.

Referring to FIG. 23, the frame 2-13 of the fixed part 2-10 is fixedly disposed on the casing 2-11. The frame 2-13 has an extension portion 2-130 extending toward the base 2-12. When viewed along the direction of the main axis 2-Q, the extension portion 2-130 is located at the corner of the fixed part 2-10. The frame 2-13 also has a first circuit 2-131 electrically connected to the driving assembly 2-MC. The first circuit 2-131 is at least partially embedded in the frame 2-13, and is not exposed outside the frame 2-13. The first circuit 2-131 is at least partially located or embedded in the extension portion 2-130, the first circuit 2-131 is electrically connected to the aforementioned circuit element 2-F, and the first circuit 2-131 is electrically connected to circuit element 2-F via the electrical connecting members 2-B (for example, solders). The surface of the first circuit 2-131 directly in contact with the electrical connecting members 2-B is not parallel to the surface of the circuit element 2-F directly in contact with the electrical connecting members 2-B. In some embodiments, the surface of the first circuit 2-131 directly contacting the electrical connecting members 2-B is perpendicular to the surface of the circuit element 2-F directly contacting the electrical connecting members 2-B.

The extension portion 2-130 of the frame 2-13 corresponds to the side wall 2-112 of the casing 2-11, and the extension portion 2-130 has a recessed structure 2-1351 to accommodate a connecting element 2-AD, such as glue, adhesive, gel or colloid. The connecting element 2-AD directly contacts the casing 2-11 and the frame 2-13, and the connecting element 2-AD directly contacts the base 2-12.

Figure 24:
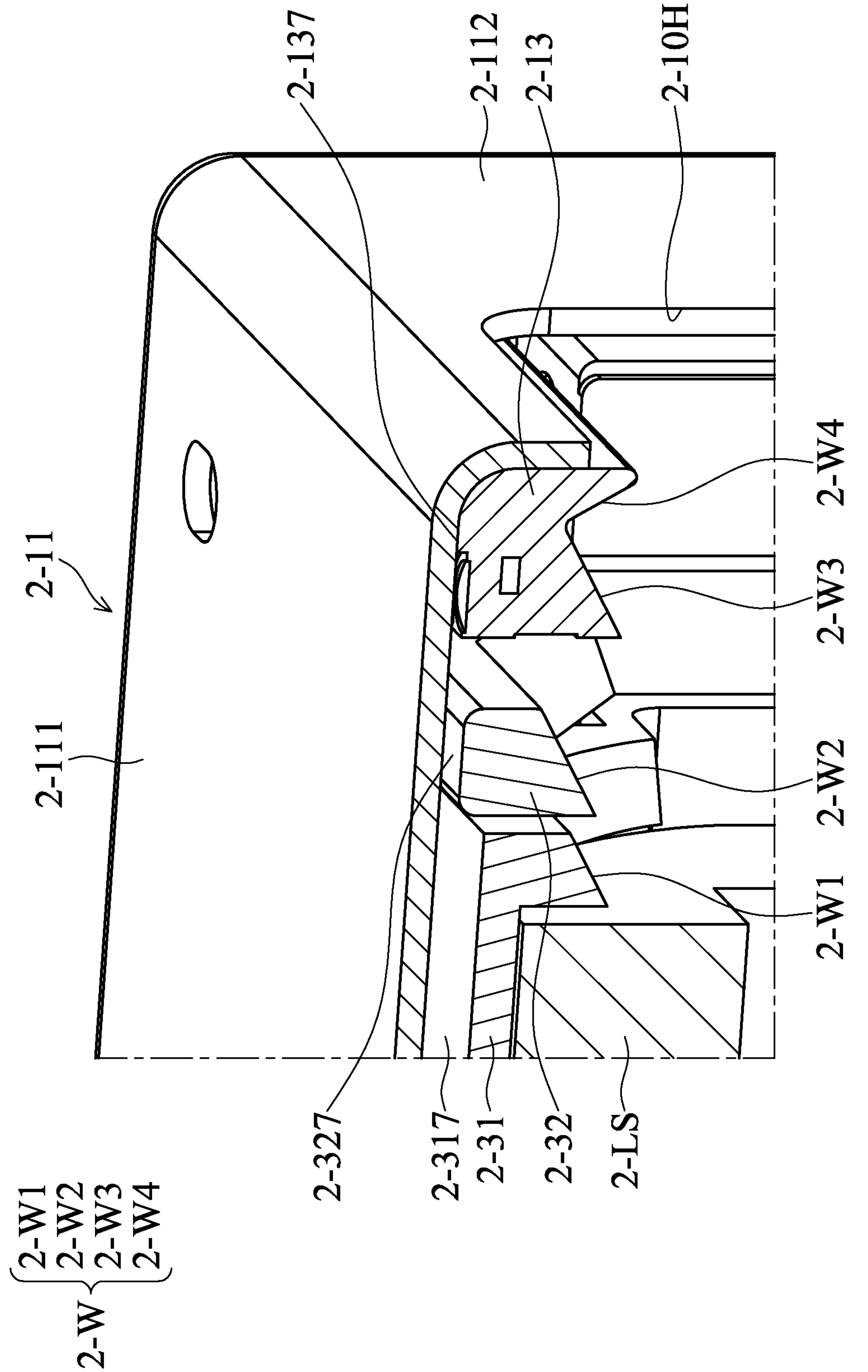
FIG. 24 is a schematic cross-sectional view taken along the line 2-B-2-B' in FIG. 15.
Figure 25:
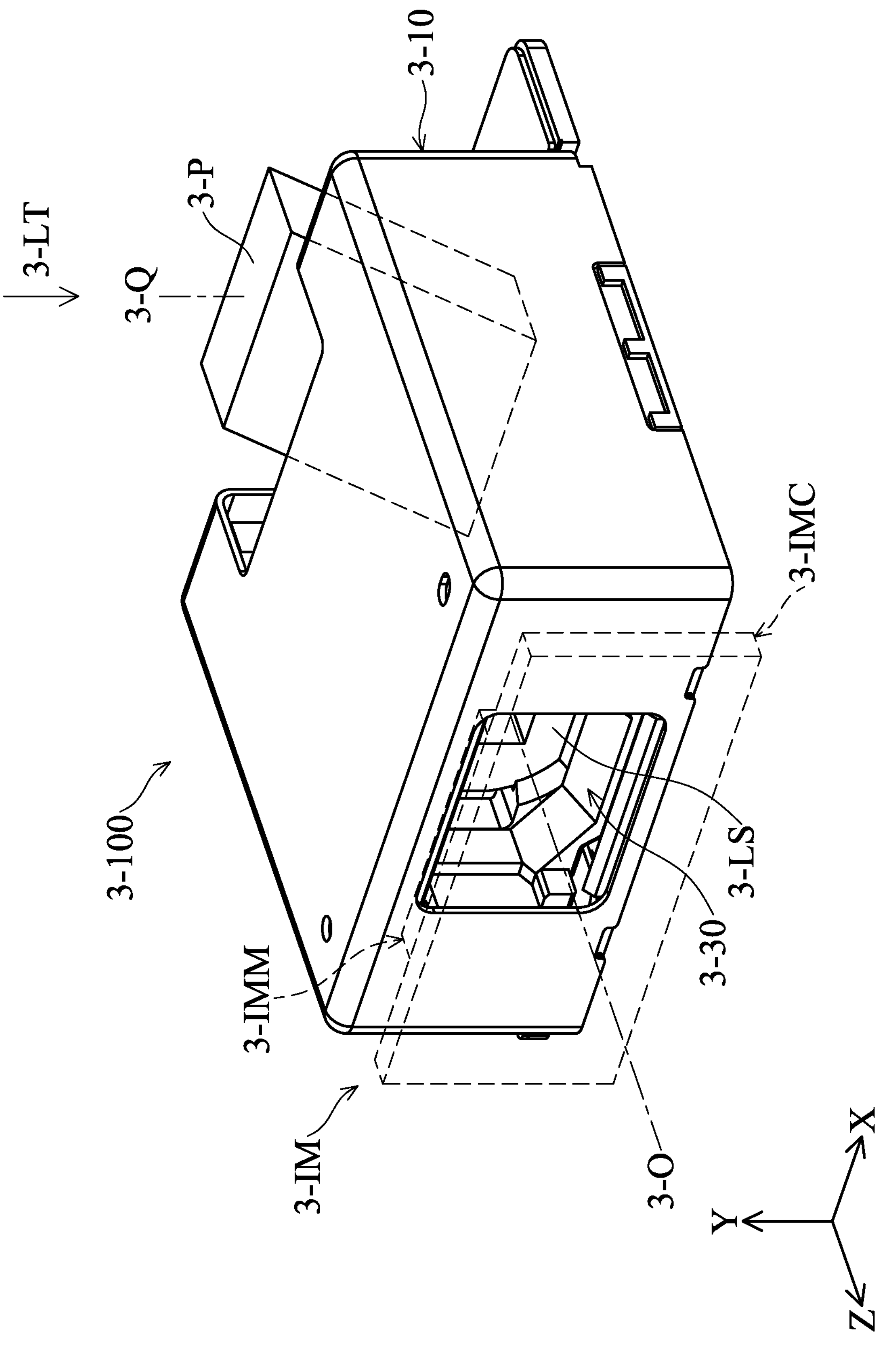
FIG. 25 is a schematic diagram of an optical element driving mechanism according to an embodiment of the present invention.

Referring to FIG. 24, the optical element holder 2-31 is formed with a first anti-reflection surface 2-W1; the driving assembly holder 2-32 is formed with a second anti-reflection surface 2-W2; and the frame 2-13 is formed with a third anti-reflection surface 2-W3 and a fourth anti-reflection surface 2-W4. In some embodiments, the optical element driving mechanism 2-100 can be defined as further including a stray light preventing component 2-W, which is used to prevent a stray light generated by light reflected (via the optical path adjustment unit 2-P) from entering and passing through the opening 2-10H of the fixed part 2-10 (or of the casing 2-11). The stray light preventing component 2-W includes: a first anti-reflection surface 2-W1, a second anti-reflection surface 2-W2, a third anti-reflection surface 2-W3, and a fourth anti-reflection surface 2-W4.

The aforementioned first anti-reflection surface 2-W1 has a planar structure and is not parallel or perpendicular to the optical axis 2-O. The first anti-reflection surface 2-W1 is disposed on the optical element holder 2-31. In this embodiment, the reflectivity of the first anti-reflective surface 2-W1 is lower than that of the optical element holder surface 2-317 of the optical element holder 2-31, and the first anti-reflective surface 2-W1 and the optical element holder surface 2-317 are not parallel. The roughness of the first anti-reflection surface 2-W1 is different from the roughness of the optical element holder surface 2-317. The first anti-reflection surface 2-W1 has an anti-reflection coating. The first anti-reflection surface 2-W1 faces the opening 2-10H.

The aforementioned second anti-reflective surface 2-W2 has a planar structure, is arranged on the driving assembly holder 2-32, and is not parallel or perpendicular to the optical axis 2-O. The reflectivity of the second anti-reflective surface 2-W2 is lower than the reflectivity of the driving assembly holder surface 2-327 of the driving assembly holder 2-32. The second anti-reflection surface 2-W2 is not parallel to the driving assembly holder surface 2-327. The roughness of the second anti-reflective surface 2-W2 is different in the roughness of the driving assembly holder surface 2-327. The second anti-reflection surface 2-W2 has an anti-reflection coating. The second anti-reflection surface 2-W2 faces the opening 2-10H. When viewed along the direction of the optical axis 2-O, the first anti-reflection surface 2-W1 and the second anti-reflection surface 2-W2 at least partially overlap.

The aforementioned third anti-reflection surface 2-W3 has a planar structure, is disposed on the frame 2-13, and is not parallel or perpendicular to the optical axis 2-O. The reflectivity of the third anti-reflection surface 2-W3 is lower than the reflectivity of the frame surface 2-137 of the frame 2-13. The third anti-reflection surface 2-W3 is not parallel to the frame surface 2-137. The roughness of the third anti-reflection surface 2-W3 is different from the roughness of the frame surface 2-137. The third anti-reflection surface 2-W3 has an anti-reflection coating. The third anti-reflection surface 2-W3 faces the opening 2-10H. When viewed along the optical axis direction 2-0, the second anti-reflection surface 2-W2 and the third anti-reflection surface 2-W3 at least partially overlap, and the first anti-reflection surface 2-W1 and the third anti-reflection surface 2-W3 at least partially overlap.

The aforementioned fourth anti-reflection surface 2-W4 has a planar structure, and is disposed on the frame 2-13, and is not parallel or perpendicular to the optical axis 2-O. The reflectivity of the fourth anti-reflection surface 2-W4 is lower than that of the frame surface 2-137. In some embodiments, the third and fourth anti-reflective surfaces 2-W3, 2-W4 have the same reflectivity. The fourth anti-reflection surface 2-W4 is not parallel to the frame surface 2-137. The roughness of the fourth anti-reflection surface 2-W4 is different from the roughness of the frame surface 2-137. The fourth anti-reflection surface 2-W4 has an anti-reflection coating. The fourth anti-reflection surface 2-W4 faces the optical element 2-LS. When viewed along the optical axis 2-O direction, the first anti-reflection surface 2-W1 and the fourth anti-reflection surface 2-W4 at least partially overlap, and the second anti-reflection surface 2-W2 and the fourth anti-reflection surface 2-W4 at least partially overlap, and the third anti-reflection surface 2-W3 and the fourth anti-reflection surface 2-W4 at least partially overlap.

The above-mentioned stray light preventing component 2-W can be used to prevent extra reflections generated by light in the mechanism, or to shield extra reflected stray light so that stray light does not easily enter the opening 2-10H of the fixed part 2-10, greatly improve the quality of shooting or optics.

In summary, an embodiment of the present invention provides an optical element driving mechanism, including a movable part for connecting an optical element; a fixed part, wherein the movable part can move relative to the fixed part; a driving assembly for driving the movable part to move relative to the fixed part; and a supporting assembly, wherein the movable part can move relative to the fixed part in multiple dimensions via the supporting assembly.

The embodiment of the present invention has at least one of the following advantages or effects. In the periscope optical system, by driving the optical element in three dimensions in the optical element driving mechanism, wherein the optical path adjustment unit is relatively fixed and does not move, the alignment procedures between the components can be simplified, thereby improving the assembly efficiency. Furthermore, the overall mechanism can be miniaturized. In some embodiments, the anti-reflection surfaces can effectively reduce the stray light generated when light is reflected or refracted by the optical path adjustment unit, so as to improve the optical quality. It can also adjust the wide range of shooting by zooming, focusing and optical anti-shake, and better optical quality can be acquired even when there are external interference elements.

For ease of description, in the following content and the drawings, the first direction 3-D1 (Y axis), the second direction 3-D2 (Z axis), and the third direction 3-D3 (X axis) may be used to describe the direction or orientation. The first direction 3-D1, the second direction 3-D2, and the third direction 3-D3 are different and not parallel to each other. In some embodiments, the first direction 3-D1, the second direction 3-D2, and the third direction 3-D3 are perpendicular or substantially perpendicular to each other. In some situations, the movement in the dimension may include linear movements and rotations.

FIG. 24 is a schematic diagram of an optical element driving mechanism 3-100. The optical element driving mechanism 3-100 may be disposed in a tablet computer, a smart phone, etc. The optical element driving mechanism 3-100 can be used as a mechanism for driving optical assembly. The optical element driving mechanism 3-100 may be a periscope mechanism.

Figure 26:
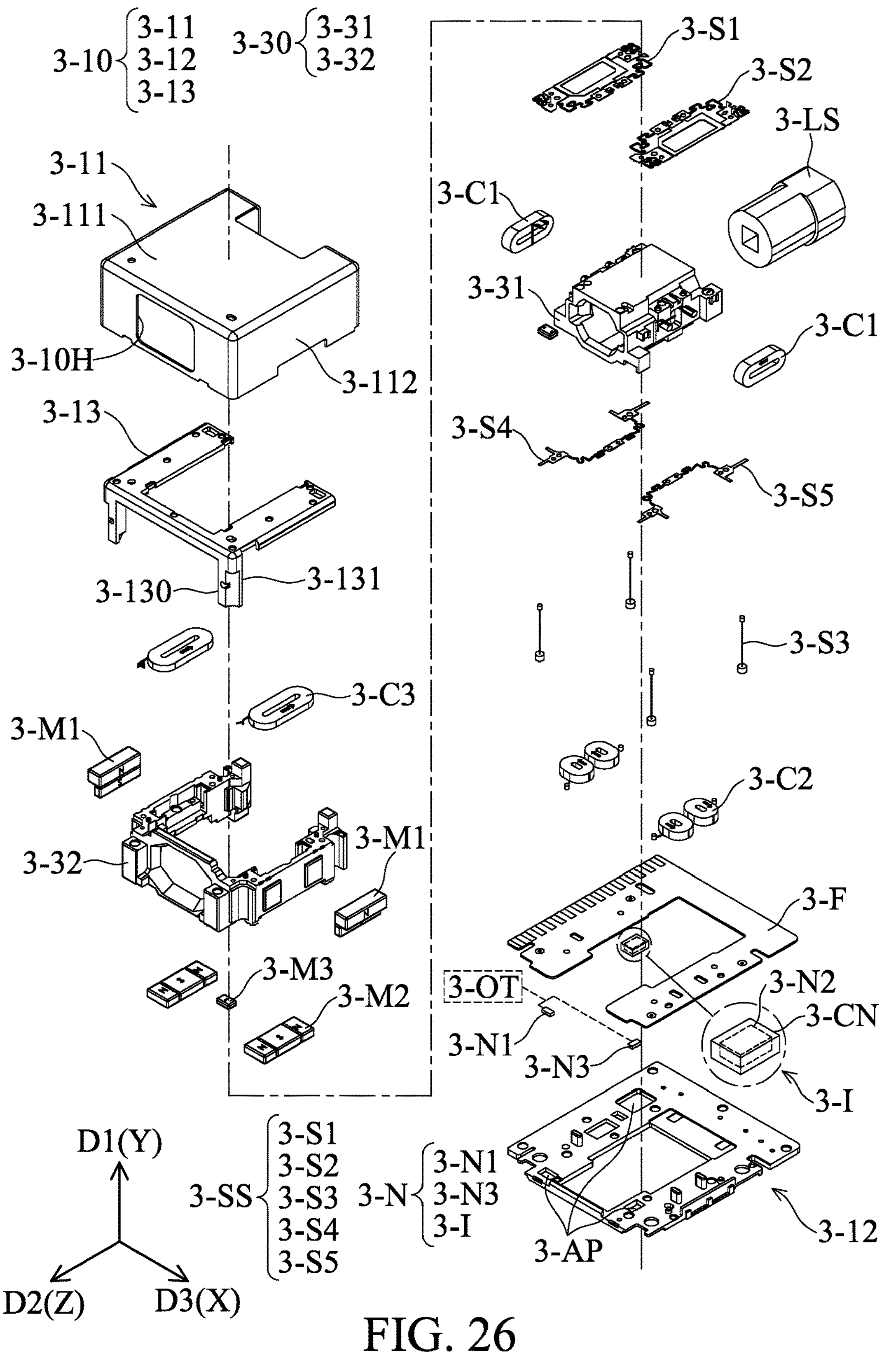
FIG. 26 is an exploded view diagram of the optical element driving mechanism.

The optical path adjustment unit 3-P disposed in the optical element driving mechanism 3-100 can change the optical path of the incident light 3-LT. Specifically, when the incident light 3-LT from the outside reaches the optical path adjustment unit 3-P along the main axis 3-Q, the optical path adjustment unit 3-P is used to adjust the incident direction and exit direction of the incident light, thereby changing the path of the light 3-LT, and the incident light 3-LT can reach the optical element 3-LS of the optical element driving mechanism 3-100. The optical element 3-LS, such as a lens element or a lens assembly containing a plurality of lens elements, is arranged in the movable part 3-30 (FIG. 26). The optical axis 3-O is a virtual axis passing through the center of the optical element 3-LS. The optical path adjustment unit 3-P may be a mirror, a prism, or a beam splitter. The incident light 3-LT is substantially perpendicular to the optical axis 3-O and enters the optical path adjustment unit 3-P, and then by the optical path adjustment unit 3-P, the incident light 3-LT passes through the optical element 3-LS to the photosensitive element 3-IMM to obtain images. Through the driving mechanism of the optical element driving mechanism 3-100, the optical element 3-LS and the photosensitive element 3-IM can move relatively to achieve optical zooming, auto-focusing (AF) or optical image stabilization (OIS). In some embodiments, it may also be defined that the optical element driving mechanism 3-100 includes the optical path adjustment unit 3-P.

The optical path adjustment unit 3-P is fixedly connected to the fixed part 3-10, which can simplify active alignment and facilitate assembly. In some embodiments, in the first direction 3-D1, the maximum size of the optical path adjustment unit 3-P is larger than one-half of the optical element driving mechanism 3-100. In some embodiments, in the first direction 3-D1, the maximum size of the optical path adjustment unit 3-P is larger than two-thirds of the optical element driving mechanism 3-100.

The photosensitive component 3-IM includes a photosensitive element 3-IMM and a correction component 3-IMC. The photosensitive element 3-IMM, such as an image sensor, is used to receive light. The correction component 3-IMC is used to drive the photosensitive element 3-IMM to move relative to the fixed part 3-10, wherein the correction component 3-IMC can be used to drive the photosensitive element 3-IMM to move along the second and third dimensions relative to the fixed part 3-10. In some embodiments, the correction component 3-IMC may include coils and magnets, and the driving force for driving the photosensitive element 3-IMM is generated by applying current to the coils and the magnets. In other embodiments, the correction component 3-IMC may include a bias element made of shape memory alloys (SMA) to generate driving force for the photosensitive element 3-IMM.

The optical axis 3-O and the main axis 3-Q are not parallel. In some embodiments, the main axis 3-Q is perpendicular to the optical axis 3-O. The maximum size of the optical element driving mechanism 3-100 in the direction of the spindle 3-Q is smaller than the size of the optical element driving mechanism 3-100 in the direction of the optical axis 3-O. The maximum dimension of the optical element driving mechanism 3-100 in the direction of the spindle 3-Q is smaller than the dimension of the optical element driving mechanism 3-100 in the third direction 3-D3.

The detailed structure of the optical element driving mechanism 3-100 will be described below.

Figure 27:
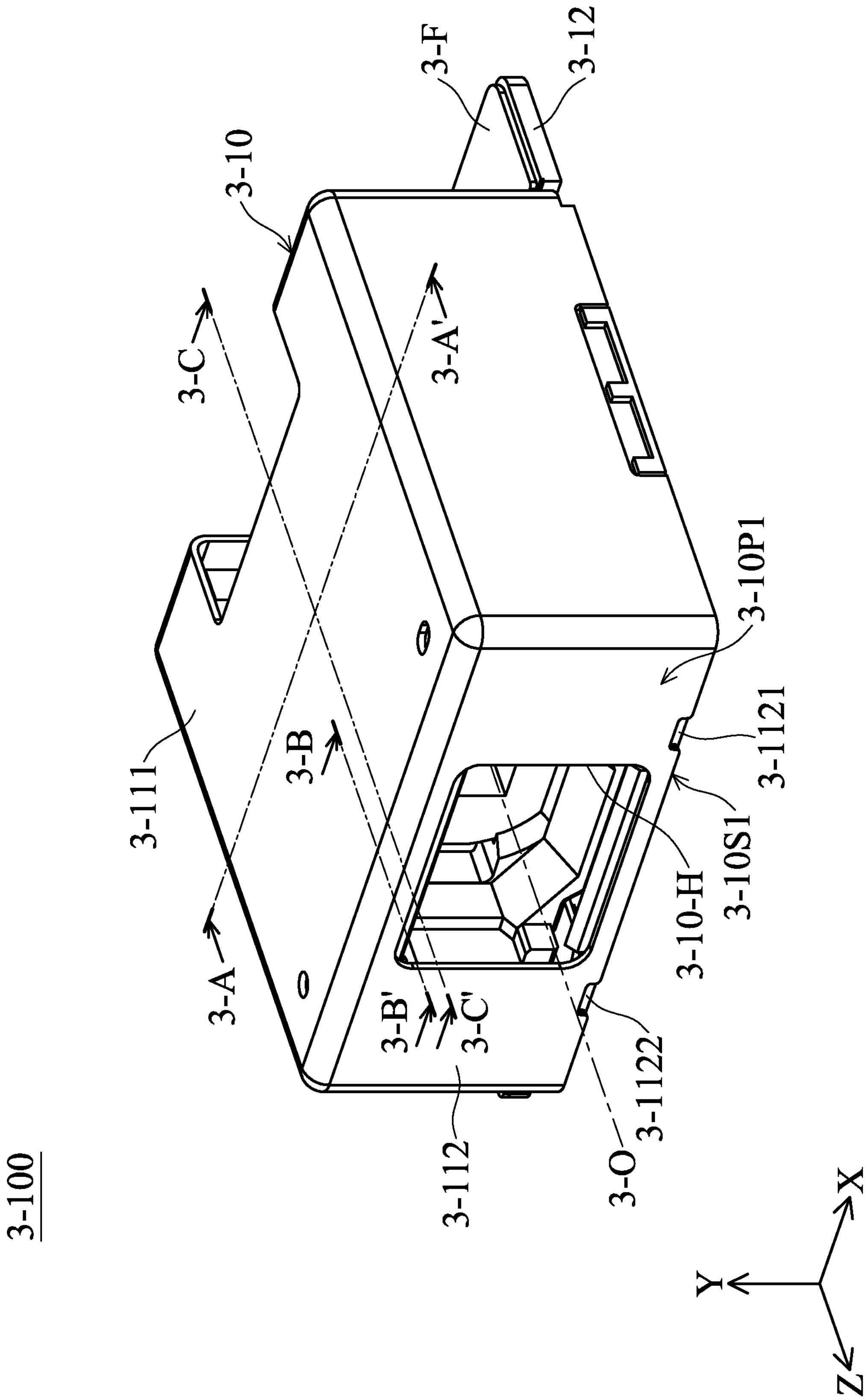
FIG. 27 is a schematic diagram of the optical element driving mechanism after assembly.

FIG. 26 is an exploded schematic diagram of the optical element driving mechanism 3-100, and FIG. 27 is a schematic diagram of the optical element driving mechanism 3-100 after assembly. The optical element driving mechanism 3-100 includes a fixed part 3-10, a movable part 3-30, a driving assembly 3-MC and a supporting assembly 3-SS. The movable part is used to connect an optical element 3-LS (such as a lens or a lens assembly), the driving assembly 3-MC is used to drive the movable part 3-30 to move relative to the fixed part 3-10, and the movable part 3-30 is movable relative to the fixed part 3-10 in multiple dimensions via the supporting assembly 3-SS.

The fixed part 3-10 includes a casing 3-11 and a base 3-12 corresponding to each other, which are arranged along a main axis 3-Q (Y-axis), and has an accommodation space for the movable part 3-30, the driving assembly 3-MC and the supporting assembly 3-SS, to protect them. In some embodiments, the fixed part 3-10 has a polygonal structure when viewed along the direction of the main axis 3-Q. The movable part 3-30 is arranged on the base 3-12. The driving assembly 3-MC is disposed on the movable part 3-30 and the fixed part 3-10, and is used to drive the movable part 3-30 and the optical element 3-LS to move relative to the fixed part 3-10, thereby adjusting the posture or position of the movable part 3-30 with the optical element 3-LS, to achieve the purpose of optical zooming), auto-focusing (AF) or optical image stabilization (OIS).

The casing 3-11 includes a top wall 3-111 and a side wall 3-112. The top wall 3-111 has a plate-shaped structure; and the top wall 3-111 is not parallel to the main axis 3-Q. In some embodiments, the top wall 3-111 is perpendicular to the main axis 3-Q. The side wall 3-112 has a plate structure and extends from the edge of the top wall 3-111. The top wall 3-111 is not parallel to the side wall 3-112, and the side wall 3-112 is parallel to the main axis 3-Q. The base 3-12 has a plate-shaped structure and is not parallel to the main axis 3-Q. In some embodiments, the base 3-12 is perpendicular to the main axis 3-Q.

Figure 28:
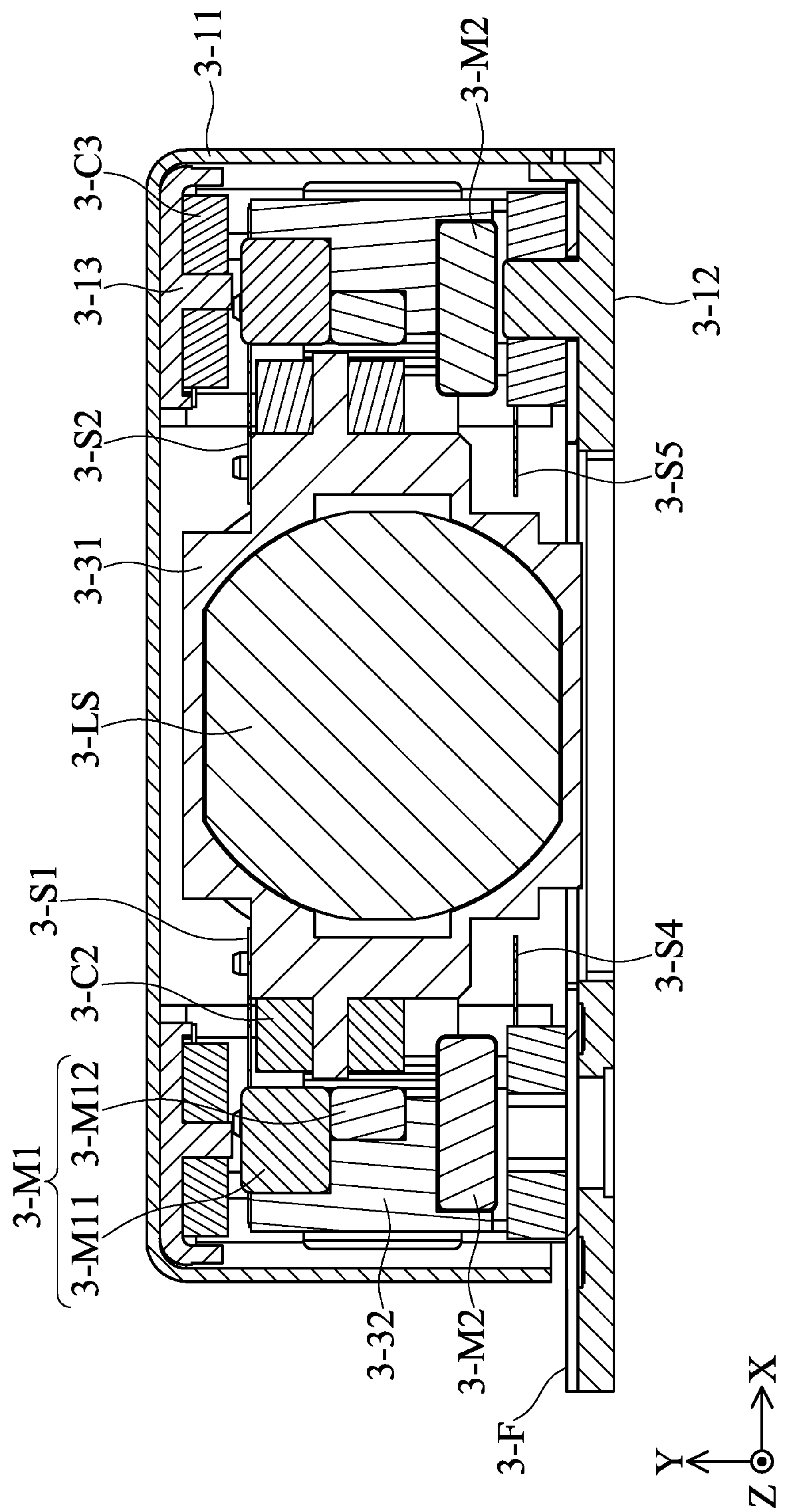
FIG. 28 is a schematic cross-sectional view taken along the line 3-A-3-A' in FIG. 27.

Referring to FIGS. 26 and 28, the movable part 3-30 includes an optical element holder 3-31 and a driving assembly holder 3-32, and the optical element holder 3-31 is used for connecting the optical element 3-LS, the driving assembly holder 3-32 is connected to at least a part of the driving assembly 3-MC. The driving assembly MC includes a plurality of coils 3-C1 to 3-C3 and a plurality of magnetic elements 3-M1 to 3-M3 (Those elements will be detailed later). The driving assembly holder 3-32 is connected to or carries at least a part of the driving assembly 3-MC, for example, is connected to the first and second magnetic elements 3-M1 and 3-M2 of the driving assembly 3-MC.

Figure 29:
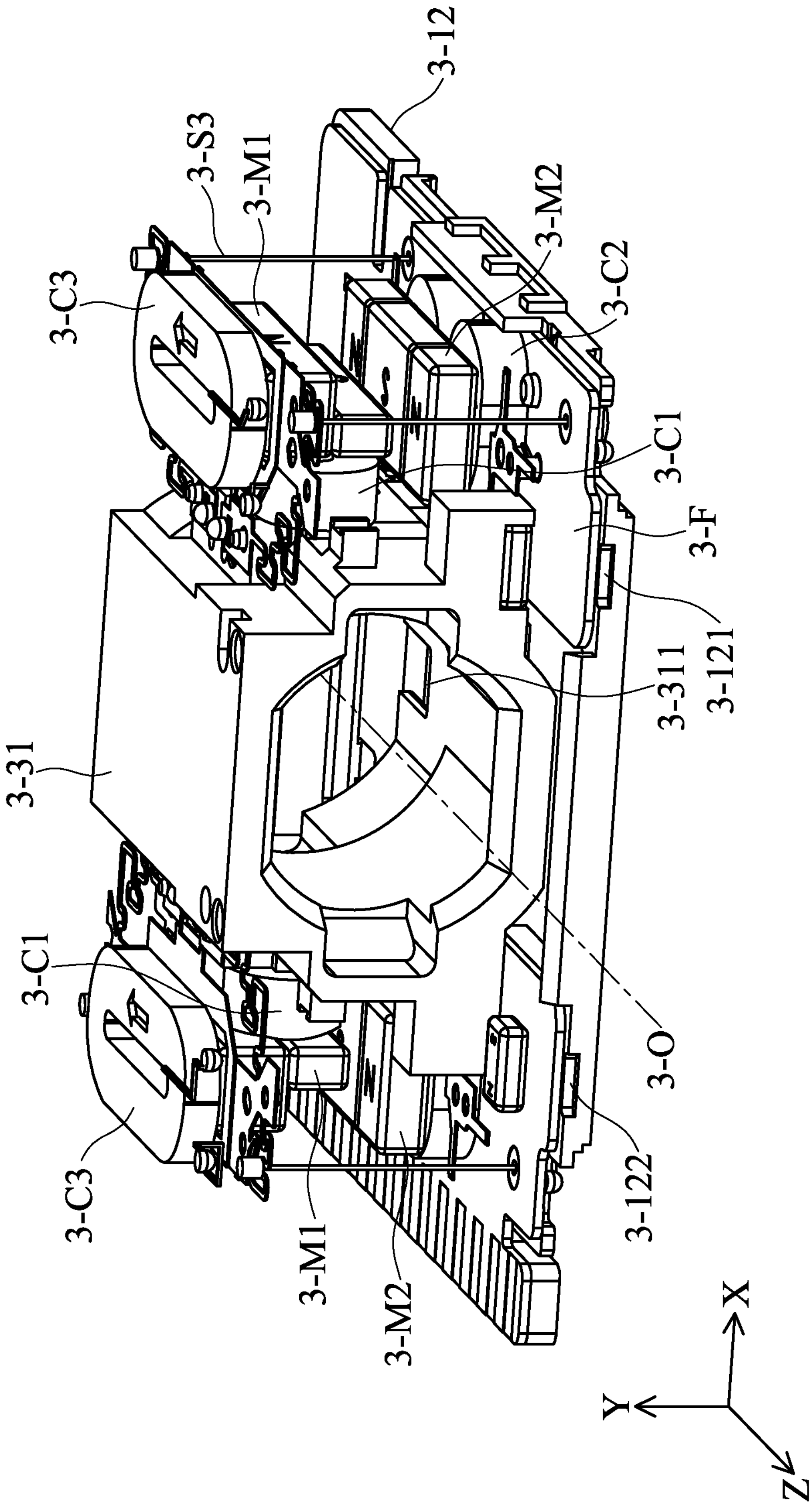
FIG. 29 is a schematic diagram of the optical element driving mechanism (the casing, the frame and the driving assembly holder are omitted)

Referring to FIGS. 26 and 29, regarding the driving assembly 3-MC, it may be an electromagnetic driving assembly, including a plurality of coils (including first, second, and third coils 3-C1, 3-C2, 3-C3) and a plurality of magnetic elements (including the first, second, and third magnetic elements 3-M1, 3-M2, 3-M3).

When a driving signal is applied to the driving assembly 3-MC (for example, a current is applied to the driving coil by an external power supply), a magnetic force is generated between the magnetic element and the coil, which can drive the movable part 3-30 to move relative to the fixed part 3-10. In this way, the driving assembly 3-MC can drive the movable part 3-30 and the optical element 3-LS to move along the optical axis 3-O, or move in a plane perpendicular to the optical axis 3-O, so as to achieve the optical image anti-shake, auto-focusing or changing the focal length.

Through the driving assembly 3-MC, the optical element holder 3-31 can move relative to the driving assembly holder 3-32, the optical element holder 3-31 can move relative to the fixed part 3-10, and the driving assembly holder 3-32 can move relative to the fixed part 3-10. The driving assembly 3-MC is used to drive the optical element holder 3-31 to move along a first dimension relative to the driving assembly holder 3-32, for example, through the first coil 3-C1 and the first magnetic element 3-M1. The driving assembly 3-MC is used to drive the driving assembly holder 32 to move along a second dimension relative to the fixed part 3-10, for example, through the second coil 3-C2 and the second magnetic element 3-M2. The driving assembly 3-MC is used to drive the driving assembly holder 3-32 to move along a third dimension relative to the fixed part 3-10, for example, through the third coil 3-C3 and the second magnetic element 3-M2 or the third magnetic element 3-M3. The aforementioned first and second dimensions are different; the second and third dimensions are different; the first dimension can be movement parallel to the first direction 3-D1; the movement in second dimension can be a movement that is parallel to the second direction 3-D2; the third dimension movement can be a movement that is parallel to the third direction 3-D3. The first, second, and third directions 3-D1, 3-D2, and 3-D3 are not parallel to each other; the first, second, and third directions are perpendicular to each other; the second dimension is parallel to the optical axis 3-O of the optical element 3-LS.

In some embodiments, each first magnetic element 3-M1 may include two first and second sub-magnetic elements 3-M11, 3-M12 with different thicknesses (in the X-axis direction), and they are arranged in the main axis 3-Q direction.

Continuing to refer to FIG. 29, the optical element holder 3-31 further includes a notch 3-311, and the arrangement direction of the notch 3-311 and the optical axis 3-O is perpendicular to the third direction 3-D3. The arrangement direction of the notch 3-311 and the optical axis 3-O is parallel to the first direction 3-D1. With the notch 3-311, the overall mechanism is thinner and the optical quality can be improved.

Figure 30:
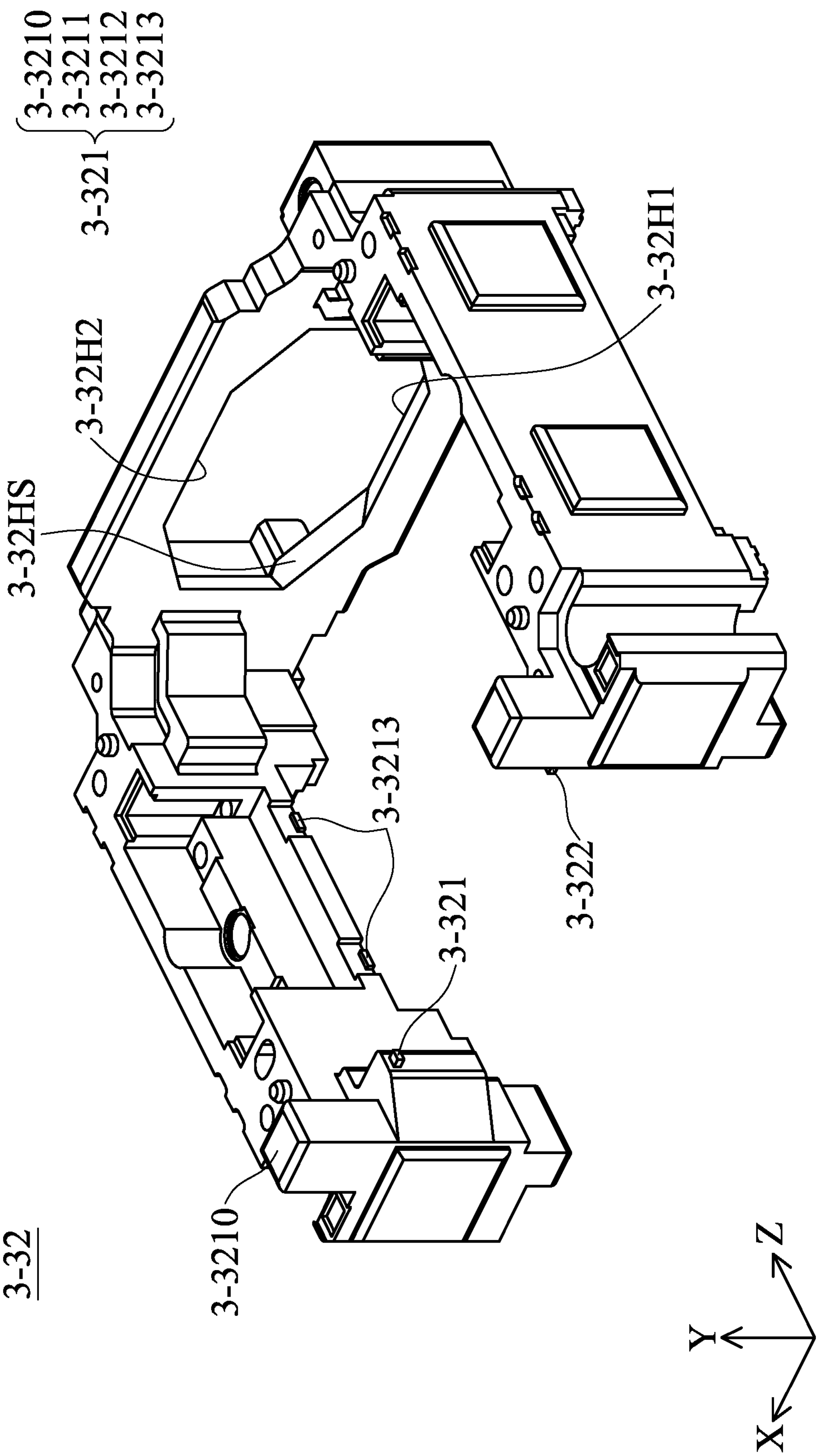
FIG. 30 is a schematic diagram of the driving assembly holder.

Referring to FIG. 30, the driving assembly holder 3-32 also includes a metal reinforcement assembly 3-321, which can strengthen the overall mechanical strength of the driving assembly holder 3-32. The metal reinforcement assembly 3-321 includes a main body 3-3210, a first reinforcement element 3-3211, a second reinforcement element 3-3212, and a third reinforcement element 3-3213. The main body 3-3210 has a non-metallic material. The first reinforcement element 3-3211 is made of a metal material and is at least partially embedded in the main body 3-3210, and at least partially exposed from the main body 3-3210. The second reinforcement element 3-3212 is at least partially embedded in the main body 3-3210, and at least partially exposed from the main body 3-3210. The exposed parts of the main body of the first and second reinforcing elements 3-3211 and 3-3212 extend in parallel 3-D3 along the third direction 3-D3. The third reinforcement element 3-3213 is made of a magnetic metal material, and is at least partially embedded in the main body 3-3210, and at least partially exposed from the main body 3-3210, and faces or contacts the second magnetic element 3-M2. Since the third reinforcement element 3-3213 is made of a magnetic metal material, the magnetic force between the magnetic element 3-M1~3-M3 and the coil 3-C1~3-C3 can be concentrated in a predetermined direction, thereby strengthening the driving ability of the driving assembly 3-MC, and can reduce the effect of magnetic interference, and enhance the overall mechanical strength of the driving assembly holder 3-32. In some embodiments, the third reinforcement element 3-3213 can be used as a permeability element.

The driving assembly holder 3-32 has an opening 3-32H, and the opening 3-32H has an outer opening portion 3-32H1, an inner opening portion 3-32H2, and an opening incline group 3-32HS. The opening area of the inner opening portion 3-32H2 is larger than the opening area of the outer opening portion 3-32H1. The opening incline group 3-32HS is located between the outer opening 3-32H1 and the inner opening 3-32H2, and connects the two. In some embodiments, an incline surface of the opening incline group 3-32HS connecting the outer opening 3-32H1 and the inner opening 3-32H2 is inclined by 25 to 30 degrees with respect to the reference plane XZ plane (or the top wall 3-111). Through the opening incline group 3-32HS, optical characteristics can be increased.

Referring to FIGS. 26 and 29, the supporting assembly 3-SS includes a first elastic element 3-S1 and a second elastic element 3-S2. The optical element holder 3-31 is movably connected to the driving assembly holder 3-32 via the first elastic element 3-S1. The first elastic element 3-S1 has a plate-shaped structure, and its extending direction is parallel to a first imaginary plane (ZX plane). The optical element holder 3-31 is movably connected to the driving assembly holder 3-32 via the second elastic element 3-S2. The second elastic element 3-S2 has a plate-shaped structure; the extending direction of the second elastic element 3-S2 is parallel to the first imaginary plane. The centers of the first and second elastic elements 3-S1, 3-S2 are arranged along the third direction 3-D3, and the first imaginary plane passes through the first and second elastic elements 3-S1, 3-S2. The first imaginary plane is perpendicular to the main axis 3-Q, and the first imaginary plane is parallel to the optical axis 3-O.

The supporting assembly 3-SS further includes a plurality of third elastic elements 3-S3, and the movable part 3-30 is movably connected to the fixed part 3-10 via the third elastic element 3-S3. The third elastic element 3-S3 has an elongated structure, the extending direction of the third elastic element 3-S3 is not parallel to the optical axis 3-O direction, the third elastic element 3-S3 is not parallel to the first imaginary plane, and the third elastic element 3-S3 is perpendicular to the first imaginary plane. In some embodiments, the plurality of third elastic elements 3-S3 can be used as an elastic assembly. In some embodiments, the supporting assembly 3-SS may include one third elastic element 3-S3, so that the movable part 3-30 can be movably connected to the fixed part 3-10.

The supporting assembly 3-SS also includes a fourth elastic element 3-S4 and a fifth elastic element 3-S5, which are arranged on the bottom side of the optical element holder 3-31 for elastically connecting the movable part 3-30 and fixed part 3-10.

Referring to FIG. 26, in some embodiments, the optical element driving mechanism 3-100 further includes a sensing assembly 3-N for sensing the movement of the movable part 3-30 relative to the fixed part 3-10. The sensing assembly 3-N includes: a first sensing element 3-N1 for sensing the movement of the optical element holder 3-31 relative to the driving assembly holder 3-32, wherein the first sensing element 3-N1 is used for sensing the movement of the optical element holder 3-31 relative to the driving assembly holder 3-32 in the first dimension; a second sensing element 3-N2 for sensing the movement of the driving assembly holder 3-32 relative to the fixed part 3-10, wherein the second sensing element 3-N2 for sensing the movement of the driving assembly holder 3-32 relative to the fixed part 3-10 in the second dimension; and a third sensing element 3-N3 is used to sense the movement of the driving assembly holder 3-32 relative to the fixed part 3-10, wherein the third sensing element 3-N3 is used to sense the movement of the driving assembly holder 3-32 relative to the fixed part 3-10 in the third dimension.

The first control unit 3-CN is electrically connected to the driving assembly 3-MC and the second sensing element 3-N2, and controls the driving assembly 3-MC according to the sensing signal output by the second sensing element 3-N2. The first control unit 3-CN and the second sensing element 3-N2 are located in a packaging unit 3-I; the first and third sensing elements 3-N1, 3-N3 and the driving assembly 3-MC are electrically connected to an external control unit 3-OT, which is located outside the optical element driving mechanism 3-100. The first control unit 3-CN is electrically connected to the external control unit 3-OT; the packaging unit 3-I is located in the optical element driving mechanism 3-100; and the first and third sensing elements 3-N1, 3-N2 are located in the optical element driving mechanism 3-100.

The optical element driving mechanism 3-100 also includes a circuit element 3-F, electrically connected to the first, second, and third sensing elements 3-N1, 3-N2, 3-N3. The driving assembly 3-MC and the first sensing element 3-N1 are respectively located on opposite sides (or upper and lower sides) of the circuit element 3-F, wherein the driving assembly 3-MC and the second and third sensing elements 3-N2, 3-N3 are respectively located on the opposite sides (or upper and lower sides) of circuit element 3-F. The base 3-12 includes a plurality of receiving portions 3-AP, corresponding to the first to third sensing elements 3-N1 to 3-N3. In the first direction 3-D1, the maximum size of the receiving portion 3-AP is larger than the maximum sizes of the first, second and third sensing elements 3-N1-3-N3, so the base 3-12 can protect the sensing elements 3-N1-3-N3 to avoid damage caused by impact.

Figure 31:
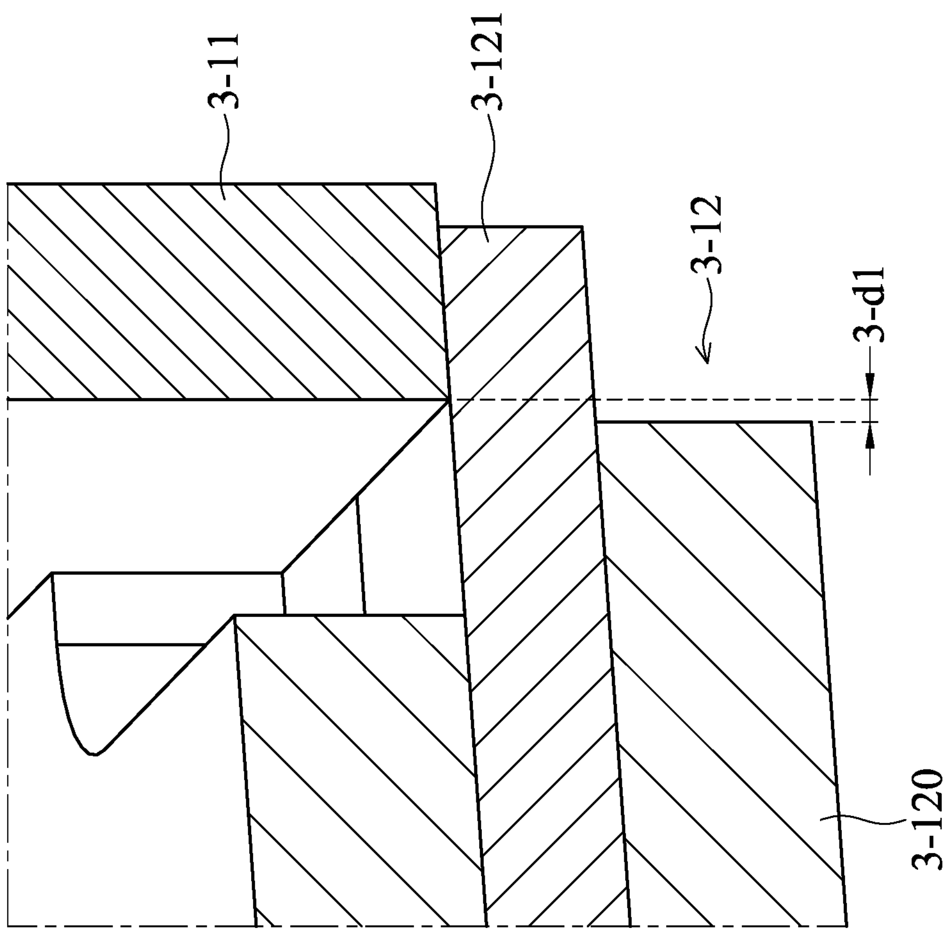
FIG. 31 is a partial cross-sectional schematic diagram of the casing and the base.

Referring to FIGS. 29 and 31, the base 3-12 includes: a non-metal body 3-120 and a first metal portion 3-121. The non-metal body 3-120 has a plate-shaped structure. The first metal portion 3-121 is made of metal and is at least partially embedded in the non-metal body 3-120, and the casing 3-11 has metal material and is welded to the first metal portion 3-121 through welding (by a metal connection processing method such as soldering, welding or resistance welding). The shortest distance between the first metal portion 3-121 and the casing (which can be zero) is less than the shortest distance 3-*d*1 between the non-metal body 3-120 and the casing, to ensure that the casing 3-11 and the first metal portion 3-121 can actually contact, thereby improving the welding quality.

The aforementioned base 3-12 also includes a second metal portion 3-122 having metal material and at least partially embedded in the non-metal body 3-120; the casing 3-11 and the second metal portion 3-122 are connected by welding. Similarly, the shortest distance (may be zero) between the second metal portion 3-122 and the casing 3-11 is smaller than the shortest distance between the non-metal body 3-120 and the casing 3-11 (such as the distance 3-*d*1).

Referring to FIGS. 26 and 29, the weld between the first and second metal portions 3-121, 3-122 and the casing 3-11 is located at the side 3-10S1 of the fixed part 3-10. The opening 3-10H of the fixed part 3-10 is corresponding to light. When viewed along the main axis 3-Q direction, the opening 3-10H is located at the side 3-10S1. The side wall 3-112 of the casing 3-11 has a plurality of (at least two) grooves 3-1121 and 3-1122, corresponding to the first and second metal portions 3-121 and 3-122, respectively. The grooves 3-1121, 3-1122 and the opening 3-10H are located on the side surface 3-10P1 of the fixed part 3-10. The side surface 3-10P1 is perpendicular to the optical axis 3-O; the side surface 3-10P1 is parallel to the main axis 3-Q; the casing 3-11 is electrically connected to an external ground circuit via the first metal portion 3-121 for grounding.

Figure 32:
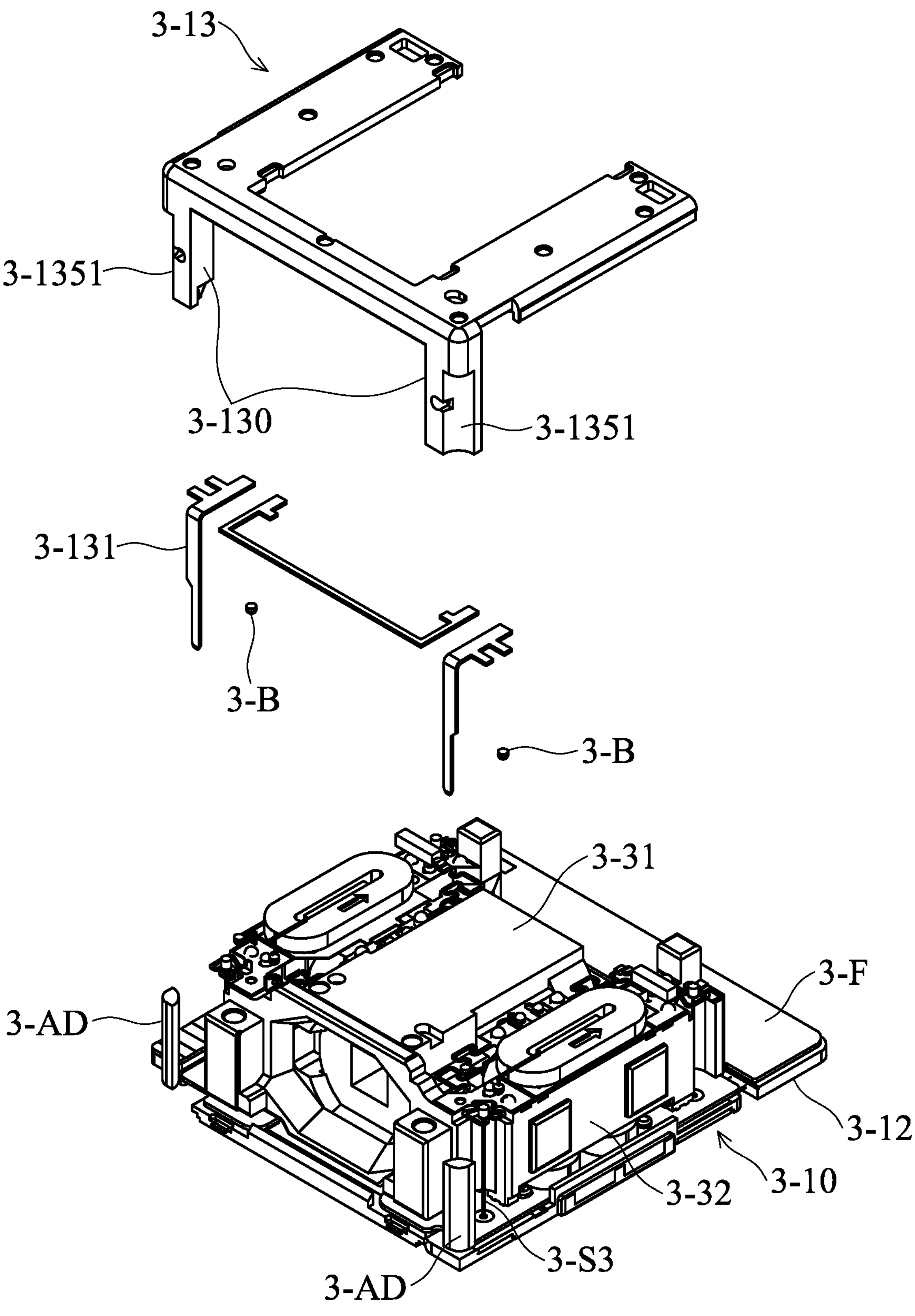
FIG. 32 is an exploded view diagram of the frame, the first circuit and the electrical connecting member.

Referring to FIG. 32, the frame 3-13 of the fixed part 3-10 is fixedly disposed on the casing 3-11. The frame 3-13 has an extension portion 3-130 extending toward the base 3-12. When viewed along the direction of the main axis 3-Q, the extension portion 3-130 is located at the corner of the fixed part 3-10. The frame 3-13 also has a first circuit 3-131 electrically connected to the driving assembly 3-MC. The first circuit 3-131 is at least partially embedded in the frame 3-13, and is not exposed outside the frame 3-13. The first circuit 3-131 is at least partially located or embedded in the extension portion 3-130, the first circuit 3-131 is electrically connected to the aforementioned circuit element 3-F, and the first circuit 3-131 is electrically connected to circuit element 3-F via the electrical connecting members 3-B (for example, solders). The surface of the first circuit 3-131 directly in contact with the electrical connecting members 3-B is not parallel to the surface of the circuit element 3-F directly in contact with the electrical connecting members 3-B. In some embodiments, the surface of the first circuit 3-131 directly contacting the electrical connecting members 3-B is perpendicular to the surface of the circuit element 3-F directly contacting the electrical connecting members 3-B.

The extension portion 3-130 of the frame 3-13 corresponds to the side wall 3-112 of the casing 3-11, and the extension portion 3-130 has a recessed structure 3-1351 to accommodate a connecting element 3-AD, such as glue, adhesive, gel or colloid. The connecting element 3-AD directly contacts the casing 3-11 and the frame 3-13, and the connecting element 3-AD directly contacts the base 3-12.

Figure 33:
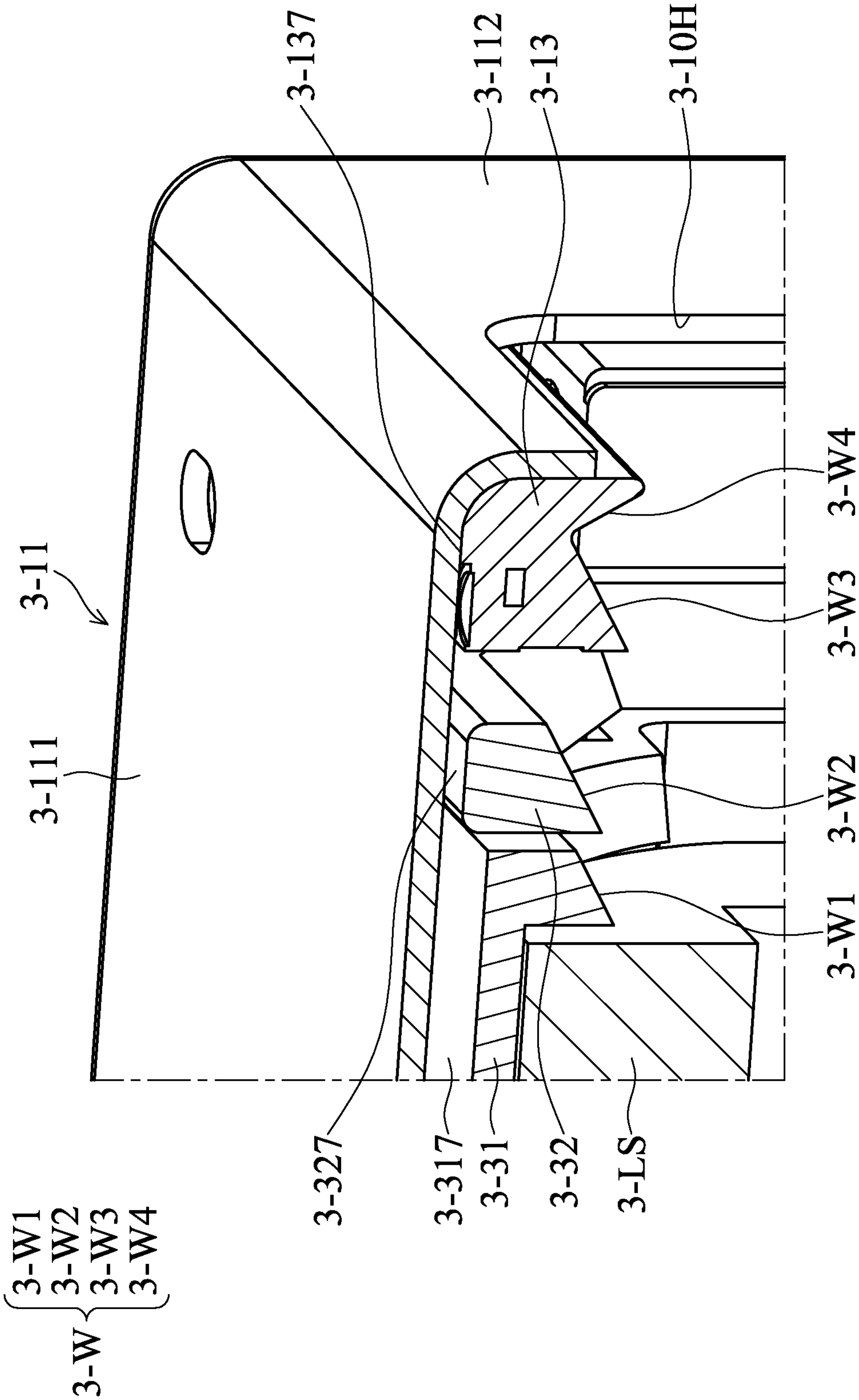
FIG. 33 is a schematic cross-sectional view taken along the line 3-B-3-B' in FIG. 27.
Figure 34:
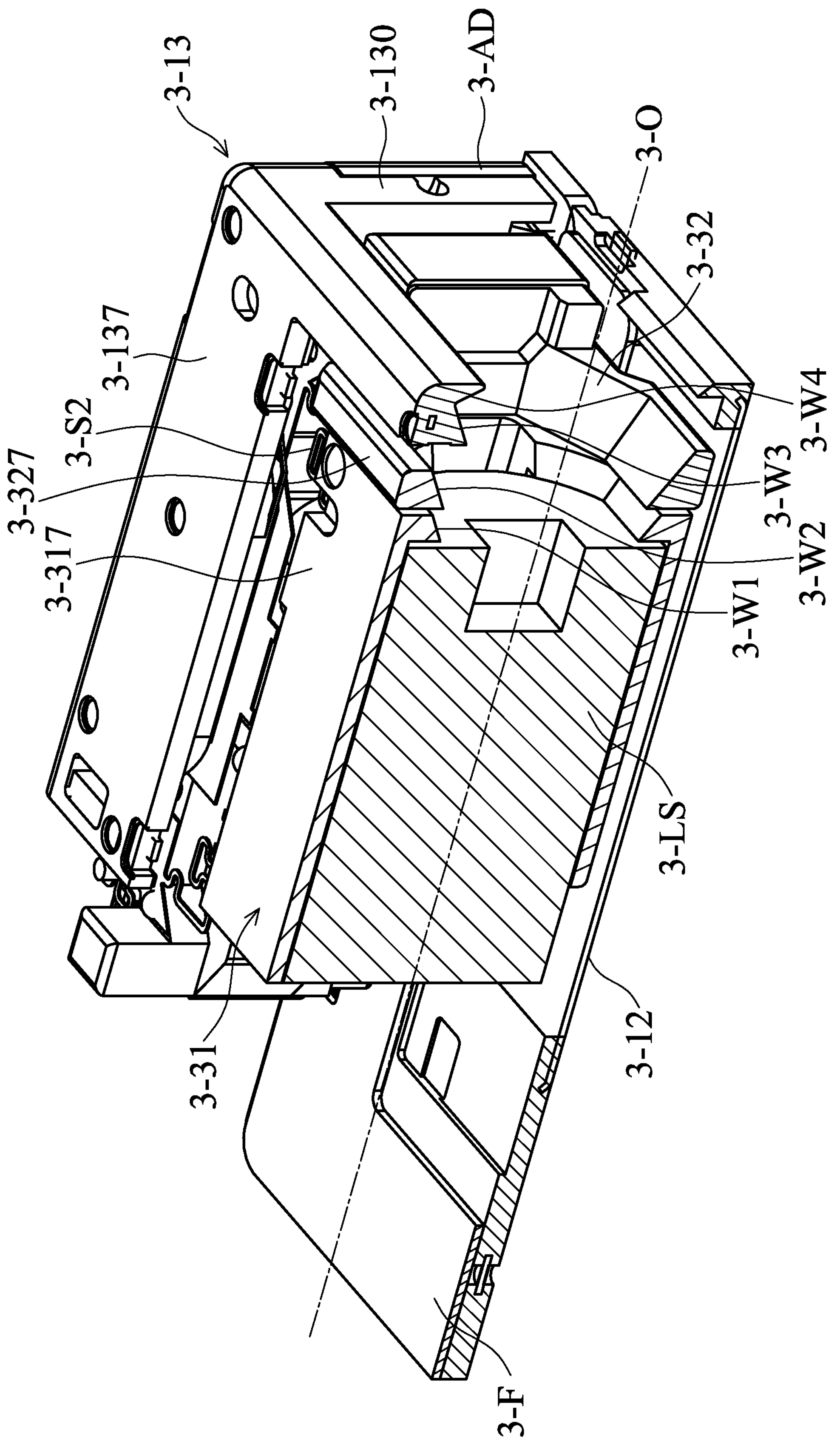
FIG. 34 is a schematic cross-sectional view taken along the line 3-C-3-C' in FIG. 27 (the casing is omitted)

Referring to FIGS. 33 and 34, the optical element holder 3-31 is formed with a first anti-reflection surface 3-W1; the driving assembly holder 3-32 is formed with a second anti-reflection surface 3-W2; and the frame 3-13 is formed with a third anti-reflection surface 3-W3 and a fourth anti-reflection surface 3-W4. In some embodiments, the optical element driving mechanism 3-100 can be defined as further including a stray light preventing component 3-W, which is used to prevent a stray light generated by light reflected (via the optical path adjustment unit 3-P) from entering and passing through the opening 3-10H of the fixed part 3-10 (or of the casing 3-11). The stray light preventing component 3-W includes: a first anti-reflection surface 3-W1, a second anti-reflection surface 3-W2, a third anti-reflection surface 3-W3, and a fourth anti-reflection surface 3-W4.

The aforementioned first anti-reflection surface 3-W1 has a planar structure and is not parallel or perpendicular to the optical axis 3-O. The first anti-reflection surface 3-W1 is disposed on the optical element holder 3-31. In this embodiment, the reflectivity of the first anti-reflective surface 3-W1 is lower than that of the optical element holder surface 3-317 of the optical element holder 3-31, and the first anti-reflective surface 3-W1 and the optical element holder surface 3-317 are not parallel. The roughness of the first anti-reflection surface 3-W1 is different from the roughness of the optical element holder surface 3-317. The first anti-reflection surface 3-W1 has an anti-reflection coating. The first anti-reflection surface 3-W1 faces the opening 3-10H.

The aforementioned second anti-reflective surface 3-W2 has a planar structure, is arranged on the driving assembly holder 3-32, and is not parallel or perpendicular to the optical axis 3-O. The reflectivity of the second anti-reflective surface 3-W2 is lower than the reflectivity of the driving assembly holder surface 3-327 of the driving assembly holder 3-32. The second anti-reflection surface 3-W2 is not parallel to the driving assembly holder surface 3-327. The roughness of the second anti-reflective surface 3-W2 is different in the roughness of the driving assembly holder surface 3-327. The second anti-reflection surface 3-W2 has an anti-reflection coating. The second anti-reflection surface 3-W2 faces the opening 3-10H. When viewed along the direction of the optical axis 3-O, the first anti-reflection surface 3-W1 and the second anti-reflection surface 3-W2 at least partially overlap.

The aforementioned third anti-reflection surface 3-W3 has a planar structure, is disposed on the frame 3-13, and is not parallel or perpendicular to the optical axis 3-O. The reflectivity of the third anti-reflection surface 3-W3 is lower than the reflectivity of the frame surface 3-137 of the frame 3-13. The third anti-reflection surface 3-W3 is not parallel to the frame surface 3-137. The roughness of the third anti-reflection surface 3-W3 is different from the roughness of the frame surface 3-137. The third anti-reflection surface 3-W3 has an anti-reflection coating. The third anti-reflection surface 3-W3 faces the opening 3-10H. When viewed along the optical axis direction 3-O, the second anti-reflection surface 3-W2 and the third anti-reflection surface 3-W3 at least partially overlap, and the first anti-reflection surface 3-W1 and the third anti-reflection surface 3-W3 at least partially overlap.

The aforementioned fourth anti-reflection surface 3-W4 has a planar structure, and is disposed on the frame 3-13, and is not parallel or perpendicular to the optical axis 3-O. The reflectivity of the fourth anti-reflection surface 3-W4 is lower than that of the frame surface 3-137. In some embodiments, the third and fourth anti-reflective surfaces 3-W3, 3-W4 have the same reflectivity. The fourth anti-reflection surface 3-W4 is not parallel to the frame surface 3-137. The roughness of the fourth anti-reflection surface 3-W4 is different from the roughness of the frame surface 3-137. The fourth anti-reflection surface 3-W4 has an anti-reflection coating. The fourth anti-reflection surface 3-W4 faces the optical element 3-LS. When viewed along the optical axis 3-O direction, the first anti-reflection surface 3-W1 and the fourth anti-reflection surface 3-W4 at least partially overlap, and the second anti-reflection surface 3-W2 and the fourth anti-reflection surface 3-W4 at least partially overlap, and the third anti-reflection surface 3-W3 and the fourth anti-reflection surface 3-W4 at least partially overlap.

The above-mentioned stray light preventing component 3-W can be used to prevent extra reflections generated by light in the mechanism, or to shield extra reflected stray light so that stray light does not easily enter the opening 3-10H of the fixed part 3-10, greatly improve the quality of shooting or optics.

In summary, an embodiment of the present invention provides an optical element driving mechanism, including a movable part for connecting an optical element; a fixed part, wherein the movable part can move relative to the fixed part; a driving assembly for driving the movable part to move relative to the fixed part; and a supporting assembly, wherein the movable part can move relative to the fixed part in multiple dimensions via the supporting assembly.

The embodiment of the present invention has at least one of the following advantages or effects. In the periscope optical system, by driving the optical element in three dimensions in the optical element driving mechanism, wherein the optical path adjustment unit is relatively fixed and does not move, the alignment procedures between the components can be simplified, thereby improving the assembly efficiency. Furthermore, the overall mechanism can be miniaturized. In some embodiments, the anti-reflection surfaces can effectively reduce the stray light generated when light is reflected or refracted by the optical path adjustment unit, so as to improve the optical quality. It can also adjust the wide range of shooting by zooming, focusing and optical anti-shake, and better optical quality can be acquired even when there are external interference elements.

Figure 35:
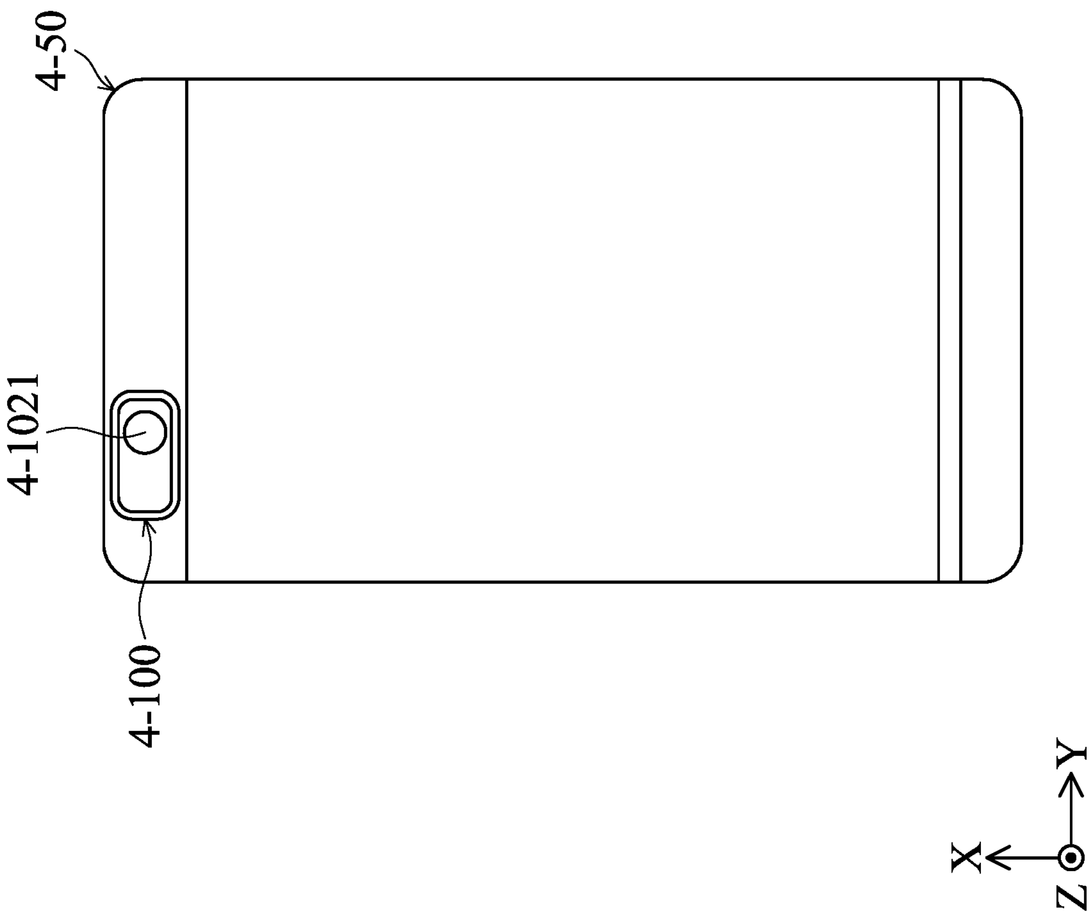
FIG. 35 is a schematic diagram of an optical system 4-100 installed on a portable electronic device 4-50 according to an embodiment of the present disclosure.

Please refer to FIG. 35, which is a schematic diagram of an optical system 4-100 installed on a portable electronic device 4-50 according to an embodiment of the present disclosure. The portable electronic device 4-50 can be any portable device or handheld device, such as a personal digital assistant (PDA), a smartphone, a tablet, a mobile phone, a mobile Internet device (MID), a notebook computer, a car computer, a gaming device or any other type of mobile computing device. However, it will be understood by a person skilled in the art that the present disclosure is not limited to those devices.

In this embodiment, the optical system 4-100 can be a lens system with a long focal length, which can provide the user with a better shooting effect, and light can enter the optical system 4-100 through an opening 4-1021 so as to capture images. In addition, in an embodiment, the optical system 4-100 may also include a wide-angle lens system (not shown in the figures) to capture a larger range of images, and this image can be processed along with an image obtained by the long focal length lens system by the processor of the portable electronic device 4-50 to obtain a better final image.

Figure 36:
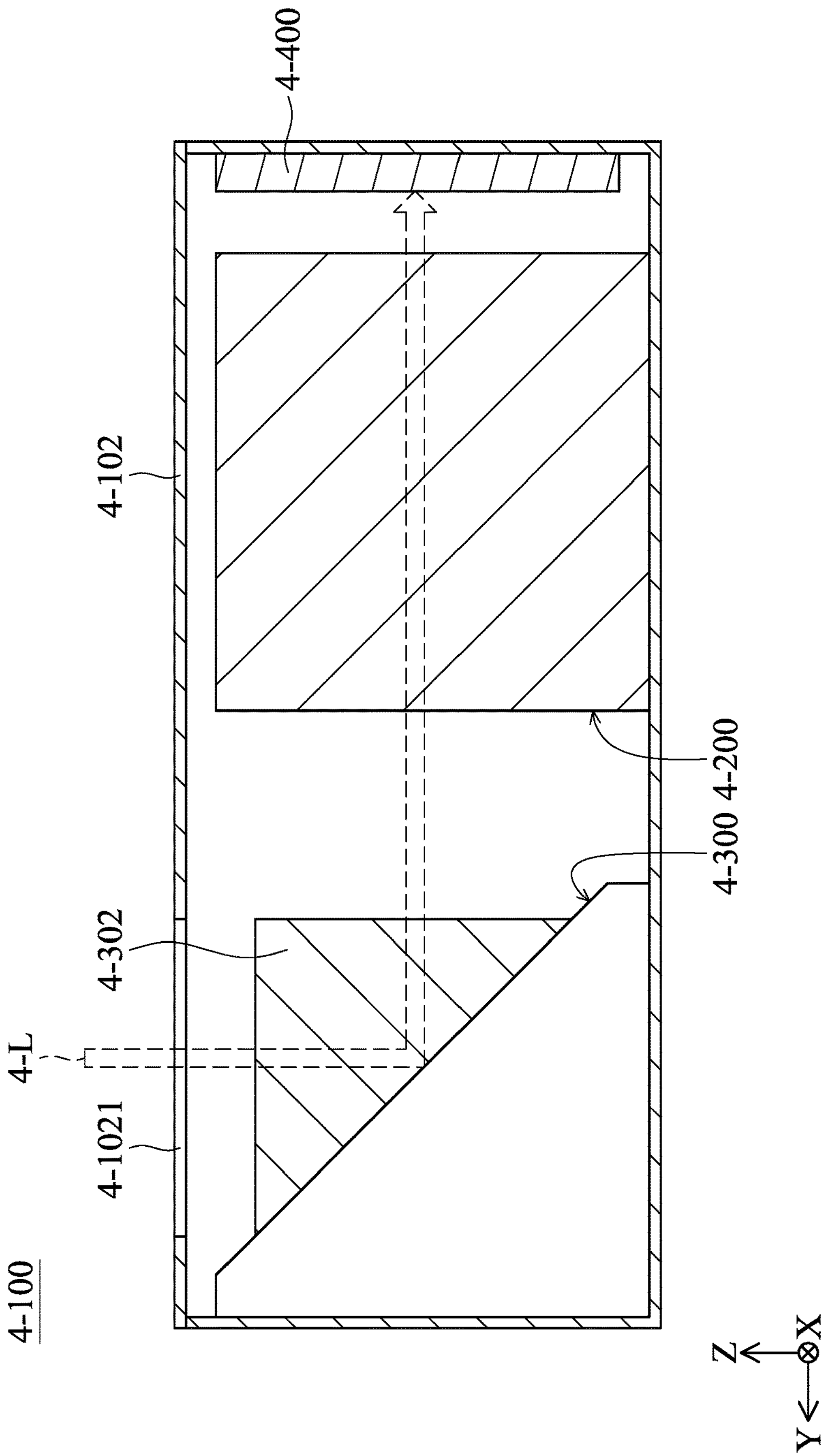
FIG. 36 is a cross-sectional view of the optical system 4-100 in FIG. 35 according to an embodiment of the present disclosure.

Please refer to FIG. 36, which is a cross-sectional view of the optical system 4-100 in FIG. 35 according to an embodiment of the present disclosure. The optical system 4-100 includes a casing 4-102, a lens unit 4-200, an optical element driving mechanism 4-300, and a sensing element 4-400. The casing 4-102 is installed in the portable electronic device 4-50 shown in FIG. 35, and the lens unit 4-200 and the optical element driving mechanism 4-300 are installed in the casing 4-102. The external light 4-L can pass through the opening 4-102 of the casing 4-102 in the Z-axis and enter the casing 4-102.

The optical element driving mechanism 4-300 includes an optical element 4-302 for reflecting the light 4-L incident in the Z-axis to the lens unit 4-200 in the −Y axis direction. The lens unit 4-200 includes one or more lenses (not shown in the figure) for guiding the light 4-L to the sensing element 4-400, and the sensing element 4-400 generates electronic signal after receiving the light 4-L and transmits the electronic signal to the processor of the portable electronic device 4-50 to generate a digital image.

Figure 37:
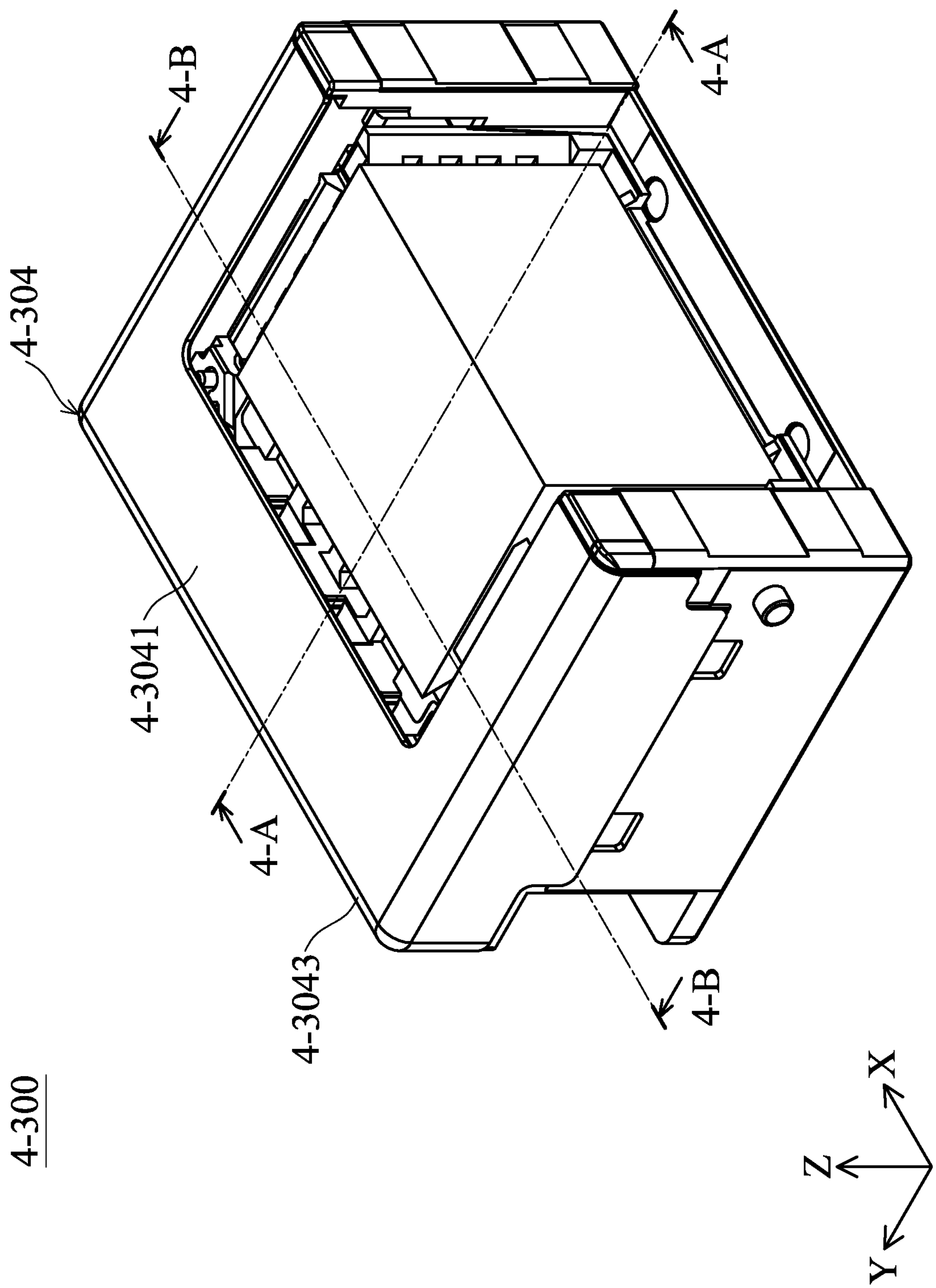
FIG. 37 is a perspective view of the optical element driving mechanism 4-300 according to an embodiment of the present disclosure.
Figure 38:
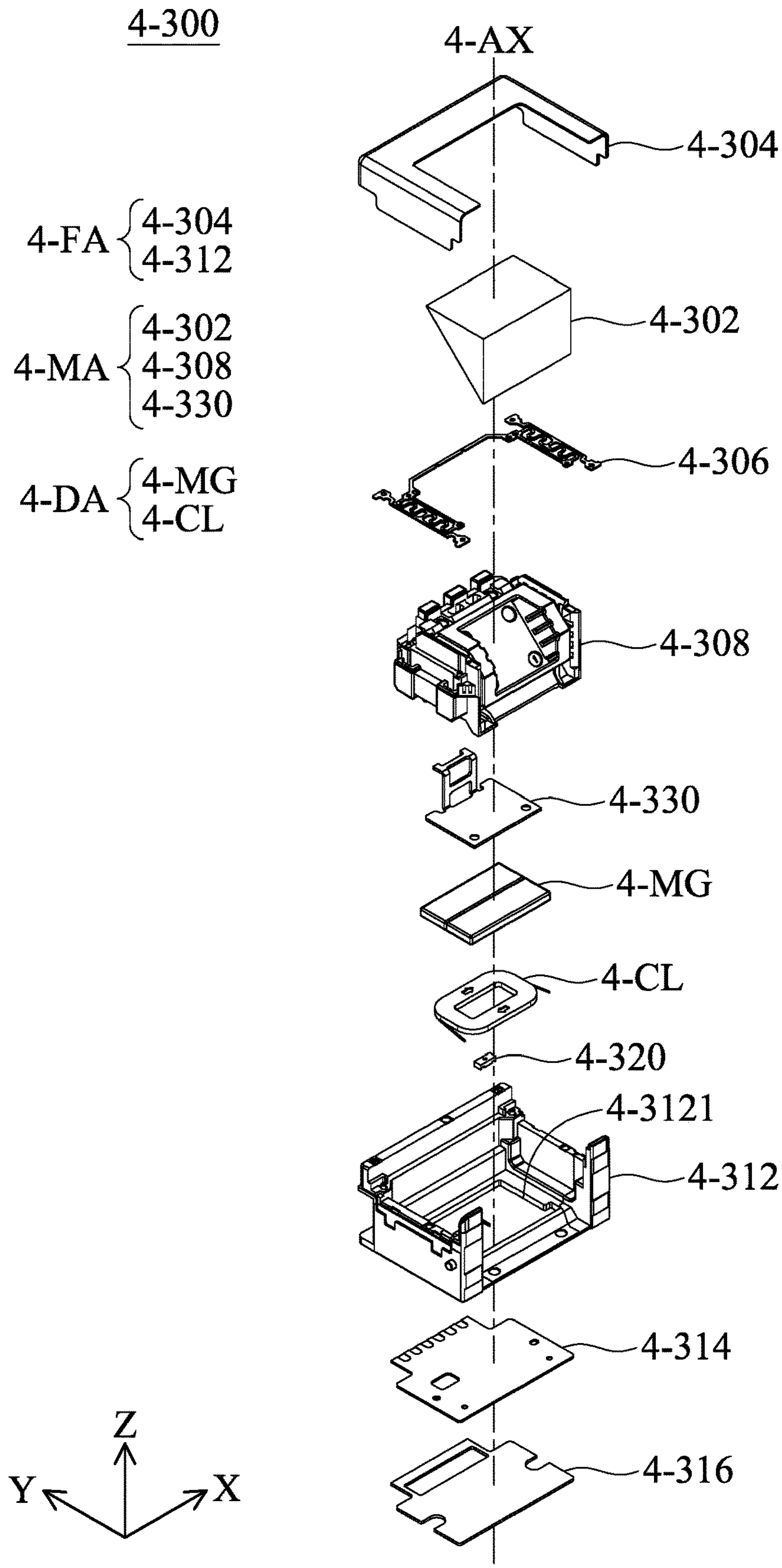
FIG. 38 is an exploded diagram of the optical element driving mechanism 4-300 according to an embodiment of the present disclosure.

Please refer to FIG. 37 and FIG. 38. FIG. 37 is a perspective view of the optical element driving mechanism 4-300 according to an embodiment of the present disclosure, and FIG. 38 is an exploded diagram of the optical element driving mechanism 4-300 according to an embodiment of the present disclosure. As shown in the figures, the optical element driving mechanism 4-300 further includes a fixed assembly 4-FA, a movable assembly 4-MA, a driving assembly 4-DA, an elastic member 4-306, a circuit assembly 4-314, and a reinforcement member 4-316. The movable assembly 4-MA can move relative to the fixed assembly 4-FA. The driving assembly 4-DA is configured to drive the movable assembly 4-MA to move relative to the fixed assembly 4-FA. The circuit assembly 4-314 is electrically connected to the driving assembly 4-DA.

In this embodiment, the fixed assembly 4-FA may include an outer frame 4-304 and a base 4-312. The base 4-312 and the outer frame 4-304 are arranged along a main axis 4-AX, and the outer frame 4-304 can be fixedly connected to the base 4-312. The movable assembly 4-MA may include the optical element 4-302, a strengthening element 4-330, and a lens holder 4-308. The optical element 4-302 is disposed on the lens holder 4-308, and the strengthening element 4-330 is disposed at the bottom of lens holder 4-308.

The driving assembly 4-DA may include a driving magnet 4-MG (the magnetic element) and a driving coil 4-CL. The driving magnet 4-MG may be disposed on the strengthening element 4-330, and the driving coil 4-CL may be disposed on the circuit assembly 4-314. The reinforcement member 4-316 can be connected to the circuit assembly 4-314, and the circuit assembly 4-314 can be disposed on the base 4-312. The circuit assembly 4-314 is a flexible circuit board, and the reinforcement member 4-316 is made of rigid material, so as to support the circuit assembly 4-314.

Figure 39:
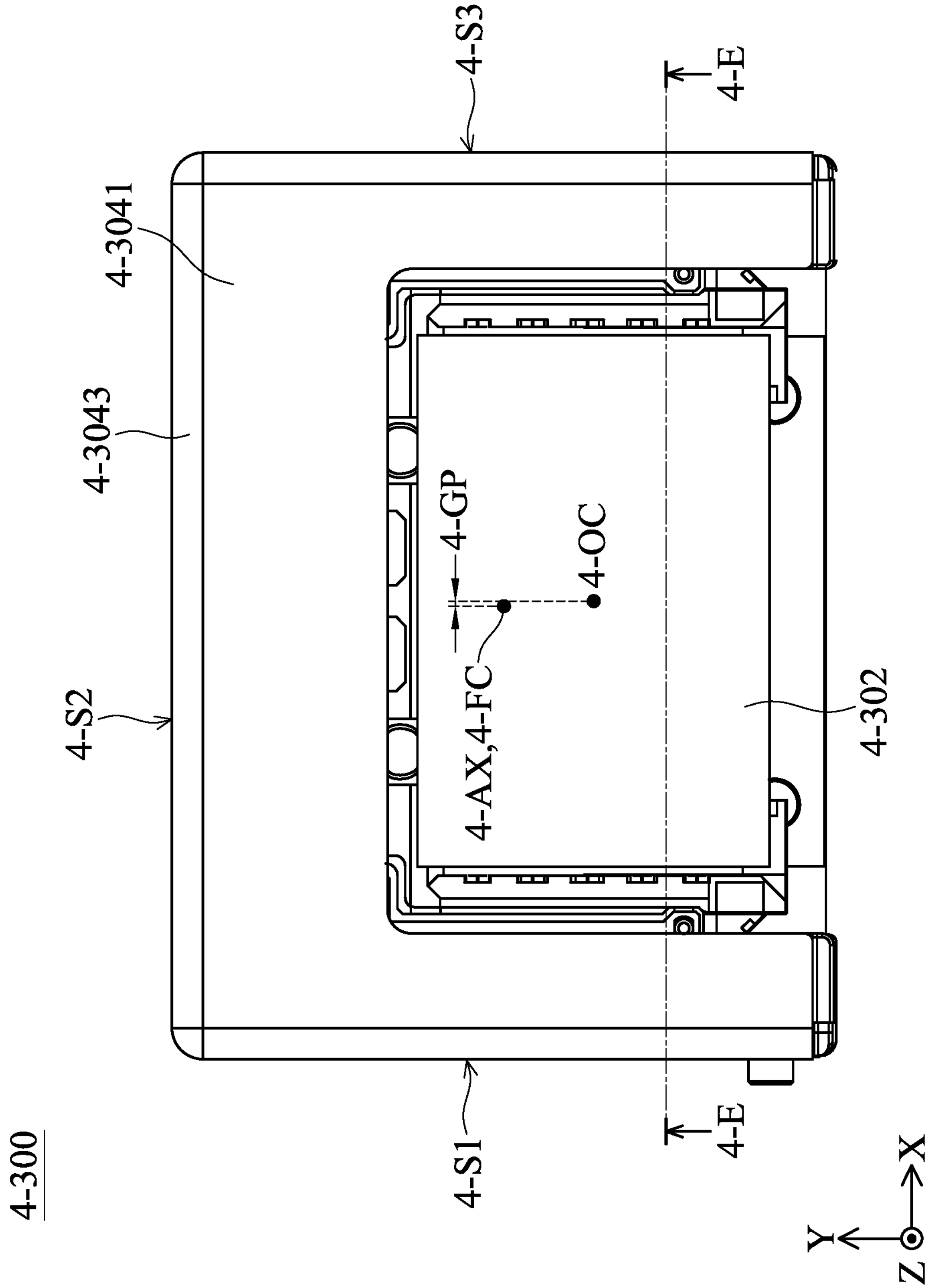
FIG. 39 is a top view of the optical element driving mechanism 4-300 according to an embodiment of the present disclosure.
Figure 40:
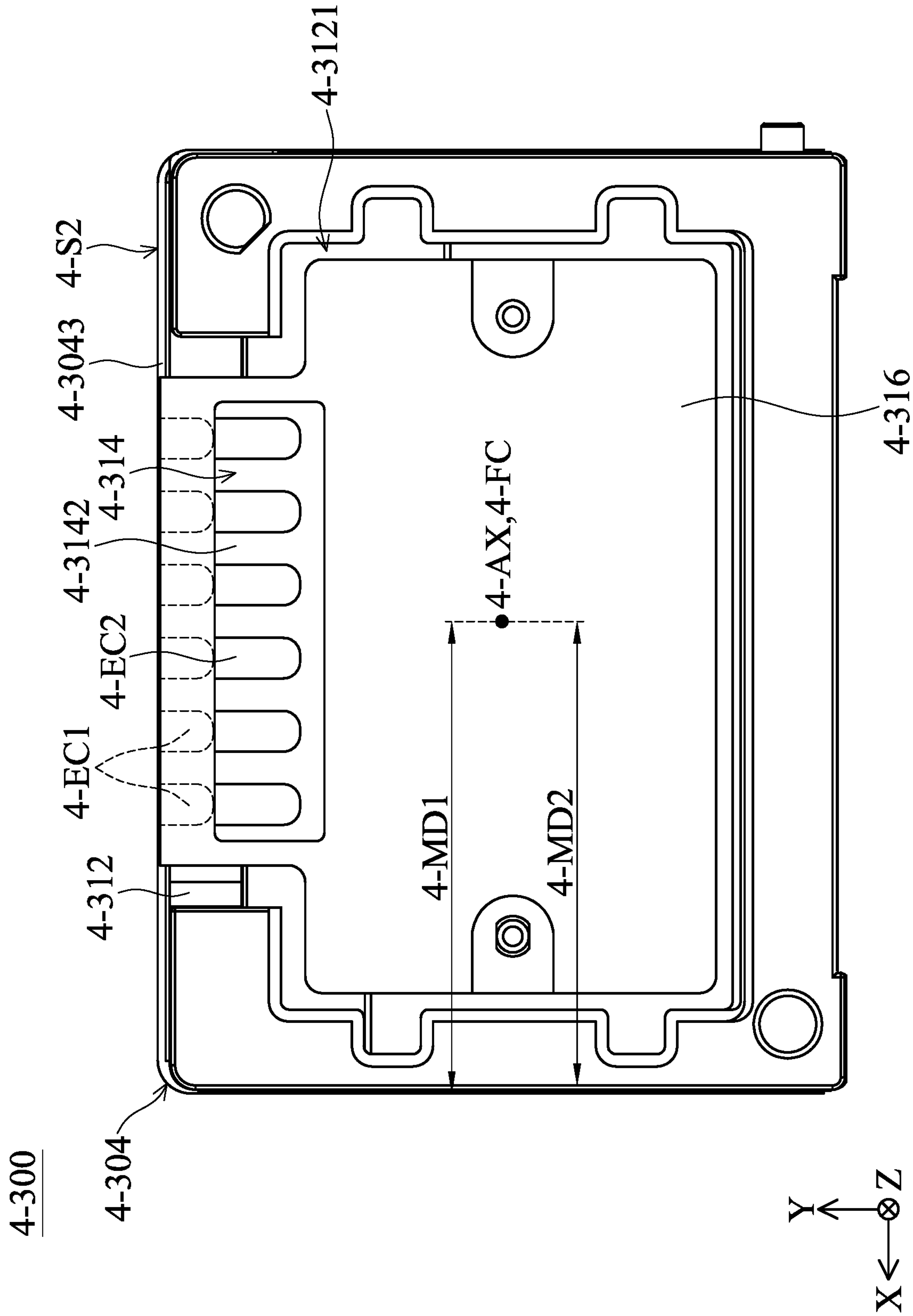
FIG. 40 is a bottom view of the optical element driving mechanism 4-300 according to an embodiment of the present disclosure.
Figure 41:
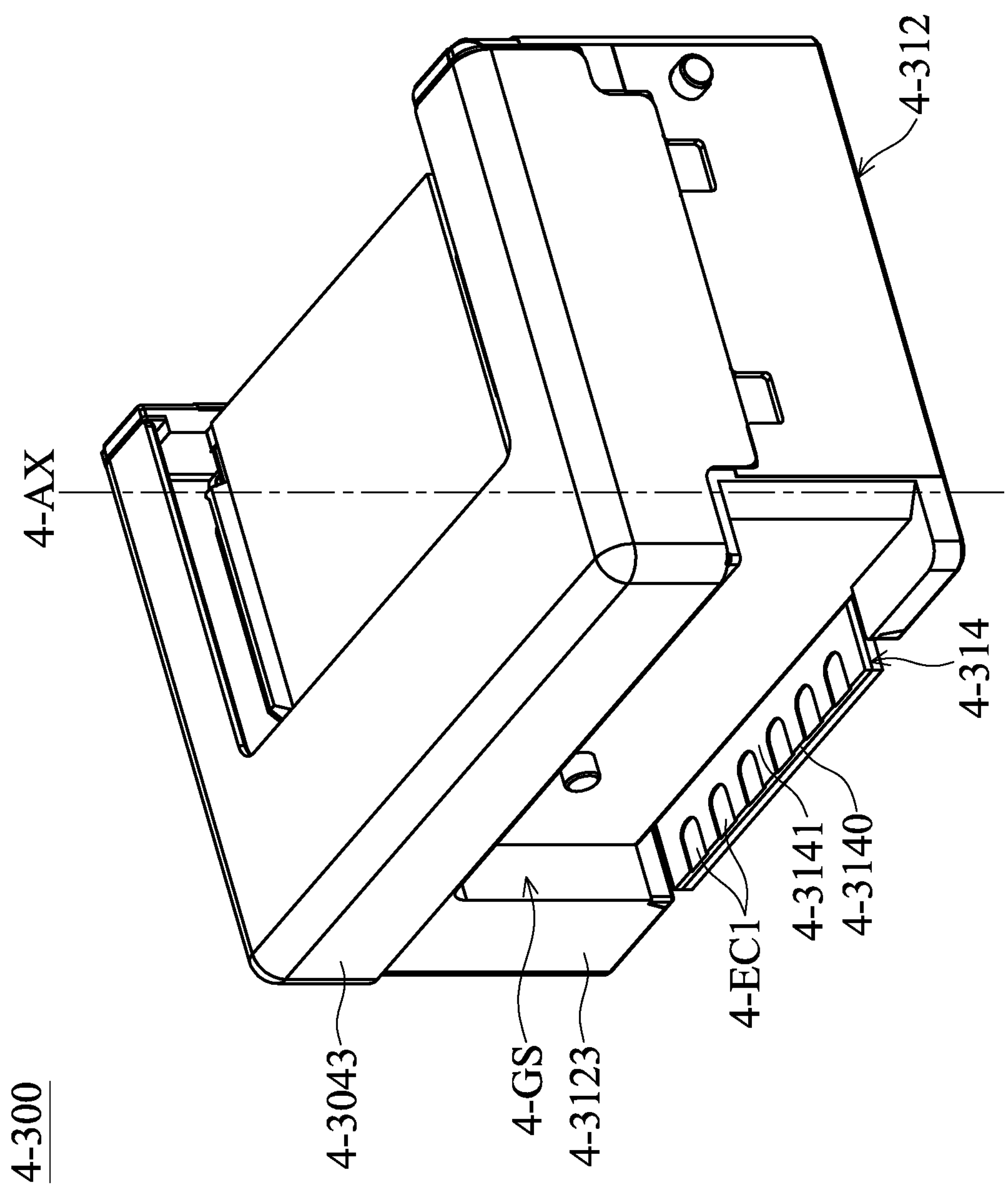
FIG. 41 is a diagram of the optical element driving mechanism 4-300 in another view according to an embodiment of the present disclosure.

Please refer to FIG. 37, FIG. 39 to FIG. 41. FIG. 39 is a top view of the optical element driving mechanism 4-300 according to an embodiment of the present disclosure, FIG. 40 is a bottom view of the optical element driving mechanism 4-300 according to an embodiment of the present disclosure, and FIG. 41 is a diagram of the optical element driving mechanism 4-300 in another view according to an embodiment of the present disclosure.

As shown in FIG. 37, in this embodiment, the outer frame 4-304 has a top surface 4-3041 and a side wall 4-3043 extending from the top surface 4-3041. The top surface 4-3041 and the side wall 4-3043 are not parallel to each other. As shown in FIG. 39, when viewed along the main axis 4-AX, the main axis 4-AX passes through a center 4-FC of the fixed assembly 4-FA.

In addition, as shown in FIG. 40, when viewed along the main axis 4-AX, the maximum distance 4-MD1 between the outer frame 4-304 and the main axis 4-AX is greater than the maximum distance 4-MD2 between the base 4-312 and the main axis 4-AX.

As shown in FIG. 37 and FIG. 39, when viewed along the main axis 4-AX, the fixed assembly 4-FA has a rectangular structure. When viewed along the main axis 4-AX, the fixed assembly 4-FA further includes a first side 4-S1 and a second side 4-S2. The extending directions of the first side 4-S1 and the second side 4-S2 are different. For example, the first side 4-S1 extends in the Y-axis, and the second side 4-S2 extends in the X-axis. As shown in FIG. 39, the length of the first side 4-S1 is different than the length of the second side 4-S2.

As shown in FIG. 38, FIG. 40, and FIG. 41, in this embodiment, the circuit assembly 4-314 has a plate-shaped structure, the base 4-312 has an opening 4-3121, and the circuit assembly 4-314 and the driving coil 4-CL of the driving assembly 4-DA are located in the opening 4-3121.

As shown in FIG. 41, the base 4-312 further includes a base side wall 4-3123 extending along the main axis 4-AX. The base side wall 4-3123 can form a recessed space 4-GS corresponding to a plurality of external contacts 4-EC1 on the circuit assembly 4-314 for connecting an external circuit. Specifically, the plurality of the external contacts 4-EC1 are located in the recessed space 4-GS and exposed to the external environment.

Furthermore, as shown in FIG. 40, when viewed along the main axis 4-AX, the base 4-312 overlaps at least a portion of the external contacts 4-EC1. When viewed along the main axis 4-AX, the outer frame 4-304 overlaps at least a portion of the external contacts 4-EC1. When viewed along the main axis 4-AX, the circuit assembly 4-314 does not exceed the fixed assembly 4-FA. When viewed along the main axis 4-AX, the circuit assembly 4-314 does not extend beyond the side wall 4-3043. When viewed along the main axis 4-AX, the circuit assembly 4-314 extends beyond the base 4-312.

Based on the above structural design, the circuit assembly 4-314 will not be easily damaged by the impact of external components.

Furthermore, as shown in FIG. 39 and FIG. 40, in this embodiment, the length of the first side 4-S1 is shorter than the length of the second side 4-S2. When viewed along the main axis 4-AX, the fixed assembly 4-FA further includes a third side 4-S3, which is parallel to the first side 4-S1. When viewed along the main axis 4-AX, the external contacts 4-EC1 are located on the second side 4-S2. When viewed along the main axis 4-AX, a distance 4-GP is between the center 4-FC of the fixed assembly 4-FA and the center 4-OC of the optical element 4-302, and the distance is not zero. When viewed along the main axis 4-AX, the center 4-OC of the optical element 4-302 is closer to the third side 4-S3 than the center 4-FC of the fixed assembly 4-FA.

As shown in FIG. 40 and FIG. 41, the circuit assembly 4-314 further includes a body 4-3140, a first surface 4-3141, a second surface 4-3142, and at least one test contact 4-EC2. The body 4-3140 is made of non-metallic material, the external contacts 4-EC1 are located on the first surface 4-3141, and the test contacts 4-EC2 are configured to test whether the driving assembly 4-DA works normally. The second surface 4-3142 and the first surface 4-3141 face different directions. The test contacts 4-EC2 are located on the second surface 4-3142. The external contacts 4-EC1 have a metal material and are exposed from the body 4-3140, and the test contacts 4-EC2 have a metal material and are exposed from the body 4-3140.

Figure 42:
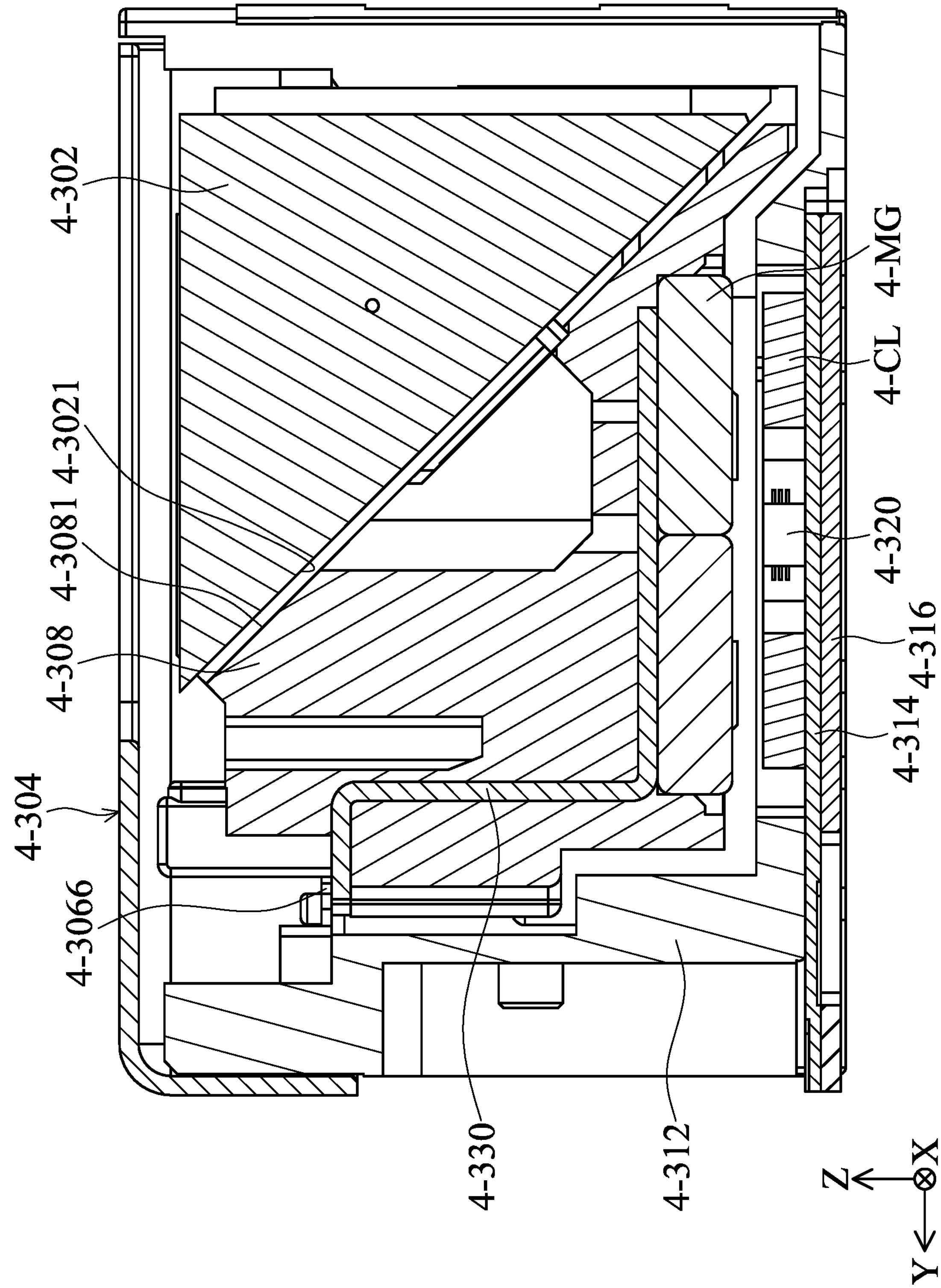
FIG. 42 is a cross-sectional view along the line 4-A-4-A in FIG. 37 according to an embodiment of the present disclosure.
Figure 43:
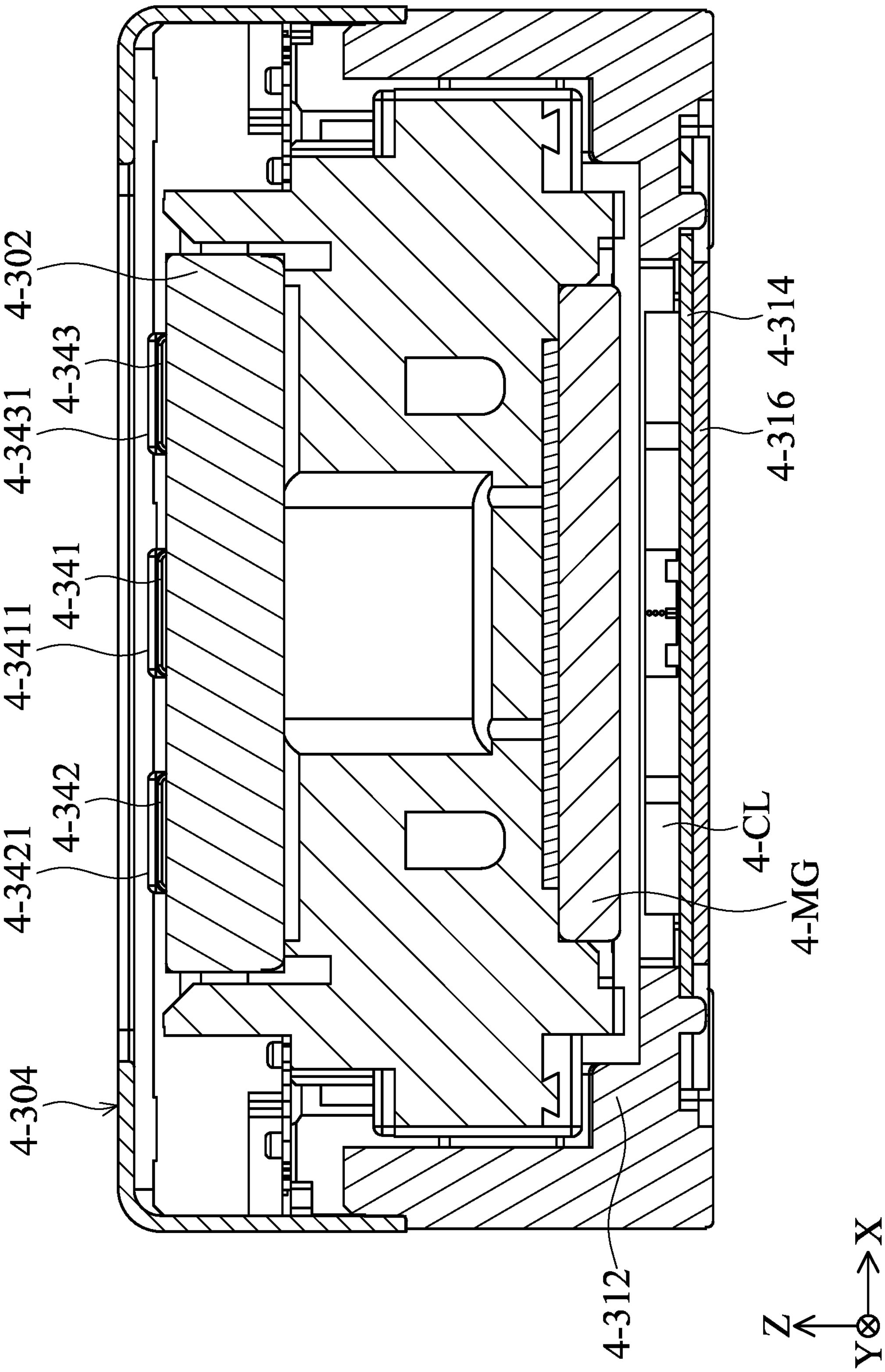
FIG. 43 is a cross-sectional view along the line 4-B-4-B in FIG. 37 according an embodiment of the present disclosure.

Please refer to FIG. 42 and FIG. 43. FIG. 42 is a cross-sectional view along the line 4-A-4-A in FIG. 37 according to an embodiment of the present disclosure, and FIG. 43 is a cross-sectional view along the line 4-B-4-B in FIG. 37 according an embodiment of the present disclosure. As shown in FIG. 42, when viewed in a first direction (the X-axis) perpendicular to the main axis 4-AX, at least a portion of the base 4-312 is located between the circuit assembly 4-314 and the outer frame 4-304.

Furthermore, as shown in FIG. 43, when viewed in a second direction (the Y-axis) which is perpendicular to the main axis 4-AX and the first direction, at least a portion of the base 4-312 is located between the circuit assembly 4-314 and outer frame 4-304. In addition, as shown in FIG. 42 and FIG. 40, when viewed along the main axis 4-AX, at least a portion of the base 4-312 overlaps the circuit assembly 4-314.

Figure 44:
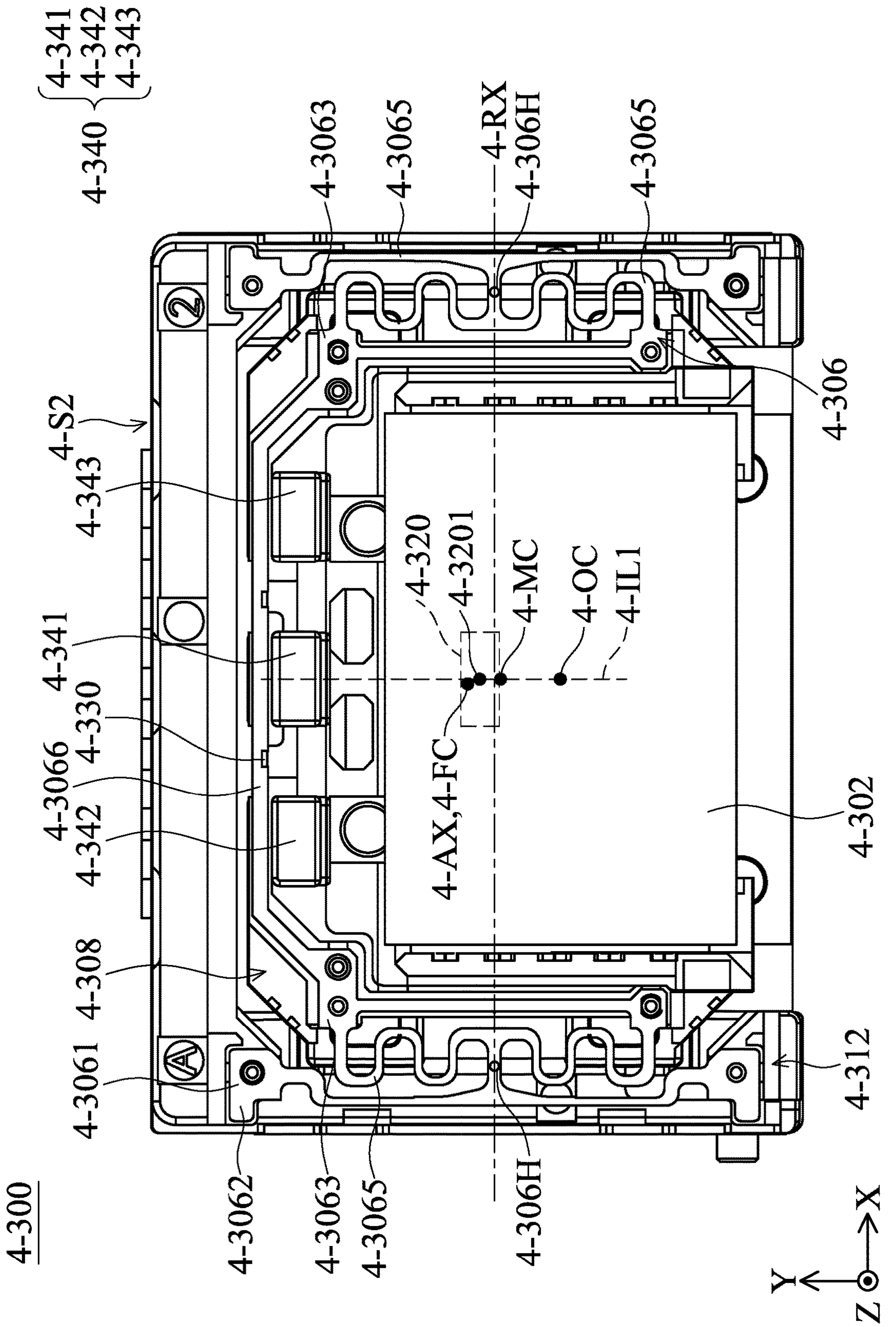
FIG. 44 is a top view of the optical element driving mechanism 4-300 after the outer frame 4-304 is removed according to an embodiment of the present disclosure.

Please refer to FIG. 44, which is a top view of the optical element driving mechanism 4-300 after the outer frame 4-304 is removed according to an embodiment of the present disclosure. As shown in FIG. 44, the lens holder 4-308 of the movable assembly 4-MA is movably connected to the base 4-312 of the fixed assembly 4-FA through the elastic member 4-306. Specifically, the lens holder 4-308 of the movable assembly 4-MA can rotate around an actual rotating axis 4-RX relative to the base 4-312 of the fixed assembly 4-FA through the elastic member 4-306.

As shown in FIG. 44, when viewed along the main axis 4-AX, the actual rotating axis 4-RX does not overlap the center 4-OC of the optical element 4-302. When viewed along the main axis 4-AX, a distance which is not zero is between the actual rotating axis 4-RX and the center 4-OC of the optical element 4-302. In this embodiment, the elastic member 4-306 may have a plate-shaped structure, and the elastic member 4-306 is perpendicular to the main axis 4-AX, but it is not limited thereto. In other embodiments, the elastic member 4-306 may be parallel to the main axis 4-AX.

As shown in FIG. 44, the elastic member 4-306 further includes four fixed assembly fixed ends 4-3061, four stable portions 4-3062, four movable assembly fixed ends 4-3063, and a plurality of elastic deformation portions 4-3065. The fixed assembly fixed ends 4-3061 are fixedly connected to the base 4-312 of the fixed assembly 4-FA, and the stable portion 4-3062 is disposed in the corresponding fixed assembly fixed end 4-3061 to increase the contact area of the fixed assembly fixed end 4-3061 and the base 4-312 of the fixed assembly 4-FA.

Specifically, the stable portion 4-3062 is in contact with the base 4-312 of the fixed assembly 4-FA, and the stable portion 4-3062 extends outward from the fixed assembly fixed end 4-3061. The movable assembly fixed end 4-3063 is fixedly connected to the lens holder 4-308 of the movable assembly 4-MA. The movable assembly fixed end 4-3063 is movably connected to the corresponding fixed assembly fixed end 4-3061 via these elastic deformation portions 4-3065. These elastic deformation portions 4-3065 respectively have a closed through hole 4-306H with a maximum size of 0.05 to 0.2 mm.

The movable assembly fixed end 4-3063 has a connecting portion 4-3066 extending in a direction (for example, the first direction) perpendicular to the main axis 4-AX. Specifically, the connecting portion 4-3066 is connected between two movable assembly fixed ends 4-3063.

Please refer to FIG. 42 and FIG. 44 together. When viewed along the main axis 4-AX, the connecting portion 4-3066 is located on the second side 4-S2, and the extending direction of the connecting portion 4-3066 is parallel to the extending direction of the second side 4-S2 (the X-axis). The movable assembly fixed end 4-3063 and the strengthening element 4-330 are fixedly connected. The strengthening element 4-330 is made of a metal material, and as shown in FIG. 42, the connecting portion 4-3066 of the elastic member 4-306 is fixedly connected to the strengthening element 4-330 by welding. At least a portion of the strengthening element 4-330 is embedded in and not exposed from the lens holder 4-308 of the movable assembly 4-MA. In this embodiment, the lens holder 4-308 is made of plastic material, and at least a portion of the driving assembly 4-DA (for example, the driving magnet 4-MG) is fixedly connected to the strengthening element 4-330.

In this embodiment, the optical element driving mechanism 4-300 may further include a position sensing assembly 4-320 for sensing the movement of the movable assembly 4-MA relative to the fixed assembly 4-FA. As shown in FIG. 44, when viewed along the main axis 4-AX, the position sensing assembly 4-320 overlaps at least a portion of the optical element 4-302. When viewed along the main axis 4-AX, a distance which is not zero is between the center 4-3201 of the position sensing assembly 4-320 and the center 4-OC of the optical element 4-302. When viewed along the main axis 4-AX, a distance which is not zero is between the center 4-3201 of the position sensing assembly 4-320 and the actual rotating axis 4-RX.

Figure 45:
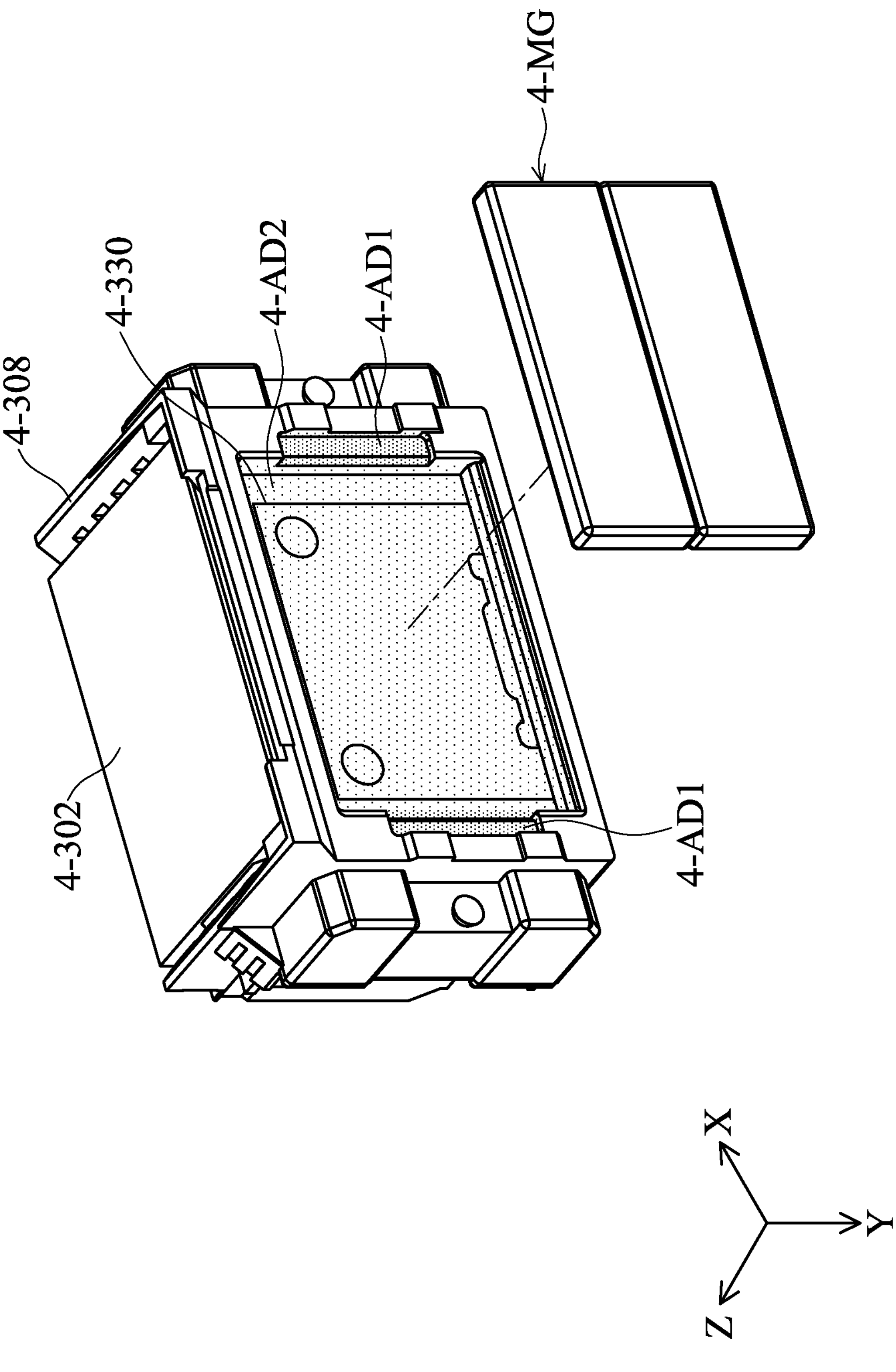
FIG. 45 is an exploded diagram of the lens holder 4-308 and the driving magnet 4-MG in another view according to an embodiment of the present disclosure.

Please refer to FIG. 42 and FIG. 45, and FIG. 45 is an exploded diagram of the lens holder 4-308 and the driving magnet 4-MG in another view according to an embodiment of the present disclosure. The driving magnet 4-MG (the magnetic element) corresponds to the driving coil 4-CL to generate an electromagnetic driving force to drive the lens holder 4-308 and the optical element 4-302 to rotate around the actual rotating axis 4-RX so as to perform the auto focusing function. As shown in FIG. 42, the driving magnet 4-MG is fixedly connected to the strengthening element 4-330.

Specifically, the driving magnet 4-MG is fixedly connected to the lens holder 4-308 and the strengthening element 4-330 of the movable assembly 4-MA by a first adhesive element 4-AD1, and the driving magnet 4-MG can be further fixedly connected to the strengthening element 4-330 of the movable assembly 4-MA by a second adhesive element 4-AD2. In this embodiment, the first adhesive element 4-AD1 and the second adhesive element 4-AD2 are made of different materials.

For example, the hardening conditions of the first adhesive element 4-AD1 and the second adhesive element 4-AD2 are different. As shown in FIG. 45, the first adhesive element 4-AD1 is exposed between the driving magnet 4-MG and the lens holder 4-308 of the movable assembly 4-MA, and the first adhesive element 4-AD1 can be hardened by irradiating light. When the driving magnet 4-MG is fixed to the lens holder 4-308, the second adhesive element 4-AD2 is not exposed from the driving magnet 4-MG and the lens holder 4-308 of the movable assembly 4-MA, and the second adhesive element 4-AD2 can be hardened by heating.

The fluidity of the first adhesive element 4-AD1 before being hardened is different from the fluidity of the second adhesive element 4-AD2 before being hardened. For example, the fluidity of the first adhesive element 4-AD1 before being hardened is less than the fluidity of the second adhesive element 4-AD2 before being hardened. Based on the above design, the convenience and accuracy of assembly can be improved.

Please continue to refer to FIG. 43 and FIG. 44. In this embodiment, the optical element driving mechanism 4-300 further includes a stopping assembly 4-340 to limit the movement of the movable assembly 4-MA relative to the fixed assembly 4-FA within a limit range. The limit range can be defined as the maximum movable range of the movable assembly 4-MA relative to the fixed assembly 4-FA. The stopping assembly 4-340 includes a first stopping element 4-341, a second stopping element 4-342, and a third stopping element 4-343. The first stopping element 4-341 has a protruding structure extending toward the outer frame 4-304 of the fixed assembly 4-FA, the second stopping element 4-342 has a protruding structure extending toward the outer frame 4-304 of the fixed assembly 4-FA, and the third stopping element 4-343 has a protruding structure extending toward the outer frame 4-304 of the fixed assembly 4-FA.

It is worth noting that in other embodiments, the first stopping element 4-341, the second stopping element 4-342, and/or the third stopping element 4-343 can be disposed on the outer frame 4-304 extending toward the lens holder 4-308.

As shown in FIG. 43 and FIG. 44, the first stopping element 4-341 extends along the main axis 4-AX (the Z-axis). When viewed along the main axis 4-AX, the first stopping element 4-341 overlaps a first imaginary line 4-IL1, and the first imaginary line 4-IL1 is parallel to the second direction (the Y-axis) and passes through the center 4-MC of the movable assembly 4-MA.

The second stopping element 4-342 extends along the main axis 4-AX, and when viewed along the main axis 4-AX, the second stopping element 4-342 does not overlap the first imaginary line 4-IL1. The third stopping element 4-343 extends along the main axis 4-AX, and when viewed along the main axis 4-AX, the third stopping element 4-343 does not overlap the first imaginary line 4-IL1.

As shown in FIG. 44, when viewed along the main axis 4-AX, the second stopping element 4-342 and the third stopping element 4-343 are arranged in the first direction perpendicular to the main axis 4-AX. When viewed along the main axis 4-AX, the first stopping element 4-341 is located between the second stopping element 4-342 and the third stopping element 4-343.

In addition, as shown in FIG. 43, the first stopping element 4-341 has a first stopping surface 4-3411 for contacting the outer frame 4-304 of the fixed assembly 4-FA. The second stopping element 4-342 has a second stopping surface 4-3421 for contacting the outer frame 4-304 of the fixed assembly 4-FA. The third stopping element 4-343 has a third stopping surface 4-3431 for contacting the outer frame 4-304 of the fixed assembly 4-FA. A distance in the X-axis is between two of the first stopping element 4-341, the second stopping element 4-342, and the third stopping element 4-343, and the distance is not zero.

Figure 46:
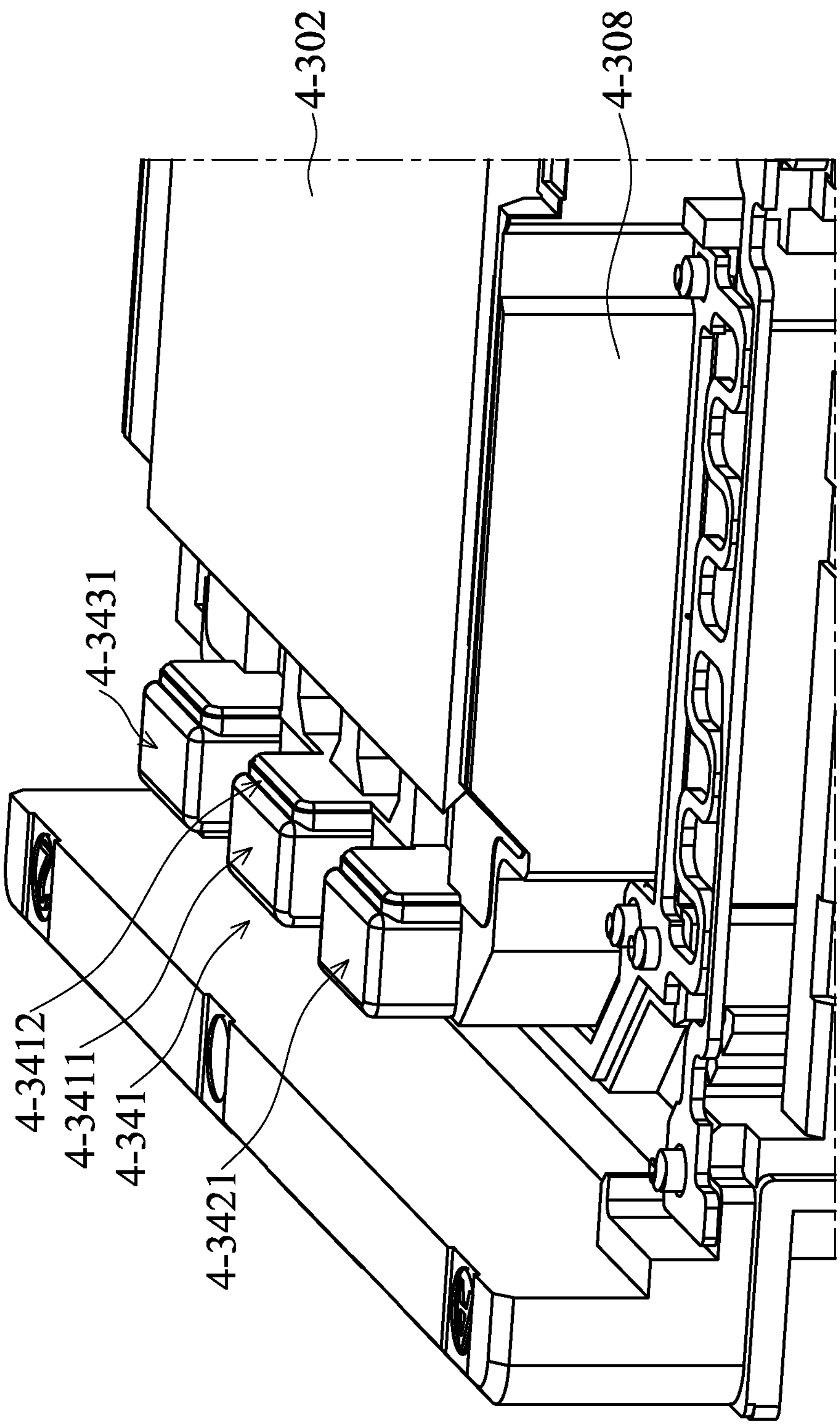
FIG. 46 is an enlarged schematic diagram of a partial structure of the optical element driving mechanism 4-300 according to an embodiment of the present disclosure.

In addition, please refer to FIG. 46, which is an enlarged schematic diagram of a partial structure of the optical element driving mechanism 4-300 according to an embodiment of the present disclosure. In this embodiment, the first stopping surface 4-3411 has a stepped structure 4-3412. Based on this structural design, when the lens holder 4-308 and the optical element 4-302 rotate around the actual rotating axis 4-RX, the problem of unnecessary particles resulted from the contact of the first stopping element 4-341 and the outer frame 4-304 can be avoided. Similarly, the second stopping surface 4-3421 and the third stopping surface 4-3431 also have the same structure, so they are not repeated herein.

Figure 47:
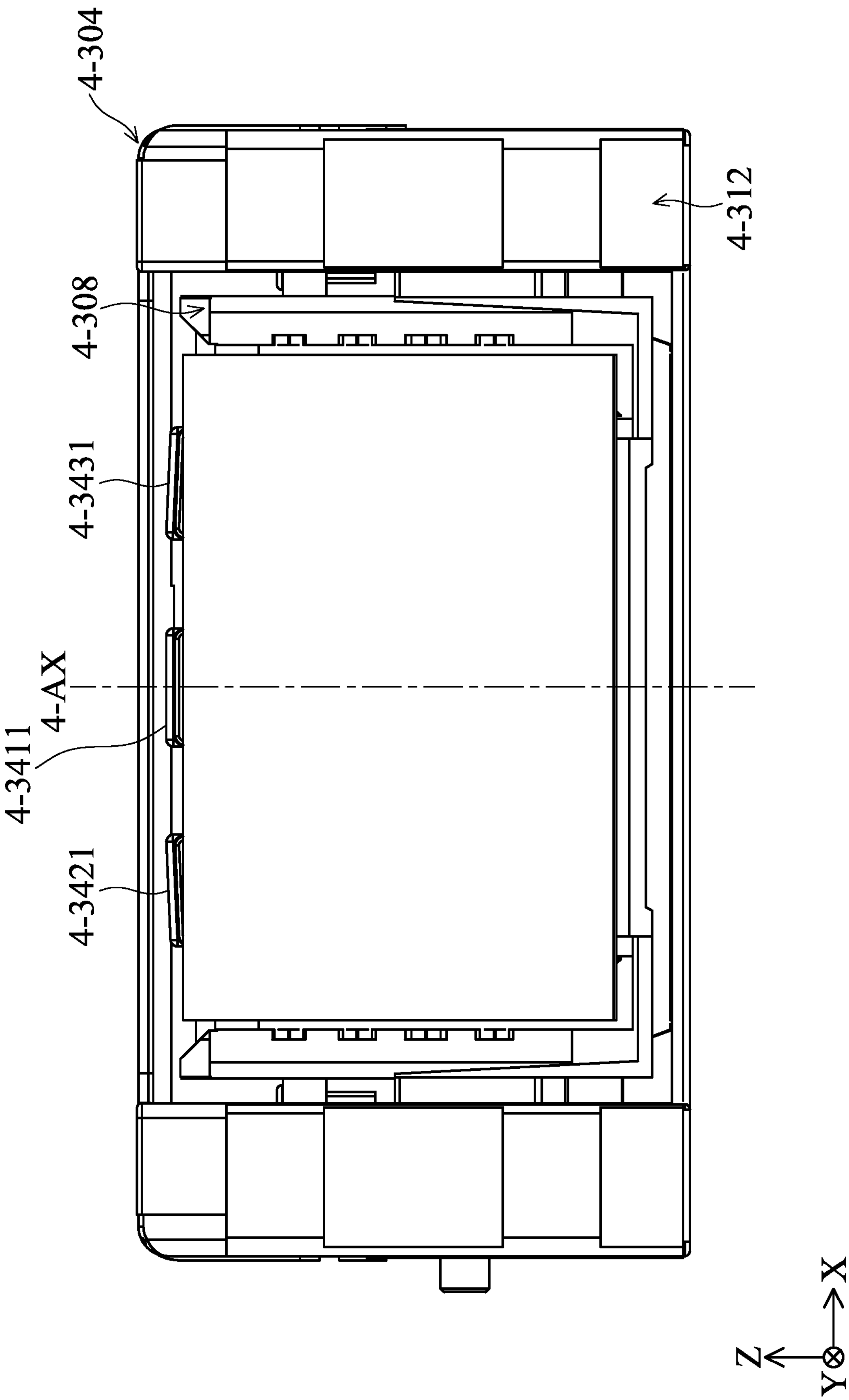
FIG. 47 is a front view of the optical element driving mechanism 4-300 according to another embodiment of the present disclosure.

Please refer to FIG. 47, which is a front view of the optical element driving mechanism 4-300 according to another embodiment of the present disclosure. In this embodiment, the first stopping surface 4-3411 and the second stopping surface 4-3421 are not parallel, the first stopping surface 4-3411 and the third stopping surface 4-3431 are not parallel, the second stopping surface 4-3421 and the third stopping surface 4-3431 are not parallel, and the first stopping surface 4-3411 is perpendicular to the main axis 4-AX. As a result, when the lens holder 4-308 rotates around the Y-axis due to impact, the collision of the second stopping surface 4-3421 (or third stopping surface 4-3431) and the outer frame 4-304 does not produce particles, thereby affecting image quality of the optical element driving mechanism 4-300.

It is worth noting that, based on the design of the stopping assembly 4-340 of the present disclosure, when the movable assembly 4-MA is located at any position in the limit range, the driving magnet 4-MG is not directly in contact with the driving coil 4-CL. Therefore, the problem of damage caused by collision can be avoided.

Figure 48:
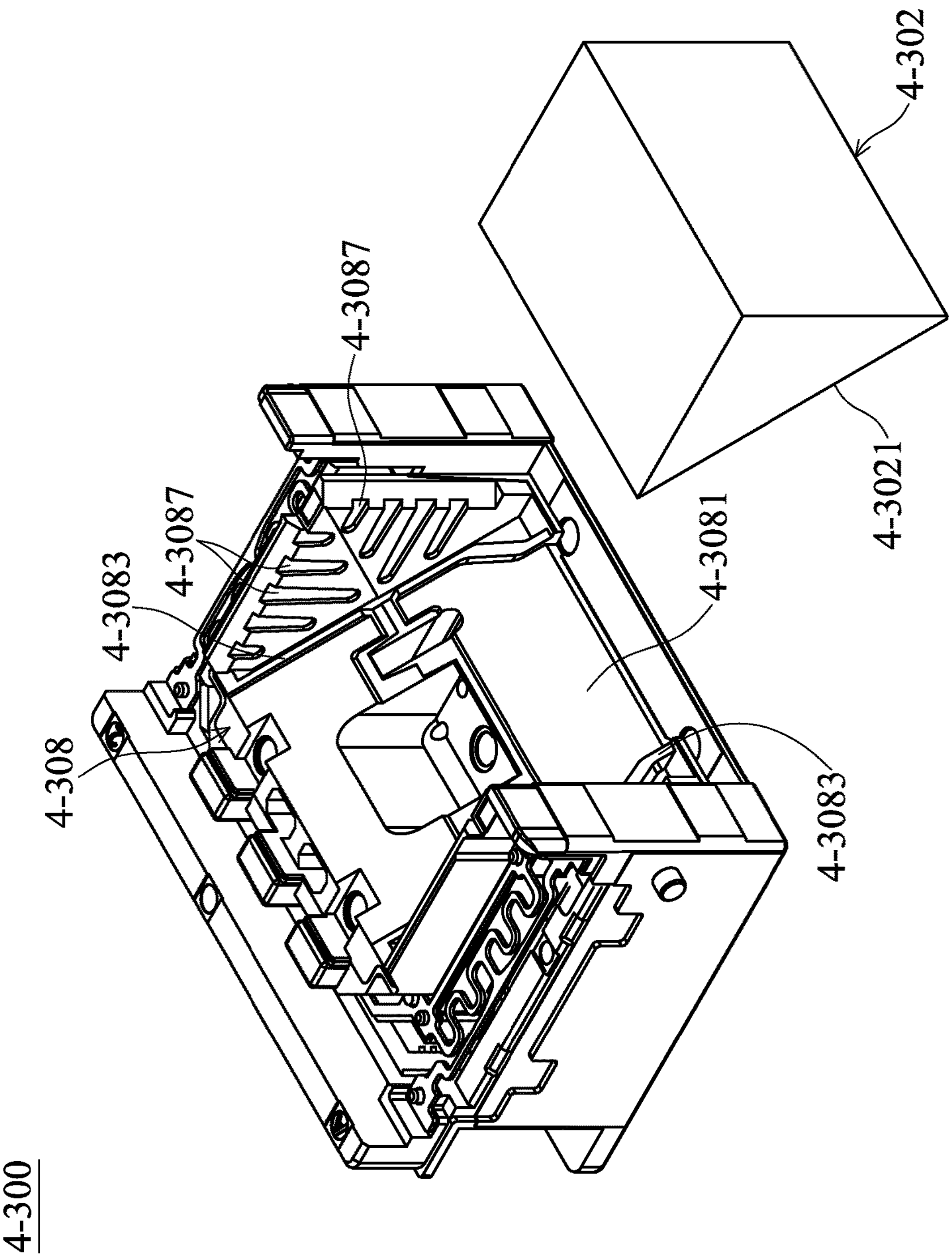
FIG. 48 is an exploded diagram of a partial structure of the optical element driving mechanism 4-300 according to an embodiment of the present disclosure.
Figure 49:
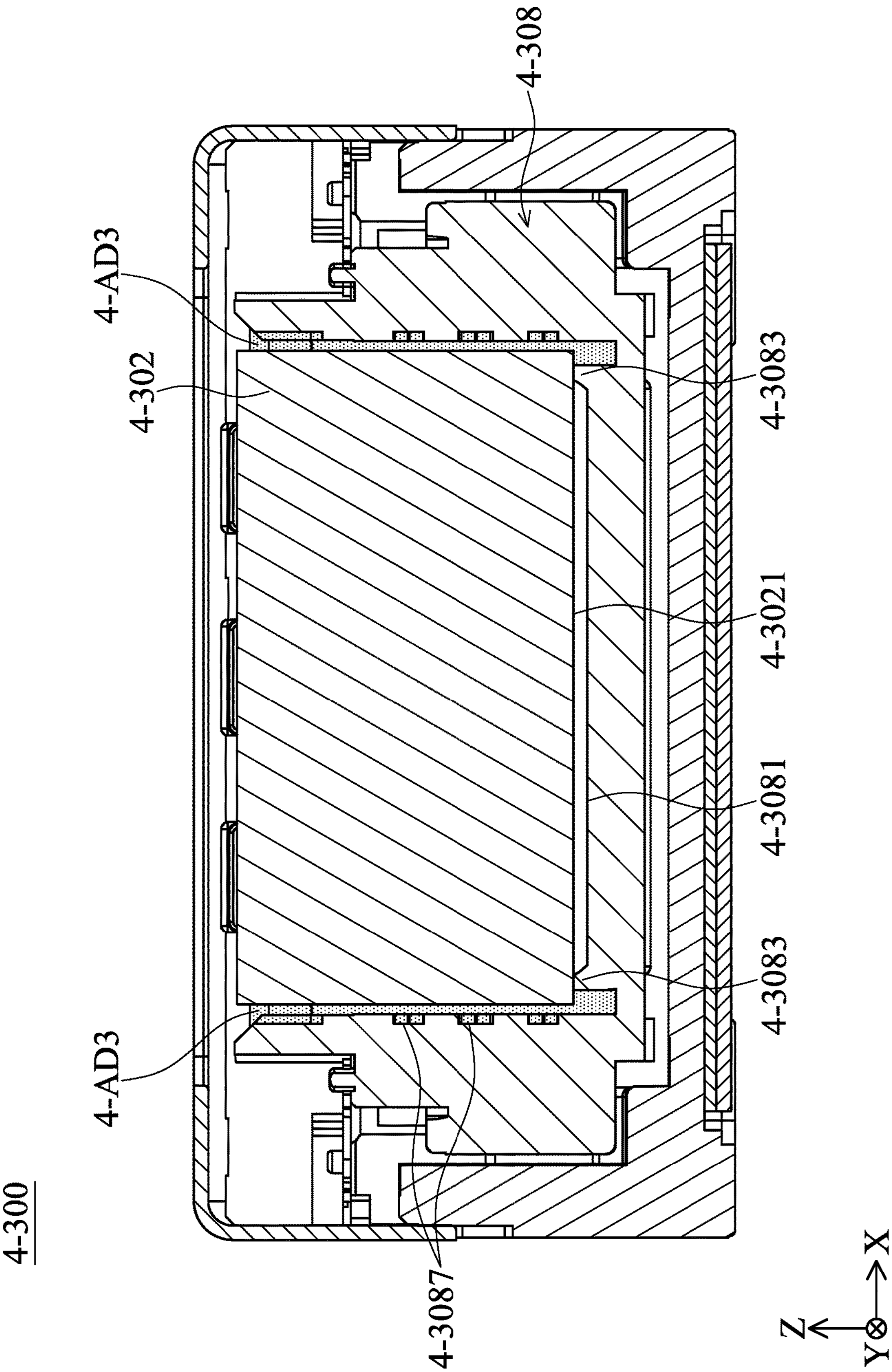
FIG. 49 is a cross-sectional view along the line 4-E-4-E in FIG. 39 according to an embodiment of the present disclosure.

Please refer to FIG. 42. FIG. 48, and FIG. 49. FIG. 48 is an exploded diagram of a partial structure of the optical element driving mechanism 4-300 according to an embodiment of the present disclosure, and FIG. 49 is a cross-sectional view along the line 4-E-4-E in FIG. 39 according to an embodiment of the present disclosure. As shown in FIG. 48, the optical element 4-302 has a first surface 4-3021, the lens holder 4-308 has a second surface 4-3081 and two protrusions 4-3083, and these protrusions 4-3083 are in contact with the optical element 4-302. It is worth noting that, as shown in FIG. 42, there is a gap between the second surface 4-3081 and the first surface 4-3021.

Furthermore, as shown in FIG. 48 and FIG. 49, a plurality of accommodating grooves 4-3087 are formed on the lens holder 4-308, and the optical element driving mechanism 4-300 may further include a bonding element 4-AD3 disposed in these accommodating grooves 4-3087 so that the optical element 4-302 can be affixed to the lens holder 4-308. It should be noted that the bonding element 4-AD3 is not disposed between the first surface 4-3021 and the second surface 4-3081.

The present disclosure provides an optical element driving mechanism 4-300, and the circuit assembly 4-314 is disposed at the bottom of the base 4-312 and has external contacts 4-EC1 and test contacts 4-EC2. The external contacts 4-EC1 and test contacts 4-EC2 are disposed on opposite surfaces of the circuit assembly 4-314. A recessed space 4-GS is formed on the base 4-312 so that the external contacts 4-EC1 are exposed so as to facilitate an external circuit being electrically connected to the external contacts 4-EC1.

In addition, when viewed along the main axis 4-AX, the center 4-OC of the optical element 4-302 does not overlap the center 4-FC of the fixed assembly 4-FA, so that shooting quality of the optical system 4-100 can be effectively improved.

Figure 50:
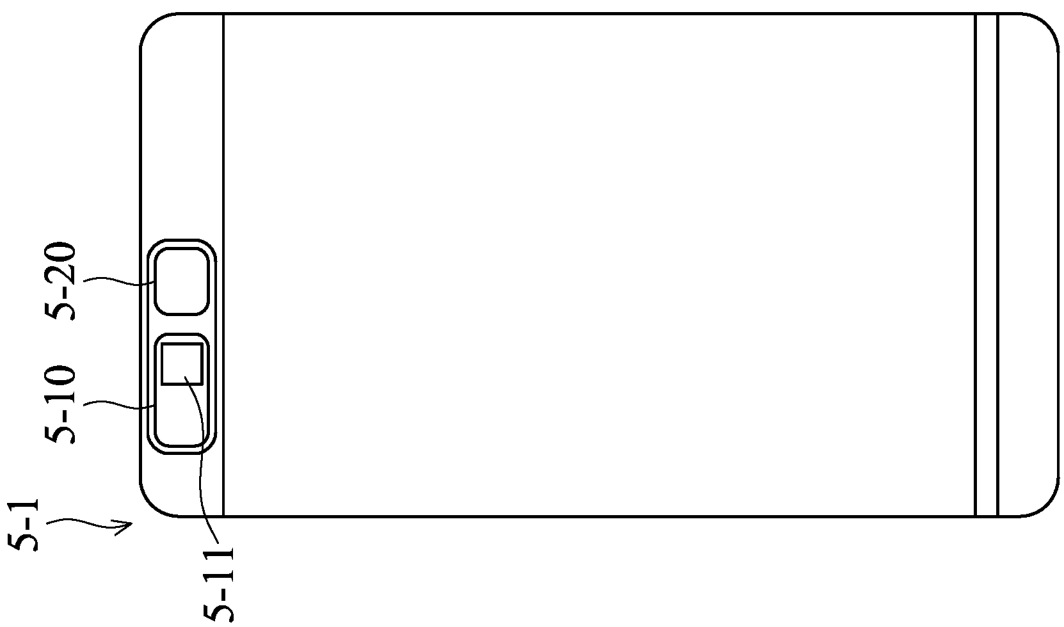
FIG. 50 is a schematic view of the electronic device equipped with the optical element driving mechanism.

FIG. 50 is a schematic view of an electronic device 5-1 equipped with an optical element driving mechanism 5-10. The electronic device 5-1 may be a smart phone, a tablet computer, etc. The optical element driving mechanism 5-10 is generally disposed on the top region of the electronic device 5-1. The optical element driving mechanism 5-10 may be a periscope mechanism. In some embodiments, the electronic device 5-1 may further equipped with another optical element driving mechanism 5-20. Images and video may be respectively generated by the optical element driving mechanism 5-10 and optical element driving mechanism 5-20 to enhance the quality of the images and video.

Figure 51:
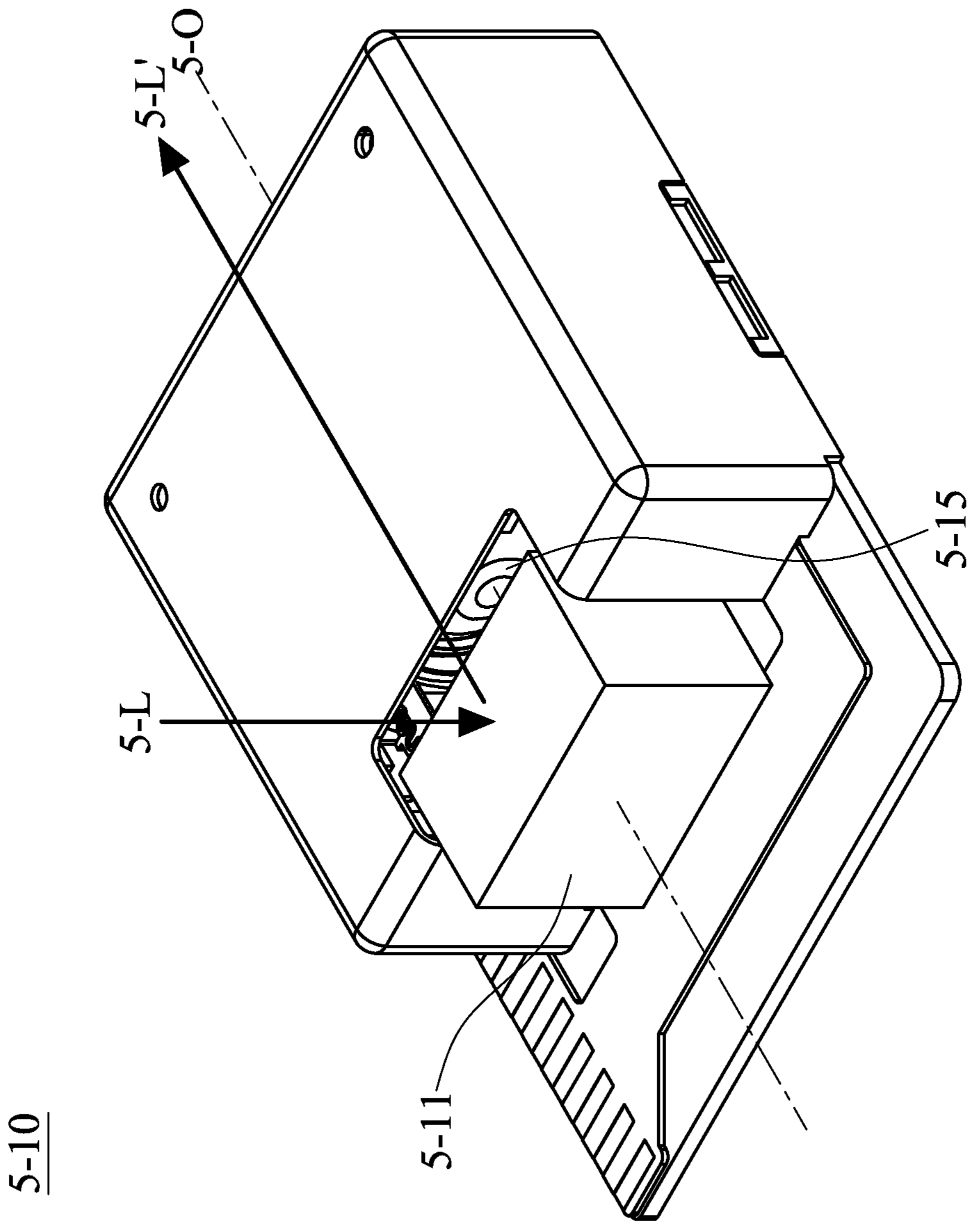
FIG. 51 is a perspective view of the optical element driving mechanism including the optical path adjustment assembly.
Figure 52:
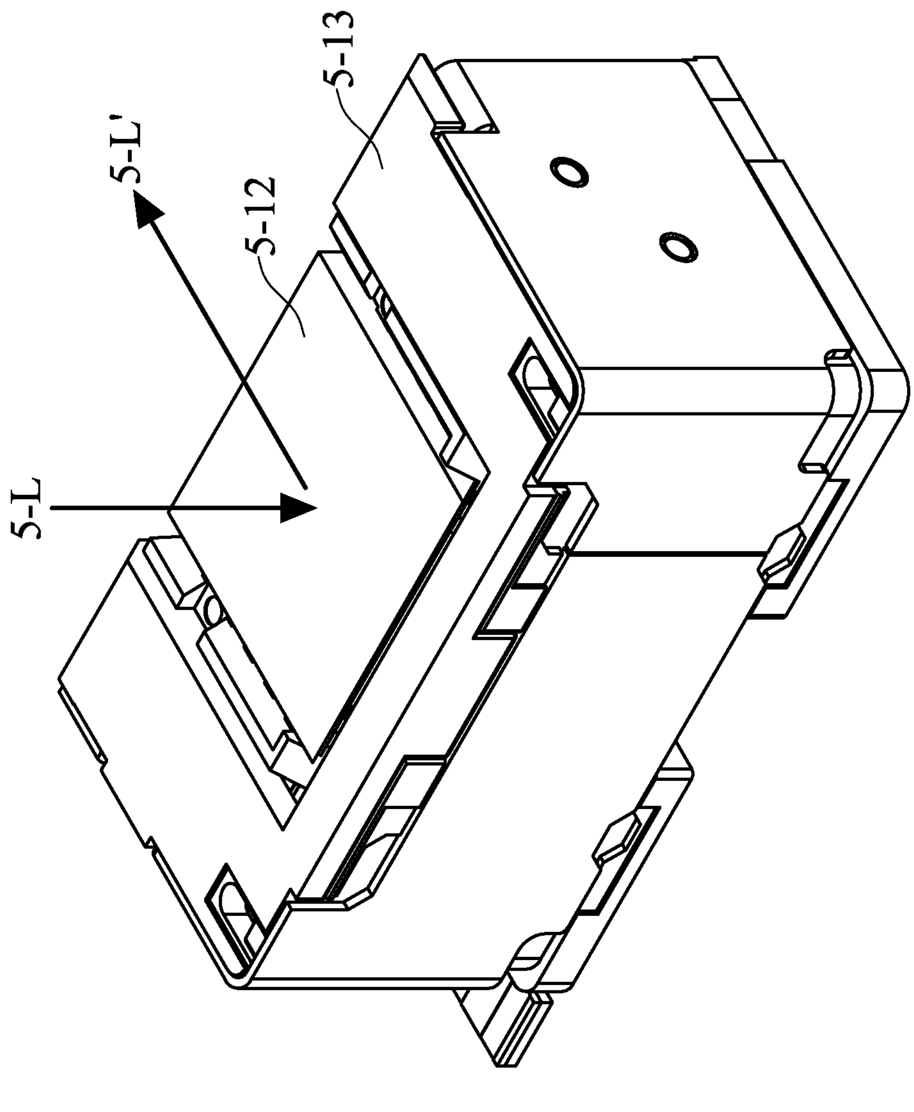
FIG. 52 is a schematic view of the optical path adjustment assembly.

FIG. 51 is a perspective view of the optical element driving mechanism 5-10 including an optical path adjustment assembly 5-11. FIG. 52 is a schematic view of the optical path adjustment assembly 5-11. The optical element driving mechanism 5-10 may include the optical path adjustment assembly 5-11. The optical path adjustment assembly 5-11 may change the optical path of an incident light 5-L. In particular, after the optical path of the incident light 5-L is changed by the optical path adjustment assembly 5-11, the incident light 5-L enters an optical element 5-15 with an optical axis 5-O. The optical axis 5-O is an imaginary axis passing through the center of the optical element 5-15. The optical path adjustment assembly 5-11 includes an optical path adjustment element 5-12 and an optical path adjustment element base 5-13. The optical path adjustment element 5-12 is disposed on the optical path adjustment element base 5-13. The optical path adjustment element 5-12 may be a mirror, a prism, a beam splitter, and the like. As shown in FIG. 51, when the incident light 5-L enters the optical path adjustment assembly 5-11, the incident light 5-L is substantially perpendicular to the optical axis 5-O. The optical path of the incident light 5-L may be changed by rotation or movement of the optical path adjustment element 5-12. The incident light 5-L becomes an exit light 5-L' after entering the optical element 5-15. The exit light 5-L' is substantially parallel with the optical axis 5-O.

Figure 53:
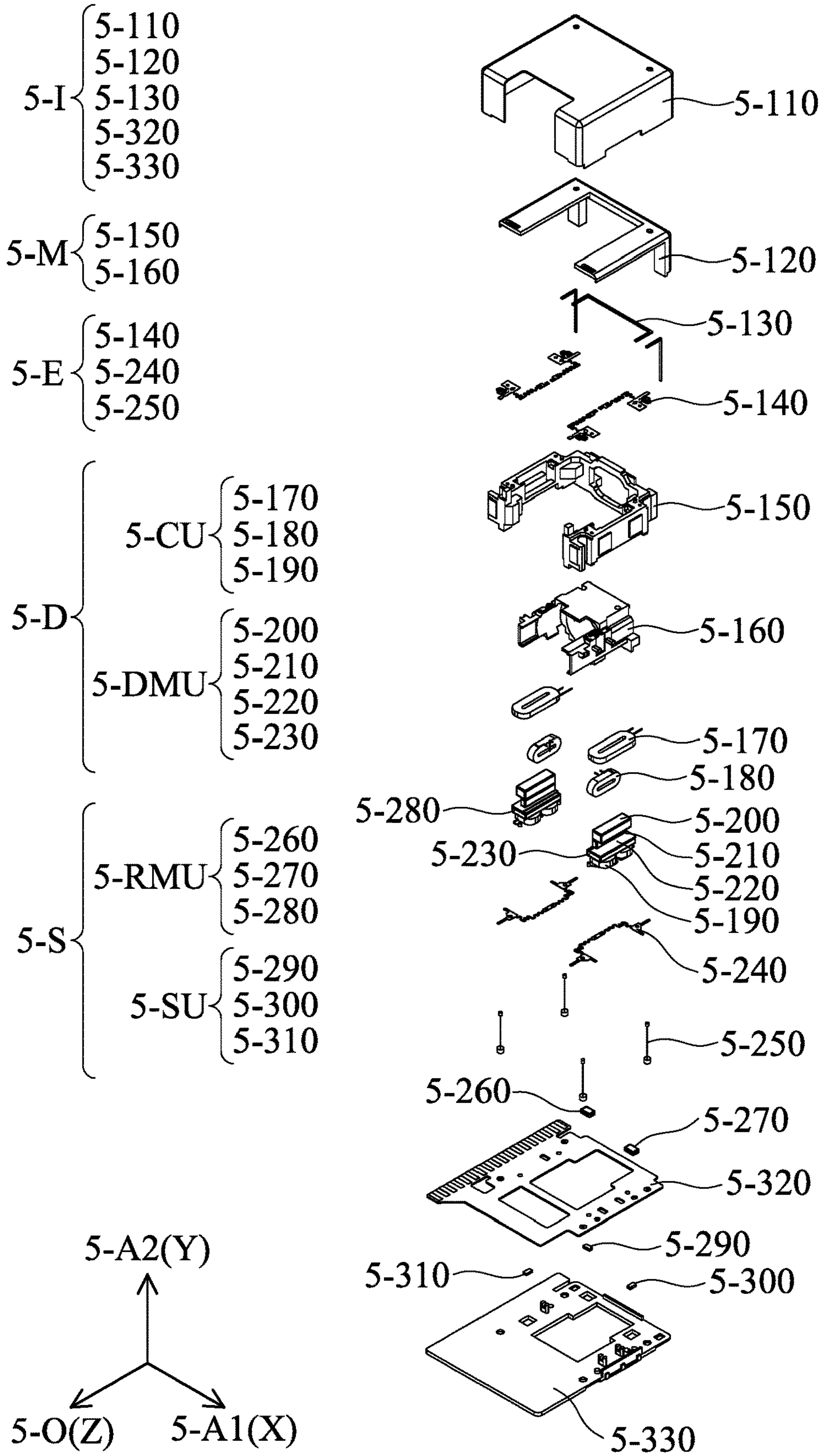
FIG. 53 is an exploded view of the optical element driving mechanism with the optical path adjustment assembly omitted.

FIG. 53 is an exploded view of the optical element driving mechanism 5-10 with the optical path adjustment assembly 5-11 omitted. The optical element driving mechanism 5-10 includes an immovable part 5-I, a movable part 5-M, an elastic assembly 5-E, a drive assembly 5-D, and a position sensing assembly 5-S. The movable part 5-M holds the optical element 5-15. The movable part 5-M is movable relative to the immovable part 5-I. The drive assembly 5-D drives the movable part 5-M to move relative to the immovable part 5-I. The position sensing assembly 5-S senses the movement of the movable part 5-M relative to the immovable part 5-I.

For clarity of illustration, in the drawings and in the following, a first direction 5-A1 (the X-axis), a second direction 5-A2 (the Y-axis), and the optical axis 5-O (the Z-axis) may be used for describing the direction or the orientation. The first direction 5-A1, the second direction 5-A2, and the optical axis 5-O are different and are not parallel with each other. In some embodiments, the first direction 5-A1, the second direction 5-A2, and the optical axis 5-O are substantially perpendicular to each other.

In this embodiment, the immovable part 5-1 includes a case 5-110, an immovable frame 5-120, an embedded circuit 5-130, a circuit assembly 5-320, and a bottom 5-330. The movable part 5-M includes a movable frame 5-150 and a holder 5-160. The elastic assembly 5-E includes at least one first elastic element 5-140, at least one second elastic element 5-240, and at least one third elastic element 5-250. The drive assembly 5-D includes a circuit unit 5-CU and a drive magnetic unit 5-DMU. The circuit unit 5-CU includes at least one first coil 5-170, at least one second coil 5-180, and at least one third coil 5-190. The drive magnetic unit 5-DMU includes at least one first drive magnetic element 5-200, at least one second drive magnetic element 5-210, at least one magnetically-permeable element 5-220, and at least one third drive magnetic element 5-230. The position sensing assembly 5-S includes a first reference magnetic element 5-260, a second reference magnetic element 5-270, and a third reference magnetic element 5-280. The sensing unit 5-SU includes a first sensing element 5-290, a second sensing element 5-300, a third sensing element 5-310. It should be noted that the elements may be added or omitted according to the requirements of the users. In the following, the immovable part 5-I, the movable part 5-M, the elastic assembly 5-E, the drive assembly 5-D, and the position sensing assembly 5-S are explained in detail.

Figure 54:
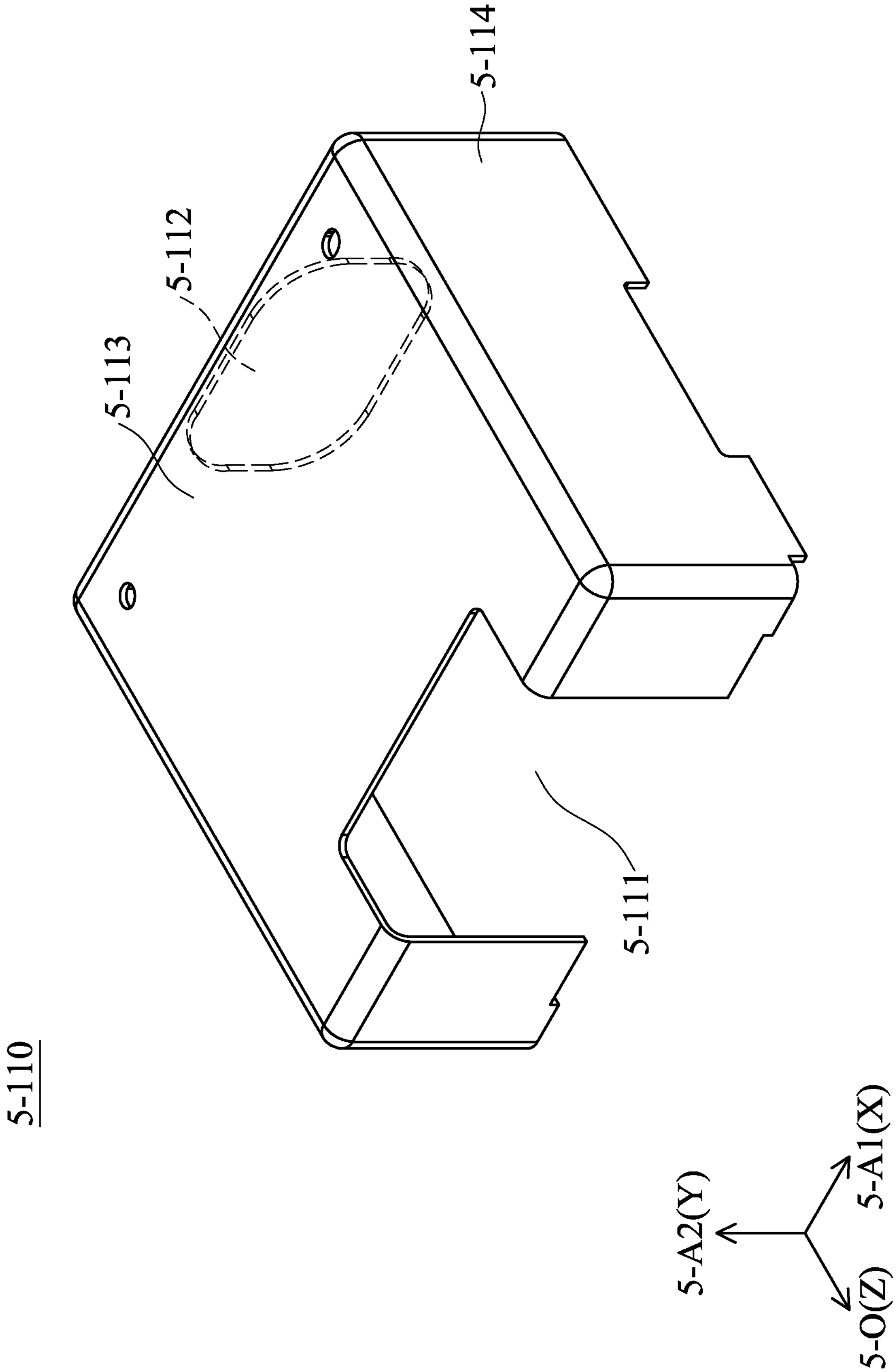
FIG. 54 is a perspective view of the case.
Figure 55:
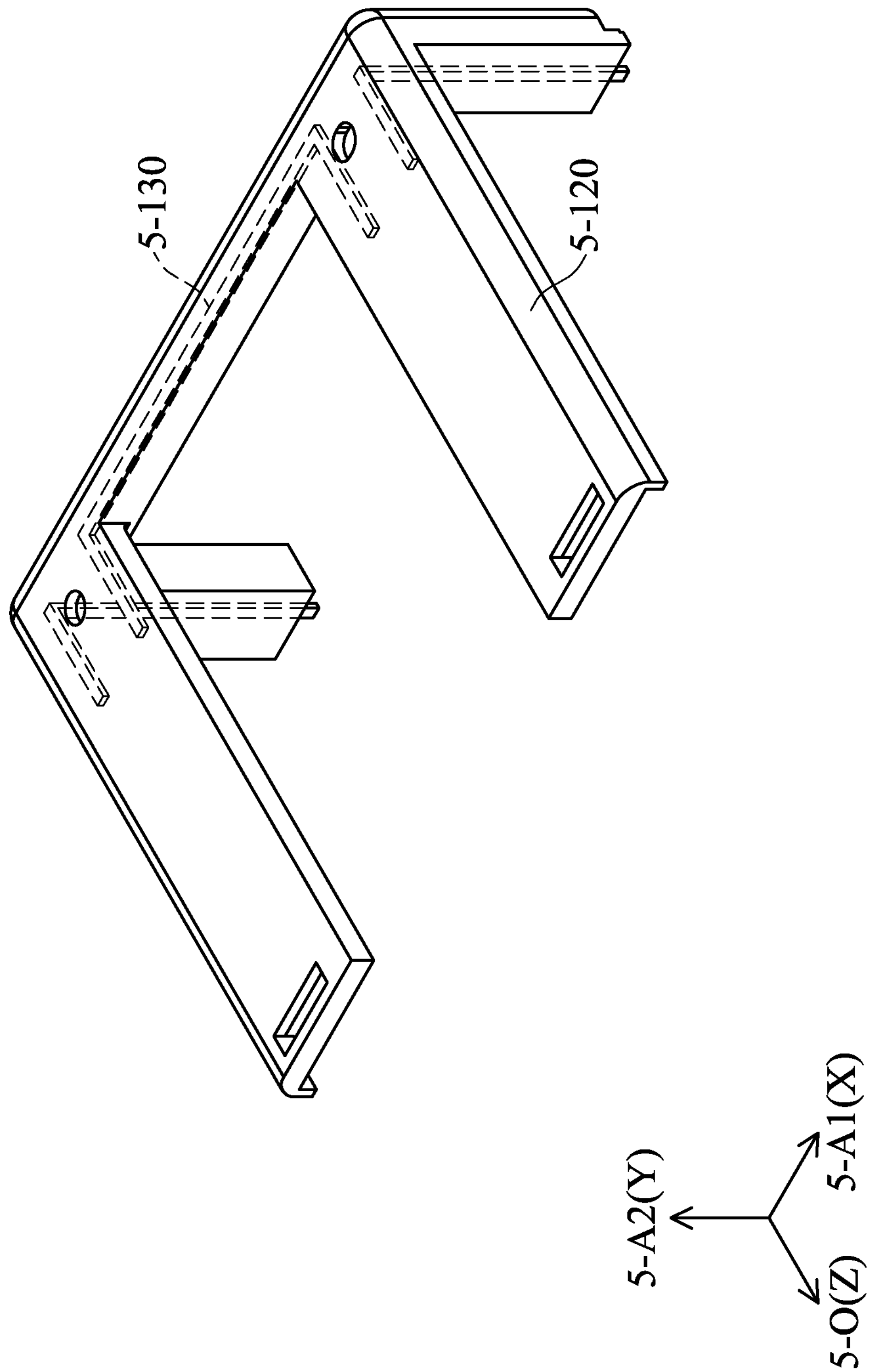
FIG. 55 is a perspective view of the immovable frame including the embedded circuit, wherein the embedded circuit is illustrated with dotted lines.
Figure 56:
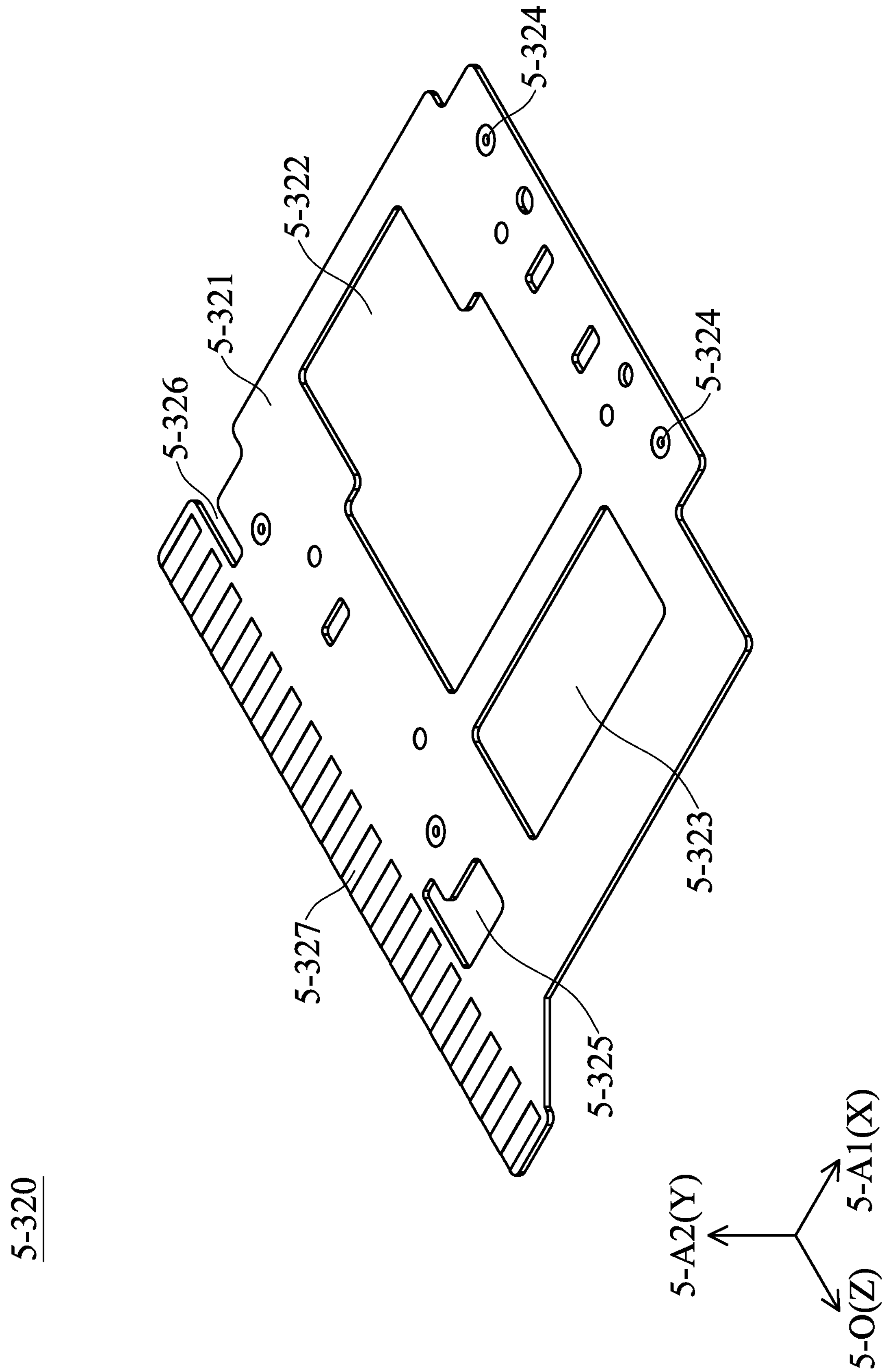
FIG. 56 is a perspective view of the circuit assembly.
Figure 57:
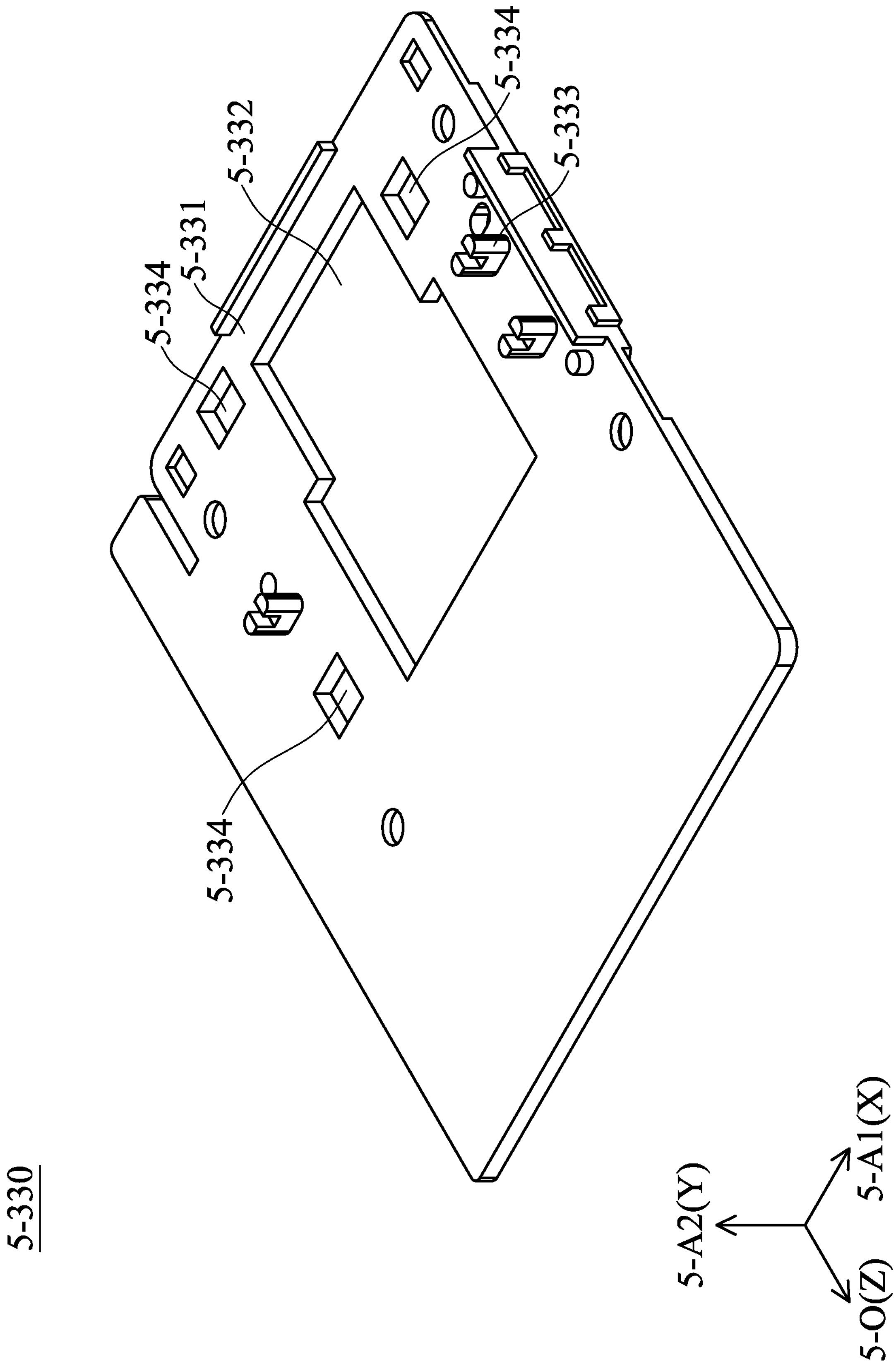
FIG. 57 is a perspective view of the bottom.
Figure 58:
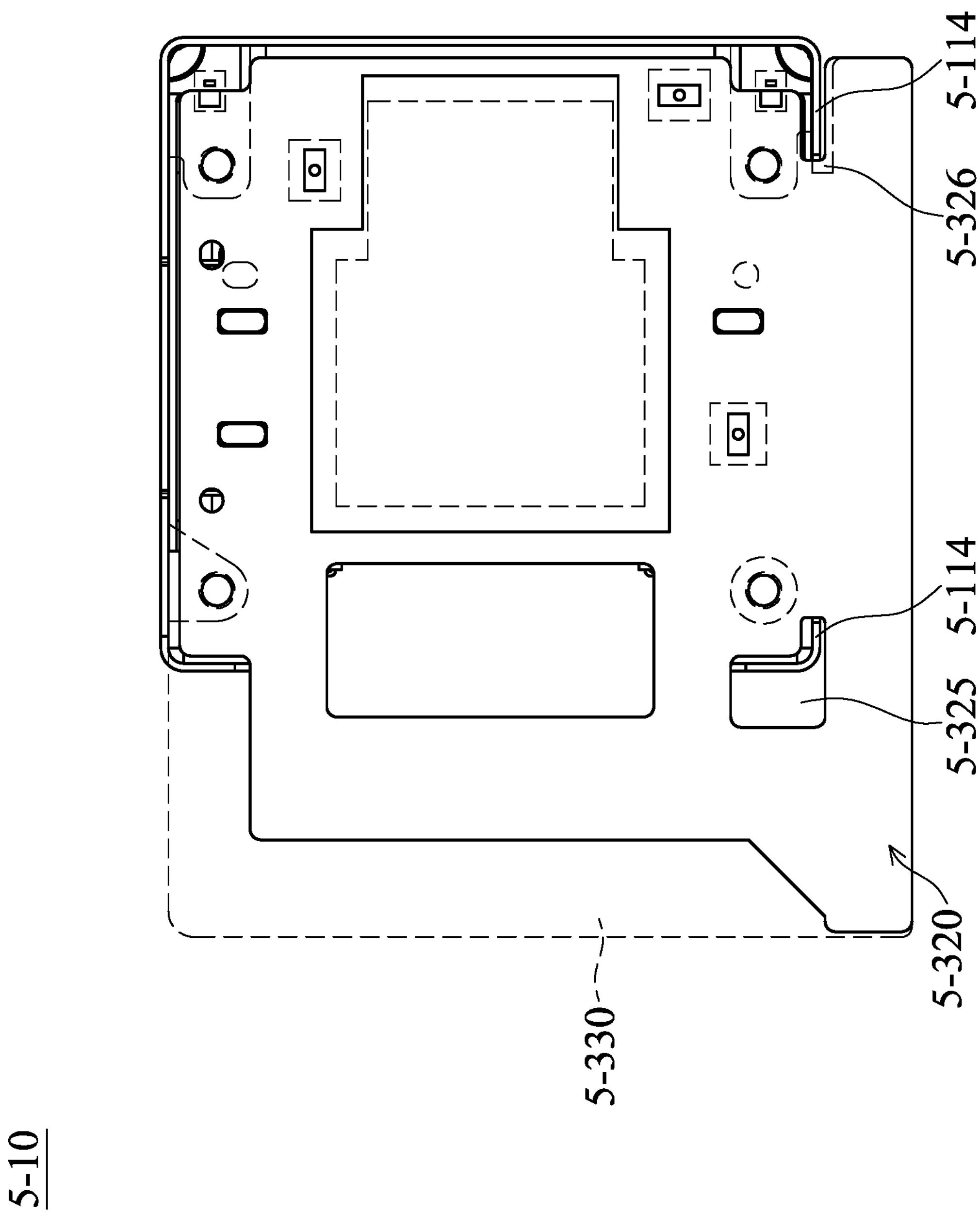
FIG. 58 is a bottom view of the optical element driving mechanism, wherein the bottom is illustrated with dotted lines.

Please refer to FIG. 54 to FIG. 58 to understand the immovable part 5-I. FIG. 54 is a perspective view of the case 5-110. FIG. 55 is a perspective view of the immovable frame 5-120 including the embedded circuit 5-130, wherein the embedded circuit 5-130 is illustrated with dotted lines. FIG. 56 is a perspective view of the circuit assembly 5-320. FIG. 57 is a perspective view of the bottom 5-330. FIG. 58 is a bottom view of the optical element driving mechanism 5-10, wherein the bottom 5-330 is illustrated with dotted lines. The case 5-110, the immovable frame 5-120, the circuit assembly 5-320, and the bottom 5-330 of the immovable part 5-I are arranged in the second direction 5-A2 sequentially. The case 5-110 is connected to the bottom 5-330. After the case 5-110 is connected to the bottom 5-330, the space formed therein may accommodate the movable part 5-M, the elastic assembly 5-E, the drive assembly 5-D, and the position sensing assembly 5-S, and the like.

The case 5-110 may be made of a metal material. As shown in FIG. 54, the case 5-110 includes a light entrance 5-111, a light exit 5-112, a top wall 5-113, and at least one sidewall 5-114. The light entrance 5-111 is formed on one side of the case 5-110. The light entrance 5-111 may accommodate the optical path adjustment assembly 5-11. The incident light 5-L may enter the optical element driving mechanism 5-10 via the light entrance 5-111. The light exit 5-112 is formed on the side opposite to the light entrance 5-111. The exit light 5-L' may leave the optical element driving mechanism 5-10 via the light exit 5-112. The top wall 5-113 is perpendicular to the second direction 5-A2 and parallel with the optical axis 5-O. The sidewall 5-114 extends in the second direction 5-A2 from the edge of the top wall 5-113.

The immovable frame 5-120 is disposed inside the case 5-110. In particular, the immovable frame 5-120 is disposed under the case 5-110. The immovable frame 5-120 may be made of a non-metal material, such as plastic or resin. Part of the embedded circuit 5-130 is embedded in the immovable frame 5-120 by methods such as insert molding. The embedded circuit 5-130 may be made of a conductive material such as metal. The embedded circuit 5-130 is used for electrical connection.

The circuit assembly 5-320 is disposed over the bottom 5-330. The circuit assembly 5-320 may be a circuit board such as a flexible printed circuit (FPC) or a rigid-flex board. As shown in FIG. 56, the circuit assembly 5-320 includes a circuit assembly body 5-321, a circuit assembly receiving portion 5-322, a circuit assembly opening 5-323, at least one third elastic element connection portion 5-324, a through hole 5-325, a notch 5-326, and an outside electrical connection portion 5-327. The circuit assembly body 5-321 is a plate structure perpendicular to the second direction 5-A2. The circuit assembly receiving portion 5-322 may receive at least part of the holder 5-160. The circuit assembly opening 5-323 may receive at least part of the optical path adjustment assembly 5-11, including receiving the whole optical path adjustment assembly 5-11, only receiving part of the optical path adjustment element base 5-13, and the like. The third elastic element connection portion 5-324 is used for placing the third elastic element 5-250. The through hole 5-325 is formed adjacent to the circuit assembly opening 5-323 and is substantially L-shaped. The notch 5-326 is formed on one side of the circuit assembly 5-320 and is located on the side on which the light exit 5-12 of the case 5-10 is located. The notch 5-326 is substantially a slit. The current is supplied to the optical element driving mechanism 5-10 via the outside electrical connection portion 5-327.

As shown in FIG. 57, the bottom 5-330 includes a bottom body 5-331, a bottom receiving portion 5-332, at least one pillar 5-333, at least one recess 5-334. The bottom body 5-331 is a plate structure that is perpendicular to the second direction 5-A2. The bottom receiving portion 5-332 may receive at least part of the holder 5-160. The pillar 5-333 is used for placing the third coil 5-190. The recess 5-334 is used for receiving the sensing unit 5-SU. In particular the three recesses 5-334 in FIG. 57 receive the first sensing element 5-290, the second sensing element 5-300, and the third sensing element 5-310, respectively. In some embodiments, the depth of the recess 5-334 is greater than the depth of any of the first sensing element 5-290, the second sensing element 5-300, and the third sensing element 5-310, so that the recess 5-334 may effectively protect the first sensing element 5-290, the second sensing element 5-300, and the third sensing element 5-310.

As shown in FIG. 58, the different corners of the sidewalls 5-114 of the case 5-110 are in contact with the bottom 5-330 via the through hole 5-325 and the notch 5-326 of the circuit assembly 5-320. The shape of the notch 5-326 is different from that of the through hole 5-325.

Figure 59:
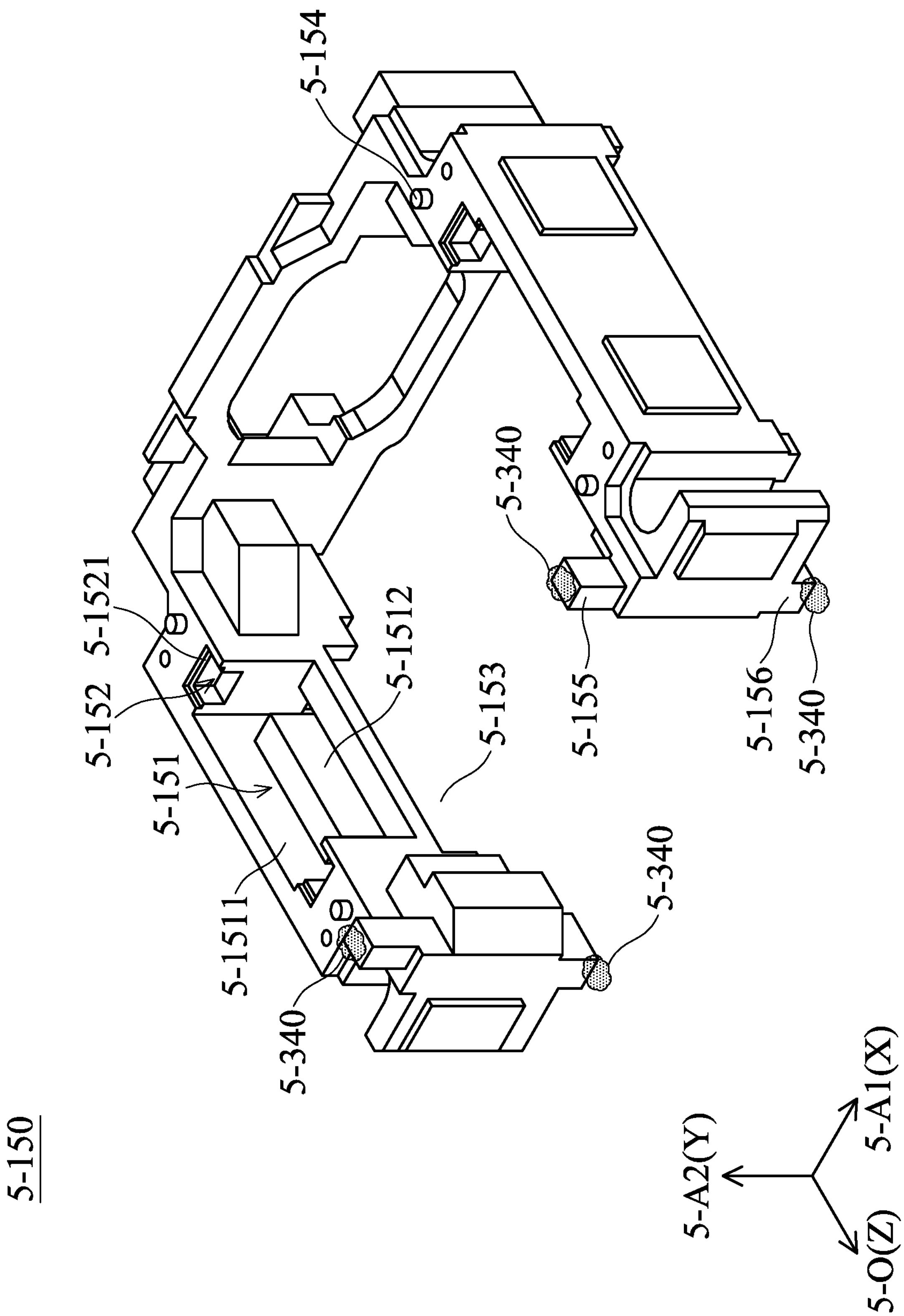
FIG. 59 is a perspective view of the movable frame.
Figure 60:
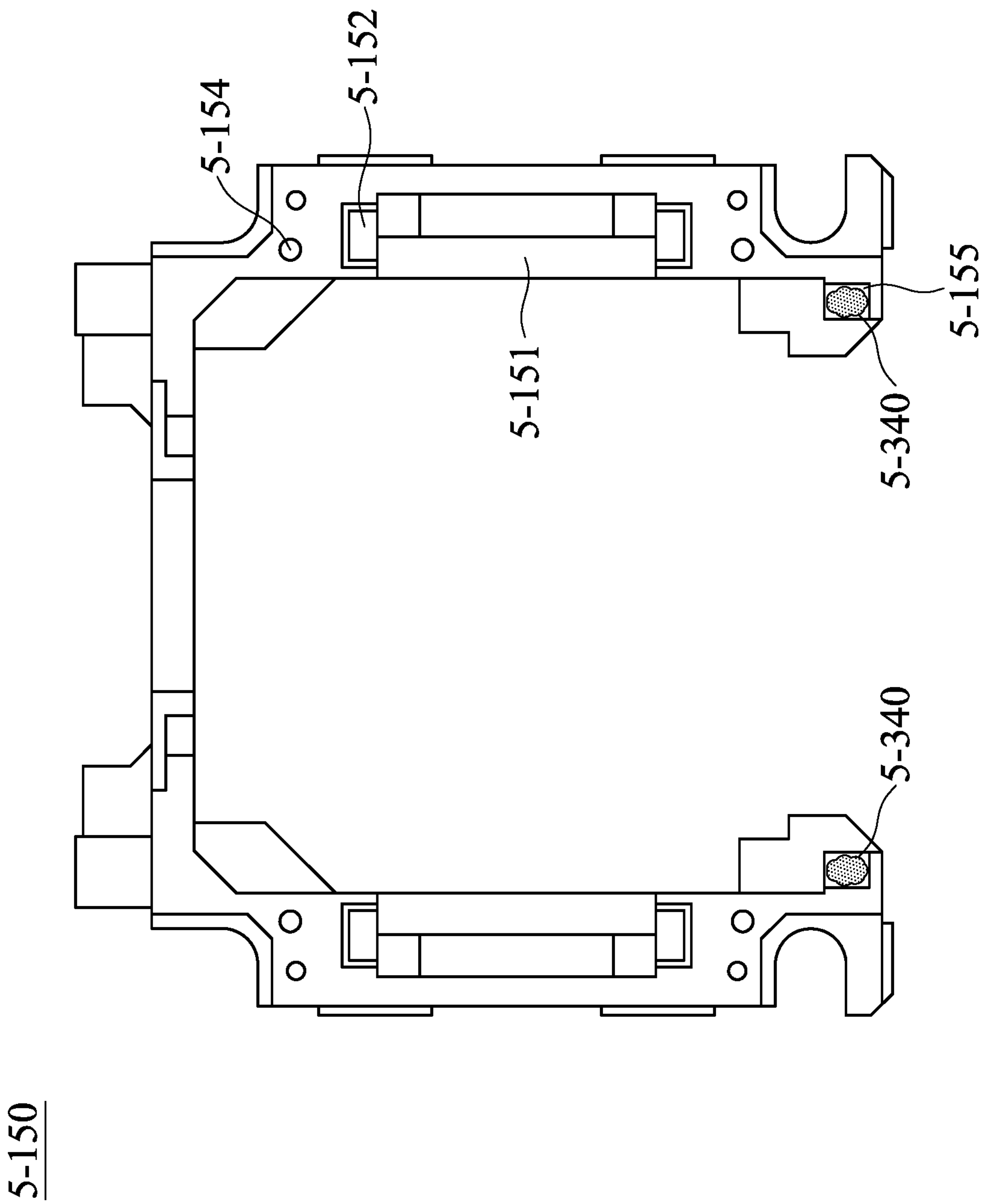
FIG. 60 is a top view of the movable frame.
Figure 61:
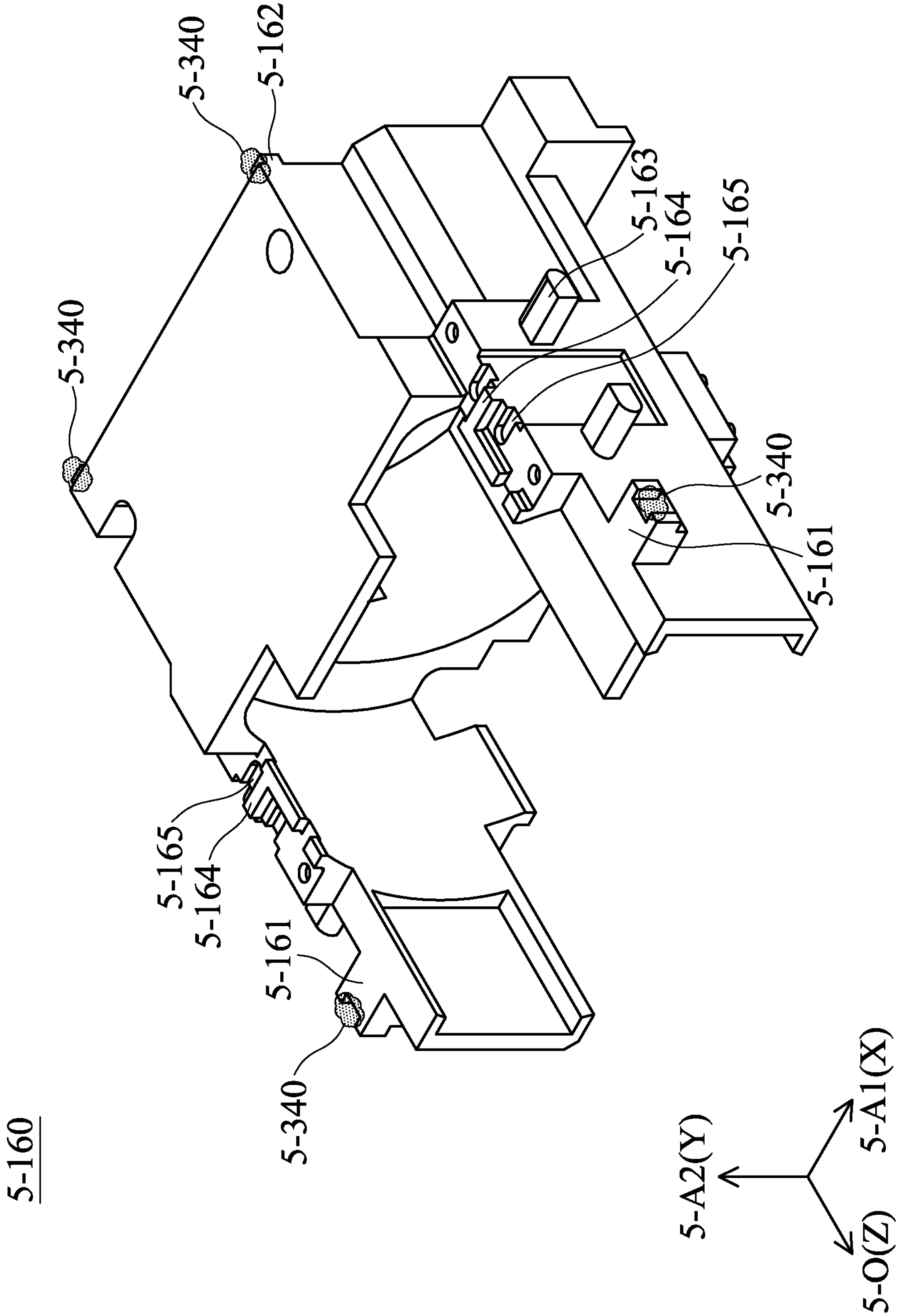
FIG. 61 is a perspective view of the holder.
Figure 62:
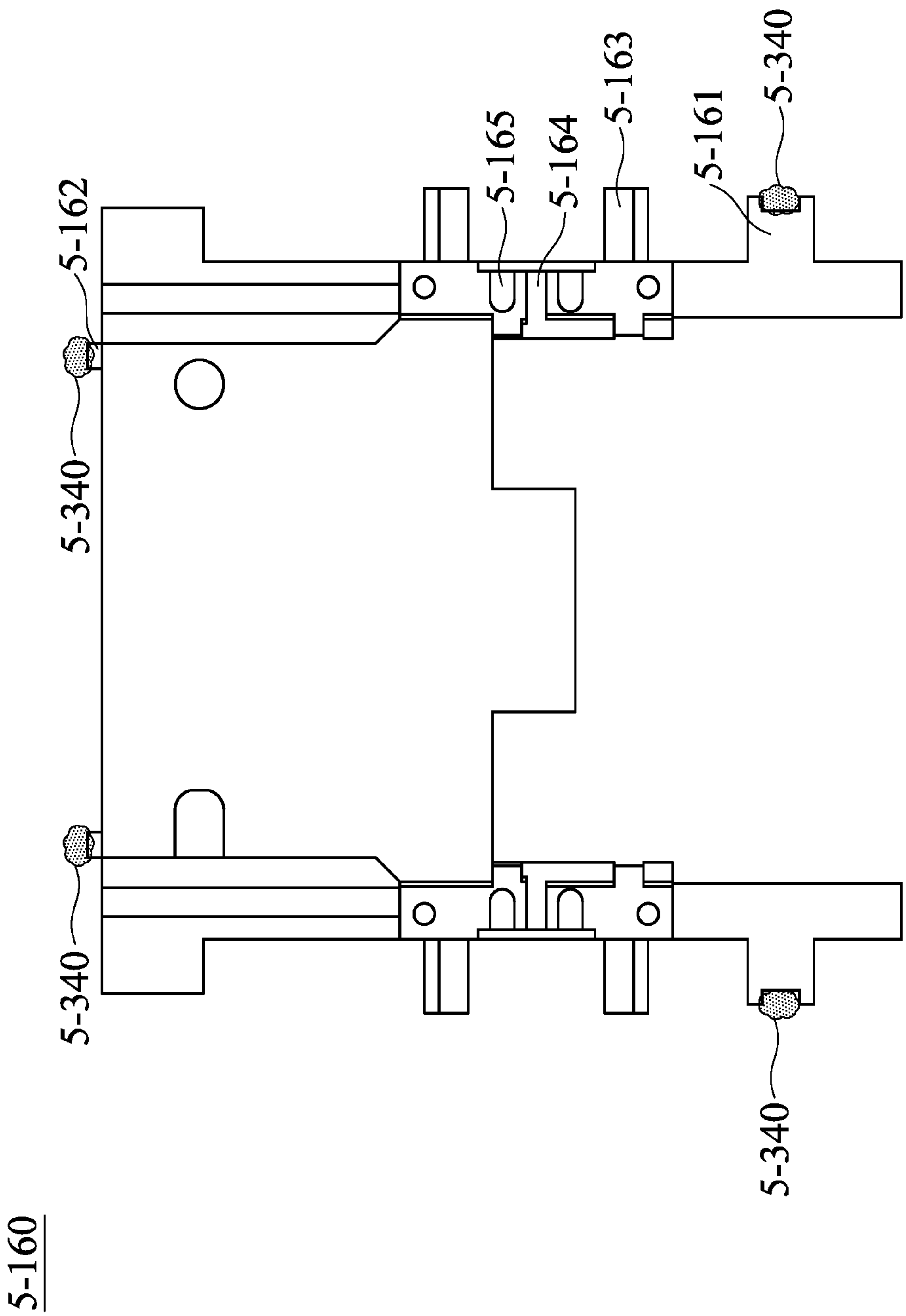
FIG. 62 is a top view of the holder.

Please also refer to FIG. 59 to FIG. 62 to understand the movable part 5-M. FIG. 59 is a perspective view of the movable frame 5-150. FIG. 60 is a top view of the movable frame 5-150. FIG. 61 is a perspective view of the holder 5-160. FIG. 62 is a top view of the holder 5-160.

The movable frame 5-150 is disposed between the immovable frame 5-120 and the circuit assembly 5-320. The movable frame 5-150 is substantially U-shaped to surround the holder 5-160. As shown in FIG. 59 and FIG. 60, the movable frame 5-150 includes at least one first recession 5-151, at least one second recession 5-152, at least one third recession 5-153, at least one first elastic element connection portion 5-154, at least one upper stopping portion 5-155, and at least one lower stopping portion 5-156.

The first recession 5-151 faces the first drive magnetic element 5-200 and the second drive magnetic element 5-210. The first recession includes a first half 5-1511 and a second half 5-1512, and the size of the first half 5-1511 is different from that of the second half 5-1512. The first half 5-1511 of the first recession 5-151 may receive at least part of the first drive magnetic element 5-200 while the second half 5-1512 of the first recession 5-151 may receive at least part of the second drive magnetic element 5-210. The second recession 5-152 is formed on the edge of the first recession 5-151. The second recession 5-152 includes an outflow-proof structure 5-1521. The outflow-proof structure 5-1521 is substantially step-like. The third recession 5-153 may receive at least part of the third drive magnetic element 5-230. The first elastic element connection portion 5-154 is disposed on the top surface of the movable frame 5-150 for connecting to the first elastic element 5-140. The first elastic element connection portion 5-154 may be a protrusion.

The upper stopping portion 5-155 is the part of the movable frame 5-150 that is closest to the top wall 5-113 of the case 5-110. The upper stopping portion 5-155 extends upwardly in the second direction 5-A2. The lower stopping portion 5-156 is the part of the movable frame 5-150 that is closest to the circuit assembly 5-320. The lower stopping portion 5-156 extends downwardly in the second direction 5-A2. The upper stopping portion 5-155 and the lower stopping portion 5-156 may restrict the range of movement of the movable frame 5-150 in the second direction 5-A2. When the movable frame 5-150 moves upwardly in the second direction 5-A2 and reaches the limit, the upper stopping portion 5-155 is in contact with the top wall 5-113 of the case 5-110, and thus the movable frame 5-150 cannot keep moving upwardly. When the movable frame 5-150 moves downwardly in the second direction 5-A2 and reaches the limit, the lower stopping portion 5-156 is in contact with the circuit assembly 5-320, and thus the movable frame 5-150 cannot keep moving downwardly.

The holder 5-160 is disposed in the movable frame 5-150. As shown in FIG. 61 and FIG. 62, the holder 5-160 includes at least one first damping element placement portion 5-161, at least one second damping element placement portion 5-162, at least one second coil placement portion 5-163, at least one separation element 5-164, and at least one second coil start lead placement portion 5-165.

The first damping element placement portion 5-161 extends in the first direction 5-A1. The second damping element placement portion 5-162 extends along the optical axis 5-O. In other words, the first damping element placement portion 5-161 and the second damping element placement portion 5-162 extend along different directions. The arrangement direction of the two first damping element placement portions 5-161 is parallel with the first direction 5-A1. Also, the arrangement direction of the two second damping element placement portions 5-162 is parallel with the first direction 5-A1. In other words, the arrangement direction of the first damping element placement portions 5-161 is parallel with the arrangement direction of the second damping element placement portions 5-162.

The second coil placement portion 5-163 is disposed on the side of the holder 5-160 for placing the second coil 5-180. The separation element 5-164 and the second coil start lead placement portion 5-165 are close to the second coil placement portion 5-163. The separation element 5-164 is located between the two second coil start lead placement portions 5-165.

Figure 63:
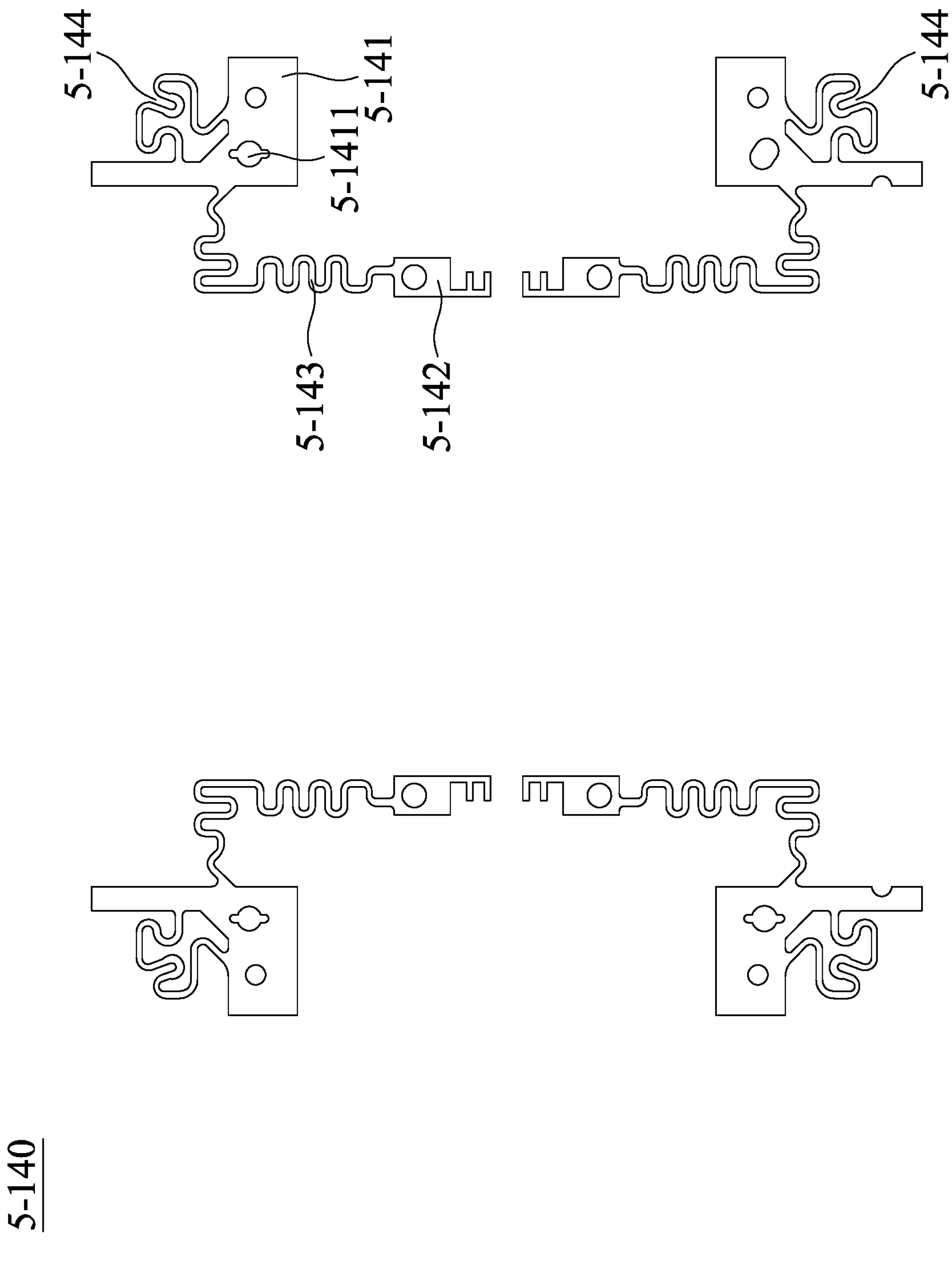
FIG. 63 is a top view of the first elastic element.
Figure 64:
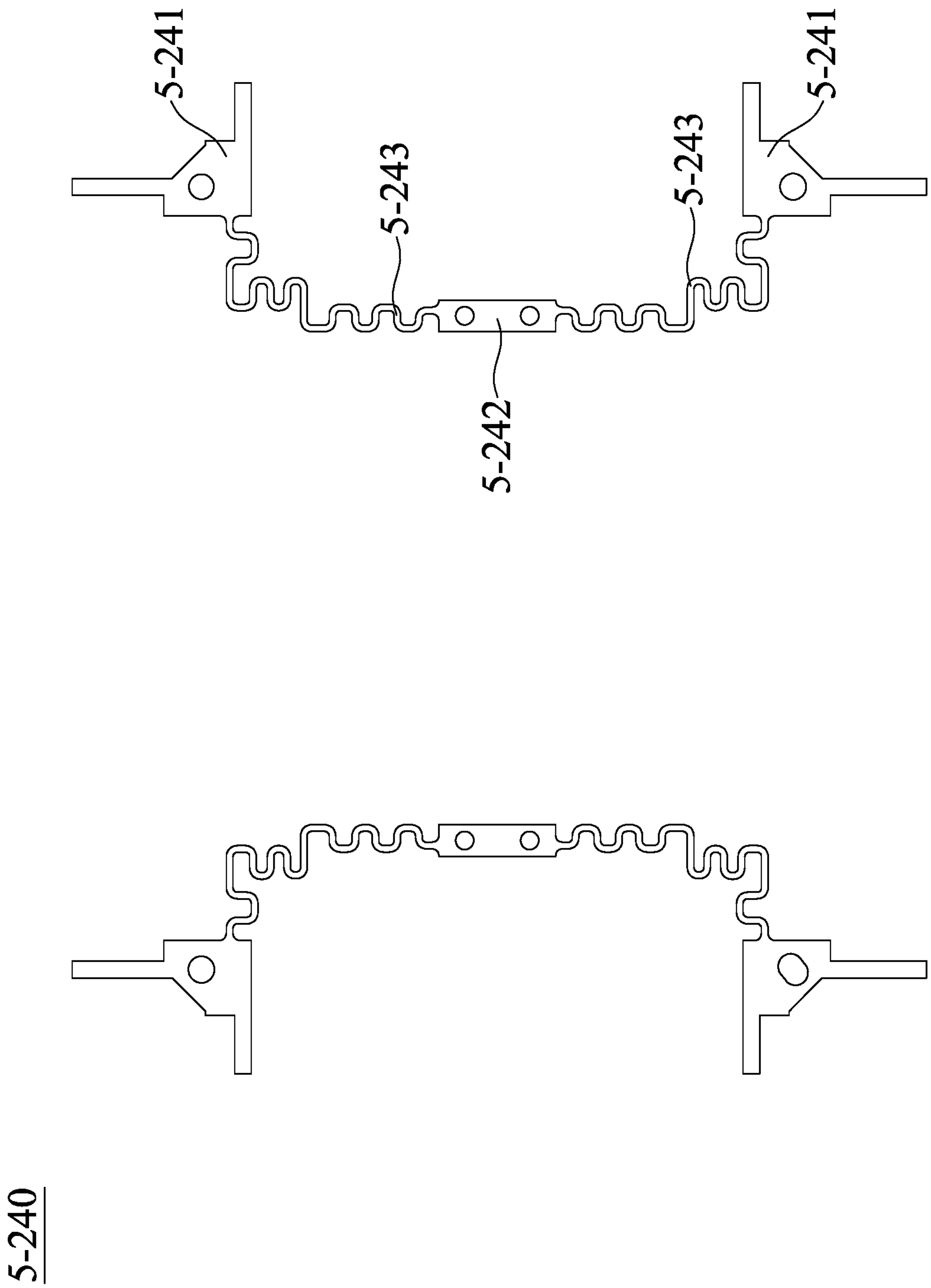
FIG. 64 is a top view of the second elastic element.
Figure 65:
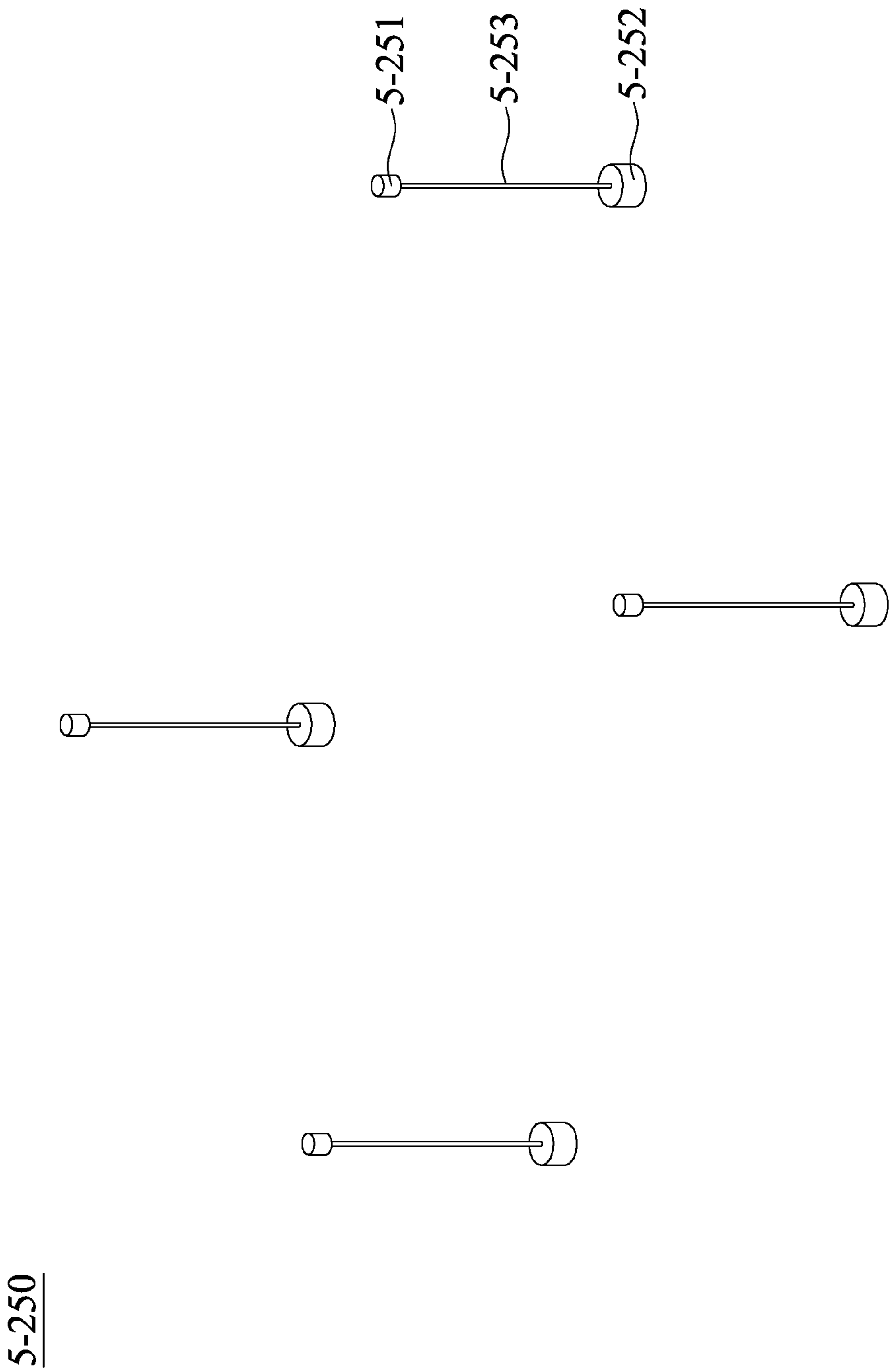
FIG. 65 is a perspective view of the third elastic element.

Please refer to FIG. 63 to FIG. 65 to understand the elastic assembly 5-E. FIG. 63 is a top view of the first elastic element 5-140. FIG. 64 is a top view of the second elastic element 5-240. FIG. 65 is a perspective view of the third elastic element 5-250. The first elastic element 5-140 and the second elastic element 5-240 are made of an elastic material or a ductile material such as metal. In this technical field, the first elastic element 5-140 and the second elastic element 5-240 may be known as "spring", "leaf spring". "plate spring", etc.

The first elastic element 5-140 is disposed between the immovable frame 5-120 and the movable frame 5-150. The first elastic element 5-140 is elastically connected to the movable frame 5-150 and the holder 5-160. As shown in FIG. 63, each of the first elastic elements 5-140 includes a movable frame connection portion 5-141, a holder connection portion 5-142, a deformation portion 5-143, and a third elastic element connection portion 5-144. The movable frame connection portion 5-141 is disposed on the top surface of the movable frame 5-150. The movable frame connection portion 5-141 may include a hole 5-1411 that correspond to the first elastic element connection portion 5-154 of the movable frame 5-150 to strengthen the connection between the movable frame 5-150 and the first elastic element 5-140. The holder connection portion 5-142 is disposed on the top surface of the holder 5-160. The deformation portion 5-143 is connected to the movable frame connection portion 5-141 and the holder connection portion 5-142. The third elastic element 5-250 is placed in the third elastic element connection portion 5-144.

The second elastic element 5-240 is disposed between the movable frame 5-150 and the circuit assembly 5-320. The second elastic element 5-240 is connected to the movable frame 5-150 and the holder 5-160. As shown in FIG. 64, each of the second elastic elements 5-240 includes two movable frame connection portions 5-241, a holder connection portion 5-242, and two deformation portions 5-243. The movable frame connection portion 5-241 is disposed on the bottom surface of the movable frame 5-150. The movable frame connection portion 5-241 may include a structure for strengthening the connection between the movable frame 5-150 and the second elastic element 5-240. The holder connection portion 5-242 is disposed on the bottom surface of the holder 5-160. The deformation portion 5-243 is connected to the movable frame connection portion 5-241 and the holder connection portion 5-242.

Due to the elongation and shrinkage of the deformation portion 5-143 and deformation portion 5-243, the first elastic element 5-140 and the second elastic element 5-240 may elastically hold the holder 5-160 and prevent the holder 5-160 from getting damaged because of collision with other elements.

As shown in FIG. 65, each of the third elastic elements 5-250 includes an upper end 5-251, a lower end 5-252, and a middle section 5-253. The upper end 5-251 is connected to the third elastic element connection portion 5-144 of the first elastic element 5-140 while the lower end 5-252 is connected to the third elastic element connection portion 5-324 of the circuit assembly 5-320. The middle section 5-253 is connected to the upper end 5-251 and the lower end 5-252.

Since the first elastic element 5-140 is connected to the movable frame 5-150 and the holder 5-150, actually, the third elastic elements 5-250 suspend the movable frame 5-150 together with the holder 5-160 between the case 5-110 and the bottom 5-330 of the immovable part 5-1, so that the movable frame 5-150 and the holder 5-150 are not in direction contact with the case 5-110 and the bottom 5-330, thereby reducing the collision occurred between the elements and strengthening the mechanical strength of the optical element driving mechanism 5-10.

As described above, due to the first elastic element 5-140 and the second elastic element 5-240, the holder 5-160 is movably connected to the movable frame 5-150, so that the holder 5-150 may move relative to the movable frame 5-150. Also, due to the third elastic element 5-250, the movable frame 5-150 is movably connected to the circuit assembly 5-320, so that the movable frame 5-150 and the holder 5-160 therein may move relative to the circuit assembly 5-320. That is, the movable part 5-M is movable relative to the immovable part 5-I.

Figure 66:
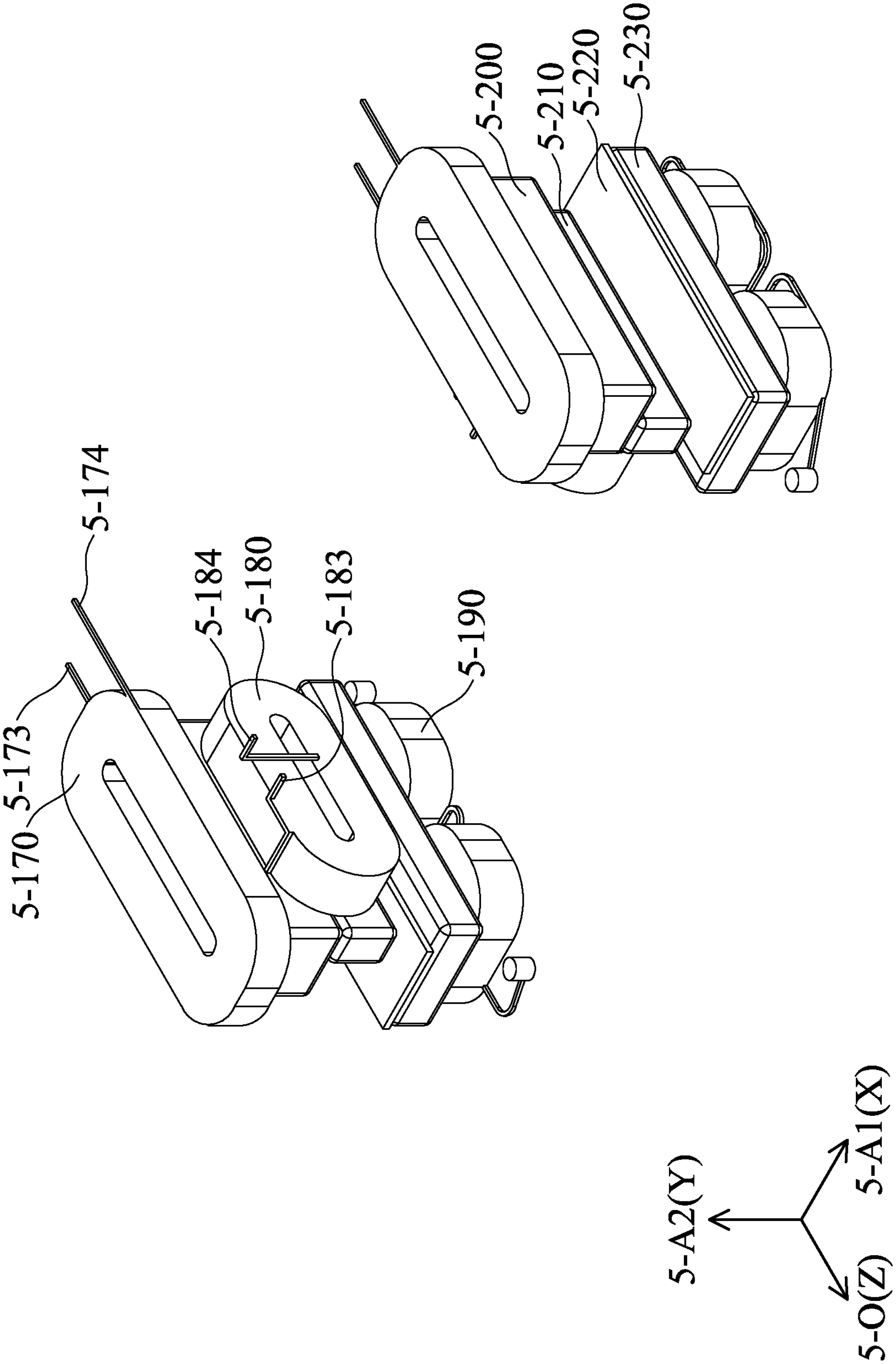
FIG. 66 is a perspective view of the drive assembly.
Figure 67:
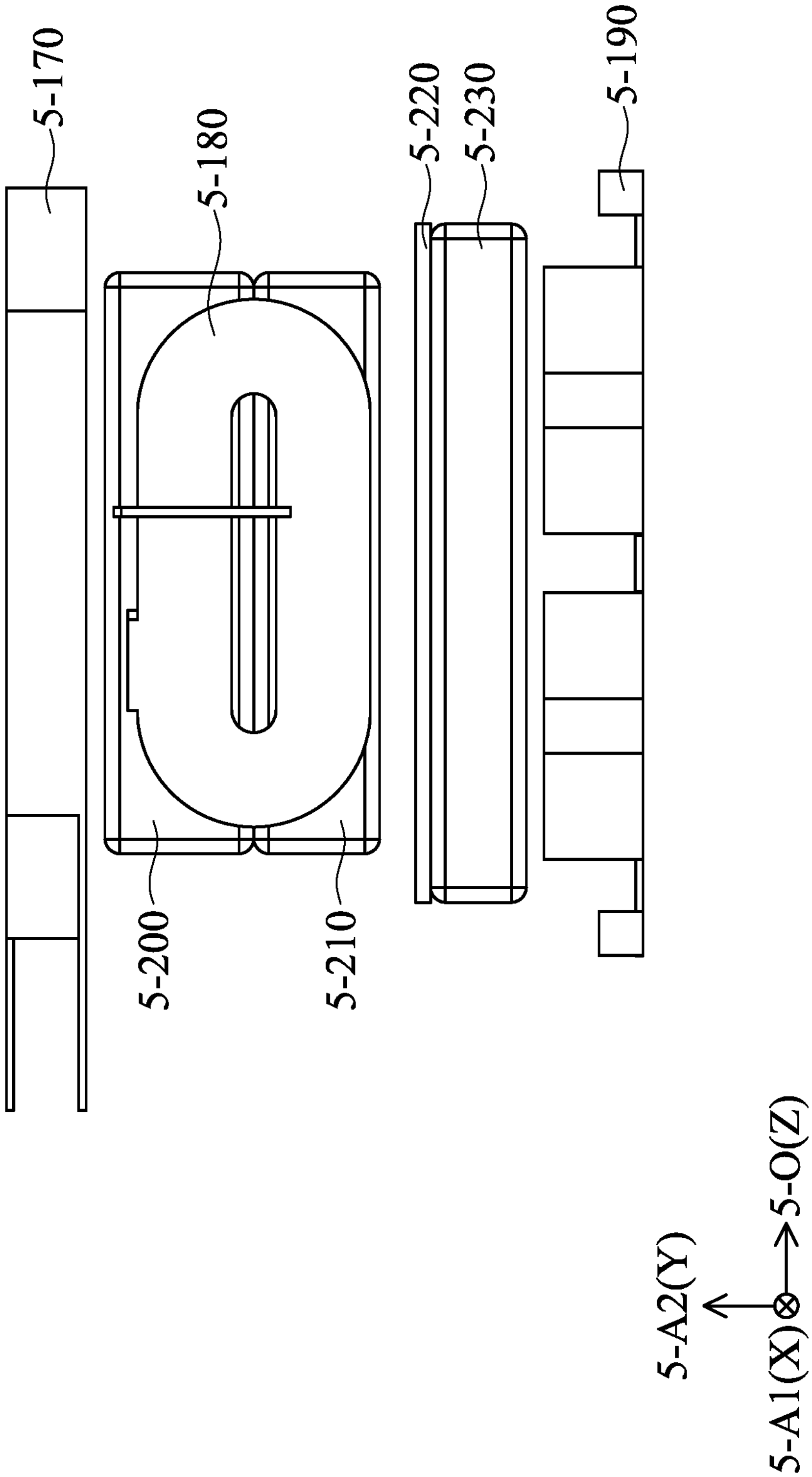
FIG. 67 is a side view of the drive assembly.
Figure 68:
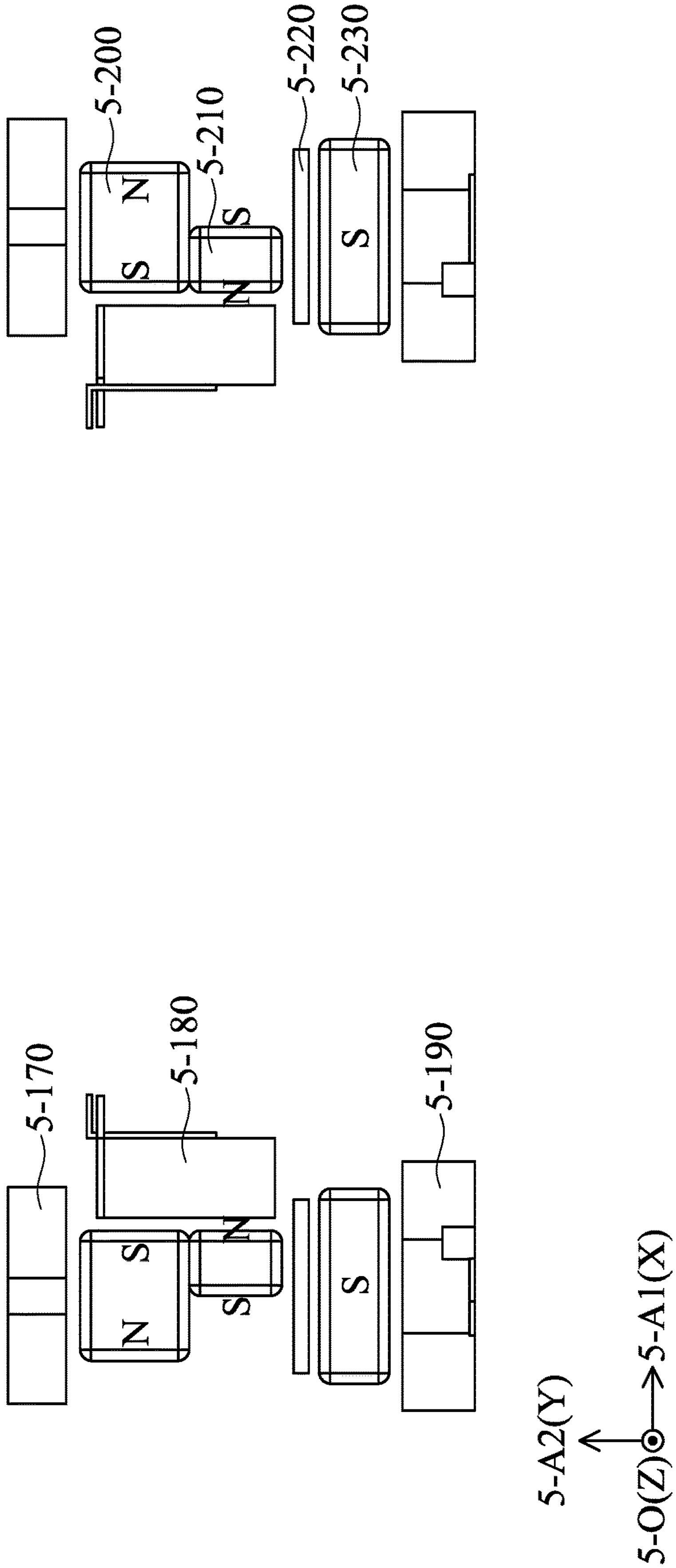
FIG. 68 is a front view of the drive assembly.
Figure 69:
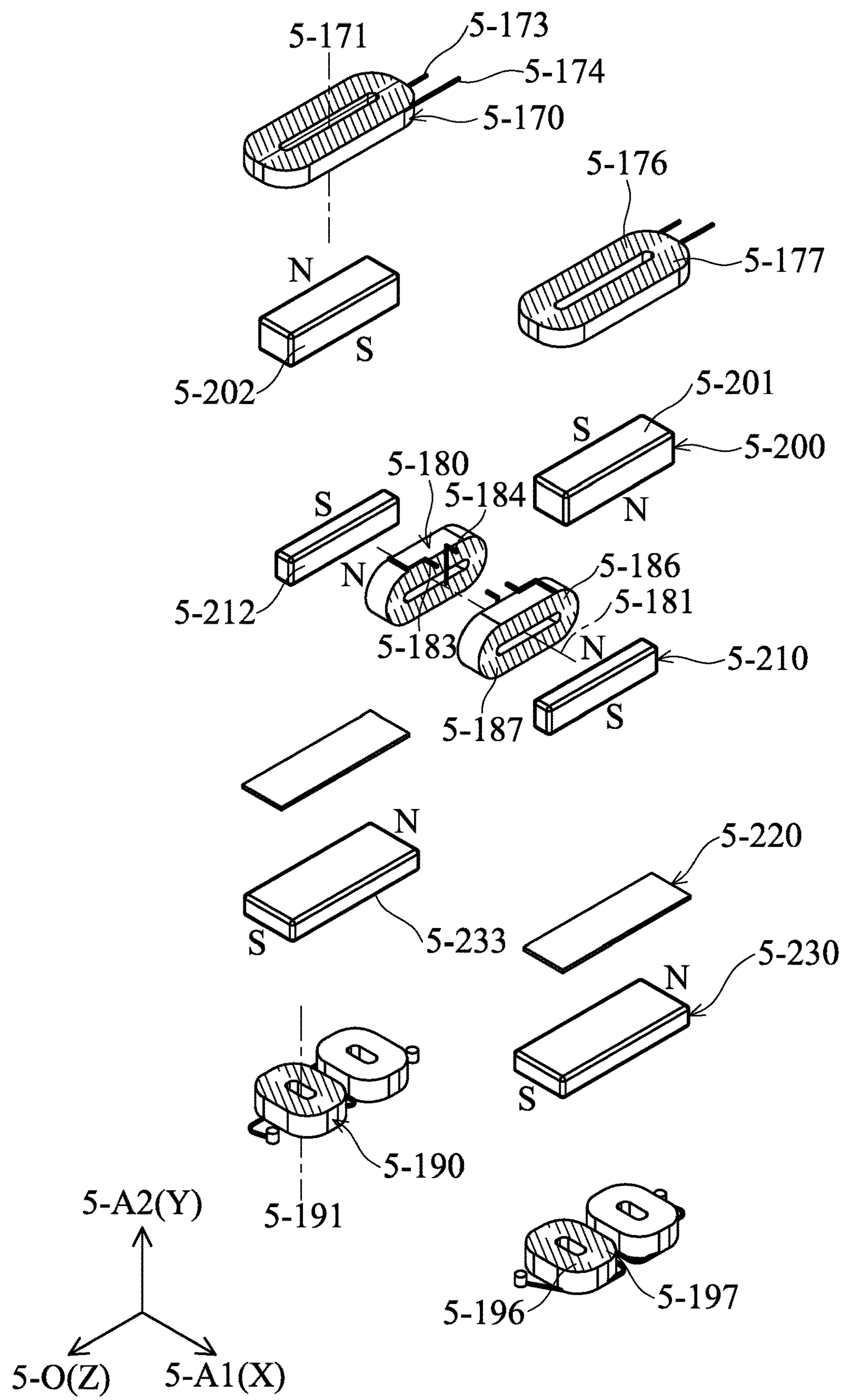
FIG. 69 is an exploded view of the drive assembly.

Please refer to FIG. 66 to FIG. 69 to understand the drive assembly 5-D. FIG. 66 is a perspective view of the drive assembly 5-D. FIG. 67 is a side view of the drive assembly 5-D. FIG. 68 is a front view of the drive assembly 5-D. FIG. 69 is an exploded view of the drive assembly 5-D. The arrangement direction of the first coil 5-170, the second coil 5-180, and the third coil 5-190 is parallel with the second direction 5-A2. When viewed from the second direction 5-A2, the first coil 5-170, the second coil 5-180, and the third coil 5-190 at least partially overlap each other. Also, the arrangement direction of the first drive magnetic element 5-200, the second drive magnetic element 5-210, the magnetically-permeable element 5-220, and the third drive magnetic element 5-230 is parallel with the second direction 5-A2. When viewed from the second direction 5-A2, the first drive magnetic element 5-200, the second drive magnetic element 5-210, the magnetically-permeable element 5-220, and the third drive magnetic element 5-230 at least partially overlap each other.

The first coil 5-170 is disposed between the immovable frame 5-120 and the movable frame 5-150. A winding axis 5-171 of the first coil 5-170 is parallel with the second direction 5-A2. The first coil 5-170 includes a first coil first start lead 5-173 and a first coil second lead 5-174. The second coil 5-180 is disposed on the second coil placement portion 5-163 of the holder 5-160. A winding axis 5-181 of the second coil 5-180 is parallel with the first direction 5-A1. The second coil 5-180 includes a second coil first start lead 5-183 and a second coil second start lead 5-184. The third coil 5-190 is disposed on the circuit assembly 5-320. A winding axis 5-191 of the third coil 5-190 is parallel with the second direction 5-A2. As described above, the winding axis 5-171 of the first coil 5-170 is not parallel with the winding axis 5-181 of the second coil 5-180. Alternatively, the winding axis 5-171 of the first coil 5-170 is perpendicular to the winding axis 5-181 of the second coil 5-180. The winding axis 5-171 of the first coil 5-170 is parallel with the winding axis 5-191 of the third coil 5-190. Therefore, the arrangement and the configuration of the first coil 5-170, the second coil 5-180, and the third coil 5-190 may reduce the overall thickness of the optical element driving mechanism 5-10 and thus achieve lightweight and save power.

The first coil 5-170, the second coil 5-180, and third coil 5-190 are substantially bar-like. In some embodiments, the first coil 5-170, the second coil 5-180, and third coil 5-190 may be rectangular, polygonal, oval, and the like. The major axis (the longer side) of the first coil 5-170 is parallel with the optical axis 5-O while the minor axis (the shorter side) of the first coil 5-170 is parallel with the first direction 5-A1. The major axis of the second coil 5-180 is parallel with the optical axis 5-O while the minor axis of the second coil 5-180 is parallel with the second direction 5-A2. The major axis of the third coil 5-190 is parallel with the first direction 5-A1 while the minor axis of the third coil 5-190 is parallel with the optical axis 5-O. As described above, the major axis of the first coil 5-170 is parallel with the major axis of the second coil 5-180 and the minor axis of the third coil 5-190. That is, the major axis of the first coil is not parallel with the major axis of the third coil 5-190. The maximum size of the first coil 5-170 in a direction that is parallel with the optical axis 5-O is larger than the maximum size of the second coil 5-180 in a direction that is parallel with the optical axis 5-O. That is, the maximum size of the first coil 5-170 in a direction that is parallel with the optical axis 5-0 is different than the maximum size of the second coil 5-180 in in a direction that is parallel with the optical axis 5-O. The first drive magnetic element 5-200, the second drive magnetic element 5-210, and the third drive magnetic element 5-230 may be permanent magnets. The first drive magnetic element 5-200 is disposed on the first half 5-1511 of the first recession 5-151. The second drive magnetic element 5-210 is disposed on the second half 5-1512 of the first recession 5-151. The magnetically-permeable element 5-220 is disposed over the third drive magnetic element 5-230. In particular, the magnetically-permeable element 5-220 is disposed between the first drive magnetic element 5-200 and the third drive magnetic element 5-230. The magnetically-permeable element 5-220 is made of a material with magnetic permeability. The shape and the profile of the magnetically-permeable element 5-220 correspond to the shape and the profile of the third drive magnetic element 5-230. The magnetically-permeable element 5-220 may adjust the distribution of the magnetic field and may attract and concentrate the magnetic force generated by the drive assembly 5-D. The magnetically-permeable element 5-220 and the third drive magnetic element 5-230 are disposed on the third recession 5-153 of the movable frame 5-150.

The maximum size of the first drive magnetic element 5-200 in the first direction 5-A1 is greater than the maximum size of the second drive magnetic element 5-210 in the first direction 5-A1. That is, the maximum size of the first drive magnetic element 5-200 in the first direction 5-A1 is different from the maximum size of the second drive magnetic element 5-210 in the first direction 5-A1. The maximum size of the first drive magnetic element 5-200 in a direction that is parallel with the optical axis 5-O is less than the maximum size of the third drive magnetic element 5-230 in a direction that is parallel with the optical axis 5-O. That is, the maximum size of the first drive magnetic element 5-200 in a direction that is parallel with the optical axis 5-O is different from the maximum size of the third drive magnetic element 5-230 in a direction that is parallel with the optical axis 5-O.

The first coil 5-170 corresponds to an upper surface 5-201 of the first drive magnetic element 5-200. The second coil 5-180 corresponds to a side surface 5-202 of the first drive magnetic element 5-200 and a side surface 5-212 of the second drive magnetic element 5-210 at the same time. The third coil 5-190 corresponds to a lower surface 5-233 of the third drive magnetic element 5-230. The upper surface 5-201 of the first drive magnetic element 5-200 and the side surface 5-202 of the first drive magnetic element 5-200 are parallel with the optical axis 5-O. The upper surface 5-201 of the first drive magnetic element 5-200 is not parallel with the side surface 5-202 of the first drive magnetic element 5-200. The side surface 5-202 of the first drive magnetic element 5-200 is parallel with the side surface 5-212 of the second drive magnetic element 5-210. The upper surface 5-201 of the first drive magnetic element 5-200 is parallel with the lower surface 5-233 of the third drive magnetic element 5-230.

It should be noted that "the main current regions" of the first coil 5-170, the second coil 5-180, and the third coil 5-190 are shown in slant lines in FIG. 69. "The main current regions" represents the main regions of the first coil 5-170, the second coil 5-180, and the third coil 5-190 that may generate magnetic force to drive the movable part 5-M to move. The regions that are not labeled with slant lines are not the main current regions, which may only generate weak magnetic force that is not enough for driving the movable part 5-M to move. The area of the magnetic poles that the main current regions correspond to have to be as large as possible so as to generate magnetic force as great as possible.

For example, the main current regions of the first coil 5-170 includes a left half 5-176 and a right half 5-177. The direction of the current flowing through the left half 5-176 is opposite to the direction of the current flowing through the right half 5-177. From the right-hand rule that describing the relationship between the current, the magnetic field, and the magnetic force, to make the direction of the magnetic force generated by the left half 5-176 the same as the direction of the magnetic force generated by the right half 5-177, the left half 5-176 and the right half 5-177 need different directions of the magnetic field. Therefore, the left half 5-176 and the right half 5-177 need to correspond to different magnetic poles. That is, the arrangement direction of the magnetic poles of the first drive magnetic element 5-200 that corresponds to the first coil 5-170 need to be the same as the arrangement direction of the main current regions of the first coil 5-170. The arrangement direction of the magnetic poles represents the arrangement direction of a pair of magnetic poles (N-pole and S-pole). Since the arrangement direction of the left half 5-176 and the right half 5-177 is parallel with the first direction 5-A1, the arrangement direction of the magnetic poles of the first drive magnetic element 5-200 is also parallel with the first direction 5-A1.

When the current flows into the first coil 5-170, the magnetic force generated by the main current regions (i.e. the left half 5-176 and the right half 5-177) of the first coil 5-170 and the first drive magnetic element 5-200 is in the first direction 5-A1, so that the generated magnetic force may drive the movable part 5-M to move relative to the immovable part 5-I in the first direction 5-A1.

Similarly, the main current regions of the second coil 5-180 includes an upper half 5-186 and a lower half 5-187. The direction of the current flowing through the upper half 5-186 is opposite to the direction of the current flowing through the lower half 5-187. To make the direction of the magnetic force generated by the upper half 5-186 the same as the direction of the magnetic force generated by the lower half 5-187, the upper half 5-186 and the lower half 5-187 need different directions of the magnetic field. Therefore, the upper half 5-186 and the lower half 5-187 need to correspond to different magnetic poles. In particular, the direction of the magnetic field provided by the side surface 5-202 of the first drive magnetic element 5-200 that corresponds to the upper half 5-186 need to be different from the direction of the magnetic field provided by the side surface 5-202 of the first drive magnetic element 5-200 that corresponds to the lower half 5-187. That is, the arrangement direction of the magnetic poles of the second drive magnetic element 5-210 is parallel with the arrangement direction of the magnetic poles of the first drive magnetic element 5-200 and the first direction 5-A1. However, the magnetic pole of the first drive magnetic element 5-200 that faces the second coil 5-180 is different from the magnetic pole of the second drive magnetic element 5-210 that faces the second coil 5-180. In FIG. 69, the S-pole of the first drive magnetic element 5-200 faces the second coil 5-180 while the N-pole of the second drive magnetic element 5-210 faces the second coil 5-180. However, in some other embodiments, the N-pole of the first drive magnetic element 5-200 faces the second coil 5-180 while the S-pole of the second drive magnetic element 5-210 faces the second coil 5-180.

When the current flows into the second coil 5-180, the magnetic force generated by the main current regions (i.e. the upper half 5-186 and the lower half 5-187) of the second coil 5-180 and the first drive magnetic element 5-200 and the second drive magnetic element 5-210 is in the second direction 5-A2, so that the generated magnetic force may drive the movable part 5-M to move relative to the immovable part 5-1 in the second direction 5-A2.

Figure 73:
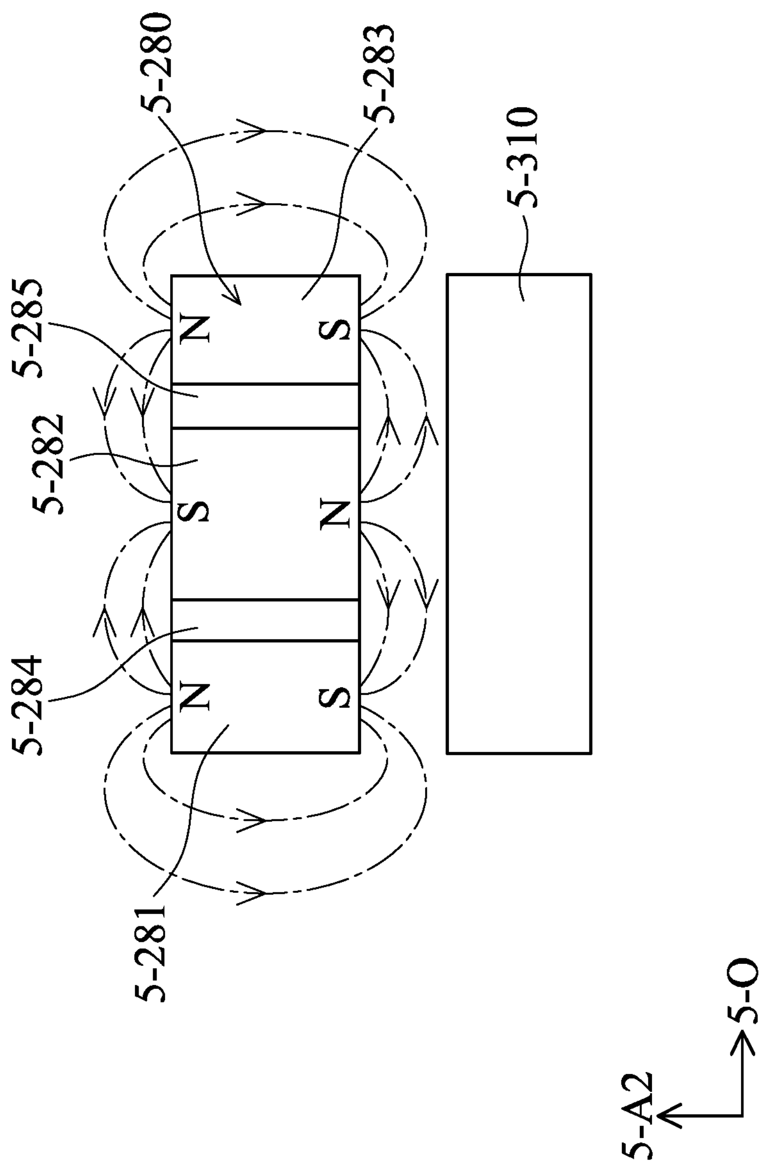
FIG. 73 is a schematic view of the third reference magnetic element and the third sensing element.

Similarly, the main current regions of the third coil 5-190 includes a front half 5-196 and a back half 5-197. The direction of the current flowing through the front half 5-196 is opposite to the direction of the current flowing through the back half 5-197. To make the direction of the magnetic force generated by the front half 5-196 the same as the direction of the magnetic force generated by the back half 5-197, the front half 5-196 and the back half 5-197 need different directions of the magnetic field. Therefore, the third drive magnetic element 5-230 is a multipole magnet and the direction of the magnetic poles of the third drive magnetic element 5-230 is parallel with the second direction 5-A2 (as shown in FIG. 73).

When the current flows into the third coil 5-190, the magnetic force generated by the main current regions (i.e. the front half 5-196 and the back half 5-197) of the third coil 5-190 and the third drive magnetic element 5-230 is in a direction that is parallel with the optical axis 5-O, so that the generated magnetic force may drive the movable part 5-M to move relative to the immovable part 5-I in the optical axis 5-O. It should be noted that the main current regions of the third coil 5-190 is less than the main current regions of the first coil 5-170 and the second coil 5-180, so that the number of third coils 5-190 is greater than the number of first coils 5-170 and the number of second coils 5-180.

As described above, the arrangement direction of the magnetic poles of the first drive magnetic element 5-200 is parallel with the arrangement direction of the magnetic poles of the second drive magnetic element 5-210. However, the arrangement direction of the magnetic poles of the first drive magnetic element 5-200 is not parallel with the arrangement direction of the magnetic poles of the third drive magnetic element 5-230. Alternatively, the arrangement direction of the magnetic poles of the first drive magnetic element 5-200 is perpendicular to the arrangement direction of the magnetic poles of the third drive magnetic element 5-230.

In some embodiments, to enhance the stability of the movable part 5-M when it moves relative to the immovable part 5-I, a damping element 5-340 (illustrated in FIG. 59 to FIG. 62) may be placed. The damping element 5-340 is made of a material that may absorb shock and may inhibit vibration, such as a gel. When the optical element driving mechanism 5-10 is impacted by an external force, the damping element 5-340 may prevent a severe collision between the holder 5-150 and the movable frame 5-160 and/or between the movable part 5-M and the immovable part 5-I. Furthermore, the damping element 5-340 may help the movable part 5-M to return to its original position quickly when it is impacted. Therefore, the damping element 5-340 may improve the mechanical strength of the optical element driving mechanism 5-10.

The damping element 5-340 may be disposed on the upper stopping portion 5-155 of the movable frame 5-150, the lower stopping portion 5-156 of the movable frame 5-150, the first damping element placement portion 5-161 of the holder 5-160, and the second damping element placement portion 5-162 of the holder 5-160. Therefore, the upper stopping portion 5-155 and the lower stopping portion 5-156 may be referred to as "the movable frame damping element placement portion". When the damping element 5-340 is disposed on the upper stopping portion 5-155 of the movable frame 5-150, the damping element 5-340 is disposed between the movable frame 5-150 and the case 5-110. When the damping element 5-340 is disposed on the lower stopping portion 5-156 of the movable frame 5-150, the damping element 5-240 is disposed between the movable frame 5-150 and the circuit assembly 5-320. When the damping element 5-340 is disposed on the first damping element placement portion 5-161 of the holder 5-160 and/or the second damping element placement portion 5-162 of the holder 5-160, the damping element 5-340 is disposed between the holder 5-160 and the movable frame 5-150.

In particular, when the first coil 5-170 and the first drive magnetic element 5-200 drive the movable part 5-M to move in the first direction 5-A1, the damping element 5-340 disposed on the first damping element placement portion 5-161 of the holder 5-160 may inhibit the shake and collision between the holder 5-160 and the movable frame 5-150 in the first direction 5-A1. When the second coil 5-180 and the second drive magnetic element 5-210 drive the movable part 5-M to move upwardly in the second direction 5-A2, the damping element 5-340 disposed on the upper stopping portion 5-155 of the movable frame 5-150 may inhibit the shake and collision between the movable frame 5-150 and the immovable frame 5-120 in the first direction 5-A1. Similarly, when the second coil 5-180 and the second drive magnetic element 5-210 drive the movable part 5-M to move downwardly in the second direction 5-A2, the damping element 5-340 disposed on the lower stopping portion 5-156 of the movable frame 5-150 may inhibit the shake and collision between the movable frame 5-150 and the circuit assembly 5-320 in the first direction 5-A1. Furthermore, when the third coil 5-190 and the third drive magnetic element 5-230 drive the movable part 5-M to move in the optical axis 5-O, the damping element 5-340 disposed on the second damping element placement portion 5-162 of the holder 5-160 may inhibit the shake and collision between the holder 5-160 and the movable frame 5-150 in a direction that is parallel with the optical axis 5-O. With suitable damping effects, the control speed and control accuracy may be significantly enhanced. Additionally, due to the aforementioned configuration, the stability of the damping element 5-340 is high and thus the damping element 5-340 is not easy to drop off. At the same time, the space is utilized and the overall optical element driving mechanism 5-10 is miniaturized.

Figure 70:
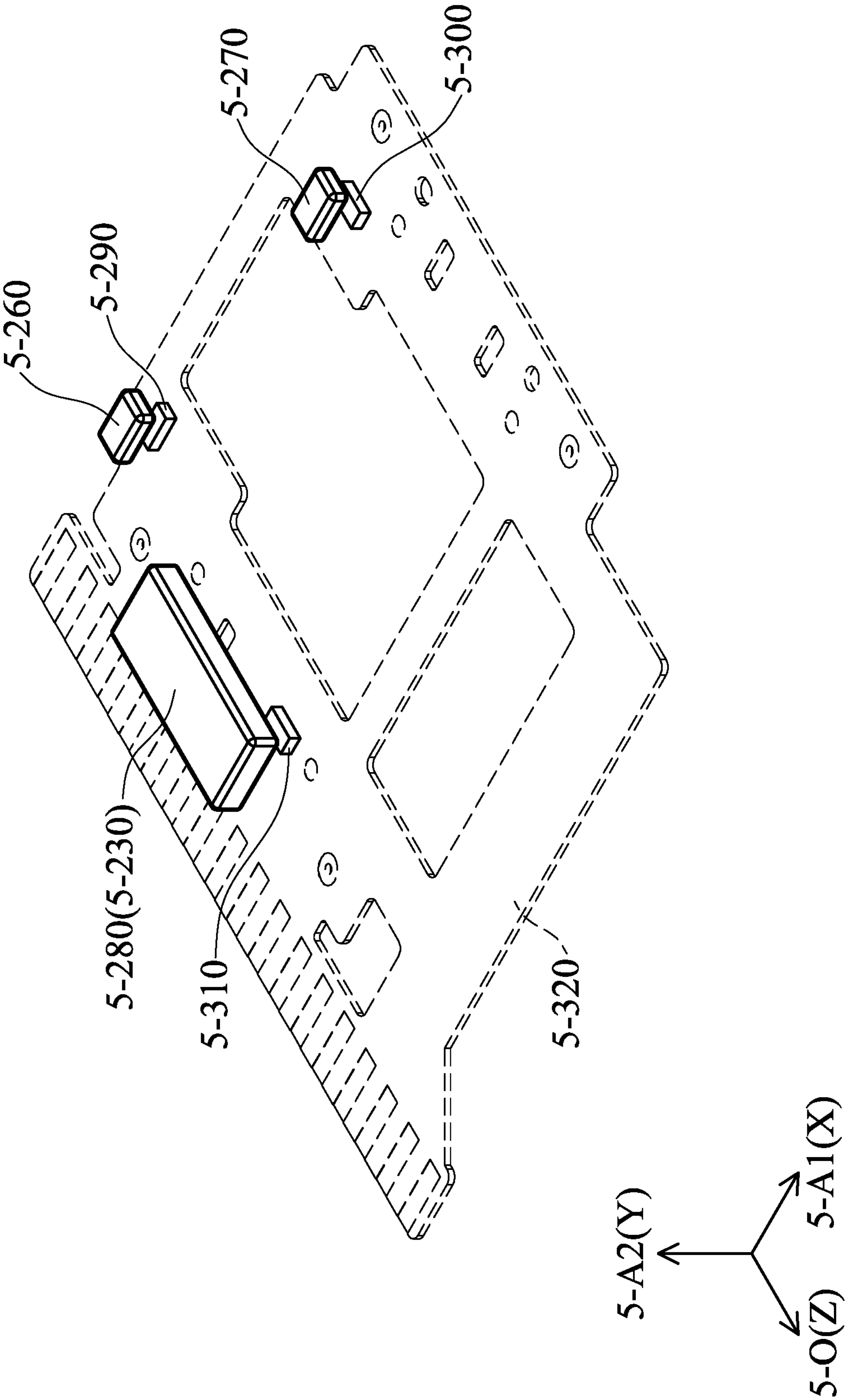
FIG. 70 is a schematic view of the circuit assembly and the position sensing assembly, wherein the circuit assembly is illustrated with dotted lines.
Figure 71:
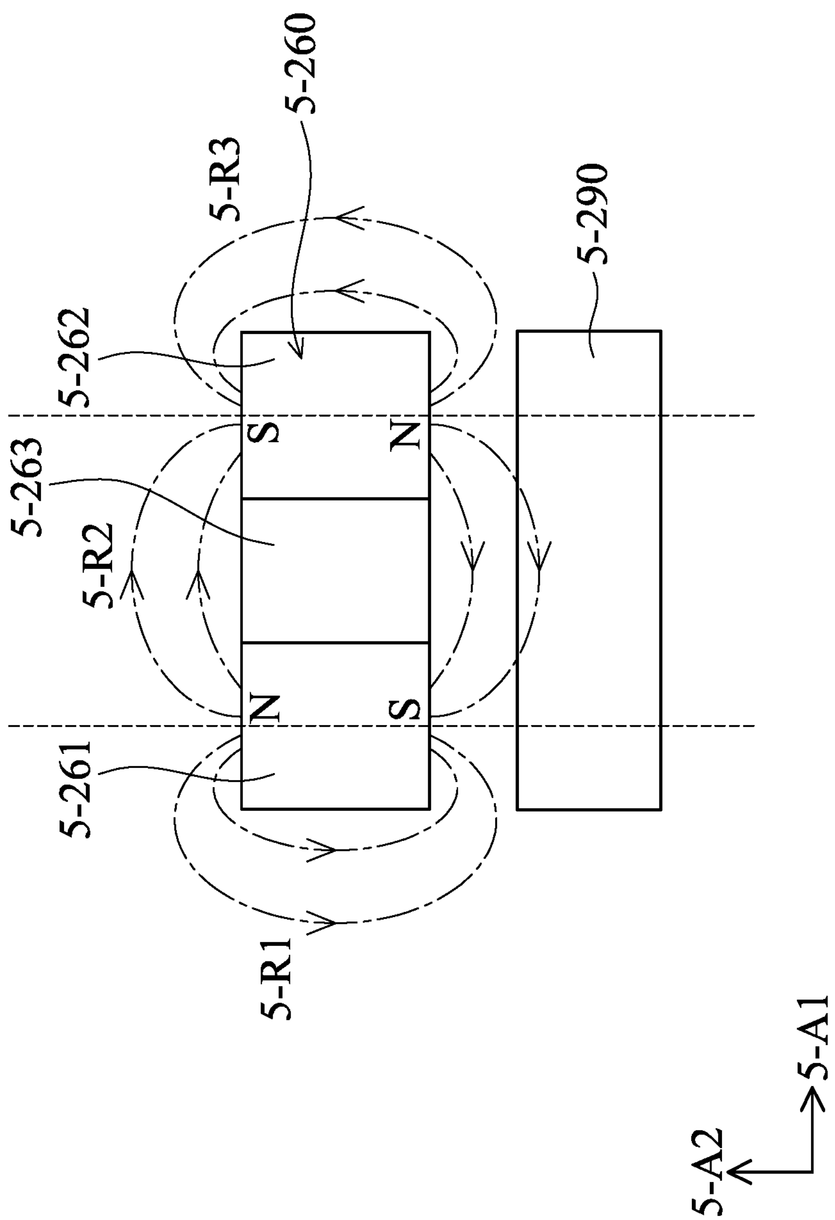
FIG. 71 is a schematic view of the first reference magnetic element and the first sensing element.
Figure 72:
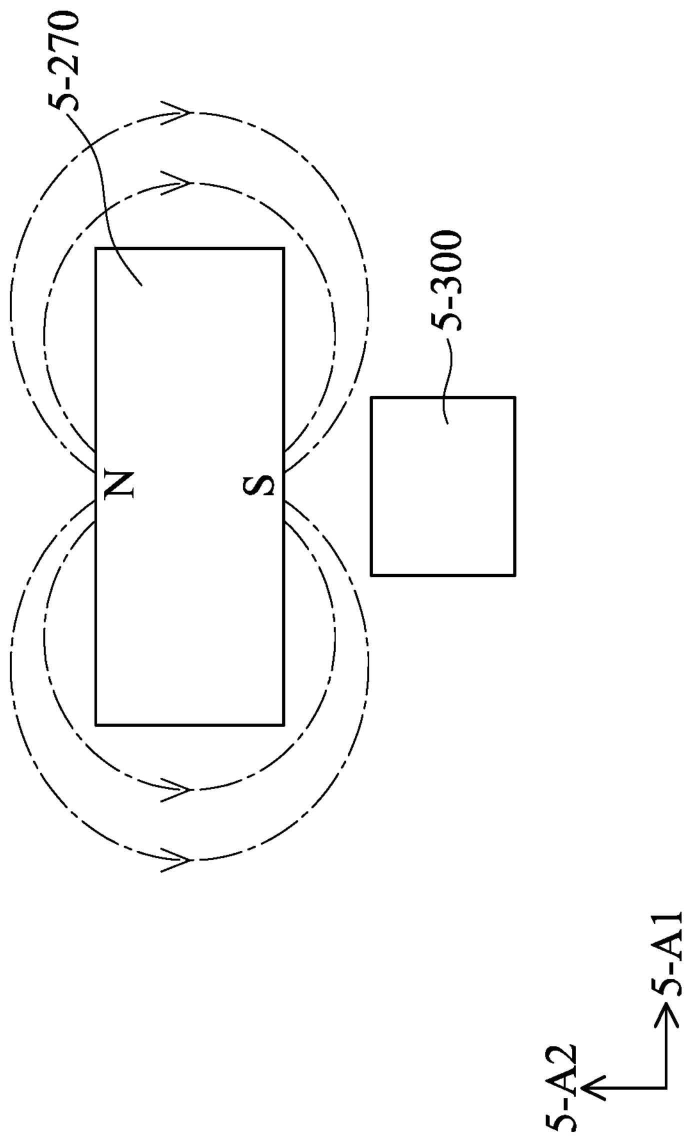
FIG. 72 is a schematic view of the second reference magnetic element and the second sensing element.

Please refer to FIG. 70 to FIG. 73 to understand the position sensing assembly 5-S. FIG. 70 is a schematic view of the circuit assembly 5-320 and the position sensing assembly 5-S, wherein the circuit assembly 5-320 is illustrated with dotted lines. FIG. 71 is a schematic view of the first reference magnetic element 5-260 and the first sensing element 5-290. FIG. 72 is a schematic view of the second reference magnetic element 5-270 and the second sensing element 5-300. FIG. 73 is a schematic view of the third reference magnetic element 5-280 and the third sensing element 5-310.

The first reference magnetic element 5-260, the second reference magnetic element 5-270, and the third reference magnetic element may be a permanent magnet. The first sensing element 5-290, the second sensing element 5-300, and the third sensing element 5-310 may be a Hall sensor, a giant magneto resistance (GMR) sensor, a tunneling magneto resistance (TMR) sensor, and the like.

It should be noted that the drive magnetic element may be used as the reference magnetic element in some embodiments, and thus no additional reference magnetic element is needed so as to simplify the manufacture process and reduce the cost. For example, in this embodiment, the third drive magnetic element 5-230 on the left side may be used as the third reference magnetic element 5-280. In the following, the third reference magnetic element 5-280 is exact the third drive magnetic element 5-230 of the left side, these two terms refer to the same element.

The first reference magnetic element 5-260 is disposed on the movable frame 5-150. The first sensing element 5-290 is disposed on the bottom surface of the circuit assembly 5-320 and is electrically connected to the circuit assembly 5-320. The first reference magnetic element 5-260 and the first sensing element 5-290 are located on different sides of the circuit assembly 5-320. The first sensing element 5-290 corresponds to the first reference magnetic element 5-260 to sense the movement of the movable frame 5-150 relative to the circuit assembly 5-320 in the first direction 5-A1, i.e., the movement of the movable part 5-M relative to the immovable part 5-M in the first direction 5-A1.

As shown in FIG. 71, the first reference magnetic element 5-260 includes at least one pair of magnetic poles and the first reference magnetic element 5-260 is a multipole magnet. The multiple pairs of magnetic poles of the first reference magnetic element 5-260 are arranged in the first direction 5-A1. The first reference magnetic element 5-260 includes at least two magnetic domains 5-261, 5-262 and a depletion region 5-263 located between the magnetic domain 5-261 and the magnetic domain 5-262. When a multi-pole magnet is manufactured, only the magnetic domain 5-261 and the magnetic domain 5-262 are magnetized, so the depletion region 5-263 is formed. The magnetic domain 5-261 and the magnetic domain 5-262 have a pair of N-pole and S-pole, respectively. Additionally, the arrangement direction of the magnetic poles of the magnetic domain 5-261 and the arrangement direction of the magnetic poles of the magnetic domain 5-262 is parallel with the second direction 5-A2.

By designing the first reference magnetic element 5-260 as a multi-pole magnet with multiple magnetic domains, the magnetic lines of force of the first reference magnetic element 5-260 are more intense. Additionally, the sensing accuracy may be further improved without increasing the volume of the first reference magnetic element 5-260. As a result, the size of the first reference magnetic element 5-260 may also be reduced, thereby the power consumption of the optical element driving mechanism 5-10 may be reduced and miniaturization may be achieved.

The S-pole of the magnetic domain 5-261 faces the first sensing element 5-290, and the N-pole of the magnetic domain 5-262 faces the first sensing element 5-290. It should be noted that in some other embodiments, the N-pole of the magnetic domain 5-261 faces the first sensing element 5-290, and the S-pole of the magnetic domain 5-262 faces the first sensing element 5-290.

Since the magnetic lines of force points to the S-pole from the N-pole, the side that the first reference magnetic element 5-260 faces the first sensing element 5-290 is divided into a first region 5-R1, a second region 5-R2, and a third region 5-R3 by the different directions of the magnetic lines of force. When the first sensing element 5-290 is in the first region 5-R1, the sensed magnetic lines of force point to the S-pole of the magnetic domain 5-261 from the N-pole of the magnetic domain 5-261. When the first sensing element 5-290 is in the second region 5-R2, the sensed magnetic lines of force point to the S-pole of the magnetic domain 5-261 from the N-pole of the magnetic domain 5-262. When the first sensing element 5-290 is in the third region 5-R3, the sensed magnetic lines of force point to the S-pole of the magnetic domain 5-262 from the N-pole of the magnetic domain 5-262. Moreover, the density of magnetic lines of force may be different in the first region 5-R1, the second region 5-R2, and the third region 5-R3.

When the movable frame 5-150 moves in the first direction 5-A1, the first reference magnetic element 5-260 disposed on the movable frame 5-150 also moves relative to the first sensing element 5-290 in the first direction 5-A1, so that the first sensing element 5-290 may sense the change of the magnetic field, including the density change of the magnetic lines of force and/or the direction change of the magnetic lines of force. The movement of the movable frame 5-150 in the first direction 5-A1 may be known accurately via the density change of the magnetic lines of force and/or the direction change of the magnetic lines of force sensed by the first sensing element 5-290.

The second reference magnetic element 5-270 is disposed on the holder 5-160. The second sensing element 5-300 is disposed on the bottom surface of the circuit assembly 5-320 and is electrically connected to the circuit assembly 5-320. The second reference magnetic element 5-270 and the second sensing element 5-300 are located on different sides of the circuit assembly 5-320. The second sensing element 5-300 corresponds to the second reference magnetic element 5-270 to sense the movement of the holder 5-160 relative to the circuit assembly 5-320 in the second direction 5-A2, i.e., the movement of the movable part 5-M relative to the immovable part 5-M in the second direction 5-A2.

As shown in FIG. 72, the second reference magnetic element 5-270 includes at least one pair of magnetic poles but the second reference magnetic element 5-270 is not a multi-pole magnet. That is, the number of magnetic poles of the second reference magnetic element 5-270 is different from the number of magnetic poles of the first reference magnetic element 5-260. The arrangement direction of the magnetic poles of the second reference magnetic element 5-270 is parallel with the second direction 5-A2. In other words, the arrangement direction of the magnetic poles of the second reference magnetic element 5-270 is not parallel with the first direction 5-A1.

The S-pole of the second reference magnetic element 5-270 faces the second sensing element 5-300. It should be noted that, in some other embodiments, the N-pole of the second reference magnetic element 5-270 faces the second sensing element 5-300. Since the second reference magnetic element 5-270 only includes one pair of magnetic poles, the second sensing element 5-300 may only sense the same direction of the magnetic lines. Compared to the first sensing element 5-290, Compared to the first sensing element 5-290, the second sensing element 5-300 can only sense the density change of the magnetic lines but cannot sense the direction change of the magnetic lines.

When the holder 5-160 moves in the second direction 5-A2, the second reference magnetic element 5-270 disposed on the holder 5-160 also moves relative to the second sensing element 5-300 in the second direction 5-A2, so that the second sensing element 5-300 may sense the density change of the magnetic lines of force. The movement of the holder 5-160 in the second direction 5-A2 may be known accurately via the direction change of the magnetic lines of force sensed by the second sensing element 5-300.

As described above, the third drive magnetic element 5-230 is disposed on the movable frame 5-150, i.e. the third reference magnetic element 5-280 is disposed on the movable frame 5-150. The third sensing element 5-310 is disposed on the bottom surface of the circuit assembly 5-320 and is electrically connected to the circuit assembly 5-320. In some embodiments, the third sensing element 5-310 is disposed in the third coil 5-190 to save the space and achieve miniaturization. The third reference magnetic element 5-280 and the third sensing element 5-310 are located on different sides of the circuit assembly 5-320. The third sensing element 5-310 corresponds to the third reference magnetic element 5-280 to sense the movement of the movable frame 5-150 relative to the circuit assembly 5-320 in the optical axis 5-O, i.e., the movement of the movable part 5-M relative to the immovable part 5-M in the optical axis 5-O. As described above, the arrangement direction of the magnetic poles of the third drive magnetic element 5-230 is parallel with the second direction 5-A2, i.e. the arrangement direction of the third reference magnetic element 5-280 is parallel with the second direction 5-A2. That is, the arrangement direction of the third reference magnetic element 5-280 is not parallel with the first direction 5-A1 and the optical axis 5-O.

As shown in FIG. 73, the third reference magnetic element 5-280 includes at least one pair of magnetic poles and the third reference magnetic element 5-280 is a multipole magnet, i.e. the number of pairs of magnetic poles of the third reference magnetic element 5-280 is different from the number of pairs of the magnetic poles of the second reference magnetic element 5-270. The multiple pairs of magnetic poles of the third reference magnetic element 5-280 are arranged along the optical axis 5-O. The third reference magnetic element 5-280 includes three magnetic domains 5-281, 5-282, 5-283, a depletion region 5-284 located between the magnetic domain 5-281 and the magnetic domain 5-282, and a depletion region 5-285 located between the magnetic domain 5-282 and the magnetic domain 5-283. It should be noted that since the magnetic domain 5-282 corresponds to main current regions of the two third coil 5-190, the range of the magnetic domain 5-282 is greater than the range of the magnetic domain 5-281 and the magnetic domain 5-283. For example, the volume of the magnetic domain 5-282 is twice as large as the volume of the magnetic domain 5-281 and the magnetic domain 5-283.

The S-pole of the magnetic domain 5-281 and the S-pole of the magnetic domain 5-283 are toward the third sensing element 5-310 while the N-pole of the magnetic domain 5-282 faces the third sensing element 5-310. However, in some other embodiments, the N-pole of the magnetic domain 5-281 and the N-pole of the magnetic domain 5-283 are toward the third sensing element 5-310 while the S-pole of the magnetic domain 5-282 faces the third sensing element 5-310.

Since the third reference magnetic element 5-280 has more than one pair of magnetic poles, similar to the first sensing element 5-290, the third sensing element 5-310 may sense the density change of the magnetic lines of force and the direction change of the magnetic lines of force. When the movable frame 5-150 moves along the optical axis 5-O, the third reference magnetic element 5-280 disposed on the movable frame 5-150 also moves relative to the third sensing element 5-310 along the optical axis 5-O, so that the third sensing element 5-310 may sense the density change of the magnetic lines of force and/or the direction change of the magnetic lines of force. The movement of the movable frame 5-150 in the optical axis 5-O may be known accurately via the density change of the magnetic lines of force and/or the direction change of the magnetic lines of force sensed by the third sensing element 5-310. Due to the aforementioned features, the interference generated between the first sensing element 5-290, the second sensing element 5-300, and the third sensing element 5-310 may be improved, and the overall optical element driving mechanism 5-10 may be further miniaturized. Furthermore, the recesses 5-334 protect the first sensing element 5-290, the second sensing element 5-300, and the third sensing element 5-310, so that the recesses 5-334 prevent the first sensing element 5-290, the second sensing element 5-300, and the third sensing element 5-310 from getting damaged because of collision with other elements. Therefore, the overall stability and the reliability of the optical element driving mechanism 5-10 are enhanced.

As described above, the optical element driving mechanism 5-10 may be driven in at least three directions via the drive assembly 5-D, and the movement in the at least three directions may be sensed by the sensing assembly 5-S. Also, the drive signal may be corrected to achieve closed-loop feedback.

The elements of the optical element driving mechanism 5-10 are described above. Next, how the optical element driving mechanism 5-10 is assembled will be described in detail. The order of the operation is not limited.

The first coil 5-170 is wound and then mounted to the bottom surface of the immovable frame 5-120. The first drive magnetic element 5-290 and the second drive magnetic element 5-210 are mounted to the first recession 5-151 of the movable frame 5-150. The magnetically-permeable element 5-220 and the third drive magnetic element 5-230 are mounted to the third recession 5-153 of the movable frame 5-150. The first reference magnetic element 5-260 is mounted to the movable frame 5-150. The second coil 5-180 is wound and then mounted to the holder 5-160. The third coil 5-190 is wound and then the third coil 5-190, the first sensing element 5-290, the second sensing element 5-300, the third sensing element 5-310 are mounted to the circuit assembly 5-320. Then, the circuit assembly 5-320 is mounted to the bottom 5-330.

The movable frame 5-150 is connected to the holder 5-160 via the first elastic element 5-140 and the second elastic element 5-240. The movable frame 5-150 is connected to the circuit assembly 5-320 on the bottom 5-330 via the third elastic element 5-250. Finally, the case 5-110 and the immovable frame 5-120 are mounted to finish assembling the optical element driving mechanism 5-1.

Figure 74:
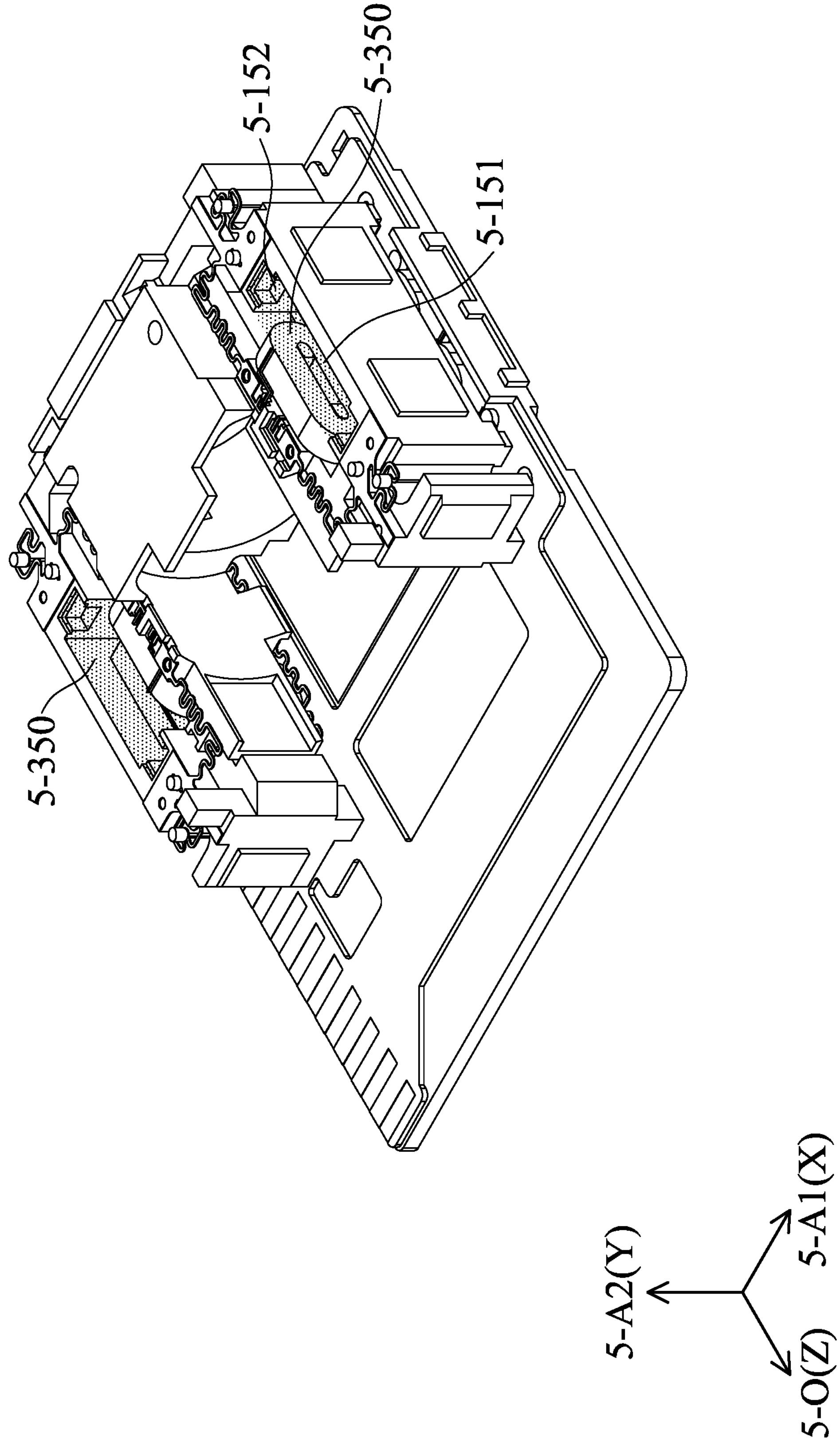
FIG. 74 is a perspective view of the optical element driving mechanism with some elements omitted.
Figure 75:
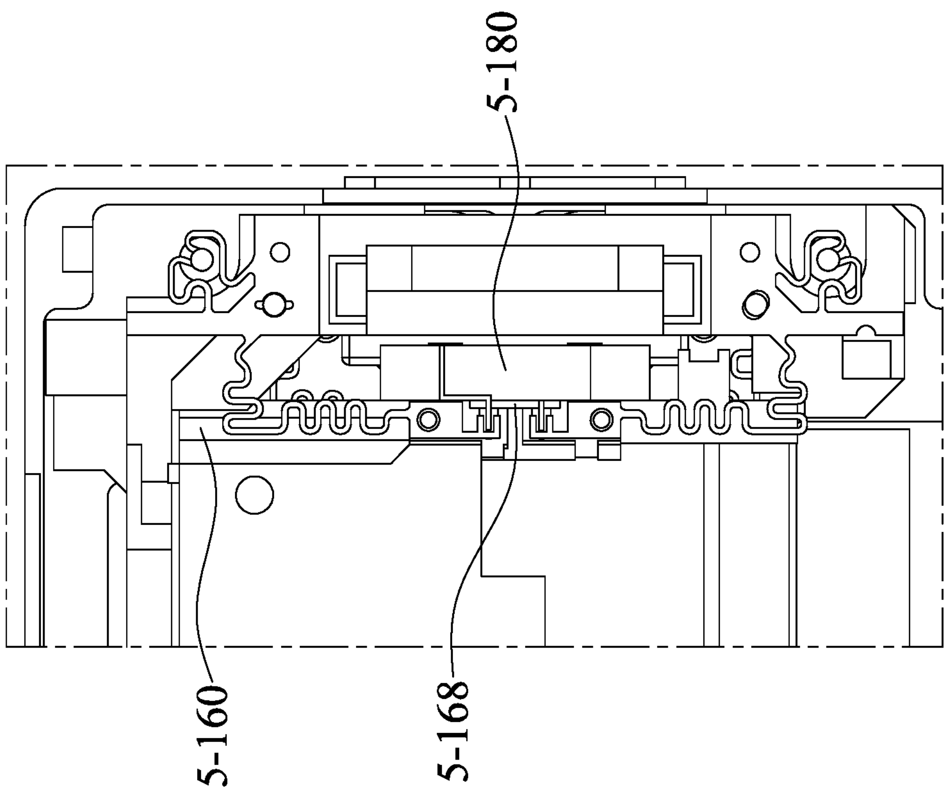
FIG. 75 is a top view of the optical element driving mechanism with some elements omitted.

In some embodiments, when assembling the optical element driving mechanism 5-10, an adhesion element 5-350 may be placed to strengthen the connection between the elements. Please refer to FIG. 74 and FIG. 75 to understand the adhesion element 5-350. 5-25 FIG. 74 is a perspective view of the optical element driving mechanism 5-10 with some elements omitted. FIG. 75 is a top view of the optical element driving mechanism 5-10 with some elements omitted.

Different elements may be adhered to each other by the adhesion element 5-350. The adhesion element 5-350 may be made of an adhesion material, a conductive material, or an insulation material, such as resin. The resin material may include UV curable resin and heat curable resin. The UV curable resin is cured by irradiation of ultraviolet (UV) light while the heat curable resin is cured by heating. Furthermore, the adhesion element 5-350 generally has good elasticity and good covering ability and thus the adhesion element 5-350 may protect the element(s). Additionally, the adhesion element 5-350 may reduce the probability of particles such as dust or mist entering the element(s). If the adhesion element 5-350 is made of an insulation material, insulation may be achieved. The steps for applying the adhesion element 5-350 is generally referred to as "glue dispensing", which may be conducted manually or mechanically.

For example, before mounting the first drive magnetic element 5-200 and the second drive magnetic element 5-210 to the first recession 5-151 of the movable frame 5-150, the adhesion element 5-350 may be applied to the first recession 5-151, so that at least part of the adhesion element 5-350 is received in the first recession 5-151. Then, the first drive magnetic element 5-200 and the second drive magnetic element 5-210 are mounted to the first recession 5-151, so that the adhesion element 5-350 is in direct contact with the movable frame 5-150, the first drive magnetic element 5-200, and the second drive magnetic element 5-210.

Also, the adhesion element 5-350 may be further applied to the second recession 5-152, so that at least part of the adhesion element 5-350 is received in the second recession 5-152. The adhesion element 5-350 in the second recession 5-152 is in direct contact with the movable frame 5-150 and the first drive magnetic element 5-200. Furthermore, the outflow-proof structure 5-1521 may prevent the adhesion element 5-350 from an outflow.

It should be noted that the adhesion element 5-350 applied to the first recession 5-151 and the adhesion element 5-350 applied to the second recession 5-152 may be different. For example, the adhesion element 5-350 in the first recession 5-151 may be heat curable resin while the adhesion element 5-350 in the second recession 5-152 may be UV curable resin. The adhesion element 5-350 may be chosen according to the actual needs.

Additionally, as shown in FIG. 75, a trench 5-168 is formed between the holder 5-160 and the second coil 5-180. The adhesion element 5-350 may also be disposed on the trench 5-168, so that the adhesion element 5-350 is in direct contact with the holder 5-160 and the second coil 5-180 to strengthen the connection between the holder 5-160 and the second coil 5-180.

Figure 76:
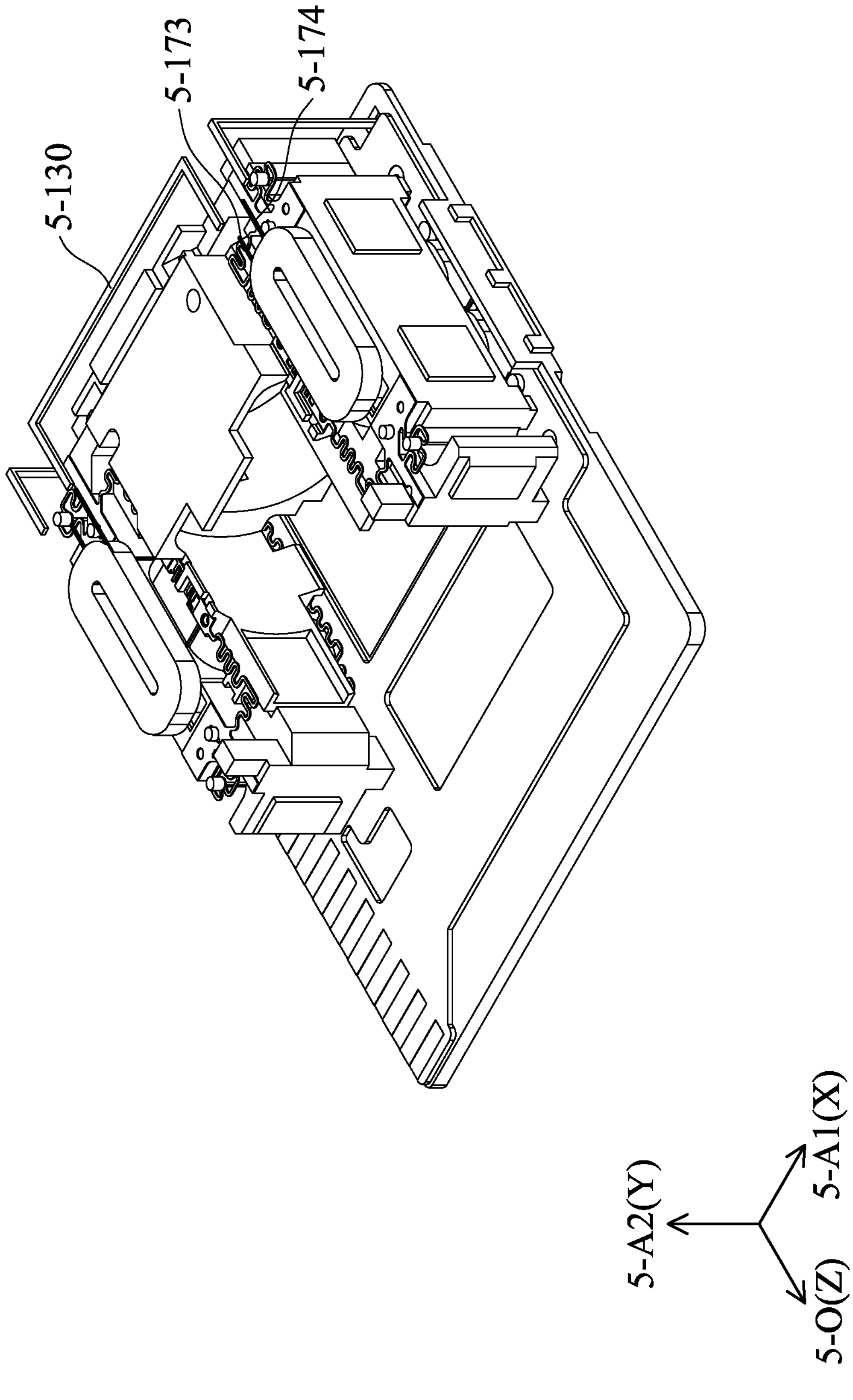
FIG. 76 is a perspective view of the optical element driving mechanism with some elements omitted.
Figure 77:
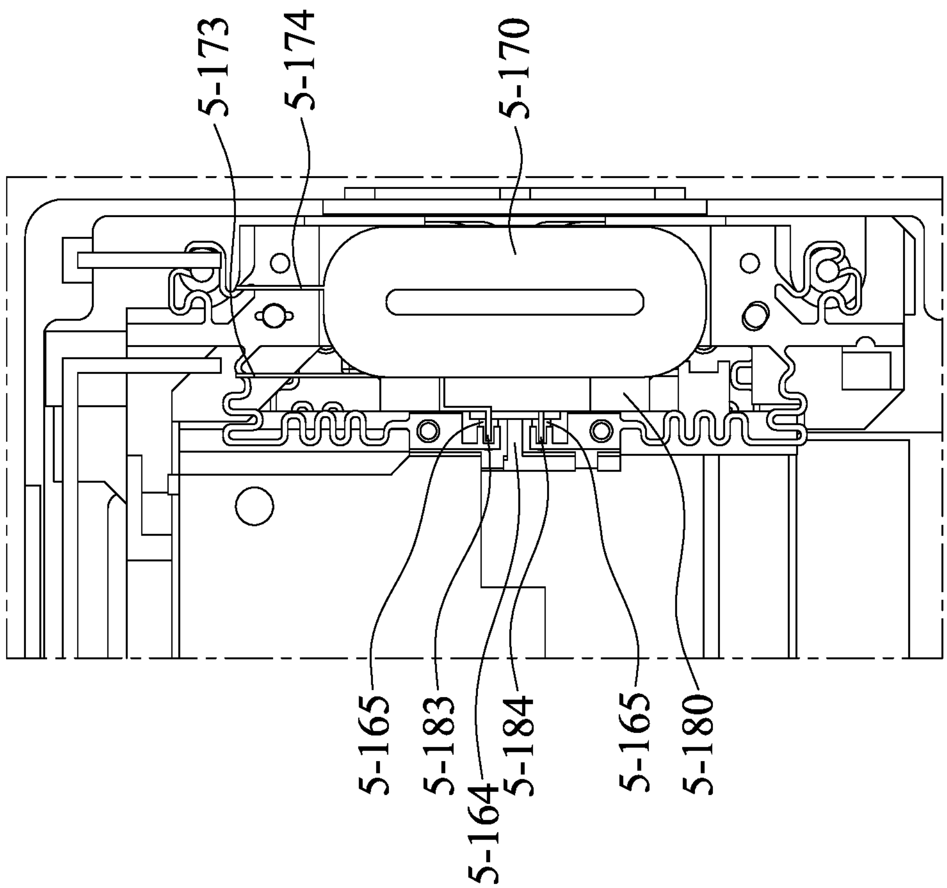
FIG. 77 is a top view of the optical element driving mechanism with some elements omitted.

Lastly, please refer to FIG. 76 and FIG. 77 to understand how the current flows into and flows out the optical element driving mechanism 5-10. FIG. 76 is a perspective view of the optical element driving mechanism 5-10 with some elements omitted. FIG. 77 is a top view of the optical element driving mechanism 5-10 with some elements omitted.

It should be understood that the immovable frame 5-120 is omitted in FIG. 76 and FIG. 77 to clearly illustrate the embedded circuit 5-130 embedded in the immovable frame 5-120. As shown in FIG. 76 and FIG. 77, the first coil first start lead 5-173 and the first coil second start lead 5-174 are electrically connected to the embedded circuit 5-130. The second coil first start lead 5-183 and the second coil second start lead 5-184 are disposed on the second coil start lead placement portion 5-165 of the holder 5-160. Also, the second coil first start lead 5-183 and the second coil second start lead 5-184 are electrically connected to two of the first elastic elements 5-140. It should be noted that the separation element 5-164 is disposed between the second coil first start lead 5-183 and the second coil second start lead 5-184 to avoid short circuit caused by the contact between the second coil first start lead 5-183 and the second coil second start lead 5-184.

Additionally, since the upper end 5-251 of the third elastic element 5-250 is connected to the first elastic element 5-140 and the lower end 5-252 is connected to the circuit assembly 5-320, so that the current input via the outside electrical connection portion 5-327 of the circuit assembly 5-320 may be transmitted to the first elastic element 5-140 via the third elastic element 5-250. In this embodiment, the current does not flow through the second elastic element 5-240, and the second elastic element 5-240 provides support effects.

As described above, the first coil 5-170 is electrically connected to the circuit assembly 5-320 via the embedded circuit 5-130 embedded in the immovable frame 5-120. The second coil 5-180 is electrically connected to the circuit assembly 5-320 via the first elastic element 5-240 and the third elastic element 5-250. In other words, the two second coils 5-180 are electrically connected to each other via the first elastic element 5-140, the third elastic element 5-250, and the circuit assembly 5-320. The circuit assembly 5-320 may integrate the conduction wires.

Based on the present disclosure, an optical element driving mechanism is provided. The optical element driving mechanism may be driven in at least three directions by the drive assembly. The drive assembly and the position sensing assembly are designed to achieve displacement correction and displacement compensation. The circuit assembly may integrate the conduction wires. Furthermore, the optical element driving mechanism is easy to be assembled and has great mechanical strength.

Figure 78:
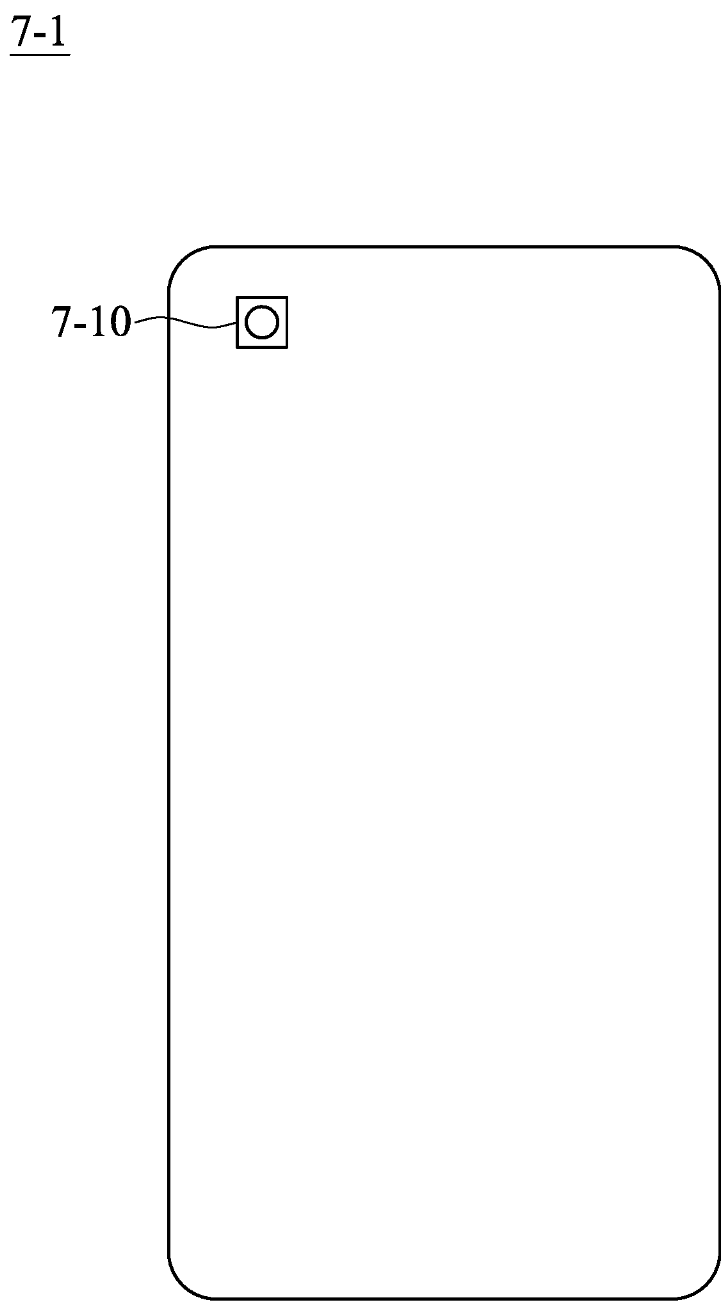
FIG. 78 shows a schematic view of an electrical device with an optical element driving mechanism according to an embodiment of the present disclosure.

Please refer to FIG. 78, an optical element driving mechanism 7-10 of an embodiment of the present disclosure may be mounted in an electrical device 7-1 for taking photos or videos, wherein the aforementioned electrical device 7-1 may, for example, be a smartphone or a digital camera, but the present disclosure is not limited to these. It should be noted that the position and the size between the optical element driving mechanism 7-10 and the electrical device 7-1 shown in FIG. 78 are only an example, which is not for limiting the position and the size between the optical element driving mechanism 7-10 and the electrical device 7-1. In fact, according to different needs, the optical element driving mechanism 7-10 may be mounted at different positions in the electrical device 7-1.

Figure 79:
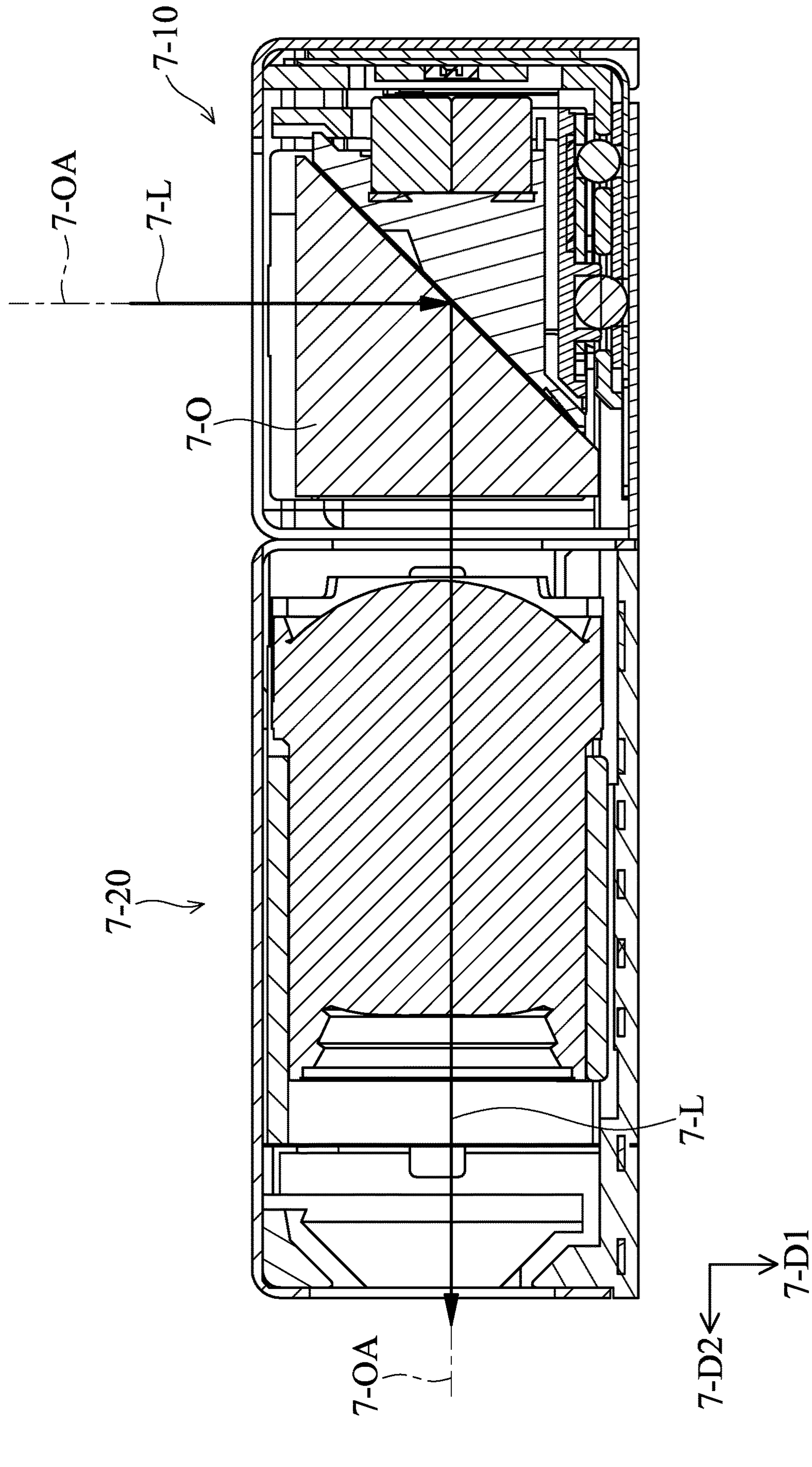
FIG. 79 shows a schematic view of the optical element driving mechanism and a lens module according to an embodiment of the present disclosure.

Please refer to FIG. 79, the optical element driving mechanism 7-10 carries an optical element 7-O. A lens module 7-20 may be disposed outside of the optical element driving mechanism 7-10. The lens module 7-20 is located at the downstream of the light entry of the optical element driving mechanism 7-10. An optical axis 7-OA of a light 7-L incident to the optical element 7-O of the optical element driving mechanism 7-10 along a first direction 7-D1, and then reflected by the optical element 7-O to pass through the lens module 7-20 along a second direction 7-D2 that is not parallel to (or perpendicular to) the first direction 7-D1 for imaging.

Figure 80:
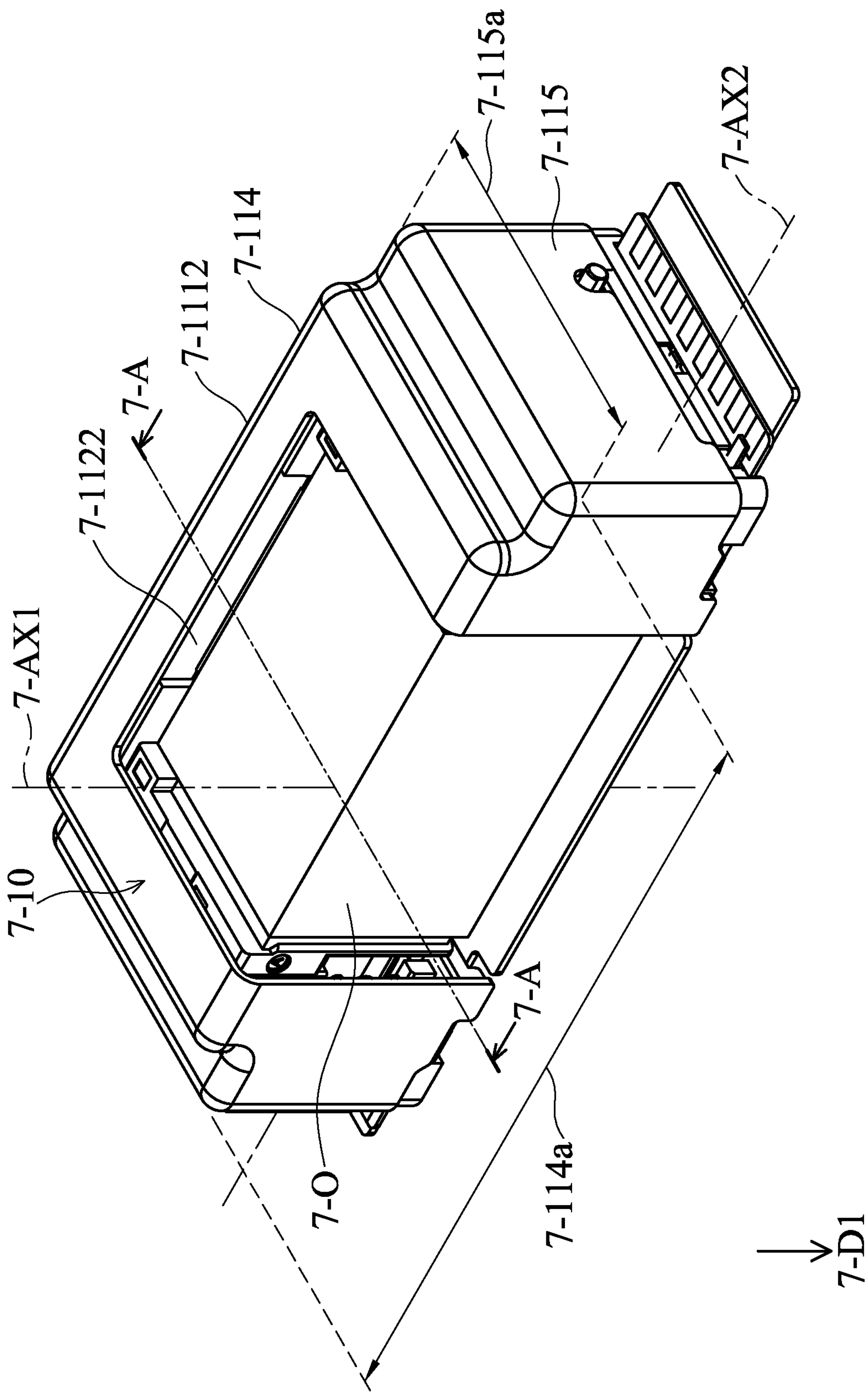
FIG. 80 shows a perspective view of the optical element driving mechanism and an optical element according to an embodiment of the present disclosure.
Figure 81:
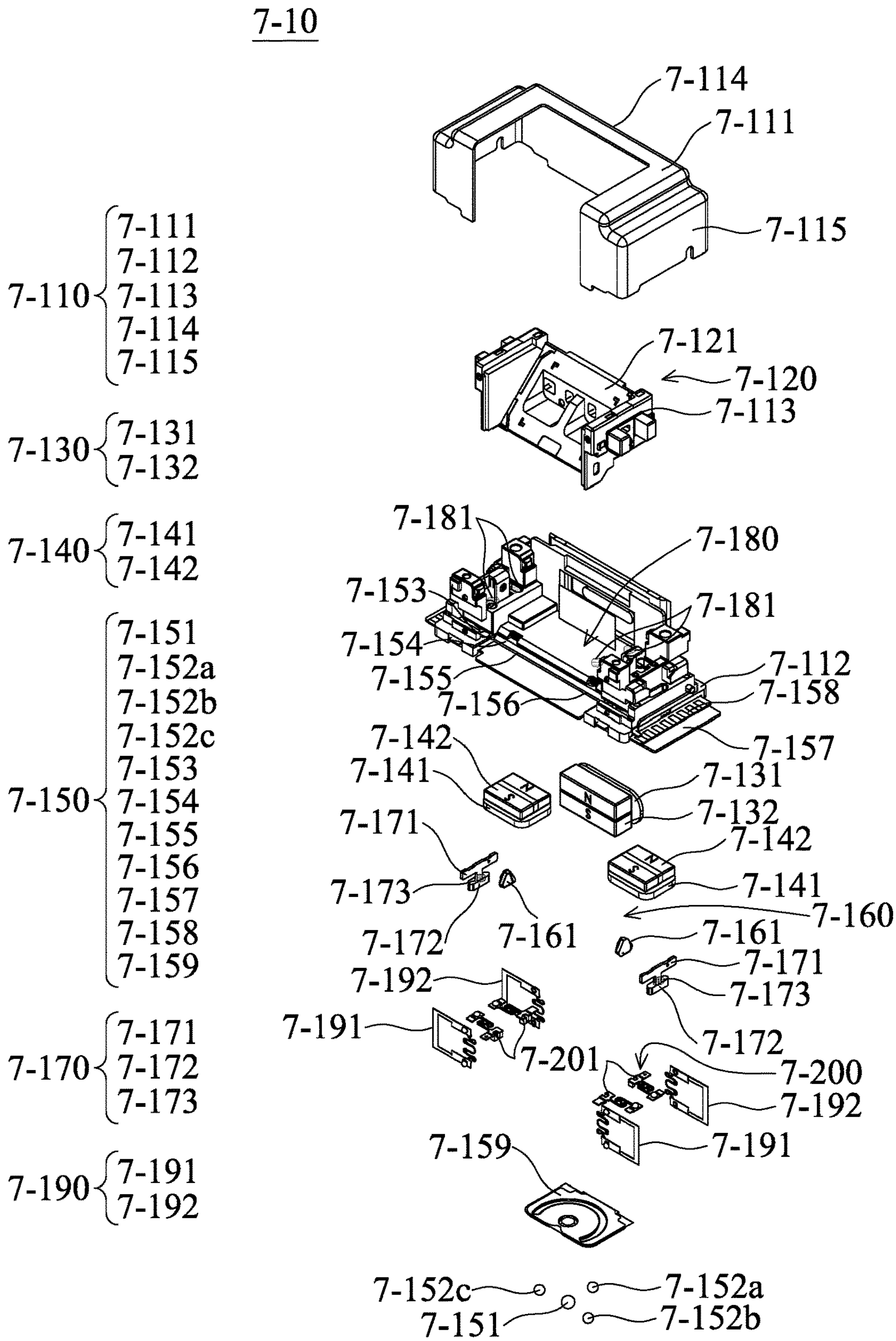
FIG. 81 shows an exploded view of the optical element driving mechanism according to an embodiment of the present disclosure.

Please refer to FIG. 80 and FIG. 81, the optical element driving mechanism 7-10 includes a fixed part 7-110, a movable part 7-120, a first driving assembly 7-130, a second driving assembly 7-140, a first supporting assembly 7-150, a second supporting assembly 7-160, a first suppression assembly 7-170, a second suppression assembly 7-180, a first connecting assembly 7-190 and a second connecting assembly 7-200.

The movable part 7-120 is movable relative to the fixed part 7-110 within a first limit range in a first dimension via the first supporting assembly 7-150. In which, the first dimension is a rotation about a first rotary axis 7-AX1. The movable part 7-120 is movable relative to the fixed part 7-110 within a second limit range in a second dimension via the second supporting assembly 7-160. In which, the second dimension is a rotation about a second rotary axis 7-AX2. The first rotary axis 7-AX1 are not parallel to the second rotary axis 7-AX2. Thus, the first dimension is different from the second dimension.

Please continue to refer to FIG. 80 and FIG. 81, the fixed part 7-110 includes an outer frame 7-111, a base 7-112, a frame 7-113, a first side 7-114 and a second side 7-115. The movable part 7-120 includes a holder 7-121. The first driving assembly 7-130 includes a first coil 7-131 and a first magnetic element 7-132. The second driving assembly 7-140 includes a second coil 7-141 and a second magnetic element 7-142. The first supporting assembly 7-150 includes a first intermediate element 7-151, a second intermediate element 7-152*a*, a third intermediate element 7-152*b*, a fourth intermediate element 7-152*c*, a first supporting element 7-153, a first bearing unit 7-154, a first strengthening unit 7-155, a first accommodating unit 7-156, a second supporting element 7-157, a second strengthening unit 7-158, and a second accommodating unit 7-159. The second supporting assembly 7-160 includes a plurality of second supporting units 7-161. The first suppression assembly 7-170 includes a first suppression element 7-171, a second suppression element 7-172, and a first damping element 7-173. The second suppression assembly 7-180 includes a plurality of second damping elements 7-181. The first connecting assembly 7-190 includes a first elastic element 7-191 and a second elastic element 7-192. The second connecting assembly 7-200 includes a third elastic element 7-201.

Figure 82:
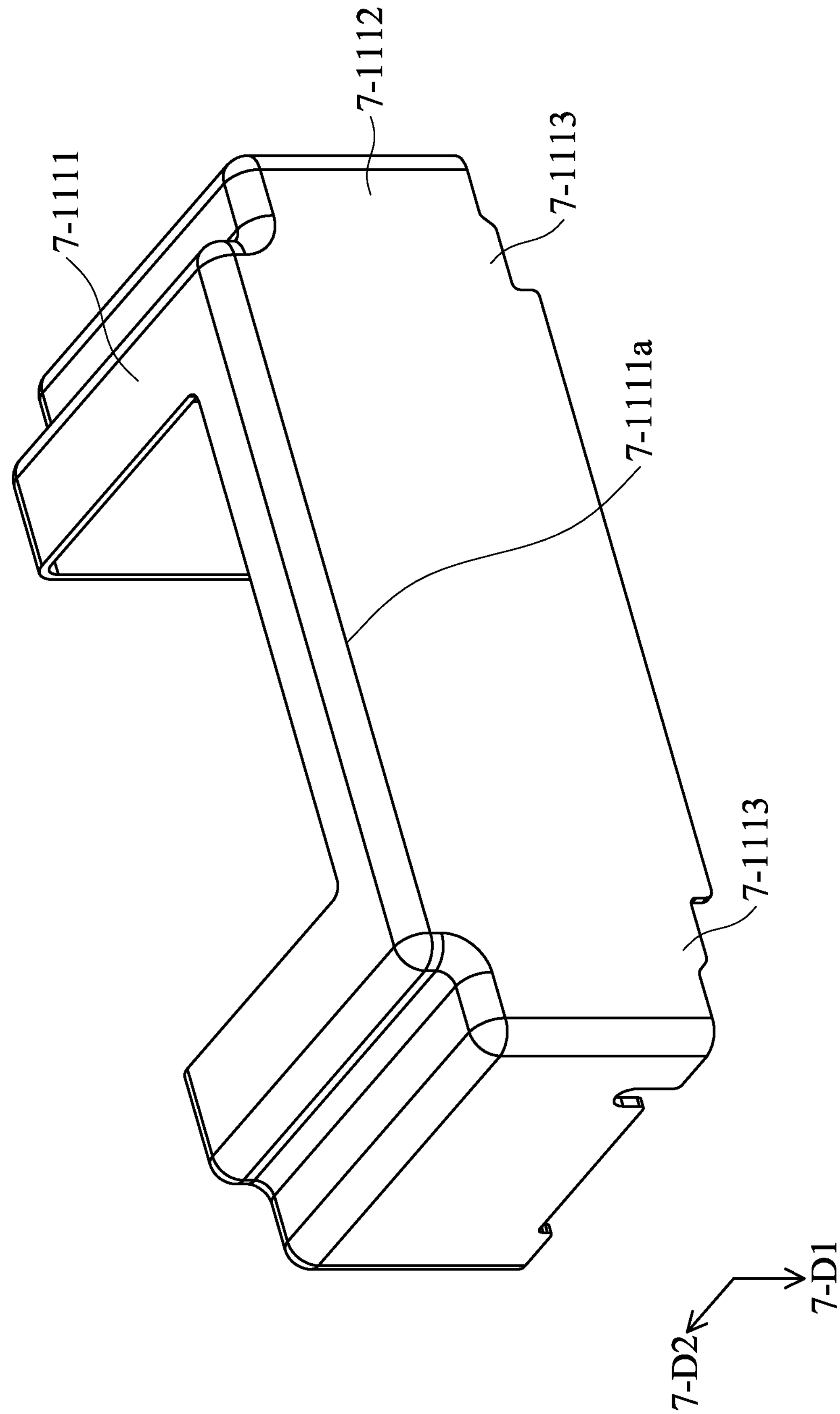
FIG. 82 shows a perspective view of an outer frame of the optical element driving mechanism according to an embodiment of the present disclosure.

Please refer to FIG. 82, the outer frame 7-111 of the fixed part 7-110 includes a top surface 7-1111, an outer frame sidewall 7-1112 and two outer frame connecting portions 7-1113. The top surface 7-1111 is not parallel to the first direction 7-D1. The outer frame sidewall 7-1112 is parallel to the first direction 7-D1, and the outer frame sidewall 7-1112 extends from an edge 7-1111*a* of the top surface 7-1111. The outer frame sidewall 7-1112 is located at the first side 7-114 of the fixed part 7-110 (FIG. 80). The outer frame connecting portions 7-1113 has a plate-like structure, and the outer frame connecting portions 7-1113 is located at outside the outer frame sidewall 7-1112.

Figure 83:
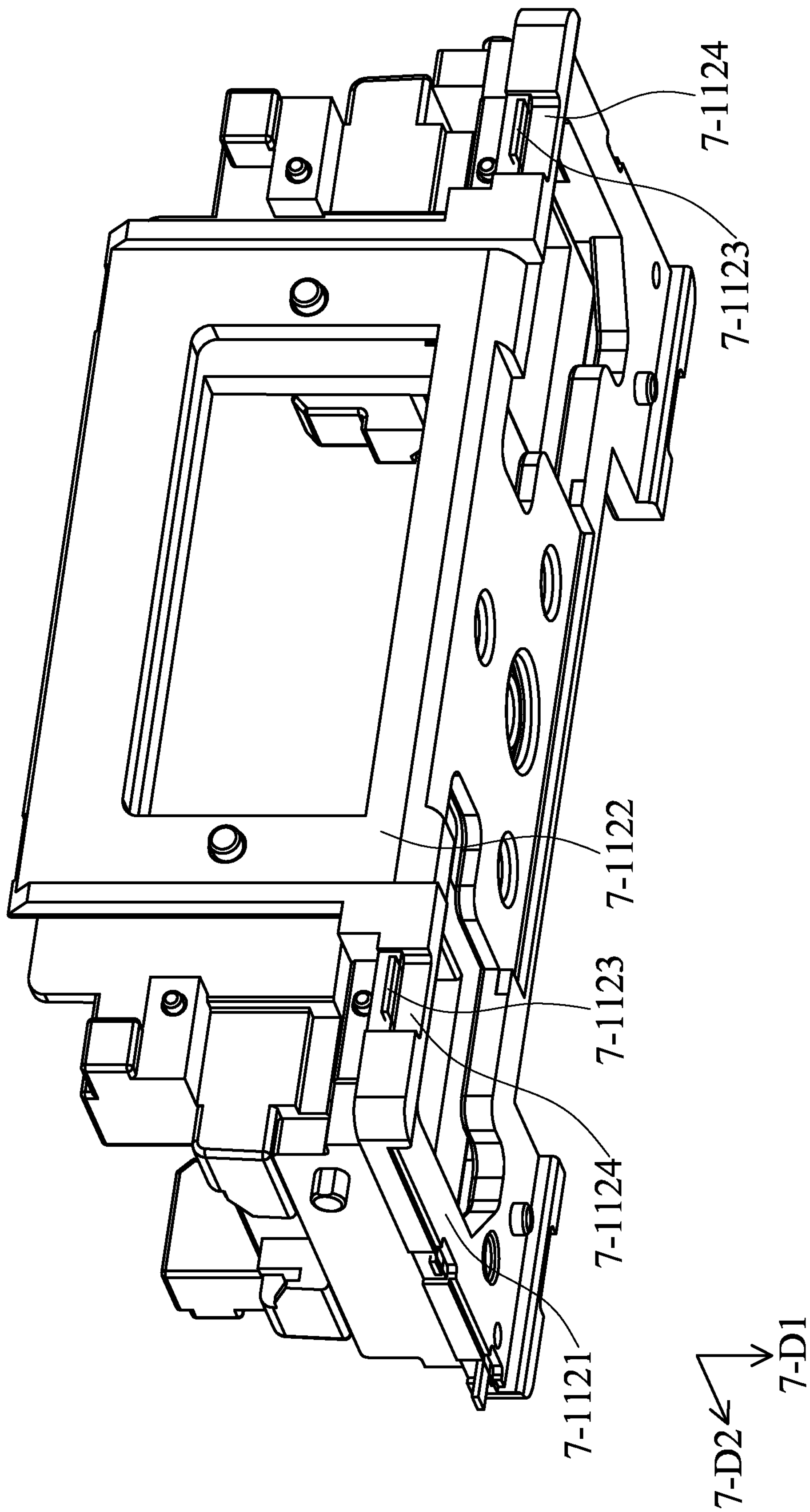
FIG. 83 shows a perspective view of a base of the optical element driving mechanism according to an embodiment of the present disclosure.
Figure 84:
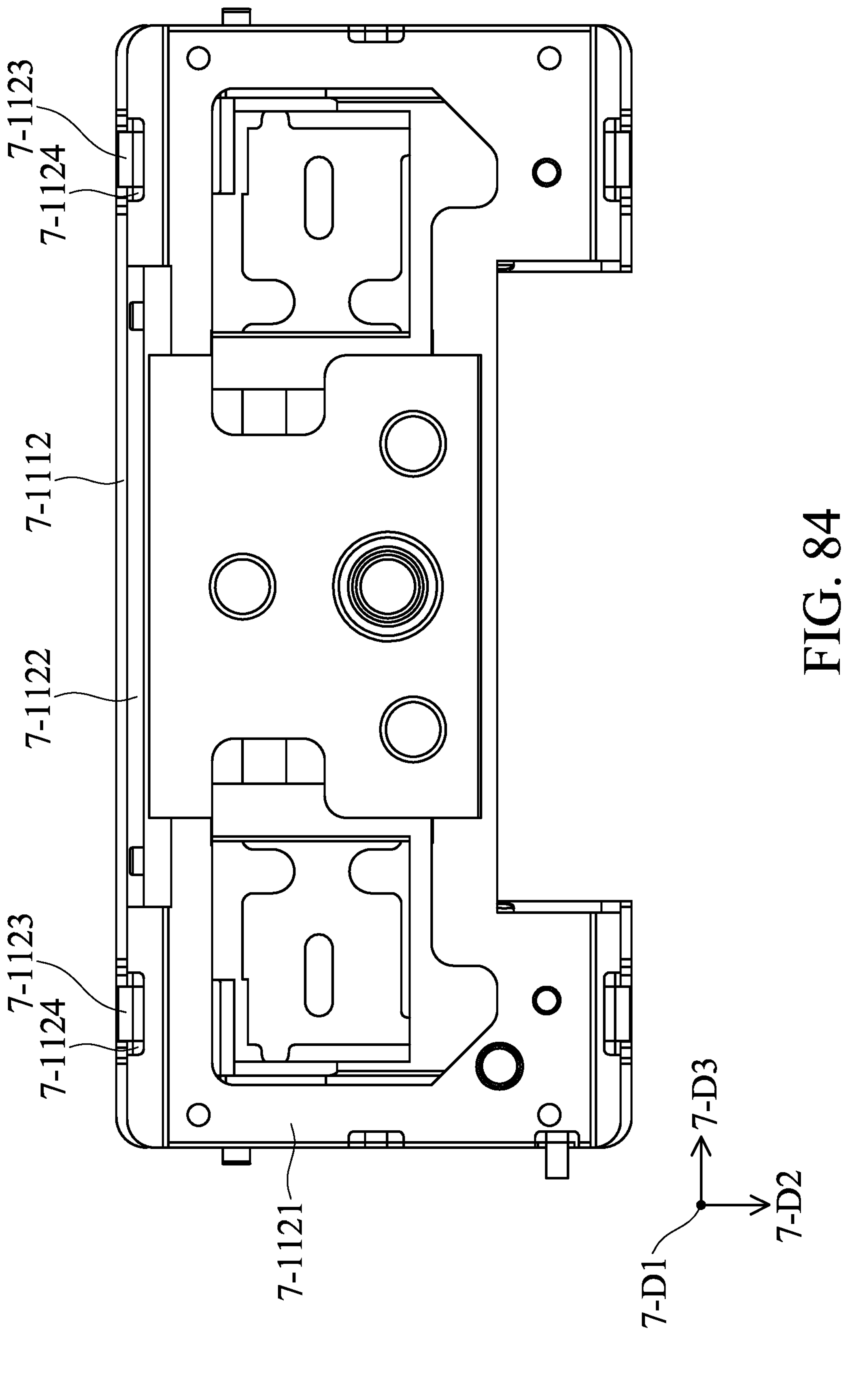
FIG. 84 shows a bottom view of the outer frame and the base of the optical element driving mechanism according to an embodiment of the present disclosure.

Please refer to FIG. 83 and FIG. 84, the base 7-112 of the fixed part 7-110 includes a bottom plate 7-1121, a first base sidewall 7-1122, two base connecting portions 7-1123, and two base connecting portion recesses 7-1124. The bottom plate 7-1121 of the fixed part 7-110 is not parallel to the first direction 7-D1, and the bottom plate 7-1121 has a plastic material. The first base sidewall 7-1122 is parallel to the first direction 7-D1 and extends from the bottom plate 7-1121. The first base sidewall 7-1122 is located on the first side 7-114 of the fixed part 7-110 (FIG. 80). Since the outer frame sidewall 7-1112 is also parallel to the first direction 7-D1, therefore, the first base sidewall 7-1122 is parallel to the outer frame sidewall 7-1112. The first base sidewall 7-1122 is closer to the movable part 7-120 (not shown in FIG. 83 and FIG. 84) than the outer frame sidewall 7-1112 when viewed along the first direction 7-D1.

Figure 85:
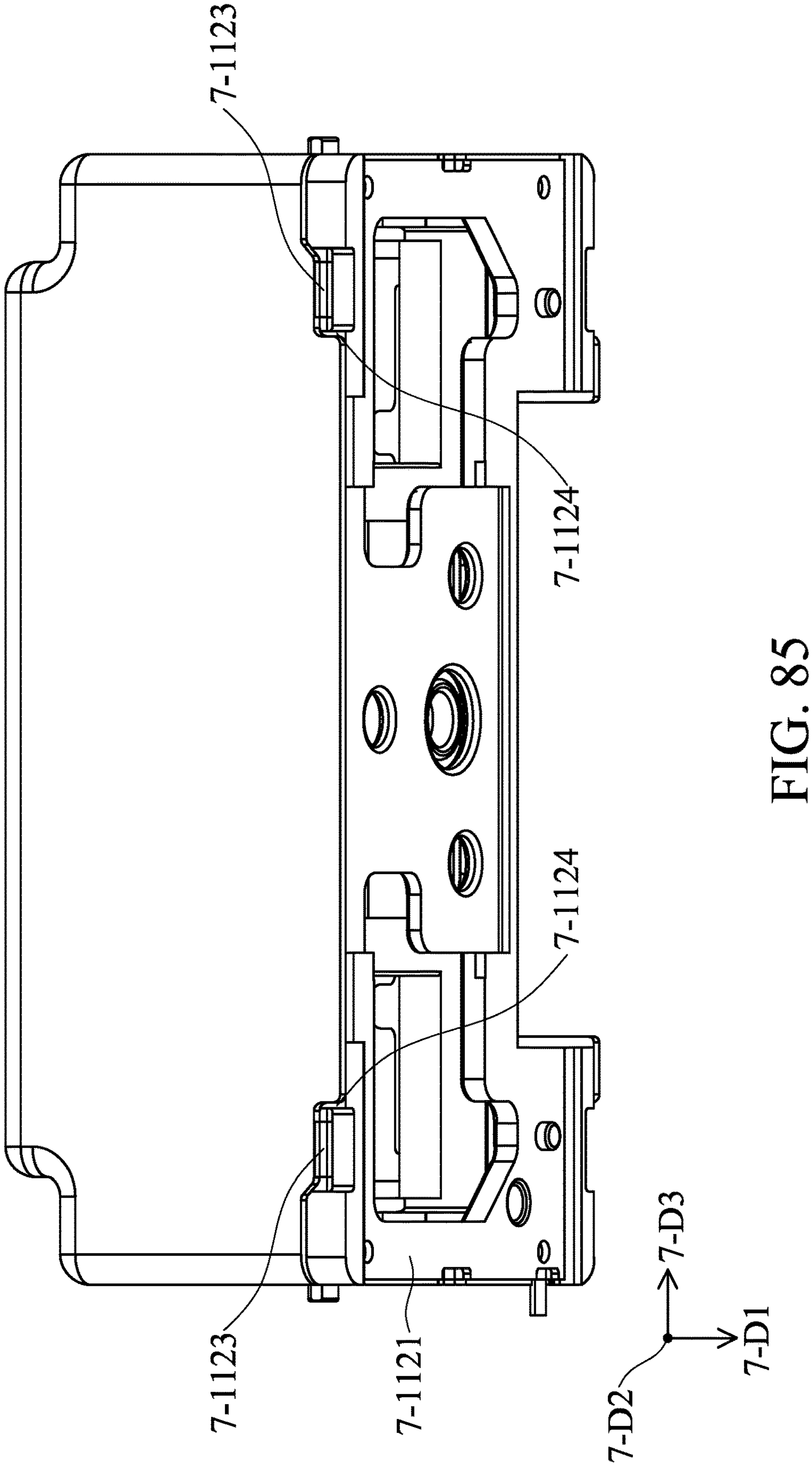
FIG. 85 shows a perspective view of the outer frame and the base of the optical element driving mechanism according to an embodiment of the present disclosure.

Please refer to FIG. 84 and FIG. 85, the base connecting portion 7-1123 has a plate-like structure. The base connecting portion 7-1123 is located on the bottom plate 7-1121, and the base connecting portion 7-1123 is at least partially embedded in the bottom plate 7-1121. The base connecting portion 7-1123 is disposed in the base connecting portion recess 7-1124. The base connecting portion 7-1123 is revealed to the base connecting portion recess 7-1124 when viewed along a third direction 7-D3 that is perpendicular to the first direction 7-D1 and the second direction 7-D2. The outer frame connecting portion 7-1113 covers the base connecting portion 7-1123 when viewed along the first direction 7-D1. In one embodiment, the outer frame connecting portion 7-1113 is fixedly connected to the base connecting portion 7-1123, and the outer frame connecting portion 7-1113 is not parallel to the base connecting portion 7-1123. In one embodiment, the outer frame connecting portion 7-1113 is perpendicular to the base connecting portion 7-1123, and the outer frame connecting portion 7-1113 is fixedly connected to the s base connecting portion 7-1123 by welding. Thus, the structure of the optical element driving mechanism 7-10 may be strengthened.

Figure 86:
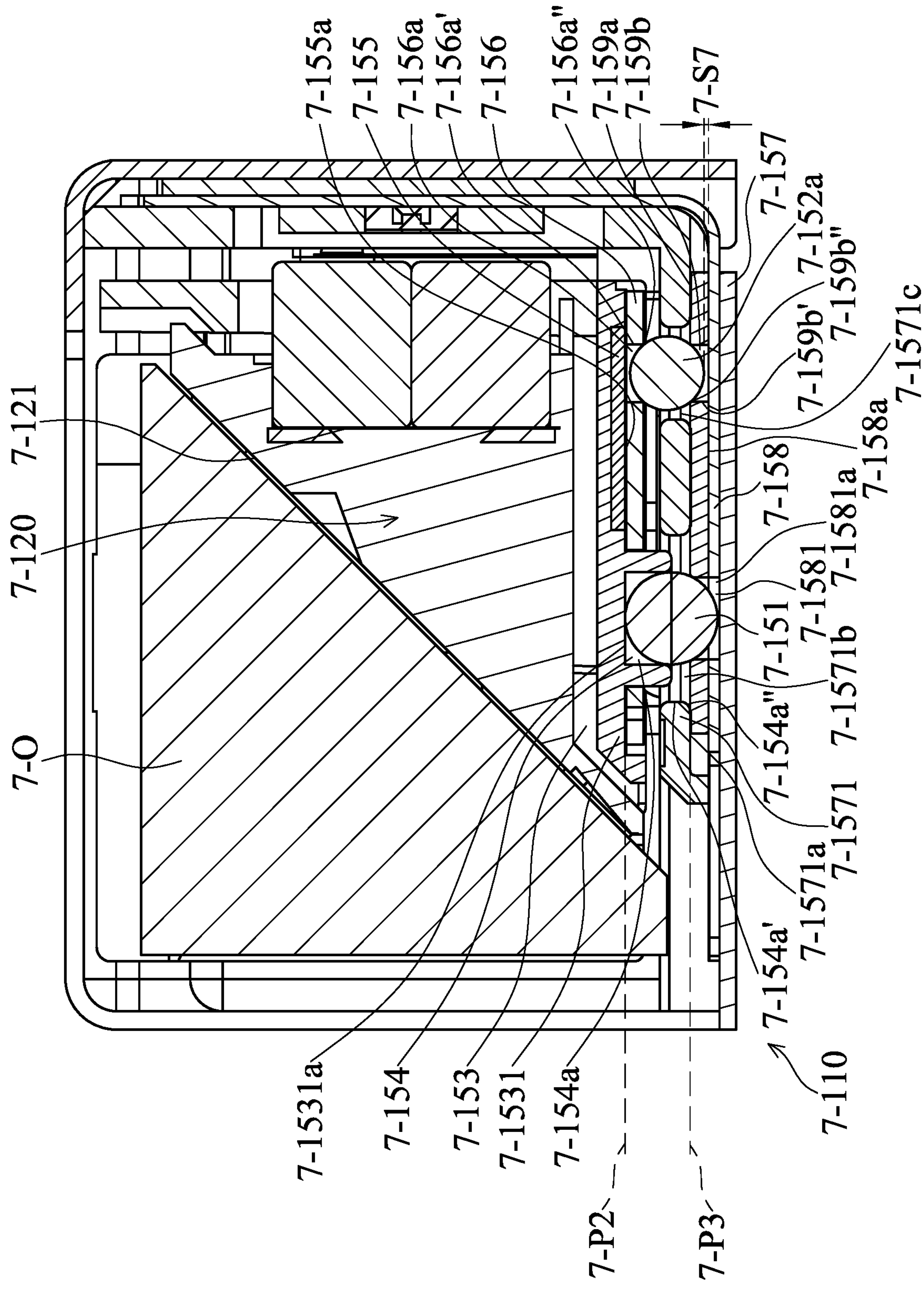
FIG. 86 shows a cross-sectional view of the optical element driving mechanism and the optical element along line 7-A-7-A of FIG. 80, according to an embodiment of the present disclosure.

Please refer to FIG. 86, the movable part 7-120 is in contact with and is connected to the optical element 7-O, and the movable part 7-120 is movable relative to the fixed part 7-110. Specifically, the holder 7-121 of the movable part 7-120 carries and is connected to the optical element 7-O. The holder 7-121 may have any shape that is suitable for carry and be connected to the optical element 7-O. For example, the holder 7-121 may have at least one recess (may refer to FIG. 81).

Figure 87:
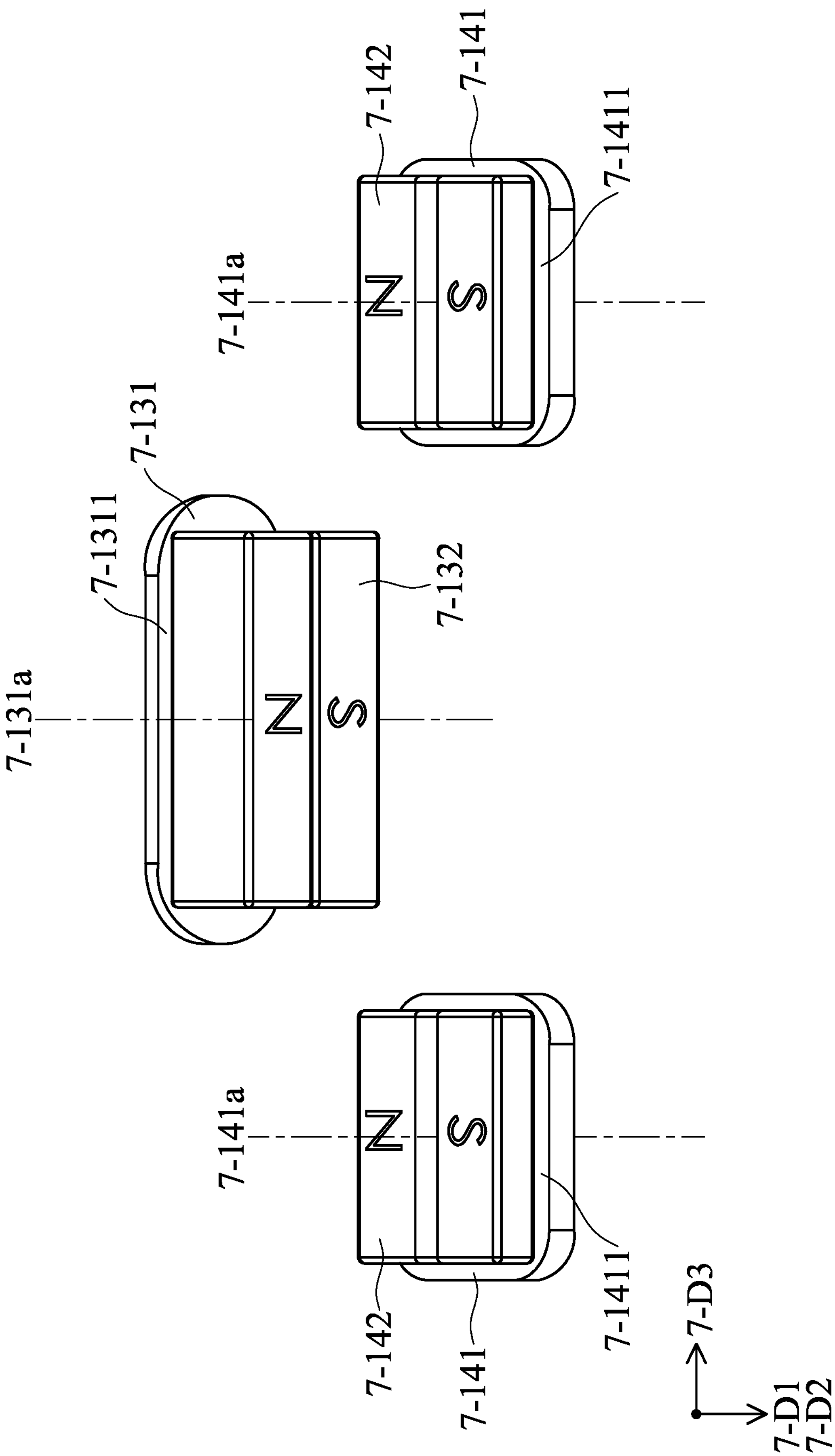
FIG. 87 shows a perspective view of a first driving assembly and a second driving assembly of the optical element driving mechanism according to an embodiment of the present disclosure.

Please refer to FIG. 87, the first driving assembly 7-130 drives the movable part 7-120 to move relative to the fixed part 7-110. The first driving assembly 7-130 is located at the first side 7-114 (not shown in FIG. 87) when viewed along the first direction 7-D1. The first coil 7-131 of the first driving assembly 7-130 has a first segment 7-1311. The first segment 7-1311 extends along the third direction 7-D3. A winding axis 7-131*a* of the first coil 7-131 is parallel to the second direction 7-D2. The first coil 7-131 and the first magnetic element 7-132 are arranged along the first direction 7-D1. The first magnetic element 7-132 of the first driving assembly 7-130 corresponds to the first segment 7-1311 to generate a first driving force. The direction of the first driving force is parallel to the first direction 7-D1.

The second driving assembly 7-140 drives the holder 7-121 to move relative to the frame 7-113. The second driving assembly 7-140 is located on the second side 7-115 (not shown in FIG. 87) when viewed along the first direction 7-D1. The second coil 7-141 of the second driving assembly 7-140 has a second section 7-1411. The second section 7-1411 also extends along the third direction 7-D3. Therefore, the extending directions of the first segment 7-1311 and the second segment 7-1411 are parallel to each other. A winding axis 7-141*a* of the second coil 7-141 is parallel to the first direction 7-D1. Thus, the winding axis 7-131*a* of the first coil 7-131 is not parallel to the winding axis 7-141*a* of the second coil 7-141. The second coil 7-141 and the second magnetic element 7-142 are arranged along the second direction 7-D2. Thus, the arranging direction of the first coil 7-131 and the first magnetic element 7-132 is different from the arranging direction of the second coil 7-141 and the second magnetic element 7-142. The second magnetic element 7-142 of the second driving assembly 7-140 corresponds to the second segment 7-1411 to generate a second driving force.

It should be noted that the directions of the aforementioned first driving force and the second driving force are different. The first driving force may drive the movable part 7-120 to move relative to the fixed part 7-110 within the first limit range in the first dimension. Moreover, the second driving force may drive the movable part 7-120 to move relative to the fixed part 7-110 within the second limit range in the second dimension.

Figure 88:
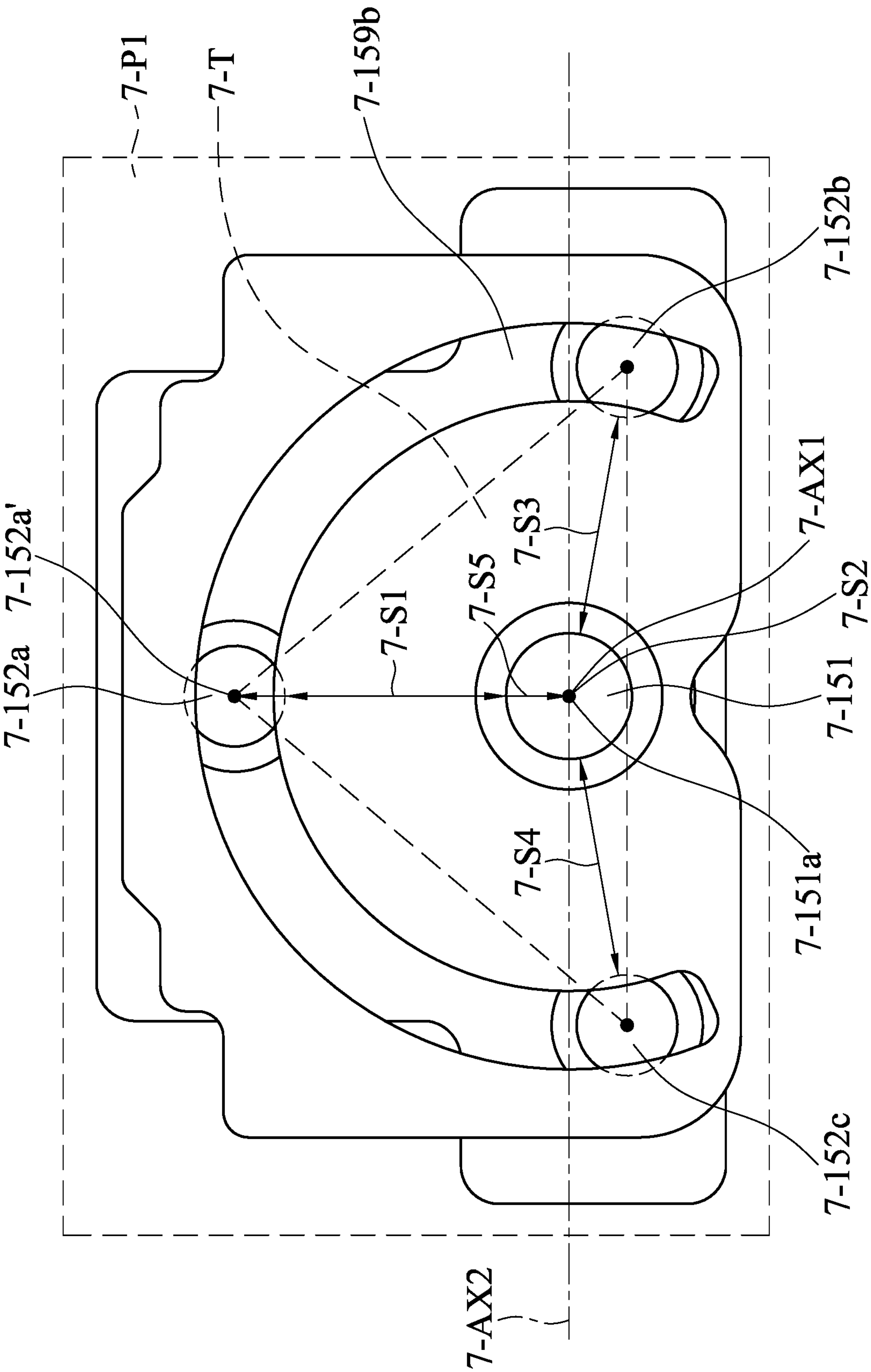
FIG. 88 shows a schematic view of first intermediate element, a second intermediate element, a third intermediate element and a fourth intermediate element of the optical element driving mechanism according to an embodiment of the present disclosure.

Please refer to FIG. 86 and FIG. 88, the first supporting assembly 7-150 of the first intermediate element 7-151, the second intermediate element 7-152*a*, the third intermediate element 7-152*b* and the fourth intermediate element 7-152*c* are located between the fixed part 7-110 and the movable part 7-120.

The first intermediate element 7-151 has a metal material, and the first intermediate element 7-151 has a spherical structure. Therefore, the fixed part 7-110 or the movable part 7-120 is movable relative to the first intermediate element 7-151. The first rotary axis 7-AX1 passes through the first intermediate element 7-151.

The second intermediate element 7-152*a* has a metal material, and the second intermediate element 7-152*a* has a spherical structure. The fixed part 7-110 or the movable part 7-120 is movable relative to the second intermediate element 7-152*a*. The second intermediate element 7-152*a* is movable relative to the first intermediate element 7-151. The second intermediate element 7-152*a* is movable relative to the fixed part 7-110, and the second intermediate element 7-152*a* is movable relative to the movable part 7-120. A shortest distance 7-S1 between the second intermediate element 7-152*a* and the first rotary axis 7-AX1 is different from a shortest distance 7-S2 between the first intermediate element 7-151 and the first rotary axis 7-AX1. The shortest distance 7-S1 between the second intermediate element 7-152*a* and the first rotary axis 7-AX1 is greater than the shortest distance 7-S2 between the first intermediate element 7-151 and the first rotary axis 7-AX1.

The third intermediate element 7-152*b* has a metal material, and the third intermediate element 7-152*b* has a spherical structure. The fixed part 7-110 or the movable part 7-120 is movable relative to the third intermediate element 7-152*b*. The third intermediate element 7-152*b* is movable relative to the first intermediate element 7-151. A shortest distance 7-S3 between the third intermediate element 7-152*b* and the first rotary axis 7-AX1 is different from the shortest distance 7-S2 between the first intermediate element 7-151 and the first rotary axis 7-AX1. The shortest distance 7-S3 between the third intermediate element 7-152*b* and the first rotary axis 7-AX1 is greater than the shortest distance 7-S2 between the first intermediate element 7-151 and the first rotary axis 7-AX1. The shortest distance 7-S3 between the third intermediate element 7-152*b* and the first rotary axis 7-AX1 is substantially equal to the shortest distance 7-S1 between the second intermediate element 7-152*a* and the first rotary axis 7-AX1.

The fourth intermediate element 7-152*c* has a metal material, and the fourth intermediate element 7-152*c* has a spherical structure. The fixed part 7-110 or the movable part 7-120 is movable relative to the fourth intermediate element 7-152*c*. The fourth intermediate element 7-152*c* is movable relative to the first intermediate element 7-151. A shortest distance 7-S4 between the fourth intermediate element 7-152*c* and the first rotary axis 7-AX1 is different from the shortest distance 7-S2 between the first intermediate element 7-151 and the first rotary axis 7-AX1. The shortest distance 7-S4 between the fourth intermediate element 7-152*c* and the first rotary axis 7-AX1 is greater than the shortest distance 7-S2 between the first intermediate element 7-151 and the first rotary axis 7-AX1. The shortest distance 7-S4 between the fourth intermediate element 7-152*c* and the first rotary axis 7-AX1 is substantially equal to the shortest distance 7-S1 between the second intermediate element 7-152*a* and the first rotary axis 7-AX1.

The first rotary axis 7-AX1 passes through a triangle 7-T (shown as a dashed-line) formed by the second intermediate element 7-152*a*, the third intermediate element 7-152*b* and the fourth intermediate element 7-152*c* when viewed along the first rotary axis 7-AX1. In the direction that is parallel to the first rotary axis 7-AX1, a non-zero gap 7-S5 is provided between a center 7-151*a* of the first intermediate element 7-151 and a center 7-152*a*' of the second intermediate element 7-152*a*. In the direction that is parallel to the second rotary axis 7-AX2, a distance between a center 7-152*c*' of the fourth intermediate element 7-152*c* and a central 7-152*b*' of the third intermediate element 7-152*b* is about zero. A first imaginary plane 7-P1 passes through the first intermediate element 7-151, the second intermediate element 7-152*a*, the third intermediate element 7-152*b*, and the fourth intermediate element 7-152*c*.

Please return to FIG. 86, the first supporting element 7-153 of the first supporting assembly 7-150 is in direct contact with the first intermediate element 7-151, and the first supporting element 7-153 includes a first base bottom 7-1531. The first base bottom 7-1531 has a first surface 7-1531*a*. The first bearing unit 7-154 corresponds to the first intermediate element 7-151, and the first bearing unit 7-154 includes a first opening 7-154*a*. The first strengthening unit 7-155 is disposed on the first base bottom 7-1531, and the first strengthening unit 7-155 includes a second surface 7-155*a*. The first accommodating unit 7-156 is disposed on the first base bottom 7-1531, and the first accommodating unit 7-156 includes a third surface 7-156*a*. The second supporting element 7-157 is in direct contact with the first intermediate element 7-151, and the second supporting element 7-157 includes a second base bottom 7-1571. The second base bottom 7-1571 has a fourth surface 7-1571*a*, a first accommodating portion 7-1571*b* and a second accommodating portion 7-1571*c*. The second strengthening unit 7-158 is disposed on the first base bottom 7-1531, and the second strengthening unit 7-158 includes a second bearing unit 7-1581 and a fifth surface 7-158*a* The second accommodating unit 7-159 is disposed on the first base bottom 7-1531, and the second accommodating unit 7-159 includes a sixth surface 7-159*a* and a third opening 7-159*b*.

The first supporting element 7-153 is in direct contact with the second intermediate element 7-152*a*. The first surface 7-1531*a* overlaps and is parallel to a second imaginary plane 7-P2. The first surface 7-1531*a* faces the first intermediate element 7-151. The first base bottom 7-1531 has a plastic material. The first opening 7-154*a* accommodates at least part of the first intermediate element 7-151. An edge 7-154*a*' of the first opening 7-154*a* has a first reinforcing structure 7-154*a*". The first reinforcing structure 7-154*a*" is in direct contact with the first intermediate element 7-151. The first reinforcing structure 7-154*a*" may have an arc structure or an inclined structure that is not parallel and not perpendicular to the first surface 7-1531*a*, so as to avoid damaging the first intermediate element 7-151.

The first bearing unit 7-154 protrudes from the first surface 7-1531*a* The first intermediate element 7-151 is fixedly connected to the first bearing unit 7-154. The second surface 7-155*a* faces the second intermediate element 7-152*a*. The Young's modulus of the first strengthening unit 7-155 is different from the Young's modulus of the first base bottom 7-1531. The first strengthening unit 7-155 has a metal material. The second surface 7-155*a* is parallel to the second imaginary plane 7-P2. The second surface 7-155*a* overlaps the second imaginary plane 7-P2. The second intermediate element 7-152*a* does not overlap the second surface 7-155*a* when viewed along the direction that is perpendicular to the first rotary axis 7-AX1. The second intermediate element 7-152*a* at least partially overlaps the second surface 7-155*a* when viewed along the direction that is parallel to the first rotary axis 7-AX1. A non-zero distance 7-S6 is provided between the second intermediate element 7-152*a* and the second surface 7-155*a*.

The third surface 7-156*a* faces the second intermediate element 7-152*a*. The Young's modulus of the first accommodating unit 7-156 is different from the Young's modulus of the first base bottom 7-1531. The first accommodating unit 7-156 has a metal material. The first accommodating unit 7-156 has a second opening 7-156*a* to accommodate at least part of the second intermediate element 7-152*a*. The second opening 7-156*a* does not accommodate the third intermediate element 7-152*b* and the fourth intermediate element 7-152*c*. The second opening 7-156*a* is located on the third surface 7-156*a*. An edge 7-156*a*' of the second opening 7-156*a* has a second reinforcing structure 7-156*a*". The second reinforcing structure 7-156*a*" is in direct contact with the second intermediate element 7-152*a*. The second reinforcing structure 7-156*a*" has an arc structure or an inclined structure that is not parallel and not perpendicular to the third surface 7-156*a*, so as to avoid damaging the second intermediate element 7-152*a*.

The second intermediate element 7-152*a* at least partially overlaps the third surface 7-156*a* when viewed along the direction that is perpendicular to the first rotary axis 7-AX1. The second intermediate element 7-152*a* at least partially overlas the third surface 7-156*a* when viewed along the direction that is parallel to the first rotary axis 7-AX1. The second supporting element 7-157 is in direct contact with the second intermediate element 7-152*a*. The first intermediate element 7-151 is located between the first supporting element 7-153 and the second supporting element 7-157 when viewed along the direction that is perpendicular to the first rotary axis 7-AX1. The second intermediate element 7-152*a* is located between the first supporting element 7-153 and the second supporting element 7-157 when viewed along the direction that is perpendicular to the first rotary axis 7-AX1.

The fourth surface 7-1571*a* overlaps and is parallel to a third imaginary plane 7-P3. The direction in which the fourth surface 7-1571*a* faces is the same as the direction in which the first surface 7-1531*a* faces. The first accommodating portion 7-1571*b* accommodates at least part of the first intermediate element 7-151. The first accommodating portion 7-1571*b* is not in direct contact with the first intermediate element 7-151. The second accommodating portion 7-1571*c* accommodates at least part of the second intermediate element. The second accommodating portion 7-1571*c* is not in direct contact with the second intermediate element 7-152*a*. The second base bottom 7-1571 has a plastic material.

The fifth surface 7-158*a* faces the second intermediate element 7-152*a*. The Young's modulus of the second strengthening unit 7-158 is different from the Young's modulus of the second base bottom 7-1571. The second bearing unit 7-1581 accommodates at least part of the first intermediate element 7-151. The second bearing unit 7-1581 accommodates at least part of the first intermediate element 7-151. The second bearing unit 7-1581 has a recessed structure 7-1581*a*. The first intermediate element 7-151 is movable relative to the second bearing unit 7-1581. The second bearing unit 7-1581 is located on the fifth surface 7-158*a*. The first intermediate element 7-151 at least partially overlaps the fifth surface 7-158*a* when viewed along the direction that is perpendicular to the first rotary axis 7-AX1. The first intermediate element 7-151 at least partially overlaps the fifth surface 7-158*a* when viewed along the direction that is parallel to the first rotary axis 7-AX1. The second intermediate element 7-152*a* does not overlap the fifth surface 7-158*a* when viewed along the direction that is perpendicular to the first rotary axis 7-AX1. Parallel along a first rotary axis 7-AX1 when viewed in the direction of, the second intermediate element 7-152*a* and the fifth surface 7-158*a* at least partially overlap. A non-zero gap 7-S7 is provided between the second intermediate element 7-152*a* and the fifth surface 7-158*a*.

The sixth surface 7-159*a* faces the second intermediate element 7-152*a* The second accommodating unit 7-159 is disposed on the fourth surface 7-1571*a*. The Young's modulus of the second accommodating unit 7-159 is different from the Young's modulus of the first base bottom 7-1531. The second accommodating unit 7-159 has a metal material. The third opening 7-159*b* accommodates at least part of the second intermediate element 7-152*a* (FIG. 88). The third opening 7-159*b* accommodates at least part of the third intermediate element 7-152*b* (FIG. 88). The third opening 7-159*b* accommodates at least part of the fourth intermediate element 7-152*c* (FIG. 88). The third opening 7-159*b* is located on the sixth surface 7-159*a*. An edge 7-159*b*' of the third opening 7-159*b* has a third reinforcing structure 7-159*b*". The third reinforcing structure 7-159*b*" is in direct contact with the second intermediate element 7-152*a*. The third reinforcing structure 7-159*b*" has an arc structure or an inclined structure that is not parallel and not perpendicular to the sixth surface 7-159*a*, so as to avoid damaging the second intermediate element 7-152*a*. The second intermediate element 7-152*a* at least partially overlaps the sixth surface 7-159*a* when viewed along the direction that is perpendicular to the first rotary axis 7-AX1. The second intermediate element 7-152*a* at least partially overlaps the sixth surface 7-159*a* when viewed along the direction that is parallel to the first rotary axis 7-AX1.

By providing the reinforcing structures, the intermediate elements may be prevented from being damaged, and the optical element driving mechanism is prevented from being adversely affected.

Figure 89:
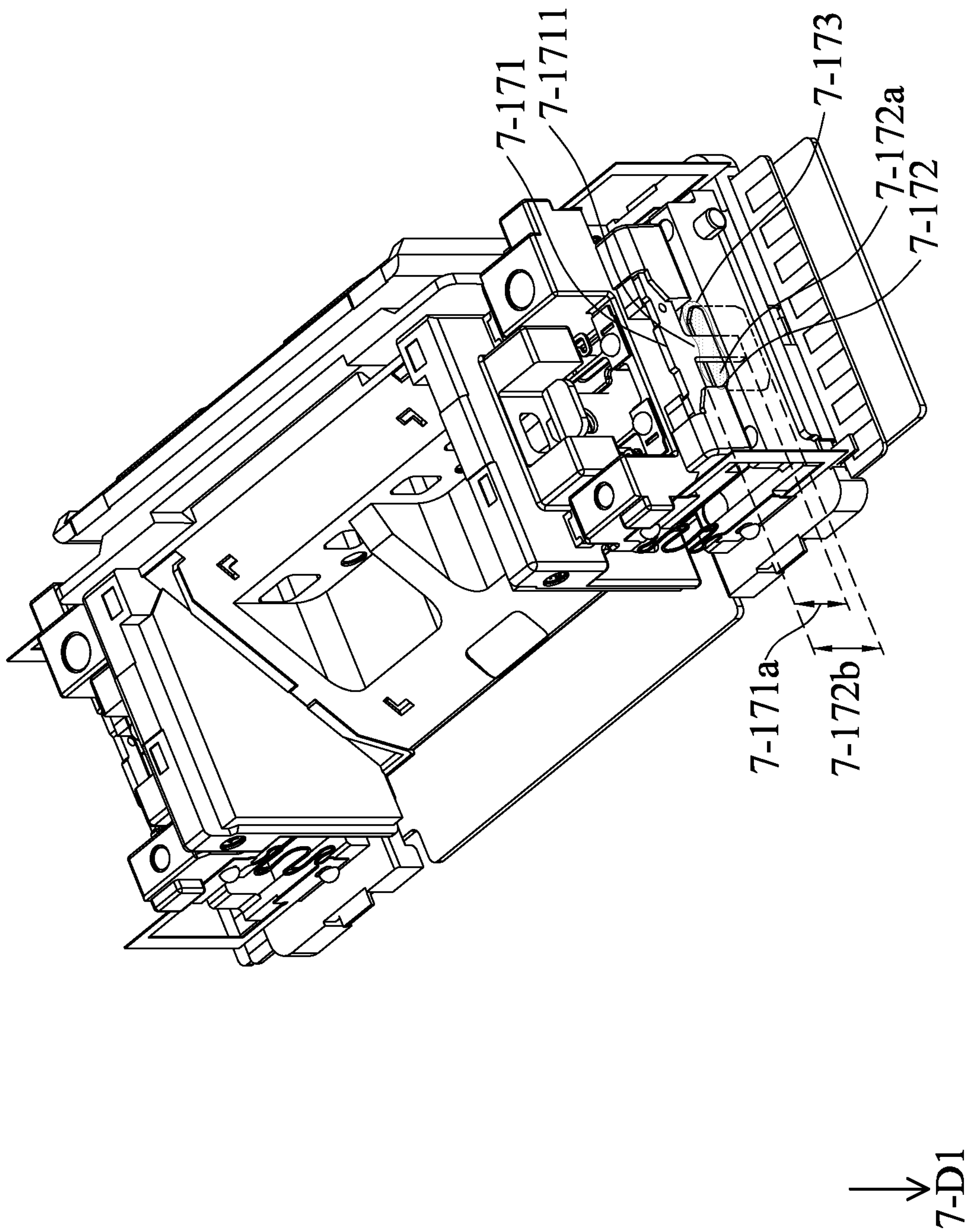
FIG. 89 shows a schematic view of a first suppression assembly of the optical element driving mechanism according to an embodiment of the present disclosure.

Please refer to FIG. 89, the first suppression assembly 7-170 suppresses an abnormal movement or vibration of the movable part 7-120 relative to the fixed part 7-110, so as to improve the driving accuracy. The second suppression element 7-172 corresponds to the first suppression element 7-171. The first damping element 7-173 is provided between the first suppression element 7-171 and the second suppression element 7-172. The Young's modulus of the first suppression element 7-171 is different from the Young's modulus of the second suppression element 7-172. The first suppression element 7-171 has a metal material. The second suppression element 7-172 has a plastic material. The first suppression element 7-171 and the second suppression element 7-172 are respectively disposed on the movable part 7-120 and the fixed part 7-110. The first suppression element 7-171 has a projecting structure 7-1711 extending towards the second suppression element 7-172. The second suppression element 7-172 has a recessed structure 7-172*a* that accommodates at least part of the first suppression element 7-171. The first damping element 7-173 has a soft resin material. The protruding structure 7-1711 of the first suppression element 7-171 extends along the first direction 7-D1. In an extending direction of the protruding structure 7-1711 of the first suppression element 7-171 (may be the first direction 7-D1), a maximum dimension 7-171*a* of the first suppression element 7-171 is smaller than a depth 7-172*b* of the recessed structure 7-172*a* of the second damping element 7-172. The first damping element 7-173 is in direct contact with the first damping element 7-171 and the second damping element 7-172.

The first suppression element 7-171 does not directly contact the second element suppression 7-172 when the movable part 7-120 is located at an arbitrary position within the first limit range. The fixed part 7-110 has a rectangular structure and the first suppression element 7-171 is located on the first side 7-114 of the fixed part 7-110 when viewed along the extending direction of the protruding structure

7-1711 of the first suppression element 7-171 (may be the first direction 7-D1). The second side 7-115 of the fixed part 7-110 is not parallel to the first side 7-114 when viewed along the extending direction of the protruding structure 7-1711 of the first suppression element 7-171 (may be the first direction 7-D1) (may refer to FIG. 80). A length 7-114*a* of the first side 7-114 is different from a length 7-115*a* of the second side 7-115. The length 7-114*a* of the first side 7-114 is smaller than the length 7-115*a* of the second side 7-115 (may refer to FIG. 80).

Figure 90:
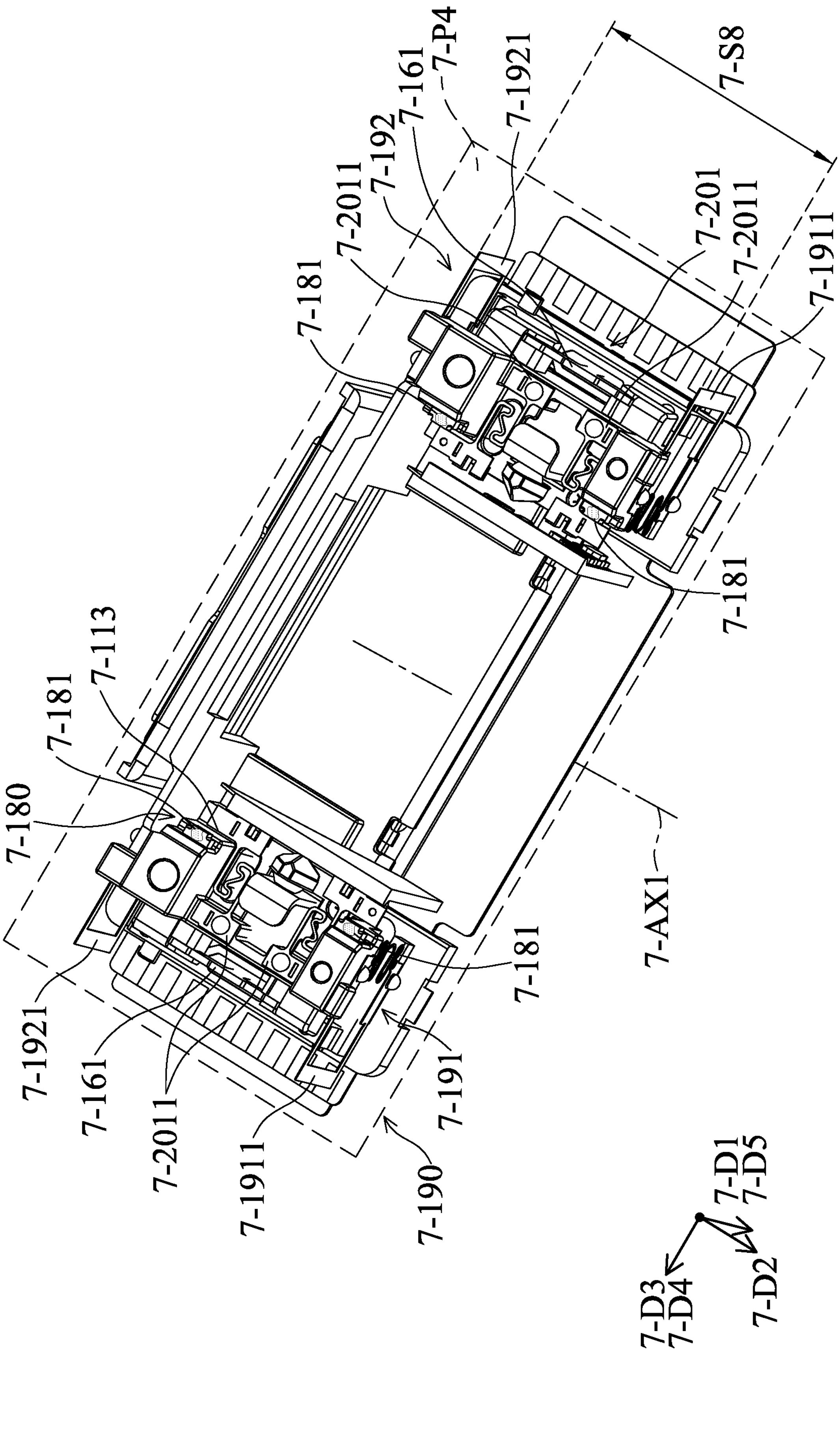
FIG. 90 shows a schematic view of a second supporting assembly, a second suppression assembly, a first connecting assembly and a second connecting assembly of the optical element driving mechanism according to an embodiment of the present disclosure.

Please refer to FIG. 90, the second suppression assembly 7-180 suppresses an abnormal movement or vibration of the holder 7-121 relative to the frame 7-113, so as to improve the driving accuracy. The second damping element 7-181 of the second suppression assembly 7-180 has a soft resin material. The second damping element 7-181 is in direct contact with the holder 7-121 (not shown) and the frame 7-113. The second damping elements 7-181 are respectively located at different corners of the fixed part 7-110 when viewed along a first direction. A fourth imaginary plane 7-P4 passes through the second damping element 7-181. The fourth imaginary plane 7-P4 is perpendicular to the first direction 7-D1.

Please refer to FIG. 86 and FIG. 90, the holder 7-121 is movable relative to the frame 7-113 within the second limit range in the second dimension via the second supporting assembly 7-160. The second supporting units 7-161 of the second supporting assembly 7-160 are arranged in a direction that is parallel to an extending direction of the second side 7-115 (may be the third direction 7-D3) when viewed along the first direction 7-D1. The first elastic element 7-191 has a plate-like structure. The second elastic element 7-192 having a plate-like structure.

The frame 7-113 is movably connected to the fixed part 7-110 via the first connecting assembly 7-190. A thickness direction of the first elastic element 7-191 is perpendicular to the third direction 7-D3. The first elastic element 7-191 is parallel to the first rotary axis 7-AX1. The first elastic element 7-191 includes a plurality of first elastic units 7-1911. The first elastic units 7-1911 are arranged along the fourth direction 7-D4. The second side 7-115 is parallel to the fourth direction 7-D4.

A thickness direction of the second elastic element 7-192 is perpendicular to the third direction 7-D3. The second elastic element 7-192 is parallel to the first rotary axis 7-AX1. The second elastic element 7-192 further includes a plurality of second elastic units 7-1921. The second elastic units 7-1921 are arranged along the fourth direction 7-D4.

In the third direction 7-D3, a non-zero distance 7-S8 is provided between the first elastic element 7-191 and the second elastic element 7-192.

The holder 7-121 (not shown in FIG. 90) is movably connected to the frame 7-113 via the second connecting assembly 7-200. The third elastic element 7-201 has a plate-like structure. A thickness direction of the third elastic element 7-201 is perpendicular to a fifth direction 7-D5. The third elastic element 7-201 is not parallel to the first rotary axis 7-AX1. The third elastic element 7-201 is perpendicular to the first rotary axis 7-AX1. The third elastic element 7-201 further includes a plurality of third elastic units 7-2011. The third elastic units 7-2011 are arranged along the fourth direction 7-D4. The third elastic element 7-201 is located between the first elastic element 7-191 and the second elastic element 7-192 when viewed along the first direction 7-D1.

In summary, the movable part 7-120 of the optical element driving mechanism 7-10 of the present disclosure is movable relative to the fixed part 7-110 via the first supporting assembly 7-150 and the second supporting assembly 7-160. In this way, the movable part 7-120 and the optical element 7-O is movable relative to the fixed part 7-110 more smoothly. Moreover, a better imaging effect may be achieved by driving the optical element 7-O. Furthermore, since the first supporting assembly 7-150 and the second supporting assembly 7-160 have spherical structures, the first supporting assembly 7-150 and the second supporting assembly 7-160 of the optical element driving mechanism 7-10 may be minimized, thereby achieving the effect of miniaturizing the optical element driving mechanism 7-10.

Figure 91:
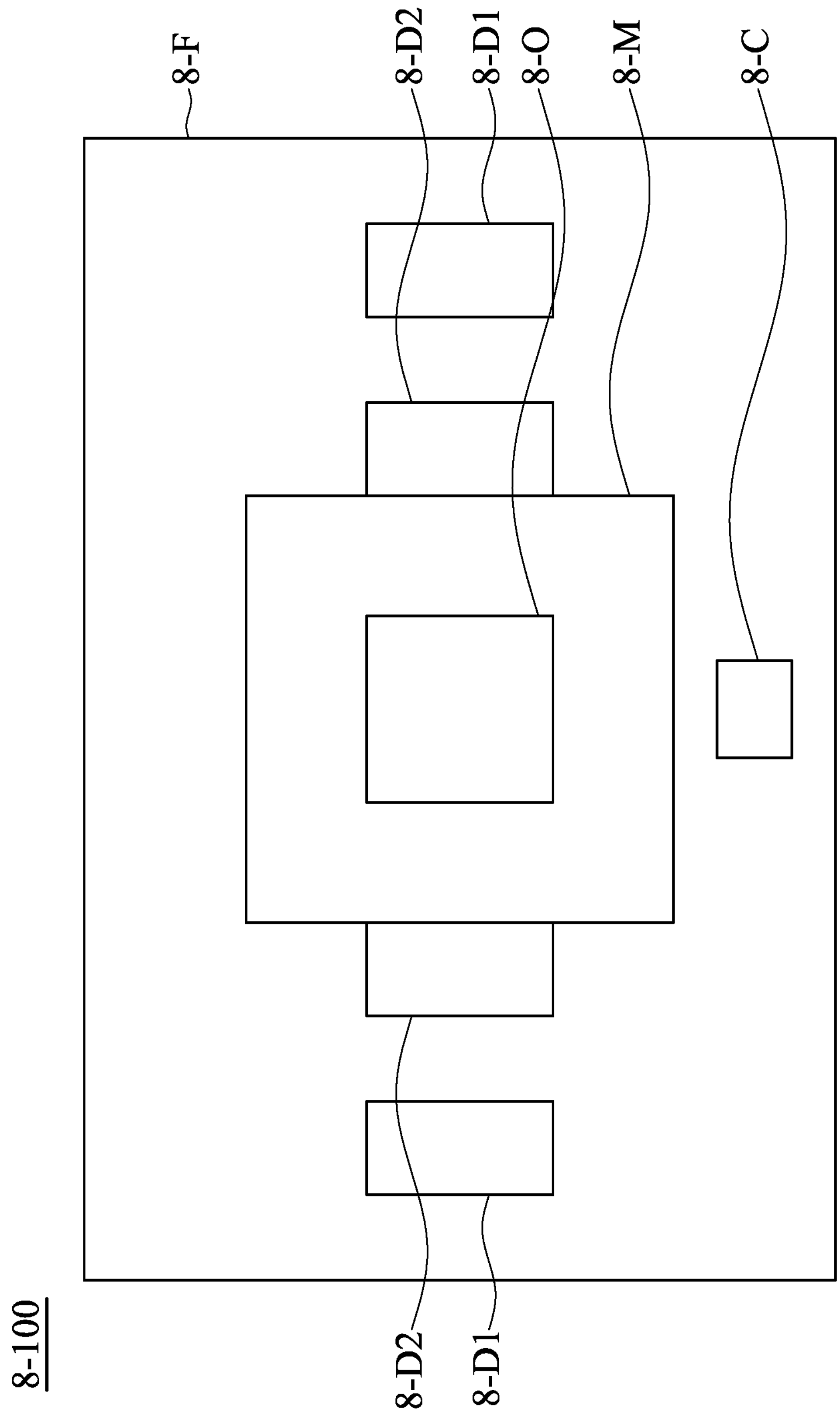
FIG. 91 is a schematic view of an optical element driving mechanism in some embodiments of the present disclosure.

Refer to FIG. 91. FIG. 91 is a schematic view of an optical element driving mechanism 8-100 in some embodiments of the present disclosure. The optical element driving mechanism 8-100 may mainly include a fixed portion 8-F, a movable portion 8-M, a driving assembly 8-D, and a control assembly 8-C. The optical element driving mechanism 8-100 is used for holding an optical element 8-O, and the optical element driving mechanism 8-100 may be used in an optical system (e.g. cellphones, cameras, etc.). The movable portion 8-M, the driving assembly 8-D, and the control assembly 8-C may be disposed in the fixed portion 8-F. The movable portion 8-M is used for connecting to the optical element 8-O to move the optical element 8-O relative to the fixed portion 8-F.

In some embodiments, the driving assembly 8-D may include a first driving element 8-D1 and a second driving element 8-D2 disposed on the fixed portion 8-F and the movable portion 8-M, respectively. A driving force (e.g. electromagnetic force) may be generated between the first driving element 8-D1 and the second driving element 8-D2 to drive the movable portion 8-M to move relative to the fixed portion 8-F. The driving assembly 8-D may be electrically connected to the control assembly 8-C. The control assembly 8-C provides a control signal to control the driving assembly 8-D.

Figure 92:
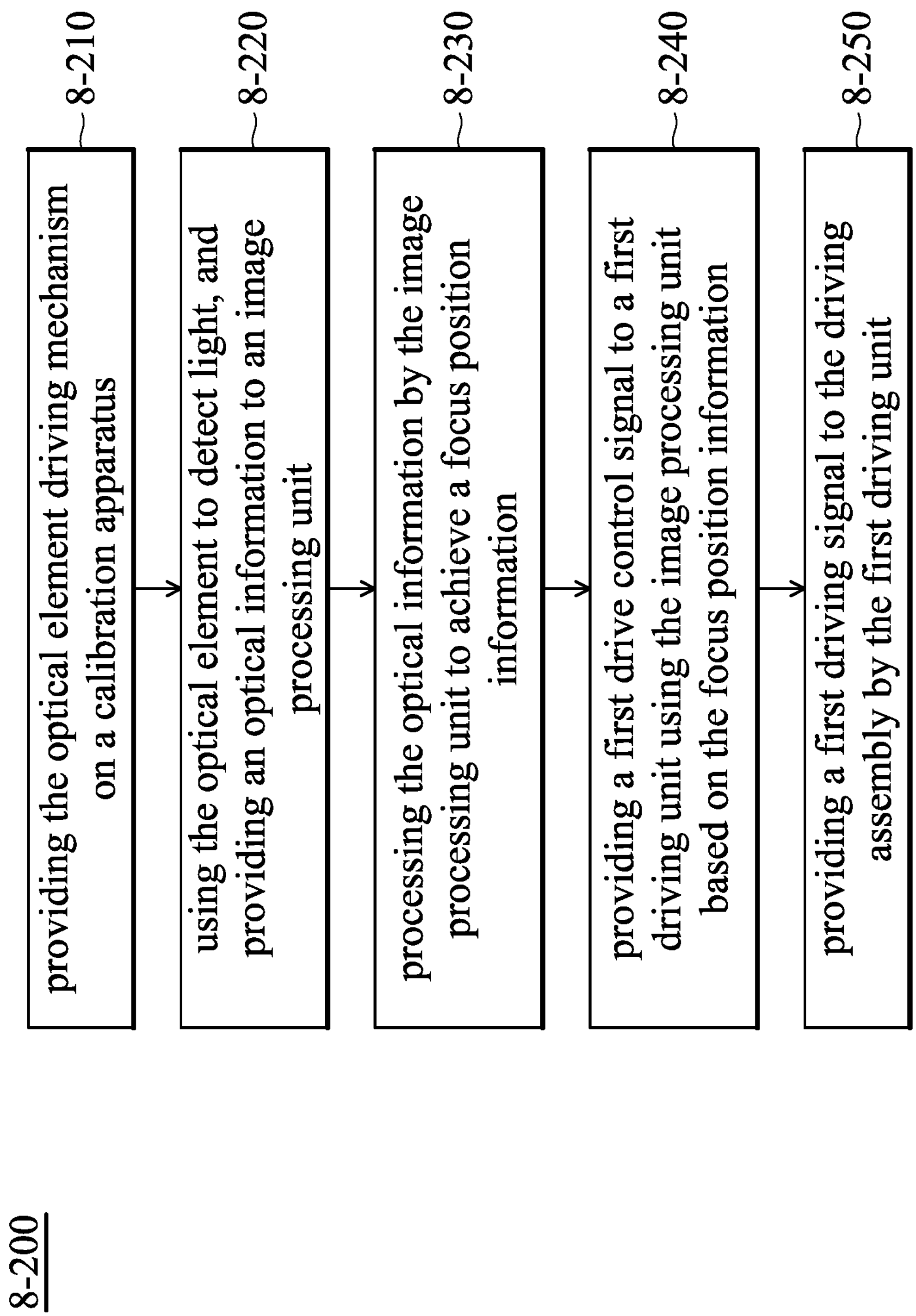
FIG. 92 is a block diagram of a calibration step in some embodiments of the present disclosure.
Figure 94:
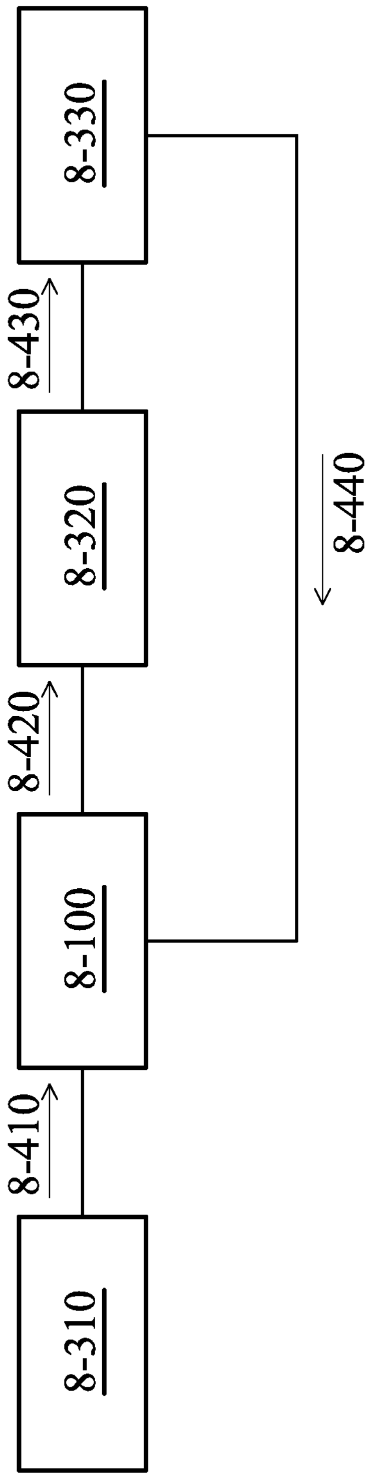
FIG. 94 is a schematic view when the optical element driving mechanism is calibrated by the calibration step.

FIG. 92 is a block diagram of a calibration step 8-200 in some embodiments of the present disclosure, and FIG. 94 is a schematic view when the optical element driving mechanism 8-100 is calibrated by the calibration step 8-200. The calibration step 8-200 is used for recording a first predetermined data to the control assembly. The first predetermined data includes a relationship between the movement of the movable portion 8-M relative to the fixed portion 8-F and the control signal.

The calibration step 8-200 starts from an operation 8-210. The optical element driving mechanism 8-100 is disposed on a calibration apparatus 8-310 (FIG. 94) to calibrate the optical element driving mechanism 8-100. In the operation 8-220, light 8-410 is provided to the optical element 8-O to the calibration apparatus 8-310. The light 8-410 passes through the optical element 8-O and is transferred to an optical information 8-420 (e.g. an image). Afterwards, the optical information 8-420 is provided to an image processing unit 8-320. In some embodiments, the image processing unit may be electrically connected to the optical element driving mechanism 8-100 and may be disposed inside or outside the optical element driving mechanism 8-100, depending on design requirement.

Figure 93:
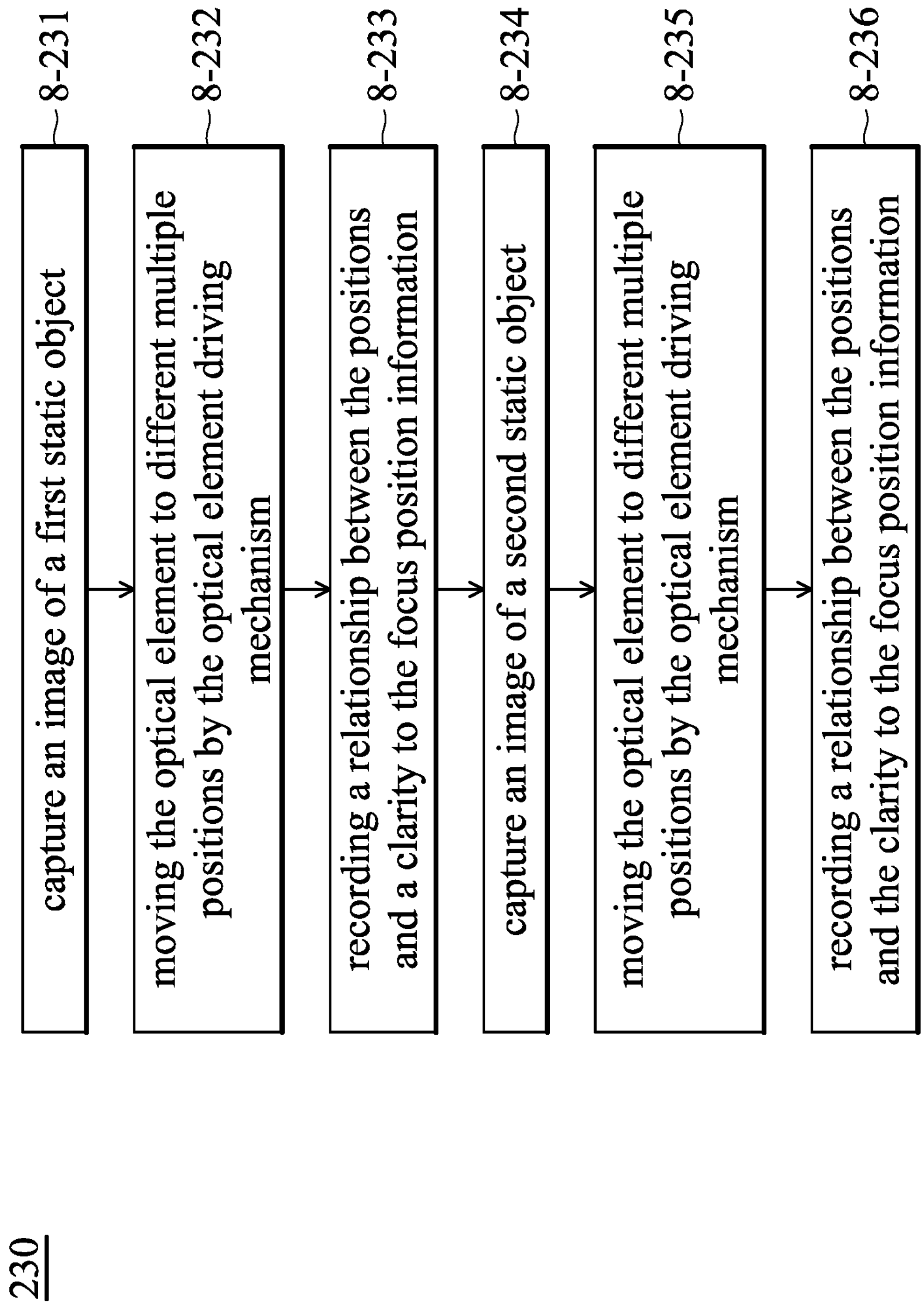
FIG. 93 is a detailed process flow of the operation in some embodiments.

In the operation 8-230, the optical information 8-420 is process by the image processing unit 8-320 to get a focus position information. FIG. 93 is a detailed process flow of the operation 8-230 in some embodiments. The operation 8-230 starts from an operation 8-231, wherein a photo of a first static object is taken by the optical element 8-O. Afterwards, in operation 8-232, the optical element 8-O is moved in multiple different positions, and photos of the first static object are taken by the optical element 8-O when the optical element 8-O is moving. In the operation 8-233, the relation between the positions and the clarity of the photos taken at the positions is recorded in the focus position information.

In the operation 8-234, a photo of a second static object is taken by the optical element 8-O. A distance between the first static object and the optical element driving mechanism 8-100 is different than a distance between the second static object and the optical element driving mechanism 8-100. After wards, in the operation 8-235, the optical element 8-O is moved in multiple different positions, and photos of the second static object are taken by the optical element 8-O when the optical element 8-O is moving. In the operation 8-236, the relation between the positions and the clarity of the photos taken at the positions is recorded in the focus position information. In some embodiments, the focus position information may be stored in the control assembly 8-C.

It should be noted that the clarity of the optical information 8-420 may be calculated by the image processing unit 8-320 using space Fourier transform or image comparison method.

In operation 8-240, a first drive control signal 8-430 is provided to a first driving element 8-330 by the image processing unit 8-320 based on the focus position information. In the operation 8-250, a first driving signal 8-440 is provided by the first driving unit 8-330 based on the first drive control signal 8-430 to control the driving assembly 8-D of the optical element driving mechanism 8-100. For example, if the first driving element 8-D1 is a coil, and then current for controlling the first driving element 8-D1 may be controlled by the first driving signal 8-440, so the driving force generated by the driving assembly 8-D may be controlled.

Figure 95:
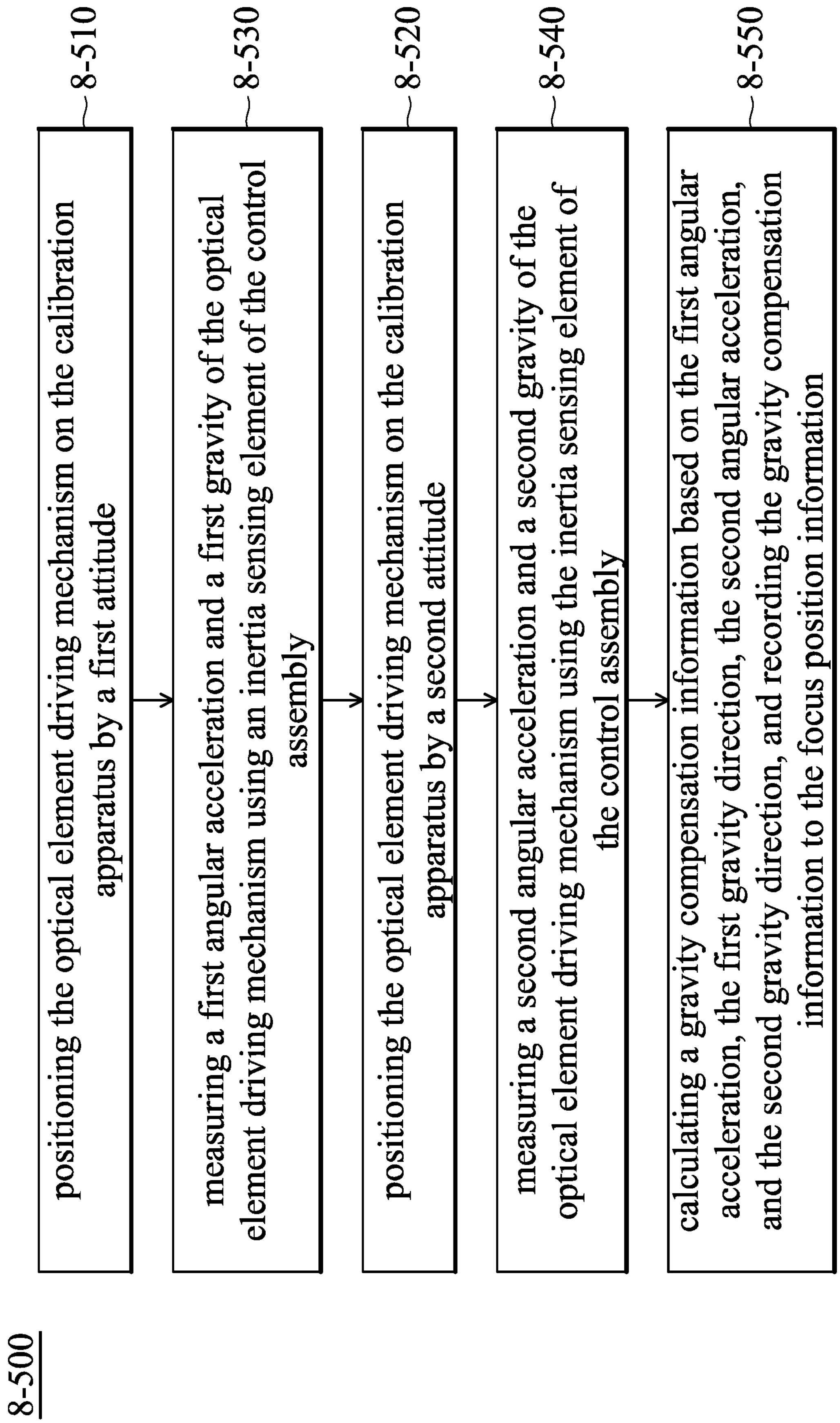
FIG. 95 is a block diagram of a calibration step.

FIG. 95 is a block diagram of a calibration step 8-500. The calibration step 8-500 may be used for calculating gravity compensation information to compensate the influence of different gravity directions to the optical element driving mechanism 8-100. The calibration step 8-500 starts from operation 8-510, wherein the optical element driving mechanism 8-100 is positioned on the calibration apparatus 8-310 by a first attitude, such as disposed on the calibration apparatus by a specific angle. Afterwards, in operation 8-520, a first angular acceleration and a first gravity direction of the optical element driving mechanism 8-100 at the first attitude are detected by an inertia sensing element in the control assembly 8-C.

In operation 8-530, the optical element driving mechanism 8-100 is positioned on the calibration apparatus 8-310 by a second attitude. Afterwards, in operation 8-540, a second angular acceleration and a second gravity direction of the optical element driving mechanism 8-100 at the second attitude are detected by an inertia sensing element in the control assembly 8-C. It should be noted that the first attitude and the second attitude are different, so the first angular acceleration may be different than the second angular acceleration, or the first gravity direction may be different than the second gravity direction. Therefore, influence of the gravity direction to the sensed signal in different attitudes may be achieved.

In operation 8-550, gravity compensation information is calculated by the first angular acceleration, the second angular acceleration, the first gravity direction, and the second gravity direction. The gravity compensation information may be used together with the focus position information to further compensate the influence of the gravity direction to the optical element driving mechanism, so more accurate sensed signal may be achieved.

Figure 96A:
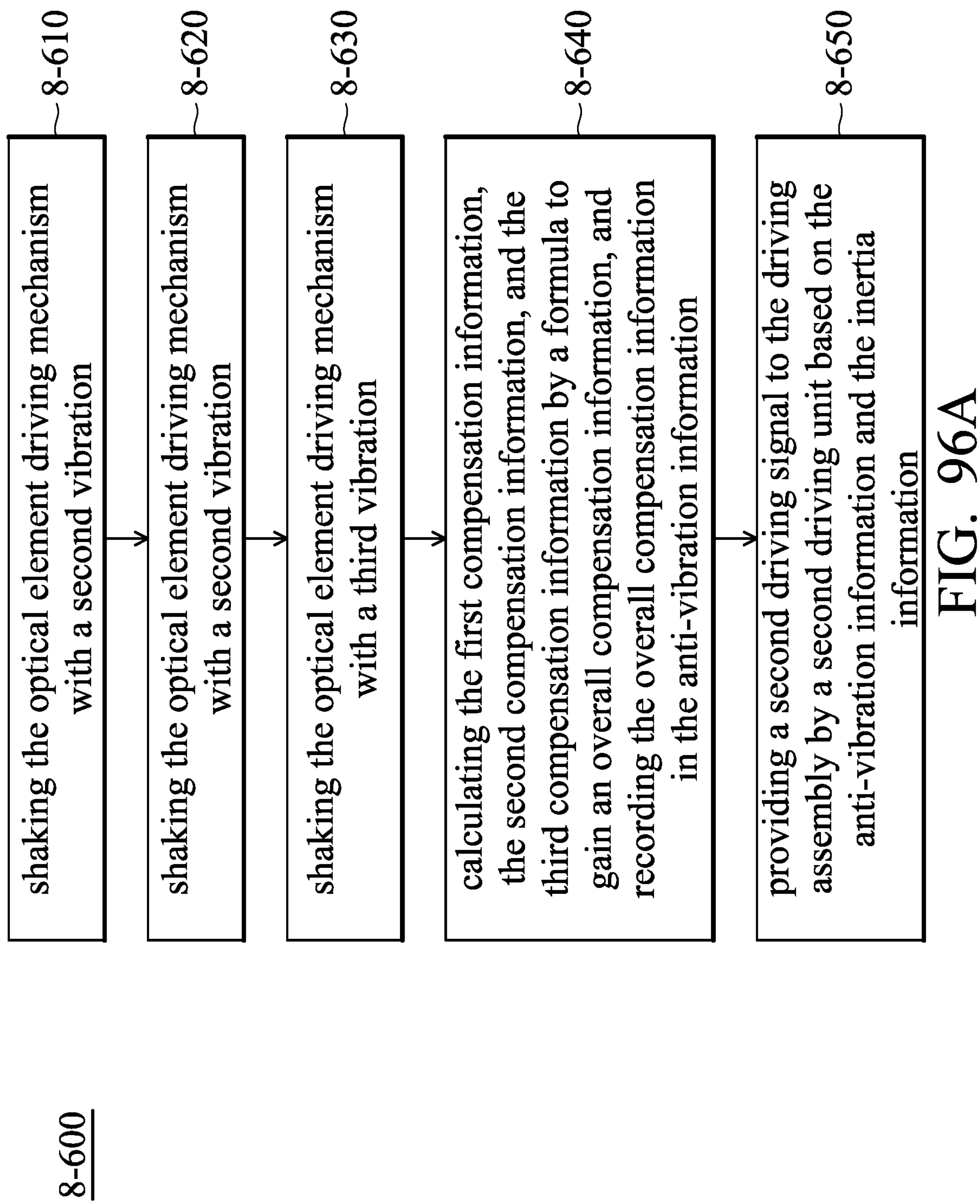
FIG. 96A is a block diagram of a calibration step.
Figure 96B:
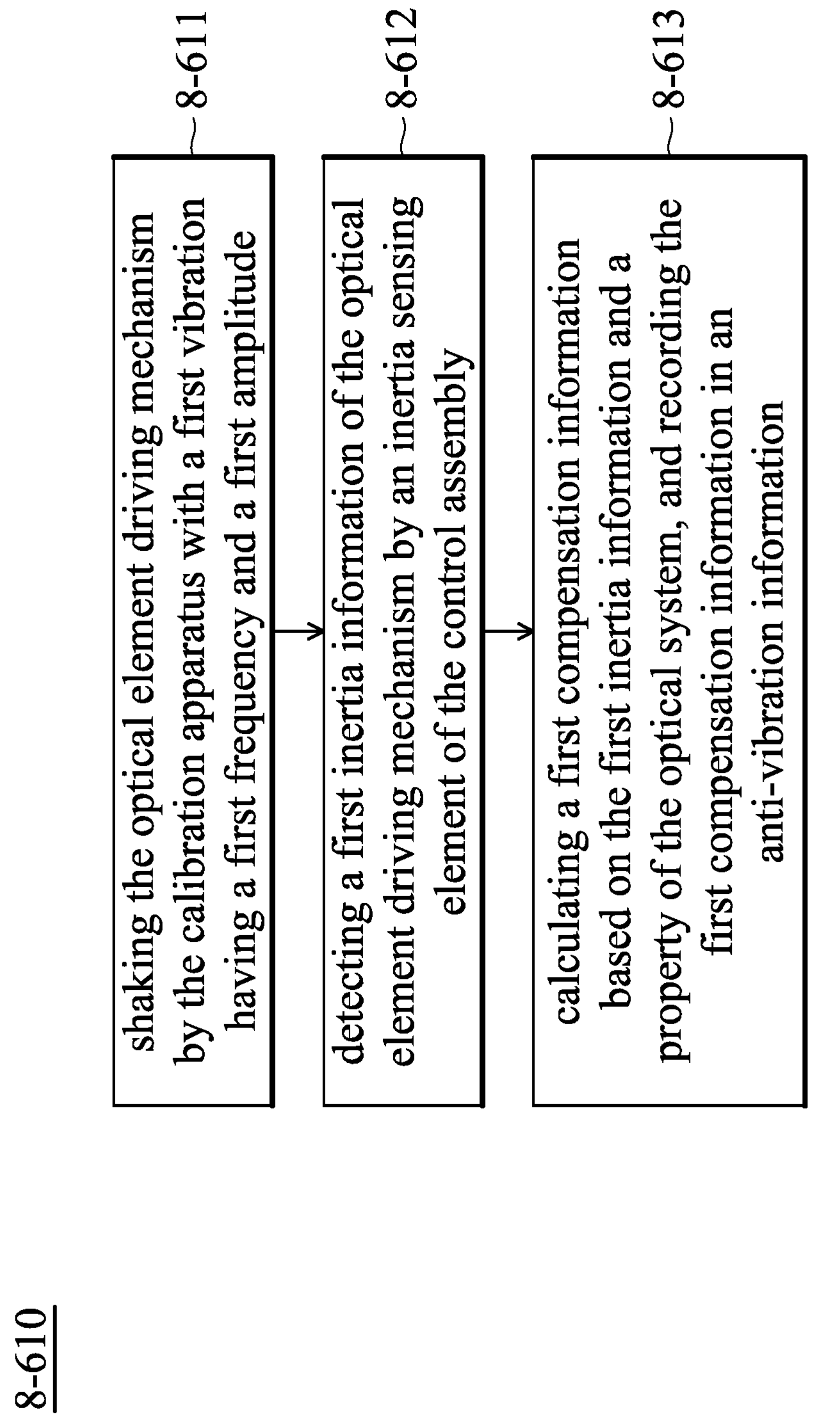
FIG. 96B is a block diagram of an operation of the calibration step.
Figure 97:
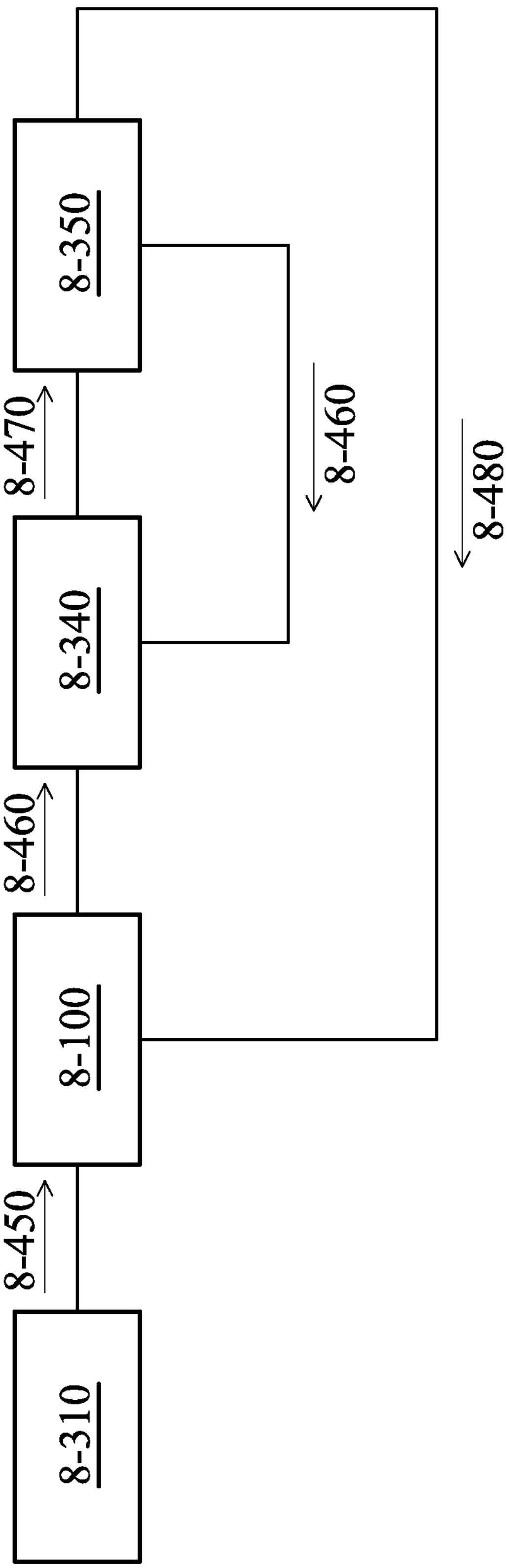
FIG. 97 is a schematic view when using the calibration step to calibrate the optical element driving mechanism.

FIG. 96A is a block diagram of a calibration step 8-600, and FIG. 97 is a schematic view when using the calibration step 8-600 to calibrate the optical element driving mechanism 8-100. The calibration step 8-600 starts from operation 8-610 using first vibration, and the operation 8-610 includes operations 8-611, 8-612, and 8-613. FIG. 96B is a block diagram of the operation 8-610. In the operation 8-611, a first vibration (a portion of vibration 8450) with a first frequency and a first amplitude is provided by the calibration apparatus 8-310 to the optical element driving mechanism 8-100 to shake the optical element driving mechanism 8-100. Afterwards, in the operation 8-612, the inertia sensing element of the control assembly 8-C is used to detect a first inertia information (a portion of the inertia sensing information 8-460) of the optical element driving mechanism 8-100 under the first vibration. In the operation 8-613, using a calculation unit 8-340 to calculate first compensation information based on the first inertia information and the optical property of the optical system where the optical element driving mechanism 8-100 is disposed in, and storing the first compensation information in an anti-vibration information 8-470.

Figure 96C:
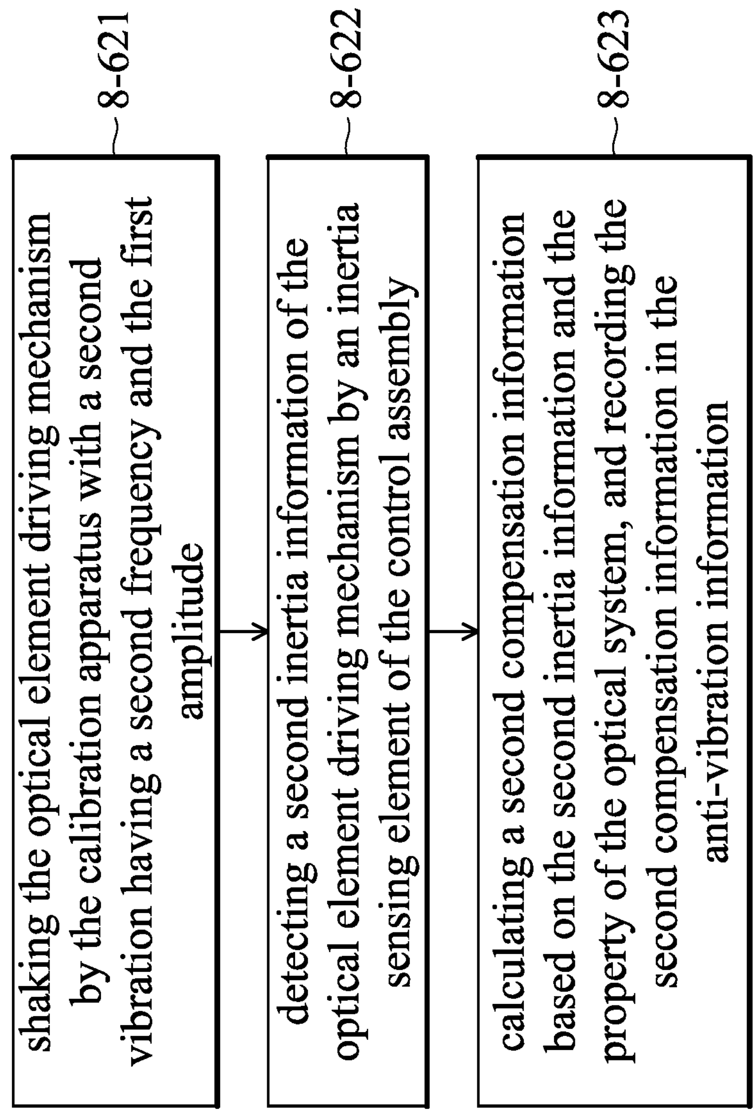
FIG. 96C is a block diagram of an operation of the calibration step.

The calibration step 8-600 continues to operation 8-620 using a second vibration. FIG. 96C is a block diagram of the operation 8-620. The operation 8-620 includes operations 8-621, 8-622, and 8-623. In the operation 8-621, a second vibration (a portion of vibration 8-450) with a second frequency and the first amplitude is provided by the calibration apparatus 8-310 to the optical element driving mechanism 8-100 to shake the optical element driving mechanism 8-100. Afterwards, in the operation 8-622, the inertia sensing element of the control assembly 8-C is used to detect a second inertia information (a portion of the inertia sensing information 8-460) of the optical element driving mechanism 8-100 under the second vibration. In the operation 8-623, using a calculation unit 8-340 to calculate second compensation information based on the second inertia information and the optical property of the optical system where the optical element driving mechanism 8-100 is disposed in, and storing the second compensation information in the anti-vibration information 8-470.

Figure 96D:
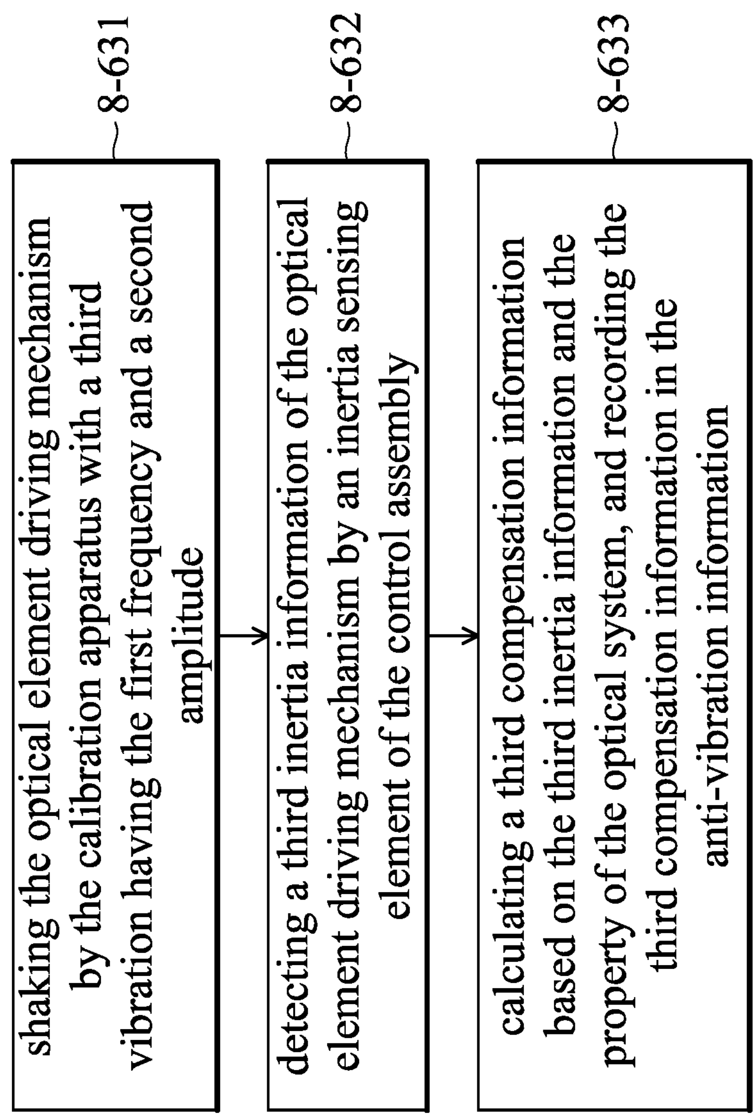
FIG. 96D is a block diagram of an operation of the calibration step.

The calibration step 8-600 continues to operation 8-630 using a third vibration. FIG. 96D is a block diagram of the operation 8-630. The operation 8-630 includes operations 8-631, 8-632, and 8-633. In the operation 8-631, a third vibration (a portion of vibration 8450) with the first frequency and a second amplitude is provided by the calibration apparatus 8-310 to the optical element driving mechanism 8-100 to shake the optical element driving mechanism 8-100. Afterwards, in the operation 8-632, the inertia sensing element of the control assembly 8-C is used to detect a third inertia information (a portion of the inertia sensing information 8-460) of the optical element driving mechanism 8-100 under the third vibration. In the operation 8-633, using a calculation unit 8-340 to calculate third compensation information based on the third inertia information and the optical property of the optical system where the optical element driving mechanism 8-100 is disposed in, and storing the third compensation information in the anti-vibration information 8-470.

It should be noted that the first vibration and the second vibration have an identical first amplitude, but with different first and second frequencies. Furthermore, the first vibration and the third vibration have an identical first frequency, but with different first and second amplitudes. By comparing the first compensation information and the second compensation information respectively caused by the first vibration and the second vibration, the influence of vibration frequency to the optical element driving mechanism 8-100 may be achieved. By comparing the first compensation information and the third compensation information respectively caused by the first vibration and the third vibration, the influence of vibration amplitude to the optical element driving mechanism 8-100 may be achieved.

Moreover, if an additional resilient element is provided in the optical element driving mechanism 8-100 to movably connect the movable portion 8-M and the fixed portion 8-F, resonance may occur. The first frequency and the second frequency are different than the resonance frequencies of the optical element 8-O, the optical element driving mechanism 8-100, or the entire optical system. For example, the difference between may be greater than 10% of the resonance frequencies of the optical element 8-O, the optical element driving mechanism 8-100, or the entire optical system, so effective vibration may be achieved. In some embodiments, when the vibration provided to the optical element driving mechanism 8-100 is close to its resonance frequency (e.g. difference less than 10% of the resonance frequency of the optical element driving mechanism 8-100), additional current may be provided by the control assembly 8-C to the driving assembly 8-D for adjusting the vibration frequency to prevent resonance from occurring. In some embodiments, additional damping element (e.g. gel) may be provided to adjust the resonance frequency of the optical element driving mechanism 8-100. For example, the damping element may movably connect the movable portion 8-M and the fixed portion 8-F to adjust the resonance frequency.

In some embodiments, specific frequency of vibration may be filtered. For example, when an user using a cellphone, the vibration frequency caused by the used is about 1 Hz to 10 Hz. Therefore, vibration with frequency higher than a specific frequency (e.g. 10 Hz) may be determined as noise, and the influence caused by the vibration to the optical element driving mechanism 8-100 is not recorded when recording the influence of vibration to the optical element driving mechanism 8-100, so more accurate compensation result may be achieved.

Afterwards, the calibration step 8-600 goes to operation 8-640, wherein the first compensation information, the second compensation information, and the third compensation information are calculated by a formula to gain an overall compensation information, and the overall compensation information is recorded in the anti-vibration information 8-470. In other words, the anti-vibration information 8-470 includes the first compensation information, the second compensation information, and the third compensation information that are not calculated, and the overall compensation information that is calculated. The formula includes exponential equation, logarithmic equation, or polynomial formula, depending on design requirement. In some embodiments, the anti-vibration information 8-470 may be recorded in the control assembly 8-C of the optical element driving mechanism 8-100, or may be recorded in other storage unit outside the optical element driving mechanism 8-100, depending on design requirement.

In operation 8-650, a second driving signal 8-480 is provided by the second driving unit 8-350 to the driving assembly 8-D of the optical element driving mechanism 8-100 based on the inertia information 8-460 and the anti-vibration information 8-470. It should be noted that the first driving signal 8-440 and the second driving signal 8-480 are provided to different elements in the driving assembly 8-D.

For example, the driving assembly 8-D may include a first coil and a second coil used for respectively generating a first driving force and a second driving force with a first magnetic element and a second magnetic element. The directions of the first driving force and the second driving force are different, and the first driving signal 8-440 and the second driving signal 8-480 may be respectively provided to the first coil and the second coil to control the driving forces in different directions separately. Moreover, the factors needed to be considered are different when the direction of the driving force is changed, so using different signals may calibrate the optical element driving mechanism 8-100 more accurately.

By calibrating the optical element driving mechanism 8-100 with the calibration steps 8-200, 8-500, and 8-600, the position of the optical element 8-O in the optical element driving mechanism 8-100 may be corrected based on the focus position information, the gravity compensation information, the anti-vibration information 8-470, and the inertia information 8-460 to achieve optical image stabilization or auto focus, and no additional sensor is required in the optical element driving mechanism 8-100 to detect the position of the optical element 8-O in the optical element driving mechanism 8-100. Therefore, the required number of elements of the optical element driving mechanism may be reduced to lower the cost and achieve miniaturization.

In some embodiments, the calibration steps 8-200 and 8-500 may be performed in advance to allow the optical element 8-O in the optical element driving mechanism to perform focus. Afterwards, the calibration step 8-600 is performed to achieve optical image stabilization, so the accuracy of the optical element driving mechanism 8-100 may be further enhanced.

In summary, a control method is provided. The control method is used for controlling an optical element driving mechanism for an optical system. The optical element driving mechanism includes a movable portion, a fixed portion, a driving assembly, and a control assembly. The movable portion is used for connecting an optical element. The movable portion is movable relative to the fixed portion. The driving assembly is used for driving the movable portion to move relative to the fixed portion. The control assembly is used for providing a control signal to control the driving assembly. The control method includes a calibration step. In the calibration step, a first predetermined data is recorded in the control assembly. The first predetermined data includes a relationship between the movement of the movable portion relative to the fixed portion and the control signal.

By the control method, no additional sensor is required in the optical element driving mechanism 8-100 to detect the position of the optical element 8-O in the optical element driving mechanism 8-100. Therefore, the required number of elements of the optical element driving mechanism may be reduced to lower the cost and achieve miniaturization The relative positions and size relationship of the elements in the present disclosure may allow the optical element driving mechanism achieving miniaturization in specific directions or for the entire mechanism. Moreover, different optical modules may be combined with the optical element driving mechanism to further enhance optical quality, such as the quality of photographing or accuracy of depth detection. Therefore, the optical modules may be further utilized to achieve multiple anti-vibration systems, so image stabilization may be significantly improved.

Figure 98:
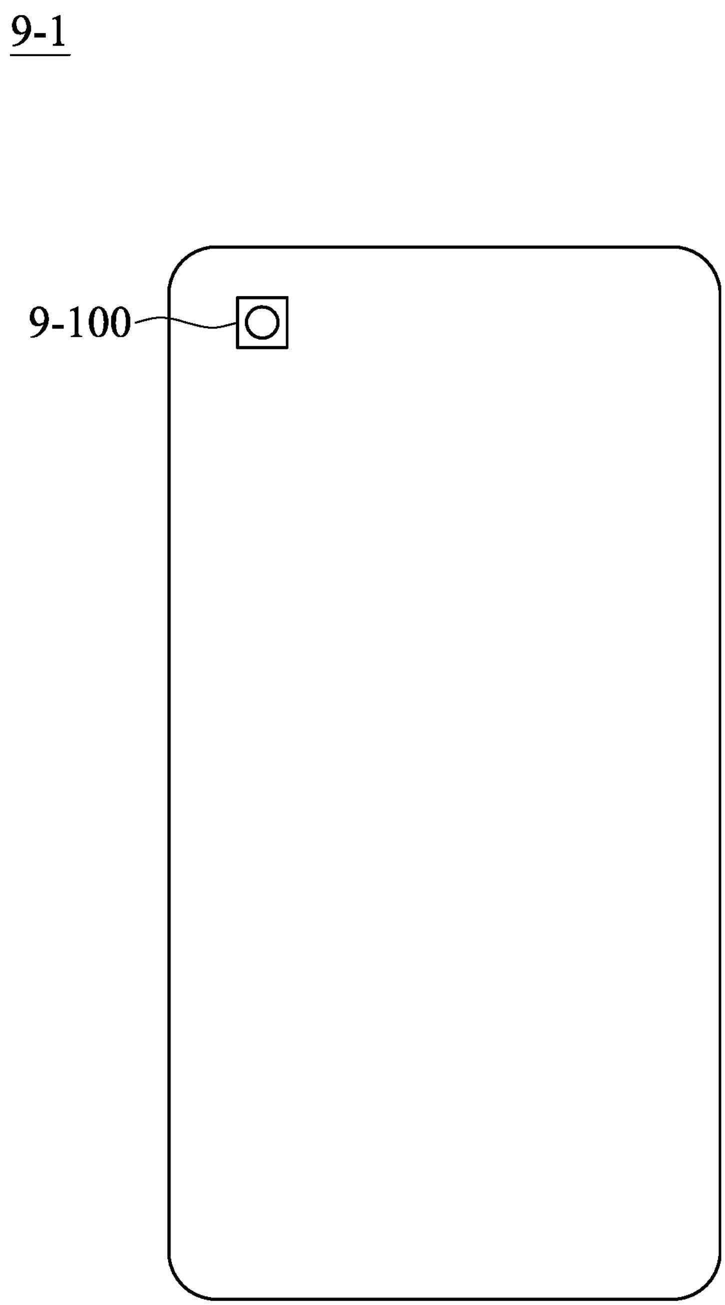
FIG. 98 shows a schematic view of an electrical device with an optical element driving mechanism according to an embodiment of the present disclosure.

Please refer to FIG. 98, an optical element driving mechanism 9-100 of an embodiment of the present disclosure may be mounted in an electrical device 9-1 for taking photos or videos, wherein the aforementioned electrical device 9-1 may, for example, be a smartphone or a digital camera, but the present disclosure is not limited to these. It should be noted that the position and the size between the optical element driving mechanism 9-100 and the electrical device 9-1 shown in FIG. 98 are only an example, which is not for limiting the position and the size between the optical element driving mechanism 9-100 and the electrical device 9-1. In fact, according to different needs, the optical element driving mechanism 9-100 may be mounted at different positions in the electrical device 9-1.

Figure 99:
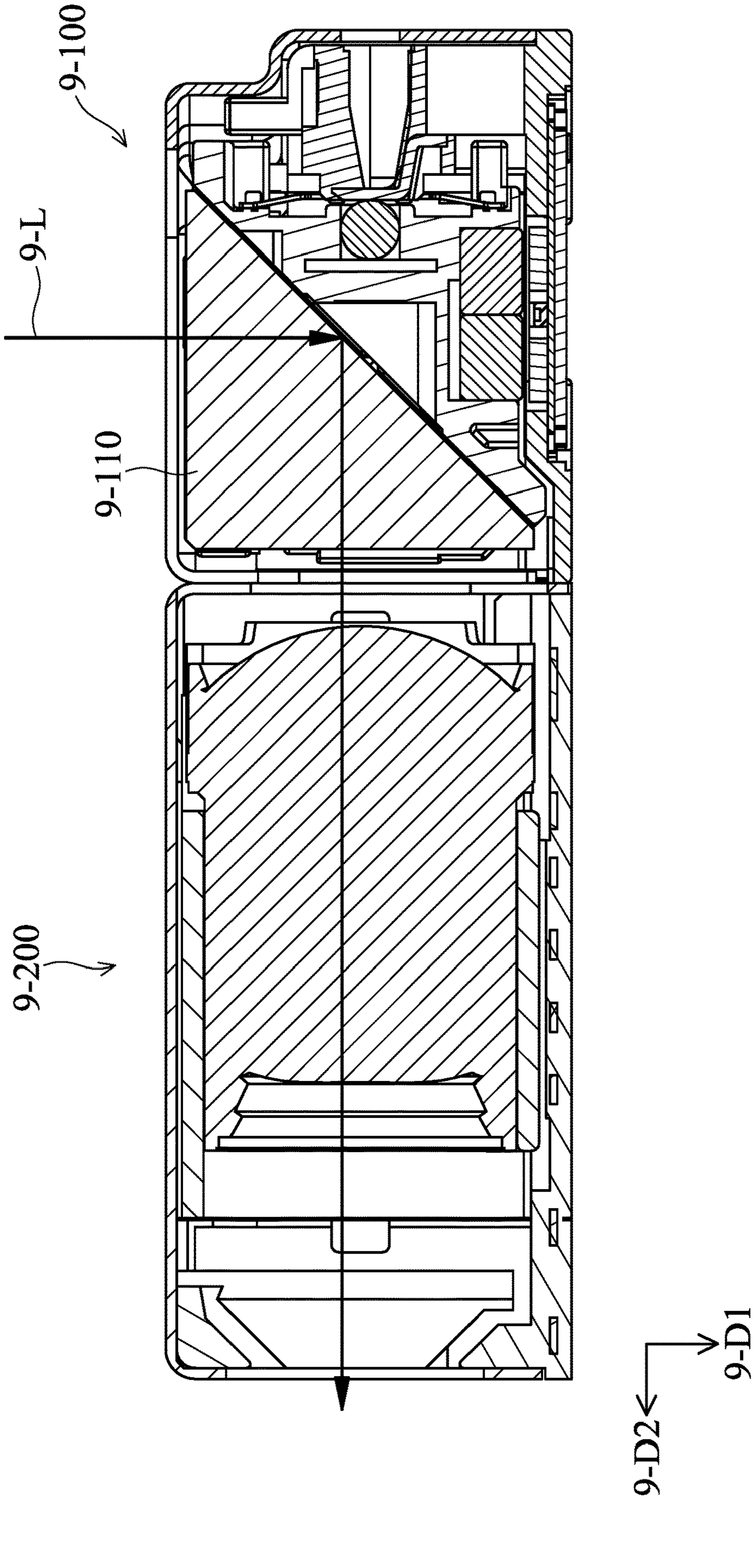
FIG. 99 shows a schematic view of the optical element driving mechanism and a lens module according to an embodiment of the present disclosure.

Please refer to FIG. 99, the optical element driving mechanism 9-100 carries an optical element 9-110. A lens module 9-200 may be disposed outside of the optical element driving mechanism 9-100. The lens module 9-200 is located at the downstream of the light entry of the optical element driving mechanism 9-100. A light 9-L incident to the optical element 9-110 of the optical element driving mechanism 9-100 along a first direction 9-D1, and then reflected by the optical element 9-110 to pass through the lens module 9-200 along a second direction 9-D2 that is not parallel to (or perpendicular to) the first direction 9-D1 for imaging.

Figure 100:
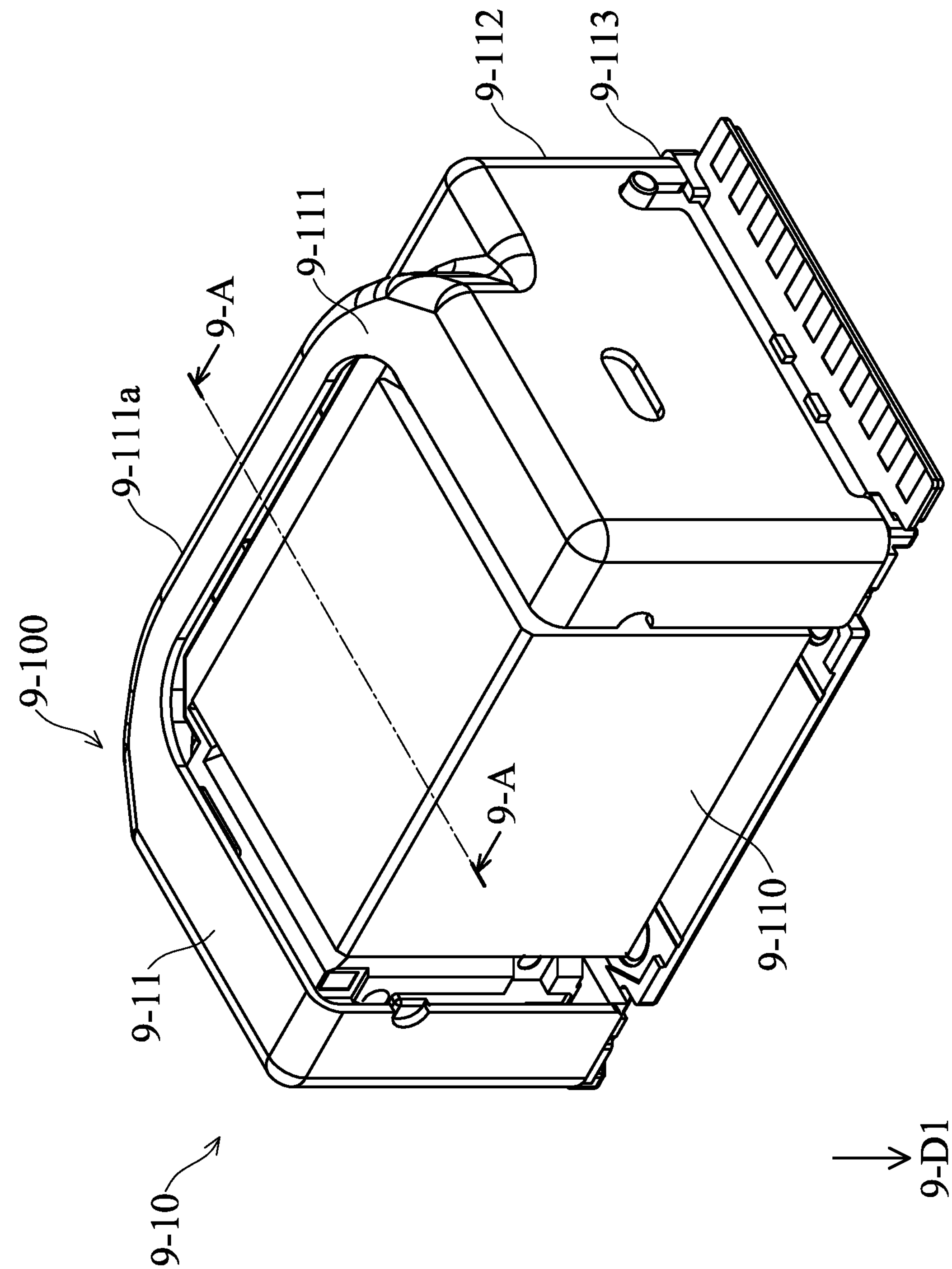
FIG. 100 shows a perspective view of the optical element driving mechanism and an optical element according to an embodiment of the present disclosure.
Figure 101:
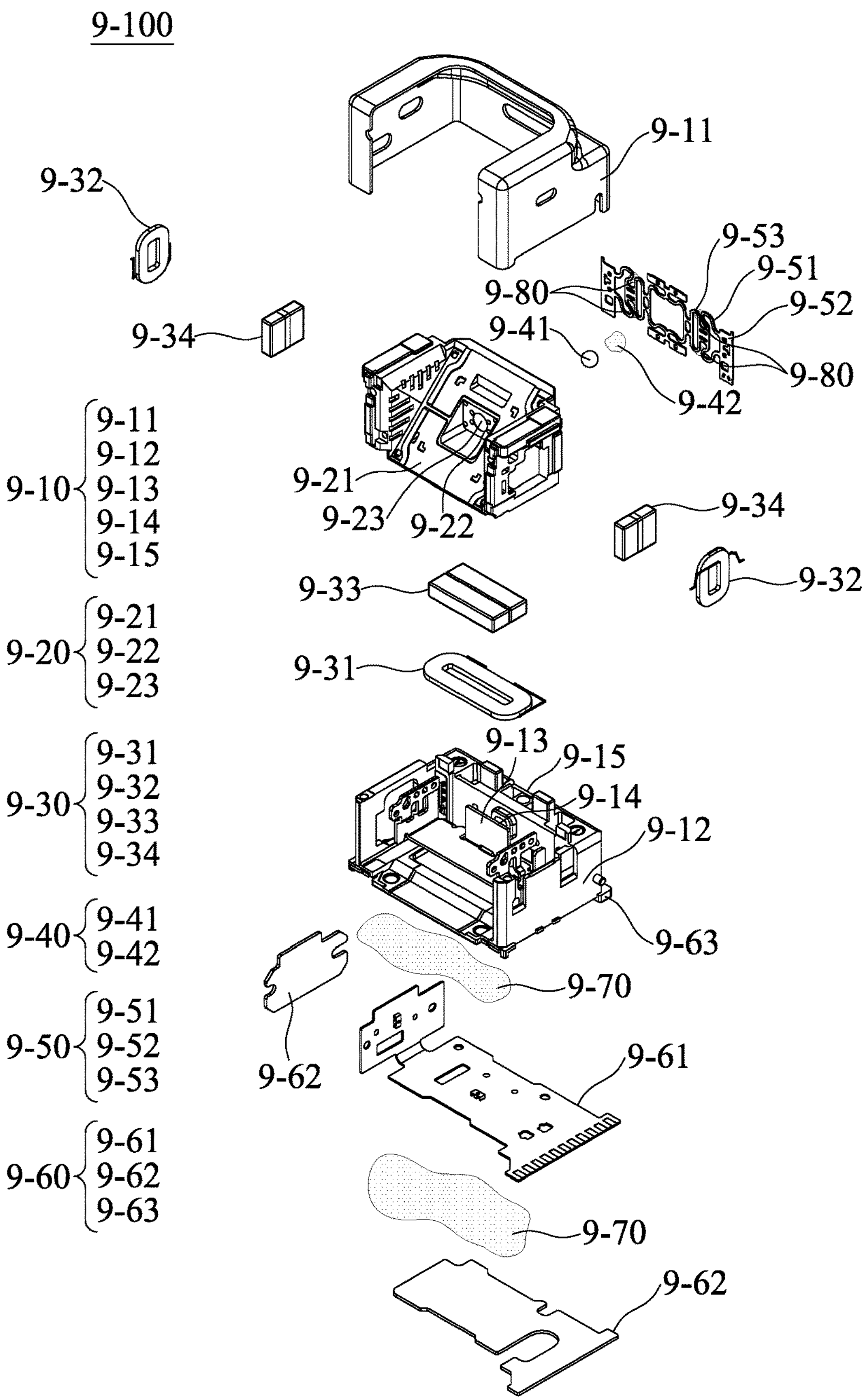
FIG. 101 shows an exploded view of the optical element driving mechanism according to an embodiment of the present disclosure.

Please refer to FIG. 100 and FIG. 101, the optical element driving mechanism 9-100 includes a fixed part 9-10, a movable part 9-20, a driving assembly 9-30, a supporting assembly 9-40, an elastic assembly 9-50, a circuit assembly 9-60, a plurality of adhering elements 9-70 and a plurality of damping elements 9-80. The movable part 9-20 is movably connected to the fixed part 9-10 via the elastic assembly 9-50. Moreover, the movable part 9-20 is movable relative to the fixed part 9-10. More specifically, the movable part 9-20 may move relative to the fixed part 9-10 in a range of motion (which will be described in detail below) via the supporting assembly 9-40.

Figure 106:
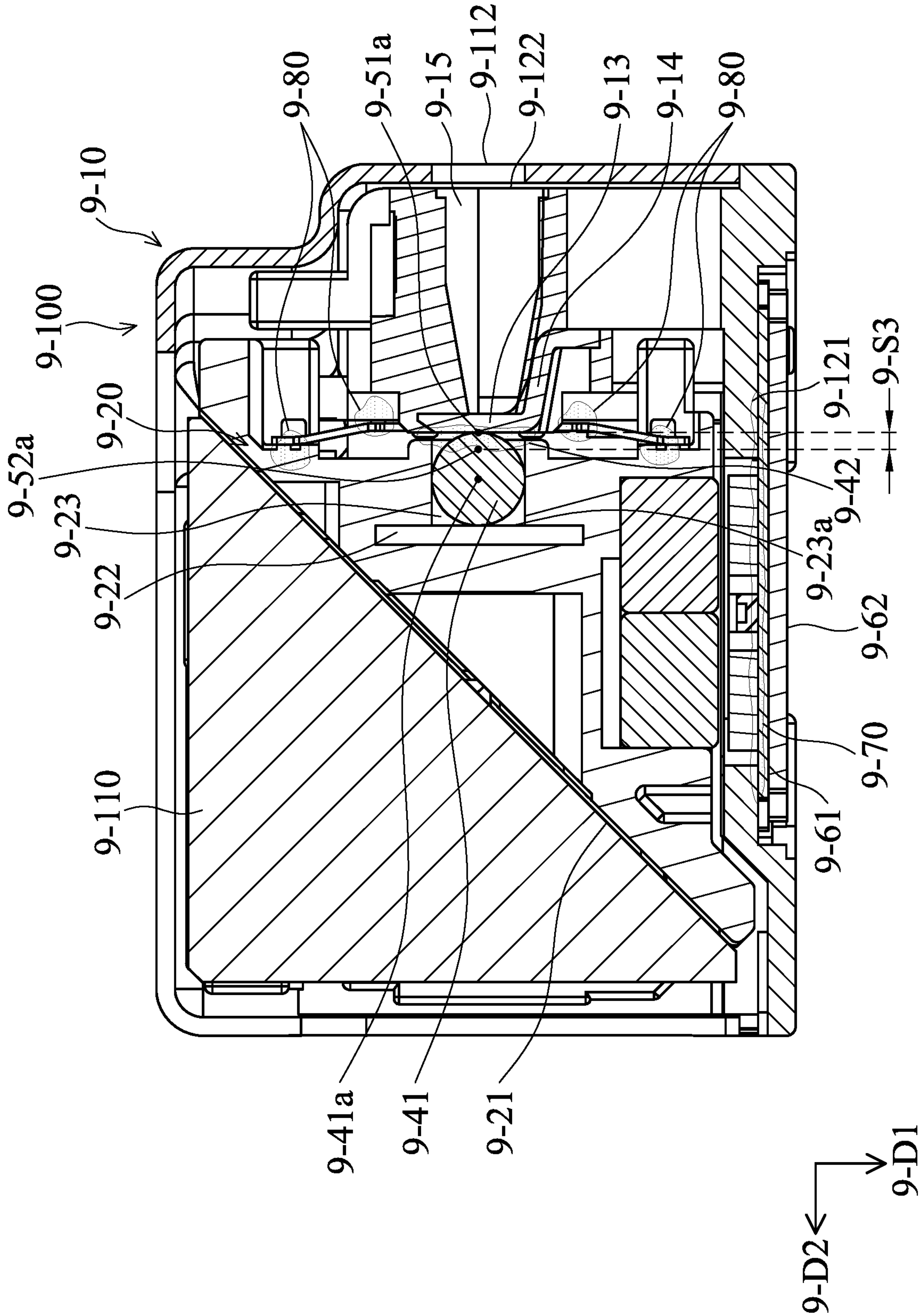
FIG. 106 shows a cross-sectional view of the optical element driving mechanism and the optical element along line 9-A-9-A of FIG. 100, according to an embodiment of the present disclosure.

The fixed part 9-10 comprises an outer frame 9-11, a base 9-12, a fixed part contacting element 9-13, a protruding structure 9-14 and a void structure 9-15 (the details are shown if FIG. 106). The movable part 9-20 includes an optical element holder 9-21, a movable part contacting element 9-22, and a recessed structure 9-23 (the details are shown if FIG. 106). The driving assembly 9-30 includes a first coil 9-31, two second coils 9-32, a first magnetic element 9-33, and two second magnetic elements 9-34. The supporting assembly 9-40 includes a fulcrum element 9-41 and a lubricating element 9-42. The elastic assembly 9-50 includes a fixed part fixing end 9-51, a movable part fixing end 9-52 and an elastic portion 9-53. The circuit assembly 9-60 includes a circuit element 9-61, two reinforcement elements 9-62, and a ground circuit 9-63.

Figure 102:
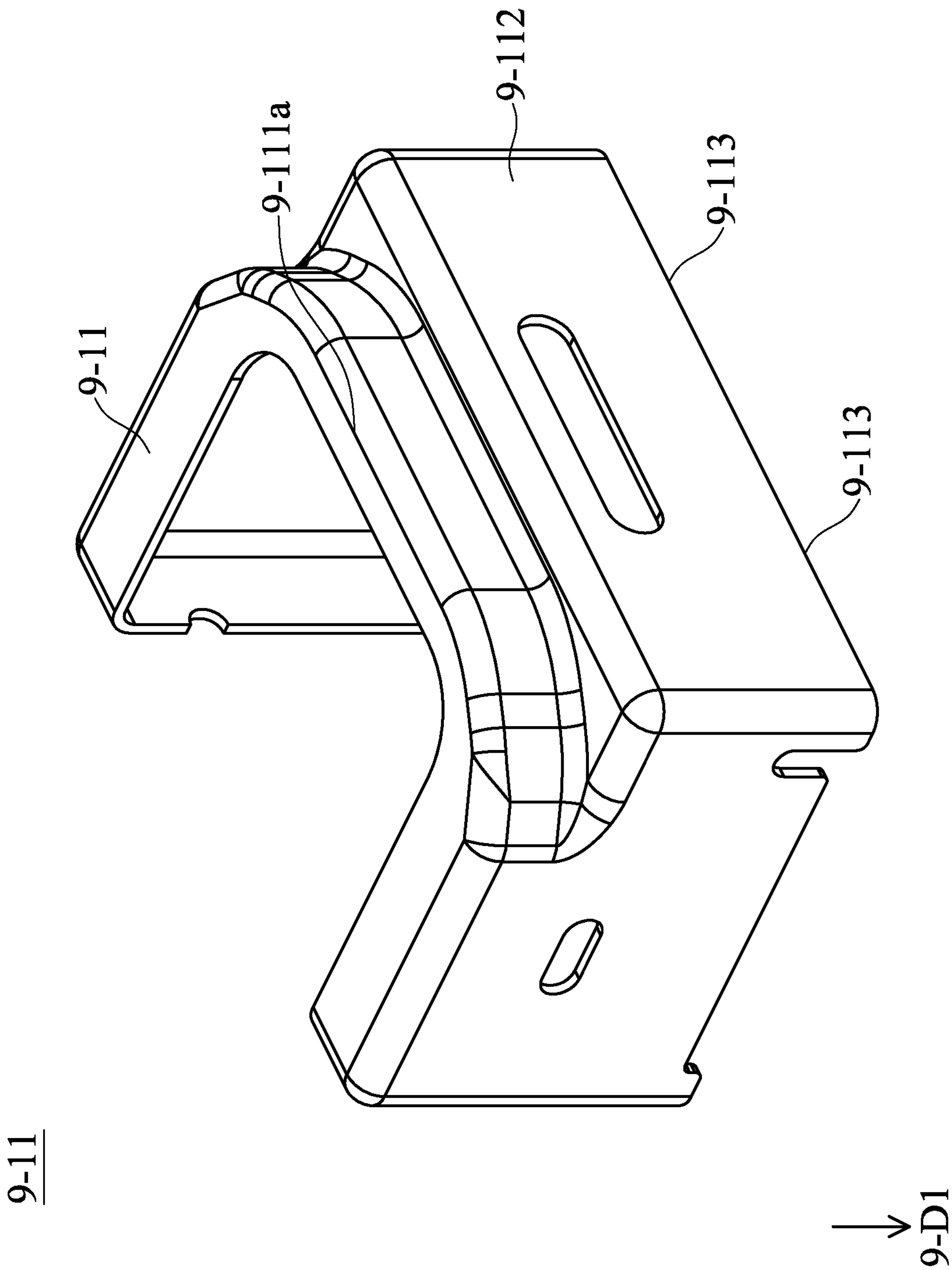
FIG. 102 shows a perspective view of an outer frame of the optical element driving mechanism according to an embodiment of the present disclosure.

Please refer to FIG. 100 and FIG. 102, the outer frame 9-11 of the fixed part 9-10 includes a top surface 9-111, an outer frame sidewall 9-112 and two outer frame connecting portions 9-113. The top surface 9-111 is not parallel to the first direction 9-D1. The outer frame sidewall 9-112 is parallel to the first direction 9-D1, and the outer frame sidewall 9-112 extends from an edge 9-111*a* of the top surface 9-111. The outer frame connecting portion 9-113 has a plate-like structure, and the outer frame connecting portion 9-113 is located on the outer frame sidewall 9-112.

Figure 103:
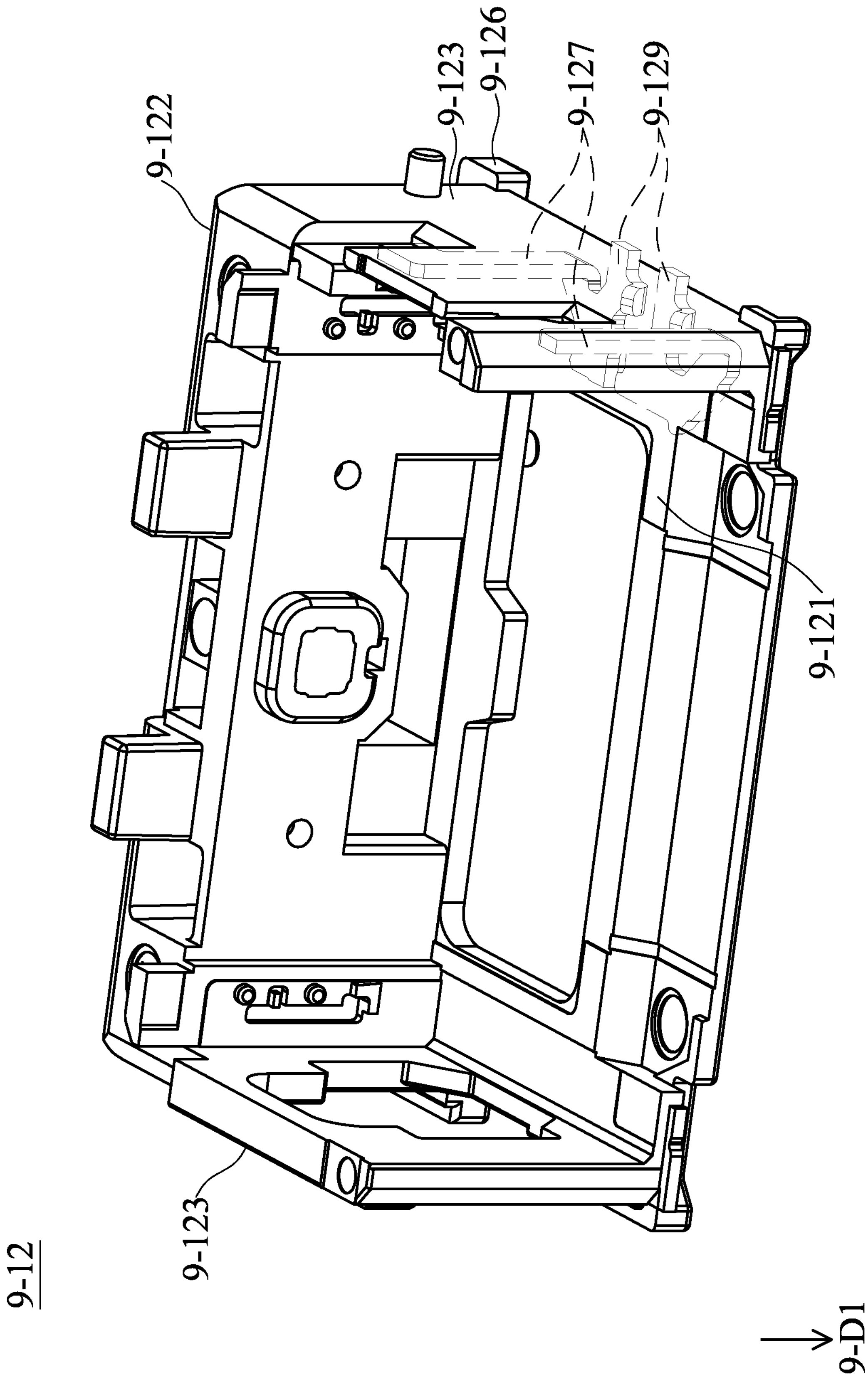
FIG. 103 shows a perspective view of a base of the optical element driving mechanism according to an embodiment of the present disclosure.
Figure 104:
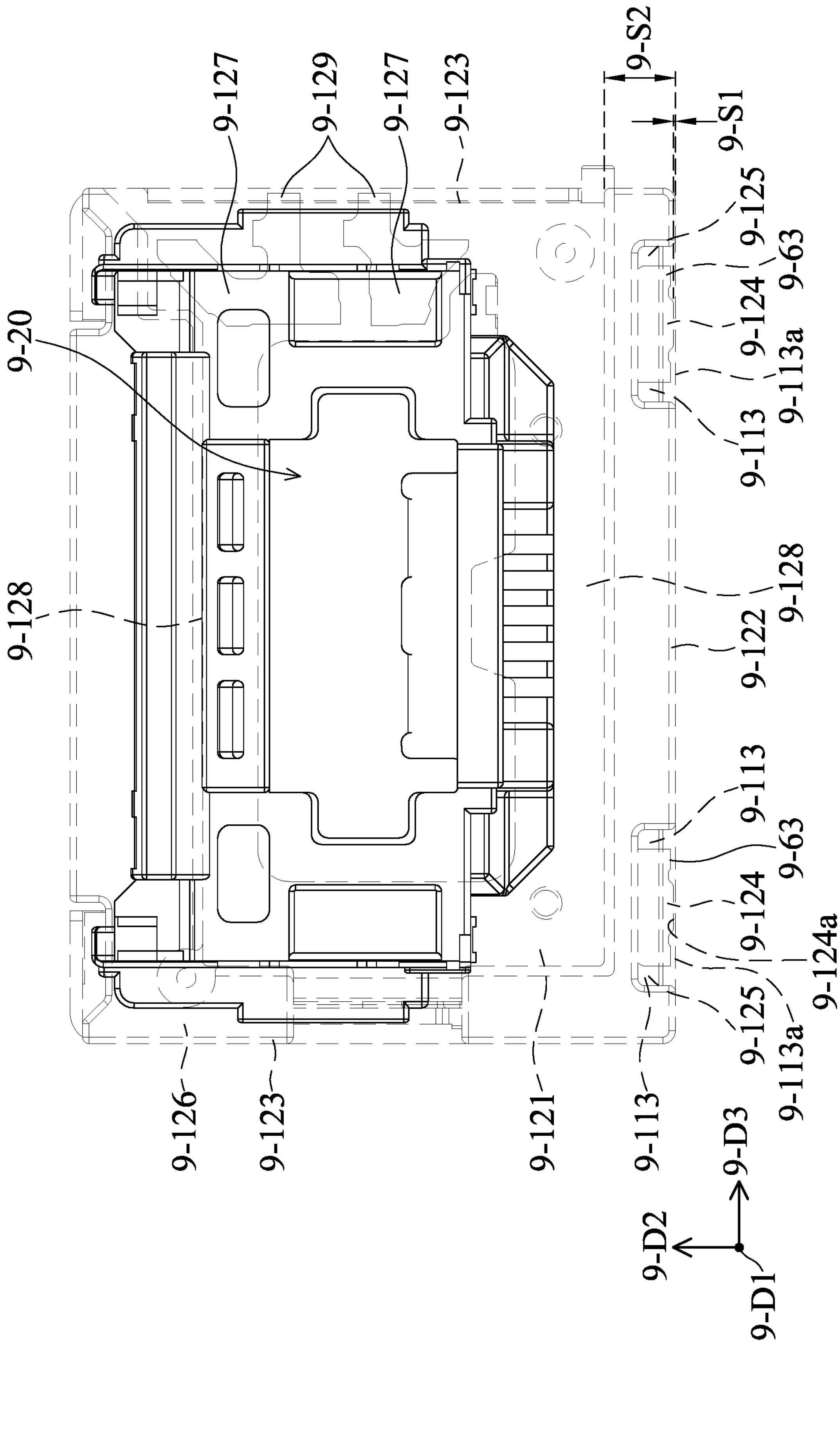
FIG. 104 shows a bottom view of the outer frame, the base, and a ground circuit of the optical element driving mechanism according to an embodiment of the present disclosure, wherein the outer frame is shown as a dash-line.

Please refer FIG. 103 and FIG. 104, the base 9-12 of the fixed part 9-10 includes a bottom plate 9-121, a first base sidewall 9-122, two second base sidewall 9-123, two base connecting portions 9-124, two base connecting portion recesses 9-125, a base outer periphery 9-126, a base electrical connection portion 9-127, two glue overflow grooves 9-128, and a circuit member 9-129.

The bottom plate 9-121 is not parallel to the first direction 9-D1, and the bottom plate 9-121 has a plastic material. The first base sidewall 9-122 and the second base sidewall 9-123 are parallel to the first direction 9-D1, and they extend from the bottom plate 9-121. Further, the first base sidewall 9-122 is substantially perpendicular to the second base sidewalls 9-123. Since the outer frame sidewall 9-112 is also parallel to the first direction 9-D1, therefore, the first base sidewall 9-122 is parallel to the outer frame sidewall 9-112, the first base sidewall 9-122 is closer to the movable part 9-20 than the outer frame sidewall 9-112 when viewed along the first direction 9-D1.

The base connecting portion 9-124 has a plate-like structure. The base connecting portion 9-124 is located on the bottom plate 9-121, and the base connecting portion 9-124 is at least partially embedded in the bottom plate 9-121. The base connecting portion 9-124 is disposed in the base connecting portion recess 9-125. The base connecting portion 9-124 does not reveal to the base connecting portion recess 9-125 when view along a third direction 9-D3 that is perpendicular to the first direction 9-D1 and the second direction 9-D2. The outer frame connecting portion 9-113 covers the base connecting portion 9-124 when viewed along the first direction 9-D1. In one embodiment, the outer frame connecting portion 9-113 is fixedly connected to the base connecting portion 9-124, and the outer frame connecting portion 9-113 is not parallel to the base connecting portion 9-124. In one embodiment, the outer frame connecting portion 9-113 is perpendicular to the base connecting portion 9-124 (may refer to FIG. 105), and the outer frame connecting portion 9-113 is fixedly connected to the base connecting portion 9-124 via welding. Thus, the structure of the optical element driving mechanism 9-100 may be intensified.

Please refer to FIG. 104, a base connecting portion boundary 9-124*a* of the base connecting portion 9-124 is located between an outer frame connecting portion boundary 9-113*a* of the outer frame connecting portion 9-113 and the movable part 9-20 when viewed along the first direction 9-D1. A shortest distance 9-S1 between the base connecting portion 9-124 and the outer frame connecting portion 9-113 is shorter than a shortest distance 9-S2 between the bottom plate 9-121 and the outer frame connecting portion 9-113, and this structure may improve the assembling accuracy of the base and the outer frame and may make the base connecting portion and the outer frame connecting portion contact reliably, so as to improve the welding accuracy and strength.

Figure 105:
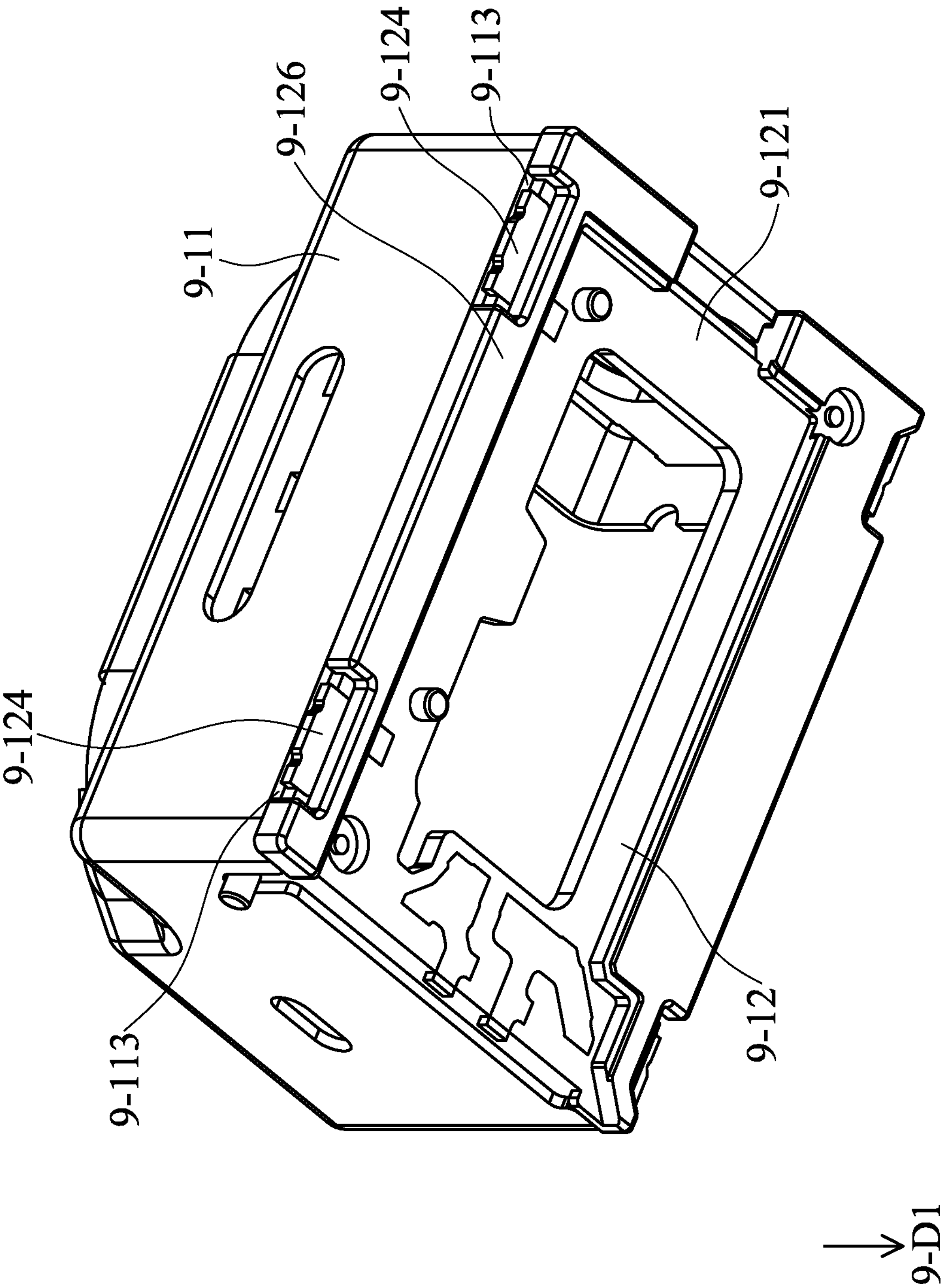
FIG. 105 shows a perspective view of the outer frame and the base of the optical element driving mechanism according to an embodiment of the present disclosure.

Please refer to FIG. 105, the base outer periphery 9-126 surrounds the bottom plate 9-121. Moreover, the base connecting portion 9-124 is higher than the base outer periphery 9-126 when viewed along a direction that is perpendicular to the first direction 9-D1. The base electrical connection portion 9-127 is embedded in the second base sidewall 9-123 of the base 9-12 (FIG. 103).

Please refer to FIG. 106, in one embodiment, the fixed part contacting element 9-13 may have a plate-like structure, and the fixed part contacting element 9-13 has a metal material. The protruding structure 9-14 extends along the second direction 9-D2 and is connected to the fixed part contacting element 9-13. The void structure 9-15 may extend along the second direction 9-D2. The void structure 9-15 corresponds to the fixed part contacting element 9-13. That is, the void structure 9-15 extends from the first base sidewall 9-122 to the fixed part contacting element 9-13. The void structure 9-15 may be helpful to position and fix of the fixed part contacting element 9-13 and may reduce the weight of the optical element driving mechanism 9-100, thereby miniaturizing optical element driving mechanism 9-100.

The movable part 9-20 is in contact with and is connected to the optical element 9-110. Specifically, the optical element holder 9-21 of the movable part 9-20 carries and is connected to the optical element 9-110. The optical element holder 9-21 may have any shape that is suitable for carrying and connecting to the optical element 9-110. For example, the optical element holder 9-21 may be a surface having a recess (may refer to FIG. 101).

The movable part contacting element 9-22 of the movable part 9-20 may have a plate-like structure and have a metal material. The movable part contacting element 9-22 may correspond to the fixed part contacting element 9-13. The recessed structure 9-23 of the movable part 9-20 has a recessed structure surface 9-23*a*. The recessed structure surface 9-23*a* is recessed along the second direction 9-D2 and is perpendicular to the second direction 9-D2. That is, the recessed structure surface 9-23*a* faces the fixed part 9-10.

Figure 107:
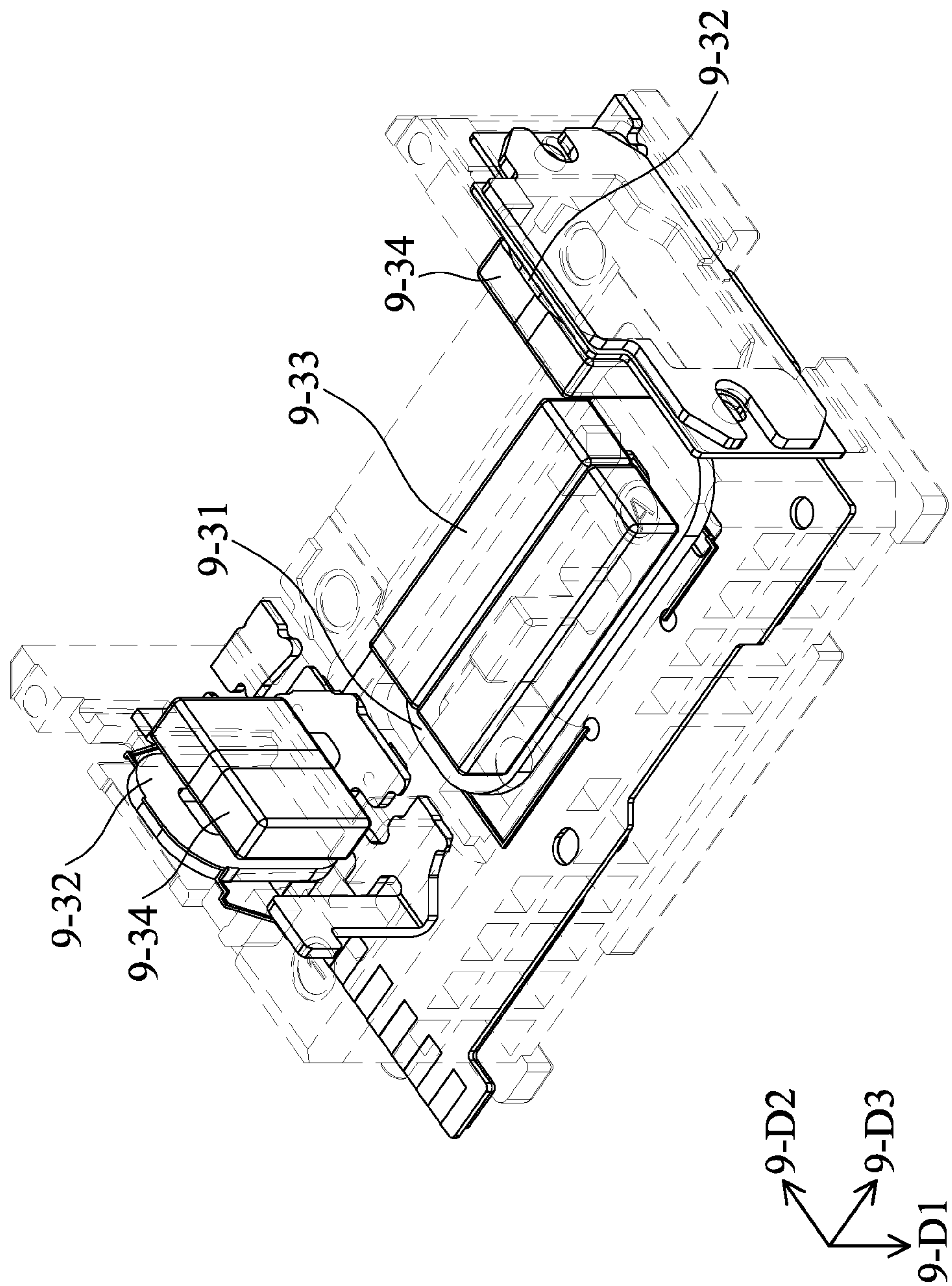
FIG. 107 shows a perspective view of the base, a driving assembly, and a circuit element of the optical element driving mechanism according to an embodiment of the present disclosure, wherein the base is shown as a dash-line.

Please refer to FIG. 107, the first coil 9-31 of the driving assembly 9-30 corresponds to the first magnetic element 9-33, and the second coil 9-32 corresponds to the second magnetic element 9-34. The first coil 9-31 may interact with the magnetic field of the first magnetic element 9-33 and generate electromagnetic driving force to drive the optical element holder 9-21 of the movable part 9-20 and the optical element 9-110 to move about the first direction 9-D1. The second coil 9-32 may interact with the magnetic field of the second magnetic element 9-34 and generate electromagnetic driving force to drive the optical element holder 9-21 of the movable part 9-20 and the optical element 9-110 to move about the third direction 9-D3. Therefore, the optical element holder 9-21 of the movable part 9-20 and the optical element 9-110 may move in the range of motion (about the first direction 9-D1 or about the third direction 9-D3). The first coil 9-31 includes a first lead 9-311, and the second coil 9-32 includes a second lead 9-321, which will be described later.

Please return to FIG. 106, the fulcrum element 9-41 of the supporting assembly 9-40 is located between the fixed part 9-10 and the movable part 9-20. The fulcrum element 9-41 is disposed on the protruding structure 9-14 of the fixed part 9-10, and the fulcrum element 9-41 is at least partially disposed in the recessed structure 9-23 of the movable part 9-20. Specifically, the fulcrum element 9-41 is disposed between the protruding structure 9-14 and the recessed structure 9-23. A center 9-41*a* of the fulcrum element 9-41 overlaps the recessed structures 9-23 when viewed along the first direction 9-D1. Moreover, the movable part 9-20 and the fulcrum element 9-41 at least partially overlap when viewed along the second direction 9-D2. Thus, the fulcrum element 9-41 may be as close as possible to the movable part 9-20. With this structure, the position of the rotating axis is closer to the movable part, so that the optical quality will not be degraded (such as image distortion or chromatic dispersion) due to the rotating axis is too far from the optical element when rotating, and the accuracy of the position sensing can be improved, so that driving accuracy is increased.

The fulcrum element 9-41 is in direct contact with the fixed part 9-10 and the movable part 9-20. In one embodiment, the fulcrum element 9-41 is fixedly connected to the movable part 9-20 and is movable relative to the fixed part 9-10. In one embodiment, the fulcrum element 9-41 is fixedly connected to the fixed part 9-10 and is movable relative to the movable part 9-20. Specifically, the fulcrum element 9-41 is in direct contact with the fixed part contacting element 9-13 and the movable part contacting element 9-22. In one embodiment, the lubricating element 9-42 is provided between the fulcrum element 9-41 and the fixed part 9-10 (specifically, the fixed part contacting element member 9-13). Therefore, in the foregoing embodiment, the lubricating element 9-42 is in direct contact with the fixed part 9-10, and the lubricating element 9-42 is in direct contact with the fulcrum element 9-41 and the fixed part contacting element 9-13. In one embodiment, the lubricating element 9-42 is provided between the fulcrum element 9-41 and the movable part 9-20 (specifically, the movable part contacting element 9-22) (not shown in the figure). Therefore, in the foregoing embodiment, the lubricating element 9-42 is in direct contact with the movable part 9-20, and the lubricating element 9-42 is in direct contact with the fulcrum element 9-41 and the movable part contacting element 9-22.

Figure 108:
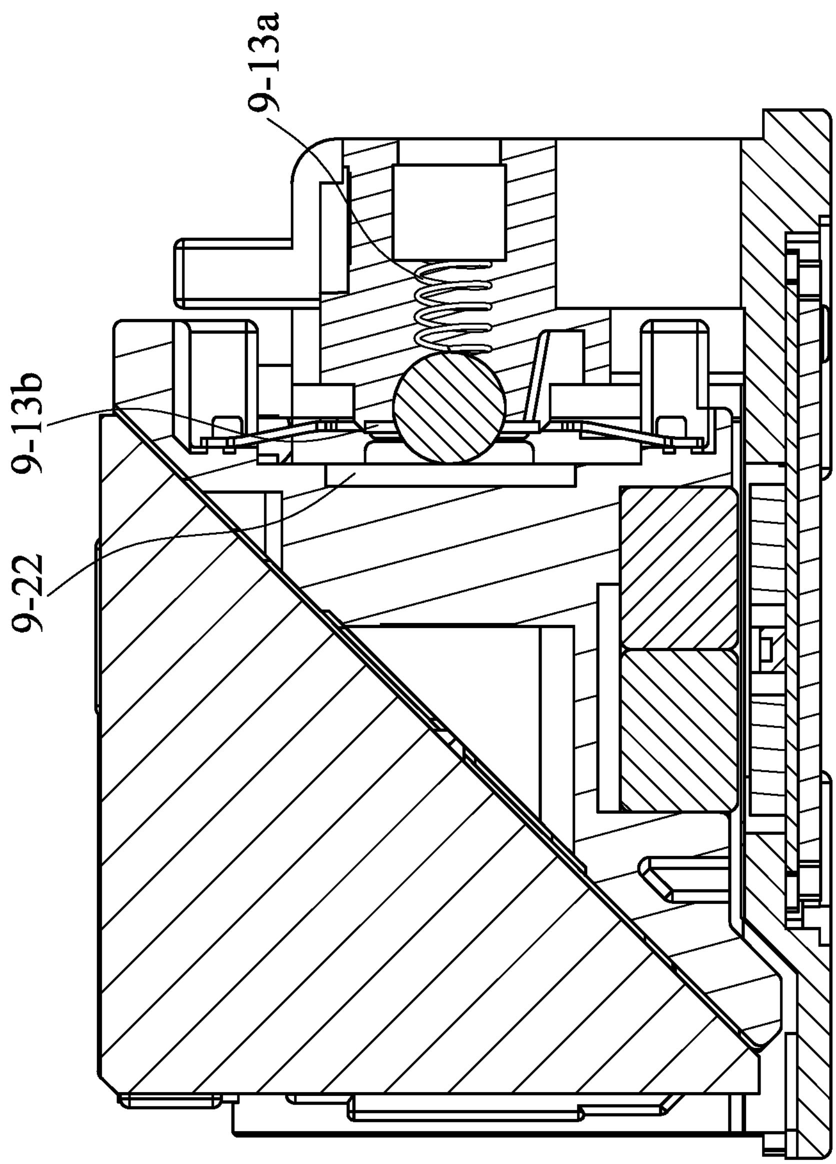
FIG. 108 shows a cross-sectional view of the optical element driving mechanism and the optical element along line 9-A-9-A of FIG. 100, according to another embodiment of the present disclosure.

As shown in FIG. 108, in one embodiment, the fixed part contacting element 9-13 may include a spring 9-13*a* and a ring 9-13*b*. The spring 9-13*a* may press the fulcrum element 9-41 against the ring 9-13*b*, so that the fulcrum element 9-41 in in contact with the movable part contacting element 9-22 of the movable part 9-20.

Please return to FIG. 106, Since the fulcrum element 9-41 has a spherical structure (that is, the fulcrum element 9-41 has an arc-shaped surface), the fulcrum element 9-41 is movable (or rotatable) relative to the fixed part 9-10 (the fixed part contacting element 9-13) or the movable part 9-20 (the moving part contacting element 9-22). Thus, the optical element holder 9-21 of the movable part 9-20 and the optical element 9-110 may move in the range of motion (as described above, move about the first direction 9-D1 or move about the third direction 9-D3).

Figure 109:
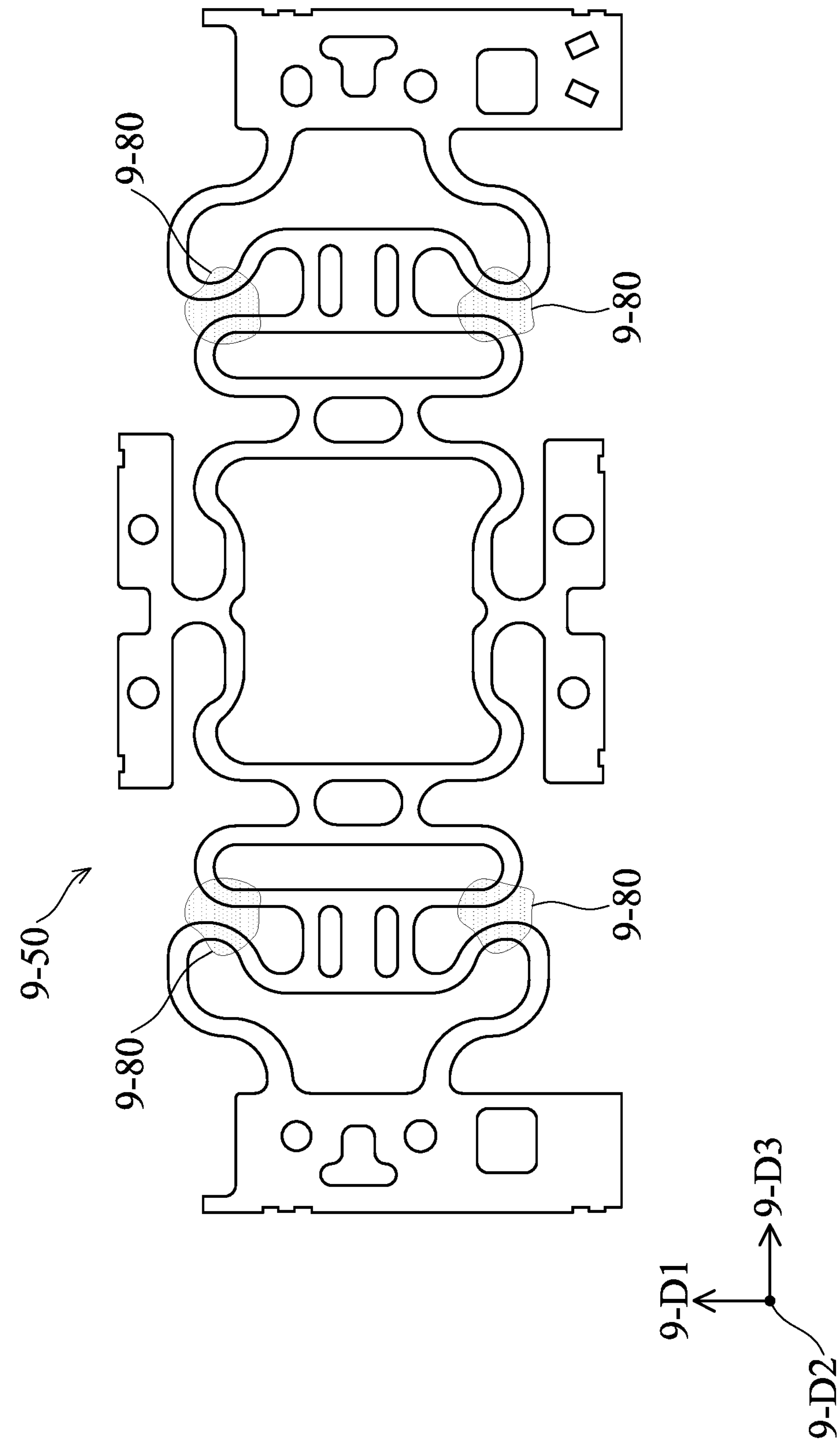
FIG. 109 shows a schematic view of an elastic assembly and a damping element of the driving assembly of the optical element driving mechanism according to an embodiment of the present disclosure.

Please refer to FIG. 106 and FIG. 109, the elastic assembly 9-50 has a plate-like structure, and the elastic assembly 9-50 is perpendicular to the second direction 9-D2. An extending direction (for example, may be the first direction 9-D1, or the third direction 9-D3) of the elastic assembly 9-50 is parallel to the recessed structure surface 9-23*a*. The damping element 9-80 may be disposed between the fixed part 9-10 and the elastic assembly 9-50. The damping element 9-80 may be disposed between the movable part 9-20 and the elastic assembly 9-50. The elastic assembly 9-50 is prevented from striking the fixed part 9-10 or the movable part 9-20 to cause damage when the elastic assembly 9-50 is moving.

The fixed part fixing end 9-51 of the elastic assembly 9-50 is fixedly connected to the fixed part 9-10, and the movable part fixing end 9-52 of the elastic assembly 9-50 is fixedly connected to the movable part 9-10. The movable part fixing end 9-52 is movable relative to the fixed part fixing end 9-51 via the elastic portion 9-53. The fixed part fixing end 9-51 does not overlap the movable part fixing end 9-52 when viewed along the first direction 9-D1. In other words, in a direction that is perpendicular to the elastic assembly 9-50 (for example, may be the second direction 9-D2), a gap 9-S3 between a center 9-51*a* of the fixed part fixing end 9-51 and a center 9-52*a* of the movable part fixing end 9-52 is greater than zero. As a result, the elastic assembly 9-50 may have a pre-pressure to push the fulcrum element 9-41 toward the movable part 9-20 to ensure that the fulcrum element can reliably contact the movable part in any circumstance.

Figure 110:
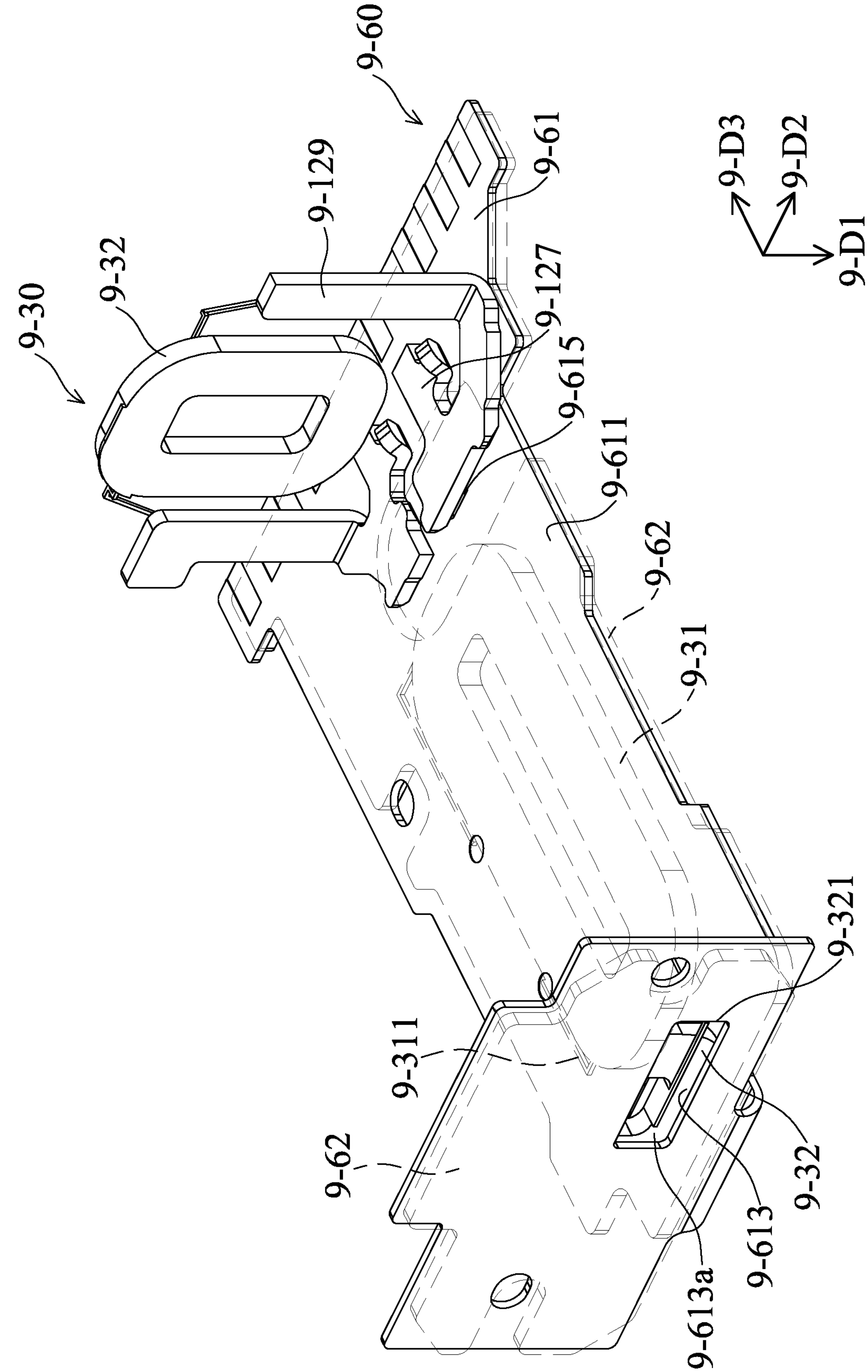
FIG. 110 shows a schematic view of a first coil, a second coil, the circuit element, and a reinforcement element of the optical element driving mechanism according to an embodiment of the present disclosure, wherein the first coil, the second coil and the reinforcement element are shown as dash-lines.
Figure 111:
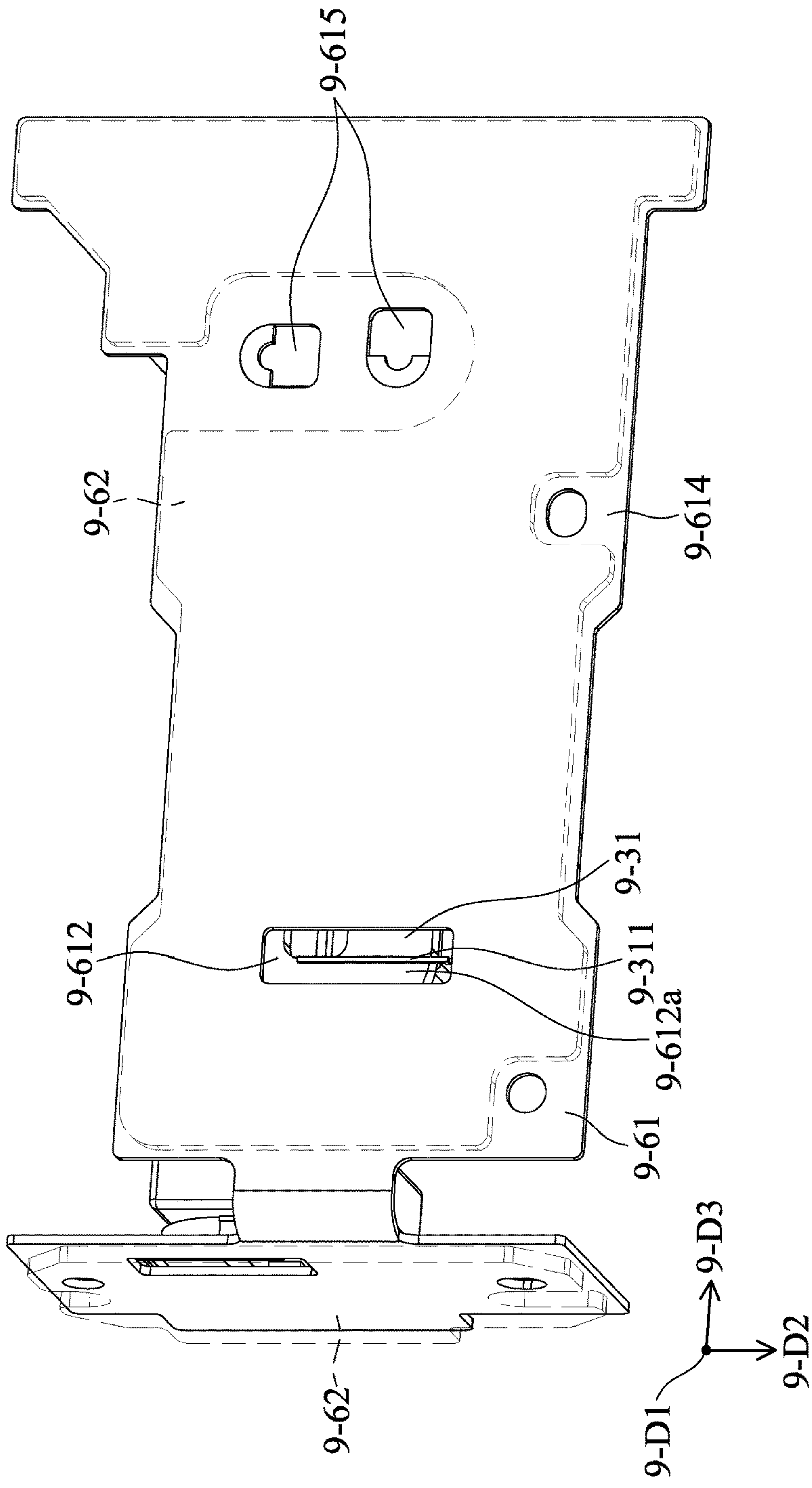
FIG. 111 shows a schematic view of the circuit element and the reinforcement element of the optical element driving mechanism according to an embodiment of the present disclosure, wherein the reinforcement element is shown as a dash-line.

Please refer to FIG. 110 and FIG. 111, the circuit assembly 9-60 is electrically connected to the driving assembly 9-30.

The circuit element 9-61 of the circuit assembly 9-60 includes a circuit element surface 9-611, a first circuit element receiving portion 9-612, a second circuit element receiving portion 9-613, and a circuit element revealed portion 9-614 and a circuit element electrode 9-615.

Please refer to FIG. 106 again, the circuit element 9-61 is located between the reinforcement element 9-62 and the bottom plate 9-121, and the circuit element 9-61 has a plate-like structure. The circuit element 9-61 at least partially overlap the adhering element 9-70 when viewed in a direction that is perpendicular to the first direction 9-D1. Specifically, the adhering element 9-70 is provided between the circuit element 9-61 and the base 9-12 so as to fix the circuit element 9-61 on the base 9-12.

As shown in FIG. 110 and FIG. 111, the circuit element 9-61 at least partially overlap and the first lead 9-311 when viewed along an extending direction of the circuit element 9-61 (for example, may be the first direction 9-D1 or the third direction 9-D3). The first coil 9-31 may be directly electrically connected to the circuit element 9-61 of the circuit assembly 9-60.

The circuit member 9-129 is electrically connected to the circuit element 9-61. Therefore, the second coil 9-32 is electrically connected to the circuit element 9-61 of the circuit assembly 9-60 via the base electrical connection portion 9-127 and the circuit member 9-129.

The circuit element surface 9-611 of the circuit element 9-61 faces the first coil 9-31 and faces the movable part 9-20 (not shown in FIG. 108 or FIG. 109). The first coil 9-31 and the first circuit element receiving portion 9-612 is disposed on the circuit element surface 9-611. Moreover, the first circuit element receiving portion 9-612 has an opening structure 9-612*a* to receive the first lead 9-311.

The second circuit element receiving portion 9-613 and the second lead 9-321 are adjacent to the second base sidewall 9-123 (not shown in FIG. 110 and FIG. 111). The second circuit element receiving portion 9-613 corresponds to the second lead 9-321. Moreover, the second circuit element receiving portion 9-613 has an opening structure 9-613*a* to receive the second lead 9-321.

The circuit element electrode 9-615 is disposed on the circuit element surface 9-611, and the first lead 9-311 is electrically connected to the circuit element electrode 9-615 to electrically connect the first coil 9-31 to the circuit element 9-61.

The reinforcement element 9-62 has a plate-like structure, and the reinforcement element 9-62 has a metal material. The reinforcement element 9-62 is fixedly disposed on the circuit element 9-61. It should be noted that the reinforcement element 9-62 does not have a magnetically conductive material to avoid adverse effects on the circuit element 9-61 or the electromagnetic driving assemblies.

Please return to FIG. 104, the base connecting portions 9-124 is electrically connected to the ground circuit 9-63 to ground the optical element driving mechanism 9-100.

Figure 112:
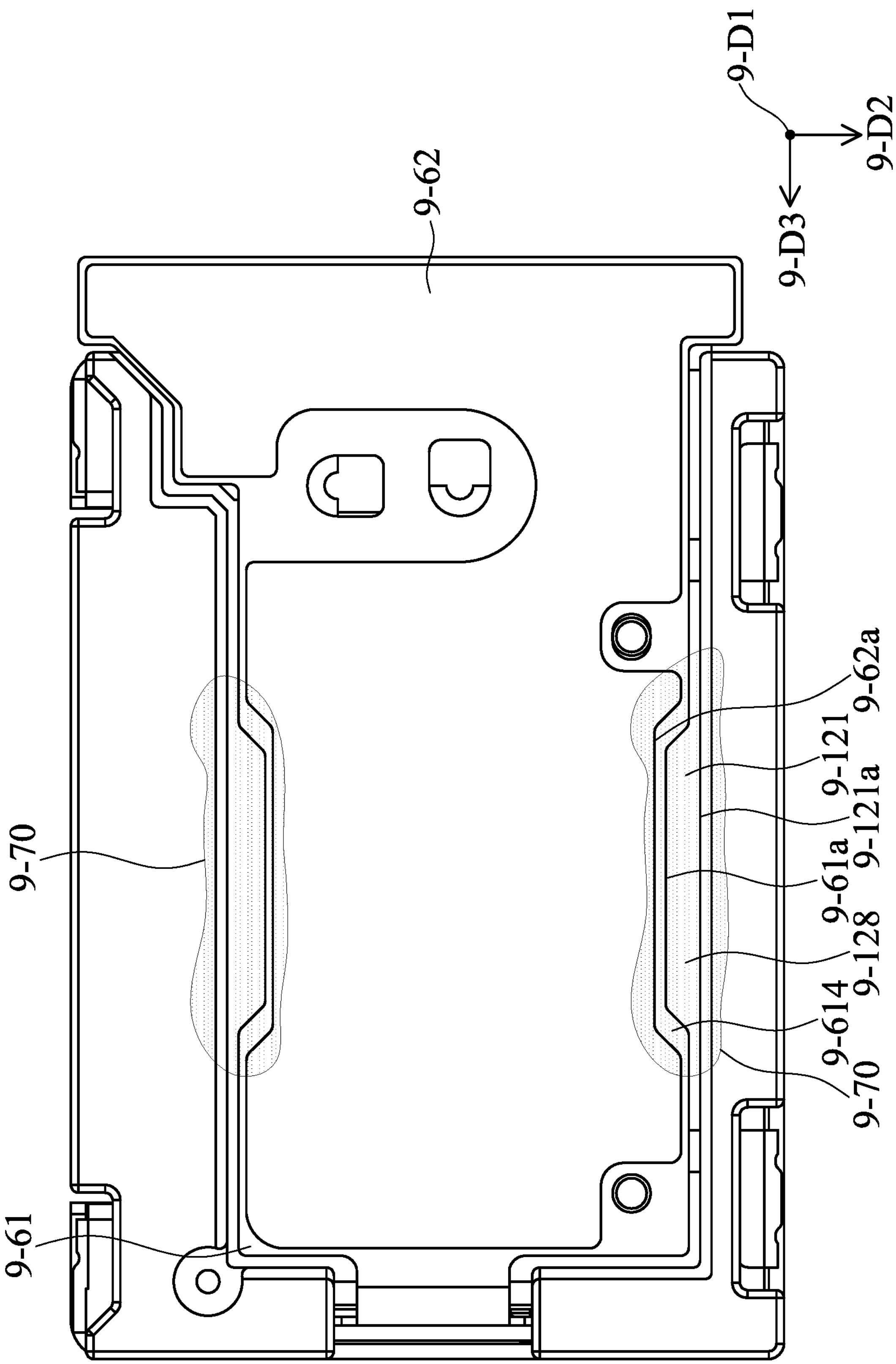

Please refer to FIG. 112, the bottom plate 9-121 of the base 9-12 is partially revealed to the circuit element 9-61 when viewed along the first direction 9-D1. The circuit element revealed portion 9-614 is revealed to the reinforcement element 9-62. The circuit element revealed portion 9-614 is covered by the adhering element 9-70 when viewed along the first direction 9-D1. A circuit element boundary 9-61*a* of the circuit element 9-61 is located between a reinforcement element boundary 9-62*a* of the reinforcement element 9-62 and a bottom plate boundary 9-121*a* of the bottom plate 9-121 when view along the first direction 9-D1. The bottom plate boundary 9-121*a* is located on the overflow groove 9-128 and the overflow groove 9-128 may limit the disposed range of the adhering element 9-70. The adhering element 9-70 is in direct contact with the reinforcement element boundary 9-62*a*, the circuit element boundary 9-61*a* and the bottom plate boundary 9-121*a*. Thus, the structural strength of the optical element driving means 9-100 may be enhanced.

In summary, the movable part 9-20 of the optical element driving mechanism 9-100 of the present disclosure may move relative to the fixed part 9-10 via the fulcrum element 9-41. In this way, the movable part 9-20 and the optical element 9-110 may move relative to the fixed part 9-10 more smoothly. Moreover, a better imaging effect may be achieved by driving the optical element 9-110. Furthermore, since the fulcrum element 9-41 has a spherical structure, the supporting assembly 9-40 of the optical element driving mechanism 9-100 may be minimized, thereby achieving the effect of miniaturizing the optical element driving mechanism 9-100.

Figure 114:
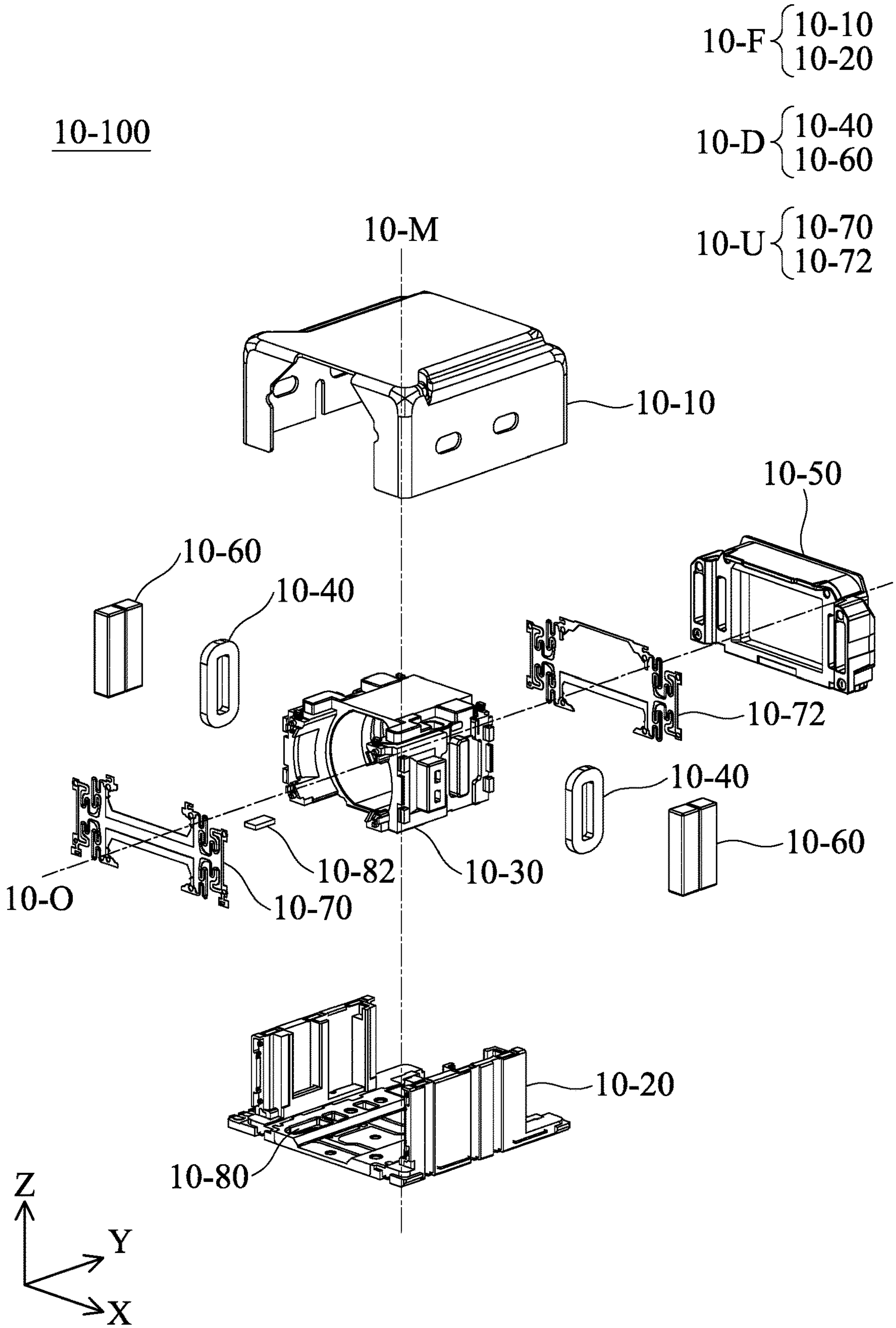
Figure 116:
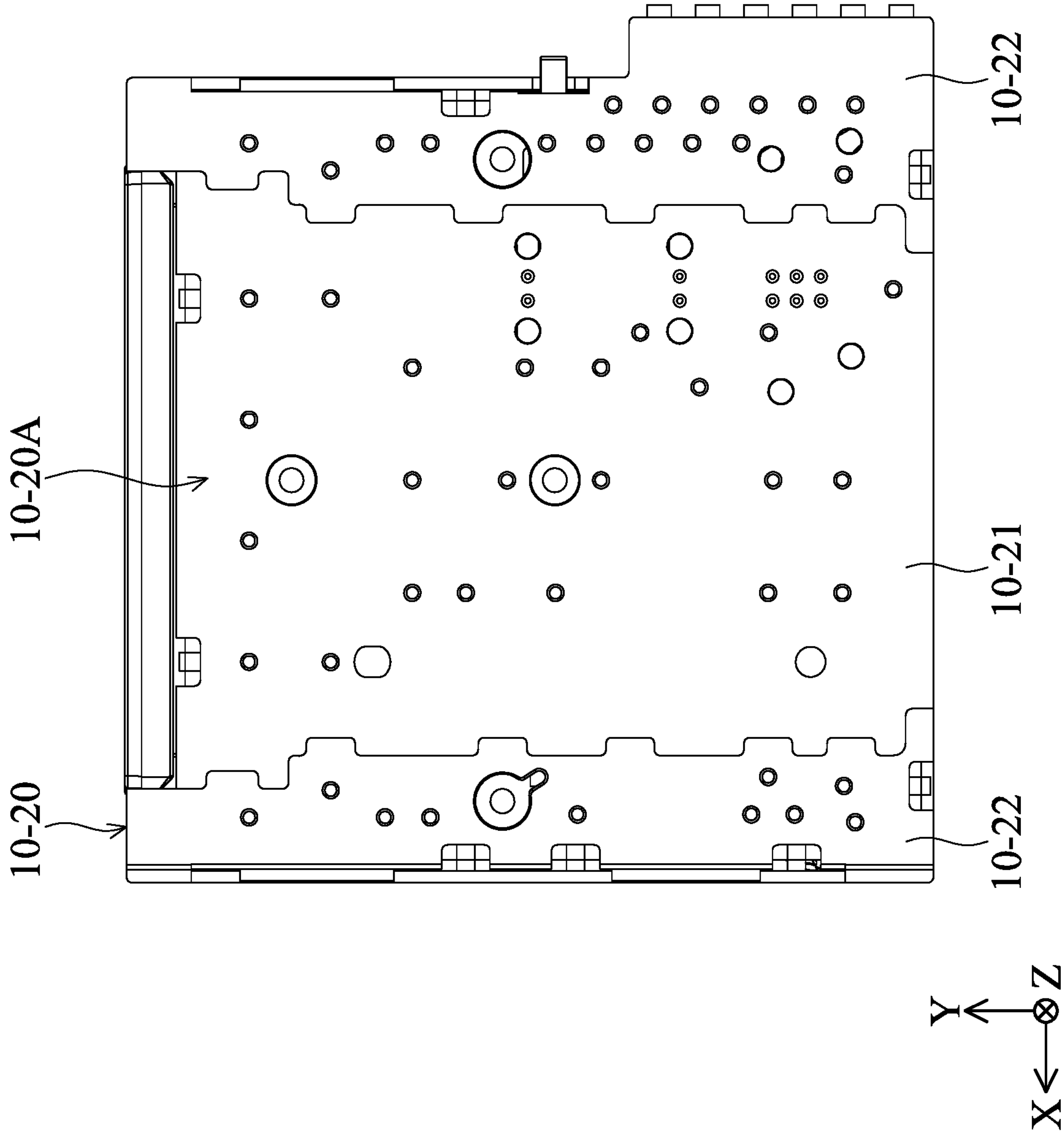
Figure 117:
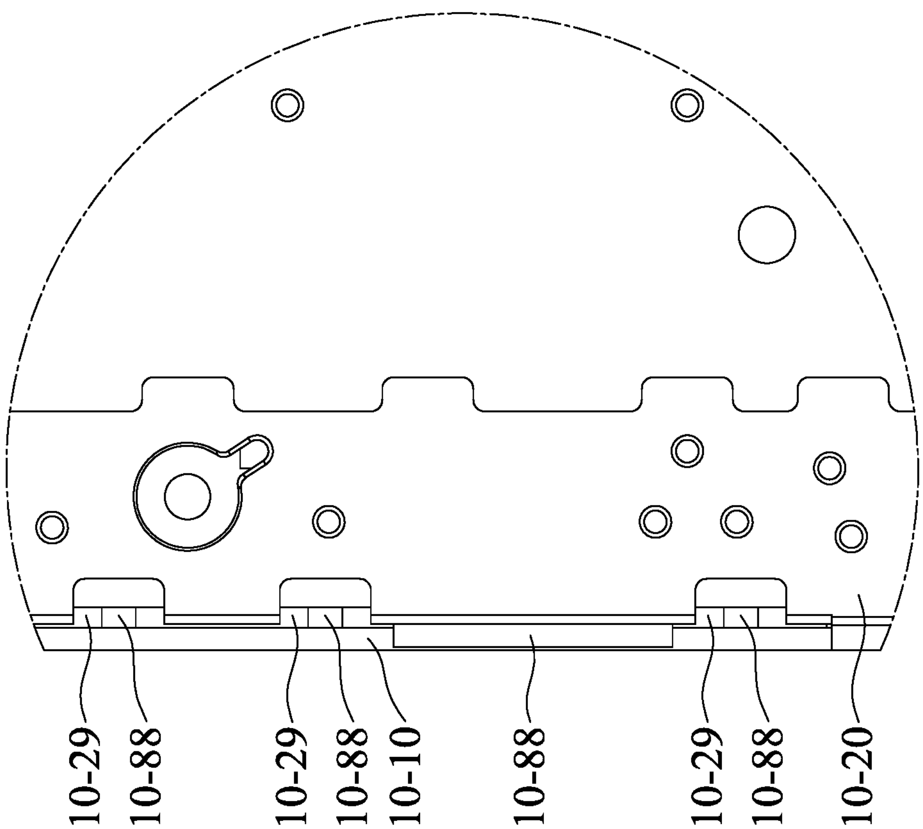

Referring to FIG. 113 to FIG. 117. FIG. 113 is a perspective view of an optical element driving mechanism 10-100 in some embodiments of the present disclosure. FIG. 114 is an exploded view of the optical element driving mechanism 10-100. FIG. 115 is a top view of the optical element driving mechanism 10-100. FIG. 116 is a bottom view of the optical element driving mechanism. FIG. 117 is an enlarged view of FIG. 116.

The optical element driving mechanism 10-100 may mainly include a case 10-10, a bottom 10-20, a movable portion 10-30, a coil 10-40, a frame 10-50, a magnetic element 10-60, a first resilient element 10-70, a second resilient element 10-72, and an electronic assembly 10-80. The optical element driving mechanism 10-100 may use for driving an optical element to move to achieve auto focus or optical image stabilization.

FIG. 118, FIG. 119, FIG. 120, FIG. 121, and FIG. 122 are cross-sectional views illustrated along lines 10-A-10-A, 10-B-10-B, 10-C-10-C, 10-D-10-D in FIG. 115 and a line 10-E-10-E in FIG. 113. FIG. 123 is a schematic view of some elements of the optical element driving mechanism 10-100. FIG. 124 is a top view of some elements of the optical element driving mechanism 10-100. FIG. 125 is a front view of some elements of the optical element driving mechanism 10-100. FIG. 126 is a back view of some elements of the optical element driving mechanism 10-100. FIG. 127 is an enlarged view of FIG. 124, wherein the case 10-10 is omitted to show other elements inside. FIG. 128 and FIG. 129 are schematic views of other elements of the optical element driving mechanism 10-100 viewed in different directions. FIG. 130 is a schematic view of the bottom 10-20 and some elements disposed on the bottom 10-10. FIG. 131 is an enlarged view of FIG. 130. FIG. 132 is a top view of the bottom 10-20 and some elements disposed on the bottom 10-20. FIG. 133 and FIG. 134 are schematic views of the movable portion 10-30 and the coil 10-40 viewed in different directions. FIG. 135A is a side view of the movable portion 10-30 and the coil 10-40. FIG. 135B is a top view of the movable portion 10-30 and the coil 10-40. FIG. 136 is a schematic view of the movable portion 10-30. FIG. 137 is a side view of the movable portion 10-30. FIG. 138 is an enlarged view of FIG. 136. FIG. 139 is a schematic view of some elements of the optical element driving mechanism 10-100. FIG. 140 is a schematic view of the frame 10-50. FIG. 141 is a front view of the frame 10-50.

The case 10-10 and the bottom 10-20 may be called as a fixed portion 10-F. The movable portion 10-30 is movably connected to the fixed portion 10-F. In other words, the movable portion 10-30 is movable relative to the fixed portion 10-F. Moreover, the coil 10-40 and the magnetic element 10-60 may be called as a driving assembly 10-D, which is used for driving the movable portion 10-30 to move relative to the fixed portion 10-F. The first resilient element 10-70 and the second resilient element 10-72 may be called as a support assembly 10-U, and the movable portion 10-30 can be moved relative to the fixed portion 10-F through the support assembly 10-U.

The case 10-10 may include a top wall 10-10A and side walls 10-10B extended from the sides of the top wall 10-10A. The bottom 10-20 and the case 10-10 may arrange along a main axis 10-M. As shown in FIG. 116 and FIGS. 7A to 7C, the bottom 10-20 may include walls 10-21 and a bottom plate 10-22. The walls 10-21 may extend from the sides of the bottom plate 10-22 in the Z direction, and the bottom plate 10-22 may be positioned on the XY plane. The walls 10-21 and the bottom plate 10-22 may be plate-shaped. In other words, the walls are not parallel to the bottom plate 10-22.

In some embodiments, the walls 10-21 and the bottom plate 10-22 may include different materials and different Young's modulus. For example, the Young's modulus of the bottom plate 10-22 may be greater than the Young's modulus of the walls 10-21. In some embodiments, a strengthening element 10-88 may be embedded in the bottom 10-20, such as embedded in the walls 10-21 or the bottom plate 10-22. Moreover, as shown in FIG. 117, the strengthening element may indirect contact with the case 10-10, and both of the strengthening element 10-88 and the case 10-10 may include metal. For example, at least a portion of the material of the strengthening element 10-88 may be identical to at least a portion of the material of the case 10, and the case 10-10 and the strengthening element 10-88 may be affixed with each other by soldering or welding. Furthermore, the strengthening element 10-88 may exposed from recesses 10-29 of the bottom 10-20, but not extend beyond the case 10-10 in the X direction. Therefore, the strengthening element 10-88 may be protected by the case 10-10 to prevent being collided with other external elements. Adhesive material (not shown) may be disposed in the recesses 10-29 to affix the bottom 10-20 and the case 10-10.

Moreover, as shown in FIG. 131, recesses 10-23 may be provided on the bottom 10-20, and the magnetic elements 10-60 may be disposed in the recesses 10-23. Furthermore, glue recesses 10-24A and dodge recesses 10-24B may be provided at sides of the recess 10-23. Adhesive material may be provided at the glue recesses 10-24A and the dodge recesses 10-24B to affix the magnetic elements 10-60 and the bottom 10-20. Moreover, the guiding wire of the coil 10-40 may be disposed in the dodge recesses 10-24B to protect the guiding wire of the coil 10-40.

Figure 118:
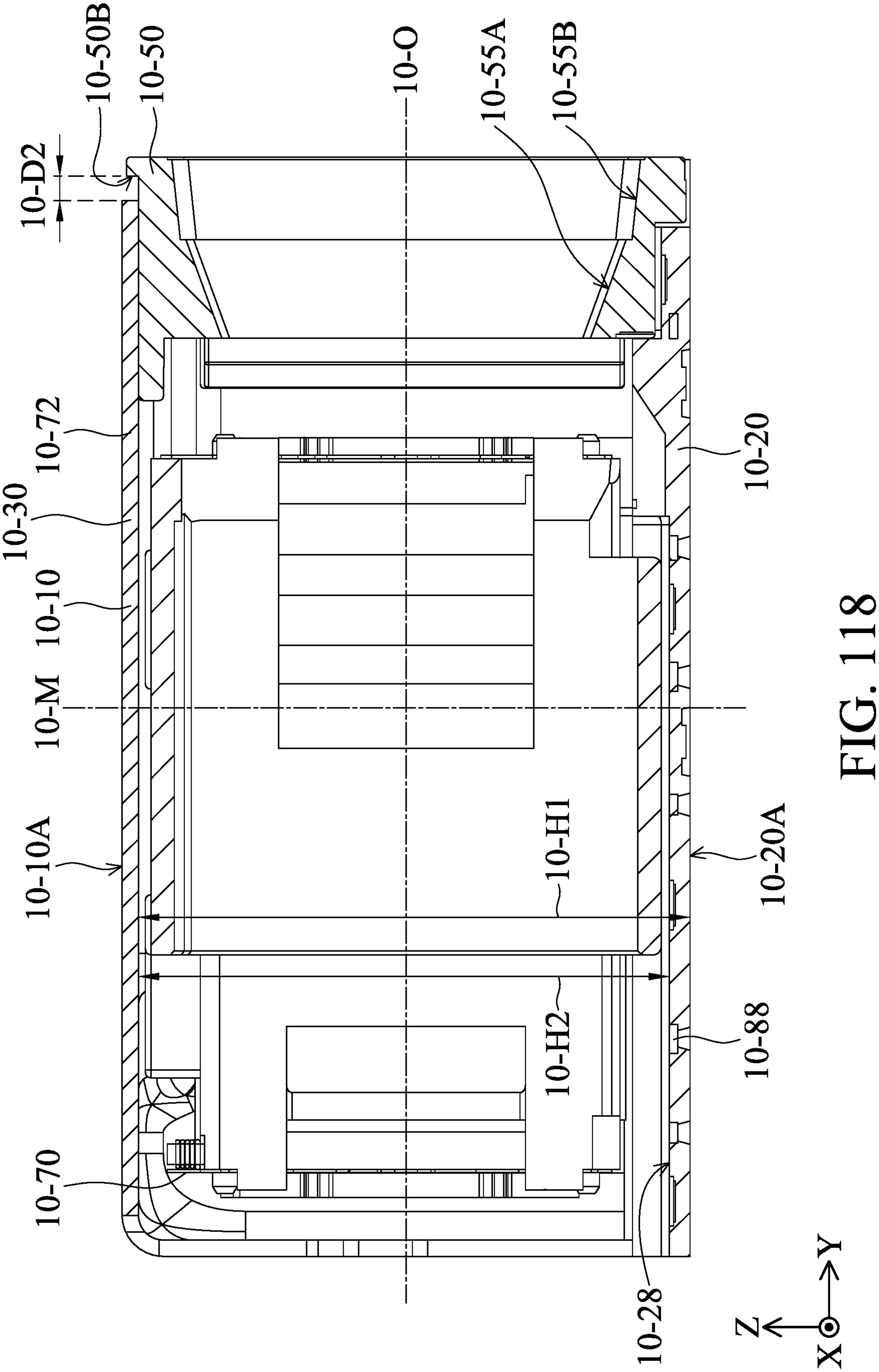

In some embodiments, as shown in FIG. 132, additional reinforcement element 10-28 may be provided on the bottom 10-20, as shown by the inclined lines. The reinforcement element 10-28 may include polymer, and may in direct contact with the strengthening element 10-88 and the bottom 10-20. The reinforcement element 10-28 is not electrically conductive, so may be used for protecting the strengthening element 10-88 to prevent short circuit. Furthermore, as shown in FIG. 116 and FIG. 118, the bottom 10-20 may include a bottom surface 10-20A that faces away from the case 10-10, and the bottom surface 10-20A may be perpendicular to the main axis 10-M, and parallel to the optical axis 10-O. In the direction of the main axis 10-M extending, the maximum distance 10-H1 between the bottom surface 10-20A and the top wall 10-10A is greater than the maximum distance 10-H2 between the reinforcement element 10-28 and the top wall 10-10A.

In some embodiments, additional circuit may be provided on the bottom 10-20. The circuit is electrically connected to other electronic elements disposed inside or outside the optical element driving mechanism 10-100 to achieve auto focus or optical image stabilization.

In some embodiments, the bottom 10-20 may be formed by multiple steps. For example, the strengthening element 10-88 may be embedded in the bottom plate 10-22 by surface mount technology (SMT). Afterwards, the walls 10-21 may be formed on sides of the bottom plate 10-22. Therefore, the material characteristic (e.g. Young's modulus) of the walls 10-21 and the bottom plate 10-22 may be different, and the deformation of the bottom 10-20 may be reduced.

In some embodiments, the main axis 10-M may be perpendicular to the optical axis 10-O. The case 10-10 and the bottom 10-20 may be combined with each other to form the shell of the optical element driving mechanism 10-100. For example, the bottom surface 10-20 may be affixed to the case 10-10. The case 10-10 has two openings, and light with the optical axis 10-O can enter the optical element driving mechanism 10-100 from the opening that is away from the frame 10-50, and then exit the optical element driving mechanism 10-100 from the opening that is closer to the frame 10-50. An image sensor (not shown) may be disposed on another side of the frame 10-50. Therefore, the optical element that is disposed in the optical element driving mechanism 10-100 may perform focus to the image sensor along the optical axis 10-O.

It should be noted that the interaction between the magnetic element 10-60 and the coil 10-40 may generate a magnetic force, and the magnetic force may move the movable portion 10-30 relative to the fixed portion 10-F along the optical axis 10-O to achieve fast focus.

In this embodiments, the movable portion 10-30 and the optical element disposed therein are movably disposed in the fixed portion 10-F. In detail, the movable portion 10-30 may connect to the bottom 10-20 and be suspended in the fixed portion 10-F through the metal support assembly 10-U (which includes the first resilient element 10-70 and the second resilient element 10-72), see FIG. 3. When current passes to the coil 10-40, the coil 10-40 may interact with the magnetic field of the magnetic element 10-60 to generate an electromagnetic force. The electromagnetic force moves the movable portion 10-30 and the optical element relative to the fixed portion 10-F along the optical axis 10-O, and auto focus is achieved. In some embodiments, the support assembly may be strip-shaped or circular.

As shown in FIG. 120, FIG. 121, FIG. 124, FIG. 127, FIG. 133, FIG. 134, FIG. 135A, and FIG. 135B, the movable portion 10-30 may include a first stopping structure 10-31 and a second stopping structure 10-32 for limiting the movable portion 10-30 to move in a movable range relative to the fixed portion 10-F. The first stopping structure 10-31 and the second stopping structure 10-32 extend in the X direction (first direction), and respectively have a first stopping surface 10-31A and a second stopping surface 10-32A that face the fixed portion (e.g. the case 10-10 or the bottom 10-20). In some embodiments, the first stopping surface 10-31A and the second stopping surface 10-32A may be parallel. As shown in FIG. 127, the first stopping surface 10-31A and the bottom 10-20 (fixed portion 10-F) has a distance 10-L1, the second stopping surface 10-32A and the bottom 10-20 (fixed portion 10-F) has a distance 10-L2, and the distance 10-L1 and the distance 10-L2 may be different.

For example, in some embodiments, the distance 10-L1 may be greater than the distance 10-L2.

Furthermore, as shown in FIG. 133 and FIG. 134, a first lightening structure 10-33 may be formed on the second stopping surface 10-32A. For example, the first lightening structure 10-33 may be a recess for reducing the weight of the movable portion 10-30, so the required force provided by the driving assembly 10-D to the movable portion 10-30 may be reduced. Therefore, the size of the driving assembly 10-D may be reduced to achieve miniaturization.

Moreover, as shown in FIG. 121, FIG. 133 to FIG. 135B, an enhance structure 10-34 is provided at the root of the second stopping structure 10-32. The enhance structure has a tilted surface relative to the second stopping surface 10-32A when viewed in a cross-sectional view, such as viewed in FIG. 121. As a result, the mechanical strength of the second stopping structure 10-32 may be further enhanced, so the second stopping structure 10-32 may be prevented from being damaged when the movable portion 10-30 is moving.

In some embodiments, the coil 10-40 may be affixed to the first stopping structure 10-31, such as winding on the first stopping structure 10-31, and then affixed to the first stopping structure 10-31 by adhesive material. Furthermore, as shown in FIG. 124, the minimum distance 10-L1 between the first stopping surface 10-31A and the bottom 10-20 (the fixed portion 10-F) is less than the minimum distance 10-L3 between the coil 10-40 and the bottom 10-20 (the fixed portion 10-F). Therefore, when the movable portion 10-30 moves in the X direction, the first stopping structure 10-31 will contact the fixed portion 10-F before the coil 10-40 comes into contact with the fixed portion 10-F, so the coil 10-40 may be prevented from being in direct contact with the fixed portion 10-F to avoid damage. Furthermore, as shown in FIG. 135A, glue recesses 10-35 may be provided on sides of the first stopping structure 10-31, and glue may be filled in the glue recesses 10-30 to affix the position of the coil 10-40 and the movable portion 10-30.

In some embodiments, as shown in FIG. 136, FIG. 137, and FIG. 138, the coil 10-40 may be disposed in an accommodating portion 10-39 of the movable portion 10-30, and a coil surface 10-39A of the accommodating portion 10-39 faces the coil 10-40. A guiding wire accommodating structure 10-39B may be disposed between the accommodating portion 10-39 and the first stopping structure 10-31. The guiding wire accommodating structure 10-39B is recessed from the coil surface 10-39A, and the first stopping structure 10-31 protrudes from the coil surface 10-39A. As a result, the guiding wire of the coil 10-40 may be accommodated in the guiding wire accommodating structure 10-39B and thus may be protected. In some embodiments, the movable portion 10-30 may also include a coil supporting structure 10-39C that protrudes from the coil surface 10-39A and corresponds to the coil 10-40. For example, as shown in FIG. 127 and FIG. 133, the coil 10-40 may in direct contact with the coil supporting structure 10-39C and at least partially overlaps the coil supporting structure 10-39C in the X direction, so the shape of the coil of the 10-40 may be maintained when the movable portion 10-30 is moving. Moreover, as shown in FIG. 127, the magnetic element 10-60 at least partially overlaps the first stopping surface 10-31A in the X direction, so the first stopping surface 10-31A may be in contact with the magnetic element 10-60 when the movable portion 10-30 moves in the X direction. Therefore, the maximum movable range of the movable portion 10-30 in the X direction may be defined.

In some embodiments, as shown in FIG. 133 and FIG. 134, guiding wires 10-41 and 10-42 of the coil may be disposed on wiring portions 10-36 of the movable portion 10-30 to affix the position of the guiding wires 10-41 and 10-42. Furthermore, as shown in FIG. 123, the guiding wires 10-41 and 10-42 of the coil 10-40 may respectively in direct contact with the first resilient element 10-70 and the second resilient element 10-72 at the wiring portion 10-36, so current may be provided to the coil 10-40 through the first resilient element 10-70 and the second resilient element 10-72. It should be noted that the wiring portion 10-30 may extend from the movable portion 10-30 in the Z direction. In other words, multiple wiring portions 10-36 may be disposed on the same side of the movable portion 10-30.

As shown in FIG. 133 to FIG. 135A, the movable portion 10-30 may include upper surfaces 10-30A, 10-30B and a lower surface 10-30C. The upper surfaces 10-30A and 10-30B may be positioned on the same plane, and may be the closest portions of the movable portion 10-30 to the case 10-10 in the Z direction. Furthermore, the movable portion 10-30 may also include a lower surface 10-30D. Although the distance between the lower surface 10-30D and the optical axis 10-O is greater than the distance between the lower surface 10-30C and the optical axis 10-O in FIG. 135A, the bottom 10-20 has a recess for the reinforcement element 10-28, so the distance between the bottom 10-20 and the lower surface 10-30D may be higher than the distance between the bottom 10-20 and the lower surface 10-30C. In other words, the lower surface 10-30C is the portion of the movable portion 10-30 that is closest to the bottom 10-20 in the Z direction. Therefore, the upper surfaces 10-30A, 10-30B and the lower surface 10-30C may be in contact with the fixed portion 10-F when the movable portion 10-30 moves in the Z direction relative to the fixed portion 10-F, the movable range of the movable portion 10-30 may be defined, and other portions of the movable portion 10-30 may be prevented from being damaged by the fixed portion 10-F in the Z direction.

In some embodiments, as shown in FIG. 125 and FIG. 126, the first resilient element 10-70 may include a first portion 10-70A and a second portion 10-70B that are separated from each other, and the second resilient element 10-72 may be formed as one piece. Therefore, the electrical connection of the optical element driving mechanism 10-100 may be adjusted.

In some embodiments, as shown in FIG. 118, FIG. 130. FIG. 131, FIG. 134, and FIG. 139, the electronic assembly 10-80 may be disposed in the first accommodating space 10-25 of the bottom plate 10-22. Furthermore, the movable portion 10-30 may have a second accommodating space 10-37, and a sensed magnetic element 10-82 (e.g. a magnet) may be disposed in the second accommodating space 10-37. The electronic assembly 10-80 may include a sensing element (not shown) to sense the magnetic field of the sensed magnetic element 10-82, so the position of the movable portion 10-30 relative to the bottom 10-20 (fixed portion 10-F) may be detected.

For example, in the direction of the main axis 10-M (Z direction), the entire first accommodating space 10-25 overlaps the second accommodating space 10-37, and the second accommodating space 10-37 does not extend beyond the first accommodating space 10-25. Moreover, in the direction of the main axis 10-M, when the movable portion 10-30 moves in its movable range, the first accommodating space 10-25 still overlaps the entire second accommodating space 10-37, and the second accommodating space 10-37 still does not extend beyond the first accommodating space 10-25.

Therefore, the electronic assembly 10-80 may detect the magnetic field of the sensed magnetic element 10-82 no matter where the movable portion 10-30 is, so the position of the movable portion 10-30 relative to the fixed portion 10-F may be achieved.

It should be noted that as shown in FIG. 139, the magnetic element 10-60 and the sensed magnetic element 10-82 may be disposed at different sides of the movable portion 10-30 to prevent interference, so the accuracy of the optical element driving mechanism 10-100 may be enhanced.

Figure 119:
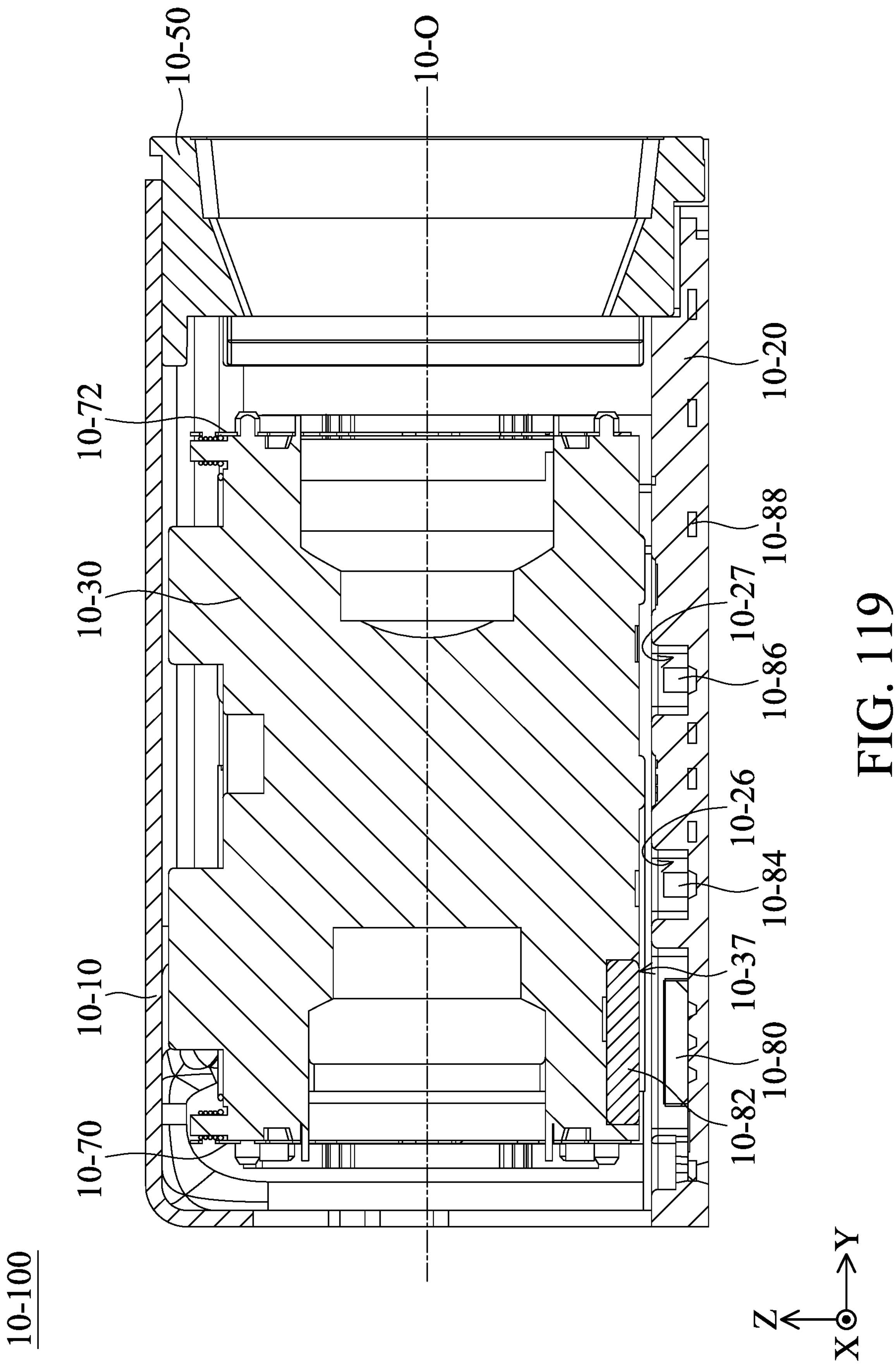
Figure 120:
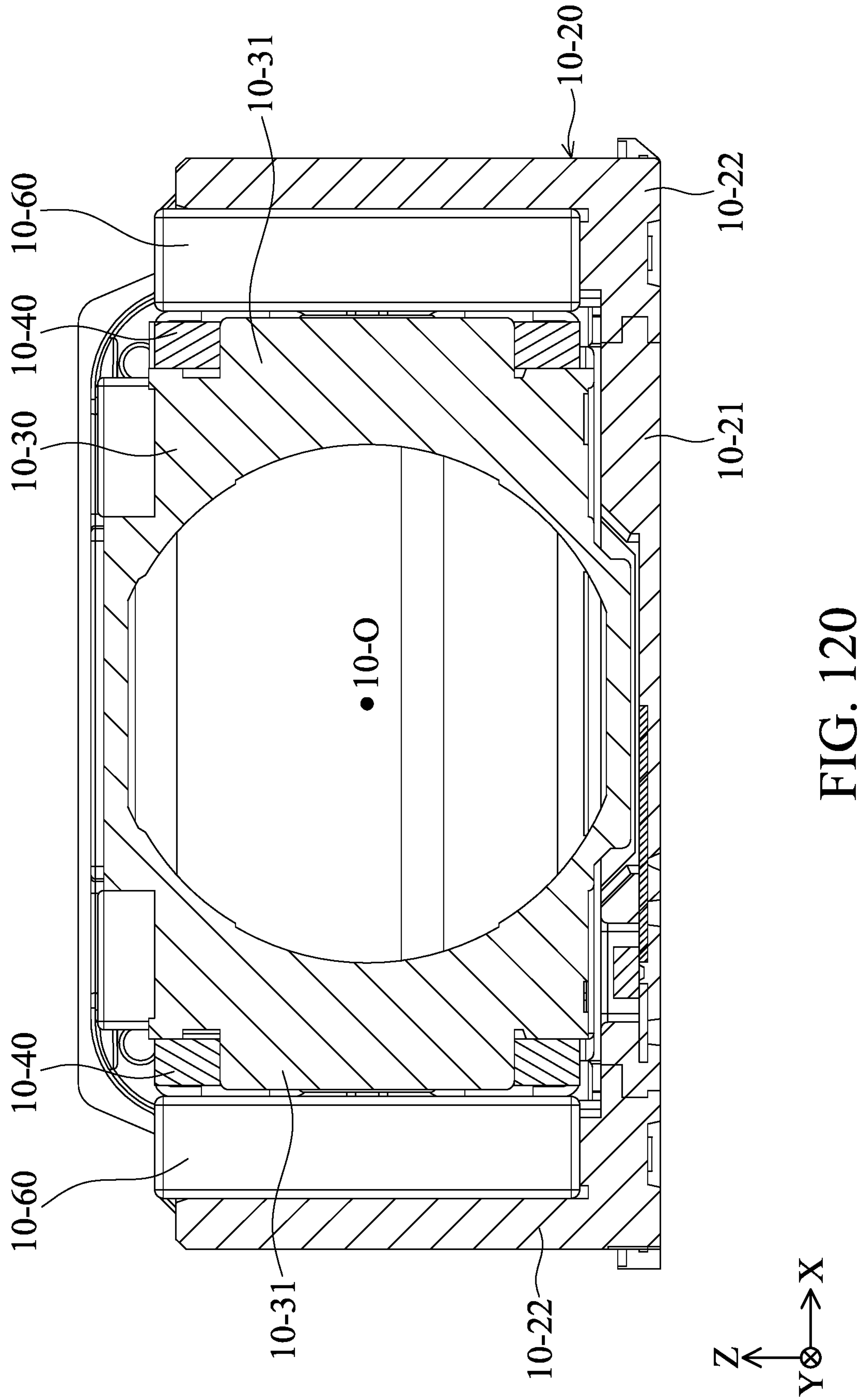
Figure 121:
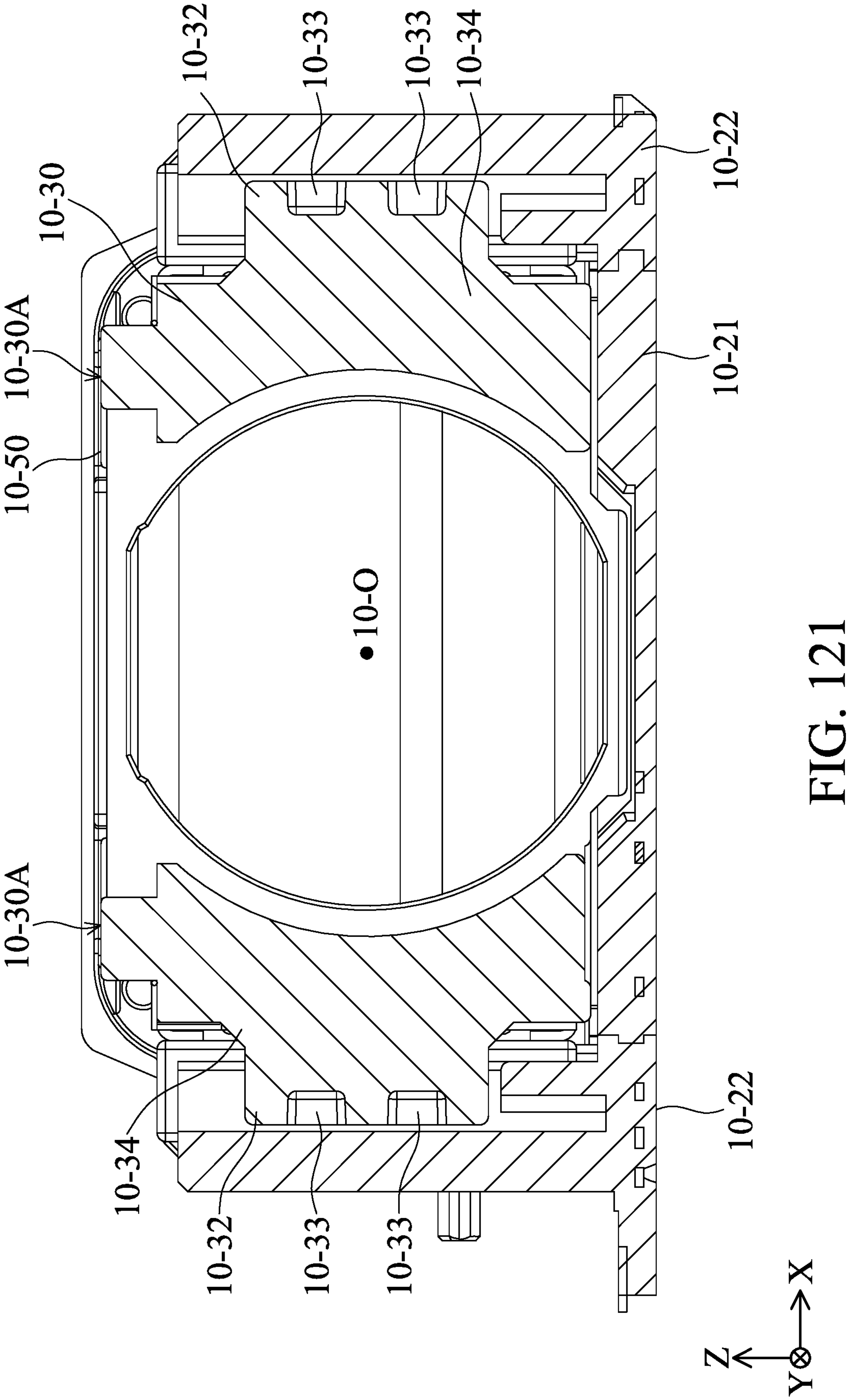

As shown in FIG. 130 and FIG. 132, an additional third accommodating space 10-26 and an additional fourth accommodating space 10-27 may be provided on the bottom 10-20 for additional electronic assemblies 10-84 and 10-86. It should be noted that as shown in FIG. 119, the heights of the electronic assemblies 10-80, 10-84, and 10-86 are less than the depths of the first accommodating space 10-25, the third accommodating space 10-26, and the fourth accommodating space 10-27, so the movable portion 10-30 may be prevented from in direct contact with the electronic assemblies 10-80, 10-84, and 10-86 when the optical element driving mechanism 10-100 is operating to protect the electronic assemblies 10-80, 10-84, and 10-86. Moreover, the electronic assemblies 10-80, 10-84, and 10-86 may be electrically connected to the circuit embedded in the bottom 10-20 to connect to other external apparatuses.

The electronic assemblies 10-80, 10-84, and 10-86 may include sensor or control elements. The sensor may include a Hall sensor, a magnetoresistance effect sensor (MR sensor), a giant magnetoresistance effect sensor (GMR sensor), a tunneling magnetoresistance effect sensor (TMR sensor), or a fluxgate sensor.

In some embodiments, damping elements 10-90 may be provided between the movable portion 10-30 and the fixed portion 10-F (the bottom 10-20) to absorb the vibration generated when the movable portion 10-30 is moving relative to the fixed portion 10-F. The damping elements 10-90 may be gel and may be disposed on accommodating portions 10-38A of the movable portion 10-30. For example, as shown in FIG. 128 and FIG. 129, the movable portion 10-30 may have four accommodating portions 10-38A at its front side and have four accommodating portions 10-38A at its back side, so multiple damping elements 10-90 may be provided on the movable portion 10-30, and the vibration generated by the movable portion 10-30 may be reduced. In some embodiments, as shown in FIG. 133 and FIG. 134, the accommodating portion 10-38A may have a recessed shape, so the damping element 10-90 may be disposed in the accommodating portion 10-38A.

Furthermore, the movable portion 10-30 may include resilient element limiting structures 10-38B to define the movable range of the first resilient element 10-70 and the second resilient element 10-72. The resilient element limiting structure 10-38B may protrude from the movable portion 10-30 and may be disposed between two accommodating portions 10-38A. When viewed along the optical axis 10-O, the first resilient element 10-70 or the second resilient element 10-72 may at least partially overlaps the resilient element limiting structures 10-38B, so the first resilient element 10-70 or the second resilient element 10-72 may be in contact with the resilient element limiting structures 10-38B when the movable portion 10-30 moves along the optical axis 10-O, and the position of the first resilient element 10-70 or the second resilient element 10-72 may be limited. It should be noted that the resilient element limiting structures 10-38B are not in contact with the movable portion 10-F when the movable portion 10-30 moves in its movable range to protect the resilient element limiting structures 10-38B. In some embodiments, as shown in FIG. 135B, the length of the resilient element limiting structures 10-38B is higher than the length of the accommodating portion 10-38A in the X direction.

Figure 122:
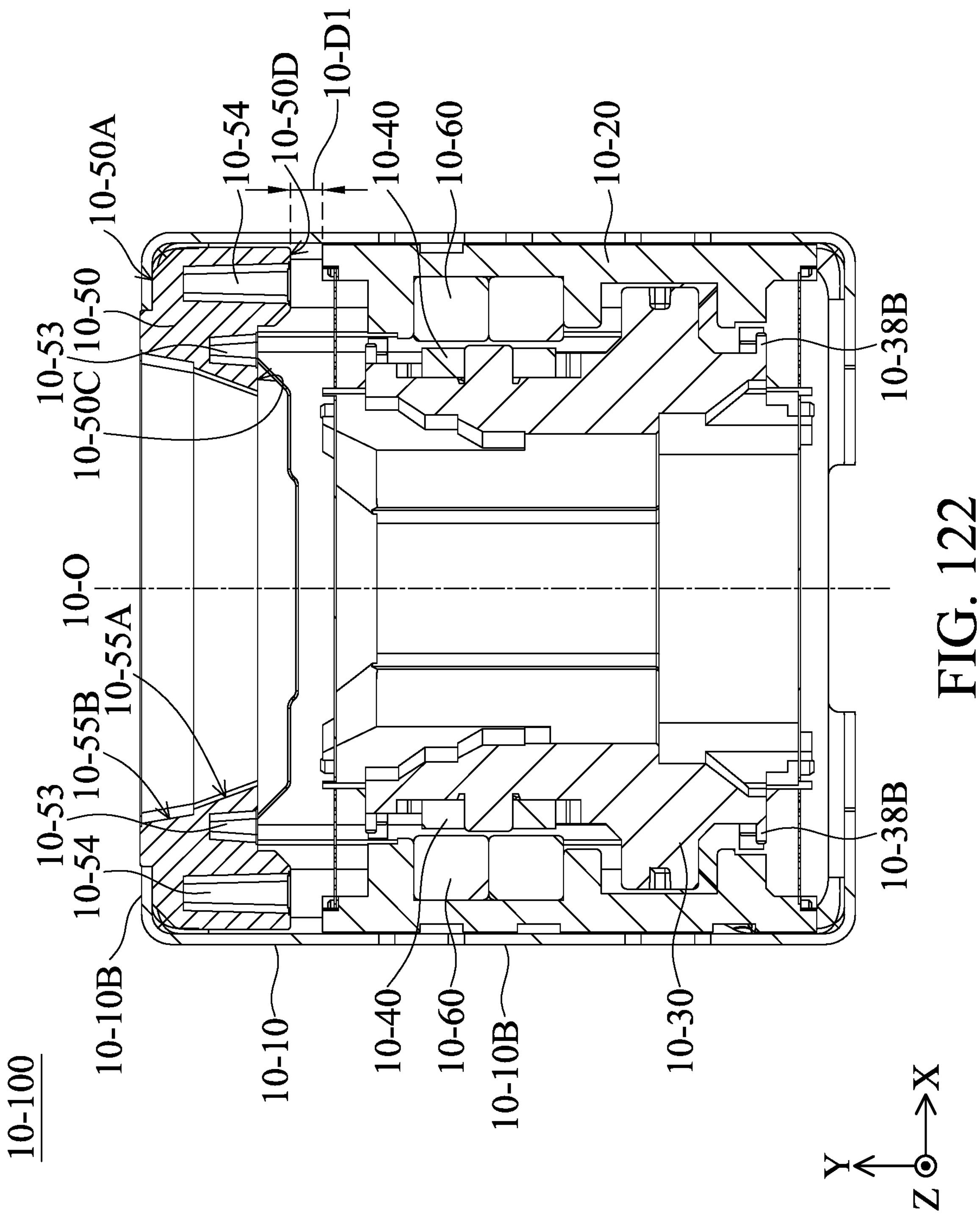

In some embodiments, as shown in FIG. 114, FIG. 118, FIG. 122, FIG. 139A, and FIG. 139B, the frame 10-50 may be arranged with the movable portion 10-30 along the optical axis 10-O (the Y direction). The frame 10-50 may include a first frame surface 10-50A and a second frame surface 10-50B that face the case 10-10. In some embodiments, as shown in FIG. 118 and FIG. 122, the first frame 10-50A and the second frame surface 10-50B are facing different directions; for example, opposite directions. The first frame surface 10-50A faces the side wall 10-10B, and the second frame surface 10-50B faces the top wall 10-10A. In other words, in the direction of the optical axis 10-O, the first frame surface 10-50A at least partially overlaps the side wall 10-10B, and the second frame surface 10-50B at least partially overlaps the top wall 10-10A. Moreover, the first frame surface 10-50A and the second frame surface 10-50B are not parallel to the direction that the optical axis 10-O extends (Y direction), such as may be perpendicular to the optical axis 10-O.

In the direction of the optical axis 10-O, the shortest distance between the first frame surface 10-50A and the case 10-10 is 10-D1, the shortest distance between the second frame surface 10-50B and the case 10-10 is 10-D2, and the shortest distance 10-D1 may be different than the shortest distance 10-D2. In some embodiments, the shortest distance 10-D1 may be greater than the shortest distance 10-D2, but it is not limited thereto. Therefore, higher tolerance of the elements may be endured.

In some embodiments, the frame 10-50 may also include a third frame surface 10-50C and a fourth frame surface 10-50D, wherein the third frame surface 10-50C faces the movable portion 10-30, and the fourth frame surface 10-50D faces the wall 10-21 of the bottom 10-20. In some embodiments, the third frame surface 10-50C and the fourth frame surface 10-50D may perpendicular to the optical axis 10-O. In other words, along the optical axis 10-O, the third frame surface 10-50C at least partially overlaps the movable portion 10-30, and the fourth frame surface 10-50D at least partially overlaps the wall 10-21. Moreover, the first frame surface 10-50A faces a different direction to the third frame surface 10-50C and the fourth frame surface 10-50D, such as are facing opposite directions.

As shown in FIG. 122, FIG. 140, and FIG. 141, a second lightening structure 10-53 may be provided on the third frame surface 10-50C, and a third lightening structure 10-54 may be provided on the fourth frame surface 10-50D. For example, the second lightening structure 10-53 and the third lightening structure 10-54 may be recesses to reduce the weight of the frame 10-50, and the second lightening structure 10-53 and the third lightening structure 10-54 may have different depths. In some embodiments, as shown in FIG. 141, the frame 10-50 may have a polygonal shape (e.g. rectangular shape), and may have first frame sides 10-51 and second frame sides 10-52. The first frame sides 10-51 extend in a first direction (the X direction), and the second frame sides 10-52 extend in a second direction (the Y direction). When viewed along the optical axis 10-O (Y direction), the width of the first frame side in the Z direction is 10-T1, and the width of the second frame side 10-52 in the X direction is 10-T2, and the width 10-T1 is less than the width 10-T2. Therefore, the second lightening structure 10-53 and the third lightening structure 10-54 may be disposed on the second frame side 10-52 that has a higher width 10-T2. It should be noted that the first direction (the X direction) that the first frame side 10-51 extends is different than the second direction (the Z direction) that the second frame side 10-51 extends, and the first direction and the second direction are perpendicular to the direction that the optical axis 10-O extends (the Y direction).

In some embodiments, the frame 10-50 may also include a first noise-cancelling surface 10-55A and a second noise-cancelling surface 10-55B. The first noise-cancelling surface 10-55A and the second noise-cancelling surface are not parallel and may arrange along the optical axis 10-O, but are not parallel nor perpendicular to the optical axis 10-O. The material on the first noise-cancelling surface 10-55A and the second noise-cancelling surface 10-55A may be different than other part of the frame 10-50, such as a material having low reflectivity (e.g. light absorb material). Alternatively, the roughness of the first noise-cancelling surface 10-55A or the second noise-cancelling surface 10-55B may be changed to achieve a rough structure, wherein the roughness of the first noise-cancelling surface 10-55A or the second noise-cancelling surface 10-55B may be higher than the roughness of the third frame surface 10-50C and the fourth frame surface 10-50D, and the reflectivity of the first noise-cancelling surface 10-55A and the second noise-cancelling surface 10-55B may be less than the reflectivity of the third frame surface 10-50C and the fourth frame surface 10-50D. In other words, light is harder to be reflected by the first noise-cancelling surface 10-55A and the second noise-cancelling surface 10-55B than the third frame surface 10-50C and the fourth frame surface 10-50D, so the reflected noise light may be reduced when the light passing through the optical element driving mechanism 10-100, and the quality of the image gained may be enhanced.

In some embodiments, additional anti-reflect element may be provided on the frame 10-50 to further reduce reflected noise light. FIG. 142 is a schematic view when an anti-reflect element 10-56 is disposed on the frame 10-50. FIG. 143 and FIG. 144 are cross-sectional views of the optical element driving mechanism 10-100 when the anti-reflect element 10-56 is disposed on the frame 10-50. FIG. 145 is a back view of the optical element driving mechanism 10-100 when the anti-reflect element 10-56 is disposed on the frame 10-50. As shown in FIG. 142 to FIG. 145, the plate-shaped anti-reflect element 10-56 may be disposed on the third frame surface 10-50C, such as may cover the entire third frame surface 10-50C. An opening may be formed in the anti-reflect element 10-56, the size 10-S1 of the opening may be less than the size 10-S2 of the minimum opening of the frame 10-50 in the X direction, and the size 10-S3 of the opening may be less than the size 10-S4 of the minimum opening of the frame 10-50 in the Z direction. In other words, as shown in FIG. 145, the anti-reflect element 10-56 exposes from the opening of the frame 10-40. However, the present disclosure is not limited thereto. For example, in some embodiments, the size 10-S3 may be equal to or higher than the size 10-S4, but the size 10-S1 still less than the size 10-S2. Because the size 10-S2 is less than the size 10-S2, noise light may easily occur in this direction (the Z direction). Therefore, let the size 10-S1 less than the size 10-S2 may prevent noise light from being generated, so the quality of the received image may be enhanced.

The anti-reflect element 10-56 may have a low reflectivity. For example, reflectivity of the anti-reflect element 10-56 may be less than the reflectivity of the surfaces of the frame 10-50, such as less than the reflectivity of the third frame surface 10-50C, or may be less than the reflectivity of the first noise-cancelling surface 10-55A and the second noise-cancelling surface 10-55B. Therefore, noise light may be further reduced to enhance the quality of the gained image.

In summary, an optical element driving mechanism is provided. The optical element driving mechanism includes a movable portion, a fixed portion, a driving assembly, and a support assembly. The movable portion is used for connecting to an optical element. The movable portion may move relative to the fixed portion. The driving assembly is used for driving the movable portion to move relative to the fixed portion. The movable portion is movable relative to the fixed portion through the support assembly.

The relative positions and size relationship of the elements in the present disclosure may allow the optical element driving mechanism achieving miniaturization in specific directions or for the entire mechanism. Moreover, different optical modules may be combined with the optical element driving mechanism to further enhance optical quality, such as the quality of photographing or accuracy of depth detection. Therefore, the optical modules may be further utilized to achieve multiple anti-vibration systems, so image stabilization may be significantly improved.

FIG. 146 is a schematic view of an electronic device 11-I equipped with an optical element driving mechanism 11-10. The electronic device 11-I may be a smart phone, a tablet computer, etc. The optical element driving mechanism 11-10 is generally disposed on the top region of the electronic device 11-I. The optical element driving mechanism 11-10 may be a periscope optical mechanism. In some embodiments, the electronic device 11-I may further equipped with another optical element driving mechanism 11-20. Images and video may be respectively generated by the optical element driving mechanism 11-10 and optical element driving mechanism 11-20 to enhance the functionality of capturing images and video of the electronic device 11-I.

FIG. 147 is a perspective view of the optical element driving mechanism 11-10 and an optical path adjustment assembly 11-11, and the optical path adjustment assembly 11-11 is schematically illustrated in FIG. 147. FIG. 148 is a schematic view of the optical path adjustment assembly 11-11. The optical path adjustment assembly 11-11 includes an optical path adjustment element 11-12 and an optical path adjustment element base 11-13. The optical path adjustment element 11-12 is disposed on the optical path adjustment element base 11-13. The optical path adjustment element 11-12 may be a mirror, a prism, a beam splitter, and the like. The optical path of an incident light 11-L may be changed by rotation or movement of the optical path adjustment element 11-12. The incident light 11-L becomes an exit light 11-U. The exit light 11-L' is substantially perpendicular to the incident light 11-L.

Next, please refer to FIG. 149 to FIG. 154 to understand the optical element driving mechanism 11-10. FIG. 149 is an exploded view of the optical element driving mechanism 11-10. FIG. 150 to FIG. 152 are perspective vies of the optical element driving mechanism 11-10 from different perspectives. FIG. 153 is a front view of the optical element driving mechanism 11-10. FIG. 154 is a side view of the optical element driving mechanism 11-10. The optical element driving mechanism 11-10 includes an immovable part 11-I, a first movable part 11-M1, a second movable part 11-M2, a first drive assembly 11-D1, a second drive assembly 11-D2, a first sensing assembly 11-S1, a second sensing assembly 11-S2, and a guidance assembly 11-G. The first movable part 11-M1 is movable relative to the immovable part 11-I. The first movable part 11-M1 is connected to a first optical element 11-110 with a first optical axis 11-O1. The first optical axis 11-O1 is an imaginary axis passing through the center of the first optical element 11-110. Also, the second movable part 11-M2 is movable relative to the immovable part 11-I. The second movable part 11-M2 is connected to a second optical element 11-120 with a second optical axis 11-O2. The second optical axis 11-O2 is an imaginary axis passing through the center of the second optical element 11-120. The first optical axis 11-O1 and the second optical axis 11-O2 are substantially parallel with the Z-axis. In some embodiments, the first optical axis 11-O1 coincides with the second optical axis 11-O2. The first optical element 11-110 and the second optical element 11-120 may be an optical element or optical element group including multiple optical elements. The optical element or optical element group may be a lens or lenses made of plastics or glass.

The first drive assembly 11-D1 drives the first movable part 11-M1 to move relative to the immovable part 11-I. The second drive assembly 11-D2 drives the second movable part 11-M2 to move relative to the immovable part 11-I. The first sensing assembly 11-S1 senses the movement of the first movable part 11-M1 relative to the immovable part 11-I. The second sensing assembly 11-S2 senses the movement of the second movable part 11-M2 relative to the immovable part 11-I. The guidance assembly 11-G guides the movement of the first movable part 11-M1 and the second movable part 11-M2 in a first dimension.

In this embodiment, the immovable part 11-I includes a case 11-200, a circuit assembly 11-370, and a bottom 11-380. The first movable part 11-M1 includes a first holder 11-210 and a first receiving element 11-230. The second movable part 11-M2 includes a second holder 11-220 and a second receiving element 11-240. The first drive assembly 11-D1 includes a first magnetic element 11-270 and a first drive coil 11-280. The second drive assembly 11-D2 includes a second magnetic element 11-290 and a second drive coil 11-300. The first sensing assembly 11-S1 includes a first reference element 11-310, a second reference element 11-320, and a first sensing element 11-350. The second sensing assembly 11-S1 includes a third reference element 11-380, a fourth reference element 11-340, and a second sensing element 11-360. The guidance assembly 11-G includes a contact unit 11-250 and a guidance unit 11-260. In detail, the contact unit 11-250 may be divided into at least one first contact unit 11-251 in the first movable part 11-M1 and at least one second contact unit 11-252 in the second movable part 11-M2. The guidance unit 11-260 includes a first guidance element 11-261 located on the left side and a second guidance element 11-262 located on the right side. It should be noted that the elements may be added or omitted according to the requirements of the users.

In addition to FIG. 149 to FIG. 154, please refer to FIG. 155 and FIG. 156 to understand immovable part 11-I. FIG. 155 is a perspective view of the case 11-200. FIG. 156 is a perspective view of the circuit assembly 11-370 and the bottom 11-380. The case 11-200 is connected to the bottom 11-380. After the case 11-200 is connected to the bottom 11-380, the space formed therein may accommodate the first movable part 11-M1, the second movable part 11-M2, the first drive assembly 11-D1, the second drive assembly 11-D2, the first sensing assembly 11-S1, the second sensing assembly 11-S2, the guidance assembly 11-G, and the like. Therefore, the optical element driving mechanism 11-10 has good mechanical strength due to the protection of the immovable part 11-I.

It should be noted that the first optical element 11-110 and the second optical element 11-120 are eccentric structures. The first optical element 11-110 and the second optical element 11-120 are not located in the center of the optical element driving mechanism 11-10 directly. When viewed from the Z-axis, the profile of the immovable part 11-I is substantially rectangular including a first side 11-I-1 (the top side, the long side of the rectangle), a second side 11-I-2 (the left side, the short side of the rectangle), a third side 11-I-3 (the bottom side, the long side of the rectangle) opposite to the first side 11-I-1, and a fourth side 11-I-4 (the right side, the short side of the rectangle) opposite to the first side 11-I-1. The first side 11-I-1, the second side 11-I-2, the third side 11-I-3, and the fourth side 11-I-4 are only labeled in FIG. 155. The first drive assembly 11-D1 and the second drive assembly 11-D2 are located on the second side 11-I-2. The bottom 11-380 is located on the third side 11-I-3.

The first optical axis 11-O1 of the first optical element 11-110 is located between the first side 11-I-1 and the third side 11-I-3, and is located between the second side 11-I-2 and the fourth side 11-I-4. The minimum distance between the first optical axis 11-O1 and the first side 11-I-1 is different from the minimum distance between the first optical axis 11-O1 and the third side 11-I-3. Additionally, the minimum distance between the first optical axis 11-O1 and the second side 11-I-2 is different from the minimum distance between the first optical axis 11-O1 and the fourth side 11-I-4. In detail, the first optical element 11-110 is closer to the first side 11-I-1 and the fourth side 11-I-4, so that the minimum distance between the first optical axis 11-O1 and the first side 11-I-1 is less than the minimum distance between the first optical axis 11-O1 and the third side 11-I-3, and the minimum distance between the first optical axis 11-O1 and the second side 11-I-2 is greater than the minimum distance between the first optical axis 11-O1 and the fourth side 11-I-4.

The case 11-200 may be made of a metal material. As shown in FIG. 155, the case 11-200 includes a light entrance 11-201, a light exit 11-202, a top wall 11-203, and at least one sidewall 11-204. The light entrance 11-201 is formed on one side of the case 11-200. The light entrance 11-201 may correspond to the optical path adjustment assembly 11-11. After leaving optical path adjustment assembly 11-11, the exit light 11-L' may enter the optical element driving mechanism 11-10 via the light entrance 11-201. The light exit 11-202 is formed on the side opposite to the light entrance 11-201. The exit light 11-L' may leave the optical element driving mechanism 11-10 via the light exit 11-202. In particular, the exit light 11-L' passes through the light entrance 11-201, the second optical element 11-120, the first optical element 11-110, and the light exit 11-202. The top wall 11-203 is perpendicular to the Y-axis. The sidewall 11-204 extends in the Y-axis from the edge of the top wall 11-203. In FIG. 150 to FIG. 154, for clarity of illustration, the case 11-200 is omitted.

The circuit assembly 11-370 is disposed on the bottom 11-380. The circuit assembly 11-370 may be a circuit board such as a flexible printed circuit (FPC) or a rigid-flex board. The shape of the circuit assembly 11-370 may be cut in a different shape depending on the actual need. The circuit assembly 11-370 includes an electrical connection portion 11-371. The current is supplied to the optical element driving mechanism 11-10 via the outside electrical connection portion 11-371. In some embodiments, the circuit assembly 11-370 may be omitted. The circuits may be formed in the bottom 11-380 by methods such as insert molding.

As shown in FIG. 156, the bottom 11-380 includes a bottom body 11-381, a bottom support portion 11-382, a bottom front placement portion 11-383, and a bottom rear placement portion 11-384. The bottom body 11-381 is a plate structure that is perpendicular to the Y-axis. The bottom support portion 11-382 is like a column or a pillar. Each of the bottom support portion 11-382 includes a bottom support portion recess (may also be referred to as "an immovable part recess") 11-3821. The second guidance element 11-262 is disposed on the bottom support portion 11-382 by passing through the bottom support portion recess 11-3821. The bottom front placement portion 11-383 and the bottom rear placement portion 11-384 are substantially L-shaped. The bottom front placement portion 11-383 and the bottom rear placement portion 11-384 are located on the left side of the bottom 11-380. The bottom front placement portion 11-383 may affix the second drive coil 11-300 and the bottom rear placement portion 11-384 may affix the first drive coil 11-280. Since the height of the first drive coil 11-280 is greater than the height of the second drive coil 11-300, the height of the bottom rear placement portion 11-384 is greater than the bottom front placement portion 11-383 in this embodiment, but the present disclosure is not limited thereto.

In addition to FIG. 149 to FIG. 154, please refer to FIG. 157 to FIG. 160 to understand the first movable part 11-M1 and the second movable part 11-M2. FIG. 157 is a perspective view of the first holder 11-210. FIG. 158 is a front view of the first holder 11-210. FIG. 159 is a perspective view of the second holder 11-220. FIG. 160 is a front view of the second holder 11-220. The structure and the design of the first holder 11-210 are similar to the second holder 11-220, but difference may still exist. For example, the size of the first holder 11-210 in the Z-axis (the width) is different from the size of the second holder 11-220 in the Z-axis. In FIG. 151 and FIG. 152, for clarity of illustration, the first holder 11-210 and the second holder 11-220 are omitted.

The first holder 11-210 includes a first holder body 11-211, a first holder opening 11-212, a first holder placement portion 11-213, a first holder recess (may be referred to as the first movable part recess) 11-214, and at least one first holder receiving portion 11-215. In some embodiments, the first holder 11-210 further includes at least one first accommodating part 11-216.

The first holder body 11-211 is hollow for holding the first receiving element 11-230. The first receiving element 11-230 further holds the first optical element 11-110. The first holder opening 11-212 is located on the left side of the first holder body 11-211. When viewed from the Z-axis, the first holder opening 11-212 is substantially polygonal or likely to be polygonal such as triangular or likely to be triangular. The first holder placement portion 11-213 is located on the left side of the first holder opening 11-212. The first holder placement portion 11-213 may affix the first magnetic element 11-270. The first holder recess 11-214 may receive at least part of the second guidance element 11-262. In this embodiment, there are two first holder receiving portions 11-215 for receiving the first reference element 11-310 and the second reference element 11-320, respectively. It should be noted that the surface of the first holder receiving portion 11-215 is not horizontal, it is inclined. The first accommodating part 11-216 may accommodate at least part of the contact unit 11-250 of the guidance assembly 11-G. The first accommodating part 11-216 will be further described with regard to the guidance assembly 11-G.

Similarly, the second holder 11-220 includes a second holder body 11-221, a second holder opening 11-222, a second holder placement portion 11-223, a second holder recess (may be referred to as the second movable part recess) 11-224, and at least one second holder receiving portion 11-225. In some embodiments, the second holder 11-220 further includes at least one second accommodating part 11-226.

The second holder body 11-221 is hollow for holding the second receiving element 11-240. The second receiving element 11-240 further holds the second optical element 11-120. The second holder opening 11-222 is located on the left side of the second holder body 11-221. When viewed from the Z-axis, the second holder opening 11-222 is substantially polygonal or likely to be polygonal such as triangular or likely to be triangular. The second holder placement portion 11-223 is located under the second holder opening 11-222. The second holder placement portion 11-223 may affix the second magnetic element 11-290. The second holder recess 11-224 may receive at least part of the second guidance element 11-262. In this embodiment, there is one second holder receiving portions 11-225 for receiving the third reference element 11-330 and the fourth reference element 11-340 at the same time. Unlike the surface of the first holder receiving portion 11-215, the surface of the second holder receiving portion 11-225 is horizontal. The second accommodating part 11-226 may accommodate at least part of the contact unit 11-250 of the guidance assembly 11-G.

Next, please refer to FIG. 149 to FIG. 154 to understand the first drive assembly 11-D1 and the second drive assembly 11-D2. The first magnetic element 11-270 and the second magnetic element 11-290 are bar-like and extend in a first direction 11-A1. In this embodiment, the first direction 11-A1 is substantially parallel with the Z-axis. The first drive coil 11-280 and the second drive coil 11-300 are hollow and cylindrical. The first drive coil 11-280 and the second drive coil 11-300 extend in the first direction 11-A1 as well. The magnetic poles of the first magnetic element 11-270 and the second magnetic element 11-290 are arranged in the first direction A1. It should be noted that the magnetic poles defined herein are N-pole and/or S-pole.

A winding axis 11-281 of the first drive coil 11-280 is parallel with the first direction 11-A1. The first drive coil 11-280 corresponds to the first magnetic element 11-270. In particular, at least part of the first magnetic element 11-270 is located in the first drive coil 11-280. When the current is supplied to the first drive coil 11-280, magnetic force that is parallel with the first direction 11-A1 is generated between the first magnetic element 11-270 and the first drive coil 11-280, thereby driving the first movable part 11-M1 and the first optical element 11-110 therein to move in the first direction 11-A1 within a first limit range, so as to achieve zoom or focus.

Similarly, a winding axis 11-301 of the second drive coil 11-300 is parallel with the first direction 11-A1. The second drive coil 11-300 corresponds to the second magnetic element 11-290. In particular, at least part of the second magnetic element 11-290 is located in the second drive coil 11-300. When the current is supplied to the second drive coil 11-300, magnetic force that is parallel with the first direction 11-A1 is generated between the second magnetic element 11-290 and the second drive coil 11-300, thereby driving the second movable part 11-M2 and the second optical element 11-120 therein to move in the first direction 11-A1 within a second limit range, so as to achieve zoom or focus.

It should be noted that the first limit range is different from the second limit range. In some embodiments, the first limit range is greater than the second limit range. Usually, if the first limit range is greater than the second limit range, then the first drive assembly 11-D1 is referred to as a focus assembly while the second drive assembly 11-D2 is referred to as a zoom assembly. However, the terms "focus", "zoom", and the like are not limited hereto.

Additionally, although both the first magnetic element 11-270 and the second magnetic element 11-290 extend in the first direction 11-A1, the first magnetic element 11-270 does not overlap the second magnetic element 11-290 in the first direction 11-A1. When viewed from the first direction 11-A1, the center of the first magnetic element 11-270 and the center of the second magnetic element 11-290 are spaced a gap that is not zero apart from each other. Also, when viewed from the first direction 11-A1, the center of the first drive coil 11-280 and the center of the second drive coil 11-300 are spaced a gap that is not zero apart from each other.

Additionally, in some embodiments, the cuboid-like first magnetic element and/or the cuboid-like second magnetic element may be used, and the oval-like first drive coil and/or the oval-like second drive coil may be used. However, the bar-like first magnetic element 11-270 and the bar-like second magnetic element 11-290 with the hollow and cylindrical-like first drive coil 11-280 and the hollow and cylindrical-like second drive coil 11-290 may effectively utilize the space, and thus greater magnetic force may be generated. Therefore, the first movable part 11-M1 and the second movable part 11-M2 may have greater stroke, i.e., the range of movement.

Next, in addition to FIG. 149 to FIG. 154, please refer to FIG. 161 and FIG. 162 to understand the first sensing assembly 11-S1 and the second sensing assembly 11-S2. FIG. 161 is a schematic view of the first sensing assembly 11-S1. FIG. 162 is a schematic view of the second sensing assembly 11-S2.

The first reference element 11-310 and the second reference element 11-320 include a magnetic material. For example, the first reference element 11-310 and the second reference element 11-320 may be magnets or permanent magnets. The first sensing element 11-350 is disposed on the circuit assembly 11-370. The first sensing element 11-350 senses the movement of the first movable part 11-M1 relative to the immovable part 11-I via sensing the first reference element 11-310 and/or the second reference element 11-320.

As described above, the first reference element 11-310 and the second reference element 11-320 are disposed in the first holder receiving portion 11-215 of the first holder 11-210. The second reference element 11-320 and the first reference element 11-310 are spaced a gap that is not zero apart from each other. The magnetic poles of the first reference element 11-310 are arranged in a second direction 11-A2 while the magnetic poles of the second reference element 11-320 are arranged in a third direction 11-A3. The second direction 11-A2 is neither perpendicular to nor parallel with the first direction 11-A1. The third direction 11-A3 is neither perpendicular to nor parallel with the first direction 11-A1. The third direction 11-A3 is neither perpendicular to nor parallel with the second direction 11-A2. However, the line connecting the center of the first reference element 11-310 and the center of the second reference element 11-320 is parallel with the first direction 11-A1. As shown in FIG. 154 and FIG. 161, the first reference element 11-310 and the second reference element 11-320 are not horizontally-placed. The angle between the horizontal line and the first reference element 11-310 and the second reference element 11-320 may be zero to about 10 degrees. For example, the angle between the horizontal line and the first reference element 11-310 and the second reference element 11-320 may be 8 degrees. As described above, the first limit range of the first movable part 11-M1 may be greater than the second limit range of the second movable part 11-M2, to better sense the movement of the first movable part 11-M1, the first reference element 11-310 and the second reference element 11-320 that are not horizontally-placed may make the distribution of the magnetic field generated by the first reference element 11-310 and the second reference element 11-320 more linear, so that the sensing accuracy of the first sensing assembly 11-S1 is enhanced.

The third reference element 11-330 and the fourth reference element 11-340 include a magnetic material. For example, the third reference element 11-330 and the fourth reference element 11-340 may be magnets or permanent magnets. The second sensing element 11-360 is disposed on the circuit assembly 11-370. The second sensing element 11-360 senses the movement of the second movable part 11-M2 relative to the immovable part 11-I via sensing the third reference element 11-330 and/or the fourth reference element 11-340.

As described above, the third reference element 11-330 and the fourth reference element 11-340 are disposed in the second holder receiving portion 11-225 of the second holder 11-220. The magnetic poles of the third reference element 11-330 are arranged in a fourth direction 11-A4 while the magnetic poles of the fourth reference element 11-340 are arranged in a fifth direction 11-A5. The fourth direction 11-A4 is perpendicular to the first direction 11-A1. The fourth direction 11-A4 is neither perpendicular to nor parallel with the second direction 11-A2. The fourth direction 11-A4 is neither perpendicular to nor parallel with the third direction 11-A3. The fifth direction 11-A5 is perpendicular to the first direction 11-A1. The fifth direction 11-A5 is neither perpendicular to nor parallel with the second direction 11-A2. The fifth direction 11-A5 is neither perpendicular to nor parallel with the third direction 11-A3. The fifth direction 11-A5 is parallel with the fourth direction 11-A4. As shown in FIG. 154 and FIG. 162, the third reference element 11-330 and the fourth reference element 11-340 are substantially horizontally-placed. Therefore, the line connecting the center of the third reference element 11-330 and the center of the fourth reference element 11-340 is parallel with the first direction 11-A1. However, in some embodiments, the third reference element 11-330 and the fourth reference element 11-340 may be placed to be inclined according to the actual needs. In some embodiments, the third reference element 11-330 and the fourth reference element 11-340 are integrally formed. For example, the third reference element 11-330 and the fourth reference element 11-340 may be a multipole magnet including at least two pairs of magnetic poles (at least four magnetic poles).

Next, please refer to FIG. 163 to understand the guidance assembly 11-G. FIG. 163 is a schematic view of the guidance assembly 11-G. As described above, the contact unit 11-250 located in the first movable part 11-M1 is defined as the first contact unit 11-251 while the contact unit 11-250 located in the second movable part 11-M2 is defined as the second contact unit 11-252. In this embodiment, the contact unit 11-250 includes two groups of first contact unit 11-251 and two groups of second contact unit 11-252. The first contact unit 11-251 and the second contact unit 11-252 are arranged in the first direction 11-A1. The first contact unit 11-251 includes a plurality of first contact elements 11-2511. The second contact unit 11-252 includes a plurality of second contact elements 11-2521.

The first guidance element 11-261 located on the left side of the optical element driving mechanism 11-10 is in direct contact with the first contact unit 11-251 and the second contact unit 11-252 while the second guidance element 11-262 located on the right side of the optical element driving mechanism 11-10 is not in contact with the first contact unit 11-251 and the second contact unit 11-252. The first guidance element 11-261 and the second guidance element 11-262 are bar-like structures and extend in the first direction 11-A1, such as rod-shaped. The first guidance element 11-261 and the second guidance element 11-262 include a metal material but exclude a magnetically-permeable material. The magnetically-permeable material means the material with the magnetic permeability.

The second guidance element 11-262 passes through the first holder recess 11-214, the second holder recess 11-224, and the bottom support portion recess 11-3821. As shown in FIG. 157 and FIG. 159, the first holder recess 11-214 and the second holder recess 11-224 may be defined as being recessed toward the X-axis. That is, the recessed direction of the first holder recess 11-214 and the second holder recess 11-224 is in the X-axis. As shown in FIG. 156, the bottom support portion recess 11-3821 may be defined as being recessed toward the Z-axis. That is, the recessed direction of the bottom support portion recess 11-3821 is in the Z-axis. Therefore, the second guidance element 11-262 passing through the first holder recess 11-214, the second holder recess 11-224, and the bottom support portion recess 11-3821 may affix the first movable part 11-M1 and/or the second movable part 11-M2 in the Y-axis. In other words, the recessed direction of the first holder recess 11-214 and the second holder recess 11-224 is different from the recessed direction of the bottom support portion recess 11-3821. In some embodiments, the recessed direction of the first holder recess 11-214 and the second holder recess 11-224 is perpendicular to the recessed direction of the bottom support portion recess 11-3821. Additionally, in some embodiments, the size of the bottom support portion recess 11-3821 in the X-axis is designed to be larger than the size of the second guidance element 11-262 in the X-axis, so that the second guidance element 11-262 may be slightly movable in the X-axis, which may be advantageous for the adjusting the position of the first movable part 11-M1 and/or adjusting the position of the second movable part 11-M2.

Next, in addition to FIG. 163, please refer to FIG. 164 to FIG. 166 to understand the first contact unit 11-251 and the first guidance element 11-261 of the guidance assembly 11-G. FIG. 164 is a perspective view of the first accommodating part 11-216, the first contact unit 11-521, and the first guidance element 11-261. FIG. 165 and FIG. 166 are a front view and a rear view of the first accommodating part 11-216, the first contact unit 11-251, and the first guidance element 11-261. It should be noted that the first accommodating part 11-216 may be the same as or substantially the same as the second accommodating part 11-226, and the first contact unit 11-251 may be the same as or substantially the same as the second contact unit 11-252. For simplicity, only the first accommodating part 11-216 and the first contact unit 11-251 are discussed in the following, but the second accommodating part 11-226 and the second contact unit 11-252 may also have the same or similar features.

In this embodiment, there are two first accommodating parts 11-216. The two accommodating part 11-216 face to each other, so that the first contact elements 11-2511 therein are protected. Each of the first accommodating parts 11-216 includes a first accommodating space 11-2161 and a first accommodating part opening 11-2162. When viewed from the Z-axis, the first accommodating part opening 11-2162 is substantially oval or circular. The first guidance element 11-261 of the guidance assembly 11-G passes through the first holder opening 11-212 and the first accommodating part opening 11-2162. When viewed from the Z-axis, the area of the first holder opening 11-212 is different from the area of the first accommodating part opening 11-2162. In this embodiment, when viewed from the Z-axis, the area of the first holder opening 11-212 (substantially triangular) is larger than the area of the first accommodating part opening 11-2162 (substantially circular).

In this embodiment, there are six first contact elements 11-2511. However, the number, the shape, and other features of the first contact elements 11-2511 may be adjusted according to the shape, the structure, and other features of the first accommodating part 11-216. For example, in this embodiment, the first accommodating part 11-216 is substantially triangular, so there are three first contact elements 11-2511 in each first accommodating part 11-216. In other embodiments, the first accommodating part 11-216 may be substantially quadrilateral, so there may be four first contact elements 11-2511 in each first accommodating part 11-216. Alternatively, in other embodiments, the first accommodating part 11-216 may be omitted, and the first contact elements 11-2511 may be placed to be in direct contact with the first holder 11-210. Under such circumstances, the number of the first contact elements 11-2511 may be adjusted according to the shape, the structure, or other features of the first holder opening 11-212. The first contact elements 11-2511 may be made of a ceramic material or a metal material.

The first contact elements 11-2511 are affixed to the first accommodating space 11-2161 by methods such as welding, adhesion via glue, etc. The first contact elements 11-2511 are located on different corners of the first accommodating space 11-2161. As shown in FIG. 164 to FIG. 166, the first guidance element 11-261 is in direct contact with the first contact elements 11-2511, and the connection between the first guidance element 11-261 and the first contact elements 11-2511 may be a close fit. Therefore, the first movable part 11-M1 is not in direct contact with the first guidance element 11-261 via the first contact unit 11-251, so that the contact area between the first movable part 11-M1 and the other elements is reduced when the first movable part 11-M1 moves relative to the immovable part 11-I, so that the friction force generated during the movement of the first movable part 11-M1 relative to the immovable part 11-I is reduced.

Furthermore, in this embodiment, the first contact elements 11-2511 are fixedly disposed in the first movable part 11-M1, but the first contact elements 11-2511 may be fixedly disposed in the immovable part 11-I in other embodiments. For example, the first contact elements 11-2511 may be fixedly disposed in the bottom support portion recess (the immovable part recess) 11-3821. Any method that may make the first guidance element 11-261 be in direct contact with the first contact elements 11-2511 so as to reduce the friction force are within the scope of the present disclosure.

To sum up, the contact between the first guidance element 11-261 and the first contact unit 11-251 and/or the contact between the first guidance element 11-261 and the second contact unit 11-252 may reduce the contact area between the first movable part 11-M1 and other elements and/or the contact area between the second movable part 11-M2 and other elements when the first movable part 11-M1 and the second movable part 11-M2 move relative to the immovable part 11-I. Also the second guidance element 11-262 may affix the first movable part 11-M1. Therefore, unwanted shake, vibration, rotation, tilt, etc. of the first movable part 11-M1 and the second movable part 11-M2 may be prevented due to the guidance assembly 11-G. It should be noted that since the size of the first movable part 11-M1 in the first direction 11-A1 is greater than the size of the second movable part 11-M2 in the first direction 11-A1, the distance between the two groups of the first contact unit 11-251 is greater than the two groups of the second contact unit 11-252. Therefore, the range of adjustment or the adjustment tolerance of the first movable part 11-M1 is greater than the range of adjustment or the adjustment tolerance of the second movable part 11-M2. That is, compared to the second movable part 11-M2, unwanted shake, vibration, rotation, tilt, etc. of the first movable part 11-M1 may be easier to prevented.

Based on the present disclosure, an optical element driving mechanism is provided. The optical element driving mechanism may be a periscope optical mechanism, so miniaturization is achieved. The optical element driving mechanism of the present disclosure is easy to be assembled and has great mechanical strength. A plurality of optical elements may be received in the optical element driving mechanism, and focus and/or zoom may be achieved via the movement of the first movable part and/or the second movable part. Stroke or the range of movement of the first movable part and/or the second movable part is increased due to the shape of the drive assembly. The guidance assembly may guide the movement of the first movable part and/or the second movable part in a certain dimension. Additionally, the contact area between the first movable part and/or the second movable part and the other elements is reduced via the guidance assembly. Therefore, the friction force is reduced, and unwanted shake, vibration, rotation, tilt, etc. of the first movable part and/or the second movable part are prevented.

For ease of description, in the following content and the drawings, the first direction 12-D1 (Y-axis), the second direction 12-D2 (Z-axis), and the third direction 12-D3 (X-axis) may be used to describe the direction or orientation. The first direction 12-D1, the second direction 12-D2, and the third direction 12-D3 are different and not parallel to each other. In some embodiments, the first direction 12-D1, the second direction 12-D2, and the third direction 12-D3 are perpendicular or substantially perpendicular to each other.

FIG. 167 is a schematic diagram of an optical system 12-1 according to an embodiment of the disclosure. The optical system 12-1 can be installed in a tablet computer, a smart phone, etc. The optical system 12-1 may be a periscope optical system. The detailed structure of the aforementioned optical system 12-1 will be described below.

The optical system 12-1 includes a first optical module 12-100 and a second optical module 12-200. The first optical module 12-100 is configured to carry an optical assembly, such as one or more optical elements (such as the first and second optical elements 12-LS1 and 12-LS2 in FIG. 168). The second optical module 12-200 carries a third optical element 12-L3, which can be an optical path adjusting unit that can change the optical path of the incident light 12-LT. Specifically, when the incident light 12-LT from the outside is along the main axis 12-Q to the third optical element 12-L3, the third optical element 12-L3 is used to adjust the incident direction and the exit direction of the incident light 12-LT, to change the optical path of the light 12-LT, so that the incident light 12-LT can reach the optical elements 12-LS1 and 12-LS2. The optical elements 12-LS1 and 2LS2 are, for example, lens elements or lens assemblies including a plurality of lens elements. The first optical axis 12-O1 is a virtual axis passing through the centers of the optical elements 12-LS1, 12-LS2. The aforementioned third optical element 12-L3 may be a mirror, a prism, or a beam splitter. The incident light 12-LT enters the second optical module 200, which incident direction is substantially perpendicular to the first optical axis 12-O1, and after being reflected or refracted by the third optical element 12-L3, the incident light 12-LT can pass through the optical elements 12-LS1 and 12-LS2 to reach a photosensitive element to obtain images. Through the internal driving mechanism of the optical system 12-100, the internal optical assemblies can be moved, so as to achieve optical zooming, auto-focusing (AF) or optical image stabilization (OIS).

Referring to FIG. 168 and FIG. 169, which are the schematic diagrams showing the optical system 12-1 in different modes. The optical system 12-1 can drive the optical elements 12-LS1 and 12-LS2 arranged therein by a driving mechanism, so as to achieve optical zoom, auto focus or optical anti-shake. For example, in FIG. 168, a larger distance between the two optical elements 12-LS1 and 12-LS2, the optical system 12-1 is in telephoto mode; in FIG. 169, a smaller distance between the two optical elements 12-LS1 and 12-LS2, and they moving from the left to the right (+Z axis direction) along the first optical axis 12-O1, the optical system 12-1 presents a wide-angle mode.

Referring to FIG. 170, the first optical module 12-100 is used to drive the optical assembly to move, such as driving the first and second optical elements 12-LS1 and 12-LS2 to move. The first optical module 12-100 includes: a first fixed part 12-10, a first movable part 12-30 (may include a lens barrel and a lens holder), and a second movable part 12-40 (may include a lens barrel and a lens holder), a first driving assembly 12-MC1, a second driving assembly 12-MC2 and a guide assembly 12-GU. The first movable part 12-30 is used for connecting the first optical element 12-LT1, and the first driving assembly 12-MC1 is used for driving the first movable part 12-30 to move relative to the first fixed part 12-10. The second movable part 12-40 is used for connecting the first optical element 12-LS2, and the second driving assembly 12-MC2 is used for driving the second movable part 12-40 to move relative to the first fixed part 12-10. The guide assembly 12-GU can be used to guide the first and second movable parts 12-30, 12-40 to move in the first dimension. In some embodiments, the movement in the first dimension includes a movement along the first optical axis 12-O1.

The first fixed part 12-10 includes a housing 12-11, a side plate 12-12, and a barrel 12-13. The side plate 12-12 and the barrel 12-13 are arranged in the housing 12-11, and the side plate 12-12 includes a circuit board assembly 12-PF. The housing 12-11 has an accommodation space for the first movable part 12-30, the first driving assembly 12-MC1, the guide assembly 12-GU, the second movable part 12-40 and the second driving assembly 12-MC2 to be disposed therein, for protection. When viewed along the first optical axis 12-O1 of the first optical element 12-LS1, the first fixed part 12-10 has a polygonal structure.

Referring to FIG. 167, FIG. 168 and FIG. 170, the first fixed part 12-10 includes a first side 12-10S1 extending along a first direction 12-D1 and a second side 12-10S2 extending along a second direction 12-D2. In some embodiments, both the first direction 12-D1 and the second direction 12-D2 are perpendicular to the first optical axis 12-O1. The lengths of the first and second sides 12-10S, 12-10S2 are different. In this embodiment, the length of the first side 12-10S1 is greater than the length of the second side 12-10S2. Referring to FIG. 168, when viewed along the direction of the first optical axis 12-O1, the first driving assembly 12-MC1 is located on the second side 12-10S2. When viewed along the direction of the first optical axis 12-O1, the guide assembly 12-GU is located on the second side 12-10S2, and the first and second position sensing assemblies 12-SN1, 12-SN2 of the first optical module 12-100 is also located on the second side 12-10S2.

Referring to FIG. 170 and FIG. 171, the aforementioned guide assembly 12-GU is a long rod extending along the first optical axis 12-O1 and passing through the first and second movable parts 12-30, 12-40, so that the first and second movable parts 12-30, 12-40 can move or slide on the guide assembly 12-GU. In some embodiments, one end of the guide assembly 12-GU can be fixed to the second optical module 12-200.

Referring to FIG. 171 and FIG. 172, the first driving assembly 12-MC1 is configured to drive the first movable part 12-30, and includes a first piezoelectric element 12-J1 and a first contact element 12-K1 which correspond to each other. The first piezoelectric element 12-J1 has piezoelectric material. In some embodiments, the first piezoelectric element 12-J1 has silicon carbide material. The first piezoelectric element 12-K1 and the first contact element 12-K1 are fixedly disposed on the first movable part 12-30 and the first fixed part 12-10, respectively. When viewed in a direction perpendicular to the first optical axis 12-O1, the first piezoelectric element 12-J1 and the first contact element 12-K1 at least partially overlap.

Similarly, the aforementioned second driving assembly 12-MC2, configured to drive the second movable part 12-40, includes a second piezoelectric element 12-42 and a second contact element 12-K2 which correspond to each other. The second piezoelectric element 12-J2 has a piezoelectric material. The second piezoelectric element 12-J2 and the second contact element 12-K2 are fixedly disposed on the second movable part 12-40 and the first fixed part 12-10, respectively. When viewed along a direction perpendicular to the first optical axis 12-O1, the second piezoelectric element 12-J2 and the second contact element 12-K2 at least partially overlap. When viewed along the direction of the first optical axis 12-O1, the first and second piezoelectric elements 12-J1 and 12-J2 at least partially overlap. When viewed along the direction of the first optical axis 12-O1, the first and second contact elements 12-K1 and 12-K2 at least partially overlap. When viewed along the second direction 12-D2, the first and second contact elements 12-K1 and 12-K2 do not overlap.

In this way, through the first and second drive assemblies 12-MC1, 12-MC2 and the guide assembly 12-GU, the first and second movable parts 12-30, 12-40 can move relative to the first fixed part 12-10, to achieve the effects of optical focus, zoom and anti-shake.

The aforementioned first position sensing assembly 12-SN1 is used to sense the movement of the first movable part 12-30 relative to the first fixed part 12-10. The first optical module 12-100 includes: the second movable parts 12-40, the second driving assembly 12-MC2 and the second position sensing assembly 12-SN2. The second movable part 12-40 is used for connecting the second optical element 12-LS2. The second driving assembly 12-MC2 is used to drive the second movable part 12-MC2 to move relative to the first fixed part 12-10; and the second position sensing assembly 12-SN2 is configured to sense the movement of the second movable part 12-40 relative to the first fixed part 12-10.

Each of the position sensing assemblies 12-SN1, 12-SN2 have a pair of sensing elements. The position sensing assemblies 12-SN1 has a pair of sensing elements 12-SN11, 12-SN12 corresponding to each other, and the position sensing assemblies 12-SN2 has a pair of the sensing elements 12-SN21, 12-SN22 correspond to each other. The sensing elements 12-SN11, 12-SN21 are arranged on the side plates 12-12, and the sensing elements 12-SN12, 12-SN22 are arranged on the first and second movable parts 12-30, 12-40, respectively. In some embodiments, the sensing element 12-SN11 (or 12-SN21) can be one of a permanent magnet and a Hall Effect Sensor, and the sensing element 12-SN12 (or 12-SN22) is the other of the two. The Hall Effect Sensor can detect the change of the magnetic field of the permanent magnet to determine the position of the permanent magnet, thereby sensing the movements of the first and second movable parts 12-30, 12-40 relative to the first fixed part 12-10. When viewed along the direction of the first optical axis 12-O1, the second position sensing assembly 12-SN2 is located on the second side 12-10S2, and the first and second position sensing assemblies 12-SN1, 12-SN2 are at least partially overlapping.

The first optical module 12-100 further includes a first pressure assembly 12-T1 for generating a first pre-load 12-F1 to the first movable part 12-30, so that the first movable part 12-30 is connected to the guide assembly 12-GU stably and movably via the first pre-load 12-F1.

The first pressure assembly 12-T1 includes a first magnetic element 12-M1 and a second magnetic element 12-M2, which are respectively disposed on the first movable part 12-30 and the first fixed part 12-10, and the two correspond to each other to generate the first pre-load 12-F1. In this way, the guide assembly 12-GU can be a center, and first pre-load 12-F1 pushes and stabilize the first movable part 12-30. The direction of the first pre-load 12-F1 is extended from the first movable part 12-30 toward the second side 12-10S2, and the first extension imaginary line 12-FL1 of the first pre-load 12-F1 does not pass through the guide assembly 12-GU. In this embodiment, the first magnetic element 12-M1 has an elongated structure, which can be an elongated rod-shaped magnetic element, and has permeability material, and the second magnetic element 12-M2 is a permanent magnet. In other embodiments, the first magnetic element 12-M1 may be a permanent magnet, and the second magnetic element 12-M2 is a magnetic element.

In some embodiments, the first position sensing assembly 12-SN1 can sense the relative movement of the first movable part 12-30 relative to the first fixed part 12-10 via sensing the relative position of the first magnetic element 12-M1 or the second magnetic element 12-M2. In some embodiments, the first position sensing assembly 12-SN1 may be provided on different position, wherein one of the sensing elements 12-SN11 and 12-SN12 of the first position sensing assembly 12-SN1 (the other one can be omitted) may be placed on the position 12-X1 (as shown in FIG. 171). The movement of the first movable part 30 can be sensed by the position sensing assembly 12-SN1 and the first and second magnetic elements 12-M1, 12-M2. In this configuration, in the central arrangement direction of the first and second magnetic elements 12-M1 and 12-M2, the first position sensing assembly 12-SN1 at least partially overlaps the first magnetic element 12-M1 or the second magnetic element 12-M2, to reduce the number of elements in system 12-1 and save space.

Continuing to refer to FIGS. 170 to 172, the first optical module 12-10 also includes a second pressure assembly 12-T2. Similarly, the second pressure assembly 12-T2 is configured to generate a second pre-load 12-F2 for the second movable part 12-40, and the second movable part 12-40 is stably and movably connected to the guide assembly 12-GU via the second pre-load 12-F2. It should be noted that for simplicity and clarity, the second pre-load 12-F2 is also marked in FIG. 171. Actually, the second pre-load 12-F2 is applied on the second movable part 12-40 (behind the first movable part 12-30), which can be understood with reference to FIGS. 170 to 172.

The direction of the second pre-load 12-F2 extends from the second movable part 12-40 toward the second side 12-10S2, and the second extension imaginary line 12-FL2 of the second pre-load 12-F2 does not pass through the guide assembly 12-GU. The second pressure assembly 12-T2 includes a third magnetic element 12-M3 and a fourth magnetic element 12-M4. The third magnetic element 12-M3 has an elongated structure. The fourth magnetic element 12-M4 corresponds to the third magnetic element 12-M3 to generate the second pre-load 12-F2. At least one of the third and fourth magnetic elements 12-M3 and 12-M4 has a permanent magnet. The third and fourth magnetic elements 12-M3 and 12-M4 are respectively disposed on the second movable part 12-40 and the first fixed part 12-10.

The first and third magnetic elements 12-M1, 12-M3 have a long structure, and also have the function of guiding the movement of the first and second movable parts 12-30, 12-40. In some embodiments, the first and the third magnetic elements 12-ML, 12-M3 can be an integrally formed as one long rod. In some embodiments, the first and third magnetic elements 12-M1 and 12-M3 may be independent long rods.

In some embodiments, the second position sensing assembly 12-SN2 can sense the movement of the second movable part 12-40 relative to the first fixed part 12-10 by sensing the third magnetic element 12-M3 or the fourth magnetic element 12-M4. In some embodiments, the second position sensing assembly 12-SN2 may be provided at different position, similar to the sensing assembly 12-SN1 at position 12-X1, placing the second position sensing assembly 12-SN2 in the center arrangement direction center of the third and fourth magnetic assemblies 12-M3 and 12-M4.

FIG. 173 is a cross-sectional view of an optical system 12-1' according to another embodiment of the disclosure (the housing 12-11 is omitted). Compared with the optical system 12-1 in FIG. 171, the pressure assembly 12-T1' of the optical system 12-1' is different from the pressure assembly 12-T1 in the optical system 12-1. In this embodiment, the pressure assembly 12-T1' includes a first magnetic element 12-M1' and a second magnetic element 12-M2', which are respectively disposed in the first movable part 12-30 and the circuit board assembly 12-PF of the first fixed part 12-10. Similar to the aforementioned pressure assembly 12-T1, the first pre-load 12-F1' is generated by the first magnetic elements 12-M1', 12-M2', and is applied to the first movable part 12-30, so that the first movable part 12-30 can move stably on the guide assembly 12-GU. The second pressure assembly 12-T2 can also be replaced with a configuration similar to the first pressure assembly 12-T1' to stabilize the second movable part 12-40.

Referring to FIG. 167, in some embodiments, the second optical module 12-200 includes a third movable part 12-50, a second fixed part 20, and a third driving assembly 12-MC3. The third movable part 12-50 is used for connecting the third optical element 12-LS3. The third driving assembly is used to drive the third movable part 12-50 to move relative to the second fixed part 12-20. In some embodiments, the third driving assembly 12-MC3 may be an electromagnetic driving assembly including coils and magnetic elements for driving the third movable part 12-50 relative to the second fixed part 12-20. The movement in a second dimension is different from the aforementioned first dimension. In some embodiments, the movement in the second dimension is a rotation around an axis, wherein the axis is extending along a third direction 12-D3 (Z-axis).

FIG. 174 is a schematic diagram showing an optical system 12-2 of another embodiment of the present disclosure. Compared with the optical system 12-1 of the foregoing embodiment (FIG. 167), the optical system 12-2 in this embodiment further includes a third optical module 12-300. Other elements/assemblies are the same as or corresponding to the elements/assemblies of the optical system 12-1 in FIG. 167. In some embodiments, the second optical module 12-200 is located between the first and third optical modules 12-100 and 12-300.

The third optical module 12-300 is used to connect a fourth optical element 12-LS4 with a second optical axis. The external light 12-LT can pass through the fourth optical element 12-LS4 to enter the second optical module 12-200. The first and second optical axes 12-O1 and 12-O2 are not parallel.

In some embodiments, the fourth optical element 12-LS4 includes a plurality of optical lenses, and the first optical element 12-LS1 includes at least one optical lens. In some embodiments, the number of optical lenses of the fourth optical element 12-LS4 is greater than the number of optical lenses of the first optical element 12-LS1.

The third optical module 12-300 includes a third fixed part 12-301, a fourth movable part 12-302, and a fourth driving assembly 12-MC4. The fourth movable part 12-302 is used to connect the fourth optical element 12-LS4. In some embodiments, the fourth driving assembly 12-MC4 may be an electromagnetic driving assembly including coils and magnetic elements for driving the fourth movable part 12-302 to move relative to the third fixed part 12-301. In some embodiments, the fourth driving assembly 12-MC4 is used to drive the fourth movable part 12-302 to move in a third dimension relative to the third fixed part 12-301. In some embodiments, the third dimension is different from the aforementioned first dimension. In some embodiments, the third dimension is different from the second dimension.

In summary, an embodiment of the present invention provides an optical system, including a first optical module for driving an optical assembly to move, the first optical module including: a first movable part for connecting an optical element; a first fixed part, wherein the first movable part is movable relative to the first fixed part; and a first driving assembly for driving the first movable part to move relative to the first fixed part. The first optical module further includes a guide assembly for guiding the first movable part to move in a first dimension.

The embodiment of the present invention has at least one of the following advantages or effects. The optical element holder is driven and guided by the driving assembly and the guide assembly arranged on the side of the optical system, which makes the optical system obtain better optical quality. Furthermore, the wide range of zoom, focus and optical anti-shake adjustment shooting range can be enhanced, and it can also save configuration space, which is conducive to miniaturization. In some embodiments, through the pressure assembly, the optical element or the moving optical element can be stabilized, which greatly increases the optical quality.

Referring to FIG. 175 and FIG. 176, in an embodiment of the invention, an optical system 13-10 can be disposed in an electronic apparatus 13-20 and used to take photographs or record video. The electronic apparatus 13-20 can be a smartphone, a laptop computer, or a digital camera, for example. The optical system 13-10 can include two optical devices 13-11 and 13-12 adjacent to each other. The optical device 13-11 and the optical device 13-12 can respectively receive a first light 13-L1 and a second light 13-L2. The focal length of the optical device 13-11 is greater than that of the optical device 13-12. Therefore, the optical device can be a telephoto camera device, and the optical device 13-12 can be a wide angle camera device.

FIG. 177, FIG. 178, and FIG. 179 are schematic diagrams of the aforementioned optical device 13-11. As shown in the figures, the optical device 13-11 primarily includes a first optical module 13-100, a second optical module 13-200, a third optical module 13-300, a fourth optical module 13-400, a fifth optical module 13-500, a sixth optical module 13-600, a seventh optical module 13-700, an eighth optical module, and a ninth optical module 13-900. After the first light 13-L1 passes through an opening 13-11A of the optical device 13-11 and enters the optical device 13-11, it can reach the third optical module 13-300 via the first optical module 13-100, the second optical module 13-200, the fourth optical module 13-400, the sixth optical module 13-600, the ninth optical module 13-900, the eighth optical module 13-800, the fifth optical module 13-500, and the seventh optical module 13-700 in sequence. The aforementioned members are discussed below.

The first optical module 13-100 includes a first light path adjusting member 13-110 and a first driving mechanism 13-120. The first light path adjusting member 13-100 can be a prism or a mirror, and its reflecting surface faces the opening 13-11A of the optical device 13-11. After the first light 13-L1 moves along a first moving direction 13-D1 (–Z-axis in the figures) and passes through the opening 13-11A, the first light 13-L1 is reflected by the reflecting surface and moves along a second moving direction 13-D2 (X-axis in the figures). In other words, the first light path adjusting member 13-110 can adjust the moving direction of the first light 13-L1 from the first moving direction 13-D1 to the second moving direction 13-D2, and the first moving direction 13-D1 is not parallel to the second moving direction 13-D2.

The first driving mechanism 13-120 can drive the first light path adjusting member 13-110 to rotate, so as to slightly adjust the second moving direction 13-D2 of the first light 13-L1 to achieve the purpose of optical image stabilization (OIS). For example, the first driving mechanism 13-120 can drive the first light path adjusting member 13-110 to rotate relative to the electronic apparatus 13-20 around a first axis 13-AX1 and a second axis 13-AX2. The first axis 13-AX1 is substantially perpendicular to the first moving direction 13-D1 and the second moving direction 13-D2. The second axis 13-AX2 is not perpendicular and not parallel to the first moving direction 13-D1 and the second moving direction 13-D2.

For example, the first driving mechanism 13-120 can include a coil and a magnet. Of the coil and the magnet, one is connected to the first light path adjusting member 13-110, and the other is connected to the electronic apparatus 13-20. The magnetic pushing force between the coil and the magnet can generate rotation in the first light path adjusting member 13-110. In this embodiment, the electronic apparatus 13-20 has a plate structure, and the thickness of the electronic apparatus 13-20 is parallel to the first moving direction 13-D1. The arrangement direction of the first driving mechanism 13-120 and the first light path adjusting member 13-110 is also parallel to the first moving direction 13-D1. Therefore, as seen from the first moving direction 13-D1, the first driving mechanism 13-120 overlaps the first light path adjusting member 13-110. The optical devices 13-11 and 13-12 can be closer, and the optical performance of the optical system 13-10 can be enhanced.

For details of the structures of the first optical module 13-100, refer to the optical element driving mechanism 4-300 shown in FIG. 35 to FIG. 49, the optical element driving mechanism 7-10 shown in FIG. 78 to FIG. 90, or the optical element driving mechanism 9-100 shown in FIG. 98 to FIG. 112, so that the features thereof are not repeated in the interest of brevity.

The second optical module 13-200 includes a first optical assembly 13-210 and a second driving mechanism 13-220. After the first light 13-L1 is reflected by the first light path adjusting member 13-110, the first light 13-L1 moves in the second moving direction 13-D2 and is received by the first optical assembly 13-210 of the second optical module 13-200. As shown in FIG. 177 and FIG. 178, the first optical assembly 13-210 includes a first lens 13-211 and a second lens 13-212, and the first lens 13-211 is disposed between the first light path adjusting member 13-110 and the second lens 13-212. Therefore, the first light 13-L1 reflected by the first light path adjusting member 13-110 passes through the first lens 13-211 and the second lens 13-212 in sequence. In this embodiment, both the first lens 13-211 and the second lens 13-212 include circular structure, and the dimensions of the first lens 13-211 are smaller than those of the second lens 13-212.

The first optical assembly 13-210 includes a first optical axis 13-OP1 parallel to the second moving direction 13-D2. In this embodiment, the second optical module 13-200 is configured to focus, so that the second driving mechanism 13-220 can drive the first optical assembly 13-210 to move relative to the electronic apparatus 13-20 along the first optical axis 13-OP1. In some embodiments, the arrangement direction of the second driving mechanism 13-220 and the first optical assembly 13-210 is not parallel to the first moving direction 13-D1, and the second driving mechanism 13-220 and the first optical assembly 13-210 do not overlap as seen from the first moving direction 13-D1.

For example, the second driving mechanism 13-220 can include a coil and a magnet. Of the coil and the magnet, one is connected to the first optical assembly 13-210, and the other is connected to the electronic apparatus 13-20. The magnetic pushing force between the coil and the magnet can generate the movement of the first optical assembly 13-210. For details of the structures of the second optical module 13-200, refer to the optical element driving mechanism 2-100 shown in FIG. 13 to FIG. 24, the optical element driving mechanism 3-100 shown in FIG. 25 to FIG. 34, the optical element driving mechanism 5-10 shown in FIG. 50 to FIG. 77, the optical element driving mechanism 10-100 shown in FIG. 113 to FIG. 145, or the optical element driving mechanism 11-10 shown in FIG. 146 to FIG. 166, so that the features thereof are not repeated in the interest of brevity. In some embodiments, the second optical module 13-200 can use a piezoelectric driving mechanism, and details of the structures can be discerned by analogy by referring to the first optical module 12-100 shown in FIG. 167 to FIG. 174.

The fourth optical module 13-400 includes a second optical assembly 13-410 and a third driving mechanism 13-420. The first light 13-L1 passing the second optical module 13-200 continues to move in the second moving direction 13-D2 and is received by the second optical assembly 13-410 of the fourth optical module 13-400. As shown in FIG. 177 and FIG. 178, the second optical assembly 13-410 includes a third lens 13-411 and a fourth lens 13-412, and the third lens 13411 is disposed between the second lens 13-212 and the fourth lens 13-412. Therefore, the first light 13-L1 entering the second optical assembly 13-410 passes through the third lens 13-411 and the fourth lens 13412 in sequence. In this embodiment, the dimensions of the second lens 13-212 are smaller than those of the third lens 13-411, and the dimensions of the third lens 13-411 are smaller than those of the fourth lens 13-412.

The second optical assembly 13-410 includes a second optical axis 13-OP2 parallel to the second moving direction 13-D2. In this embodiment, the fourth optical module 13-400 is configured to provide optical image stabilization, so that the third driving mechanism 13-420 can drive the second optical assembly 13-410 to move relative to the electronic apparatus 13-20 along a first shifting direction 13-M1 (Y-axis in the figures) and/or a second shifting direction 13-M2 (Z-axis in the figures), wherein the first shifting direction 13-M1 is substantially perpendicular to the second shifting direction 13-M2, and both the first shifting direction 13-M1 and the second shifting direction 13-M2 are substantially perpendicular to second optical axis 13-OP2. In some embodiments, the third optical axis 13-OP2 is not parallel and not perpendicular to the first shifting direction 13-M1 and the second shifting direction 13-M2. In some embodiments, the arrangement direction of the third driving mechanism 13-420 and the second optical assembly 13-410 is not parallel to the first moving direction 13-D1, and the third driving mechanism 13-420 and the second optical assembly 13-410 do not overlap as seen from the first moving direction 13-D1.

For example, the third driving mechanism 13-420 can include a coil and a magnet. Of the coil and the magnet, one is connected to the second optical assembly 13-410, and the other is connected to the electronic apparatus 13-20. The magnetic pushing force between the coil and the magnet can generate the movement of the second optical assembly 13-410. A detailed description of the structures of the fourth optical module 13-400 can be discerned by analogy by referring to the optical element driving mechanism 2-100 shown in FIG. 13 to FIG. 24, the optical element driving mechanism 3-100 shown in FIG. 25 to FIG. 34, or the optical element driving mechanism 5-10 shown in FIG. 50 to FIG. 77, so that the features thereof are not repeated in the interest of brevity.

Referring to FIG. 177 and FIG. 178, the sixth optical module 13-600 includes a second light path adjusting member 13-610 and a fourth driving mechanism 13-620, wherein the second light path adjusting member 13-610 can be a prism or a mirror. After the first light 13-L1 passes the fourth optical module 13-400, the first light 13-L1 is reflected by the second light path adjusting member 13-610 and moves along a third moving direction 13-D3 (Y-axis in the figures). In other words, the second light path adjusting member 13-610 can adjust the moving direction of the first light 13-L1 from the second moving direction 13-D2 to the third moving direction 13-D3, and the second moving direction 13-D2 is not parallel to the third moving direction 13-D3.

The fourth driving mechanism 13-620 can drive the second light path adjusting member 13-610 to rotate, so as to slightly adjust the third moving direction 13-D3 of the first light 13-L1 to achieve the purpose of optical image stabilization. For example, the fourth driving mechanism 13-620 can drive the second light path adjusting member 13-610 to rotate relative to the electronic apparatus 13-20 around a third axis 13-AX3 and a fourth axis 13-AX4. The third axis 13-AX3 is substantially perpendicular to the second moving direction 13-D2 and the third moving direction 13-D3. The fourth axis 13-AX4 is not perpendicular and not parallel to the second moving direction 13-D2 and the third moving direction 13-D3.

In this embodiment, the second light path adjusting member 13-610 reflects the first light 13-L to the lateral side, so that the third moving direction 13-D1 is not parallel to the first moving direction 13-D1. In this embodiment, the arrangement direction of the fourth driving mechanism 13-620 and the second light path adjusting member 13-610 is not parallel to the first moving direction 13-D1, and the fourth driving mechanism 13-620 and the second light path adjusting member 13-610 do not overlap as seen from the first moving direction.

For example, the fourth driving mechanism 13-620 can include a coil and a magnet. Of the coil and the magnet, one is connected to the second light path adjusting member 13-610, and the other is connected to the electronic apparatus 13-20. The magnetic pushing force between the coil and the magnet can generate rotation in the second light path adjusting member 13-610. Details of the structures of the sixth optical module 13-600 can be discerned by analogy by referring to the optical element driving mechanism 4-300 shown in FIG. 35 to FIG. 49, the optical element driving mechanism 7-10 shown in FIG. 78 to FIG. 90, or the optical element driving mechanism 9-100 shown in FIG. 98 to FIG. 112, so that the features thereof are not repeated in the interest of brevity.

Referring to FIG. 177 and FIG. 179, the eighth optical module 13-800 includes a third light path adjusting member 13-810 and a sixth driving mechanism 13-820, wherein the third light path adjusting member 13-810 can be a prism or a mirror. The first light 13-L1 reflected by the second light path adjusting member 13-610 can reach the eighth optical module 13-800, and then the third light path adjusting member 13-810 can reflect the first light 13-L1 to move along a fourth moving direction 13-D4 (−X-axis in the figures). In other words, the third light path adjusting member 13-810 can adjust the moving direction of the first light 13-L1 from the third moving direction 13-D3 to the fourth moving direction 13-D4, and the third moving direction 13-D3 is not parallel to the fourth moving direction 13-D4.

The sixth driving mechanism 13-820 can drive the third light path adjusting member 13-810 to rotate, so as to slightly adjust the fourth moving direction 13-D4 of the first light 13-L1 to achieve the purpose of optical image stabilization. For example, the sixth driving mechanism 13-820 can drive the third light path adjusting member 13-810 to rotate relative to the electronic apparatus 13-20 around a fifth axis 13-AX5 and a sixth axis 13-AX6. The fifth axis 13-AX5 is substantially perpendicular to the third moving direction 13-D3 and the fourth moving direction 13-D4. The sixth axis 13-AX6 is not perpendicular and not parallel to the third moving direction 13-D3 and the fourth moving direction 13-D4.

For example, the sixth driving mechanism 13-820 can include a coil and a magnet. Of the coil and the magnet, one is connected to the third light path adjusting member 13-810, and the other is connected to the electronic apparatus 13-20. The magnetic pushing force between the coil and the magnet can generate rotation in the third light path adjusting member 13-810. In this embodiment, the fourth moving direction 13-D4 is parallel to the second moving direction, so that the arrangement direction of the sixth driving mechanism 13-820 and the third light path adjusting member 13-810 is not parallel to the first moving direction 13-D1, and the sixth driving mechanism 13-820 and the third light path adjusting member 13-810 do not overlap as seen from the first moving direction 13-D1.

In some embodiments, the fourth direction 13-D1 is parallel to the first moving direction 13-D1, so that the arrangement direction of the sixth driving mechanism 13-820 and the third light path adjusting member 13-810 is parallel to the first moving direction 13-D1, and the sixth driving mechanism 13-820 and the third light path adjusting member 13-810 are overlapped as seen from the first moving direction 13-D1.

The structures of the eighth optical module 13-800 can be discerned by analogy by referring to the optical element driving mechanism 4-300 shown in FIG. 35 to FIG. 49, the optical element driving mechanism 7-10 shown in FIG. 78 to FIG. 90, or the optical element driving mechanism 9-100 shown in FIG. 98 to FIG. 112, so that the features thereof are not repeated in the interest of brevity.

The fifth optical module 13-500 includes a third optical assembly 13-510. After the first light 13-L1 is reflected by the third light path adjusting member 13-810, the first light 13-L1 moves in the fourth moving direction 13-D4 and is received by the third optical assembly 13-510 of the fifth optical module 13-500. The third optical assembly 13-510 includes a fifth lens 13-511 and a sixth lens 13-512, and the fifth lens 13-511 is disposed between the third light path adjusting member 13-810 and the sixth lens 13-512. Therefore, the first light 13-L1 reflected by the third light path adjusting member 13-810 passes through the fifth lens 13-511 and the sixth lens 13-512 in sequence. In this embodiment, the dimensions of the fourth lens 13-412 are smaller than those of the fifth lens 13-511, and the dimensions of the fifth lens 13-511 are smaller than those of the sixth lens 13-512.

The third optical assembly 13-510 includes a third optical axis 13-OP3, and the third optical axis 13-OP3 is substantially parallel to the fourth moving direction 13-D4. In this embodiment, the position of the fifth optical module 13-500 is fixed relative to the electronic apparatus 13-20.

The seventh optical module 13-700 includes a fourth optical assembly 13-710 and a fifth driving mechanism 13-720. The first light 13-L1 passing the fifth optical module 13-500 continues to move in the fourth moving direction 13-D4 and is received by the fourth optical assembly 13-710 of the seventh optical module 13-700. As shown in FIG. 177 and FIG. 179, the fourth optical assembly 13-710 includes a seventh lens 13-711 and an eighth lens 13-712, and the seventh lens 13-711 is disposed between the sixth lens 13-512 and the eighth lens 13-712. Therefore, the first light 13-L1 entering the seventh optical module 13-700 can pass through the seventh lens 13-711 and the eighth lens 13-712 in sequence. In this embodiment, the dimensions of the sixth lens 13-512 are smaller than those of the seventh lens 13-711, and the dimensions of the seventh lens 13-711 are smaller than those of the eighth lens 13-712.

Specifically, in order to make the electronic apparatus 13-20 thinner, in the direction of the thickness of the electronic apparatus 13-20, the ends of the seventh lens 13-711 and the eighth lens 13-712 can be trimmed and form trimming planes 13-711A and 13-712A. Since the trimming portions are situated at the ends of the seventh lens 13-711 and the eighth lens 13-712, the optical character of the optical device 13-11 is not affected. In contrast to the seventh lens 13-711 and the eighth lens 13-712, each of the first lens 13-211, the second lens 13-212, the third lens 13-411, the fourth lens 13-412, the fifth lens 13-511, and the sixth lens 13-512 includes a circular structure without trimming.

The fourth optical assembly 13-710 includes a fourth optical axis 13-OP4 parallel to the fourth moving direction 13-D4. In this embodiment, the seventh optical module 13-700 is configured to zoom, so that the fifth driving mechanism 13-720 can drive the fourth optical assembly 13-710 to move relative to the electronic apparatus 13-20 along the fourth optical axis 13-OP4, and the largest movement range of the fourth optical assembly 13-710 relative to the electronic apparatus 13-20 along the fourth optical axis 13-OP4 is greater than the largest movement range of the second optical assembly 13-410 relative to the electronic apparatus 13-20 along the second optical axis 13-OP2.

For example, the fifth driving mechanism 13-720 can include a coil and a magnet. Of the coil and the magnet, one is connected to the fourth optical assembly 13-710, and the other is connected to the electronic apparatus 13-20. The magnetic pushing force between the coil and the magnet can generate the movement of the fourth optical assembly 13-710. The structures of the seventh optical module 13-700 can be discerned by analogy by referring to the optical element driving mechanism 2-100 shown in FIG. 13 to FIG. 24, the optical element driving mechanism 3-100 shown in FIG. 25 to FIG. 34, the optical element driving mechanism 5-10 shown in FIG. 50 to FIG. 77, the optical element driving mechanism 10-100 shown in FIG. 113 to FIG. 145, or the optical element driving mechanism 11-10 shown in FIG. 146 to FIG. 166, so that the features thereof are not repeated in the interest of brevity. In some embodiments, the seventh optical module 13-700 can use a piezoelectric driving mechanism, and details of the structures can be discerned by analogy by referring to the first optical module 12-100 shown in FIG. 167 to FIG. 174.

The third optical module 13-300 includes a first photoelectric converter 13-310 and a seventh driving mechanism 13-320. After the first light 13-L1 passes through the seventh optical module 13-710, it reaches the first photoelectric converter 13-310. The first photoelectric converter 13-310 can transform the first light 13-L1 into a first image signal, and transmit the first image signal to a processor (not shown) in the electronic apparatus 13-20, where post-processing of the images can be performed.

The surface of the first photoelectric converter 13-310 receiving the first light 13-L1 is a receiving surface 13-311, and the first photoelectric converter 13-310 includes a fifth optical axis 13-OP5. The fifth optical axis 13-OP5 is parallel to the fourth moving direction 13-D4 and perpendicular to the receiving surface 13-311. The seventh driving mechanism 13-320 can drive the first photoelectric converter 13-310 to rotate relative to the electronic apparatus 13-20 around a fifth optical axis 13-OP5 to achieve the purpose of optical image stabilization. In this embodiment, the seventh driving mechanism 13-320 can further drive the first photoelectric converter 13-310 to rotate relative to the electronic apparatus 13-20 around a seventh axis 13-AX7 (Y-axis in the figures) and an eighth axis 13-AX8 (Z-axis in the figures). Both the seventh axis 13-AX7 and the eighth axis 13-AX8 are substantially perpendicular the fifth optical axis 13-OP5, and the seventh axis 13-AX7 is not parallel to the eight axis 13-AX8.

For example, the seventh driving mechanism 13-320 can include a coil and a magnet. Of the coil and the magnet, one is connected to the first photoelectric converter 13-310, and the other is connected to the electronic apparatus 13-20. The magnetic pushing force between the coil and the magnet can generate rotation in the first photoelectric converter 13-310.

As shown in FIG. 177, in this embodiment, the ninth optical module 13-900 is disposed between the sixth optical module 13-600 and the eighth optical module 13-800. The ninth optical module 13-900 includes an iris aperture 13-910 and an eighth driving mechanism 13-920. The iris aperture 13-910 is configured to adjust the amount of light passing through the iris aperture 13-910, and eighth optical module 13-800 is configured to change the size of the iris aperture 13-910.

The iris aperture 13-910 includes a sixth optical axis 13-OP6. Since the ninth optical module 13-900 in this embodiment is disposed between the sixth optical module 13-600 and the eighth optical module 13-800, the sixth optical axis 13-OP6 is parallel to the third moving direction 13-D3 and not parallel to the first moving direction 13-D1, the second moving direction 13-D2, and the fourth moving direction 13-D4.

Although the ninth optical module 13-900 in this embodiment is disposed between the sixth optical module 13-600 and the eighth optical module 13-800, the position of the ninth optical module 13-900 can be adjusted as required. For example, the ninth optical module 13-900 can be disposed between the opening 13-11A and the first optical module 13-100, between the first optical module 13-100 and the second optical module 13-200, between the second optical module 13-200 and the fourth optical module 13-400, between the fourth optical module 13-400 and the sixth optical module 13-600, between the eighth optical module 13-800 and the fifth optical module 13-500, or between the fifth optical module 13-500 and the seventh optical module 13-700. When the ninth optical module 13-900 is disposed between the first optical module 13-100 and the second optical module 13-200, between the second optical module 13-200 and the fourth optical module 13-400, between the fourth optical module 13-400 and the sixth optical module 13-600, the eighth optical module 13-800 and the sixth optical axis 13-OP6 do not overlap as seen from the first moving direction 13-D1.

Referring to FIG. 175 and FIG. 176, the optical device 13-12 includes a lens 13-12B and a second photoelectric converter 13-12C. After the second light 13-L2 passes through the opening 13-12A of the optical device 13-12, the second light 13-L2 reaches the second photoelectric converter 13-12C. The second photoelectric converter 13-12C can transform the second light 13-L2 into a second image signal, and transmit the second image signal to the processor in the electronic apparatus 13-20, where post-processing of the images can be performed.

A distance between the first photoelectric converter 13-310 of the optical device 13-11 and the second photoelectric converter 13-12C of the optical device 13-12 is not zero, and the optical device 13-11 and the optical device 13-12 are overlapped with each other as seen from all directions perpendicular to the first moving direction 13-D1. Therefore, the space in the electronic apparatus 13-20 can be full used.

In the aforementioned embodiment, the second optical module 13-200, the fourth optical module 13-400, and the seventh optical module 13-700 are respectively used to focus, provide optical image stabilization, and zoom, but it is not limited thereto. In some embodiments, one or more of the second optical module 13-200, the fourth optical module 13-400, the fifth optical module 13-500, and the seventh optical module 13-700 can be used to focus, one or more of the second optical module 13-200, the fourth optical module 13-400, the fifth optical module 13-500, and the seventh optical module 13-700 can be used to provide optical image stabilization, and one or more of the second optical module 13-200, the fourth optical module 13-400, the fifth optical module 13-500, and the seventh optical module 13-700 can be used to zoom. In some embodiments, the positions of the second optical module 13-200, the fourth optical module 13-400, the fifth optical module 13-500, and the seventh optical module 13-700 can be adjusted as required. For example, each of them can be disposed between the opening 13-11A and the first optical module 13-100, between the first optical module 13-100 and the sixth optical module 13-600, between the sixth optical module 13-600 and the eighth optical module 13-800, or between the eighth optical module 13-800 and the third optical module 13-300. It should be noted that, no matter where the second optical module 13-200, the fourth optical module 13-400, the fifth optical module 13-500, and the seventh optical module 13-700 are disposed, the second optical module 13-200, the fourth optical module 13-400, the fifth optical module 13-500, and the seventh optical module 13-700 should be disposed on the light path of the first light 13-L1 in sequence.

Referring to FIG. 180, in another embodiment, the ninth optical module 13-900 is disposed between the second optical module 13-200 and the fourth optical module 13-400, and the fifth optical module 13-500 and the seventh optical module 13-700 are omitted. The fifth optical axis 13-OP5 of the first photoelectric converter 13-310 is parallel to the fourth moving direction 13-D4, and the first photoelectric converter 13-310 overlaps the third light path adjusting member 13-810 as seen from the fourth moving direction 13-D4. Since the third optical module 13-300 is closely adjacent to the eighth optical module 13-800, the seventh driving mechanism 13-320 of the third optical module 13-300 overlaps the third light path adjusting member 13-810 as seen from a direction that is perpendicular to the fourth moving direction 13-D4.

Referring to FIG. 181, in another embodiment, the ninth optical module 13-900 is disposed between the second optical module 13-200 and the fourth optical module 13-400, and the fifth optical module 13-500, the seventh optical module 13-700, and the eighth optical module 13-800 are omitted. The first light 13-L1 is reflected by the sixth optical module 13-600 to move in the direction which the thickness of the electronic apparatus 13-20 be measured. Therefore, the third moving direction 13-D3 is parallel to the first moving direction 13-D1, and the arrangement direction of the fourth driving mechanism 13-620 and the second light path adjusting member 13-610 is parallel to the first moving direction 13-D1. As seen from the first moving direction 13-D1, the seventh driving mechanism 13-320 of the third optical module 13-300 overlaps the second light path adjusting member 13-610.

The fifth optical axis 13-OP5 of the first photoelectric converter 13-310 is parallel to the third moving direction 13-D3, and the first photoelectric converter 13-310 overlaps the second light path adjusting member 13-610 as seen from the third moving direction 13-D3. Since the third optical module 13-300 is closely adjacent to the sixth optical module 13-600, the seventh driving mechanism 13-320 of the third optical module 13-300 overlaps the second light path adjusting member 13-610 as seen from the direction that is perpendicular to the third moving direction 13-D3.

In this embodiment, since the first photoelectric converter 13-310 is horizontally disposed in the electronic apparatus 13-20, the thickness of the electronic apparatus 13-20 can be reduced. The miniaturization of the electronic apparatus 13-20 can be facilitated.

Referring to FIG. 182 and FIG. 183, in another embodiment, the seventh optical module 13-700' includes a plurality of fourth optical assemblies 13-710'. These fourth optical assemblies 13-710' have different focal lengths, and are disposed on a frame 13-730'. The fifth driving mechanism 13-720' of the seventh optical module 13-700' can drive the frame 13-730' to move in a direction that is perpendicular to the fourth moving direction 13-D4, so as to dispose different fourth optical assemblies 13-710' on the light path of the first light 13-L1. For example, the fifth driving mechanism 13-720' can include a coil and a magnet. Of the coil and the magnet, one is connected to the frame 13-730', and the other is connected to the electronic apparatus 13-20. The magnetic pushing force between the coil and the magnet can generate the movement of the frame 13-730'.

Referring to FIG. 184, in some embodiments, the members in the optical device 13-11 can be affixed to each other by a fixed frame and/or adhesive members. As shown in the figures, the first optical module 13-100 can be affixed to the fixed frame 13-11B via a first adhesive member 13-11C, the second optical module 13-200 can be affixed to the fixed frame 13-11B via a second adhesive member 13-11D, and the third optical module 13-300 can be affixed to the fixed frame 13-11B via the third adhesive member 13-11E. The distance between the first optical module 13-100 and the second optical module 13-200 is not zero, the distance between the first optical module 13-100 and the third optical module 13-300 is not zero, and the distance between the second optical module 13-200 and the third optical module 13-300 is not zero.

The first adhesive member 13-11C, the second adhesive member 13-11D, and the third adhesive member 13-11E are light-curing glue or thermal-curing glue. In assembly, the user can adjust the positions of the first optical module 13-100 and the second optical module 13-200 to theirs predetermined positions before the first adhesive member 13-11C and the second adhesive member 13-11D are cured, so as to align the first optical axis 13-OP1 with the first axis 13-AX1 in the X-axis. Similarly, the user can also adjust the position of the third optical module 13-300 to its predetermined positions before the third adhesive member 13-11E is cured. The fourth optical module 13-400, the fifth optical module 13-500, the sixth optical module 13-600, the seventh optical module 13-700, the eighth optical module 13-800, and the ninth optical module 13-900 can be disposed on the fixed frame 13-11B by using the same method, so that the features thereof are not repeated in the interest of brevity. After the positions of the members in the optical device 13-11 are already adjusted, the adhesive members can be cured by light or heat.

In some embodiments, the fixed frame 13-11B can be omitted. The first adhesive member 13-11C is directly in contact with the first optical module 13-100 and the third optical module 13-300, and the second adhesive member 13-11D is directly in contact with the second optical module 13-200 and the third optical module 13-300, so that the members in the optical device 13-11 can be affixed to each other.

In summary, an optical system affixed to an electronic apparatus is provided. The optical system includes a first optical module, a second optical module, and a third optical module. The first optical module is configured to adjust the moving direction of a first light from a first moving direction to a second moving direction, wherein the first moving direction is not parallel to the second moving direction. The second optical module is configured to receive the first light moving in the second moving direction. The first light reaches the third optical module via the first optical module and the second optical module in sequence. The third optical module includes a first photoelectric converter, configured to transform the first light into a first image signal. The relative position and the dimensions relationship between the members in this disclosure are special. According to the aforementioned relative position and the dimensions relationship, the optical system can be thinner in a specific direction, and the optical system can be miniaturized. Moreover, the system can enhance its optical quality (such as the image quality or the depth sensing accuracy) by using different optical modules. The efficacy of optical image stabilization can be also greatly enhanced by a multiple optical image stabilization system formed by the optical modules.

Referring to FIG. 185 and FIG. 186, in an embodiment of the invention, an optical system 14-10 can be disposed in an electronic apparatus 14-20 and used to take photographs or record video. The electronic apparatus 14-20 can be a smartphone, a laptop computer, or a digital camera, for example. The optical system 14-10 can include two optical devices 14-11 and 14-12 adjacent to each other. The optical device 14-11 and the optical device 14-12 can respectively receive a first light 14-L1 and a second light 14-L2. The focal length of the optical device 14-11 is greater than that of the optical device 14-12. Therefore, the optical device can be a telephoto camera device, and the optical device 14-12 can be a wide angle camera device.

FIG. 187, FIG. 188, and FIG. 189 are schematic diagrams of the aforementioned optical device 14-11. As shown in the figures, the optical device 14-11 primarily includes a first optical module 14-100, a second optical module 14-200, a third optical module 14-300, a fourth optical module 14-400, a fifth optical module 14-500, a sixth optical module 14-600, a seventh optical module 14-700, an eighth optical module, and a ninth optical module 14-900. After the first light 14-L11 passes through an opening 14-11A of the optical device 14-11 and enters the optical device 14-11, it can reach the third optical module 14-300 via the first optical module 14-100, the second optical module 14-200, the fourth optical module 14-400, the sixth optical module 14-600, the ninth optical module 14-900, the eighth optical module 14-800, the fifth optical module 14-500, and the seventh optical module 14-700 in sequence. The aforementioned members are discussed below.

The first optical module 14-100 includes a first light path adjusting member 14-110 and a first driving mechanism 14-120. The first light path adjusting member 14-100 can be a prism or a mirror, and its reflecting surface faces the opening 14-11A of the optical device 14-11. After the first light 14-L1 moves along a first moving direction 14-D1 (−Z-axis in the figures) and passes through the opening 14-11A, the first light 14-L1 is reflected by the reflecting surface and moves along a second moving direction 14-D2 (X-axis in the figures). In other words, the first light path adjusting member 14-110 can adjust the moving direction of the first light 14-L1 from the first moving direction 14-D1 to the second moving direction 14-D2, and the first moving direction 14-D1 is not parallel to the second moving direction 14-D2.

The first driving mechanism 14-120 can drive the first light path adjusting member 14-110 to rotate, so as to slightly adjust the second moving direction 14-D2 of the first light 14-L1 to achieve the purpose of optical image stabilization (OIS). For example, the first driving mechanism

14-120 can drive the first light path adjusting member 14-110 to rotate relative to the electronic apparatus 14-20 around a first axis 14-AX1 and a second axis 14-AX2. The first axis 14-AX1 is substantially perpendicular to the first moving direction 14-D1 and the second moving direction 14-D2. The second axis 14-AX2 is not perpendicular and not parallel to the first moving direction 14-D1 and the second moving direction 14-D2.

For example, the first driving mechanism 14-120 can include a coil and a magnet. Of the coil and the magnet, one is connected to the first light path adjusting member 14-110, and the other is connected to the electronic apparatus 14-20. The magnetic pushing force between the coil and the magnet can generate rotation in the first light path adjusting member 14-110. In this embodiment, the electronic apparatus 14-20 has a plate structure, and the thickness of the electronic apparatus 14-20 is parallel to the first moving direction 14-D1. The arrangement direction of the first driving mechanism 14-120 and the first light path adjusting member 14-110 is also parallel to the first moving direction 14-D1. Therefore, as seen from the first moving direction 14-D1, the first driving mechanism 14-120 overlaps the first light path adjusting member 14-110. The optical devices 14-11 and 14-12 can be closer, and the optical performance of the optical system 14-10 can be enhanced.

For details of the structures of the first optical module 14-100, refer to the optical element driving mechanism 4-300 shown in FIG. 35 to FIG. 49, the optical element driving mechanism 7-10 shown in FIG. 78 to FIG. 90, or the optical element driving mechanism 9-100 shown in FIG. 98 to FIG. 112, so that the features thereof are not repeated in the interest of brevity.

The second optical module 14-200 includes a first optical assembly 14-210 and a second driving mechanism 14-220. After the first light 14-L1 is reflected by the first light path adjusting member 14-110, the first light 14-L1 moves in the second moving direction 14-D2 and is received by the first optical assembly 14-210 of the second optical module 14-200. As shown in FIG. 187 and FIG. 188, the first optical assembly 14-210 includes a first lens 14-211 and a second lens 14-212, and the first lens 14-211 is disposed between the first light path adjusting member 14-110 and the second lens 14-212. Therefore, the first light 14-L1 reflected by the first light path adjusting member 14-110 passes through the first lens 14-211 and the second lens 14-212 in sequence. In this embodiment, the dimensions of the first lens 14-211 are larger than those of the second lens 14-212.

The first optical assembly 14-210 includes a first optical axis 14-OP1 parallel to the second moving direction 14-D2. In this embodiment, the second optical module 14-200 is configured to focus, so that the second driving mechanism 14-220 can drive the first optical assembly 14-210 to move relative to the electronic apparatus 14-20 along the first optical axis 14-OP1. In some embodiments, the arrangement direction of the second driving mechanism 14-220 and the first optical assembly 14-210 is not parallel to the first moving direction 14-D1, and the second driving mechanism 14-220 and the first optical assembly 14-210 do not overlap as seen from the first moving direction 14-D1.

For example, the second driving mechanism 14-220 can include a coil and a magnet. Of the coil and the magnet, one is connected to the first optical assembly 14-210, and the other is connected to the electronic apparatus 14-20. The magnetic pushing force between the coil and the magnet can generate the movement of the first optical assembly 14-210. For details of the structures of the second optical module 14-200, refer to the optical element driving mechanism 2-100 shown in FIG. 13 to FIG. 24, the optical element driving mechanism 3-100 shown in FIG. 25 to FIG. 34, the optical element driving mechanism 5-10 shown in FIG. 50 to FIG. 77, the optical element driving mechanism 10-100 shown in FIG. 113 to FIG. 145, or the optical element driving mechanism 11-10 shown in FIG. 146 to FIG. 166, so that the features thereof are not repeated in the interest of brevity. In some embodiments, the second optical module 14-200 can use a piezoelectric driving mechanism, and details of the structures can be discerned by analogy by referring to the first optical module 12-100 shown in FIG. 167 to FIG. 174.

The fourth optical module 14-400 includes a second optical assembly 14-410 and a third driving mechanism 14-420. The first light 14-L1 passing the second optical module 14-200 continues to move in the second moving direction 14-D2 and is received by the second optical assembly 14-410 of the fourth optical module 14-400. As shown in FIG. 187 and FIG. 188, the second optical assembly 14-410 includes a third lens 14-411 and a fourth lens 14-412, and the third lens 14-411 is disposed between the second lens 14-212 and the fourth lens 14-412. Therefore, the first light 14-L1 entering the second optical assembly 14-410 passes through the third lens 14-411 and the fourth lens 14-412 in sequence. In this embodiment, the dimensions of the second lens 14-212 are larger than those of the third lens 14-411, and the dimensions of the third lens 14-411 are larger than those of the fourth lens 14-412.

The second optical assembly 14-410 includes a second optical axis 14-OP2 parallel to the second moving direction 14-D2. In this embodiment, the fourth optical module 14-400 is configured to provide optical image stabilization, so that the third driving mechanism 14-420 can drive the second optical assembly 14-410 to move relative to the electronic apparatus 14-20 along a first shifting direction 14-M1 (Y-axis in the figures) and/or a second shifting direction 14-M2 (Z-axis in the figures), wherein the first shifting direction 14-M1 is substantially perpendicular to the second shifting direction 14-M2, and both the first shifting direction 14-M1 and the second shifting direction 14-M2 are substantially perpendicular to second optical axis 14-OP2. In some embodiments, the third optical axis 14-OP2 is not parallel and not perpendicular to the first shifting direction 14-M1 and the second shifting direction 14-M2. In some embodiments, the arrangement direction of the third driving mechanism 14-420 and the second optical assembly 14-410 is not parallel to the first moving direction 14-D1, and the third driving mechanism 14-420 and the second optical assembly 14-410 do not overlap as seen from the first moving direction 14-D1.

For example, the third driving mechanism 14-420 can include a coil and a magnet. Of the coil and the magnet, one is connected to the second optical assembly 14-410, and the other is connected to the electronic apparatus 14-20. The magnetic pushing force between the coil and the magnet can generate the movement of the second optical assembly 14-410. A detailed description of the structures of the fourth optical module 14-400 can be discerned by analogy by referring to the optical element driving mechanism 2-100 shown in FIG. 13 to FIG. 24, or the optical element driving mechanism 3-100 shown in FIG. 25 to FIG. 34, or the optical element driving mechanism 5-10 shown in FIG. 50 to FIG. 77, so that the features thereof are not repeated in the interest of brevity.

Referring to FIG. 187 and FIG. 188, the sixth optical module 14-600 includes a second light path adjusting member 14-610 and a fourth driving mechanism 14-620, wherein the second light path adjusting member 14-610 can be a prism or a mirror. After the first light 14-L1 passes the fourth optical module 14-400, the first light 14-L1 is reflected by the second light path adjusting member 14-610 and moves along a third moving direction 14-D3 (Y-axis in the figures). In other words, the second light path adjusting member 14-610 can adjust the moving direction of the first light 14-L1 from the second moving direction 14-D2 to the third moving direction 14-D3, and the second moving direction 14-D2 is not parallel to the third moving direction 14-D3.

The fourth driving mechanism 14-620 can drive the second light path adjusting member 14-610 to rotate, so as to slightly adjust the third moving direction 14-D3 of the first light 14-L1 to achieve the purpose of optical image stabilization. For example, the fourth driving mechanism 14-620 can drive the second light path adjusting member 14-610 to rotate relative to the electronic apparatus 14-20 around a third axis 14-AX3 and a fourth axis 14-AX4. The third axis 14-AX3 is substantially perpendicular to the second moving direction 14-D2 and the third moving direction 14-D3. The fourth axis 14-AX4 is not perpendicular and not parallel to the second moving direction 14-D2 and the third moving direction 14-D3.

In this embodiment, the second light path adjusting member 14-610 reflects the first light 14-L to the lateral side, so that the third moving direction 14-D1 is not parallel to the first moving direction 14-D1. In this embodiment, the arrangement direction of the fourth driving mechanism 14-620 and the second light path adjusting member 14-610 is not parallel to the first moving direction 14-D1, and the fourth driving mechanism 14-620 and the second light path adjusting member 14-610 do not overlap as seen from the first moving direction.

For example, the fourth driving mechanism 14-620 can include a coil and a magnet. Of the coil and the magnet, one is connected to the second light path adjusting member 14-610, and the other is connected to the electronic apparatus 14-20. The magnetic pushing force between the coil and the magnet can generate rotation in the second light path adjusting member 14-610. Details of the structures of the sixth optical module 14-600 can be discerned by analogy by referring to the optical element driving mechanism 4-300 shown in FIG. 35 to FIG. 49, the optical element driving mechanism 7-10 shown in FIG. 78 to FIG. 90, or the optical element driving mechanism 9-100 shown in FIG. 98 to FIG. 112, so that the features thereof are not repeated in the interest of brevity.

Referring to FIG. 187 and FIG. 189, the eighth optical module 14-800 includes a third light path adjusting member 14-810 and a sixth driving mechanism 14-820, wherein the third light path adjusting member 14-810 can be a prism or a mirror. The first light 14-L1 reflected by the second light path adjusting member 14-610 can reach the eighth optical module 14-800, and then the third light path adjusting member 14-810 can reflect the first light 14-L1 to move along a fourth moving direction 14-D4 (−X-axis in the figures). In other words, the third light path adjusting member 14-810 can adjust the moving direction of the first light 14-L1 from the third moving direction 14-D3 to the fourth moving direction 14-D4, and the third moving direction 14-D3 is not parallel to the fourth moving direction 14-D4.

The sixth driving mechanism 14-820 can drive the third light path adjusting member 14-810 to rotate, so as to slightly adjust the fourth moving direction 14-D4 of the first light 14-L1 to achieve the purpose of optical image stabilization. For example, the sixth driving mechanism 14-820 can drive the third light path adjusting member 14-810 to rotate relative to the electronic apparatus 14-20 around a fifth axis 14-AX5 and a sixth axis 14-AX6. The fifth axis 14-AX5 is substantially perpendicular to the third moving direction 14-D3 and the fourth moving direction 14-D4. The sixth axis 14-AX6 is not perpendicular and not parallel to the third moving direction 14-D3 and the fourth moving direction 14-D4.

For example, the sixth driving mechanism 14-820 can include a coil and a magnet. Of the coil and the magnet, one is connected to the third light path adjusting member 14-810, and the other is connected to the electronic apparatus 14-20. The magnetic pushing force between the coil and the magnet can generate rotation in the third light path adjusting member 14-810. In this embodiment, the fourth moving direction 14-D4 is parallel to the second moving direction, so that the arrangement direction of the sixth driving mechanism 14-820 and the third light path adjusting member 14-810 is not parallel to the first moving direction 14-D1, and the sixth driving mechanism 14-820 and the third light path adjusting member 14-810 do not overlap as seen from the first moving direction 14-D1.

In some embodiments, the fourth direction 14-D1 is parallel to the first moving direction 14-D1, so that the arrangement direction of the sixth driving mechanism 14-820 and the third light path adjusting member 14-810 is parallel to the first moving direction 14-D1, and the sixth driving mechanism 14-820 and the third light path adjusting member 14-810 are overlapped as seen from the first moving direction 14-D1.

The structures of the eighth optical module 14-800 can be discerned by analogy by referring to the optical element driving mechanism 4-300 shown in FIG. 35 to FIG. 49, the optical element driving mechanism 7-10 shown in FIG. 78 to FIG. 90, or the optical element driving mechanism 9-100 shown in FIG. 98 to FIG. 112, so that the features thereof are not repeated in the interest of brevity.

The fifth optical module 14-500 includes a third optical assembly 14-510. After the first light 14-L1 is reflected by the third light path adjusting member 14-810, the first light 14-L1 moves in the fourth moving direction 14-D4 and is received by the third optical assembly 14-510 of the fifth optical module 14-500. The third optical assembly 14-510 includes a fifth lens 14-511 and a sixth lens 14-512, and the fifth lens 14-511 is disposed between the third light path adjusting member 14-810 and the sixth lens 14-512. Therefore, the first light 14-L1 reflected by the third light path adjusting member 14-810 passes through the fifth lens 14-511 and the sixth lens 14-512 in sequence. In this embodiment, the dimensions of the fourth lens 14-412 are larger than those of the fifth lens 14-511, and the dimensions of the fifth lens 14-511 are smaller than those of the sixth lens 14-512.

The third optical assembly 14-510 includes a third optical axis 14-OP3, and the third optical axis 14-OP3 is substantially parallel to the fourth moving direction 14-D4. In this embodiment, the position of the fifth optical module 14-500 is fixed relative to the electronic apparatus 14-20.

The seventh optical module 14-700 includes a fourth optical assembly 14-710 and a fifth driving mechanism 14-720. The first light 14-L1 passing the fifth optical module 14-500 continues to move in the fourth moving direction 14-D4 and is received by the fourth optical assembly 14-710 of the seventh optical module 14-700. As shown in FIG. 187 and FIG. 189, the fourth optical assembly 14-710 includes a seventh lens 14-711 and an eighth lens 14-712, and the seventh lens 14-711 is disposed between the sixth lens

14-512 and the eighth lens 14-712. Therefore, the first light 14-L1 entering the seventh optical module 14-700 can pass through the seventh lens 14-711 and the eighth lens 14-712 in sequence. In this embodiment, the dimensions of the sixth lens 14-512 are smaller than those of the seventh lens 14-711, and the dimensions of the seventh lens 14-711 are smaller than those of the eighth lens 14-712.

Specifically, in order to make the electronic apparatus 14-20 thinner, in the direction of the thickness of the electronic apparatus 14-20, the ends of the first lens 14-211 and the second lens 14-212 can be trimmed and form trimming planes 14-211A and 14-212A, and the ends of the seventh lens 14-711 and the eighth lens 14-712 can be trimmed and form trimming planes 14-711A and 14-712A. Since the trimming portions are situated at the ends of the lenses, the optical character of the optical device 14-11 is not affected. In contrast to these lenses, each of the third lens 14-411, the fourth lens 14-412, the fifth lens 14-511, and the sixth lens 14-512 includes a circular structure without trimming. Moreover, in this embodiment, the dimensions of the first lens 14-211 are larger than those of the eighth lens 14-712.

The fourth optical assembly 14-710 includes a fourth optical axis 14-OP4 parallel to the fourth moving direction 14-D4. In this embodiment, the seventh optical module 14-700 is configured to zoom, so that the fifth driving mechanism 14-720 can drive the fourth optical assembly 14-710 to move relative to the electronic apparatus 14-20 along the fourth optical axis 14-OP4, and the largest movement range of the fourth optical assembly 14-710 relative to the electronic apparatus 14-20 along the fourth optical axis 14-OP4 is greater than the largest movement range of the second optical assembly 14-410 relative to the electronic apparatus 14-20 along the second optical axis 14-OP2.

For example, the fifth driving mechanism 14-720 can include a coil and a magnet. Of the coil and the magnet, one is connected to the fourth optical assembly 14-710, and the other is connected to the electronic apparatus 14-20. The magnetic pushing force between the coil and the magnet can generate the movement of the fourth optical assembly 14-710. The structures of the seventh optical module 14-700 can be discerned by analogy by referring to the optical element driving mechanism 2-100 shown in FIG. 13 to FIG. 24, the optical element driving mechanism 3-100 shown in FIG. 25 to FIG. 34, the optical element driving mechanism 5-10 shown in FIG. 50 to FIG. 77, or the optical element driving mechanism 10-100 shown in FIG. 113 to FIG. 145, so that the features thereof are not repeated in the interest of brevity. In some embodiments, the seventh optical module 14-700 can use a piezoelectric driving mechanism, and details of the structures can be discerned by analogy by referring to the first optical module 12-100 shown in FIG. 167 to FIG. 174.

The third optical module 14-300 includes a first photoelectric converter 14-310 and a seventh driving mechanism 14-320. After the first light 14-L1 passes through the seventh optical module 14-710, it reaches the first photoelectric converter 14-310. The first photoelectric converter 14-310 can transform the first light 14-L1 into a first image signal, and transmit the first image signal to a processor (not shown) in the electronic apparatus 14-20, where post-processing of the images can be performed.

The surface of the first photoelectric converter 14-310 receiving the first light 14-L1 is a receiving surface 14-311, and the first photoelectric converter 14-310 includes a fifth optical axis 14-OP5. The fifth optical axis 14-OP5 is parallel to the fourth moving direction 14-D4 and perpendicular to the receiving surface 14-311. The seventh driving mechanism 14-320 can drive the first photoelectric converter 14-310 to rotate relative to the electronic apparatus 14-20 around a fifth optical axis 14-OP5 to achieve the purpose of optical image stabilization. In this embodiment, the seventh driving mechanism 14-320 can further drive the first photoelectric converter 14-310 to rotate relative to the electronic apparatus 14-20 around a seventh axis 14-AX7 (Y-axis in the figures) and an eighth axis 14-AX8 (Z-axis in the figures). Both the seventh axis 14-AX7 and the eighth axis 14-AX8 are substantially perpendicular the fifth optical axis 14-OP5, and the seventh axis 14-AX7 is not parallel to the eight axis 14-AX8.

For example, the seventh driving mechanism 14-320 can include a coil and a magnet. Of the coil and the magnet, one is connected to the first photoelectric converter 14-310, and the other is connected to the electronic apparatus 14-20. The magnetic pushing force between the coil and the magnet can generate rotation in the first photoelectric converter 14-310.

As shown in FIG. 187, in this embodiment, the ninth optical module 14-900 is disposed between the sixth optical module 14-600 and the eighth optical module 14-800. The ninth optical module 14-900 includes an iris aperture 14-910 and an eighth driving mechanism 14-920. The iris aperture 14-910 is configured to adjust the amount of light passing through the iris aperture 14-910, and eighth optical module 14-800 is configured to change the size of the iris aperture 14-910.

The iris aperture 14-910 includes a sixth optical axis 14-OP6. Since the ninth optical module 14-900 in this embodiment is disposed between the sixth optical module 14-600 and the eighth optical module 14-800, the sixth optical axis 14-OP6 is parallel to the third moving direction 14-D3 and not parallel to the first moving direction 14-D1, the second moving direction 14-D2, and the fourth moving direction 14-D4.

Although the ninth optical module 14-900 in this embodiment is disposed between the sixth optical module 14-600 and the eighth optical module 14-800, the position of the ninth optical module 14-900 can be adjusted as required. For example, the ninth optical module 14-900 can be disposed between the opening 14-11A and the first optical module 14-100, between the first optical module 14-100 and the second optical module 14-200, between the second optical module 14-200 and the fourth optical module 14-400, between the fourth optical module 14-400 and the sixth optical module 14-600, between the eighth optical module 14-800 and the fifth optical module 14-500, or between the fifth optical module 14-500 and the seventh optical module 14-700. When the ninth optical module 14-900 is disposed between the first optical module 14-100 and the second optical module 14-200, between the second optical module 14-200 and the fourth optical module 14-400, between the fourth optical module 14-400 and the sixth optical module 14-600, the eighth optical module 14-800 and the sixth optical axis 14-OP6 do not overlap as seen from the first moving direction 14-D1.

Referring to FIG. 185 and FIG. 186, the optical device 14-12 includes a lens 14-12B and a second photoelectric converter 14-12C. After the second light 14-L2 passes through the opening 14-12A of the optical device 14-12, the second light 14-L2 reaches the second photoelectric converter 14-12C. The second photoelectric converter 14-12C can transform the second light 14-L2 into a second image signal, and transmit the second image signal to the processor in the electronic apparatus 14-20, where post-processing of the images can be performed.

A distance between the first photoelectric converter 14-310 of the optical device 14-11 and the second photoelectric converter 14-12C of the optical device 14-12 is not zero, and the optical device 14-11 and the optical device 14-12 are overlapped with each other as seen from all directions perpendicular to the first moving direction 14-D1. Therefore, the space in the electronic apparatus 14-20 can be full used.

In the aforementioned embodiment, the second optical module 14-200, the fourth optical module 14-400 and the seventh optical module 14-700 are respectively used to focus, provide optical image stabilization, and zoom, but it is not limited thereto. In some embodiments, one or more of the second optical module 14-200, the fourth optical module 14-400, the fifth optical module 14-500, and the seventh optical module 14-700 can be used to focus, one or more of the second optical module 14-200, the fourth optical module 14-400, the fifth optical module 14-500, and the seventh optical module 14-700 can be used to provide optical image stabilization, and one or more of the second optical module 14-200, the fourth optical module 14-400, the fifth optical module 14-500, and the seventh optical module 14-700 can be used to zoom. In some embodiments, the positions of the second optical module 14-200, the fourth optical module 14-400, the fifth optical module 14-500, and the seventh optical module 14-700 can be adjusted as required. For example, each of them can be disposed between the opening 14-11A and the first optical module 14-100, between the first optical module 14-100 and the sixth optical module 14-600, between the sixth optical module 14-600 and the eighth optical module 14-800, or between the eighth optical module 14-800 and the third optical module 14-300. It should be noted that, no matter where the second optical module 14-200, the fourth optical module 14-400, the fifth optical module 14-500, and the seventh optical module 14-700 are disposed, the second optical module 14-200, the fourth optical module 14-400, the fifth optical module 14-500, and the seventh optical module 14-700 should be disposed on the light path of the first light 14-L1 in sequence.

Referring to FIG. 190, in another embodiment, the ninth optical module 14-900 is disposed between the second optical module 14-200 and the fourth optical module 14-400, and the fifth optical module 14-500 and the seventh optical module 14-700 are omitted. The fifth optical axis 14-OP5 of the first photoelectric converter 14-310 is parallel to the fourth moving direction 14-D4, and the first photoelectric converter 14-310 overlaps the third light path adjusting member 14-810 as seen from the fourth moving direction 14-D4. Since the third optical module 14-300 is closely adjacent to the eighth optical module 14-800, the seventh driving mechanism 14-320 of the third optical module 14-300 overlaps the third light path adjusting member 14-810 as seen from a direction that is perpendicular to the fourth moving direction 14-D4.

Referring to FIG. 191, in another embodiment, the ninth optical module 14-900 is disposed between the second optical module 14-200 and the fourth optical module 14-400, and the fifth optical module 14-500, the seventh optical module 14-700, and the eighth optical module 14-800 are omitted. The first light 14-L1 is reflected by the sixth optical module 14-600 to move in the direction which the thickness of the electronic apparatus 14-20 be measured. Therefore, the third moving direction 14-D3 is parallel to the first moving direction 14-D1, and the arrangement direction of the fourth driving mechanism 14-620 and the second light path adjusting member 14-610 is parallel to the first moving direction 14-D1. As seen from the first moving direction 14-D1, the seventh driving mechanism 14-320 of the third optical module 14-300 overlaps the second light path adjusting member 14-610.

The fifth optical axis 14-OP5 of the first photoelectric converter 14-310 is parallel to the third moving direction 14-D3, and the first photoelectric converter 14-310 overlaps the second light path adjusting member 14-610 as seen from the third moving direction 14-D3. Since the third optical module 14-300 is closely adjacent to the sixth optical module 14-600, the seventh driving mechanism 14-320 of the third optical module 14-300 overlaps the second light path adjusting member 14-610 as seen from the direction that is perpendicular to the third moving direction 14-D3.

In this embodiment, since the first photoelectric converter 14-310 is horizontally disposed in the electronic apparatus 14-20, the thickness of the electronic apparatus 14-20 can be reduced. The miniaturization of the electronic apparatus 14-20 can be facilitated.

Referring to FIG. 192 and FIG. 193, in another embodiment, the seventh optical module 14-700' includes a plurality of fourth optical assemblies 14-710'. These fourth optical assemblies 14-710' have different focal lengths, and are disposed on a frame 14-730'. The fifth driving mechanism 14-720' of the seventh optical module 14-700' can drive the frame 14-730' to move in a direction that is perpendicular to the fourth moving direction 14-D4, so as to dispose different fourth optical assemblies 14-710' on the light path of the first light 14-L1. For example, the fifth driving mechanism 14-720' can include a coil and a magnet. Of the coil and the magnet, one is connected to the frame 14-730', and the other is connected to the electronic apparatus 14-20. The magnetic pushing force between the coil and the magnet can generate the movement of the frame 14-730'.

Referring to FIG. 194, in some embodiments, the members in the optical device 14-11 can be affixed to each other by a fixed frame and/or adhesive members. As shown in the figures, the first optical module 14-100 can be affixed to the fixed frame 14-11B via a first adhesive member 14-11C, the second optical module 14-200 can be affixed to the fixed frame 14-11B via a second adhesive member 14-11D, and the third optical module 14-300 can be affixed to the fixed frame 14-11B via the third adhesive member 14-11E. The distance between the first optical module 14-100 and the second optical module 14-200 is not zero, the distance between the first optical module 14-100 and the third optical module 14-300 is not zero, and the distance between the second optical module 14-200 and the third optical module 14-300 is not zero.

The first adhesive member 14-11C, the second adhesive member 14-11D, and the third adhesive member 14-11E are light-curing glue or thermal-curing glue. In assembly, the user can adjust the positions of the first optical module 14-100 and the second optical module 14-200 to theirs predetermined positions before the first adhesive member 14-11C and the second adhesive member 14-11D are cured, so as to align the first optical axis 14-OP1 with the first axis 14-AX1 in the X-axis. Similarly, the user can also adjust the position of the third optical module 14-300 to its predetermined positions before the third adhesive member 14-11E is cured. The fourth optical module 14-400, the fifth optical module 14-500, the sixth optical module 14-600, the seventh optical module 14-700, the eighth optical module 14-800, and the ninth optical module 14-900 can be disposed on the fixed frame 14-11B by using the same method, so that the features thereof are not repeated in the interest of brevity.

After the positions of the members in the optical device 14-11 are already adjusted, the adhesive members can be cured by light or heat.

In some embodiments, the fixed frame 14-11B can be omitted. The first adhesive member 14-11C is directly in contact with the first optical module 14-100 and the third optical module 14-300, and the second adhesive member 14-11D is directly in contact with the second optical module 14-200 and the third optical module 14-300, so that the members in the optical device 14-11 can be affixed to each other.

In summary, an optical system is provided. The optical system is affixed to an electronic apparatus and configured to receive a first light. The optical system includes a first optical module, a second optical module, and a third optical module. The third optical module includes a first photoelectric converter, configured to transform the first light to a first image signal. The second optical module is disposed between the first optical module and the third optical module in the light path of the first light. When the first light passes the first optical module, the first optical module adjusts the moving direction of the first light from a first moving direction to a second moving direction, wherein the first moving direction is not parallel to the second moving direction. According to the aforementioned relative position and the dimensions relationship, the optical system can be thinner in a specific direction, and the optical system can be miniaturized. Moreover, the system can enhance its optical quality (such as the image quality or the depth sensing accuracy) by using different optical modules. The efficacy of optical image stabilization can be also greatly enhanced by a multiple optical image stabilization system formed by the optical modules.

Referring to FIG. 195, in an embodiment of the invention, an optical system 15-10 can be disposed in an electronic apparatus 15-20 and used to take photographs or record video. The electronic apparatus 15-20 can be a smartphone, a laptop computer, or a digital camera, for example. When taking photographs or recording video, the optical system 15-10 can receive the light and form an image, wherein the image can be transmitted to a processor (not shown) in the electronic apparatus 15-20, where post-processing of the image can be performed.

FIG. 196 is a schematic diagram of the aforementioned optical system 15-10. As shown in the FIG. 195 and FIG. 196, the optical system 15-10 primarily includes a reflecting module 15-100, a first light path adjusting module 15-200, a second light path adjusting module 15-300, an optical module 15-400, a photoelectric converter module 15-500, and a light quantity controlling module 15-600. The aforementioned members are discussed below.

The reflecting module 15-100 can include a reflecting member 15-110. When a light 15-L enters the optical system 15-10 via an opening 15-11 of the optical system 15-10, the reflecting member 15-110 can reflect the light 15-L, and the light 15-L can move along a first direction 15-D1. In this embodiment, the electronic apparatus 15-20 has a plate structure, and the light 15-L enters the optical system 15-10 along a direction which the thickness of the electronic apparatus 15-20 be measured (Z-axis in the figures), and the reflecting member 15-110 reflects the light 15-L to move along the length or the width of the electronic apparatus 15-200. Therefore, the thickness of the electronic apparatus 15-20 can be reduced, and the electronic apparatus 15-20 can be thinner.

After the light 15-L is reflected by the reflecting member 15-110, the light 15-L can reach the first light path adjusting module 15-200 along the first direction 15-D1. The first light path adjusting module 15-200 includes a first light path adjusting member 15-210, a first driving mechanism 15-220, and a first hollow frame 15-230, wherein the first light path adjusting member 15-210 and the first driving mechanism 15-220 are accommodated in the first hollow frame 15-230.

The first light path adjusting member 15-210 includes a first main body 15-211, a first penetrating portion 15-212, a second penetrating portion 15-213, a first reflecting portion 15-214, and a second reflecting portion 15-215. The first main body 15-211 can be made of transparent solid or liquid (such as glass or acrylic), and have a first side 15-2111, a second side 15-2112, and a third side 15-2113. The first side 15-2111 faces the reflecting module 15-100, the second side 15-2112 is opposite to the first side 15-2111, and the third side 15-2113 connects the first side 15-2111 to the second side 15-2112.

The first penetrating portion 15-212 is disposed on the first side 15-2111 of the first main body 15-211, and includes an anti-reflective material (a first anti-reflective material) to enhance the penetration rate of the light 15-L. When the light 15-L reflected by the reflecting member 15-110 reaches the first light path adjusting module 15-200, the light enters the first main body 15-211 via the first penetrating portion 15-212. It should be noted that, the light 15-L enters the first main body 15-211 via the first penetrating surface 15-212A of the first penetrating portion 15-212, and the first penetrating surface 15-212A is not perpendicular and not parallel to the first direction 15-D1. Therefore, when the light 15-L enters the first main body 15-211, it refracts and moves along a third direction 15-D3, and the third direction 15-D3 is not parallel to the first direction 15-D1.

The first reflecting portion 15-214 is disposed on the second side 15-2112 of the first main body 15-211, and includes a reflective material (such as metal coating) to enhance the reflection rate of the light 15-L. When the light 15-L moves along the third direction 15-D3 in the first main body 15-211 to the second side 15-2112 of the first main body 15-211, the light 15-L is in contact with the first reflecting portion 15-214 and reflected by the first reflecting portion 15-214 to move along a fourth direction 15-D4. Since the first reflecting surface 15-214A of the first reflecting portion 15-214, which is used to reflect the light 15-L, is not perpendicular and not parallel to the third direction 15-D3, the fourth direction 15-D4 is not parallel to the third direction 15-D3.

The second reflecting portion 15-215 is disposed on the first side 15-2111 of the first main body 15-211. The light 15-L reflected by the first reflecting portion 15-214 can move along the fourth direction 15-D4 to the first side 15-2111 of the first main body 15-211 again and reach the second reflecting portion 15-215. When the light 15-L is in contact with the second reflecting portion 15-215, the light 15-L is reflected by the second reflecting portion 15-215 again.

The difference between the first reflecting portion 15-214 and the second reflecting portion 15-215 is in that the second reflecting portion 15-215 does not include any reflective material. When the light 15-L is in contact with the second reflecting portion 15-215, it is reflected by total internal reflection to a fifth direction 15-D5. Since the second reflecting surface 15-215A of the second reflecting portion 15-215, which is used to reflect the light 15-L, is not perpendicular and not parallel to the fourth direction 15-D4, the fifth direction 15-D5 is not parallel to the fourth direction 15-D4.

The second penetrating portion 15-213 is disposed on the third side 15-2113 of the first main body 15-211. The light 15-L reflected by the second reflecting portion 15-215 can move along the fifth direction 15-D5 to the third side 15-2113 of the first main body 15-211 and reach the second penetrating portion 15-213. The second penetrating portion 15-213 includes an anti-reflective material (a second anti-reflective material). Therefore, when the light 15-L reaches the second penetrating portion 15-213, it can pass the second penetrating portion 15-213 and leave the first main body 15-211. Since the second penetrating surface 15-213A of the second penetrating portion 15-213 is not perpendicular and not parallel to the fifth direction 15-D5, the light 15-L refracts when passing through the second penetrating portion 15-213 and moves along a second direction 15-D2. The second direction 15-D2 is not perpendicular and not parallel to the second penetrating surface 15-213A. In this embodiment, the second direction 15-D2 is not parallel to the first direction 15-D1. In some embodiments, the second direction 15-D2 can be adjusted to be parallel to the first direction 15-D1.

In this embodiment, the anti-reflective material (the first anti-reflective material) of the first penetrating portion 15-212 can be the same as the anti-reflective material (the second anti-reflective material) of the second penetrating portion 15-213, and different from the material of the first main body 15-211. The reflective material of the first reflecting portion 15-214 is different from the material of the first main body 15-211. In some embodiments, the first penetrating portion 15-212 and the second penetrating portion 15-213 include different anti-reflective materials.

In some embodiments, the first reflecting portion 15-214 can reflect the light 15-L by total internal reflection (there is no reflective material disposed thereon), and the second reflecting portion 15-215 includes a reflective material. In some embodiments, both the first reflecting portion 15-214 and the second reflecting portion 15-215 include reflective material. In some embodiments, the first reflecting portion 15-214 can reflect the light 15-L by total internal reflection, and the second reflecting portion 15-215 can reflect the light 15-L by total internal reflection too.

It should be noted that, the light 15-L will converge or diverge in the refractions and the reflections in the first main body 15-211, so that the absolute value of the focal length of the first light path adjusting module 15-200 is greater than zero and smaller than infinite.

The first driving mechanism 15-220 is configured to drive the first main body 15-211 to move relative to the electronic apparatus 15-20, so as to achieve the purpose of focus, optical image stabilization (OIS), and/or zoom. For example, the first driving mechanism 15-220 can drive the first main body 15-211 to move along the first direction 15-D1 relative to the electronic apparatus 15-20, to move along a direction that is perpendicular to the first direction 15-D1 relative to the electronic apparatus 15-20, and/or to rotate around the first direction 15-D1 relative to the electronic apparatus 15-20.

For example, the first driving mechanism 13-220 can include a coil and a magnet. Of the coil and the magnet, one is connected to the first main body 15-211, and the other is connected to the first hollow frame 15-230 or the electronic apparatus 13-20. The magnetic pushing force between the coil and the magnet can drive the first main body 15-211 to move and/or rotate relative to the electronic apparatus 15-20.

Referring to FIG. 196, after the light 15-L leaves the first light path adjusting module 15-200 along the second direction 15-D2, it reaches the second light path adjusting module 15-300. As seen from the first direction 15-D1, the dimensions of the second light path adjusting module 15-300 are larger than those of the first light path adjusting module 15-200. In other words, as seen from the first direction 15-D1, at least a portion of the second light path adjusting module 15-300 does not overlap the first light path adjusting module 15-200.

The second light path adjusting module 15-300 includes a second light path adjusting member 15-310, a second driving mechanism 15-320, and a second hollow frame 15-330, wherein the second light path adjusting member 15-310 and the second driving mechanism 15-320 are accommodated in the second hollow frame 15-330.

The first light path adjusting member 15-310 includes a second main body 15-311, a third penetrating portion 15-312, a fourth penetrating portion 15-313, a third reflecting portion 15-314, and a fourth reflecting portion 15-315. The second main body 15-311 can be made of transparent solid or liquid (such as glass or acrylic), and have a fourth side 15-3111, a fifth side 15-3112, and a sixth side 15-3113. The fourth side 15-3111 faces the first light path adjusting module 15-200, the fifth side 15-3112 is opposite to the fourth side 15-3111, and the sixth side 15-3113 connects the fourth side 15-3111 to the fifth side 15-3112.

The third penetrating portion 15-312 is disposed on the fourth side 15-3111 of the second main body 15-311, and includes a first anti-reflective layer to enhance the penetration rate of the light 15-L. When the light 15-L leaves the first light path adjusting module 15-200 and enters the second light path adjusting module 15-300, the light 15-L can enter the second main body 15-311 via the third penetrating portion 15-312. It should be noted that, the light 15-L enters the second main body 15-311 via the third penetrating surface 15-312A of the third penetrating portion 15-312, and the third penetrating surface 15-312A is not perpendicular and not parallel to the second direction 15-D2. Therefore, when the light 15-L enters the second main body 15-311, it refracts and moves along a seventh direction 15-D7, and the seventh direction 15-D7 is not parallel to the second direction 15-D2.

The third reflecting portion 15-314 is disposed on the sixth side 15-3113 of the second main body 15-311, and includes a first reflective layer to enhance the reflection rate of the light 15-L. When the light 15-L moves along the seventh direction 15-D7 in the second main body 15-311 to the sixth side 15-3113 of the second main body 15-311, the light 15-L is in contact with the third reflecting portion 15-314 and reflected by the third reflecting portion 15-314 to move along an eighth direction 15-D8. Since the third reflecting surface 15-314A of the third reflecting portion 15-314, which is used to reflect the light 15-L, is not perpendicular and not parallel to the seventh direction 15-D7, the eighth direction 15-D8 is not parallel to the seventh direction 15-D7.

The fourth reflecting portion 15-315 is disposed on the fourth side 15-3111 of the second main body 15-311. The light 15-L reflected by the third reflecting portion 15-314 can move along the eighth direction 15-D8 to the fourth side 15-3111 of the second main body 15-311 again and reach the fourth reflecting portion 15-315. When the light 15-L is in contact with the fourth reflecting portion 15-315, the light 15-L is reflected by the fourth reflecting portion 15-315 again.

Similar to the third reflecting portion 15-314, the fourth reflecting portion 15-315 includes a second reflective layer to enhance the reflection rate of the light 15-L. When the light 15-L is in contact with the fourth reflecting portion 15-315, the light 15-L is reflected by the fourth reflecting portion 15-315 to move along a ninth direction 15-D9. Since the fourth reflecting surface 15-315A of the fourth reflecting portion 15-315, which is used to reflect the light 15-L, is not perpendicular and not parallel to the eighth direction 15-D8, the ninth direction 15-D9 is not parallel to the eighth direction 15-D8.

The fourth penetrating portion 15-313 is disposed on the fifth side 15-3112 of the second main body 15-311. The light 15-L reflected by the fourth reflecting portion 15-315 can move along the ninth direction 15-D9 to the fifth side 15-3112 of the second main body 15-311 and reach the fourth penetrating portion 15-313. The fourth penetrating portion 15-313 includes a second anti-reflective layer to enhance the penetration rate of the light 15-L. Therefore, when the light 15-L reaches the fourth penetrating portion 15-313, it can pass the fourth penetrating portion 15-313 and leave the second main body 15-311. Since the fourth penetrating surface 15-313A of the fourth penetrating portion 15-313 is not perpendicular and not parallel to the ninth direction 15-D9, the light 15-L refracts when passing through the fourth penetrating portion 15-313 and moves along a sixth direction 15-D6. The sixth direction 15-D6 is not perpendicular and not parallel to the fourth penetrating surface 15-313A. In this embodiment, the sixth direction 15-D6 is not parallel to the first direction 15-D1 and the second direction 15-D2. In some embodiments, the sixth direction 15-D6 can be adjusted to be parallel to the first direction 15-D1.

In this embodiment, the material of the first anti-reflective layer of the third penetrating portion 15-312 can be the same as that of the second anti-reflective layer of the fourth penetrating portion 15-313, and different from the material of the second main body 15-311. The material of the first reflective layer of the third reflecting portion 15-314 can be the same as that of the second reflective layer of the fourth reflecting portion 15-315, and different from the material of the second main body 15-311. In some embodiments, the first anti-reflective layer of the third penetrating portion 15-312 and the second anti-reflective layer of the fourth penetrating portion 15-313 can include different materials, and the first reflective layer of the third reflecting portion 15-314 and the second reflective layer of the fourth reflecting portion 15-315 can include different materials.

Since the light 15-L converges or diverges in the refractions and the reflections in the second main body 15-311, the absolute value of the focal length of the second light path adjusting module 15-300 is greater than zero and smaller than infinite.

The second driving mechanism 15-320 is configured to drive the second main body 15-311 to move relative to the electronic apparatus 15-20, so as to achieve the purpose of focus, optical image stabilization, and/or zoom. For example, the second driving mechanism 15-320 can drive the second main body 15-311 to move along the sixth direction 15-D6 relative to the electronic apparatus 15-20, to move along a direction that is perpendicular to the sixth direction 15-D6 relative to the electronic apparatus 15-20, and/or to rotate around the sixth direction 15-D6 relative to the electronic apparatus 15-20.

For example, the second driving mechanism 13-320 can include a coil and a magnet. Of the coil and the magnet, one is connected to the second main body 15-311, and the other is connected to the second hollow frame 15-330 or the electronic apparatus 13-20. The magnetic pushing force between the coil and the magnet can drive the second main body 15-311 to move and/or rotate relative to the electronic apparatus 15-20.

As shown in FIG. 196, after the light 15-L moves along the sixth direction 15-D6 and leaves the second light path adjusting module 15-300, it reaches the optical module 15-400. The optical module 15-400 is configured to adjust the focal length of the optical system 15-10, and includes at least one optical member 15-410, a third driving mechanism 15-420, and a third hollow frame 15-430. The optical member 15-410 and the third driving mechanism 15-420 are accommodated in the third hollow frame 15-430. The optical member 15-410 can be a lens, and the third driving mechanism 15-420 can be configured to drive the optical member 15-410 to move relative to the electronic apparatus 15-20.

For example, the third driving mechanism 15-420 can drive the optical member 15-410 to move along an optical axis 15-411 of the optical axis 15-410 relative to the electronic apparatus 15-20 and/or to move along a direction that is perpendicular to the optical axis 15-411 relative to the electronic apparatus 15-20. The optical axis 15-411 is parallel to the first direction 15-D1 or the sixth direction 15-D6, and is not parallel to the second direction 15-D2.

The third driving mechanism 13-420 can include a coil and a magnet. Of the coil and the magnet, one is connected to the optical member 15-410, and the other is connected to the third hollow frame 15-430 or the electronic apparatus 13-20. The magnetic pushing force between the coil and the magnet can drive the second main body 15-311 to move relative to the electronic apparatus 15-20.

After the light 15-L passes through the optical module 15-400, it reaches the photoelectric converter module 15-500. The photoelectric converter module 15-500 includes a photoelectric converter member 15-510, a fifth driving mechanism 15-520, and a fifth hollow frame 15-530. The photoelectric converter member 15-510 and the fifth driving mechanism 15-520 are accommodated in the fifth hollow frame 15-530. The photoelectric converter member 15-510 can transform the received light 15-L into an electrical signal, and the fifth driving mechanism 15-520 can drive the photoelectric converter member 15-510 to move relative to the electronic apparatus 15-20.

For example, the fifth driving mechanism 15-520 can drive the photoelectric converter member 15-510 to move along the optical axis 15-411 relative to the electronic apparatus 15-20 and/or to move along a direction that is perpendicular to the optical axis 15-411 relative to the electronic apparatus 15-20. The fifth driving mechanism 13-520 can include a coil and a magnet. Of the coil and the magnet, one is connected to the photoelectric converter member 15-510, and the other is connected to the fifth hollow frame 15-530 or the electronic apparatus 13-20. The magnetic pushing force between the coil and the magnet can drive the photoelectric converter member 15-510 to move relative to the electronic apparatus 15-20.

Referring to FIG. 196, in this embodiment, the light quantity controlling module 15-600 is disposed between the reflecting module 15-100 and the first light path adjusting module 15-200. The light quantity controlling module 15-600 is configured to control the amount of light 15-L passing through the light quantity controlling module 15-600. The light quantity controlling module 15-600 includes an iris aperture 15-610, a fourth driving mechanism 15-620, and a fourth hollow frame 15-630. The iris aperture 15-610 and the fourth driving mechanism 15-620 are accommodated in the fourth hollow frame 15-630, and the fourth driving mechanism 15-620 is configured to adjust the size of the iris aperture 15-610.

In some embodiments, the light quantity controlling module 15-600 is disposed between the opening 15-11 and the reflecting module 15-100, between the first light path adjusting module 15-200 and the second light path adjusting module 15-300, or the second light path adjusting module 15-300 and the optical module 15-400.

In summary, an optical system is provided, including a first light path adjusting module. The light path adjusting module includes a first light path adjusting member configured to adjust the moving direction of a light from a first direction to a second direction, and the first direction is not parallel to the second direction. The absolute value of the focal length of the first light path adjusting module is greater than zero and smaller than infinite. The aforementioned optical system can increase the light path in a limited space, and therefore increase the focal length of the optical system. Thus, the telephoto camera with long focal length can be disposed in the miniaturized electronic apparatus.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical system, comprising:

a first optical module, configured to drive an optical assembly to move, and the first optical module includes:

a first movable part, configured to connected an optical element;

a first fixed part, wherein the first movable part is movable relative to the first fixed part;

a first driving assembly, configured to drive the first movable part to move relative to the first fixed part; and a guide assembly, configured to guide the first movable part to move in a first dimension, wherein when viewed along a first optical axis of the first optical element, the first fixed part has a polygonal structure, and includes a first side extending along a first direction and a second side extending along a second direction, wherein the first direction and the second direction are different from each other, wherein the lengths of the first and second sides are different, wherein when viewed along the direction of the first optical axis, the first driving assembly is located on the second side, wherein when viewed along the direction of the first optical axis, the guide assembly is located on the second side, and wherein when viewed along the direction of the first optical axis, a first position sensing assembly of the first optical module is located on the second side, wherein the first position sensing assembly is configured to sense the movement of the first movable part relative to the first fixed part.

2. The optical system as claimed in claim 1, wherein both the first direction and the second direction are perpendicular to the first optical axis, and the length of the first side is greater than the length of the second side.

3. The optical system as claimed in claim 1, wherein the first optical module further includes a first pressure assembly for generating a first pre-load on the first movable part;

the first movable part is stably and movably connected to the guide assembly via the first pre-load;

the first pressure assembly further includes:

a first magnetic element, having an elongated structure;

a second magnetic element, corresponding to the first magnetic element to generate the first pre-load;

wherein at least one of the first and second magnetic elements has a permanent magnet; and the first and second magnetic elements are respectively disposed on the first movable part and the first fixed part.

4. The optical system as claimed in claim 3, wherein the first position sensing assembly senses the movement of the first movable part relative to the first fixed part by sensing the first magnetic element or the second magnetic element.

5. The optical system as claimed in claim 3, wherein when viewed along the central arrangement direction of the first and second magnetic elements, the first position sensing assembly at least partially overlaps the first magnetic element or the second magnetic element.

6. The optical system as claimed in claim 3, wherein the first pre-load direction extends from the first movable part toward the second side; and a first extension imaginary line of the first pre-load does not pass through the guide assembly.

7. The optical system as claimed in claim 1, wherein the first driving assembly further includes:

a first piezoelectric element with piezoelectric material; and a first contact element corresponding to the first piezoelectric element;

wherein the first piezoelectric element and the first contact element are respectively fixedly arranged on the first movable part and the first fixed part;

when viewed from a direction that is perpendicular to the first optical axis, the first piezoelectric element and the first contact element at least partially overlap; and the movement in the first dimension is a movement along the first optical axis.

8. The optical system as claimed in claim 1, wherein the first optical module further includes:

a second movable part for connecting a second optical element;

a second driving assembly for driving the second movable part to move relative to the first fixed part; and a second position sensing assembly for sensing the movement of the second movable part relative to the first fixed part;

wherein when viewed along the direction of the first optical axis, the second position sensing assembly is located on the second side; and when viewed along the direction of the first optical axis, the first and second position sensing assemblies at least partially overlap.

9. The optical system as claimed in claim 8, wherein the guide assembly is used to guide the second movable part to move in the first dimension.

10. The optical system as claimed in claim 8, wherein the first optical module further includes a second pressure assembly for generating a second pre-load on the second movable part;

the second movable part is stably and movably connected to the guide assembly via the second pre-load;

the second pressure assembly further includes:

a third magnetic element, having an elongated structure; and a fourth magnetic element, corresponding to the third magnetic element to generate the second pre-load;

wherein at least one of the third and fourth magnetic elements has a permanent magnet; and the third and fourth magnetic elements are respectively disposed on the second movable part and the first fixed part.

11. The optical system as claimed in claim 10, wherein the second position sensing assembly senses the movement of the second movable part relative to the first fixed part by sensing the third magnetic element or the fourth magnetic element.

12. The optical system as claimed in claim 10, wherein when viewed along the central arrangement direction of the third and fourth magnetic elements, the second position sensing assembly at least partially overlaps the third magnetic element or the fourth magnetic element.

13. The optical system as claimed in claim 10, wherein the second pre-load direction extends from the second movable part toward the second side; and a second extension imaginary line of the second pre-load does not pass through the guide assembly.

14. The optical system as claimed in claim 13, wherein the second driving assembly further includes:

a second piezoelectric element, having piezoelectric material; and a second contact element, corresponding to the first piezoelectric element;

wherein the second piezoelectric element and the second contact element are fixedly disposed on the second movable part and the first fixed part, respectively;

when viewed along a direction that is perpendicular to the first optical axis, the second piezoelectric element and the second contact element at least partially overlap; and the movement in the first dimension is a movement along the first optical axis.

15. The optical system as claimed in claim 14, wherein the first driving assembly further includes:

a first piezoelectric element with piezoelectric material; and a first contact element corresponding to the first piezoelectric element; and when viewed from a direction that is perpendicular to the first optical axis, the first piezoelectric element and the first contact element at least partially overlap.

16. The optical system as claimed in claim 1, further comprising a second optical module;

wherein a light passes through the second optical module to the first optical module, wherein the second optical module includes a third optical element for changing the direction of the light.

17. The optical system as claimed in claim 16, further comprising a third optical module for connecting a fourth optical element with a second optical axis, the light passing through the fourth optical element, and the first and second optical axes are not parallel;

wherein the second optical module further includes:

a third movable part, for connecting the third optical element;

a second fixed part, wherein the third movable part is movable relative to the second fixed part; and a third driving assembly, for driving the third movable part to move relative to the second fixed part;

wherein the third driving assembly is used for driving the third movable part to move relative to the second fixed part in a second dimension, and the second dimension is different from the first dimension;

the movement in the second dimension is a rotation around an axis which extends in a third direction;

the third optical module includes:

a fourth movable part, for connecting the fourth optical element;

a third fixed part, wherein the fourth movable part is movable relative to the third fixed part; and a fourth driving assembly for driving the fourth movable part to move relative to the third fixed part;

wherein the fourth driving assembly is configured to drive the fourth movable part to move relative to the third fixed part in a third dimension, and the third dimension is different from the first dimension; and the third dimension is different from the second dimension.

18. The optical system as claimed in claim 17, wherein the second optical module is located between the first and third optical modules.

19. The optical system as claimed in claim 17, wherein the fourth optical element includes a plurality of optical lenses; and the first optical element includes at least one optical lens, and the number of optical lenses of the fourth optical element is greater than the number of optical lenses of the first optical element.

* * * * *